(12) United States Patent
Badic et al.

(10) Patent No.: US 11,444,668 B2
(45) Date of Patent: Sep. 13, 2022

(54) METHODS AND DEVICES FOR WIRELESS COMMUNICATIONS IN DEVICE-TO-DEVICE NETWORKS

(71) Applicant: Intel Corporation, Santa Clara, CA (US)

(72) Inventors: Biljana Badic, Munich (DE); Nuno Manuel Kiilerich Pratas, Gistrup (DK); Markus Dominik Mueck, Unterhaching (DE); Zhibin Yu, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/251,230

(22) PCT Filed: Oct. 8, 2019

(86) PCT No.: PCT/EP2019/077204
§ 371 (c)(1),
(2) Date: Dec. 11, 2020

(87) PCT Pub. No.: WO2020/114651
PCT Pub. Date: Jun. 11, 2020

(65) Prior Publication Data
US 2021/0297128 A1  Sep. 23, 2021

(30) Foreign Application Priority Data
Dec. 5, 2018  (EP) .................................... 18210469

(51) Int. Cl.
*H04B 7/06* (2006.01)
*G01S 5/02* (2010.01)
(Continued)

(52) U.S. Cl.
CPC .......... *H04B 7/0617* (2013.01); *G01S 5/0284* (2013.01); *G01S 19/01* (2013.01);
(Continued)

(58) Field of Classification Search
CPC .... H04B 7/0617; H04B 7/0695; H04B 7/088; G01S 5/0284; G01S 19/01; H04W 72/0406; H04W 92/18; H04W 36/03; H04W 84/18
See application file for complete search history.

(56) References Cited

U.S. PATENT DOCUMENTS

2002/0147032 A1 10/2002 Yoon et al.
2013/0322276 A1* 12/2013 Pelletier ............ H04W 72/0453
370/252
(Continued)

OTHER PUBLICATIONS

International search report issued for corresponding PCT application PCT/EP2019/077204, dated Jan. 15, 2020, 26 pages (for informational purpose only).
(Continued)

*Primary Examiner* — Kenneth T Lam
(74) *Attorney, Agent, or Firm* — Viering, Jentschura & Partner mbB

(57) ABSTRACT

A wireless device includes a transceiver including an antenna arrangement with at least two antennas, a communication processor configured to control communications of the wireless device with at least one further wireless device included in a network of wireless devices based on data relating to mutual connections between wireless devices included in the network, a beamforming controller configured to control a configuration of the at least two antennas to steer at least one beam for transmission of data based on beamforming information.

25 Claims, 108 Drawing Sheets

(51) Int. Cl.
  *G01S 19/01* (2010.01)
  *H04W 72/04* (2009.01)
  *H04W 92/18* (2009.01)

(52) U.S. Cl.
  CPC ...... *H04B 7/0695* (2013.01); *H04W 72/0406* (2013.01); *H04W 92/18* (2013.01)

(56) References Cited

U.S. PATENT DOCUMENTS

| | | | |
|---|---|---|---|
| 2018/0075746 A1* | 3/2018 | Jiang | H04W 84/005 |
| 2018/0115958 A1* | 4/2018 | Raghavan | H04B 7/0452 |
| 2018/0310230 A1* | 10/2018 | Niu | H04W 48/12 |
| 2019/0239118 A1* | 8/2019 | Baghel | H04L 69/08 |
| 2019/0306829 A1* | 10/2019 | Abedini | H04W 48/20 |
| 2019/0372653 A1* | 12/2019 | Chae | H04W 4/00 |
| 2020/0145079 A1* | 5/2020 | Marinier | H04B 7/0456 |

OTHER PUBLICATIONS

European search report issued for corresponding EP application 18 210 469.5, dated May 10, 2019, 13 pages (for informational purpose only).

* cited by examiner

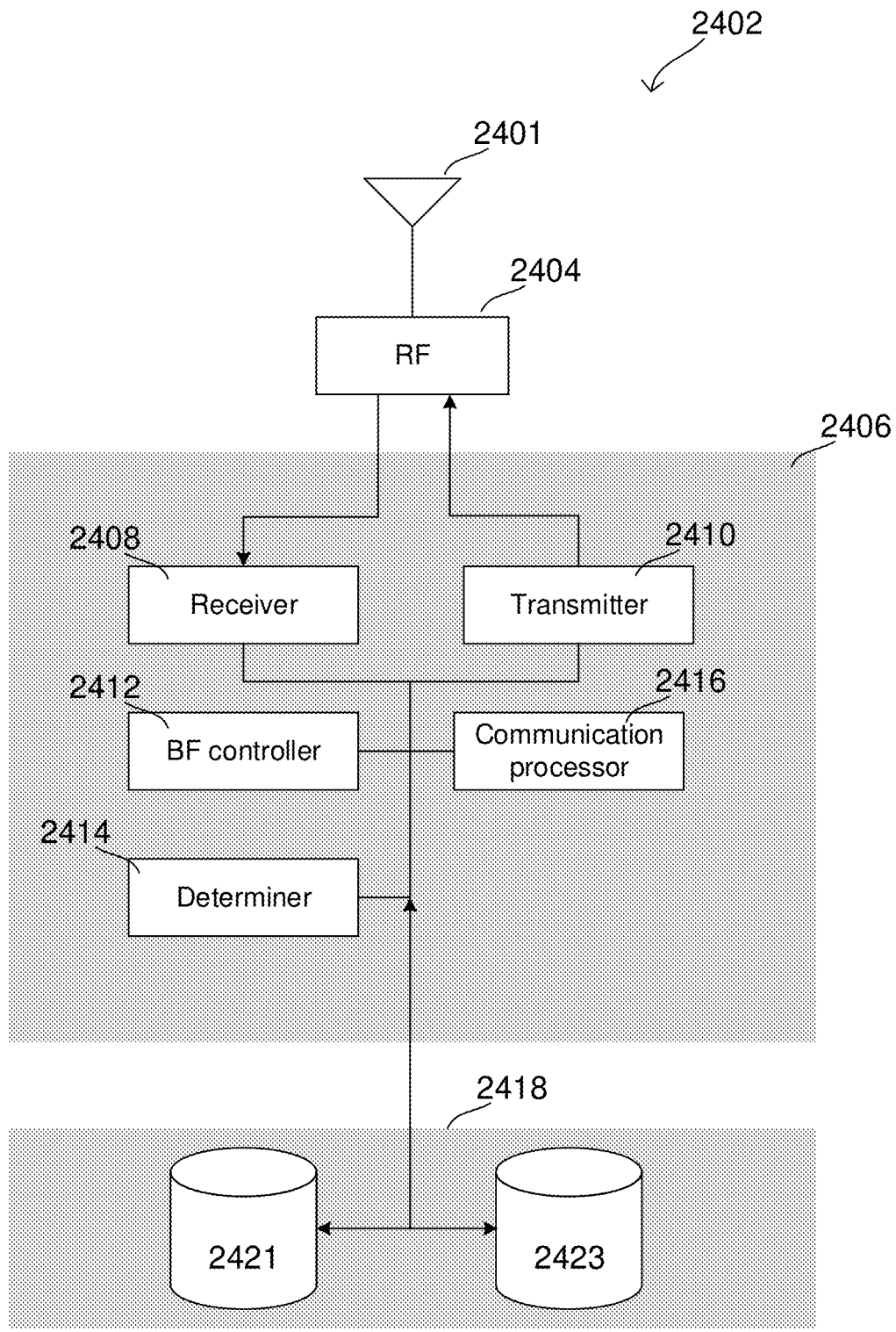

Frame

Frame

METHODS AND DEVICES FOR WIRELESS COMMUNICATIONS IN DEVICE-TO-DEVICE NETWORKS

RELATED APPLICATION(S)

This is US National Stage of PCT application PCT/EP2019/077204, filed on 8 Oct. 2019, which claims priority to EP 18210469.5, filed on 5 Dec. 2018, entitled "METHODS AND DEVICES FOR WIRELESS COMMUNICATIONS IN DEVICE-TO-DEVICE NETWORKS"; all of the above applications are hereby incorporated by reference in their entirety.

TECHNICAL FIELD

Various aspects of this disclosure generally relate to methods and devices for wireless communications in device-to device networks.

BACKGROUND

Various communication networks use device-to-device (D2D) communications to enable devices to communicate directly with each other. The devices may therefore establish direct communication links with each other and use these links to transfer data between each other.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the present disclosure are described with reference to the following drawings, in which:

FIG. 24 shows an exemplary structural configuration of a wireless device 2402 which may be included in or connected to a D2D mesh network according to some aspects;

DESCRIPTION

Figure 1:
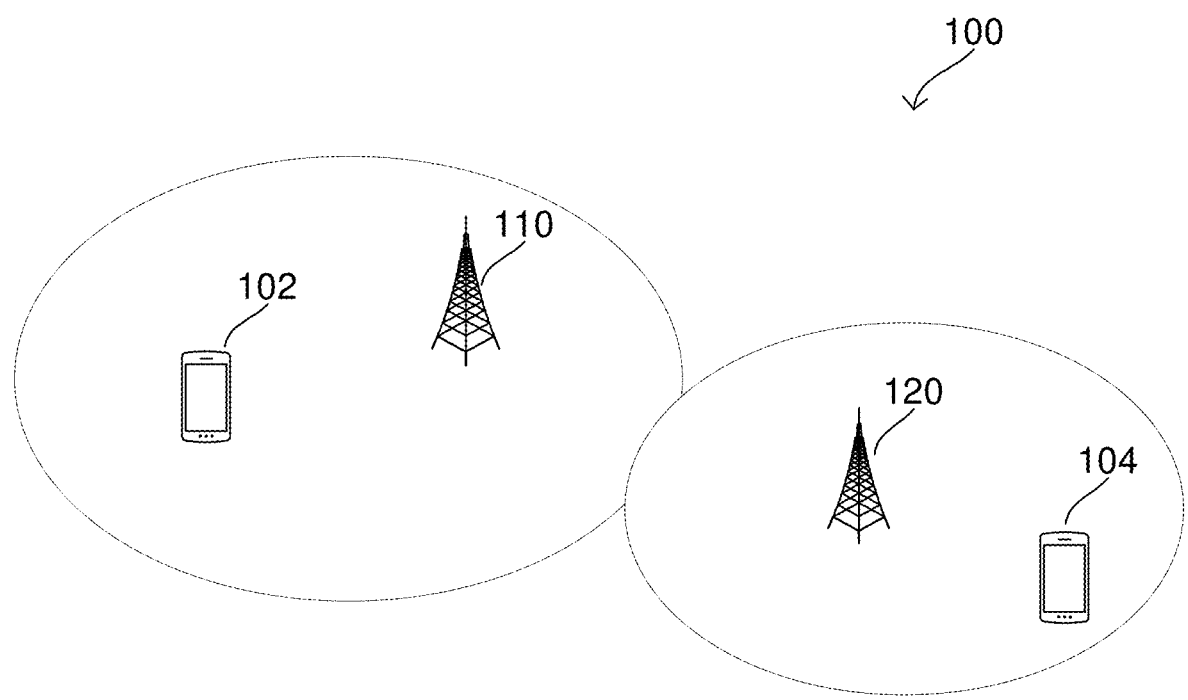
FIG. 1 shows an exemplary communication network according to some aspects.

The following detailed description refers to the accompanying drawings that show, by way of illustration, specific details and aspects of embodiments in which the invention may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "lesser subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" or "wireless device" utilized herein refers to user-side devices (both portable and fixed) that can connect to a core network and/or external data networks via a radio access network. "Terminal device" or "wireless device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. The term "User Equipment" is used herein to refer to a wireless device operating on any type of radio access technology (e.g., cellular or short-range) and does not limit the wireless device to a specific type of radio access technology.

The term "network access node" as utilized herein refers to a network-side device that provides a radio access network with which terminal devices or wireless devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal or wireless devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Any of the radio links described herein may in various aspects operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (WITS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (allocated for example in the USA (FCC Part 15)), 863-868.6 MHz (allocated for example in the European Union (ETSI EN 300 220)), 915.9-929.7 MHz (allocated for example in Japan), 917-923.5 MHz (allocated for example in South Korea), 755-779 MHz and 779-787 MHz (allocated for example in China), 790-960 MHz, 1710-2025 MHz, 2110-2200 MHz, 2300-2400 MHz, 2.4-2.4835 GHz (this is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (allocated for example in the USA for Citizen Broadband Radio Service), 5.15-5.25 GHz and 5.25-5.35 GHz and 5.47-5.725 GHz and 5.725-5.85 GHz bands (allocated for example in the USA (FCC part 15), consists four U-NII bands in total 500 MHz spectrum), 5.725-5.875 GHz (allocated for example in EU (ETSI EN 301 893)), 5.47-5.65 GHz (allocated for example in South Korea, 5925-7125 MHz and 5925-6425 MHz band (under consideration in the USA and the EU, respectively). Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (this band has near-global designation for Multi-Gigabit Wireless Systems (MGWS)/WiGig. In the USA (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document may be defined for the network side, such as Access Points, eNodeBs, New Radio (NR) or next generation Node Bs (gNodeB or gNB—note that this term is typically used in the context of 3GPP fifth generation (5G) communication systems), etc. Still, in certain aspects, a User Equipment (UE), terminal or wireless device may take this role as well and act as an Access Point, eNodeB, gNodeB, etc. In other words, some or all features defined for network equipment may be implemented by a UE, a terminal or wireless device.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Figure 2:
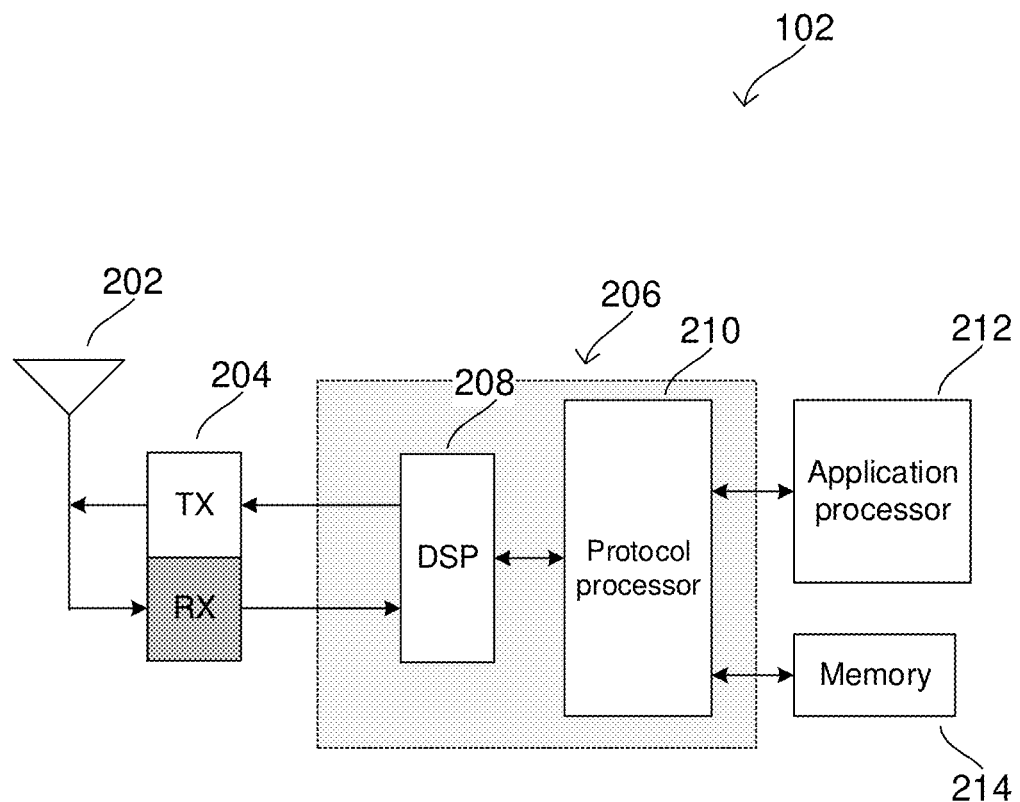
FIG. 2 shows an exemplary internal configuration of a terminal device according to some aspects.

FIGS. 1 and 2 depict a general network and device architecture for wireless communications. In particular, FIG. 1 shows exemplary radio communication network 100 according to some aspects, which may include terminal (or wireless) devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may implement lower-layer processing functions (e.g., Layer 1/PHY) of the radio communication technologies, while protocol controller 210 may implement upper-layer protocol stack functions (e.g., Data Link Layer/Layer 2 and/or Network Layer/Layer 3). Protocol controller 210 may thus implement controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Various aspects of this disclosure relate to device-to-device (D2D) networks that are decentralized, where wireless devices operating in these D2D networks may or may not have a centralized network infrastructure for example including base stations providing time and frequency synchronization and scheduling. While wireless devices may be capable of acting as peers for direct communications, various aspects of the present disclosure relate to device-to-device (D2D) mesh networks where wireless devices may be capable of relaying communications between wireless devices forming peers for relayed communications. To this end, wireless devices in accordance with certain aspects may have knowledge of respective neighboring nodes such that routes via relaying wireless devices can be established between any two wireless devices forming peers of relayed communication. In various aspects, each wireless device included in the mesh network may be configured to store and update a connectivity map including a set of possible routes between any two wireless devices forming the D2D mesh network. A number of possible routes including direct and indirect (relayed) connections from a wireless device to other wireless devices may be referred herein as "connectivity" of said wireless device. Such possible routes may be stored as connectivity map at each wireless device included in the mesh network such that each wireless device may control communications within the network based on said connectivity map.

In accordance with various aspects of the present disclosure, a wireless device in a mesh network may include a communication processor configured to control communications of the wireless device with at least one further wireless device included in the network of wireless devices (e.g. the D2D mesh network) based on data relating to mutual connections between wireless devices included in the network. In certain aspects, the communication processor may be configured to store and/or to update a database (connectivity map) including information for establishing communication routes to at least one wireless device included in the network of wireless devices based on the data relating to the mutual connections between the wireless devices included in the network. Updates of the database may in accordance with certain aspects be performed at each wireless device periodically, where a corresponding periodicity may be a predefined value. Alternatively or in addition, updates of the database may be triggered by a trigger event such as a request from a wireless device to one or more wireless devices in the D2D mesh network. In accordance with certain aspects, any wireless device included in the mesh network, and/or any device assuming a master role as described further herein, such as a synchronization master role, a mesh network control role or a beamforming master role, may request such updates, e.g. in case of high interference, high load on the network, or in emergency scenarios.

Figure 3:
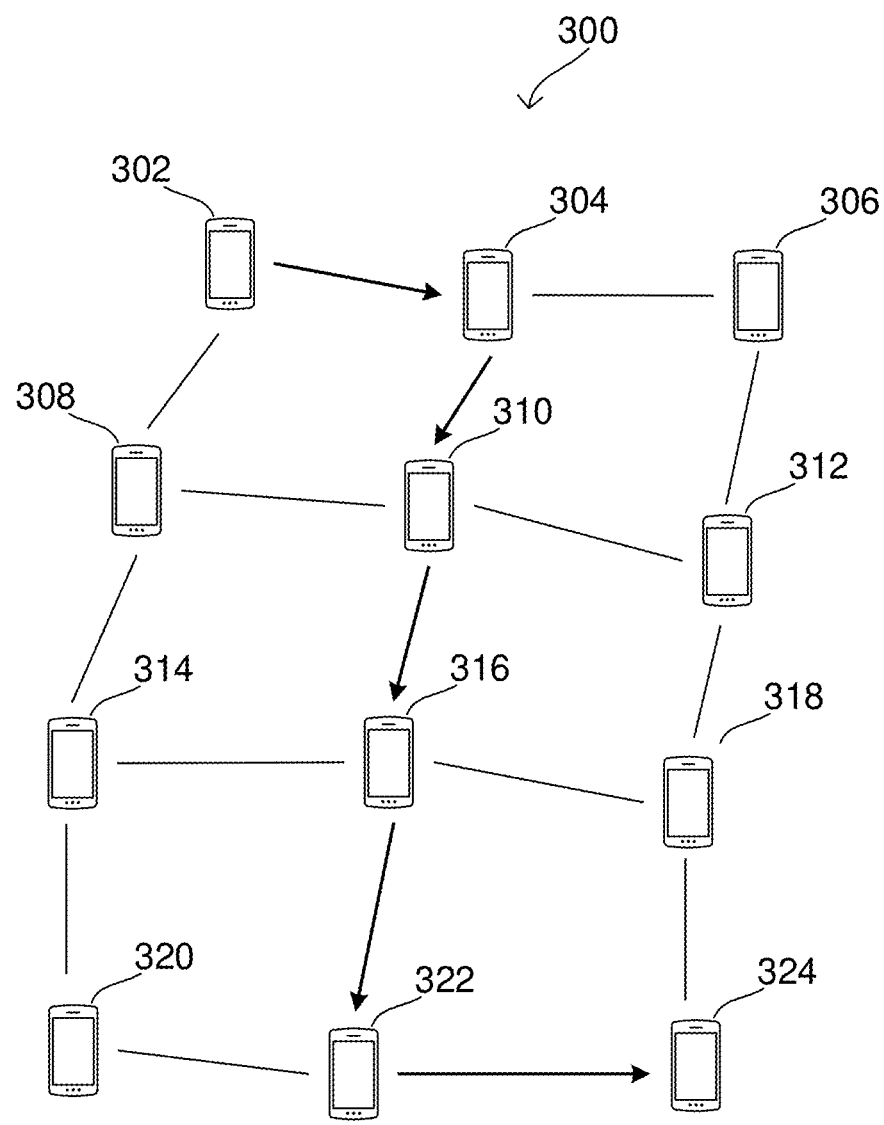
FIG. 3 shows an exemplary D2D mesh network including exemplary wireless devices according to some aspects.

FIG. 3 shows exemplary D2D mesh network 300 including exemplary wireless devices 302, 304, 306, 308, 310, 312, 314, 316, 318, 320, 322 and 324. In various aspects, the number of wireless devices forming a D2D mesh network may vary, i.e. may be smaller or larger than the number of wireless devices exemplarily forming D2D mesh network 300, while sub-groups of wireless devices may form sub-networks within a larger D2D mesh network. In addition, further or less connections may be established between the wireless devices forming the mesh network 300 (e.g. further connections may be established between wireless devices 302, 310 or 304, 312, etc.) while the shown configuration of connections is only chosen for purposes of illustration. Direct connections may be established between pairs of wireless devices within a range allowed by respective transmission power capabilities and respective reception sensitivities. Direct connections may be prevented by barriers between wireless devices such as cars, buildings, mountains, etc.

Figure 4:
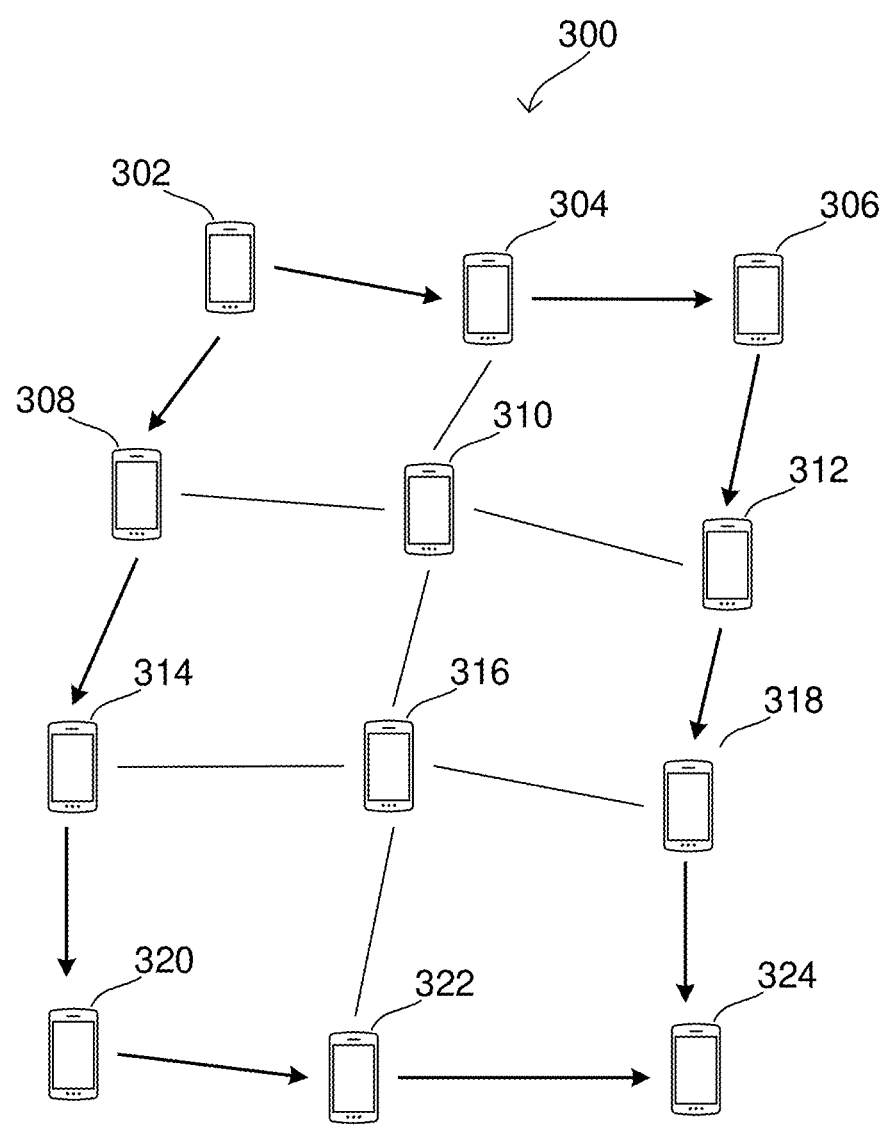
FIG. 4 shows an exemplary D2D mesh network including exemplary wireless devices according to some aspects.

In the case exemplarily shown in FIG. 3, wireless devices 302 and 324 form two peers communicating with each other (a transmission from wireless device 302 to wireless device 324 indicated via corresponding arrows) whereby wireless devices 304, 310, 316 and 322 form relays for the communication. FIG. 4 shows the exemplary mesh D2D network 300 where different from the case of FIG. 3, the transmission from wireless device 302 to wireless device 324 is split into two branches, one branch relayed by wireless devices 308, 314, 320 and 322, the other branch relayed by wireless devices 304, 306, 312 and 318. Thus, wireless devices within D2D mesh network 300 may be capable of relaying communications such that in addition to (potentially only short-range) direct communication between respective neighboring pairs of devices also (potentially long-range) relayed communication between wireless devices 302 and 324 forming peers for relayed communication becomes feasible. In accordance with certain aspects, a distance between wireless devices 302 and 324 forming peers of such relayed D2D communication may be on the order of several kilometers. Such distance may in accordance with certain aspects be proportional to a number of possible relaying wireless devices located in between a pair of wireless devices forming peers of relayed D2D communication. In other words, within a mesh network employing relayed D2D communication, long range communication over several kilometers may become feasible even if wavelengths used for communications are in the mmWave or sub-mmWave range and/or if direct communication between peers is not possible e.g. due to channel conditions.

Figure 5:
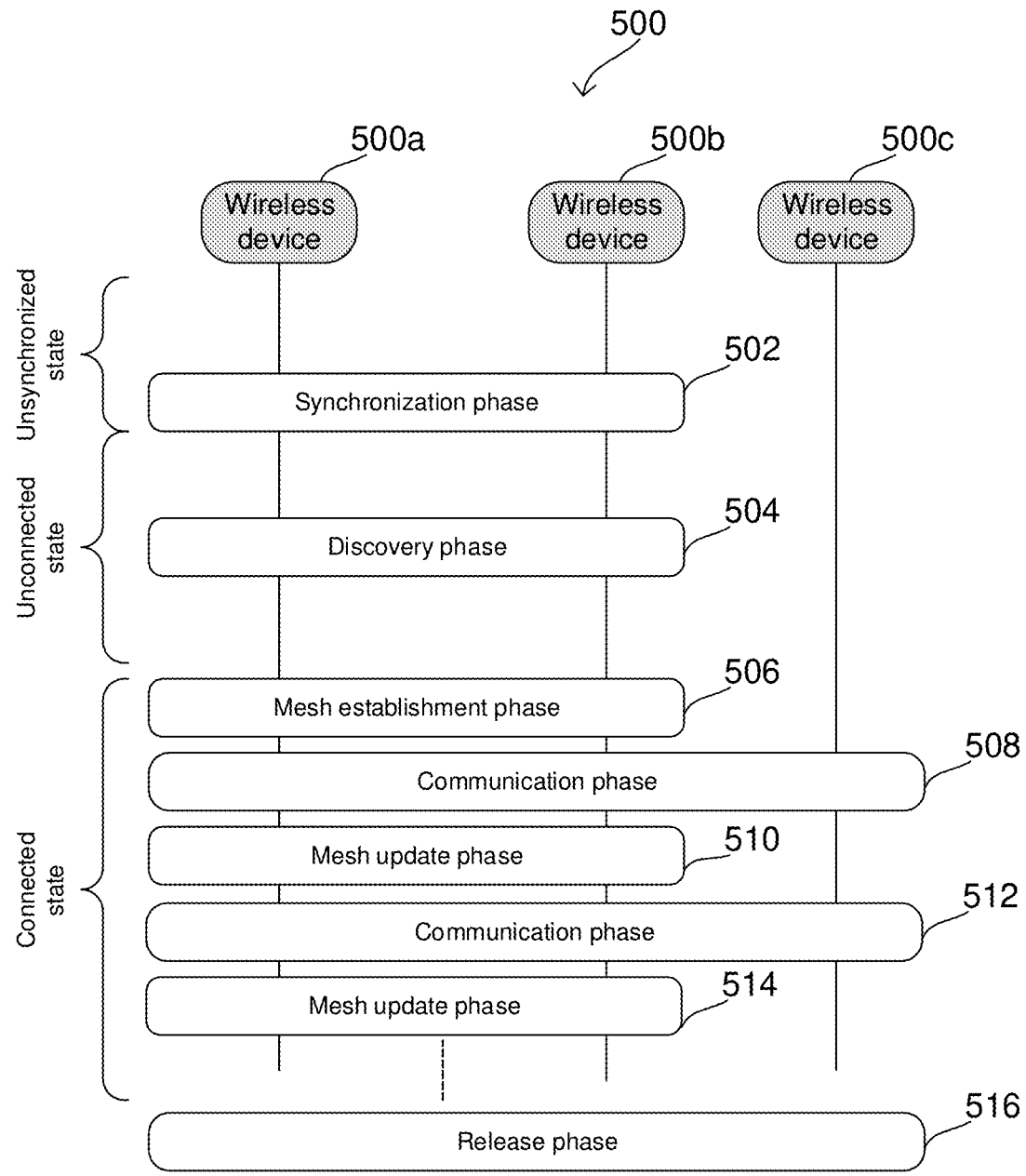
FIG. 5 shows an example connection establishment process according to some aspects.

In accordance with various aspects, a wireless device may connect to a mesh network by going through a connection establishment process 500 exemplarily illustrated in FIG. 5 for exemplary wireless devices 500a, 500b and 500c representative of a potentially larger mesh network potentially including further wireless devices that are not illustrated to keep the illustration concise. While the exact order and number of steps is chosen for illustrative purposes, a connection establishment process may include additional or less stages as compared to the one shown in FIG. 5. In the shown exemplary case, wireless device 500a may establish connection with a D2D mesh network via wireless device 500b and may then communicate with wireless device 500c, for example via wireless device 500b acting as relay for communication between wireless devices 500a and 500c. As shown, the connection establishment process 500 may in certain aspects be initiated with a synchronization phase where wireless device 500a may establish time, frequency and/or phase synchronization with wireless devices 500b and 500c. For example, wireless device 500a may receive a synchronization signal which may be periodically broadcasted by wireless device 500b which in accordance with certain aspects may assume a role of a synchronization master device.

Wireless device 500a may discover neighboring wireless devices of the D2D mesh network during a discovery phase at stage 504. For example, wireless devices 500a and 500b may use the time and frequency synchronization to align their respective discovery operations in time and frequency. For example, wireless devices 500a and 500b may operate on a slotted communication schedule that allocates certain time slots and frequencies (discovery resources) for discovery during each frame (or sequence of frames). Discovery operations may include exchanging discovery messages (e.g., a discovery initiation message and a discovery confirmation message) on the discovery resources.

Being in a connected state after discovery, wireless devices 500a and 500b may enter a mesh establishment phase at stage 506 where wireless device 500a may obtain information related to mesh connectivity provided by neighboring wireless devices to which wireless device 500a may directly connect to. In other words, in accordance with certain aspects, wireless device 500a may obtain the mentioned connectivity map, e.g. a dataset, including at least part of or all possible routes between any two nodes included in the mesh network. In certain aspects, wireless device 500a may obtain the connectivity map via a signaling sequence including a request for an updated connectivity map transmitted from the wireless device 500a to the mesh network (e.g. to wireless device 500b and/or to at least one or all wireless devices to which the wireless device 500a may be able to directly connect to) and a corresponding response from the mesh network. The response may be transmitted to wireless device 500a for example from wireless device 500b (i.e. for example from the wireless device currently assuming the role of a master also for synchronization) and/or from at least one or all wireless devices to which the wireless device 500a may be able to directly connect to.

Having obtained the mesh connectivity, wireless device 500a may enter a communication phase at stage 508 during which wireless device 500a may exchange payload data for example with wireless device 500c either directly or via one or more relays (e.g. via wireless device 500b). While being in the connected state, each wireless device may periodically enter mesh update phases (for example at stages 510, 514) where each wireless device may share its current connectivity, for example a list of wireless devices it may directly and/or indirectly connect to, within the mesh network. To this end, each wireless device may in accordance with certain aspects transmit information representing its current connectivity to at least one or each wireless devices it may directly connect to. Such information may be periodically shared between the wireless devices forming the mesh network such that each wireless device may periodically update its connectivity map. Alternatively or additionally, in accordance with certain aspects, mesh update phases may be actively triggered by a wireless device connected to the mesh network. For example, in accordance with various aspects, a wireless device may assume a role of a mesh network control device which may control an interval between mesh update phases. In certain aspects, a length of mesh update intervals may be controlled based on a rate of change of a mesh network topology, e.g. based on a rate of changes in number of wireless devices forming the mesh network and a rate of changes of a respective connectivity of each wireless device included in the mesh network. In certain aspects, said device assuming the role of the mesh network control device may be the same device assuming the role of a synchronization master device. As illustrated in FIG. 5, communication phases (such as communication phases 508, 512) and mesh update phases (such as mesh update phases 510, 514) may continue to alternate for example until wireless device 500a has completed its communication and enters a release phase 516 where wireless device 500a may release its connection to the mesh network and may return to an unconnected state.

When updating connectivity during the mesh update phase, in accordance with certain aspects, each wireless device may update information on quality of each direct link it may establish with neighboring wireless devices, e.g. based on corresponding SINR measurements of respective incoming links from said neighboring wireless devices and/or based on corresponding SINR measurements of respective outgoing links from the wireless device to the neighboring wireless devices, information on these SINR measurements being reported back to the wireless device. Further, when updating connectivity during mesh update phases, in accordance with certain aspects, each wireless device may update information on possible relayed routes towards wireless devices it may not connect directly to and corresponding information on a cost of each route for example in terms of link quality (e.g. based on SINR) of respective direct links between relaying wireless devices along a route.

Figure 6:
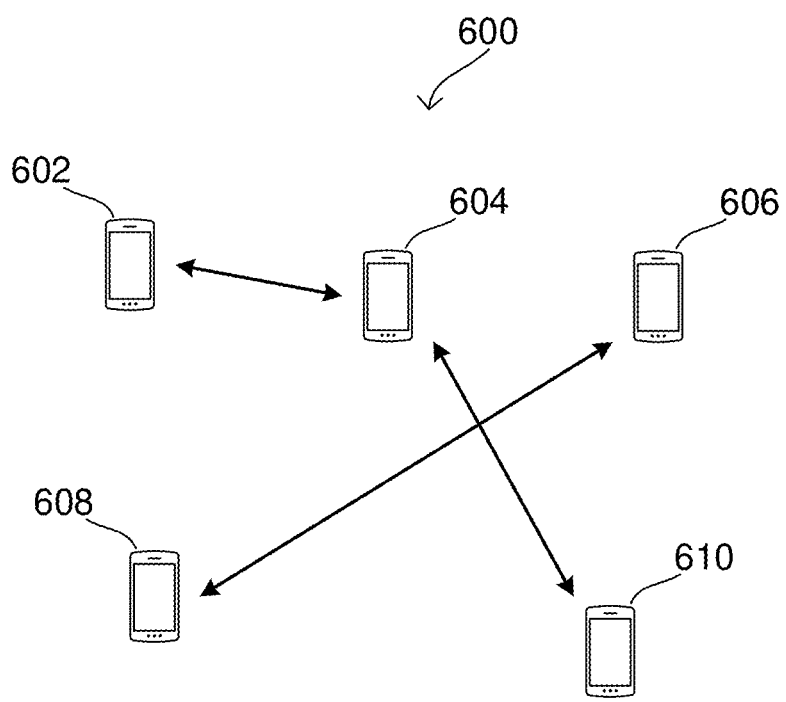
FIG. 6 shows exemplary interference situations in a D2D mesh network in accordance with some aspects.

FIG. 6 illustrates exemplary situations where interference may occur in communications within a D2D mesh network 600. For example, a transmission flow between one pair of peers such as wireless devices 606 and 608 may impose interference (inter-flow-interference) on transmission flows between wireless devices 602 and 604 and/or transmission flows between wireless devices 604 and 610. Interference may further be imposed by a relayed transmission flow on itself. For example, a transmission flow between wireless device 602 and wireless device 610 may be relayed via wireless device 604. Thus, wireless device 604 may relay a first data packet of a transmission flow to wireless device 610 at the same time when wireless device 602 may transmit a second data packet of the transmission flow to wireless device 604. As a result, transmission of the second data packet may impose interference (intra-flow-interference) on transmission of the first data packet and vice versa.

While networks having a centralized control, e.g. via base stations, may implement centralized interference mitigation mechanisms, various aspects of the present disclosure relate to mechanisms that may mitigate effects of interference in decentralized networks by beam management employing control of a wireless device's antenna arrangement including at least two antennas to steer a beam of a wireless device and/or to suppress interference based on beamforming information. As further described herein, various aspects may thus use beamforming information shared for example between wireless devices forming a D2D mesh network or forming a sub-group of wireless devices forming a D2D mesh network for steering beams from a transmitting wireless device to one or more receiving wireless devices. In accordance with certain aspects, the shared beamforming information may further be used to minimize reception of interfering signals (i.e. to steer interference nulls of the antenna arrangement). Beam management in accordance with various aspects may thus help to mitigate interference in a decentralized D2D network.

Figure 7:
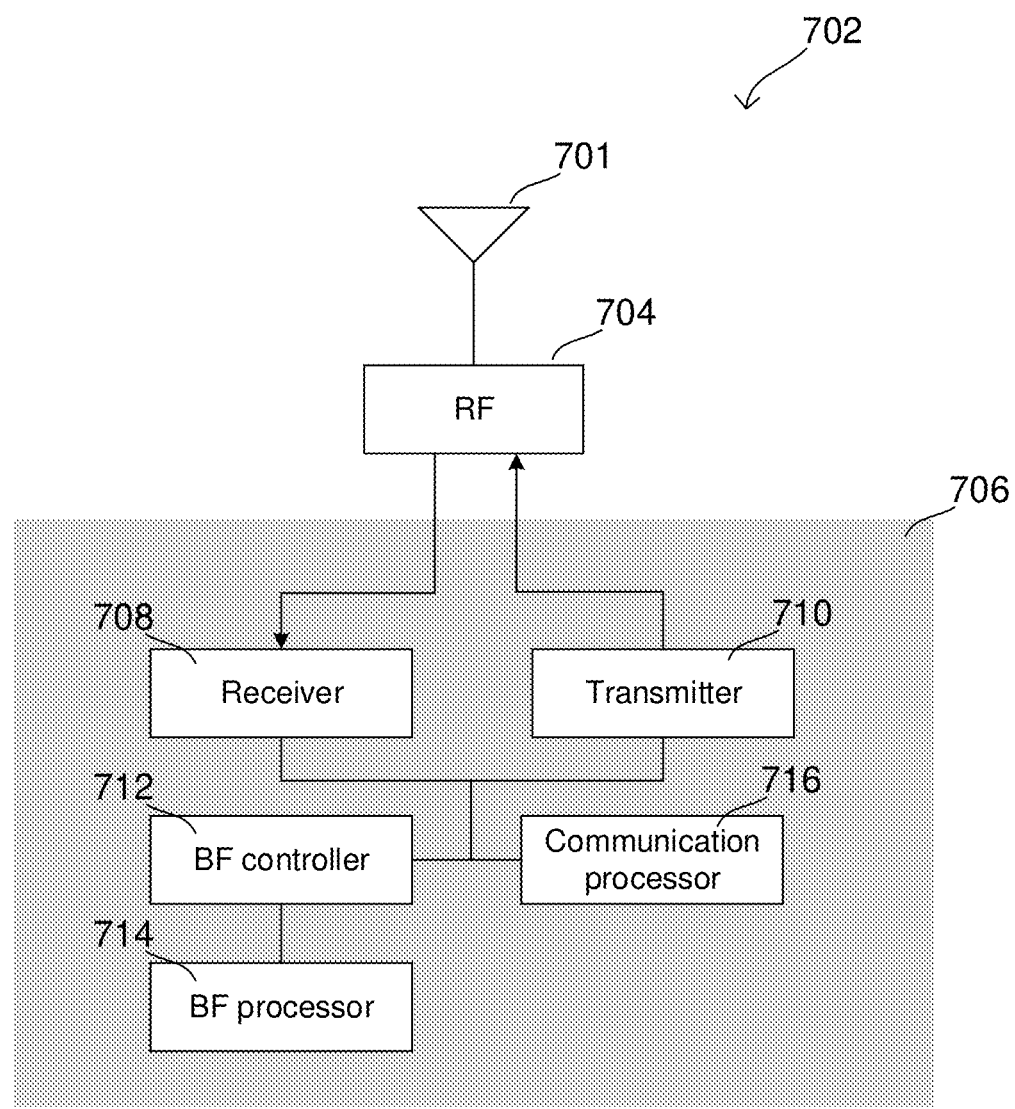
FIG. 7 shows an exemplary structural configuration of a wireless device in accordance with some aspects.

FIG. 7 shows an exemplary structural configuration of a wireless device 702 which may be included in or connected to a D2D mesh network. The structural configuration shown in FIG. 7 is focused on the beam management features of wireless device 702 and therefore may not expressly depict other components that are less directly related to these features. As illustrated, wireless device 702 may include antenna system 701, RF transceiver 704, and baseband modem 706. In some aspects, antenna system 701, RF transceiver 704, and baseband modem 706 may be configured as described above for antenna system 202, RF transceiver 204, and baseband modem 206 of terminal device 102. Accordingly, wireless device 702 may be configured to transmit and receive wireless signals via antenna system 701 and RF transceiver 704. In the transmit direction, RF transceiver 704 may therefore modulate and transmit baseband samples (provided by baseband modem 706) via antenna system 701. In the receive direction, RF transceiver 704 may also receive and demodulate radio signals via antenna system 701 and provide the resulting baseband samples to baseband modem 706.

In accordance with various aspects, antenna system 701 includes an antenna arrangement including at least two antennas. The antenna arrangement may in accordance with certain aspects correspond to one or more antenna arrays, an antenna array including a plurality of antennas. An antenna may in accordance with certain aspects correspond to an antenna element. In accordance with certain aspects, a configuration of the at least two antennas may be controlled by a beamforming controller of the wireless device 702 to steer one or more beams for transmission of data based on said beamforming information to one or more wireless devices. By thus directing a beam e.g. from one node of a mesh network (a wireless device) e.g. towards another node of a mesh network (e.g. a further wireless device), it may become possible to mitigate effects of interference from such beam to different nodes of the mesh network. In accordance with certain aspects, a configuration of said at least two antennas may further be controlled by the beamforming controller to suppress interference in a direction different from a direction in which wireless device 702 receives data from another wireless device. In other words, in certain aspects, a configuration of said at least two antennas may be controlled to steer interference nulls of the antenna arrangement.

FIG. 7 also depicts several internal components of baseband modem 706, including receiver 708, transmitter 710, the beamforming (BF) controller 712, beamforming (BF) processor 714, and communication processor 716. In accordance with some aspects, beamforming controller 712 may be referred to as a beam mesh controller while beamforming processor 714 may be referred to as side-information controller. In some aspects, baseband modem 706 may include a digital signal processor and a protocol controller. Receiver 708, transmitter 710, beamforming controller 712, beamforming processor 714, and communication processor 716 may therefore be subcomponents of the digital signal processor (e.g., physical layer components) and/or subcomponents of the protocol controller (e.g., protocol stack components). In some aspects, receiver 708 may be the physical layer receive chain, transmitter 710 may be the physical layer transmit chain, and beamforming controller 712, beamforming processor 714, and communication processor

716 may be processors that are part of the protocol stack layers of wireless device 702.

For example, receiver 708 may include a demodulator, demapper (e.g., constellation demapper), de-interleaver, decoder, and/or descrambler. Receiver 708 may receive wireless signals in the form of baseband samples via antenna system 701 and RF transceiver 704. Receiver 708 may then sequentially process these baseband samples with the demodulator, demapper (e.g., constellation demapper), de-interleaver, decoder, and/or descrambler to produce a bitstream, which receiver 708 may provide to beamforming controller 712, beamforming processor 714, and/or communication processor 716 (e.g., to the protocol stack layers). Transmitter 710 may include a scrambler, encoder, interleaver, mapper (e.g., constellation mapper), and/or a modulator, which may sequentially process a bitstream (e.g., provided by protocol stack layers of beamforming controller 712, beamforming processor 714, and communication processor 716) to produce baseband samples (e.g., complex IQ symbols). Transmitter 710 may then transmit these baseband samples as wireless signals via RF transceiver 704 and antenna system 701.

In some aspects, beamforming controller 712 may also include physical layer components, such as circuits or processors configured to control RF transceiver 704 and/or antenna system 701 to steer beams for data transmission and interference nulls generated by antenna system 701. At higher layers, e.g. at a medium access control (MAC) layer included in the data link layer, and/or higher layers the beamforming controller 712 may control width and direction of beams for data transmission and interference nulls.

Communication processor 716 may be a processor configured to execute other control- and user-plane operations of the protocol stack layers. This may include generating messages for transmitter 710 to transmit (e.g., messages including user or control data) and/or recovering messages from bitstreams provided by receiver 708. As mentioned above, communication processor 716 may in accordance with various aspects be configured to control communications of the wireless device 702 with at least one further wireless device included in a D2D mesh network based on a connectivity map including information for establishing communication routes each other wireless device included in the D2D mesh network.

While beamforming controller 712, beamforming processor 714, and communication processor 716 are shown separately in FIG. 7, in some aspects beamforming controller 712, beamforming processor 714, and communication processor 716 may structurally be a single processor configured to perform the respective operations of beamforming controller 712, beamforming processor 714, and communication processor 716.

Wireless device 702 of FIG. 7 thus includes the beamforming controller 712 that may be referred to as a beam mesh controller and the beamforming processor 714 that may be referred to as side-information controller. In accordance with certain aspects, the beam mesh controller may be configured to support beam and mesh network coordination for example in interference rich D2D networks. The side-information controller may be configured to organize and collect inputs to the beam mesh controller, these inputs to be used for the coordination of beam and mesh networks. In certain aspects, the beam mesh controller may perform beam management at lower layers (e.g. RF and PHY) by steering beams and interference nulls generated by the antenna arrangement of the wireless device to support transmission, reception and e.g. QoS demands. At higher layers (e.g. MAC and above), for example depending on the type of service (e.g. if service is unicast or multicast), the beam mesh controller may tune width and direction of beams and nulls. In accordance with certain aspects, the side-information controller may be configured to control indirect and direct signaling techniques that allow an exchange of coordination information (beamforming information) relating to beamforming e.g. in a mesh network.

Thus, in accordance with various aspects, a wireless device may include a transceiver (transceiver 704, receiver 708, and transmitter 710) comprising an antenna arrangement with at least two antennas; a communication processor (communication processor 716) configured to control communications of the wireless device with at least one further wireless device included in a network of wireless devices based on data relating to mutual connections between wireless devices included in the network; a beamforming controller (the beamforming controller 712, e.g. said beam mesh controller) configured to control a configuration of the at least two antennas to steer at least one beam for transmission of data based on beamforming information. In certain aspects, the wireless device may further include a beamforming processor (the beamforming processor 714, e.g. said side-information controller) configured to process beamforming information for use by the beamforming controller (e.g. the beam mesh controller). For example, in case a wireless device assumes a role of a beamforming master device, the wireless device may include the beamforming processor (e.g. the side-information controller) to process the beamforming information to obtain control information. The transceiver may then be configured to transmit the control information to at least one further wireless device (a slave device) for controlling a configuration of at least two antennas of a transceiver of the at least one further wireless device to steer at least one beam for transmission of data by the at least one further wireless device. Said at least one further wireless device may include a beamforming controller (e.g. a beam mesh controller) configured to control the antenna arrangement of the further wireless device for steering a beam and/or interference nulls based on the control information received from the wireless device assuming the beamforming master role.

Figure 8A:
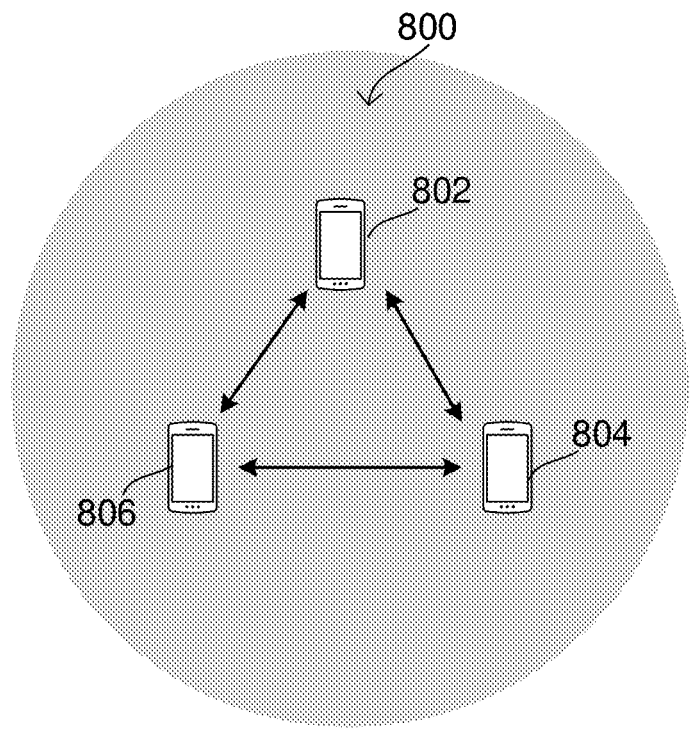
FIG. 8A shows exemplary exchange of beamforming information in a decentralized D2D mesh network in accordance with some aspects.

In accordance with various aspects, beamforming information can generally be exchanged between pairs of wireless devices having a direct mutual communication link as for example illustrated for D2D mesh network 800 in FIG. 8A (wireless devices 802, 804 and 806 shown in the figure may form part of network 800 which may include further wireless devices not shown in the figure). Each of wireless devices 802, 804 and 806 may structurally correspond to wireless device 702 of FIG. 7. In this example, beamforming information may be exchanged between all of wireless devices 802, 804 and 806 and may be processed by a beamforming processor 714 at each of the wireless devices. For exchanging the beamforming information, each wireless device may for example periodically broadcast its own beamforming information and receive broadcasted beamforming information from each other wireless device. In accordance with certain aspects, beamforming information may be obtained by a wireless device during the mesh establishment phase 506 and may be periodically updated during the mesh update phases 510, 514 of FIG. 5 discussed above. The beamforming information may in accordance with further aspects include a wireless device's capability of supporting unicast (one-to-one), multicast (one-to-many) and many-to-many reception and/or transmission. In certain aspects, beamforming processor 714 of each wireless device may process own beamforming information of the wireless device (e.g. position information and/or beamforming capability information of the wireless device) and/or beamforming information relating to at least one further wireless device (e.g. position information and/or beamforming capability information of the at least one further wireless device). A result of such processing may in accordance with certain aspects be used by the wireless device's beamforming controller 712 for steering one or more transmit beams of the wireless device for data (e.g. payload data) transmissions to one or more further wireless devices and/or to steer one or more interference nulls of the antenna arrangement of the wireless device. Alternatively or in addition, one or more results of such processing may in accordance with certain aspects be transmitted to at least one further wireless device for controlling an antenna arrangement of said at least one further wireless device to steer at least one beam and/or interference nulls at said at least one further wireless device.

Figure 8B:
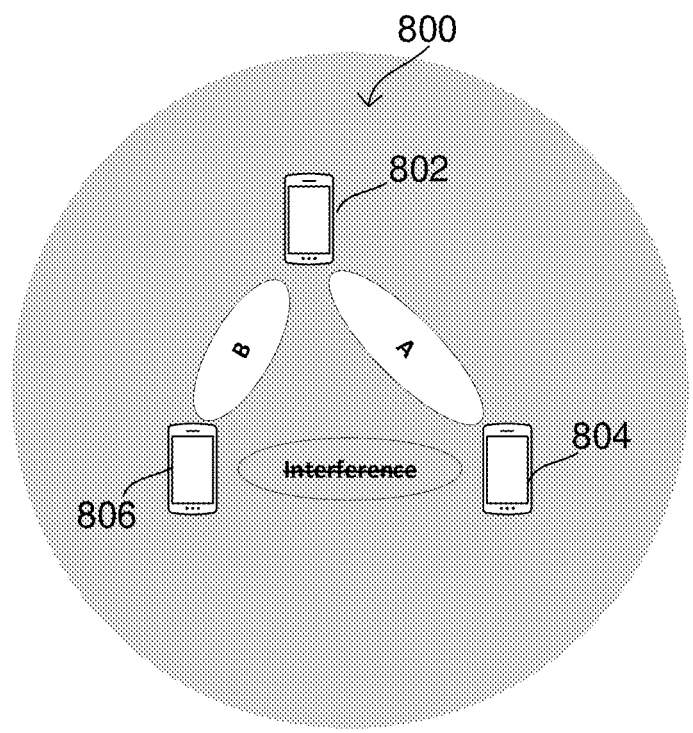
FIG. 8B shows exemplary exchange of payload data in a decentralized D2D mesh network in accordance with some aspects.

For example, wireless device 802 may process position information of wireless device 804, included in beamforming information received by wireless device 802 and beamforming controller 712 may control a transmit beam A for (e.g. payload) data transmission from wireless device 802 to wireless device 804 based on the processed position information as exemplarily illustrated in FIG. 8B. Similarly, wireless device 806 may process position information of wireless device 802 to control a beam B for (e.g. payload) data transmission from wireless device 806 to wireless device 802. At the same time, wireless device 804 may process position information of wireless devices 802 and 806 included in the received beamforming information to adjust interference nulls of an antenna arrangement of wireless device 804 for receiving the payload data transmission in a direction from wireless device 802 while suppressing signal (interference) reception in the direction towards wireless device 806. In this way, by steering interference nulls in the direction of wireless device 806 and by steering the beam for data transmission from wireless device 806 towards wireless device 802, for example interference potentially caused by beam B can be reduced at wireless device 804.

While beamforming information may be exchanged by and processed at each wireless device included in a D2D network or in a sub-portion of a D2D network as illustrated in FIGS. 8A and 8B (fully decentralized D2D mesh network), in alternative aspects of the present disclosure, one or more wireless devices may assume a role of a beamforming master (partially centralized D2D mesh network). A wireless device may assume the role of beamforming master for the entire D2D mesh network or for a sub-set e.g. of proximal wireless devices included in this network. In other words, a partially centralized D2D mesh network in accordance with various aspects may include one or more wireless devices assuming the role of a beamforming master device.

Figure 9A:
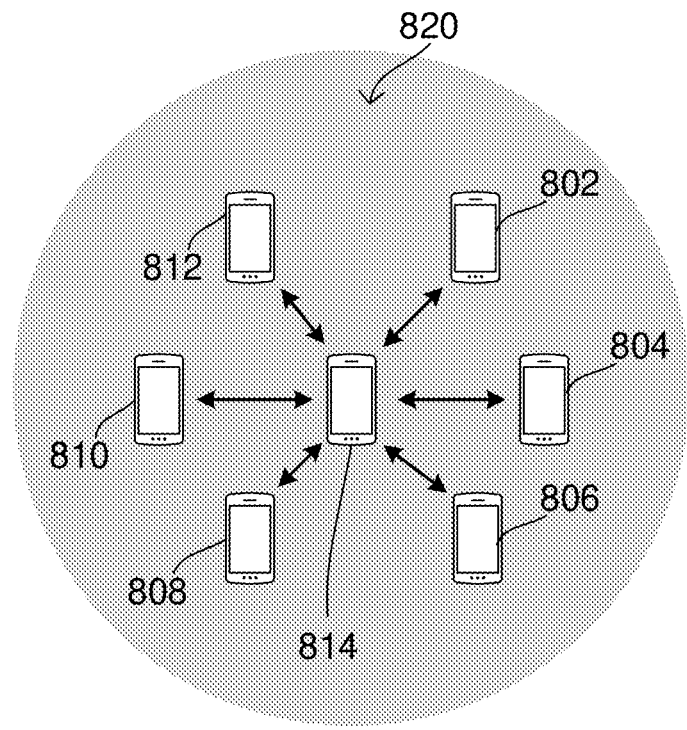
FIG. 9A shows exemplary exchange of beamforming information in a centralized D2D mesh network in accordance with some aspects.
Figure 9B:
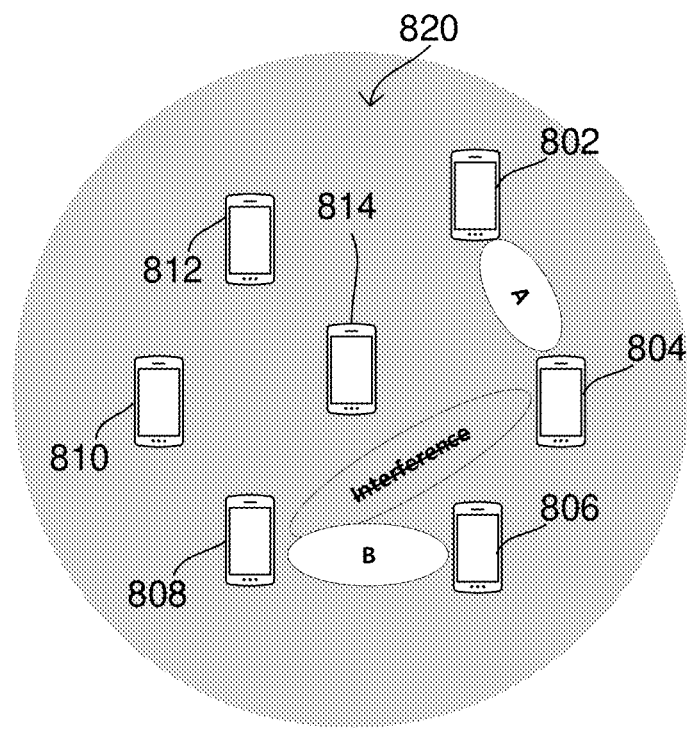
FIG. 9B shows exemplary exchange of payload data in a decentralized D2D mesh network in accordance with some aspects.

FIGS. 9A and 9B show an example configuration (exemplarily using only one beamforming master) where wireless device 814 included in a D2D mesh network 820 assumes the role of the beamforming master for wireless devices 802, 804, 806, 808, 810 and 812. Each of wireless devices 802, 804, 806, 808, 810, 812 and 814 may structurally correspond to wireless device 702 of FIG. 7. As shown in FIG. 9A, wireless devices 802, 804, 806, 808, 810 and 812 may transmit beamforming information to wireless device 814 in respective direct transmission or as broadcast transmissions. As mentioned above, beamforming information may in accordance with certain aspects be broadcasted by each wireless device, however, for example in cases of low density of wireless devices, beamforming information may also be transmitted via one-to-one transmissions. Such transmissions of beamforming information to wireless device 814 (the beamforming master) may be performed periodically, e.g. during mesh update phases 510, 514 shown in FIG. 5. Alternatively or in addition, such transmissions of beamforming information to wireless device 814 (the beamforming master) may be performed upon request of the wireless device 814 (the beamforming master). For example, in accordance with various aspects, a beamforming master may request transmission of beamforming information in case of changes e.g. in channel conditions or network load. Further, a beamforming master may in accordance with certain aspects request transmission of beamforming information in case that an emergency situation is detected.

Wireless device 814 may receive and store the beamforming information from each of the wireless devices 802, 804, 806, 808, 810 and 812. Beamforming processor 714 of wireless device 814 may process the beamforming information to obtain control information to be transmitted to each of the wireless device 802, 804, 806, 808, 810 and 812 (as shown in FIG. 9A), e.g. in response to reception of the beamforming information during the mesh update phases 510, 514 shown in FIG. 5. In accordance with certain aspects, the wireless device 814 (the beamforming master) may thus transmit the control information to wireless devices 802, 804, 806, 808, 810 and 812 for adjusting respective antenna arrangements for steering of beams and/or interference nulls at wireless devices 802, 804, 806, 808, 810 and 812.

Wireless device 814 may perform the transmission of the control information as broadcast transmission received by each of wireless devices 802, 804, 806, 808, 810 and 812 (e.g. frequency division multiplexed for the respective wireless devices) or as direct D2D transmission to each of wireless devices 802, 804, 806, 808, 810 and 812. In the latter case, the respective direct D2D transmissions may use respective transmission beams from wireless device 814 to each of wireless devices 802, 804, 806, 808, 810 and 812, the beams steered based on position information of each of wireless devices 802, 804, 806, 808, 810 and 812 included in the beamforming information received by wireless device 814.

Having received the control information from wireless device 814, each of wireless devices 802, 804, 806, 808, 810 and 812 may control its respective receiver/transmitter based thereon. For example, wireless device 814 may have processed position information of wireless devices 802, 804 included in beamforming information received from wireless devices 802, 804 and may transmit correspondingly processed control information to wireless devices 802, 804. As exemplarily illustrated in FIG. 9B, wireless device 802 may thus adjust a configuration of its antenna arrangement to steer transmit beam A for (e.g. payload) data towards wireless device 804 based on the received control information. Accordingly, wireless device 804 may adjust a configuration of its antenna arrangement to receive beam A from wireless device 802. Similarly, beamforming information received and processed by wireless device 814 may include position information of wireless devices 806, 808 and information on wireless device 808's intention to transmit data to wireless device 806. Control information transmitted from wireless device 814 to wireless devices 804, 806, 808 may thus be used at wireless device 804 to steer an interference null of its antenna arrangement to suppress possible interference caused by a transmission from wireless device 808 to wireless device 806. Said control information may further be used by wireless devices 806, 808 to adjust respective antenna arrangements for beam steering and reception such that transmit beam B is steered from wireless device 808 to wireless device 806 and received at wireless device 806.

In accordance with various aspects, a wireless device may be selected for assuming the role of the beamforming master from all or from a sub-set of wireless devices included in the network. The selection may be based on a metric (M) which may in accordance with certain aspects be derived as a weighted sum of parameters indicating characteristics (C) of a wireless device which may be considered relevant for a specific operation or which may have an impact on performance of the whole mesh network. Such characteristics may in certain aspects include a degree of connectivity of a wireless device to other devices (number of possible direct and/or relayed links to other wireless devices included in the network), computation power, maximum signal transmission power, current signal strength, mobility, current battery level. Each parameter indicative of such characteristics may be assigned a dedicated weight (W), e.g. low, high, medium. The metric M may in accordance with certain aspects thus be calculated as a function (f) of the parameters and the associated weights:

$$M=f(C,W).$$

As illustrated in FIGS. 8A/B and 9A/B, in accordance with various aspects of the present disclosure, wireless devices forming part of a D2D mesh network may include beamforming processor 712 and beamforming controller 714 enabling each wireless device to select transmit beams and receive beams for directing transmit beams to desired receivers and for directing interference nulls in desired directions for suppressing interference. Exchange of beamforming information e.g. during mesh update phases may in accordance with various aspects enable the wireless devices to dynamically re-assign (transmit/receive) beams between different wireless devices e.g. depending on locations of receivers for data to be transmitted and interference conditions. Thus, beamforming management in accordance with various aspects may enable employing beam diversity for reducing both inter-flow and intra-flow interference as discussed above. Thereby, in accordance with various aspects, the beamforming processor may collect and process beamforming information (e.g. including position information and beamforming capability information of wireless devices) to produce input for the beamforming controller of the same and/or of further wireless devices for controlling an antenna arrangement of the same wireless device and/or antenna arrangements of the further wireless devices. Thus, beamforming information can in accordance with various aspects correspond to coordination information for coordinating beamforming for example in a D2D mesh network.

Regardless of whether or not wireless devices within a D2D mesh network share beamforming information directly or indirectly via one or more wireless devices assuming a role of a beamforming master, beamforming information may be shared via wide beams or broadcast transmissions from each wireless device. Subsequent (related) payload transmissions between wireless devices may use transmit and receive beams, the direction and power of which may be controlled based on the previously exchanged beamforming information. In accordance with certain aspects, both beamforming information and related payload may be transmitted within a same frequency band or within overlapping frequency bands (e.g. in mmW frequency bands). Alternatively, in accordance with certain aspects, beamforming information may be transmitted and received in a first frequency band while related payload data may be transmitted and received in at least one further frequency band (at least partially) different from the first frequency band. For example, beamforming information may be transmitted/received in a frequency band of lower frequencies as compared to a frequency band for transmission/reception of payload data, e.g. beamforming information may be transmitted/received in ISM bands, while related payload data may be transmitted/received in mmW frequency bands. Thus, in accordance with certain aspects, wherein the first frequency band may comprise a frequency range of 790-960 MHz, a frequency range of 1710-2025 MHz, a frequency range of 2110-2200 MHz, a frequency range of 2300-2400 MHz, and/or a frequency range of 2.4-2.4835 GHz.

Figure 10:
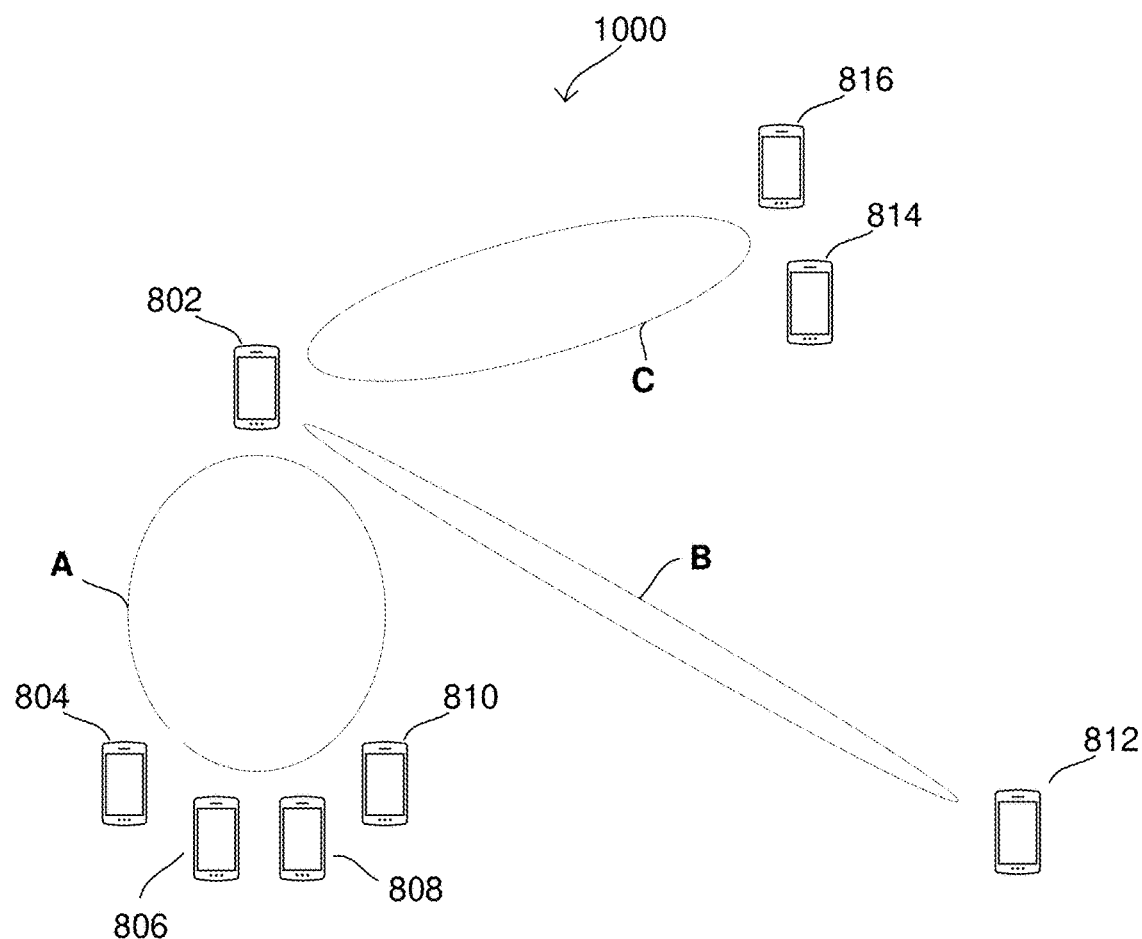
FIG. 10 shows exemplary beam management in exemplary D2D mesh network in accordance with some aspects.

FIG. 10 shows exemplary D2D mesh network 1000 illustrating a further example of beam management in accordance with certain aspects. FIG. 10 exemplarily illustrates a case of a multicast transmission where wireless device 802 transmits data to wireless devices 804, 806, 808, 810 employing a transmission antenna configuration resulting in transmission beam A, transmits data to wireless device 812 employing a transmission antenna configuration resulting in transmission beam B, and transmits data to wireless devices 814, 816 employing a transmission antenna configuration resulting in transmission beam B. The shown transmissions may be controlled at wireless device 802 based on beamforming information either received from each of the wireless devices 804, 806, 808, 810, 812, 814, 816, from a wireless device assuming the role of beamforming master (e.g. a wireless device part of network 1000 not shown in the figure), or wireless device 802 may itself assume the role of a beamforming master. Each of the wireless devices 802, 804, 806, 808, 810, 812, 814, 816 may structurally correspond to wireless device 702 of FIG. 7. As mentioned, beamforming information may include an absolute position of each of wireless devices 804, 806, 808, 810, 812, 814, 816. While FIG. 10 may show an example of a multicast transmission (a one-to-many transmission), this example can be extended to a many-to-many transmission which may be implemented as a superposition of multiple multicast transmission, while a unicast (one-to-one) transmission between only two wireless devices may be implemented as a special case of the multicast transmission.

As shown in FIG. 10, in accordance with certain aspects, co-located wireless devices may be grouped based on beamforming information including respective position information of wireless devices 804, 806, 808, 810, 812, 814, 816. For example, pairs of wireless devices may be grouped in case that a mutual distance between such pairs of wireless devices (e.g. between wireless devices 804 and 806) is determined to be below a pre-defined threshold value. In a different example, one or more wireless devices may be grouped in case that a maximum distance between a pair of said one or more wireless devices (e.g. between wireless devices 804, 810) is determined to be below a predefined threshold. Such determination may be performed e.g. by beamforming processor 714 of wireless device 802 based on beamforming information including position information and received from wireless devices 804, 806, 808, 810, 812, 814, 816. The determination may alternatively be performed by a beamforming processor 714 of a wireless device assuming a role of a beamforming master, which may process beamforming information received from wireless devices 804, 806, 808, 810, 812, 814, 816 to obtain control information to be transmitted to wireless device 802. As shown in FIG. 10, wireless device 802 may transmit (e.g.

payload) data based on the determination using a same transmission configuration (a same transmit beam) for each group of wireless devices.

As shown in FIG. 10, in certain aspects, an opening angle of a beam steered to a group of wireless devices may depend on a distance between the transmitting wireless device (e.g. wireless device 802 in FIG. 10) and the receiving wireless devices (e.g. wireless devices 804, 806, 808, 810 or wireless devices 814, 816 in FIG. 10). As shown, an opening angle may be larger for a shorter relative distance and may be smaller for a larger relative distance. Thus, in accordance with various aspects, the beamforming information (e.g. received at wireless device 802) may comprise information indicative of a relative distance between wireless devices (e.g. position information of wireless devices 804, 806, 808, 810 or wireless devices 814, 816 to be processed at wireless device 802 or information indicating relative distances between pairs of wireless devices), and the beamforming controller 714 of wireless device 802 may be configured to adjust a configuration of an antenna arrangement of wireless device 802 to adjust an opening angle of at least one beam for data transmission to wireless devices 804, 806, 808, 810 or wireless devices 814, 816 based on the relative distance.

As can be taken from FIG. 10, in accordance with certain aspects, a maximum geographical size of a group of receiving wireless devices (e.g. wireless devices 814, 816 or wireless devices 804, 806, 808, 810) to which a transmitting wireless device (e.g. wireless device 802) may transmit a single transmission beam may thus be determined by an average geographical distance between the transmitting device and the receiving devices within said group. As exemplarily illustrated in FIG. 10, the group of receiving wireless devices 804, 806, 808, 810 which is closer to transmitting wireless device 802 may be distributed over a larger geographical area and may thus be served by the larger transmission beam A (having a larger opening angle) as compared to the group of receiving wireless devices 814, 816 which are at a larger distance from the transmitting wireless device 802 and may thus be served by the narrower transmission beam C (having a smaller opening angle). Steering a narrower transmission beam to wireless devices farther away may compensate for a corresponding larger path-loss.

Figure 11:
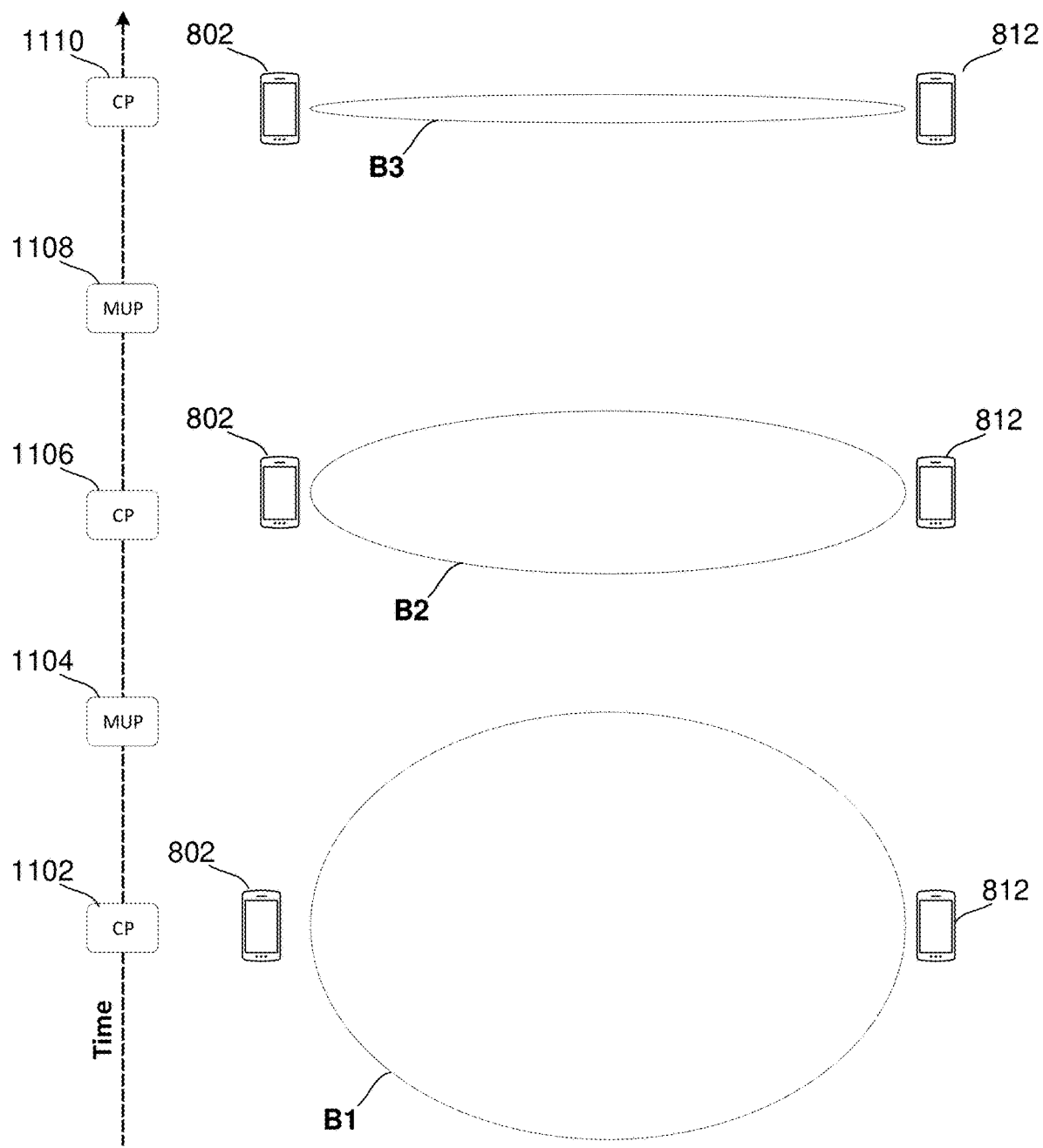
FIG. 11 shows exemplary iterative beam management in accordance with some aspects.

In accordance with various aspects, it may be possible that beamforming is iteratively tuned while communications are ongoing within a network of wireless devices as exemplarily illustrated in FIG. 11. Communications between wireless device 802 and 812 may initially start with a wide beam B1 e.g. in a first communication phase (CP) 1102 which may be a communication phase such as communication phase 508 or 512 in FIG. 5. Wireless devices may either directly exchange beamforming information in mesh update phase (MUP) 1104 or indirectly via a wireless device assuming a role of a beamforming master (or either one of wireless devices 802, 812 may assume the role of the beamforming master). Wireless devices 802, 812 may exchange said beamforming information either with direct D2D transmission (using steered beams) or with wide beam transmission or with broadcast transmission. Mesh update phase (MUP) 1104 may be a mesh update phase such as mesh update phase 510 or 514 in FIG. 5. Based on beamforming information exchanged in said mesh update phase (MUP) 1104 beamforming controllers 712 at each of wireless devices 802, 812 may control respective antenna arrangement configurations to steer and receive beam B2 for data communication in communication phase 1106 which is narrower as compared to beam B1 employed in communication phase 1102. Via further exchange of beamforming information in subsequent mesh update phase 1108, wireless devices 802, 812 may employ an even narrower beam B3 in communication phase 1110. Wireless devices may employ further iterations for further narrowing an employed beam (via further alternating mesh update and communication phase) until a desired opening angle of the beam is reached. In a similar fashion, each wireless device within a network of wireless devices may iteratively optimize directions of interference nulls to optimally suppress interference.

In accordance with certain aspects, wireless device 802 may control data transmitted to wireless devices within one group (e.g. wireless devices 804, 806, 808, 810 or wireless devices 814, 816) to be frequency domain multiplexed, whereby partially overlapping or non-overlapping frequency ranges may be assigned for each wireless device within a group. Further, in accordance with certain aspects, wireless device 802 may control data transmission to different groups (e.g. to wireless devices 804, 806, 808, 810, or to wireless device 812, or to wireless devices 814, 816) to be time domain multiplexed, e.g. a respective time slot assigned to each group of receiving wireless devices.

Figure 12:
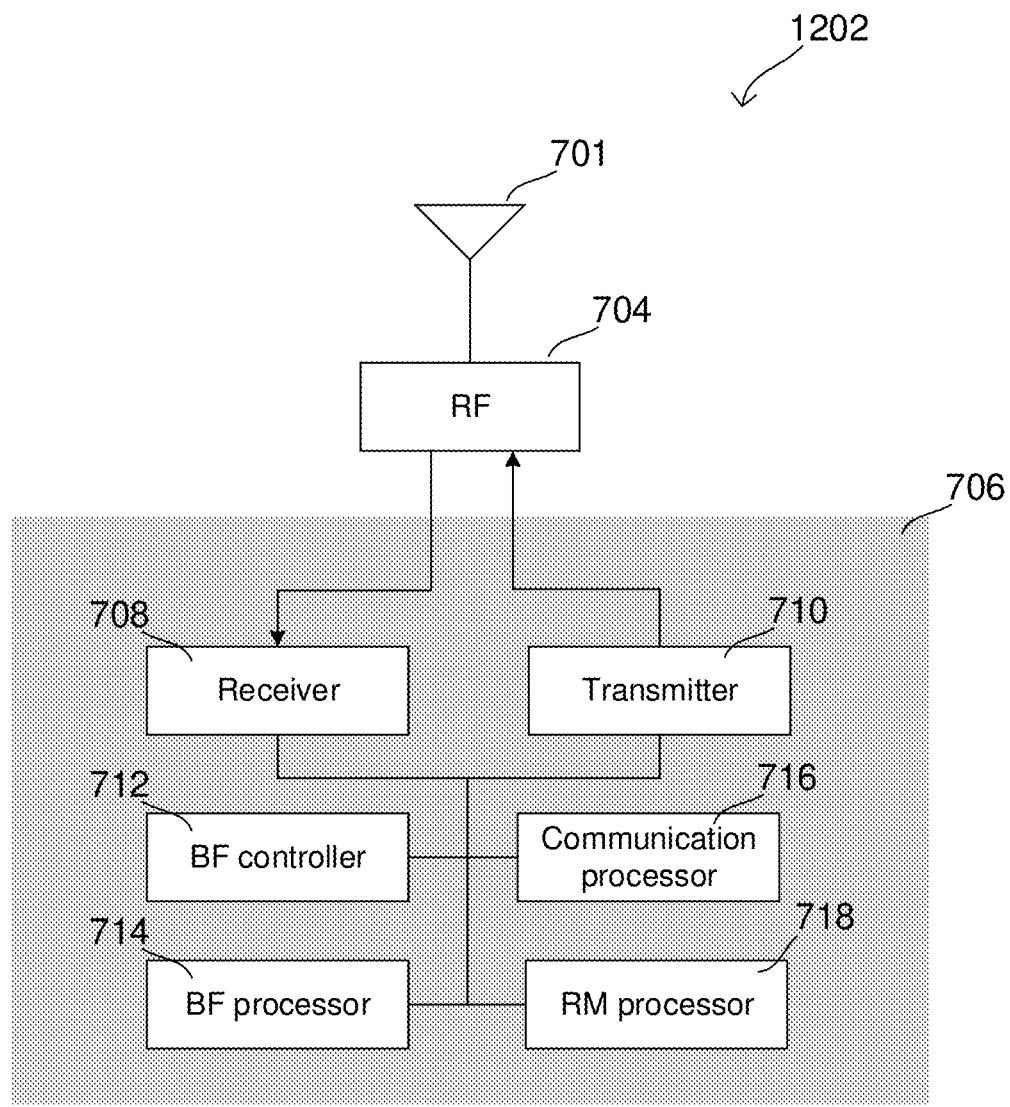
FIG. 12 shows an exemplary structural configuration of a wireless device in accordance with some aspects.

FIG. 12 shows an exemplary structural configuration of a wireless device 1202 which further to the components of wireless device 702 of FIG. 7 includes resource management (RM) processor 718. Being depicted as component of baseband modem 706, resource management processor 718 may be a subcomponent of the digital signal processor (e.g., physical layer component) and/or a subcomponent of the protocol controller (e.g., protocol stack component). While resource management processor 718 is shown as separate component in FIG. 11, in some aspects beamforming controller 712, beamforming processor 714, communication processor 716 and resource management processor 718 may structurally be a single processor configured to perform the respective operations of beamforming controller 712, beamforming processor 714, communication processor 716 and resource management processor 718.

In accordance with various aspects, the resource management processor 718 may be configured to allocate frequency and time resources for transmission and reception of data by wireless device 1202 based on allocation information. Such allocation may be received from at least one further wireless device included in the D2D mesh network. For example, in accordance with various aspects, e.g. in a decentralized mode, such allocation information may be negotiated (i.e. transmitted and received) within a group of wireless devices e.g. during the mesh update phases 510/514 of FIG. 5. The wireless device 1202 may thus in accordance with various aspects not only be configured to receive allocation information from one or more further wireless devices, the wireless device 1202 may in accordance with certain aspects be configured to transmit allocation information to the one or more further wireless devices.

Further, one or more wireless devices may take the role of a master resource management device to control allocation of frequency and time resources for one or more further wireless devices. In such aspects, the resource management processor 718 of wireless device 1202 may be configured to process allocation information to obtain allocation control information to be transmitted to the one or more further wireless devices for allocating frequency and time resources for transmission and reception of data by the one or more further wireless devices.

Figure 13A:
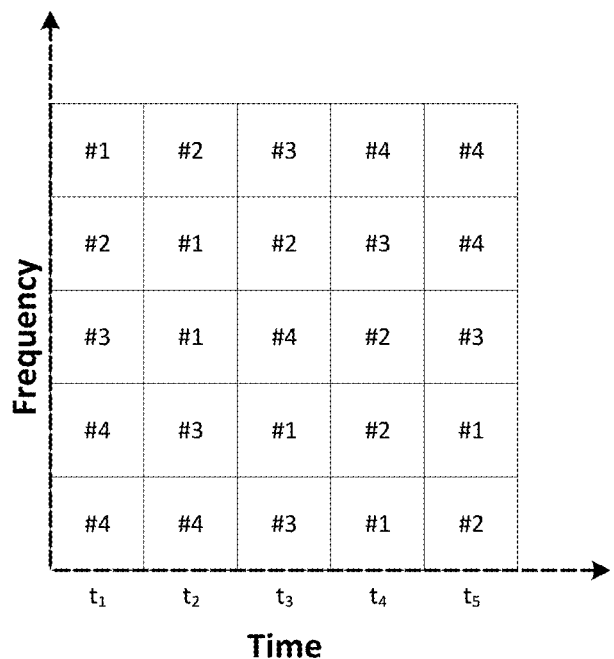
FIG. 13A shows exemplary resource allocation in accordance with some aspects.

FIGS. 13A/B illustrate time/frequency resource allocation within a D2D mesh network in accordance with various aspects. In accordance with various aspects, an available channel may be entirely allocated to a wireless device for its transmission for example in case of a low number of wireless devices in a given area and/or large data payloads. However, for example in situations of higher wireless device density, time/frequency resources (e.g., any set of OFDM tones, Resource Blocks as defined by 3GPP, etc.) may be allocated to multiple wireless devices within or forming the D2D mesh network based on the allocation information. In other words, in certain aspects, a wireless device may have access to a subset of available time/frequency resources as illustrated in FIG. 13A exemplarily for a case of four wireless devices (#1, #2, #3, #4), the frequency resources being split up into 5 blocks each which should be understood as only chosen for illustrative purposes while in accordance with certain aspects, the available frequencies may be split into any number of frequency blocks. As shown in FIG. 13A, for any time slot (exemplarily indicated as $t_1$, $t_2$, $t_3$, $t_4$, $t_5$, respectively) resource blocks are allocated to one or more of wireless devices #1, #2, #3, #4 whereby respectively allocated blocks do not overlap.

In accordance with certain aspects, a time/frequency resource pattern as exemplarily allocated for wireless devices #1, #2, #3, #4 in FIG. 13A can be pre-defined such that e.g. allocation information exchanged between wireless devices in a decentralized mode or received from a master resource management device in a centralized mode may refer e.g. to a code-book. In accordance with certain aspect, such time/frequency resource pattern may be defined dynamically, e.g. may be negotiated with exchanged allocation information or defined by the master resource management device. For example, different patterns may be used for different capacities. For example, high capacity patterns may be allocated to wireless devices which require the exchange of large and/or time sensitive data packets. In turn, low capacity patterns may be allocated to wireless devices which require the exchange of small and/or not time sensitive data packets.

In accordance with various aspects, it may be possible to allocate at least partially overlapping time/frequency resources for two or more wireless devices.

Figure 13B:
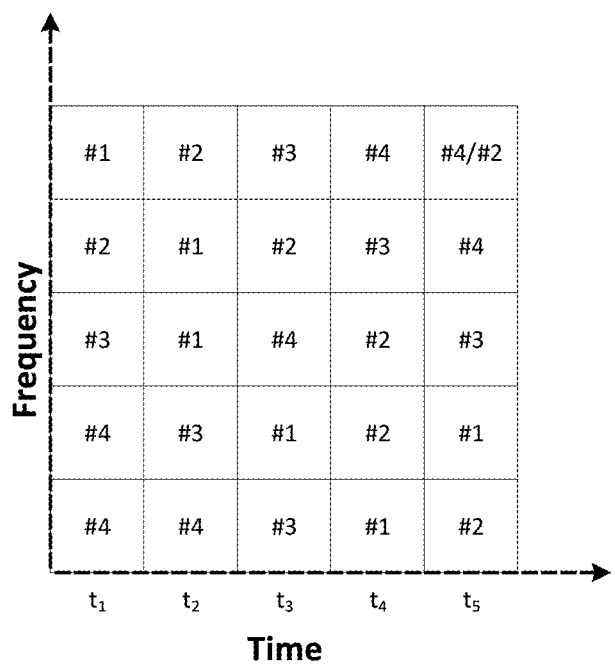
FIG. 13B shows exemplary resource allocation in accordance with some aspects.

FIG. 13B illustrates an example according to which the highest frequency resource block at time slot $t_5$ is allocated to wireless devices #2 and #4. In such cases, for example in a decentralized mode, beamforming processors 714 and/or beamforming controllers 712 of respective wireless devices or in a centralized mode the beamforming processor 714 and/or beamforming controller 712 of a beamforming master device may be configured to employ specific beamforming patterns to respective wireless devices to achieve full or partial orthogonality in space. In other words, in accordance with certain aspects, the beamforming controller of a wireless device in a centralized and/or in a decentralized mode may be configured to adjust the antenna arrangement of the transceiver of the wireless device for receiving data and/or for transmitting data based on the beamforming information and based on the allocation information. For example, if allocation information indicates or results in a collision of certain data in frequency and time, beams for data transmission of respective wireless devices (receive and/or transmit beams/configurations) may be steered to avoid an overlap of such transmission in space.

Device-to-Device (D2D) based wireless mesh networks may provide flexible resource allocation, flexible D2D link adaption, and improved spectrum utilization without a need for centralized base stations. In view of this, various aspects of the present disclosure may focus on further improving dynamics of such wireless mesh networks by dynamically adapting a topology of the mesh network in order to improve network robustness and efficiency taking into account changes in network structure for example due to fading-out/fading-in of one or more mesh network nodes (e.g. wireless devices part of the mesh network) as a result of signal blockers, fluctuating wireless channel qualities, temporally varying interferences or movement of network nodes. Certain aspects may further take into account latency of transmissions depending on a number of relays (hops) within a D2D mesh network.

In accordance with various aspects, a topology (in accordance with various aspects a set of possible routes between any two wireless devices forming the D2D mesh network as stored in the connectivity map) of a D2D mesh network may be dynamically adapted by means of dynamic beamforming and beam steering. More specifically, in accordance with certain aspects, network topology may be adapted by dynamically adjusting and readjusting spatial beam directions in the physical layer. Thus, in accordance with various aspects, a wireless device included in a mesh D2D network may include a receiver configured to receive control information from at least one further wireless device included in the mesh D2D network via an antenna arrangement (e.g. one or more antenna arrays) with at least two antennas via a direct device-to-device communication link. In certain aspects, the control information may correspond to one or more random access preambles and/or may be included in a sidelink synchronization sub-frame. Such control information included in a sidelink synchronization sub-frame may in certain aspects include a Primary Sidelink Synchronization Signal (PSSS), a Secondary Sidelink Synchronization Signal (SSSS), and a Physical Sidelink Broadcast Channel (PSBCH). The wireless device may in accordance with various aspects include a beamforming controller configured to select a transmit antenna configuration of the antenna arrangement to steer a data transmission beam towards the at least one further wireless device based on the control information.

By employing such dynamic beam adaptation based on autonomous physical layer processing at wireless devices included in the D2D mesh network, signaling overhead otherwise potentially resulting from higher layer control by centralized network nodes such as base stations may be avoided or reduced. More specifically, various aspects of the present disclosure may employ a dual-directional hierarchical autonomous beam acquisition scheme which may in certain aspects allow for a fast beam acquisition convergence for peer-to-peer communication pairs. Employing such means, various aspects of the present disclosure may enable D2D mesh networks that are robust even in case of changes in network structure, e.g. in case mesh network nodes (wireless devices) fade in or fade out. Controlling network topology by steering beams from a transmitting node to a receiving node may further mitigate interference caused by a corresponding transmission on the network.

Figure 14A:
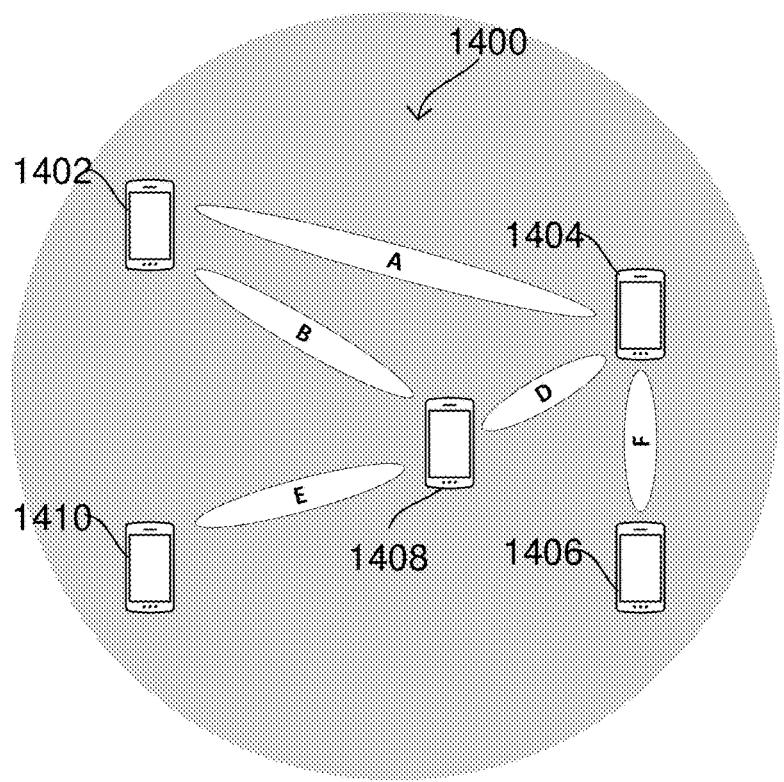
FIG. 14A conceptually illustrates mesh topology adaption by dynamic beamforming in accordance with various aspects.
Figure 14B:
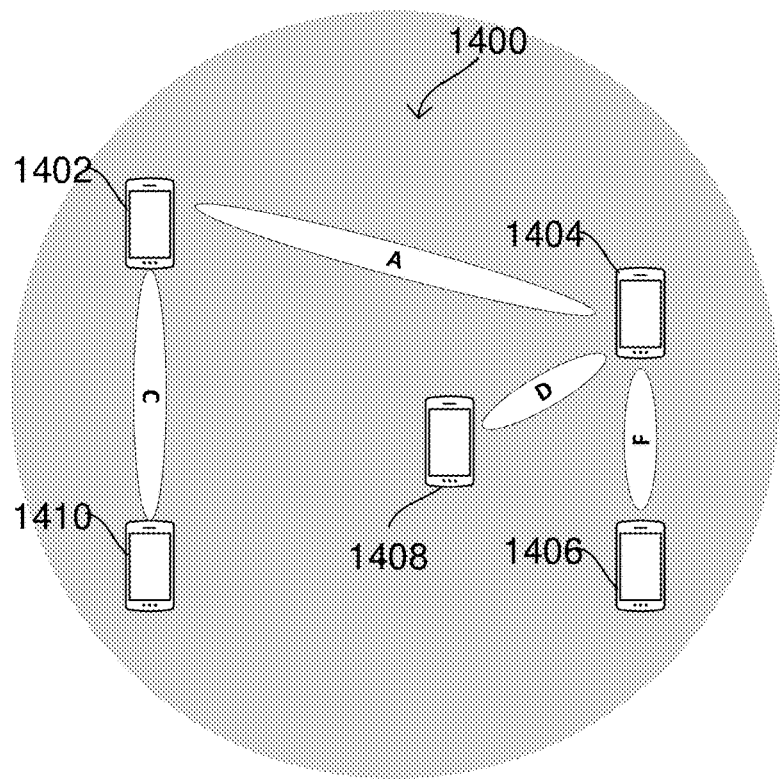
FIG. 14B conceptually illustrates mesh topology adaption by dynamic beamforming in accordance with various aspects.

FIGS. 14A and 14B conceptually show mesh topology adaption by dynamic beamforming in accordance with various aspects for exemplary D2D mesh network 1400 exemplarily including wireless devices 1402, 1404, 1406, 1408 and 1410. While the shown wireless devices are chosen for illustrative purposes, a D2D mesh network in accordance with aspects of the present disclosure may include any number of wireless devices. Enabling control of transmit beams and/or interference nulls in the receive direction, a wireless device in accordance with various aspects may include an antenna arrangement with at least two antennas (e.g. one or more antenna arrays each with one or more antennas) and a beamforming controller configured for controlling a configuration of the antenna arrangement to steer one or more beams for data transmission from the wireless device and interference nulls of the antenna arrangement. As shown, wireless device 1402 may for example simultaneously steer beam A to wireless device 1404 and beam B to wireless device 1408 (FIG. 14A) or beam A to wireless device 1404 and beam C to wireless device 1410 (FIG. 14B). Wireless device 1404 may control its antenna arrangement for receiving beam A from wireless device 1402 and may set a transmit antenna configuration of its antenna arrangement for steering respective beams (beams D and F) for data transmission to wireless devices 1406 and 1408. Wireless device 1408 may control its antenna arrangement to set a receive antenna configuration for receiving beam B from wireless device 1402 and beam D from wireless device 1404 and to steer beam E for data transmission to wireless device 1410. Thus, wireless devices in accordance with aspects of the present disclosure may be configured to employ spatial beamforming to enable transmission of data within mesh network 1400.

In accordance with various aspects, dynamic steering of spatial beams among mesh network nodes (wireless devices included in the mesh network) may be employed for dynamically adapting the mesh topology. In other words, in accordance with various aspects, a mesh topology may be dynamically adapted by dynamically updating which pairs of network nodes communicate via a beam steered from one of the nodes to the other one of the nodes. As will be described further herein, in accordance with certain aspects, autonomous beam acquisitions in the physical layer between such pairs of network nodes may in certain aspects avoid a need for higher layer re-routing protocols and may thus reduce or avoid signaling overhead for topology adaption. As compared to a static allocation of spatial beams via a centralized network node such as a base station, network nodes may be configured to autonomously identify updated beams and updated counterpart nodes via said autonomous beam acquisition described further herein.

Referring back to FIGS. 14A and 14B, in FIG. 14A, wireless device 1402 may transmit data (payload data) via wireless device 1408, wireless device 1408 acting as relay for this data transmission. While such relayed data transmission may be suitable for certain applications, for example for applications requiring reduced latency or higher data rate, a direct communication between wireless device 1402 and wireless device 1410 may be preferable for different applications. Thus, for example when wireless device 1402 switches to a service or application requiring higher data rate or reduced latency, a topology of D2D mesh network 1400 where data transmission from wireless device 1402 to wireless device 1410 is relayed as illustrated exemplarily in FIG. 14A may be adapted to a topology where wireless device 1402 steers a direct beam C to wireless device 1410 as exemplarily illustrated in FIG. 14B.

In accordance with various aspects, a topology of a D2D mesh network may be continuously adapted by adapting beam steering (and steering of interference nulls) of wireless devices within the mesh network based on application requirements, capabilities and/or limitations of wireless devices within the mesh network. In certain aspects, adapting the network topology may take into account latency and data rate requirements of wireless networks. Further, in certain aspects, adapting the network topology may take into account geographical information (e.g. position information of the wireless devices within the mesh network), e.g. thus taking into account which devices are sufficiently close to have mutual direct links and which devices need to communicate via relays. For example in certain aspects, topology adaption may take into account connectivity maps stored at each wireless device. Further, adapting the network topology may take into account wireless devices newly added to the mesh network or loss of routes for communication when wireless devices leave the mesh network.

Various aspects may employ centralized or decentralized control of the network topology adaption. For example, in a decentralized approach and exemplarily referring to D2D mesh network 1400 of FIG. 14A, wireless device 1402 (for example being aware of corresponding IDs of other wireless devices included in mesh network 1400 based on a corresponding connectivity map) may transmit (e.g. broadcast) a topology update request to one, more or all of wireless devices included in D2D mesh network 1400 for requesting communication with wireless devices 1410 and 1404. For example, wireless devices 1404, 1408 and 1410 may reply to the request with an own network connection status, thereby e.g. informing wireless device 1402 of possibilities of direct links between wireless devices 1402, 1404 and wireless devices 1402, 1410 and of an indirect link to wireless device 1410 via wireless device 1408. Based on its own capabilities (e.g. possible number of simultaneous beams, data rate per beam, etc.) wireless device 1402 may then decide to employ beams as illustrated in FIG. 14A. In case for example a requirement of wireless device 1402 changes, e.g. if higher data rate is required for communication with wireless device 1410, wireless device 1402 may broadcast a further request and may after a corresponding response switch to a configuration as illustrated in FIG. 14B.

In accordance with various aspects, topology update requests may be transmitted from multiple or all wireless devices within a D2D mesh network in synchrony either periodically (e.g. during mesh update phases as shown in FIG. 5), in response to a trigger event, and/or topology update requests may be sent from a wireless device if necessary. As an example of a triggered transmission, for example, in accordance with certain aspects, a wireless device (part or not part of the D2D mesh network) assuming a master role or a base station of a wireless communication network (e.g. when employing control and data plane separation) may trigger transmission of topology update requests by broadcasting a corresponding trigger message, e.g. in case of high interference, high load on the network, or in emergency scenarios. In response to the topology update requests, each wireless device included in the D2D mesh network may broadcast a status message, e.g. including its capabilities (e.g. maximum number of beams, possible data transmission rate, position information, desired latency and transmission rate for own communications, etc.). A topology of the mesh network may then be adapted based on a common distributed decision within the mesh network. Alternatively or in addition, a topology update request may be sent from a wireless device to one, more or all wireless devices of the mesh network if necessary, e.g. if the wireless device needs to establish a new route for data communication.

In an alternative example, in a centralized approach and again exemplarily referring to D2D mesh network 1400 of FIG. 14A, control of mesh network topology adaption may be realized via a wireless coordinator device which may be a wireless device included in the mesh network assuming a role of a master device, a different wireless device not part of the D2D network and/or a base station of a wireless network (e.g. in which case control and data plane separation may be employed). Such coordinator device may be a device being aware of connections within the D2D mesh network (e.g. based on a stored connectivity map) and may trigger updates of the mesh topology by sending (e.g. broadcasting) corresponding topology update control messages to wireless devices included in the D2D mesh network. As in the decentralized case, also a mesh network coordinator device may control mesh updates periodically (e.g. during mesh update phases as shown in FIG. 5) and/or as necessary (e.g.

In accordance with various aspects, control messages including e.g. topology update requests, topology update control messages and/or said trigger message are not necessarily transmitted via spatially steered beams but may be transmitted via non-steered control channels. Such control messages may in accordance with various aspects be transmitted using LTE bands or lower bands. In certain aspects, control messages may be transmitted and received in a first frequency band while related payload data may be transmitted and received in at least one further frequency band (at least partially) different from the first frequency band. For example, control messages may be transmitted/received in a frequency band of lower frequencies as compared to a frequency band for transmission/reception of related (beamformed) payload data, e.g. control messages may be transmitted/received in ISM bands, while related payload data may be transmitted/received in mmW frequency bands. Thus, in accordance with certain aspects, the first frequency band may comprise a frequency range of 790-960 MHz, a frequency range of 1710-2025 MHz, a frequency range of 2110-2200 MHz, a frequency range of 2300-2400 MHz, and/or a frequency range of 2.4-2.4835 GHz.

In accordance with various aspects, a topology of a D2D mesh network may be adapted based on Key Performance Indicator (KPI) optimization. In accordance with such aspects, a topology may be adapted based on specific predefined KPI parameters, which in certain aspects may be predefined peer-to-peer (network) KPI parameters and/or one peer (device) KPI parameters. In certain aspects, KPI optimization may be performed in general:

Minimize KPI(p)
Subject to $C_i(p)$, i=1, ..., m
Where $min \leq p_j \leq max$, j=1, ... n.

In certain aspects, KPI(p) may be a specific parameter under consideration to be optimized which is subject to a constraint $C_i(p)$, while m is the total number of constraints to be considered. The parameter $p_j$ may be a design variable which varies between desired predefined minimum (min) and maximum (max) values predefined in the system.

For example, in certain aspects, a key performance indicator (KPI) may relate to interference levels received at a wireless device. Such KPI may be used for dynamically steering a transmit beam into spatial directions in which interference levels received from other transmitting wireless devices (constraints) at the wireless device are minimal (e.g. a desired interference level that the wireless device can cope with).

Further, in certain aspects, a KPI may relate to mobility. For example, when a mesh node (wireless device) fades out (e.g. as a result of being blocked by a user's hands or by a building, or in case of low battery state), a corresponding mesh topology can be adapted so that the inter-connections among other nodes are still possible. Exemplarily referring to FIG. 14A, if for example wireless device 1408 fades out (at least as seen from wireless devices 1402, 1410) and can thus no longer relay communications between wireless devices 1402 and 1410, a topology of mesh network 1400 may be updated to a topology as illustrated in FIG. 14B, where a direct link is established between wireless devices 1402 and 1410.

In accordance with certain aspects, further KPIs may be defined relating to latency, channel quality, and/or beamforming capability (e.g. a number of con-current beams supported per wireless device). Such KPIs may further be employed for beam and thus topology adaptation within D2D mesh networks in accordance with certain aspects.

Figure 15:
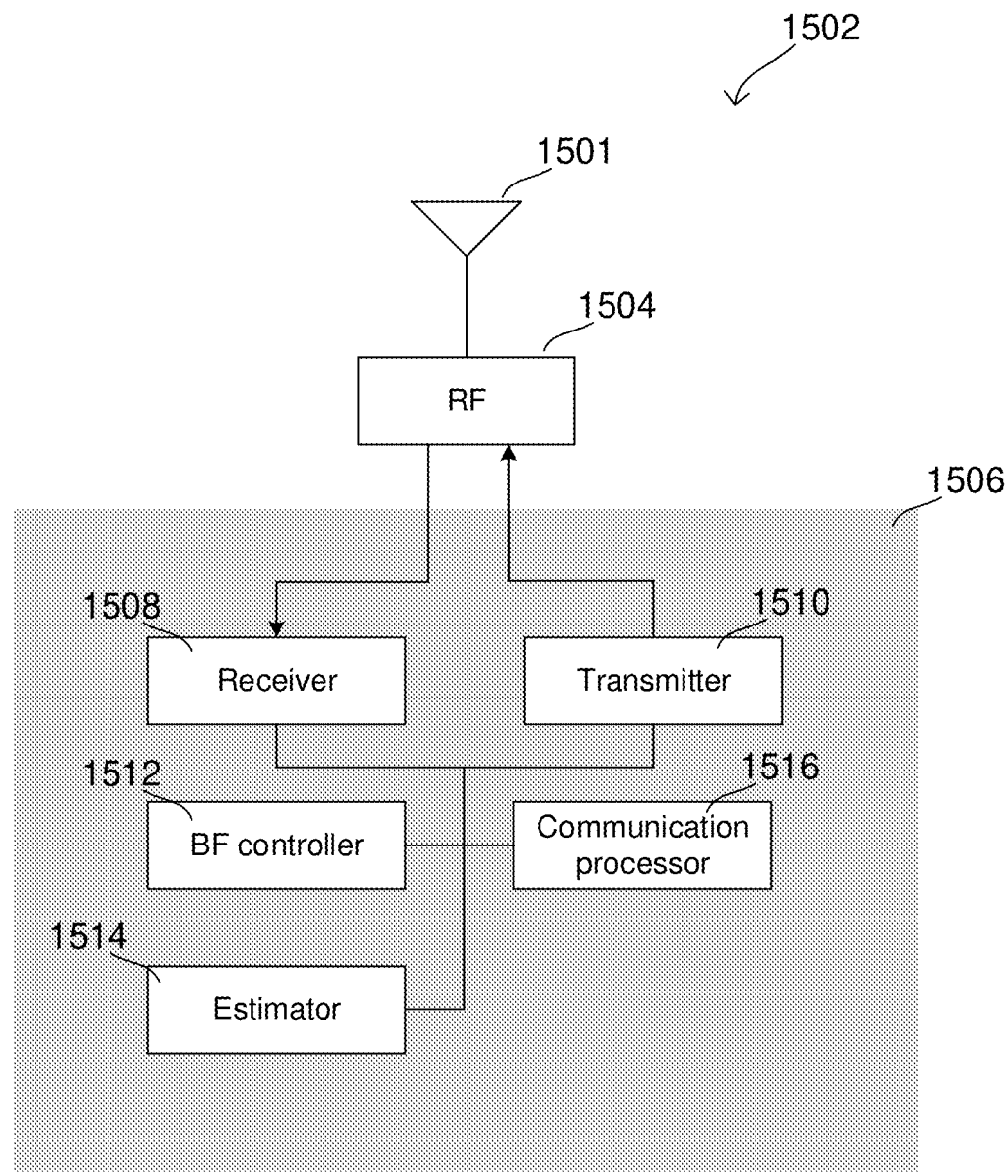
FIG. 15 shows an exemplary structural configuration of a wireless device in accordance with some aspects.

FIG. 15 shows an exemplary structural configuration of a wireless device 1502 which may be included in or connected to a D2D mesh network (wireless device 1502 may correspond to any one of wireless devices 1402, 1404, 1406, 1408 and 1410 of D2D mesh network 1400 shown in FIG. 14). The structural configuration shown in FIG. 15 is focused on beam forming features of wireless device 1502 and may therefore not expressly depict other components that are less directly related to these features. As illustrated, wireless device 1502 may include antenna system 1501, RF transceiver 1504, and baseband modem 1506. In some aspects, antenna system 1501, RF transceiver 1504, and baseband modem 1506 may be configured as described above for antenna system 202, RF transceiver 204, and baseband modem 206 of terminal device 102. Accordingly, wireless device 1502 may be configured to transmit and receive wireless signals via antenna system 1501 and RF transceiver 1504. In the transmit direction, RF transceiver 1504 may therefore modulate and transmit baseband samples (provided by baseband modem 1506) via antenna system 1501. In the receive direction, RF transceiver 1504 may also receive and demodulate radio signals via antenna system 1501 and provide the resulting baseband samples to baseband modem 1506.

In accordance with various aspects, antenna system 1501 may include an antenna arrangement including at least two antennas. The antenna arrangement may in accordance with certain aspects correspond to one or more antenna arrays, an antenna array including at least two or a plurality of antennas. An antenna may in accordance with certain aspects correspond to an antenna element. In accordance with certain aspects, a configuration of the antenna array and/or of the at least two antennas may be controlled by a beamforming controller of the wireless device 1502 to steer one or more data transmission beams to one or more wireless devices, for example based on position information of the one or more wireless devices. By thus directing a beam e.g. from one node of a mesh network (a wireless device) e.g. towards another node of a mesh network (e.g. a further wireless device), it may become possible to mitigate effects of interference from such beam to different nodes of the mesh network. In accordance with certain aspects, a configuration of said antenna arrangement may further be controlled by the beamforming controller to suppress interference in a direction different from a direction in which wireless device 1502 receives data from another wireless device. In other words, in certain aspects, a configuration of said antenna array may be controlled to steer interference nulls of the antenna arrangement.

FIG. 15 also depicts several internal components of baseband modem 1506, including receiver 1508, transmitter 1510, beamforming (BF) controller 1512, estimator 1514, and communication processor 1516.

In an alternative aspect, beamforming controller 1512 may be part of a separate building block (not shown in the figure) included in RF transceiver 1504, arranged between RF transceiver 1504 and baseband modem 1506, or included within baseband modem 1506 (within baseband modem processor 1506). In accordance with certain aspects, such separate building block may include a processor configured for processing, e.g. of measurements of received wireless signals, and may thus be configured to provide control information for steering of beams and interference nulls to beamforming controller 1512 included in said building block. Instead of an own processor, said building block may be coupled to a baseband processor such as communication processor 1516 for this purpose. Such arrangement of a beamforming controller in a separate building block close to (i.e. in between RF transceiver and base band modem) or inside of RF modem may in certain aspects allow for a faster steering of beams and interference nulls.

Referring back to FIG. 15, in some aspects, baseband modem 1506 may include a digital signal processor and a protocol controller. Receiver 1508, transmitter 1510, beamforming controller 1512, estimator 1514, and communication processor 1516 may therefore be subcomponents of the digital signal processor (e.g., physical layer components) and/or subcomponents of the protocol controller (e.g., protocol stack components). In some aspects, receiver 1508 may be the physical layer receive chain, transmitter 1510 may be the physical layer transmit chain, and beamforming controller 1512, and communication processor 1516 may be processors that are part of the protocol stack layers of wireless device 1502. Estimator 1514 may in certain aspects be a physical layer processor configured to estimate reception quality of a signal received by receiver 1508. Estimator 1514 may be configured to compare a received reception quality (such as Signal-to-Interference-plus-Noise-Ratio (SINR), Signal-to-Noise-Ratio (SNR)) to a predefined threshold value which may be a value stored at a memory of wireless device 1504 not illustrated in the figure. The estimator 1514 may further be configured to estimate a temporal duration or a frequency spread of interfering events. For example, the estimator 1514 may be configured to estimate a periodicity and/or duration of such interfering events by performing statistical analysis on interference events observed during a predefined temporal period.

For example, receiver 1508 may include a demodulator, demapper (e.g., constellation demapper), de-interleaver, decoder, and/or descrambler. Receiver 1508 may receive wireless signals in the form of baseband samples via antenna system 1501 and RF transceiver 1504. Receiver 1508 may then sequentially process these baseband samples with the demodulator, demapper (e.g., constellation demapper), de-interleaver, decoder, and/or descrambler to produce a bitstream, which receiver 1508 may provide to beamforming controller 1512, and/or communication processor 1516 (e.g., to the protocol stack layers). Transmitter 1510 may include a scrambler, encoder, interleaver, mapper (e.g., constellation mapper), and/or a modulator, which may sequentially process a bitstream (e.g., provided by protocol stack layers of beamforming controller 1512, and communication processor 1516) to produce baseband samples (e.g., complex IQ symbols). Transmitter 1510 may then transmit these baseband samples as wireless signals via RF transceiver 1504 and antenna system 1501.

In some aspects, beamforming controller 1512 may also include physical layer components, such as circuits or processors configured to control RF transceiver 1504 and/or antenna system 1501 to steer beams for data transmission and interference nulls generated by antenna system 1501. At higher layers, e.g. at a medium access control (MAC) layer included in the data link layer, and/or higher layers the beamforming controller 1512 may control width and direction of beams for data transmission and interference nulls.

Communication processor 1516 may be a processor configured to execute other control- and user-plane operations of the protocol stack layers. This may include generating messages for transmitter 1510 to transmit (e.g., messages including user or control data) and/or recovering messages from bitstreams provided by receiver 1508. Communication processor 1516 may in accordance with various aspects be configured to control communications of the wireless device 1502 with at least one further wireless device included in a D2D mesh network based on a connectivity map (data relating to mutual connections between wireless devices included in the network) including information for establishing communication routes each other wireless device included in the D2D mesh network. While beamforming controller 1512, and communication processor 1516 are shown separately in FIG. 15, in some aspects beamforming controller 1512, and communication processor 1516 may structurally be a single processor configured to perform the respective operations of beamforming controller 1512, and communication processor 1516.

As mentioned above, beamforming based adaption of topology of D2D mesh networks may in accordance with various aspects of the present disclosure be based on autonomous beam acquisitions in the physical layer. Mesh nodes (wireless devices) employing autonomous beam acquisition may be configured to autonomously identify new beams and new counterpart mesh nodes without relying e.g. on explicit higher layer signaling (for example signaling to release an old mesh node or to attach to a new mesh node). In such examples where mesh nodes may perform autonomous beam acquisition without relying on higher layer re-routing protocols, it may be possible to reduce or even avoid signaling overhead for topology adaptations. Thus, various aspects of the present disclosure may employ a dual-directional hierarchical beam acquisition scheme for autonomous peer-to-peer beam acquisition.

Generally, beam acquisition in accordance with certain aspects may hierarchically adapt a beam width (from a wide beam width to a narrow beam width) both on the receiver and on the transmitter. In other words, beam acquisition in accordance with certain aspects may be performed autonomously between pairs of wireless device and may enable adaptation both of transmit and receive beams which may in certain aspects contribute to a fast beam acquisition. FIGS. 16A to 17B illustrate dual-directional hierarchical beam acquisition for autonomous peer-to-peer beam acquisition in accordance with various aspects. FIGS. 16A to 17B may exemplarily illustrate beam acquisition employed by wireless devices 1402 and 1410 when setting up a direct communication link shown in FIG. 14B.

Figure 16A:
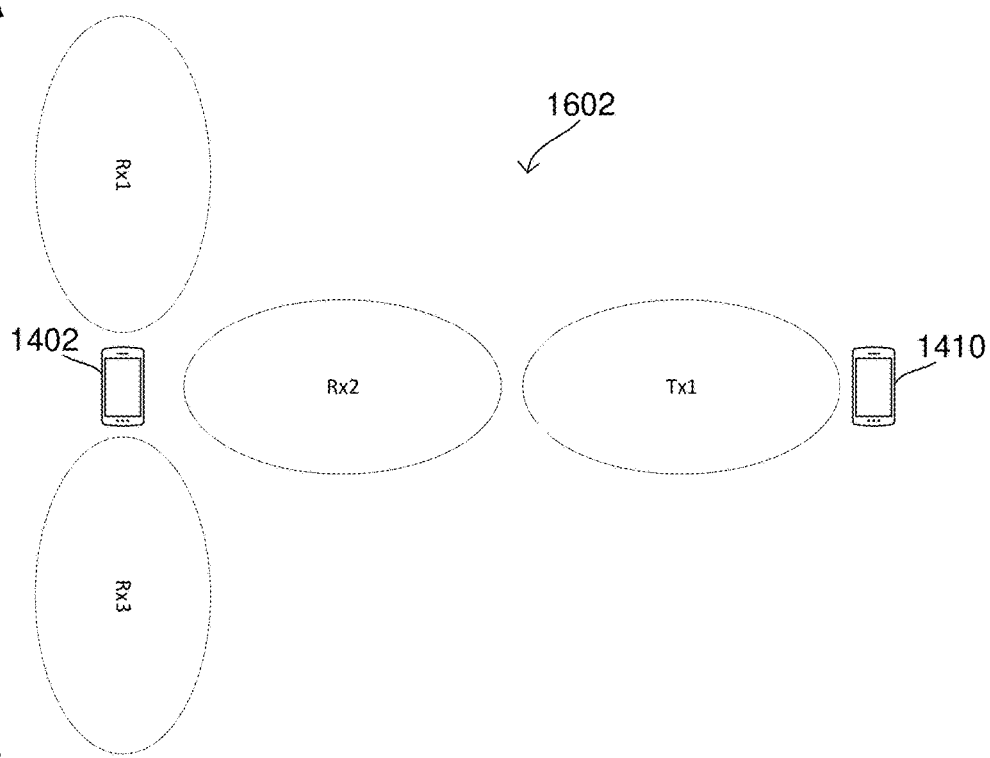
FIG. 16A shows a first stage of dual-directional hierarchical beam acquisition for autonomous peer-to-peer beam acquisition in accordance with various aspects.

In FIG. 16A, at stage 1602, a beamforming controller of wireless device 1410 may set a transmit antenna configuration of an antenna arrangement of wireless device 1410 to steer a transmit beam (beam Tx1 in FIG. 16A) towards wireless device 1402 using a broad beam width for initialization of beam acquisition. A corresponding beam width index k may be set to an initiation value (e.g. k=0). Wireless device 1410 may use transmit beam Tx1 at stage 1602 for transmission of control information, e.g. repeated preambles (e.g. predefined beam acquisition preambles stored at each wireless device an thus known to wireless device 1402, or random access preambles) for signal quality measurements at wireless device 1402. In other words, in certain aspects, control information may correspond to one or more random access preambles and/or may be included in a sidelink synchronization sub-frame. In such aspects, control information included in a sidelink synchronization sub-frame may include a Primary Sidelink Synchronization Signal (PSSS), a Secondary Sidelink Synchronization Signal (SSSS), and a Physical Sidelink Broadcast Channel (PSBCH).

Further, at stage 1602, wireless device 1402 may sweep, i.e. switch between, different candidate receive beams (beams Rx1 to Rx3 in FIG. 16A) with a similar broad beam width for initialization of beam acquisition (e.g. k=0). In other words, in accordance with various aspects, a beamforming controller of wireless device 1402 may be configured to control an antenna arrangement or wireless device 1402 to receive the control information (e.g. the predefined beam acquisition preambles, or the random access preambles) with at least two candidate receive antenna configurations (Rx1 to Rx3 in FIG. 16A) of the antenna arrangement, and to select the transmit antenna configuration (Tx1 in FIG. 16B) for steering the beam for data transmission corresponding to one (Rx2 in FIG. 16A) of the at least two candidate receive antenna configurations.

Thereby, the beamforming controller of wireless device 1402 may be configured to adjust a receive antenna configuration (e.g. any one of Rx1 to Rx3 in FIG. 16A) of the antenna arrangement for receiving the control information to be adapted to a width of a received beam (Tx1 in FIG. 16B received from wireless device 1410) including the control information. In accordance with certain aspects, a beam width for initialization of beam acquisition (for k=0) may be a predefined width stored at each wireless device which is sequentially reduced until a reception quality meets at least a predefined value.

Wireless device 1402 may perform signal quality measurements for each receive beam (Rx1 to Rx3 in FIG. 16A) using the preambles repeatedly transmitted from wireless device 1410. In other words, an estimator of wireless device 1402 may be configured to estimate a reception quality of the control information (e.g. the predefined beam acquisition preambles, or the random access preambles) for each of the at least two candidate receive antenna configurations (Rx1 to Rx3 in FIG. 16A). The beamforming controller of wireless device 1402 may be configured to select the transmit antenna configuration (Tx1 in FIG. 16B) corresponding to one (Rx2 in FIG. 16A) of the at least two candidate receive antenna configurations based on the reception quality estimated for the one of the at least two candidate receive antenna configurations. In certain aspects, the beamforming controller may select the transmit antenna configuration corresponding to the one of the at least two candidate receive antenna configurations for which the estimated reception quality fulfills a predefined reception quality criterion. In accordance with various aspects, a predefined reception quality criterion may be fulfilled for a candidate receive antenna configuration, if for this candidate receive antenna configuration, a measured or estimated reception quality is best among the at least two candidate receive antenna configurations. A reception quality criterion may in accordance with alternative aspects be predefined differently, e.g. using a different relative criterion (second best, etc.) among the at least two candidate receive antenna configurations or using an absolute predefined threshold value. As illustrated, based on such measurements, wireless device 1402 may thus exemplarily select at stage 1602 a receive beam (beam Rx2 in FIG. 16A) with best reception quality.

Figure 16B:
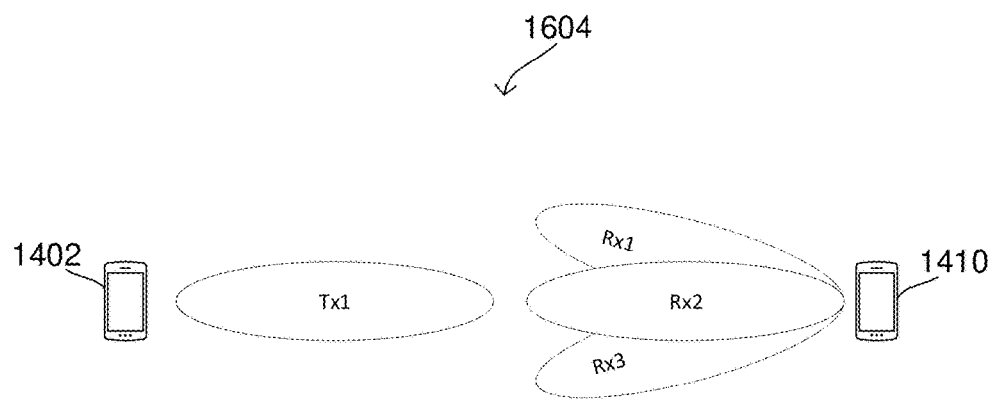
FIG. 16B shows a second stage of dual-directional hierarchical beam acquisition for autonomous peer-to-peer beam acquisition in accordance with various aspects.

FIG. 16B illustrates a second stage 1604 of the autonomous beam acquisition. At stage 1604, wireless devices 1402 and 1410 may switch transmitter and receiver roles and wireless device 1402 may control its antenna arrangement to generate and steer a transmit beam (Tx1 in FIG. 16B) with a narrower beam width (k=1) within spatial coverage of the previously selected receive beam (Rx2 in FIG. 16A) of best reception quality. In other words, the beamforming controller of wireless device 1402 may be configured to adjust the transmit antenna configuration for steering the beam (Tx1 in FIG. 16B) for data transmission towards the at least one further wireless device (wireless device 1410) with a smaller width than the width of the beam for transmission of the control information (width of Tx1 in FIG. 16A).

A difference in beam width between stage 1602 and 1604 may be a predefined value stored at each wireless device. Wireless device 1402 may use transmit beam Tx1 for repeatedly transmitting preambles towards wireless device 1410 to be used for signal quality measurements at wireless device 1410. Having assumed the receiver role at stage 1604, wireless device 1410 may sweep through candidate receive beams (Rx1 to Rx3 in FIG. 16B) within spatial coverage of its previous transmit beam (Tx1 in FIG. 16A) using a narrower beam width (k=1). Wireless device may perform signal quality measurements for each receive beam Rx1 to Rx3 and may select the receive beam with best reception measurement quality (beam Rx2 in FIG. 16B) at stage 1602.

Figure 17A:
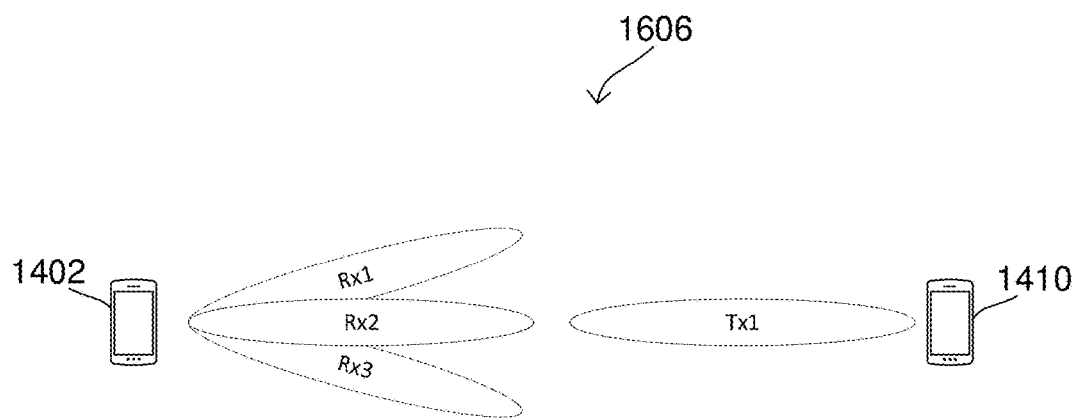
FIG. 17A shows a third stage of dual-directional hierarchical beam acquisition for autonomous peer-to-peer beam acquisition in accordance with various aspects.

FIG. 17A illustrates a third stage 1606 of the autonomous beam acquisition. At stage 1606, wireless device 1402 and 1410 may again switch transmitter and receiver roles and wireless device 1410 may control its antenna arrangement to generate and steer a transmit beam (Tx1 in FIG. 17A) with a narrower beam width (k=2) within spatial coverage of previous selected receive beam of best reception quality (beam Rx2 in FIG. 16B). Wireless device 1410 may repeatedly transmit a preamble for signal quality measurements towards wireless device 1402 using said transmit beam Tx1 at stage 1606. Wireless device 1402 may sweep through different candidate receive beams (Rx1 to Rx3 in FIG. 17A) with narrower beam width and within spatial coverage of the previous transmit beam (Tx1 of FIG. 16B). Wireless device 1402 may perform signal quality measurements for each receive beam Rx1 to Rx3 and may select the receive beam with best measurement quality (Rx2 in FIG. 17A).

Figure 17B:
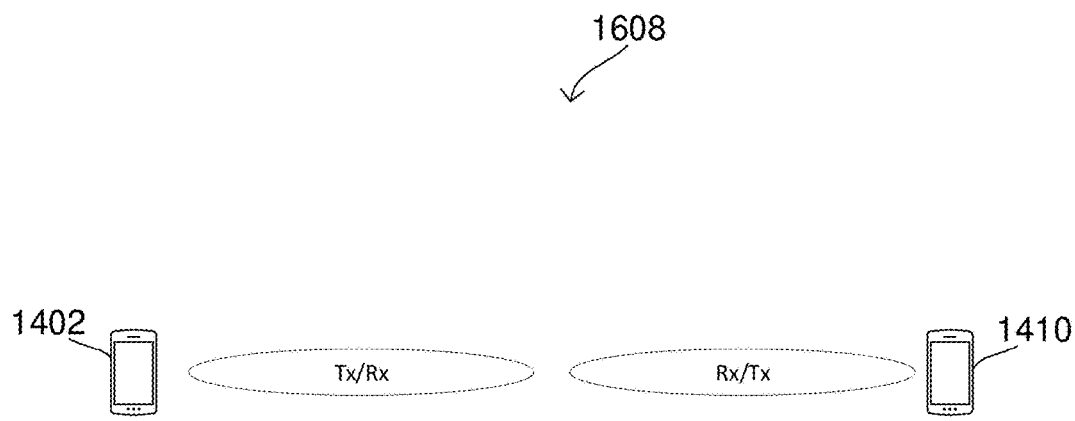
FIG. 17B shows a fourth stage of dual-directional hierarchical beam acquisition for autonomous peer-to-peer beam acquisition in accordance with various aspects.

As illustrated in FIG. 17B, wireless device 1402 may then use transmit/receive beams for data (payload data) transmission to and from wireless device 1410 at stage 1608 corresponding to the receive beam Rx2 selected at stage 1606. In turn, wireless device 1410 may use transmit/receive beams for data (payload data) transmission to and from wireless device 1402 at stage 1608 corresponding to the transmit beam Tx1 used for preamble transmission at stage 1408.

Thus, iteratively performing signal quality measurements sweeping through receive beams of decreasing beam width based on repeatedly transmitted preambles may enable autonomous beam acquisition yielding matched narrow beams for data transmission between wireless device within a D2D mesh network. The autonomous beam acquisition may be performed between pairs of mesh network nodes (wireless devices) which may be peers for mutual data communication, or where one or both mesh network nodes are relays for data communication, while for example higher layer control e.g. by a centralized base station for controlling beam direction and width is not necessary. In other words, employing such autonomous beam acquisition may reduce or avoid corresponding higher layer signaling overhead.

While FIGS. 16A to 17B exemplarily illustrate beam acquisition with three iterations using respective beam sweeping stages sweeping through three receive beams, different numbers of iterations and receive beams may be employed. In accordance with certain aspects, iterations may be terminated when the selected RX beam quality is higher than a pre-defined threshold. Such threshold may be pre-defined such that a matched and narrow beam pair can be achieved. By employing beam acquisition as hierarchical and iterative beam width adaption both at transmitter and receiver nodes, certain aspects may achieve a fast acquisition speed which may be faster than for example in case of master-slave based acquisition centrally controlled by a base station (e.g. a 5G gNB).

Figure 18:
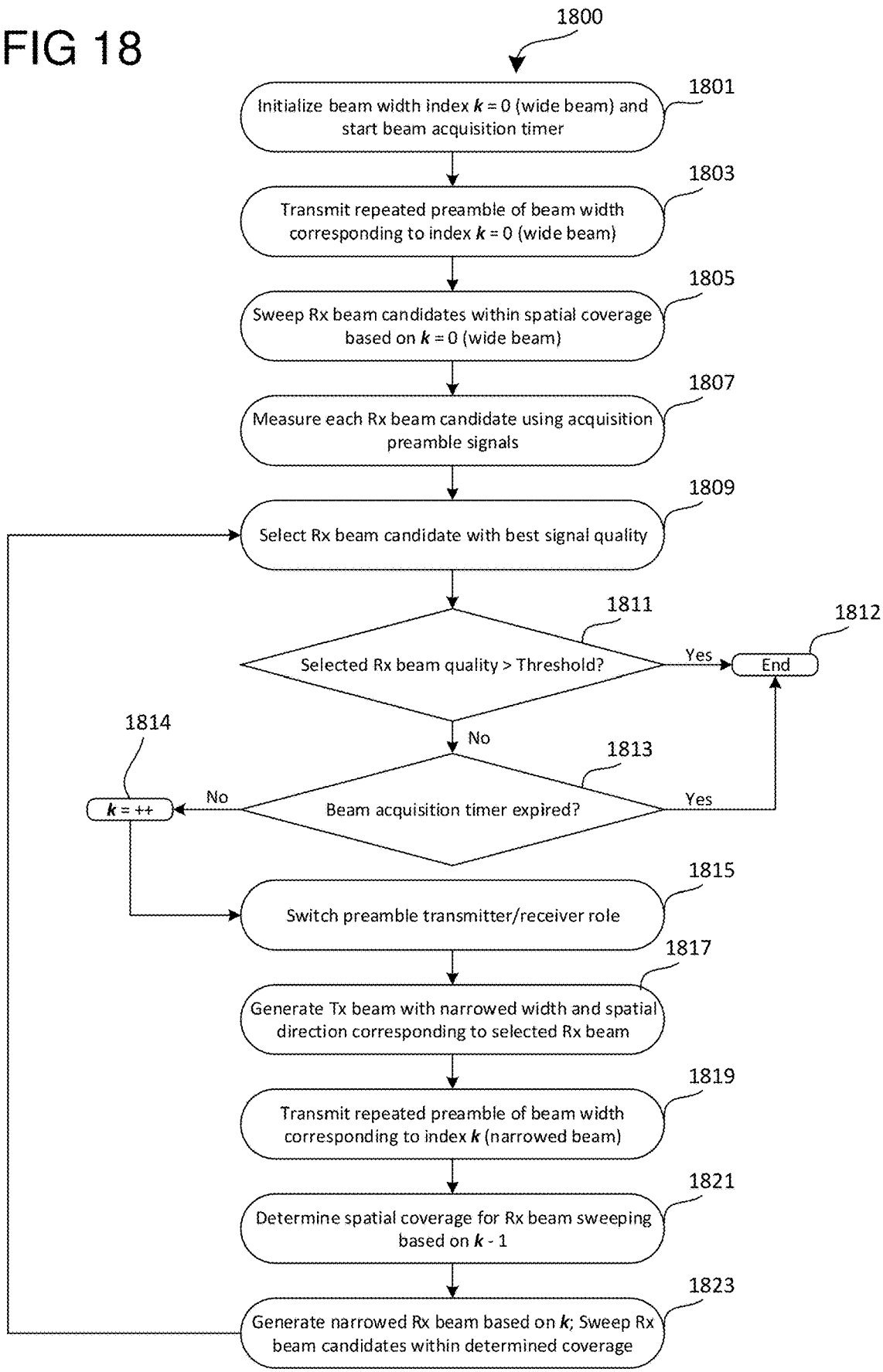
FIG. 18 illustrates an exemplary method that wireless devices may perform upon beam acquisition in accordance with various aspects.

FIG. 18 illustrates exemplary method 1800 that wireless devices 1402 and 1402 may perform upon beam acquisition as illustrated in FIGS. 16A to 17B. In accordance with various aspects, Beam acquisition may be performed for example during synchronization phase 502 where one or more of signals exchanged within method 1800 may be included e.g. in a D2D synchronization signal. Beam acquisition may in accordance with certain aspects be performed alternatively or in addition during mesh establishment phase 506 and or during discovery phase 504 shown in FIG. 5, and/or during any mesh update phase such as mesh update phases 510, 514 shown in FIG. 5. In accordance with various aspects, beam acquisition may be performed at any stage when two mesh network nodes (a wireless device and at least one further wireless device) establish a direct device-to-device (D2D) communication link. The iterative method 1800 as shown in FIG. 18 may in accordance with various aspects be implemented at the physical layer (e.g. at baseband modem 1506) of each wireless device configured to be part of a D2D mesh network. In particular control of width and direction of beams may be implemented at the physical layer (e.g. at baseband modem 1506) in accordance with various aspects. Beam steering may in accordance with various aspects be implemented in RF transceiver 1504 controlling an antenna arrangement included in antenna system 1501. While the exact order and number of shown stages of method 1800 is chosen for illustrative purposes, method 1800 may include additional or less stages as compared to the one shown in FIG. 18. The exact order of stages 1801 to 1823 may in certain aspects be adapted in accordance with given requirements.

As illustrated in FIG. 18, method 1800 may start at stage 1801 by initiating beam width index k=0 corresponding to an initially wide beam which may become gradually narrower for larger values of k. In accordance with various aspects, each wireless device implementing method 1800 may be configured to start a beam acquisition timer. The beam acquisition timer may be used to time-out a non-successful beam acquisition procedure. At stage 1803, the wireless device initially having the preamble transmitter role (e.g. wireless device 1410 of FIG. 16A) may control its antenna arrangement to generate and steer a beam with wide width corresponding to index k=0. Using this transmit beam (transmit antenna configuration of the antenna arrangement for steering a beam for data transmission), the wireless device may start repeated transmission of beam acquisition preambles. At stage 1805, the wireless device having the preamble transmitter role (e.g. wireless device 1402 of FIG. 16A) may control its antenna arrangement to sweep receive beam candidates (candidate receive antenna configurations of the antenna arrangement) within a spatial coverage corresponding to index k=0. At this stage, beam candidates may be swept within a spatial coverage corresponding to a spatial coverage of the transmitting device's transmit beam corresponding to k=0. While sweeping through candidate beams, the receiving wireless device may measure signal quality of the received preambles for each swept beam candidate at stage 1807 and may select a beam candidate with best signal quality at stage 1809.

In accordance with various aspects, the receiving wireless device may be configured to compare said best signal quality to a predefined threshold at stage 1811. Said threshold may in accordance with various aspects be set in correspondence to a matched and narrow beam pair. Such threshold may in accordance with certain aspects be determined in advance e.g. via test measurements. As illustrated, in case the signal quality is equal to or above said threshold, method 1800 ends at stage 1812, whereby the receiving wireless device (e.g. wireless device 1402 in FIG. 16A) may be configured to transmit an acquisition confirmation message to the wireless device transmitting the repeated preambles (e.g. the wireless device 1410 in FIG. 16A) to end the beam acquisition. In accordance with various aspects, the receiving wireless device (e.g. wireless device 1402 in FIG. 16A) may be configured to transmit the acquisition confirmation message so as to inform the wireless device transmitting the repeated preambles (e.g. the wireless device 1410 in FIG. 16A) to terminate the acquisition procedure. In accordance with certain aspects, this message can be carried within a D2D synchronization preamble signal.

If the signal quality is not above the threshold, the wireless devices may be configured to determine if the beam acquisition timer has expired at stage 1813. If the beam acquisition timer has expired, the wireless device (e.g. the receiving wireless device 1402 in FIG. 16A) may in accordance with certain aspects be configured to end beam acquisition without sending a confirmation message to the wireless device transmitting the repeated preambles (e.g. the wireless device 1410 in FIG. 16A). In certain aspects, since both wireless devices executing method 1800 may be configured to start the beam acquisition timer at stage 1801 upon initiating beam acquisition, the presently preamble transmitting wireless device (e.g. the wireless device 1410 in FIG. 16A) may similarly be configured to determine if the beam acquisition timer has expired at stage 1813 and may similarly be configured to end method 1800 if said beam acquisition timer has expired.

If the beam acquisition timer has not expired, the receiving wireless device may proceed to stage 1814 and may increment the value of the beam width index (k=++) corresponding to a narrower beam width. In accordance with various aspects, the receiving wireless device may transmit a corresponding message to the transmitting wireless device at stage 1814 accordingly informing the transmitting wireless device. At stage 1815, the wireless devices may exchange the roles of beam acquisition preamble transmitter/receiver (e.g. as upon transition from FIG. 16A to FIG. 16B) and the new transmitting wireless device (e.g. wireless device 1402 in FIG. 16B) may control its antenna arrangement at stage 1817 to generate and steer a transmit beam with narrowed beam width (corresponding to the new k value) within the spatial direction corresponding to the receive beam selected at stage 1809. Using this transmit beam, the transmitting wireless device may start repeated transmission of beam acquisition preambles at stage 1819.

At stage 1821, (e.g. based on the message received at stage 1814), the new receiving wireless device (e.g. wireless device 1410 of FIG. 16B) may determine a spatial coverage for receive beam sweeping based on the previous beam width index (i.e. the current k value after incrementing at stage 1814 reduced by one). Based thereon, the new receiving wireless device may control its antenna arrangement at stage 1823 to generate receive beams with reduced beam width (corresponding to the current value of k as incremented at stage 1814) and may sweep receive beam candidates within the coverage determined at stage 1821. The method may then proceed again to stage 1809, where the new receiving wireless device (e.g. wireless device 1410 in FIG. 16B) may determine a receive beam candidate with best signal quality of the received beam acquisition preamble and may compare this best signal quality to the predefined threshold at stage 1811. The method may continue until one of the wireless devices participating at the beam acquisition determines the best signal quality to be above said threshold. The wireless devices (e.g. wireless devices 1402, 1410 in FIG. 17B) may then use the determined narrow beams for communication of payload data.

In accordance with various aspects, autonomous beam acquisition between pairs of wireless devices may be employed as part of an uncoordinated multiple access scheme. In accordance with various aspects, wireless devices may perform peer-to-peer communications without coordination support from a scheduling entity (such as a base station), for example when the wireless devices operate a mesh network outside of coverage of a cellular network. In accordance with such aspects, a communication link between any two nodes (wireless devices) may be established employing a random access scheme. An exemplary random access scheme that may be employed is a Slotted Aloha scheme. In accordance with random access schemes that may be employed in accordance with certain aspects, wireless devices may switch randomly between transmission and receiving roles until they rendezvous with a peer (a wireless device).

Figure 19:
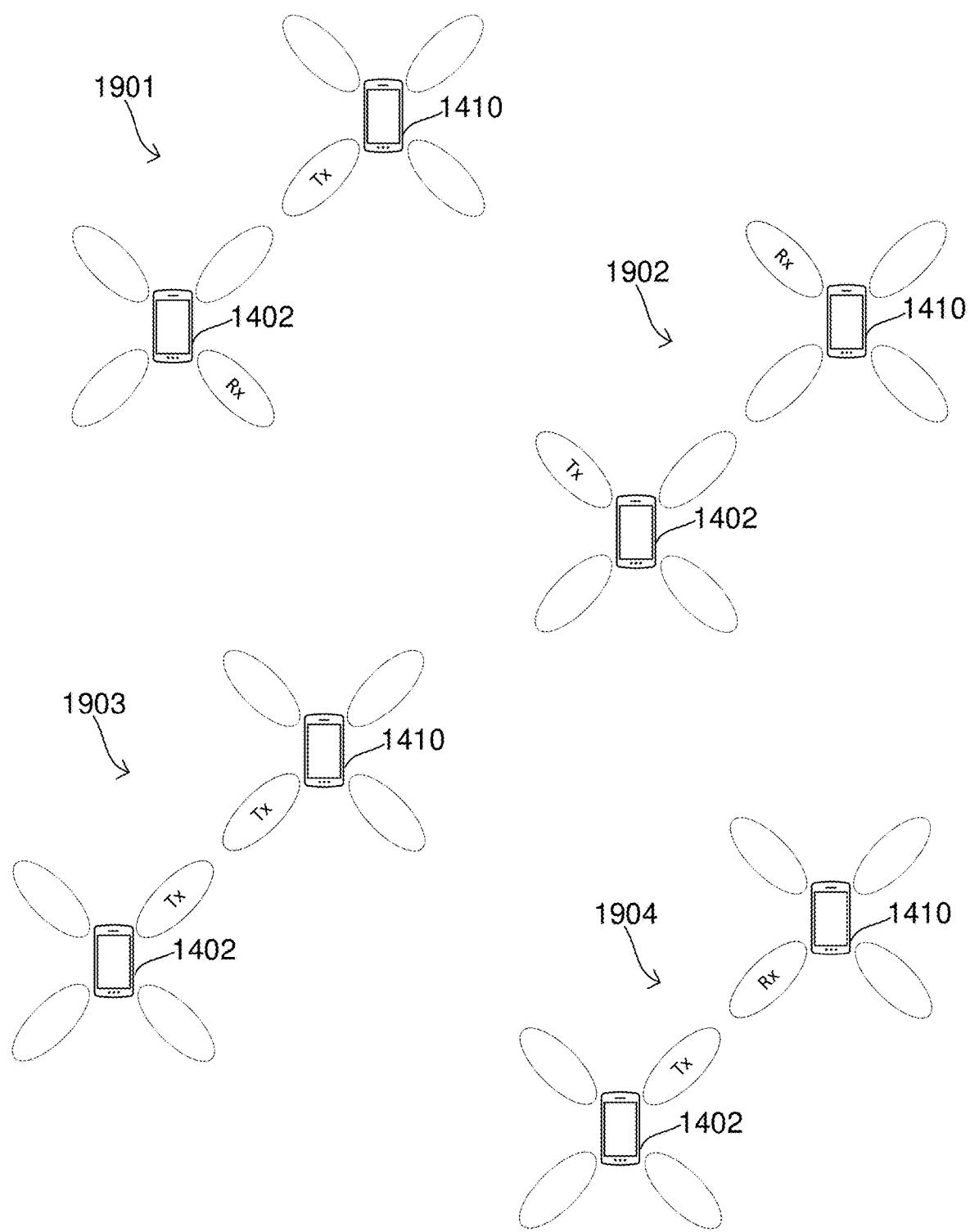
FIG. 19 exemplarily illustrates a rendezvous of wireless devices in accordance with various aspects.

FIG. 19 exemplarily illustrates a rendezvous of wireless devices 1402 and 1410. At stage 1901, wireless device 1402 assumes a receiver role using the illustrated receive beam Rx and wireless device 1410 assumes a transmitter role using the illustrated transmit beam Tx. At stage 1902, wireless device 1402 assumes a transmitter role using the shown transmit beam Tx and wireless device 1410 assumes a receiver role using the shown receive beam Rx. At stage 1903, both wireless devices 1402 and 1410 assume a transmitter role using the shown transmit beams Tx. At stage 1904 wireless devices 1402 and 1410 rendezvous using matching transmit and receive beams Tx and Rx.

Thus, in accordance with certain aspects, before a receiver of a wireless device (e.g. wireless device 1402 in FIG. 16A) may receive the control information (at stage 1805 in FIG. 18 transmitted at stage 1803 in FIG. 18) from the at least one further wireless device (e.g. wireless device 1410 in FIG. 16A), a communication processor of a corresponding wireless device (wireless device 1402 in FIG. 16A) is configured to establish a direct device-to-device communication link with the at least one further wireless device wireless (device 1410 in FIG. 16A). Thereby, the beamforming controller of the wireless device may be configured to control the antenna arrangement to periodically switch between receive antenna configurations (e.g. "Rx" of wireless device 1410 in FIG. 19) for receiving periodic control information including information for identifying the at least one further wireless device (e.g. wireless device 1402) in different spatial directions, wherein the beamforming controller of the wireless device may be configured to control the antenna arrangement to periodically switch between transmit antenna configurations (e.g. "Tx" of wireless device 1410 in FIG. 19) for transmitting periodic control information including information for identifying the wireless device (e.g. wireless device 1410) in different spatial directions. Thereby, a communication processor (e.g. of wireless device 1410) may be configured to establish the direct device-to-device communication link with the at least one further wireless device based on the information for identifying the at least one further wireless device.

In accordance with various aspects, it may be possible to control a duration of a rendezvous period by controlling a number of Tx and Rx candidates (illustrated with dashed lines in FIGS. 19 and 20) and by controlling how often wireless devices switch between receiver and transmitter roles. In accordance with certain aspects, it may be possible to shorten a rendezvous period by assigning specific access patterns to each wireless device. In other words, it may be possible to employ predefined access patterns (beam patterns) to allow for a "smarter" search of peers. In accordance with further aspects, user specific quasi-orthogonal or orthogonal preamble signals may be employed which may enable a receiver to discover a general direction of a number of peers.

Figure 20:
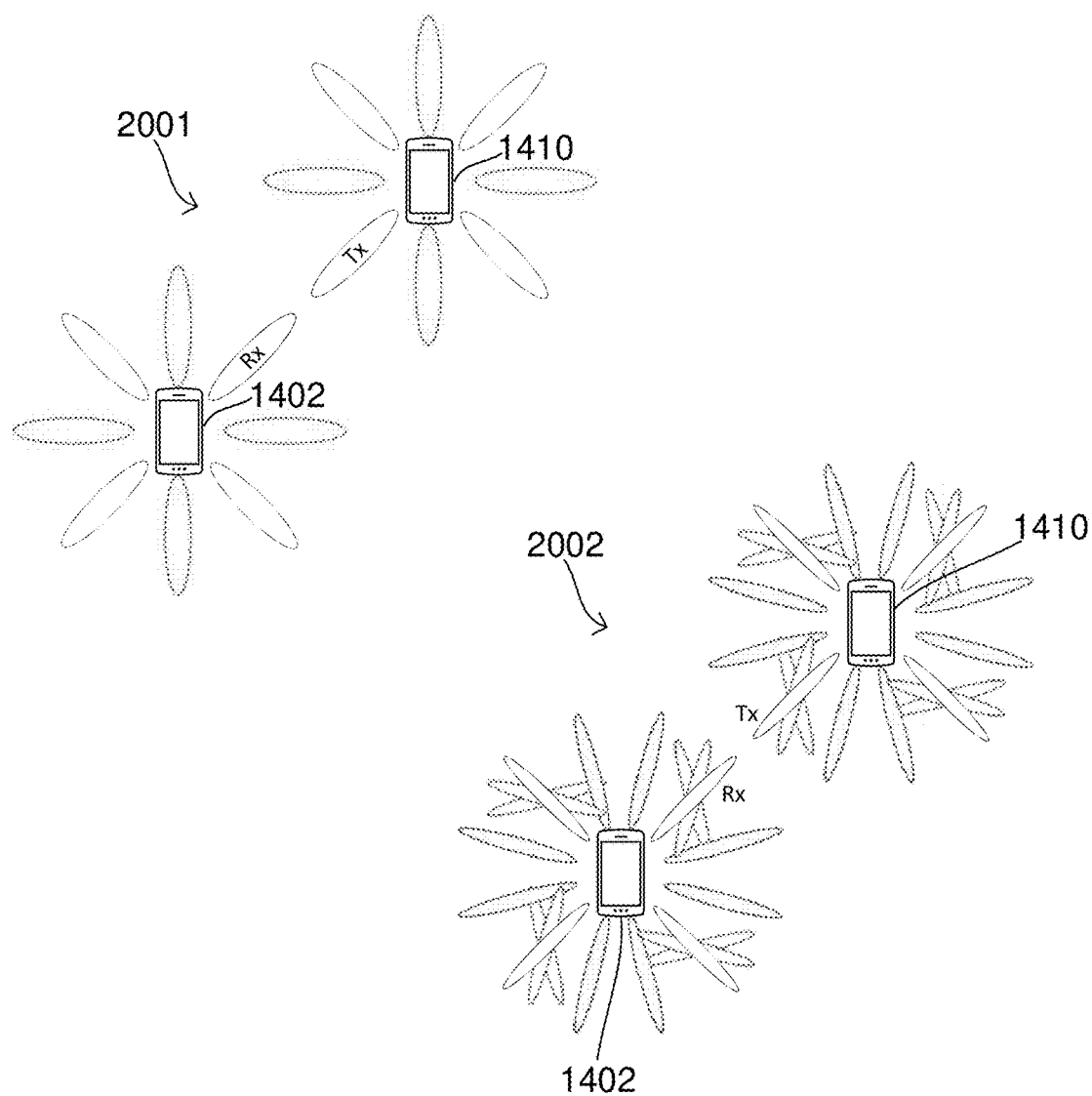
FIG. 20 exemplarily illustrates beam tuning via beam acquisition for wireless devices in accordance with various aspects.

Having performed a rendezvous as illustrated at stage 1904 of FIG. 19, wireless devices 1402 and 1410 may then be able to tune the respective transmit and receive beams e.g. employing a beam acquisition scheme in accordance with FIGS. 16A to 17B. FIG. 20 exemplarily illustrates beam tuning via beam acquisition for wireless devices 1402 and 1410 in accordance with certain aspects. As illustrated, at stage 2001, wireless device 1402 assumes a receiver role with a receive beam Rx narrowed as compared to stage 1904 of FIG. 19 (for example with beam width index k=1 changed from k=0 at stage 1904) while wireless device 1410 assumes a corresponding transmitter role with a narrowed transmit beam Tx. FIG. 20 exemplarily shows further stage 2002 with further narrowed transmit and receive beams Tx, Rx, e.g. for beam width index k=2.

Figure 21:
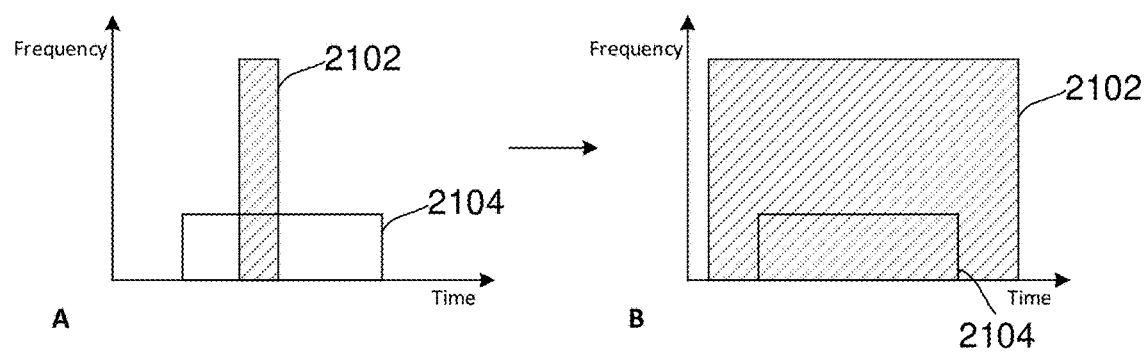
FIG. 21 exemplarily illustrates interleaving in time domain in accordance with various aspects.

Various aspects of the present disclosure may employ interleaving configurations taking into account dynamics of a D2D mesh network. Interleaving configurations in accordance with various aspects may employ interleaving in time domain, frequency domain and/or spatial domain. FIG. 21 exemplarily illustrates interleaving in time domain in accordance with various aspects. As illustrated in the left part of FIG. 21 (part A), an interfering event (or signal loss event) 2104 may be of longer duration as a data signal 2102. Examples of such interfering events in case of D2D mesh networks may include intra-flow interference (interference caused by part of a relayed flow on another part of a relayed flow), extra-flow interference (interference between different data flows within the mesh network), shadowing, or loss of connection due to different reasons such as fading-in. In accordance with various aspects, a wireless device may be configured to estimate a duration of such interfering events. For example, a wireless device may be configured to observe interfering events and to estimate characteristics such as periodicity and duration e.g. based on observed statistics. A wireless device may initially employ an intermediate interference length which may then be dynamically adapted based on signal measurements of the wireless device. Based on such estimated temporal characteristics of the interference events, a wireless device may be configured to dynamically choose a suitable interleaving size such that data is spread over a longer time period as compared to the duration of the interference/loss-of-signal event. The wireless device may further be configured to assign a channel code to the interleaved signal to be used for decoding the signal at the receiver.

Referring back to FIG. 21, having estimated temporal characteristics of the interfering signal 2104 in part A of FIG. 21, the data signal 2102 is spread over a longer period in time as illustrated in part B of FIG. 21. By interleaving data bits and thus increasing temporal diversity of the data signal, link robustness can be increased. As can be taken from FIG. 21, an interleaving length may in accordance with various aspects be dynamically adapted to a temporal duration of the interfering event. In other words, an interleaving duration may be longer for a longer interfering event and may be shorter for a shorter interfering event.

In addition to time interleaving as illustrated in FIG. 21, various aspects of the present disclosure may employ dynamically adapted interleaving in frequency domain. For example, if a data signal varies over frequency and if selective (narrow band) interference events occur, in analogy to the temporal case shown in FIG. 21, a frequency band width may be chosen over which the signal is interleaved. A suitable interleaving pattern may be taken from a predefined interleaving codebook or may be created dynamically, e.g. by creating a (pseudo-)randomized distribution of bits across the available bandwidth.

Figure 22:
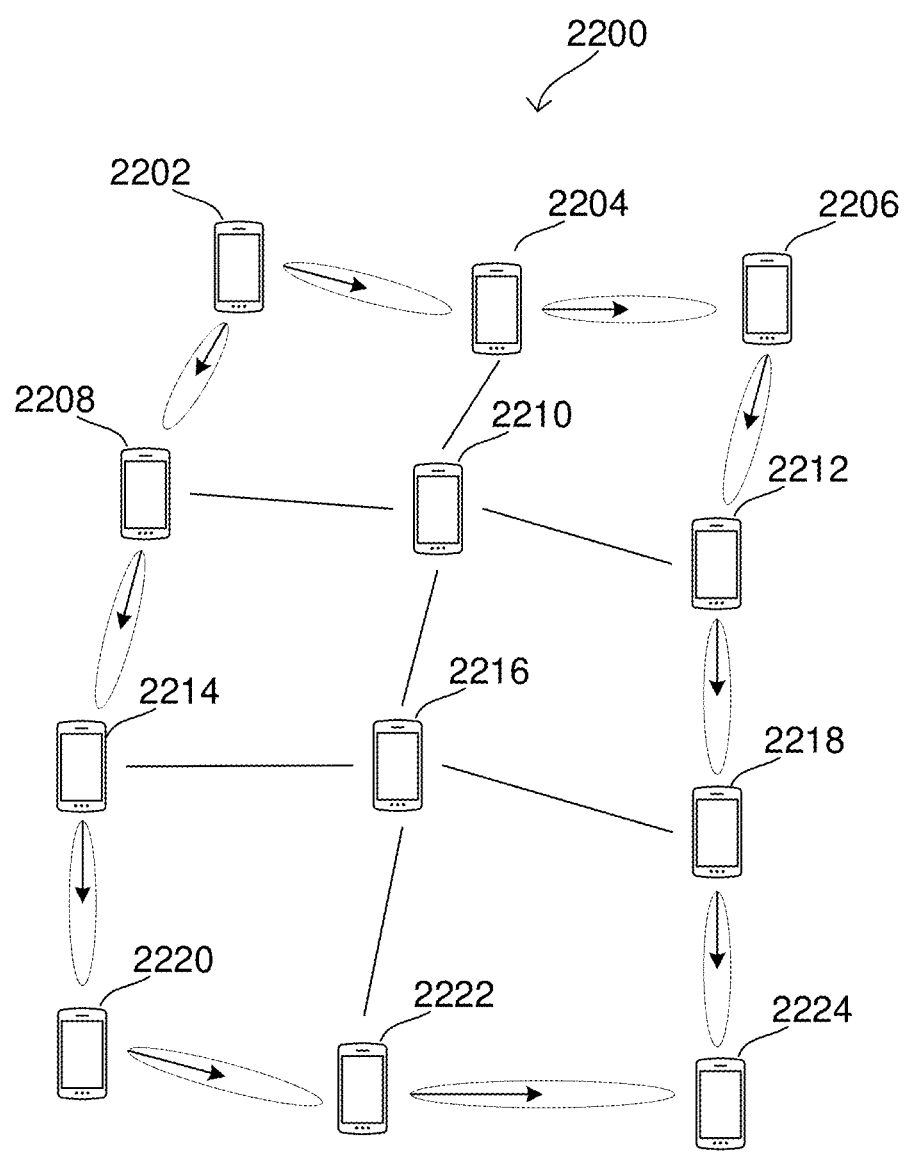
FIG. 22 exemplarily illustrates interleaving in spatial domain in accordance with various aspects.

In addition to time and/or frequency interleaving, various aspects of the present disclosure may employ interleaving in spatial domain. FIG. 22 exemplarily illustrates dynamic interleaving in spatial domain employed D2D mesh network 2200 including exemplary wireless devices 2202, 2204, 2206, 2208, 2210, 2212, 2214, 2216, 2218, 2220, 2222 and 2224. As shown in FIG. 22, a transmission flow from wireless device 2202 to wireless device 2224 is split into two branches, one branch relayed by wireless devices 2208, 2214, 2220 and 2222, the other branch relayed by wireless devices 2204, 2206, 2212 and 2218. While FIG. 22 may exemplarily show such two branches, a communication flow may be split over further branches using different relaying nodes.

In accordance with various aspects, a corresponding interleaving pattern may be taken from a predefined codebook. In accordance with further aspects, a number of beams used at each relaying device via which the data flow is split may be dynamically changed. For example, separate beams may be combined into a single beam and/or single beams may be split up into multiple independent beams in order to adapt a number of interleaving opportunities. As thus communication from wireless device 1402 to wireless device 1424 may be split over two different routes, routing diversity can be created such that one redundant portion of the data flow may be transmitted via one route while the other redundant portion may be transmitted via the other route to exploit spatial diversity. In this way link robustness can be increased as e.g. an effect of interfering events occurring at one route may be mitigated based on the redundant portion of the data transmitted over the other route not being affected by the interfering event.

In accordance with various aspects, control of interleaving in time, frequency and/or spatial domain may be performed by each wireless device. Each wireless device may be configured to estimate e.g. a temporal characteristic of an interfering event and may be configured to control a time over which an interleaved data signal is accordingly spread. In alternative aspects, control of interleaving in time domain, frequency domain and/or spatial domain may be negotiated between wireless devices forming peers for communication. In further alternative aspects, control of interleaving in time domain, frequency domain and/or spatial domain may be performed via a wireless device assuming a master role or via a centralized base station of a wireless communication network, e.g. in case of control and data plane separation. Further, in accordance with certain aspects, for example when the source of interference is part of a communication network, information of such interference may be communicated as a priori information from a node (e.g. a base station) of the network to a wireless device included in the D2D mesh network.

Device-to-Device (D2D) based wireless mesh networks may provide flexible resource allocation, flexible D2D link adaption, and improved spectrum utilization without a need for centralized base stations. By being configured for beamforming, wireless devices within a D2D mesh network in accordance with certain aspects may be able to establish direct communication links with one or more further wireless devices within the D2D mesh network even in dense deployment scenarios where nodes of a different mesh network incapable of beamforming may experience high interference. However, the advantageous effects that in certain aspects may be achievable by configuring wireless devices for beamforming may be deteriorated when beams steered along a direct path from a wireless device to a further wireless device are blocked, attenuated and/or deteriorated by beam impairments such as beam blockers (e.g. buildings, walls, hills, groups of trees, etc.) or active interferers (such as network access points operating at a similar frequency range, e.g. partially or fully overlapping with a frequency range used by the wireless devices of the D2D mesh network for signal transmission/reception, e.g. Wireless Local Area Network access points). In view of this, various aspects of the present disclosure aim at further improving communications, for example link robustness, e.g. within a D2D mesh network.

In accordance with various aspects of the present disclosure, wireless devices, e.g. included in a D2D mesh network are configured to employ adaptive beamforming, whereby data transmission beams steered from a wireless device to one or more further wireless devices are spatially adapted based on geographical information. In certain aspects, such geographical information may be information managed by a Beamforming Assistant Geographical Information System (BA-GIS). In accordance with certain aspects, said geographical information may include or correspond to the connectivity map.

The geographical information may in accordance with certain aspects be a superposition of first map data and second map data. The first map data may include position information (e.g. geographical coordinates) of wireless devices included in a D2D mesh network and may thus for example be dynamic data which may be updated (e.g. periodically) to reflect e.g. movement of the wireless devices. As an illustrative example, the first map data may periodically be updated with a periodicity being on the order of 1 second, whereby such periodicity may be dynamically adapted for example in accordance with a number of wireless devices included in the D2D mesh network (e.g. a shorter periodicity for a larger number of wireless devices). Further, a periodicity (or rate) of updates may be dynamically adapted for each wireless device in accordance with a speed of the wireless device (e.g. an update rate being higher for a higher speed of the wireless device).

In certain aspects, the first map data may correspond to, be included in, or include the connectivity map. To enable such update functionality, in certain aspects, a wireless device may comprise a receiver configured to receive at least part (e.g. coordinate positions of wireless devices which have changed since a last reception of part of the first map data) of the first map data. Such updates may be distributed within a decentralized D2D mesh network from mesh network node to mesh network node. In other words, in certain aspects, the receiver of the wireless device may be configured to receive the at least part of the first map data from at least one further wireless device. Alternatively or in addition, the receiver may be configured to receive the at least part of the first map data from a wireless coordinator device (e.g. a base station, a Road Side Unit, or a selected wireless device included in the D2D mesh network).

The second map data may include position information (e.g. coordinates) of beam impairments and may thus be referred to as Beam Impairment Map (BIM). Thereby, the second map data may include a static portion including position information of static beam impairments such as walls, buildings, hills, groups of trees, etc. The static portion of the second map data may in certain aspects be pre-installed on a wireless device and may in certain aspects be subject to semi-static updates, e.g. software updates initiated by a user when needed and/or when available. For example, a user may update a corresponding wireless device on a regular basis (e.g. daily, weekly, monthly, or per year), when respective updates of the static portion are available.

The second map data may further include a dynamic portion comprising position information of movable beam impairments such as vehicles or temporarily installed facilities such as walls or the like. The dynamic portion of the second map data may thus be updated (e.g. periodically) to reflect movement of such movable beam impairments. As an illustrative example, the dynamic portion of the second map data may periodically be updated with a periodicity being on the order of 20 milliseconds (e.g. in certain aspects shorter than in the case of the first map data, in certain aspects at a periodicity smaller than 1 second). The second map data may in addition or alternatively be aperiodically updated, i.e. event triggered instead of timer triggered. For example, a wireless device may trigger an update of the dynamic portion of the second map data when it detects movement of a beam impairment.

To enable such update functionality, in certain aspects, a wireless device may comprise a receiver configured to receive at least part of the dynamic portion of the second map data, for example position information of at least one movable beam impairment. Again, such information may be shared among nodes of a D2D mesh network such that in certain aspects, the receiver may be configured to receive the position information of the at least one movable beam impairment from at least one further wireless device. Alternatively or in addition, the receiver may be configured to receive the position information of the at least one movable beam impairment from a wireless coordinator device (e.g. a base station, a Road Side Unit, or a selected wireless device included in the D2D mesh network). In certain aspects, the first map data and the dynamic portion of the second map data may be updated simultaneously.

In other words, the geographic information managed by the BA-GIS may in certain aspects be a superposition of dynamic data (first map data and dynamic portion of the second map data) having comparably small payload and of static data of comparably large payload. The dynamic data of small payload can be updated periodically within the D2D mesh network to reflect and take account of D2D mesh network dynamics while the static portion may be pre-installed on wireless devices within the D2D mesh network. The pre-installed static portion may be semi-statically upgraded e.g. by irregular software updates.

In certain aspects, the BA-GIS may be implemented at one or more wireless devices part of the D2D mesh network (in a decentralized mode) and/or at one or more wireless coordinator devices (in a centralized mode). A wireless coordinator device may in accordance with certain aspects be a (master) wireless device included in the D2D mesh network, a radio base station of a centralized radio communication network, or a road side unit (RSU).

In accordance with various aspects, for example in a decentralized mode, a wireless device may include an antenna arrangement comprising at least two antennas. In certain aspects, a wireless device may be configured to steer a data transmission beam from the wireless device to a further wireless device by setting a Line of Sight (LoS) angle of said data transmission beam based on relative position information between the wireless device and the further wireless device. Said relative position information may be derived from the position of the wireless device and the position of the further wireless device derived from the first map data.

The wireless device may in such aspects further include a geographical information determiner configured to determine a position (e.g. coordinates) of at least one first further wireless device and a position (e.g. coordinates) of at least one second further wireless device based on geographical information. The geographical information determiner may in certain aspects be configured to determine the position of the at least one first further wireless device and the position of the at least one second further wireless device by referring to the first map data comprised by the geographical information, wherein the wireless device may comprise a receiver configured to receive (e.g. periodically) the first map data.

In accordance with various aspects the geographical information determiner may include or correspond to the BA-GIS.

In such aspects, the geographical information determiner may be configured to determine whether a beam impairment is present (whether a beam is impaired) along a direct path from the wireless device to the at least one first further wireless device based on the geographical information. The geographical information determiner may in certain aspects be configured to determine whether the beam impairment is present by referring to the second map data comprised by the geographical information, the second map data comprising position information of one or more beam impairments including the beam impairment. In these aspects, the wireless device may further include a beamforming controller configured to control a transmit antenna configuration of the antenna arrangement to steer a data transmission beam towards the at least one second further wireless device if the geographical information determiner determines a beam impairment to be present (the beam to be impaired) along the direct path from the wireless device to the at least one first further wireless device.

In accordance with various aspects, for example in a centralized mode, a wireless coordinator device may include a geographical information determiner configured to determine a position of at least one wireless device, a position of at least one first further wireless device, a position of at least one second further wireless device, and to determine whether a beam impairment is present along a direct path from the wireless device to the at least one first further wireless device based on the geographical information, which may in accordance with certain aspects include the first map data and the second map data. In these aspects, the wireless coordinator device may include a transmitter configured to transmit control information to the wireless device for controlling the wireless device to steer a data transmission beam towards the at least one second further wireless device if the geographical information determiner determines a beam impairment to be present along the direct path from the wireless device to the at least one first further wireless device.

In certain aspects, such control information may for example include geographic data relating to one or more valid paths, i.e. direct paths from the wireless device to the at least second further wireless device which do not include a beam impairment. In certain aspects, such control information may include in addition or alternatively control data to be used by the wireless device for controlling its antenna arrangement to steer a data transmission beam towards the at least one second further wireless device. For example, such control data may include one or more codewords that may be used by the wireless device for selecting a corresponding transmit antenna configuration of the antenna arrangement based on a codebook shared at least between the wireless coordinator device and the wireless device. In certain aspects, such control may include for example identification information of the second further wireless device, geographic information of the second further wireless device. Where in certain aspects wireless devices may be configured to operate in different frequency bands, the control information may include an operating frequency band of the second further wireless device.

As mentioned, position information of wireless devices included in the D2D mesh network and position information of movable beam impairments may be dynamic and may be updated to reflect the movement. Thus, in accordance with various aspects, a receiver of a wireless device implementing the BA-GIS (a wireless device in a decentralized mode or a wireless coordinator device in a centralized mode) may be configured to receive at least part of the first map data (e.g. updates to the first data) and/or the dynamic portion of the second map data. In other words, in accordance with various aspects, a wireless device implementing a BA-GIS may be configured to collect and update position information of further wireless devices within the wireless D2D mesh network (first map data). Such information may be exploited to derive a Line of Sight (LoS) angle between a wireless device (transmitting device) and at least one further wireless device (receiving device). Such LoS angle may correspond to an optimized spatial propagation path for beamforming, without considering the signal blockers.

In various aspects, a wireless device implementing the BA-GIS (a wireless device in a decentralized mode or a wireless coordinator device in a centralized mode) may be configured to store the second map data (the Beam Impairment Map, BIM), including position information of beam signal blockers or active interferers. A static portion of the second map data may be pre-stored at the wireless device while a dynamic portion thereof may be subject to updates. In certain aspects, based on the second map data, the geographical information determiner may be configured to null candidate spatial propagation paths which include beam impairments. In certain aspects, it may thus become possible to avoid data transmission along paths including beam impairments and thus to transmit data from a source wireless device to a target wireless device potentially along a relayed path (e.g. including multiple hops) within the D2D mesh network around such beam impairment. As a result, it may in certain aspects become possible to improve robustness e.g. of a link between such source wireless device to such target wireless device by avoiding beam impairments, while beamforming may contribute to avoidance of interference.

Figure 23A:
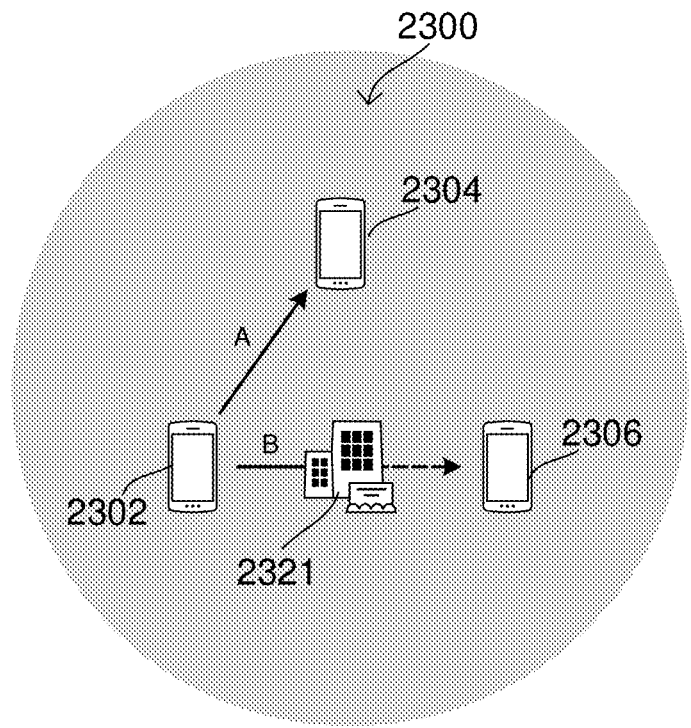
FIG. 23A shows an illustrative example of geographic information aware adaptive beam steering according to some aspects.
Figure 23B:
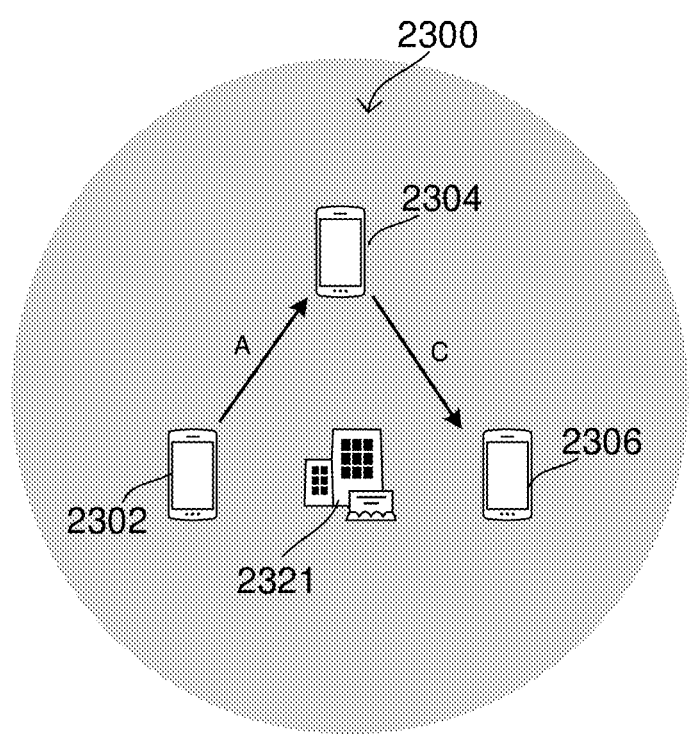
FIG. 23B shows an illustrative example of geographic information aware adaptive beam steering according to some aspects.
Figure 23C:
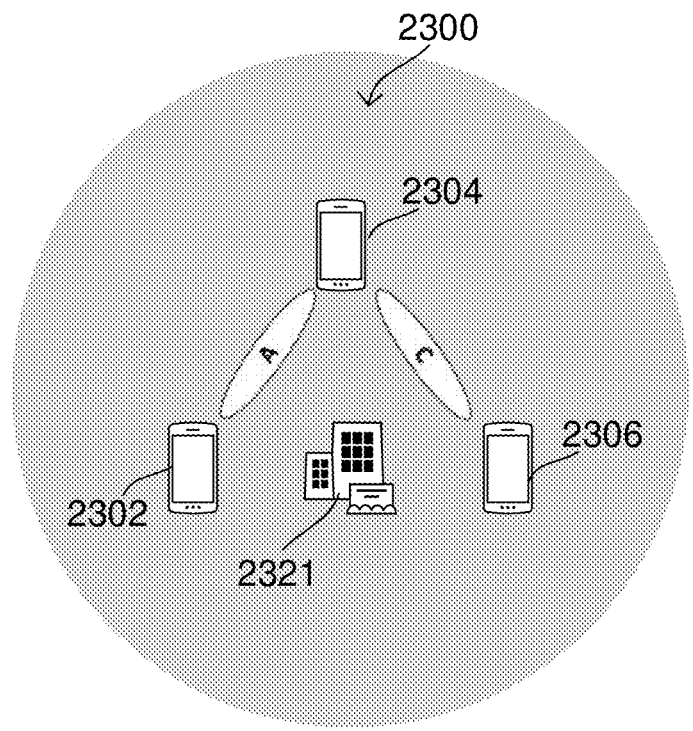
FIG. 23C shows an illustrative example of geographic information aware adaptive beam steering according to some aspects.
Figure 23D:
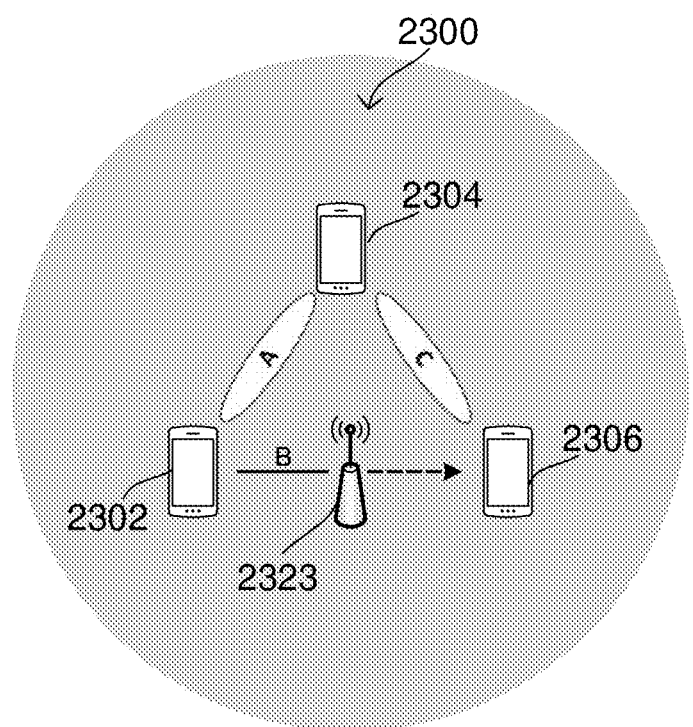
FIG. 23D shows an illustrative example of geographic information aware adaptive beam steering according to some aspects.

FIGS. 23A to 23D show an illustrative example of geographic information aware adaptive beam steering in accordance with certain aspects of the present disclosure. FIG. 23A exemplarily shows D2D mesh network 2300 including wireless devices 2302, 2304 and 2306. FIG. 23A further exemplarily illustrates beam impairment 2321, which in the example case is a building. FIG. 23D exemplarily illustrates an alternative beam impairment 2323, which in the case of FIG. 23D is a wireless access point, e.g. a Wireless Local Area Network (WLAN) access point. In other words, in certain aspects, a beam impairment may include a signal attenuator or blocker and/or an active source for interfering signals.

In the exemplary case, wireless device 2302 may be a source for a data (e.g. payload data) transmission to wireless device 2306 (a target wireless device). Further, in the example case, wireless device 2302 may implement the BA-GIS. In accordance with alternative aspects, the BA-GIS may be implemented alternatively or in addition at each of wireless devices 2304 and 2306 and/or at a wireless coordinator device (not illustrated in the figure). In the shown example, based on the first map data, wireless device 2302 may be configured to extract positions of wireless devices 2304 and 2306 and may be further configured to calculate a LoS angle to wireless device 2304 (along path A in FIG. 23A) and a LoS angle to wireless device 2306 (along path B in FIG. 23A). Based on the calculated LoS angles, the wireless device 2302 may evaluate direct spatial propagation paths in directions of the calculated LoS angles regarding presence of beam impairments by referring to the second map data (the BIM). To this end, in certain aspects, the geographical information determiner of wireless 2302 which implements the BA-GIS may for example be configured to compare position information of a direct path from the wireless device 2302 to any one of wireless devices 2304, 2306 with position information of beam impairments included in the second map data.

As illustrated in FIG. 23A, signal blocker 2321 is present on the direct path B from wireless device 2302 (a wireless device) to wireless device 2306 (a first further wireless device) while no beam impairment is present on the direct path A from wireless device 2302 (a wireless device) to wireless device 2304 (a second further wireless device). In accordance with certain aspects, wireless device 2302 may thus be configured to null candidate path B and select candidate path A. As thus, no direct path without beam impairment exists from the source wireless device 2302 to the target wireless device 2306, a communication processor of wireless device 2302 may be configured to derive a relayed path from the source wireless device to the target wireless device, e.g. based on the first map data. As illustrated in FIG. 23B, the communication processor of wireless device 2302 thus derives a relayed multi-hop path from wireless device 2302 to wireless device 2304 (relaying device) and from wireless device 2304 to wireless device 2306. This path includes the already selected sub-path from wireless device 2302 to wireless device 2304 which does not include a beam impairment. By comparing a direct path (path C in FIG. 23B) from wireless device 2304 to wireless device 2306 (based on the first map data) with the second map data (the BIM), the geographical information determiner of wireless device 2302 may determine said direct path C to be free of beam impairments.

In accordance with various aspects, the communication processor of wireless device 2302 may thus be configured to generate data to be transmitted (transmission data) with the data transmission beam to wireless device 2304 (the at least one second further wireless device) to be relayed by wireless device 2304 (for relay transmission) to wireless device 2306 (the target wireless device). To this end, in certain aspects, the communication processor of wireless device 2302 may be configured to generate identification information of wireless device 2306 corresponding to the data to be transmitted by the data transmission beam to wireless device 2304 to identify wireless device 2306 as target wireless device. The identification information may be transmitted to wireless device 2304 separately (in a not shown, e.g. non-beamformed, beam) or included in the data transmission beam. Based on the identification information, a beamforming controller of wireless device 2304 may thus control an antenna arrangement of wireless device 2304 to steer a data transmission beam for relaying the data from wireless device 2302 to wireless device 2306.

FIG. 23C exemplarily illustrates the data transmission beams steered from wireless device 2302 to wireless device 2304 (beam A in FIG. 23C) and from wireless device 2304 to wireless device 2306 (beam B in FIG. 23C). As can be taken from FIGS. 23A to 23C, by employing beam steering taking into account geographic information including position information of beam impairments, it may become possible to transmit data from a source wireless device to a target wireless device along paths free of interference and beam impairments.

As mentioned, FIG. 23D exemplarily illustrates an alternative beam impairment 2323, which in the case of FIG. 23D is a wireless access point, e.g. a Wireless Local Area Network (WLAN) access point. Thus, in accordance with various aspects, in addition to beam blockers (such as walls, buildings, hills, groups of trees, etc.) suitable to block or attenuate a data transmission beam from a wireless device to a further wireless device, beam impairments may include active sources of signal interference. For example, in certain aspects, such active sources of signal interference may include wireless signal sources operating at a frequency band at least partially overlapping with a frequency band used by a wireless device included in the D2D mesh network for transmission and/or reception of data. For example, an active source of signal interference may include a wireless signal source operating at a frequency band at least partially overlapping with mmW transmission/reception bands, the wireless signal source not being part of or connected with the D2D mesh network.

As illustrated in FIGS. 23A to 23D, dynamic beamforming based on geographical information in accordance with various aspects may enable transmission of data from a source wireless device to a target wireless device while avoiding signal blockers or interferers. While transmission of data (payload data) using data transmission beams steered based on the geographic information may in accordance with certain aspects may use Millimeter Wave (mmW) channels, said at least part of the first map data (e.g. updates to the first data) and/or said dynamic portion of the second map data may be received by the receiver of the wireless device (or the wireless coordinator device) with non-beamformed transmission via a different side-channel. In certain aspects, the at least part of the first map data (e.g. updates to the first data) and/or said dynamic portion of the second map data may be received in a frequency band of lower frequencies as compared to a frequency band for transmission/reception of payload data. For example, the at least part of the first map data (e.g. updates to the first data) and/or said dynamic portion of the second map data may be received in ISM bands, while related payload data may be transmitted/received in mmW frequency bands.

FIG. 24 shows an exemplary structural configuration of a wireless device 2402 which may be included in or connected to a D2D mesh network (wireless device 2402 may for example correspond to any one of wireless devices 2302, 2304 or 2306 of D2D mesh network 2300 shown in FIG. 23). The structural configuration shown in FIG. 24 is focused on beam forming features of wireless device 2402 and may therefore not expressly depict other components that are less directly related to these features. As illustrated, wireless device 2402 may include antenna system 2401, RF transceiver 2404, baseband modem 2406 and memory 2418. In some aspects, antenna system 2401, RF transceiver 2404, and baseband modem 2406 may be configured as described above for antenna system 202, RF transceiver 204, baseband modem 206 and memory 214 of terminal device 102. Accordingly, wireless device 2402 may be configured to transmit and receive wireless signals via antenna system 2401 and RF transceiver 2404. In the transmit direction, RF transceiver 2404 may therefore modulate and transmit baseband samples (provided by baseband modem 2406) via antenna system 2401. In the receive direction, RF transceiver 2404 may also receive and demodulate radio signals via antenna system 2401 and provide the resulting baseband samples to baseband modem 2406.

In accordance with various aspects, antenna system 2401 may include an antenna arrangement including at least two antennas. The antenna arrangement may in accordance with certain aspects correspond to one or more antenna arrays, an antenna array including at least two or a plurality of antennas. In accordance with certain aspects, an antenna array may be configured to generate a data transmission beam within a corresponding angular range. For example, in case of mmW transmission/reception wavelengths, an angular range covered by an antenna array may be ±60°. Thus, in certain aspects, a wireless device may include a respective antenna array to cover a corresponding range of spatial directions corresponding to the angular range. In certain aspects, a beamforming controller may thus be configured to select an antenna array to steer a data transmission beam towards a further wireless device. An antenna may in accordance with certain aspects correspond to an antenna element.

FIG. 24 also depicts several internal components of baseband modem 2406, including receiver 2408, transmitter 2410, beamforming (BF) controller 2412, geographical information determiner 2414, and communication processor 2416. In accordance with various aspects, the geographical information determiner 2414 may include or correspond to the BA-GIS.

In some aspects, baseband modem 2406 may include a digital signal processor and a protocol controller. Receiver 2408, transmitter 2410, beamforming controller 2412, geographical information determiner 2414, and communication processor 2416 may therefore be subcomponents of the digital signal processor (e.g., physical layer components) and/or subcomponents of the protocol controller (e.g., protocol stack components). In some aspects, receiver 2408 may be the physical layer receive chain, transmitter 2410 may be the physical layer transmit chain, and beamforming controller 2412, and communication processor 2416 may be processors that are part of the protocol stack layers of wireless device 2402. For example, receiver 2408 may include a demodulator, demapper (e.g., constellation demapper), de-interleaver, decoder, and/or descrambler. Receiver 2408 may receive wireless signals in the form of baseband samples via antenna system 2401 and RF transceiver 2404. Receiver 2408 may then sequentially process these baseband samples with the demodulator, demapper (e.g., constellation demapper), de-interleaver, decoder, and/or descrambler to produce a bitstream, which receiver 2408 may provide to beamforming controller 2412, and/or communication processor 2416 (e.g., to the protocol stack layers). Transmitter 2410 may include a scrambler, encoder, interleaver, mapper (e.g., constellation mapper), and/or a modulator, which may sequentially process a bitstream (e.g., provided by protocol stack layers of beamforming controller 2412, and communication processor 2416) to produce baseband samples (e.g., complex IQ symbols). Transmitter 2410 may then transmit these baseband samples as wireless signals via RF transceiver 2404 and antenna system 2401.

In some aspects, beamforming controller 2412 may also include physical layer components, such as circuits or processors configured to control RF transceiver 2404 and/or antenna system 2401 to steer beams for data transmission and interference nulls generated by antenna system 2401. At higher layers, e.g. at a medium access control (MAC) layer included in the data link layer, and/or higher layers the beamforming controller 2412 may control width and direction of beams for data transmission and interference nulls.

Communication processor 2416 may be a processor configured to execute other control- and user-plane operations of the protocol stack layers. This may include generating messages for transmitter 2410 to transmit (e.g., messages including user or control data) and/or recovering messages from bitstreams provided by receiver 2408. Communication processor 2416 may in accordance with various aspects be configured to control communications of the wireless device 2402 with at least one further wireless device included in a D2D mesh network based on the connectivity map (data relating to mutual connections between wireless devices included in the network) including information for establishing communication routes each other wireless device included in the D2D mesh network such as said identification information.

While receiver 2408, transmitter 2410, beamforming controller 2412, geographical information determiner 2414 and communication processor 2416 are shown separately in FIG. 24, in some aspects receiver 2408, transmitter 2410, beamforming controller 2412, geographical information determiner 2414 and communication processor 2416 may structurally be a single processor configured to perform the respective operations of receiver 2408, transmitter 2410, beamforming controller 2412, geographical information determiner 2414 and communication processor 2416.

Wireless device 2402 may in accordance with various aspects further include memory 2418 configured to store the geographical information, e.g. managed by the BA-GIS. In accordance with various aspects, the geographical information may include first map data and the memory 2418 may include first map data database 2421 configured to store the first map data. In accordance with various aspects, the geographical information may include second map data and the memory 2418 may include second map data database 2423 configured to store the second map data. As shown in FIG. 24, memory 2418 may be connected with baseband modem 2406. Thus, in accordance with various aspects, receiver 2408 of wireless device 2402 may be configured to (e.g. periodically) receive the at least part of the first map data including position information of wireless devices included in the D2D mesh network, e.g. for updating the first map data database 2421 in accordance with movement of the wireless devices. Further, in accordance with various aspects, receiver 2408 of wireless device 2402 may be configured to (e.g. periodically) receive the dynamic portion of the second map data including position information of movable beam impairments e.g. within an area covered by D2D mesh network, e.g. for updating the second map data database 2423 in accordance with movement of the movable beam impairments (e.g. vehicles).

Figure 25:
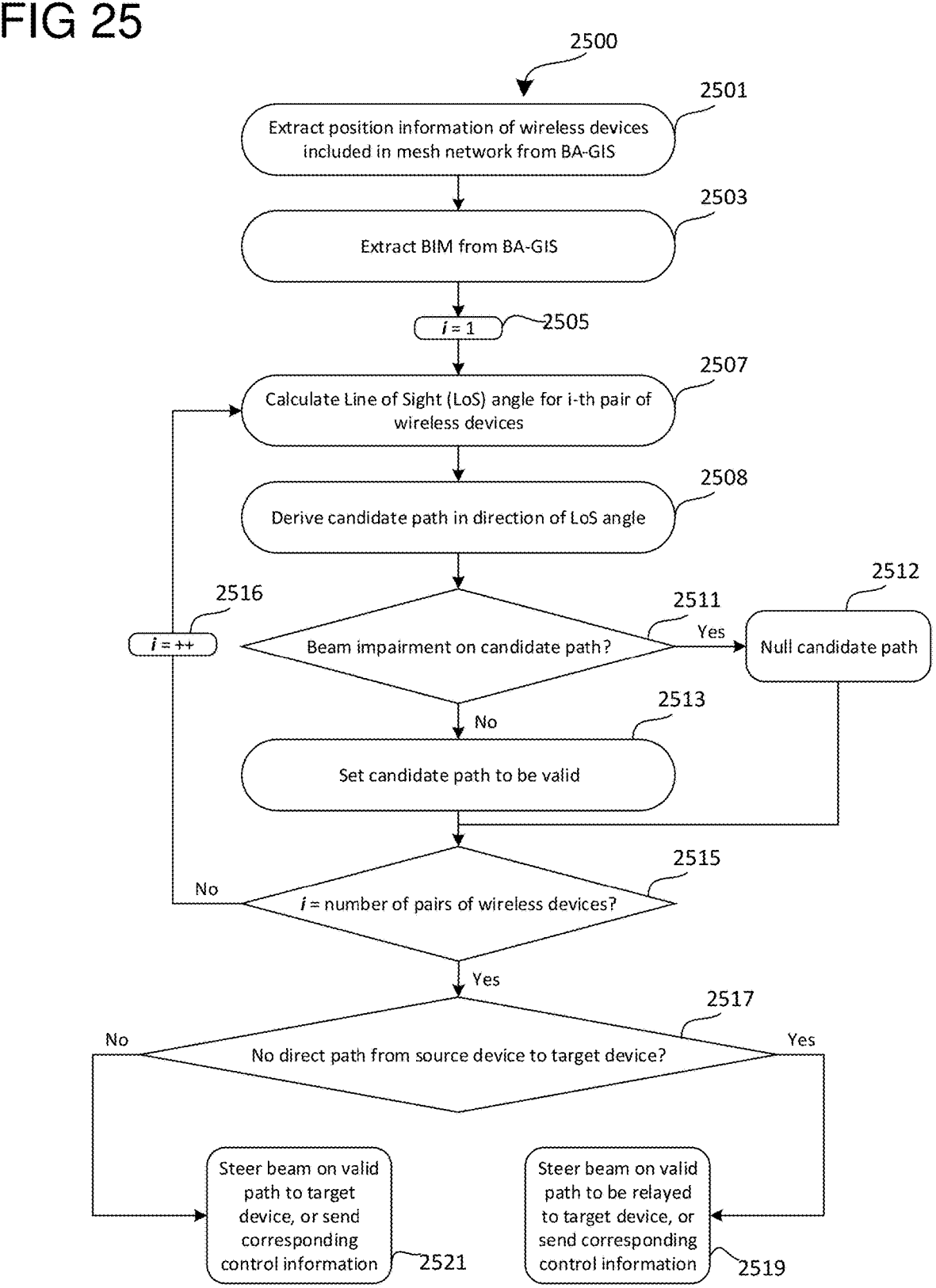
FIG. 25 shows an exemplary method, which a wireless device may execute using the internal configuration of FIG. 24 according to some aspects.

FIG. 25 shows exemplary method 2500, which a wireless device (e.g. wireless device 2302 shown in FIG. 23A or a wireless coordinator device not shown) may execute using the internal configuration of FIG. 24. While the exact order and number of shown stages of method 2500 is chosen for illustrative purposes, method 2500 may include additional or less stages as compared to the one shown in FIG. 25. The exact order of stages 2501 to 2521 may in certain aspects be adapted in accordance with given requirements.

As shown in FIG. 25, a geographical information determiner 2414 of the wireless device may be configured to determine a position of at least one first and one second further wireless device (for example of wireless devices 2304, 2306), e.g. by extracting position information of such wireless devices from first map data managed by the BA-GIS at stage 2501. In accordance with certain aspects, the geographical information determiner 2414 may further be configured to determine a position of at least one beam impairment, e.g. by extracting position information including positions of one or more beam impairments within a predefined area (an example of a beam impairment map) from second map data managed by the BA-GIS at stage 2503. At stage 2507, the geographical information determiner 2414 may in certain aspects further be configured to calculate a Line of Sight (LoS) angle for a first one (a counter index i may be initiated to 1 at stage 2505) of each pair of wireless devices e.g. included in a D2D mesh network or included in a predefined area at stage at stage 2507. For example, said first one may correspond to the pair of wireless devices 2302 and 2306 in FIG. 23A. Based on the calculated LoS path, the geographical information determiner 2414 may further be configured to derive a candidate path (e.g. direct path B in FIG. 23A) in direction of the calculated LoS path at stage 2509. At stage 2511, the geographical information determiner 2414 may further be configured to determine whether a beam impairment is present along said direct path from the wireless device (e.g. wireless device 2302 in FIG. 23A) to at least one first further wireless device (e.g. wireless device 2306 in FIG. 23A).

In the exemplary case as shown in FIG. 23A, the geographical information determiner 2414 of the wireless device (e.g. wireless device 2302 in FIG. 23A or of a wireless coordinator device) may be configured to determine presence of beam impairment in form of building 2321 of FIG. 23A or of wireless access point 2323 of FIG. 23D along path B. As shown in FIG. 25, in case presence of a beam impairment is determined at stage 2511 ("Yes" at stage 2511), the geographical information determiner 2414 may in certain aspects be configured to null the corresponding candidate path (e.g. path B in FIG. 23A) at stage 2512 and may determine whether or not further pairs of wireless devices can be evaluated at stage 2515 of FIG. 25. If for example the present counter index value is determined not to correspond to the number of wireless devices present e.g. in the D2D mesh network or in the predetermined area, said counter index value may be increased by one at stage 2516 while the method 2500 proceeds to re-perform method 2500 starting again at stage 2507. In the case illustrated in FIG. 23A, the geographical information determiner 2414 may calculate the LoS angle for wireless devices 2302 and 2304 at stage 2414, may derive path A of FIG. 23A as candidate path at stage 2509 and may determine that no beam impairment is present along said path A at stage 2511. Thus, as illustrated in FIG. 25, said path without beam impairment may be set as valid path at stage 2513. As in the case of FIG.

23A all pairs of wireless devices have been evaluated ("Yes" at stage 2515), the method 2500 may proceed at stage 2517.

In accordance with various aspects, the geographical information determiner 2414 may be configured to determine whether a direct path exists from a wireless device (e.g. wireless device 2302 in FIG. 23), which is a source of a data transmission (e.g. a payload data transmission) to a wireless device, which is a target for the data transmission (e.g. wireless device 2306 in FIG. 23). In the illustrative case of FIG. 23A, wireless device 2306 may be the target for a data transmission from wireless device 2302 to which no valid direct path from wireless device 2302 exists ("Yes" at stage 2517). Method 2500 may thus proceed with stage 2519. In other words, for example based on a determination of geographical information determiner 2414 at stage 2517, a beamforming controller 2412 of wireless device 2302 in FIG. 23A may be configured to control a transmit antenna configuration of an antenna arrangement of wireless device 2302 to steer the data transmission beam towards wireless device 2304 (towards the at least one second further wireless device) to be relayed by wireless device 2304 to wireless device 2306 (the target wireless device).

In different scenarios, if among a plurality of candidate paths evaluated at stages 2507 to 2515 a valid direct path exists between a source wireless device and a target wireless device ("No" at stage 2517), a geographical information determiner 2414 of the source wireless device may in accordance with certain aspects be configured to steer a beam on said valid direct path at stage 2521. Alternatively, in a centralized mode, a geographical information determiner 2414 of a wireless coordinator device may in accordance with certain aspects be configured to transmit control information to the source wireless device to steer a direct beam on said valid path to the target wireless device at stage 2521.

As mentioned, in accordance with various aspects, the BA-GIS may be implemented at one or more wireless devices part of the D2D mesh network (in a decentralized mode), where in accordance with various aspects a wireless device (e.g. wireless device 2302 of FIG. 23A), at least one first further wireless device (e.g. wireless device 2304 of FIG. 23A) and at least one second further wireless device (e.g. wireless device 2306 of FIG. 23A) are included in a mesh network of wireless devices configured for mutual device-to-device communication. In certain aspects, a wireless device (e.g. wireless device 2302 of FIG. 23A), at least one first further wireless device (e.g. wireless device 2304 of FIG. 23A) and at least one second further wireless device (e.g. wireless device 2306 of FIG. 23A) may be a mobile terminal device.

Figure 26A:
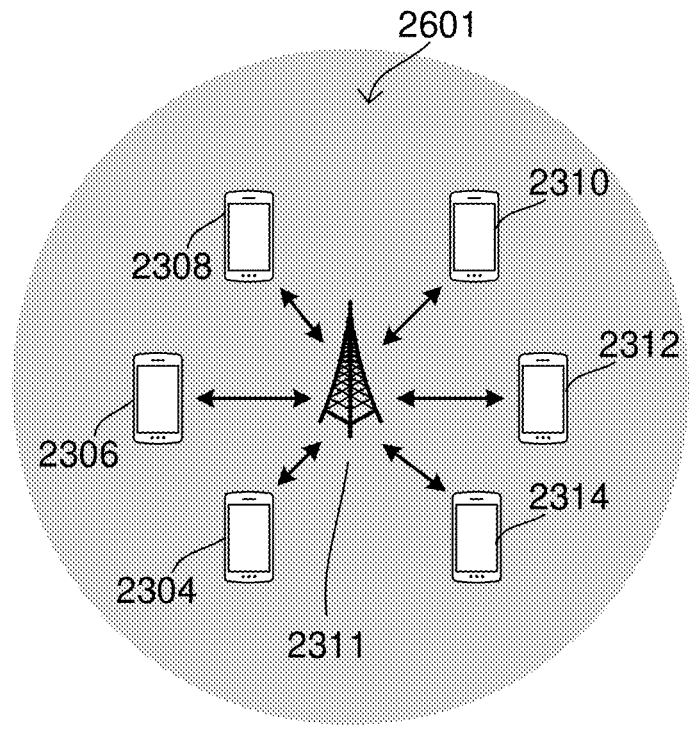
FIG. 26A illustrates a wireless coordinator device being a base station of a radio communication system according to some aspects.
Figure 26B:
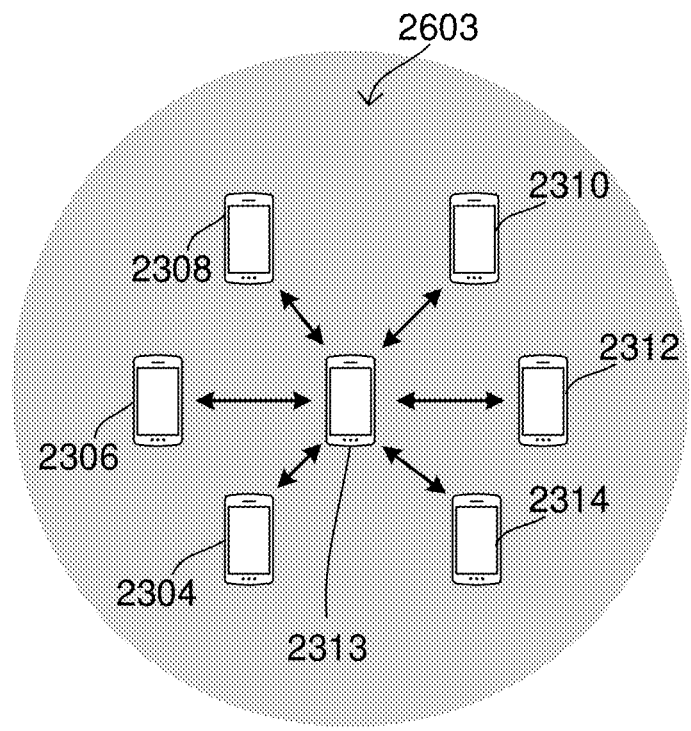
FIG. 26B illustrates a wireless coordinator device being a wireless device included in a D2D mesh network according to some aspects.

As illustrated in FIGS. 26A and 26B, in accordance with various aspects, the BA-GIS may be implemented additionally or alternatively at one or more wireless coordinator devices (in a centralized mode). FIG. 26A illustrates a wireless coordinator device being base station 2611 of a radio communication system in accordance with certain aspects such as for example NodeBs, evolved NodeBs (eNBs), gNodeBs. In other words, a D2D mesh network 2601 may in accordance with various aspects be at least partially network supported, e.g. one or more wireless devices included in the D2D mesh network may be configured to communicate, e.g. control information derived by the base station based on the BA-GIS implemented at the base station, with such base station. Alternatively or in addition, a Road-Side-Unit (RSU) may implement the BA-GIS and may assume a role of a wireless coordinator device e.g. for providing control information base on the BA-GIS to wireless devices configured for V2X communications.

As shown in FIG. 26B, in certain aspects, a dedicated wireless device 2613 (e.g. a mobile terminal device) part of the D2D mesh network 2603 may implement the BA-GIS and may assume a role of a wireless coordinator device. In certain aspects, a wireless device part of the D2D mesh network may only temporally assume a role of the wireless coordinator device and may be configured to handover the wireless coordinator device to a different wireless device included in the D2D mesh network.

Regardless of the BA-GIS being implemented in a wireless device in decentralized mode and/or on a wireless device in centralized mode, in accordance with various aspects, a receiver of the wireless device may be configured to (e.g. periodically) receive at least part of the first map data (e.g. updates to the first map data) and/or part of the second map data (e.g. updates to the second map data), e.g. position information of the at least one movable beam impairment. In other words, the wireless device may be configured to periodically update the BA-GIS. For example such periodic updates may be employed for updating the first map data to reflect movement of wireless devices e.g. within the D2D mesh network. In other words, such updates may reflect dynamics within the D2D mesh networks and in accordance with certain aspects, a periodicity of such updates of the first map data may be adapted in accordance with expected temporal characteristics of such dynamics. For example, an update rate of such updates of the first map data may be linearly scaled with a speed of a moving wireless device. For example, a moving wireless device may transmit updating information (e.g. part of the first map data relating to its position) to further wireless devices included in the D2D mesh network more often when traveling faster. For example, a periodicity may be 4 seconds at 3 km/h and 2 seconds at 6 km/h, etc. Further, such periodic updates may be employed for updating the dynamic portion of the second map data to reflect short time dynamics due to moving beam impairments such as vehicles. A periodicity of such updates may be adapted in accordance with expected temporal characteristic of such dynamics. For examples, such updates of the dynamic portion of the second map data may be performed every 20 milliseconds (e.g. in certain aspects at a periodicity smaller than 1 second), the updates being active starting from a time when the moving beam impairment is detected until the beam impairment is no longer detected and/or is detected to be no longer present. Further, such updates may include updates also of the static portion of the second map data to reflect longer time dynamics e.g. due to newly constructed buildings, etc.

In accordance with various aspects, sharing of update data may be performed in a broadcast/multicast manner, e.g. from a node of the D2D network (a wireless device) to nearby nodes of the D2D network. Thus, in certain aspects, a wireless device (in certain aspects when having a BA-GIS implemented thereon in decentralized mode, e.g. wireless device 2302 in FIG. 23A) may include a receiver configured to receive at least part of the first map data and/or the position information of the at least one movable beam impairment from at least one of at least one first further wireless device (e.g. wireless device 2304 in FIG. 23A) and the at least one second further wireless device (e.g. wireless device 2306 in FIG. 23A). In alternative aspects, update data may be received from a coordinator device, i.e. in certain aspects, said receiver may be configured to receive at least part of the first map data and/or the position information of the at least one movable beam impairment from a wireless coordinator device.

Alternatively or in addition, a BA-GIS implemented in a coordinator device in a centralized mode (e.g. the base station 2611 in FIG. 26A, the wireless device 2613 in FIG. 26B or a RSU may be updated likewise. In other words, a wireless coordinator device may include a receiver configured to receive at least part of the first map data and/or the position information of the at least one movable beam impairment from at least one of at least one first further wireless device (e.g. any one of wireless devices 2304, 2306, 2308, 2310, 2312 or 2314 in FIG. 26A) and the at least one second further wireless device (e.g. any one of wireless devices 2304, 2306, 2308, 2310, 2312 or 2314 in FIG. 26B).

In accordance with various aspects of the present disclosure, a wireless device may be configured to dynamically adapt an opening angle of a data transmission beam for transmission of data to one or more further wireless devices based on a distance between the wireless device and the one or more further wireless devices. Such dynamic adaptation of an opening angle of a data transmission beam is exemplarily illustrated in FIGS. 27A to 27F, where wireless device 2302 (which may correspond to wireless device 2302 of FIG. 23A and to wireless device 2402 of FIG. 24) moves towards wireless devices 2310 and 2312 in FIGS. 27A to 27C and moves away from wireless devices 2310 and 2312 in FIGS. 27D to 27F. The direction of movement of wireless device 2302 is indicated by dashed arrow 2331. While FIGS. 27A to 27F may conceptually illustrate dynamic adaptation of the opening angle with two receiving wireless devices (wireless devices 2310, 2312), dynamic adaptation of the opening angle in accordance with various aspects is not limited to a number of receiving devices and may be employed similarly for larger groups (or sub-groups) of wireless devices.

In accordance with various aspects of the present disclosure, geographical information determiner 2414, for example of wireless device 2302, may be configured to determine a distance from the wireless device 2302 to wireless devices 2310 and 2312 (at least one first further wireless device and to at least one second further wireless device). The geographical information determiner 2414 may be configured to determine said distance based on geographical information which may correspond to the geographical information discussed further herein, e.g. comprising the first map data which may include position information (e.g. geographical coordinates) of wireless devices included in a D2D mesh network.

Figure 27A:
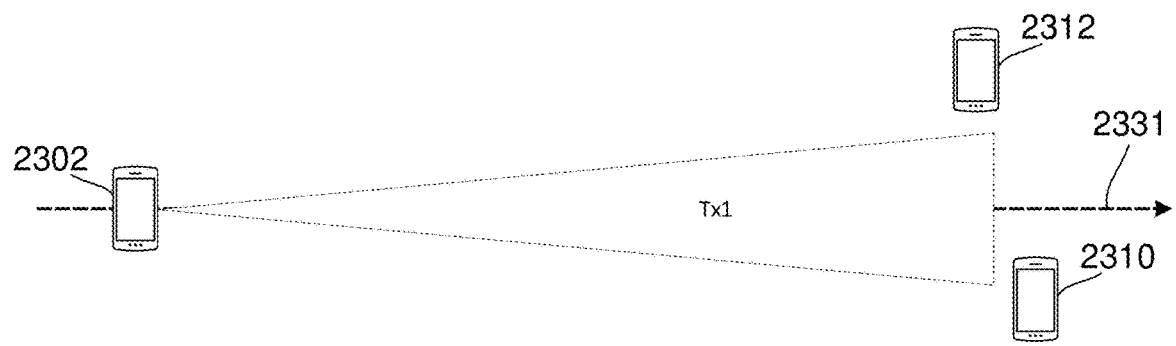
FIG. 27A illustrates dynamic adaptation of an opening angle of a data transmission beam according to some aspects.

In certain aspects, the distance from wireless device 2302 to wireless devices 2310, 2312 may be a mean distance, a maximum distance (e.g. from wireless device 2302 to wireless device 2310 in FIG. 27A), or a minimum distance (e.g. from wireless device 2302 to wireless device 2312 in FIG. 27A). For example, a mean distance may be obtained by averaging direct line of sight distances between the wireless device and further wireless devices to which the wireless device intends to transmit data.

Figure 27B:
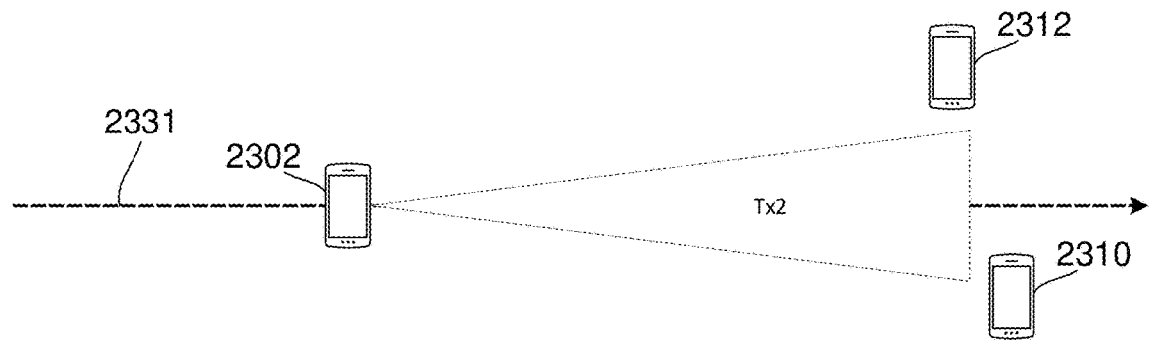
FIG. 27B illustrates dynamic adaptation of an opening angle of a data transmission beam according to some aspects.

As illustrated in FIGS. 27A and 27B, wireless device 2302 may employ a transmit beam Tx1 for data (e.g. payload data) transmission to wireless devices 2310, 2312 using an opening angle Tx1 in correspondence with a larger distance of FIG. 27A. Upon moving towards wireless devices 2310, 2312, wireless device 2302 may (e.g. gradually) increase the opening angle while moving towards wireless devices 2310, 2312 and may thus employ a larger opening angle in correspondence with a smaller distance as shown in FIG. 27B. To this end, in accordance with various aspects, beamforming controller 2412 of wireless device 2302 may be configured to control a transmit antenna configuration of an antenna arrangement of wireless device 2302 to steer a data transmission beam (Tx1 and Tx2 in FIGS. 27A, 27B) towards wireless device 2310 (the at least one first further wireless device) and to wireless device 2312 (the at least one second further wireless device) and to adjust an opening angle of the data transmission beam based on the distance from wireless device 2302 to wireless devices 2310, 2312 determined by the geographical information determiner 2414. In certain aspects, the geographical information determiner may be configured to monitor the determined distance, wherein the beamforming controller may be configured to increase the opening angle while the distance decreases.

In certain aspects, wireless device 2302 may be configured to split a data transmission beam and to direct individual data transmission beams to wireless devices 2310, 2312, respectively. Such splitting of the data transmission beam is exemplarily illustrated in FIG. 27C. As shown, when wireless device 2310 continues its movement along direction 2331, a distance to wireless devices 2310, 2312 may fall below a predetermined threshold at which wireless device 2302 splits the data transmission beam to direct transmit beam Tx3 for data transmission to wireless device 2310 and to direct transmit beam Tx4 for data transmission to wireless device 2312. In other words, geographical information determiner 2414 of wireless device 2302 may be configured to monitor the distance determined by geographical information determiner 2414 and may be configured to compare the distance with a threshold. In such aspects beamforming controller 2412 may be configured to control the transmit antenna configuration of the antenna arrangement to split the data transmission beam and to steer a first data transmission beam Tx3 towards wireless device 2310 (the at least one first further wireless device) and to steer a second data transmission beam Tx4 towards wireless device 2312 (the at least one second further wireless device) geographical information determiner 2414 determines the distance to be below the threshold.

Such splitting of a data transmission beam may in accordance with certain aspects help to overcome angular transmission limitations of a wireless device due to angular ranges within which an antenna array can steer transmit beams. In certain aspects, an antenna arrangement of wireless device 2302 may comprise at least two antenna arrays, each including a plurality of antennas and being configured to generate respective data transmission beams within a corresponding angular range. For example, one antenna array may be configured to steer data transmission beams for mmW data communication within an angular range of approximately ±60°. Further, beamforming controller 2412 of wireless device 2302 may in accordance with certain aspects be configured to select at least one of the at least two antenna arrays and to control the plurality of antennas of the at least one selected antenna array to steer a data transmission beam towards wireless device 2310 (the at least one first further wireless device) and to wireless device 2312 (the at least one second further wireless device). In other words, for example in the case of FIG. 27A, wireless device 2302 may select a single antenna array to steer transmit beam Tx1 to both wireless devices 2310, 2312.

Figure 27C:
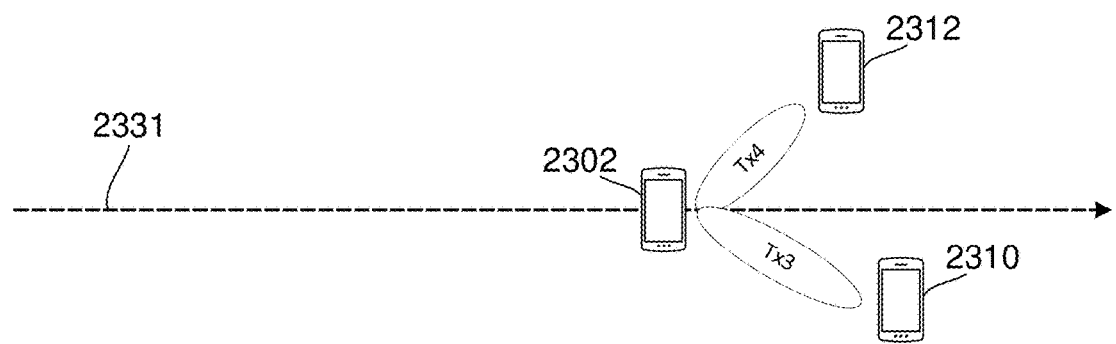
FIG. 27C illustrates dynamic adaptation of an opening angle of a data transmission beam according to some aspects.

Further in accordance with certain aspects, as for example illustrated in FIG. 27C, beamforming controller 2412 may be configured to select a first one of the at least two antenna arrays and to control the plurality of antennas of the first one selected antenna array to steer transmit beam Tx3 (the first data transmission) beam towards wireless device 2310 (the at least one first further wireless device) and to select a second one of the at least two antenna arrays and to control the plurality of antennas of the second one selected antenna array to steer transmit beam Tx4 (the second data transmission beam) towards wireless device 2312 (the at least one second further wireless device) if the geographical information determiner determines the distance to be below the threshold.

Thus, as can be taken from the illustrative example of FIGS. 27A to 27C, geographical information may be employed to enable a dynamic adaption of an opening angle of a data transmission beam (including splitting of the data transmission beam) which may help to overcome angular data transmission restrictions e.g. for wireless devices within a D2D mesh network due to angular limitations of an antenna array.

In accordance with various aspects, dynamic adaption of the opening angle may be adapted to dynamics of a D2D mesh network, i.e. to movement of receiving wireless devices. In other words, in certain aspects, geographical information determiner 2414 of wireless device 2302 may be configured to determine the distance to wireless devices 2310, 2312 by referring to first map data comprised by the geographical information, while wireless device 2302 may in such aspects comprise a receiver configured to receive at least part of the first map data. Thus, adaption of an opening angle of a transmit beam for data transmission from wireless device 2302 to wireless devices 2310, 2312 may be performed taking into account movement of wireless device 2302 and additionally taking into account potential movement of wireless devices 2310, 2312. As in cases discussed further herein, the receiver of wireless device 2302 may be configured to receive at least part of the first map data from wireless device 2310 (at least one first further wireless device), from wireless device 2312 (at least one second further wireless device) and/or from a wireless coordinator device (e.g. a base station, a Road Side Unit, or a selected wireless device included in the D2D mesh network).

Figure 27D:
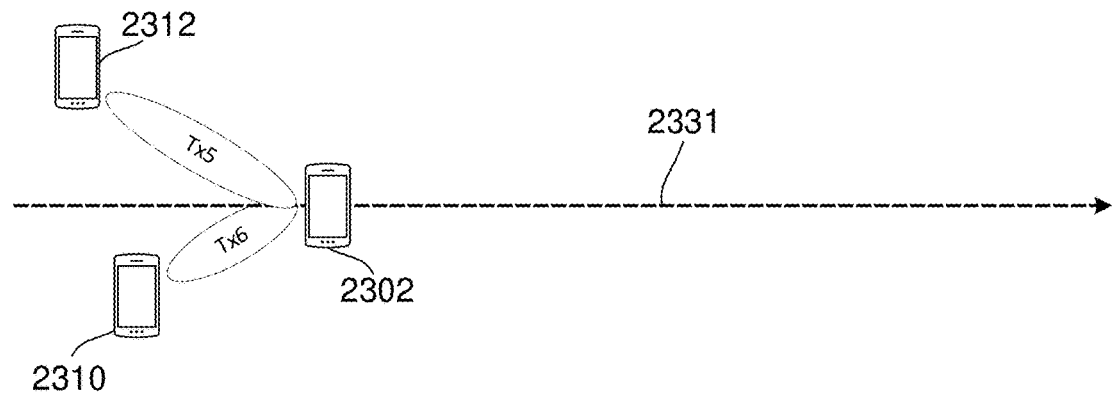
FIG. 27D illustrates dynamic adaptation of an opening angle of a data transmission beam according to some aspects.
Figure 27E:
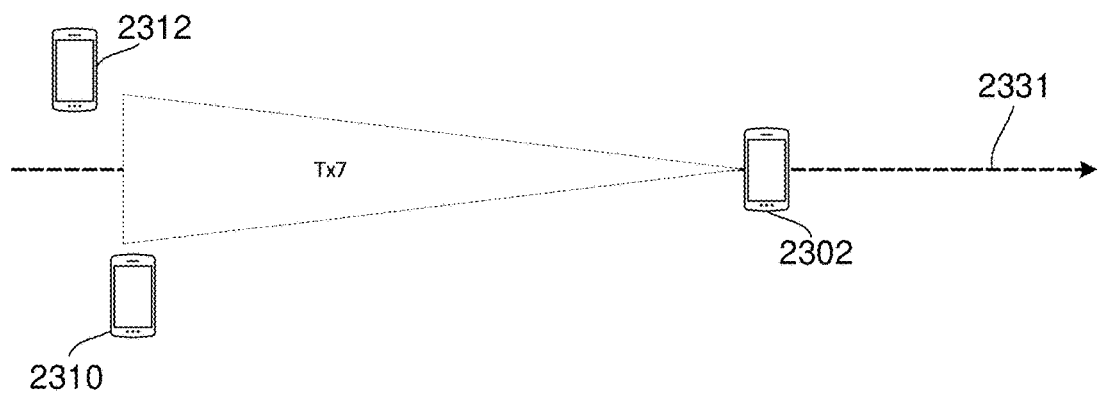
FIG. 27E illustrates dynamic adaptation of an opening angle of a data transmission beam according to some aspects.
Figure 27F:
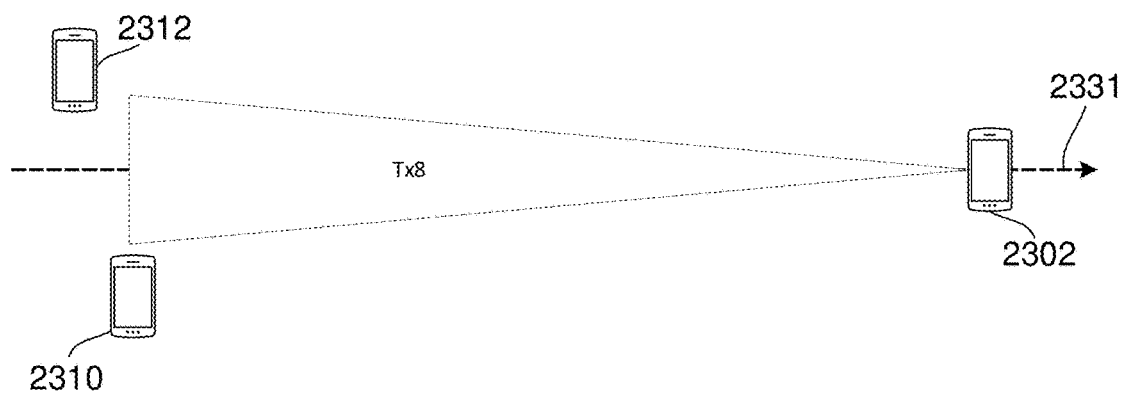
FIG. 27F illustrates dynamic adaptation of an opening angle of a data transmission beam according to some aspects.

FIG. 27D shows wireless device 2302 having passed wireless devices 2310, 2312 along its moving direction 2331. As the distance may still be below the predefined threshold, wireless device 2302 steers separate transmit beams (first and second data transmission beams) Tx5 and Tx6 towards wireless devices 2310, 2312 for transmission of data (e.g. payload data). As shown in FIG. 27E, when upon further movement of wireless device 2302 the distance to wireless devices 2310, 2312 again increases beyond the predefined threshold, wireless device 2302 may again steer a single transmit beam Tx7 to wireless devices, its opening angle adjusted in accordance with the distance to wireless devices 2310, 2312, Upon further movement, as illustrated in FIG. 27F, when the distance is larger (as compared e.g. to FIG. 27E), wireless device 2302 may employ yet a smaller opening angle for transmit beam Tx8. Thus, as illustrated in FIGS. 27D to 27F, geographical information determiner 2414 of wireless device 2302 may in certain aspects be configured to monitor the determined distance while beamforming controller 2412 may be configured to decrease the opening angle while the distance increases.

As described further herein, wireless devices in a D2D mesh network in accordance with various aspects may be sources and targets for transmission of data (e.g. payload data)m where the transmission may be relayed by one or more wireless devices of the D2D mesh network. In certain aspects, dynamic beamforming based on geographical information and dynamic adaption of an opening angle of a data transmission beam (including splitting of the data transmission beam) based on geographical information may be combined as exemplarily illustrated in FIG. 28. While FIG. 28 may conceptually illustrate such combination with wireless devices 2302, 2304, 2306, 2308, 2310, 2312, 2314, 2316, 2318, 2320 and 2322, the concept is not limited to a number of wireless devices and may be employed similarly for larger or smaller groups (or sub-groups) of wireless devices.

As illustrated, wireless device 2302 may be a source for a data (e.g. payload data) transmission to wireless devices 2310, 2312, 2314, 2316, 2318, 2320, 2322. Thus, wireless device 2302 may initially transmit a transmit beam Tx1 to wireless devices 2304, 2306, 2308 with an opening angle adjusted based on a distance to wireless devices 2304, 2306, 2308. In other words, a communication processor 2416 of wireless device 2302 may be configured to generate data to be transmitted with transmit beam Tx1 to wireless devices 2304, 2306, 2308 to be relayed to wireless devices 2310, 2312, 2314, 2316, 2318, 2320, 2322. In certain aspects, the communication processor 2416 may further be configured to generate identification information corresponding to the data to be transmitted with data transmission beam Tx1 to identify respective target wireless devices such that wireless devices 2304, 2306, 2308 may correctly identify the target wireless devices and transmit the respective data accordingly.

In accordance with certain aspects, the identification information may be transmitted by wireless device 2302 to wireless devices 2304, 2306, 2308 in a separate transmission before, after or in parallel to the transmission of the corresponding data, using a different channel. In alternative aspects, the identification information may be included in the data transmission bema (e.g. the communication processor 2416 may be configured to insert the identification information corresponding to the respective data into the data transmission beam). A transmitter of wireless device 2302 (e.g. the antenna arrangement employing a non-beamformed transmission or the antenna arrangement employing the steered beam for transmission of the data) may transmit the identification information to wireless devices 2304, 2306, 2308. In the exemplary case of FIG. 28, communication processor 2416 may be configured to generate first identification information corresponding to first data for identifying target wireless device 2310. Likewise, communication processor 2416 may generate respective identification information corresponding to data to be transmitted to any one of wireless devices 2312, 2314, 2316, 2318, 2320, 2322 for identifying the respective one of target wireless devices 2312, 2314, 2316, 2318, 2320, 2322.

Figure 28:
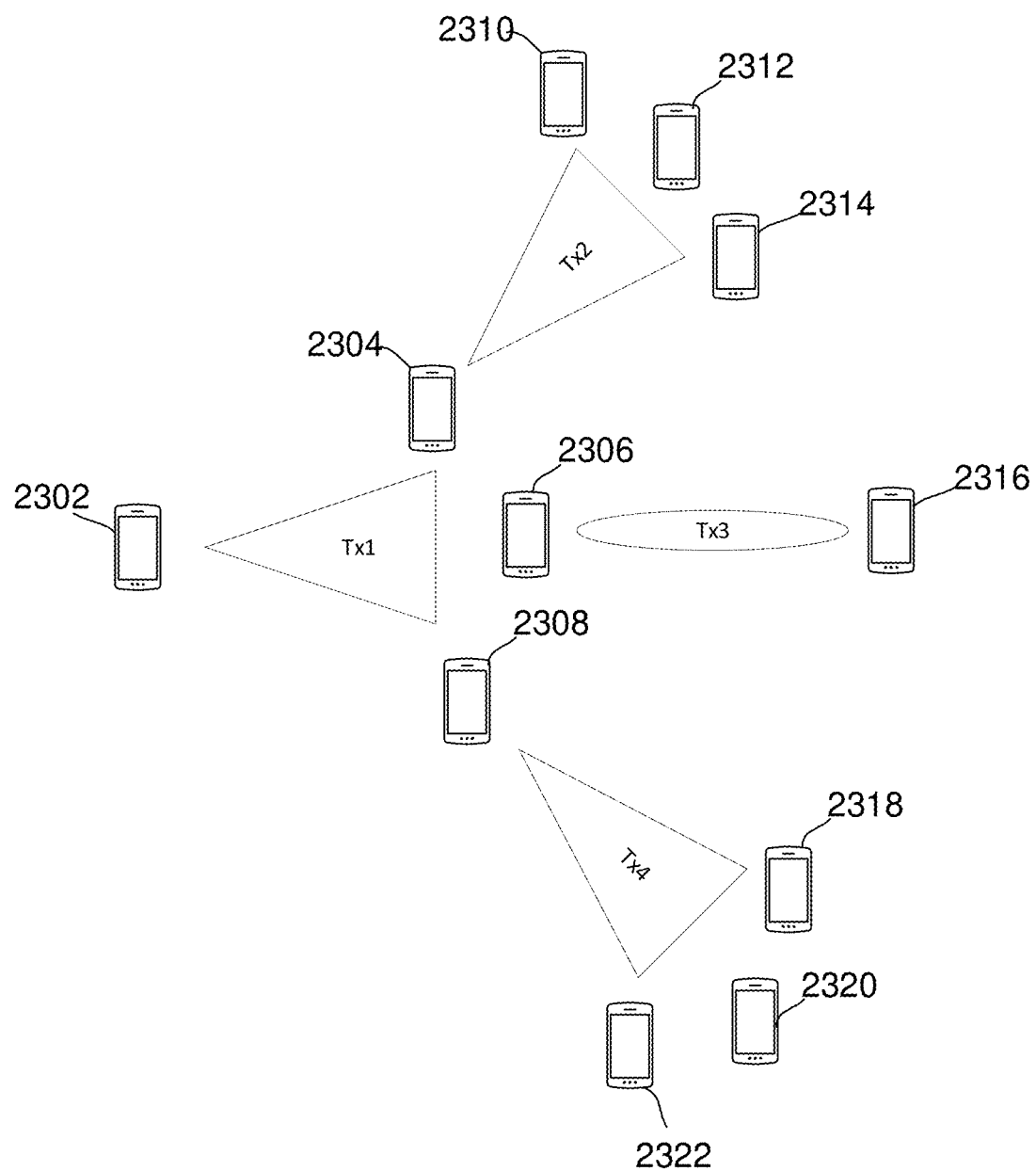
FIG. 28 shows a combination of dynamic beamforming based on geographical information and dynamic adaption of an opening angle of a data transmission beam (including splitting of the data transmission beam) based on geographical information according to some aspects.

As shown in FIG. 28, based on the identification information, wireless device 2304 may transmit a data transmission beam Tx2 to wireless devices 2310, 2312, 2314 with an opening angle adjusted to a distance between wireless device 2304 and wireless devices 2310, 2312, 2314. Wireless device 2306 may transmit a narrow, directed beam Tx3 to wireless device 2316 and wireless device 2308 may transmit a data transmission beam Tx4 to wireless devices 2318, 2320, 2322 with an opening angle adjusted to a distance between wireless device 2308 and wireless devices 2318, 2320, 2322.

As mentioned, communication processor 2416 of wireless device 2302 may be configured to first identification information corresponding to data for identifying a respective target device of the data. Thereby, wireless device 2302 may in certain aspects control use of a topology of a D2D mesh network for selecting paths for data transmission to respective wireless devices as shown in FIG. 23. The communication processor 2416 of wireless device 2302 may to this end generate the identification information e.g. based on the connectivity map and/or on the first map data comprised by the geographic information. Wireless device 2302 configured for dynamic beamforming based on geographical information and dynamic adaption of an opening angle of a data transmission beam (including splitting of the data transmission beam) based on geographical information may thus in certain aspects be a selected wireless device (e.g. a mobile terminal device) included in the D2D mesh network such as wireless device 2613 in FIG. 26B, a base station of a radio communication network, such as base station 2611 in FIG. 26A, and/or a Road Side Unit (RSU) configured for vehicle-to-everything communication with wireless devices included in a D2D mesh network. In case of wireless device 2302 configured for dynamic beamforming based on geographical information and dynamic adaption of an opening angle of a data transmission beam (including splitting of the data transmission beam) based on geographical information corresponds to a base station, a control as illustrated in FIG. 28 may in aspects further to control within D2D mesh networks be employed e.g. for wireless backhauling.

In alternative or additional aspects, communication processor 2416 of wireless device 2302 may be configured to generate the identification information based on information received from a coordinator device such as a selected wireless device (e.g. a mobile terminal device) included in the D2D mesh network such as wireless device 2613 in FIG. 26B, a base station of a radio communication network, such as base station 2611 in FIG. 26A, and/or a Road Side Unit (RSU) configured for vehicle-to-everything communication with wireless devices included in a D2D mesh network.

Device-to-Device (D2D) based wireless mesh networks may provide flexible resource allocation, flexible D2D link adaption, and beneficial spectrum utilization without a need for centralized base stations. While device-to-device (D2D) mesh networks may thus be well suited to enable communications for example between wireless devices out of coverage of cellular communication systems, for example in cases of congestion of a cellular network, for wireless device having no cellular link capabilities, or for example in cases where D2D communication may be preferred by wireless device users, certain aspects of the present disclosure may aim at further increasing overall resource usage efficiency when network access nodes such as base stations of cellular communication systems are accessible for at least part of wireless devices forming a D2D mesh network.

To this end, various aspects of the present disclosure may enable a wireless device configured to support D2D communications, e.g. direct and/or relayed D2D communications within a D2D mesh network to employ control and data plane separation when within coverage of a network access node, e.g. a network access node as described in the introduction, such as for example a base station of a cellular communication system and/or an access node of a Wireless Local Area Network (WLAN). For example, in accordance with certain aspects, a wireless device connected to a D2D mesh network and configured to control communications within said network with at least one further wireless device based on the data relating to mutual connections between wireless devices included in a network of wireless devices (the connectivity map) described herein, may switch to control communications e.g. with the at least one further wireless device based on control plane data received from at least one network access node (e.g. network access node 2920 or two or more network access nodes represented by network access node 2920) based on a result of a determination of a network control acceptance criterion.

In accordance with certain aspects, the network control acceptance criterion may correspond to user input and/or accessibility of a network access node and/or communication quality of a current device-to-device data communication link, and/or a hierarchy level of the network access node. For example, a wireless device may be configured to determine user input (e.g. via a corresponding application of the wireless device enabling a user to actively switch to a control and data plane separation service) and may be configured to switch to control of communications based on control plane data already being transmitted by a network access node. The wireless device may further be configured to request transmission (by transmitting a request message) of control plane and may be configured to switch to control of communications based on control plane data in accordance with a response of the at least one network access node.

Further, a wireless device may be configured to determine accessibility of the network access node (e.g. by regular, periodic or sporadic scanning, or by scanning in response to a user input) and may be configured to switch to control of communications based on control plane data, thus enabling the control and data plane separation service, in case the network access node is determined to be accessible.

Further, a wireless device may be configured to determine communication quality of a current D2D data communication link such as a current autonomous D2D link of two D2D mesh network nodes (e.g. by regular, periodic or sporadic link quality measurements of the wireless device) and may be configured to switch to control of communications based on control plane data, thus enabling the control and data plane separation service, in case the determined communication quality (e.g. SNR, SINR and/or communication stability) fails to fulfil a preset quality/stability criterion, e.g. falls below a predefined quality/stability threshold.

Further, a wireless device may be configured to determine a hierarchy level of the network access node (e.g. a hierarchy level of a newly detected network access node) and may be configured to switch to control of communications based on control plane data, thus enabling the control and data plane separation service, based on the hierarchy level as described further herein.

In accordance with various aspects, control plane data may be transmitted from at least one network access node to the wireless device using a control channel (for example a control channel also used in a cellular communication network to which the network access node is connected different from a data channel used by the wireless devices for communicating data plane data, or any other logical or physical channel carrying control information). In accordance with various aspects, such data channel may for example be a millimeter wave (mmW) communication channel. In other words, control and data plane communication may be layered such that a network access node, even though transmitting control plane data to the wireless device may be unaware of the actual data plane data communication being carried out between the wireless devices.

In accordance with certain aspects, such layered control and data plane separation service may provide advantages e.g. in situations where D2D communication between wireless devices may be less stable as communication controlled by a network access node such as for example a base station of a cellular communication system or for example a WLAN access point. For example, communication controlled via a base station of a cellular network may be more stable as e.g. millimeter wave (mmW) D2D communications, while mmW D2D communication may allow for a higher data rate. Thus, in accordance with certain aspects, a control and data place separation service may be employed for example such that data plane data is communicated via a (direct or relayed) mmW D2D link between a wireless device and a further wireless device e.g. while being connected to a D2D mesh network, said communication being controlled (e.g. by communication of control plane data such as time/frequency scheduling data, routing information, etc.) by said base station of the cellular communication network. Similarly, in accordance with certain aspects, such communication may be controlled by a different network access point such as e.g. an access point of a Wireless Local Access Network.

Figure 29:
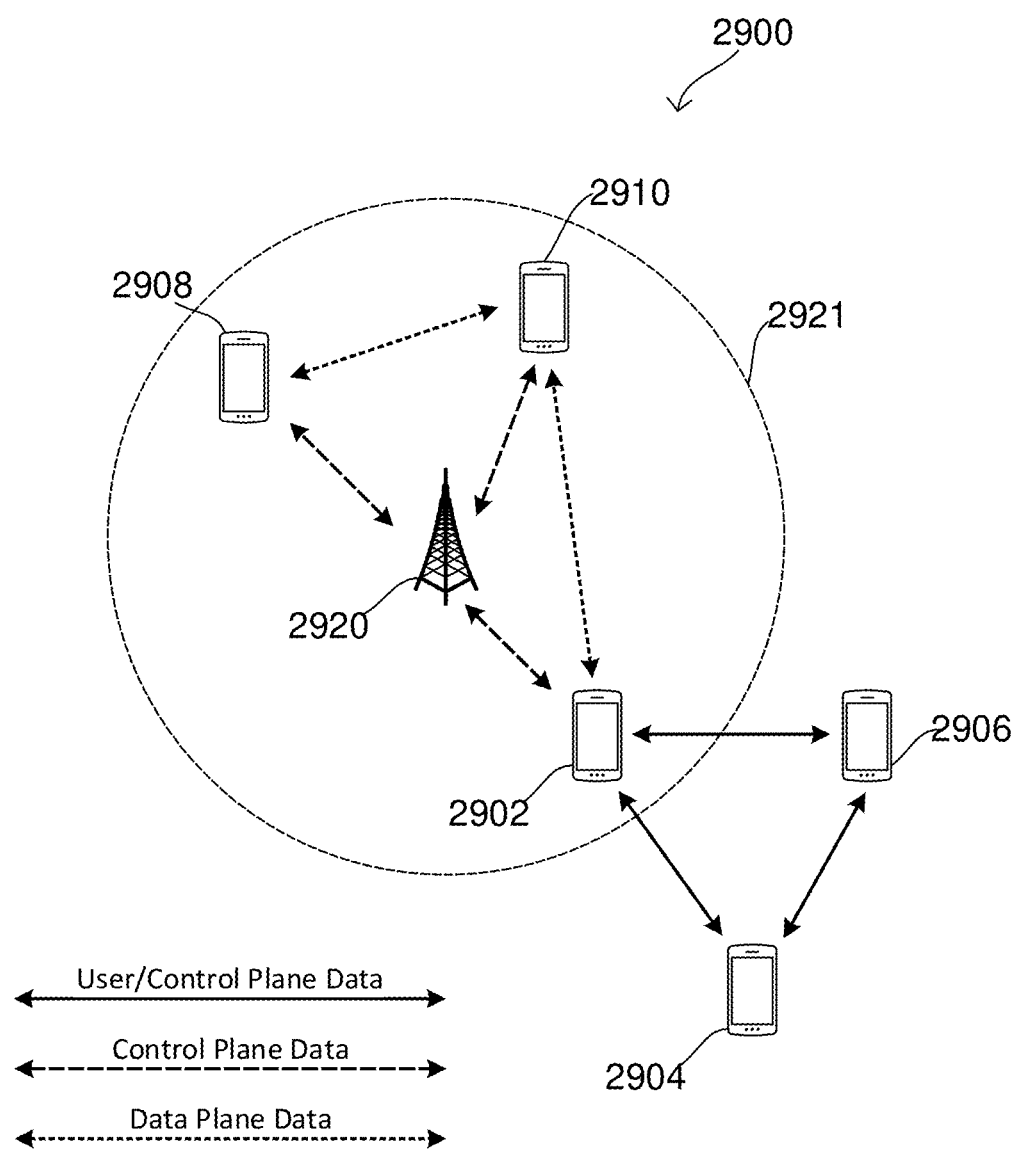
FIG. 29 shows D2D mesh network including exemplary wireless devices according to some aspects.

FIG. 29 shows D2D mesh network 2900 including exemplary wireless devices 2902, 2904, 2906, 2908 and 2910. While the number of wireless devices forming D2D mesh network 2900 is chose for illustrative purposes only, a D2D mesh network may in accordance with various aspects include more or viewer wireless devices. FIG. 29 further exemplarily illustrates network access node 2920 with exemplary area of coverage 2921. The figure exemplarily showing only a single network access node 2920 for conciseness purposes, said network access node 2920 may represent two or more network access nodes 2920 connected to a same network (e.g. a cellular communication network) while area 2921 may thus represent coverage of such two or more network access nodes. In certain aspects, the wireless device 2902 may be configured to receive control plane data simultaneously from more than one network access nodes e.g. upon performing handover and/or when employing a distributed control plane data reception from more than one network access node.

In the exemplary case shown in FIG. 29, wireless device 2902 employs control and data plane separation by communicating control plane data (as indicated by the dashed arrows) with network access node 2920 and communicating data (or user) plane data via a D2D link (as indicated by the dotted arrows) with the further wireless device 2910. The further wireless devices 2908 and 2910 within coverage 2921 of the network access node 2920 similarly employ control and data plane separation communicating data plane data via a D2D link (as indicated by the dotted arrow between wireless devices 2908, 2910) and communicating control plane data with network access node 2920 (as indicated by the respective dashed arrows). Wireless device 2902 may further communicate with wireless devices 2904, 2906 which are not within coverage 2921 of network access node 2920 via D2D links (as indicated by the respective solid arrows) based on data relating to mutual connections between wireless devices within the network 2900 of wireless devices. Similarly, wireless devices 2904, 2906 not within network coverage 2921 may communicate data via a D2D link (as indicated by the respective sold arrow) based on the data relating to mutual connections between wireless devices within the network 2900 of wireless devices.

In accordance with various aspects, a communication processor of wireless device 2902 may control D2D communications of the wireless device 2902 based on control plane data received from the network access node 2920 to communicate first data plane data with the further wireless device 2910, while, e.g. at the same time, said communication processor of wireless device 2902 may control D2D communications of the wireless device 2902 with the further wireless device 2904 and/or with a different further wireless device 2906 based on the data relating to mutual connections between wireless devices included in the network of wireless devices to communicate second data plane data with the further wireless device 2904 and/or with the different further wireless device 2906.

Thus, in accordance with various aspects, wireless devices included in a D2D mesh network within coverage of a network access node such as a base station of a cellular communication system may employ control and data plane separation and control communication of data plane data with further wireless devices included in the D2D mesh network based on control plane data received from the network access node. Thus, it may in certain aspects become possible to increase overall efficiency for the wireless devices included in the D2D mesh network which have access to the network access node because the network access node may in certain aspects take control of centralized resource allocation and overall control plane management. In certain aspects, such centralized resource management provided by the network access node may be more efficient as compared to distributed resource management and control typically employed in mesh networks.

Figure 30:
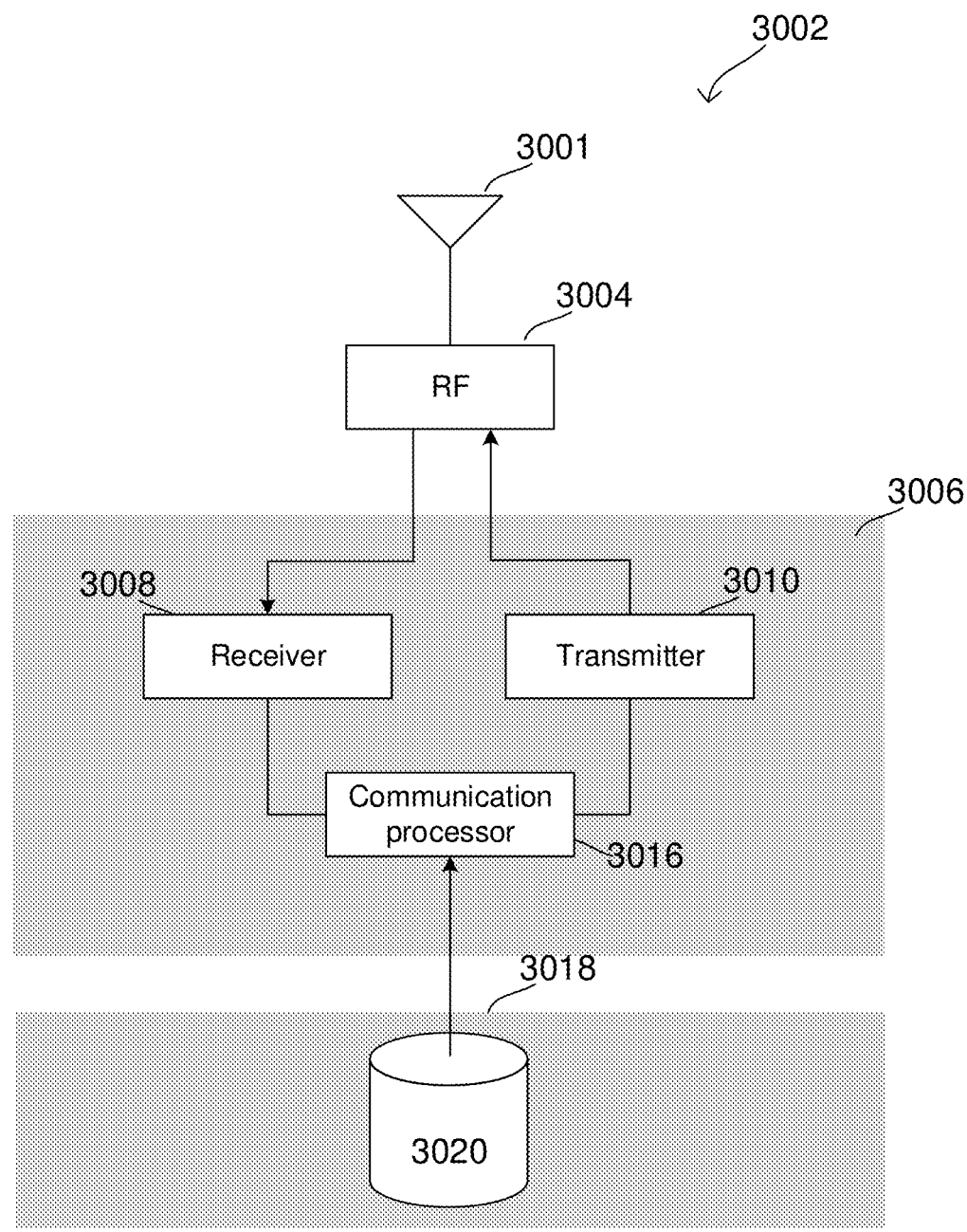
FIG. 30 shows an exemplary structural configuration of a wireless device according to some aspects.

FIG. 30 shows an exemplary structural configuration of a wireless device 3002 which may be included in or connected to a D2D mesh network (wireless device 3002 may for example correspond to any one of wireless devices 2902, 2904, 2906, 2908, or 2910 of D2D mesh network 2900 shown in FIG. 29). The structural configuration shown in FIG. 30 is focused on control and data plane separation features of wireless device 3002 and may therefore not expressly depict other components that are less directly related to these features. As illustrated, wireless device 3002 may include antenna system 3001, RF transceiver 3004, baseband modem 3006 and memory 3018. In some aspects, antenna system 3001, RF transceiver 3004, and baseband modem 3006 may be configured as described above for antenna system 202, RF transceiver 204, baseband modem 206 and memory 214 of terminal device 102. Accordingly, wireless device 3002 may be configured to transmit and receive wireless signals via antenna system 3001 and RF transceiver 3004. In the transmit direction, RF transceiver 3004 may therefore modulate and transmit baseband samples (provided by baseband modem 3006) via antenna system 3001. In the receive direction, RF transceiver 3004 may also receive and demodulate radio signals via antenna system 3001 and provide the resulting baseband samples to baseband modem 3006.

FIG. 30 also depicts several internal components of baseband modem 3006, including receiver 3008, transmitter 3010, and communication processor 3016. In some aspects, baseband modem 3006 may include a digital signal processor and a protocol controller. Receiver 3008, transmitter 3010, and communication processor 3016 may therefore be subcomponents of the digital signal processor (e.g., physical layer components) and/or subcomponents of the protocol controller (e.g., protocol stack components). In some aspects, receiver 3008 may be the physical layer receive chain, transmitter 3010 may be the physical layer transmit chain, and communication processor 3016 may be a processor part of the protocol stack layers of wireless device 3002. For example, receiver 3008 may include a demodulator, demapper (e.g., constellation demapper), de-interleaver, decoder, and/or descrambler. Receiver 3008 may receive wireless signals in the form of baseband samples via antenna system 3001 and RF transceiver 3004. Receiver 3008 may then sequentially process these baseband samples with the demodulator, demapper (e.g., constellation demapper), de-interleaver, decoder, and/or descrambler to produce a bitstream, which receiver 3008 may provide to communication processor 3016 (e.g., to the protocol stack layers). Transmitter 3010 may include a scrambler, encoder, interleaver, mapper (e.g., constellation mapper), and/or a modulator, which may sequentially process a bitstream (e.g., provided by protocol stack layers of communication processor 3016) to produce baseband samples (e.g., complex IQ symbols). Transmitter 3010 may then transmit these baseband samples as wireless signals via RF transceiver 3004 and antenna system 3001.

Communication processor 3016 may be a processor configured to execute control- and user-plane operations of the protocol stack layers. This may include generating messages for transmitter 3010 to transmit (e.g., messages including user/data plane data or control plane data) and/or recovering messages from bitstreams provided by receiver 3008. If receiver 3008 of wireless device 3002 (which may correspond to wireless device 2902 in FIG. 29) receives control plane data from a network access node (for example from network access node 2920 in FIG. 29), communication processor 3016 may in accordance with various aspects be configured to control device-to-device communications of wireless device 3002 with at least one further wireless device (for example wireless device 2910 in FIG. 29) based on control plane data received from the network access node to communicate first data plane data with the at least one further wireless device. In such aspects, the communication processor 3016 may further be configured to control device-to-device communications of the wireless device with the at least one further wireless device based on data relating to mutual connections between wireless devices included in a network of wireless devices (for example network 2900 of wireless devices in FIG. 29) to communicate the first data plane data with the at least one further wireless device if receiver 3008 does not receive the control plane data from the network access node.

While receiver 3008, transmitter 3010, and communication processor 3016 are shown separately in FIG. 30, in some aspects receiver 3008, transmitter 3010, and communication processor 3016 may structurally be a single processor configured to perform the respective operations of receiver 3008, transmitter 3010, and communication processor 3016.

Wireless device 3002 may in accordance with various aspects further include memory 3018 for storing a database 3020 including the data relating to mutual connections between wireless devices included in a network of wireless devices (the connectivity map). While FIG. 30 focuses on control and data plane separation aspects and shows only database 3002, memory 3018 may be used for storing further data and/or databases. As shown in FIG. 30, memory 3018 may be connected with baseband modem 3006. Thus, in accordance with various aspects, receiver 3008 of wireless device 3002 may be configured to (e.g. periodically) receive (at least part of) said connectivity map. Receiver 3008 may for example be configured to initially receive said connectivity map in full and may then be configured to periodically or sporadically receive part of said connectivity map as updates reflecting changes in network connections, e.g. due to wireless devices leaving and/or entering the D2D mesh network. For example, receiver 3008 may be configured to receive the connectivity map in full or an initial update of a connectivity map already stored in database 3020 during a first mesh establishment phase (e.g. mesh establishment phase 506 in FIG. 5). Receiver 3008 may then be configured to receive data relating to mutual connections between wireless devices included in the network of wireless devices (i.e. at least part of said connectivity map) as updates during mesh update phases (e.g. mesh update phases 510 and 514 shown in FIG. 5).

Figure 31A:
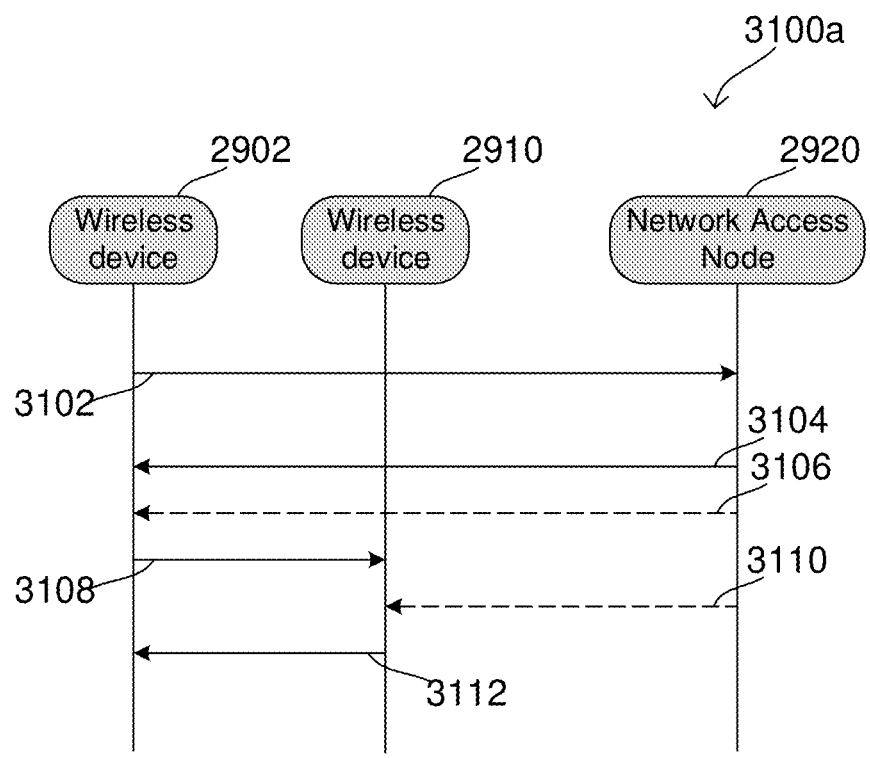
FIG. 31A shows an exemplary sequence chart illustrating communications between a wireless device, at least one further wireless device and a network access node according to some aspects.

FIG. 31A shows exemplary sequence chart 3100a illustrating communications between wireless 2902 (a wireless device), wireless device 2910 (at least one further wireless device) and network access node 2920. As shown, in accordance with certain aspects, transmitter 3010 of wireless device 2902 may transmit a request message for control plane data to the network access node 2920, e.g. a request message for a control and data plane separation service, to network access node 2920 at stage 3102. In accordance with certain aspects, said request message may request control plane data for communication of data plane data from the wireless device 2902 to wireless device 2910 connected to network access node 2920. In accordance with certain aspects, said request message may in addition or alternatively request control plane data for communication of data plane data from the wireless device 2902 to wireless device 2910 connected to network access node 2920 for specific applications only while wireless device 2902 may communicate data plane data for different applications with wireless device 2910 as D2D mesh network communication, e.g. based on the data relating to mutual connections.

Network access node 2920 may transmit an acknowledgement message to wireless device 2902 in response to the request message at stage 3104. In accordance with certain aspects, network access node 2902 may further transmit control plane data for communication of data plane data from the wireless device 2902 to wireless device 2906, which may be known to wireless device 2902 e.g. based on the connectivity map or based on scanning performed by wireless device 2902. As wireless device 2906 is not connected to network access node 2920, network access node 2920 may respond with a non-acknowledgement message at stage 3104, in which case wireless device 2902 may for example establish D2D mesh network data plane data communication with wireless device 2906 based on the data relating to mutual connections.

In certain aspects, transmission of such request message may be triggered by a user of wireless device 2902 who may actively initiate the request message. Thus, in certain aspects communication processor 3016 of wireless device 2902 may be configured to determine the network control acceptance criterion corresponding to user input and may switch to control D2D communication of wireless device 2902 based on control plane data based on a result of the determination. For example, if requested by a user via user input, the communication processor may switch to such control based on existing data (e.g. being already transmitted and/or broadcasted by a network access node). Further, in certain aspects, the transmitter may be configured to transmit the request message for control plane data to the network access node based on a result of the evaluation and the switching may be performed in accordance with a response from the network access node (e.g. after having received an acknowledgement message from the network access node).

In other words, in accordance with various aspects, a control and data plane separation service may be actively initiated and/or requested by a user of a wireless device which may already be connected to a D2D mesh network. For example, a wireless device such as a mobile terminal device (e.g. a smart phone, a smart watch, etc.) may be configured to run an application including an option for a user to select the wireless device to activate a control and data plane separation service (i.e. to trigger the request message). Such application may e.g. actively offer such option to the user when a access to a network access node is available and/or the user may be given the option to try initiating such service without knowledge of accessibility of a network access node. Alternatively or in addition, user input may correspond to a dynamically stored, semi-static user input. For example, a user may register at least one certain geographical area (a country, a region, a city, etc.) in the vicinity of which a data and control plane separation service is not desired and/or may register at least one geographical area (a country, a region, a city, etc.) in the vicinity of which a data and control plane separation service is desired. Based on such criterion, wireless device 2902 may be configured to decide whether or not to transmit the request message at stage 3102 (e.g. not transmit at stage 3102 when being within geographical area where the service is not desired and transmit at stage 3102 when being within geographical area where the service is desired). The wireless device may be configured to determine its geographical location e.g. based on reception of satellite based positioning system signals (e.g. GPS, GNSS signals, etc.).

Likewise, in accordance with certain aspects, a user may register one or more applications for which a control and data plane separation service is desired or not desired, and the wireless device may be configured to decide whether or not to transmit the request message at stage 3102 in analogy to the decision based on the at least one geographical area. For example, a user may register a security and/or privacy application for which control and data plane separation may not be desired. If the wireless device is running such application, it may decide to not transmit the request message at stage 3102 for data communication of such application (while in certain aspects, the wireless device may for example simultaneously apply control and data plane separation for different applications and accordingly may not disregard a corresponding notification for such different application).

Figure 31B:
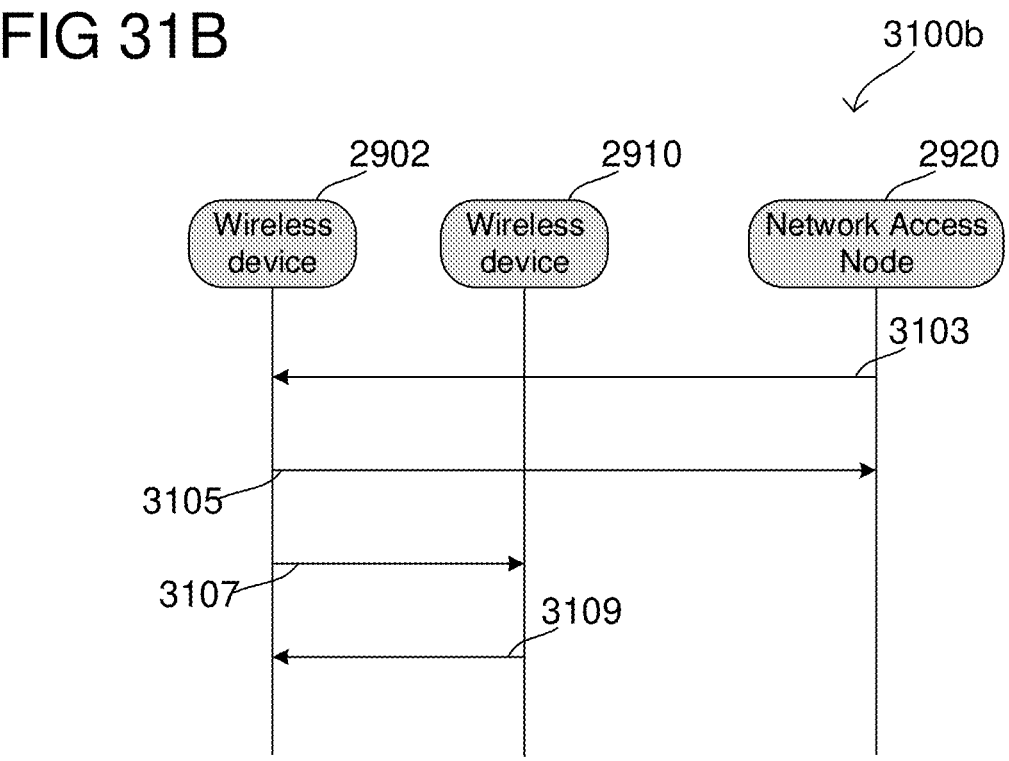
FIG. 31B shows an exemplary sequence chart illustrating communications between a wireless device, at least one further wireless device and a network access node according to some aspects.

In certain aspects control plane data transmitted from network access node 2920 to wireless device 2902 may further include application prioritization information. For example, if a network to which network access node 2920 is connected is highly loaded or even congested, a network access node may nevertheless allow a wireless device 2902 to employ the control and data plane separation service (e.g. upon request as at stage 3102 of FIG. 31A or upon being notified as at stage 3103 of FIG. 31B) for one or more selected applications running and/or to be running at the wireless device 2902. For example, even if such network is heavily loaded or even congested, the network may allow for a control and data plane separation service at wireless device 2902 for security and/or emergency applications.

Thus, in accordance with various aspects, a wireless device may employ an agile switching configuration. In other words, a wireless device may be configured to switch to a control and data plane separation service when it is appropriate and may be configured to not switch to the control and data plane separation service when it is not appropriate. Alternatively or in addition, in certain aspects, a configuration of a wireless device may be such that a control and data plane separation service is automatically initiated by the wireless device. In other words, a wireless device may automatically switch to control D2D communications of the wireless device based on control plane data received from the at least one network access node based on a result of a determination of the network access criterion, e.g. in case the network control acceptance criterion is network accessibility and/or communication quality of a current D2D data transmission link. Control pane data may already be present in form of already transmitted/broadcasted control plane data or may be used by the wireless device upon request. Thus, in such aspects, a wireless device may be configured to perform the switching automatically after having requested control pane data from the network access node.

A wireless device may in such aspects be for example be configured to automatically switch to and/or request the control and data plane separation service once access to a network access node is available and/or based on communication quality/stability of a current D2D data transmission link to a further wireless device. For example, a wireless device (e.g. a transmitter of the wireless device) may be configured to automatically switch to and/or request (e.g. trigger the request message at stage 3102) the control and data plan separation service based on a communication quality criterion such as stability and/or quality. For example, the wireless device (e.g. a transmitter of the wireless device) may be configured to automatically switch to and/or request (e.g. trigger the request message at stage 3102) the service when a communication quality parameter (e.g. Signal-to-interference-plus-noise ratio (SINR), Signal-to-noise ratio (SNR)) falls below a predefined threshold. Wireless device 2902 may thus in such aspects be configured to determine to be within network coverage 2921 of network access node 2920 (e.g. based corresponding information received by receiver 3008 from network access node 2920) and may then be configured to automatically transmit said request message to the network access node at stage 3102. In other words, in certain aspects, said network control acceptance criterion may correspond to accessibility of a network access node.

Thus, in certain aspects, the communication processor 3016 of wireless device 2902 may be configured to start controlling device-to-device communications of the wireless device 2902 with wireless device 2910 (the at least one further wireless device) based on received control plane data if receiver 3008 of wireless device 2902 receives an acknowledgement message from the network access node in response to the request message. In certain aspects, wireless device 2902 may be configured to transmit said request message to the network access node 2920 while communicating data plane data with wireless device 2910 using D2D mesh network communication (i.e. based on based on data relating to mutual connections between wireless devices included in a network of wireless devices). In such aspects, the communication processor 3016 of wireless device 2902 may be configured to switch from controlling device-to-device communications of the wireless device 2902 with wireless device 2910 (the at least one further wireless device) based on the data relating to mutual connections between wireless devices included in the network of wireless devices to controlling device-to-device communications of the wireless device 2902 with wireless device 2910 (the at least one further wireless device) based on received control plane data if receiver 3008 of wireless device 2902 receives an acknowledgement message from the network access node 2920 in response to the request message.

In certain aspects, said acknowledgement message may include control plane data. In alternative aspects, network access node may transmit control plane data in a separate message at stage 3106. In accordance with certain aspects, control plane data may include time and/or frequency allocation information based on which wireless device 2902 may transmit the data plane data to wireless device 2910. For example, frequency allocation information may allocate frequencies for data plane data transmission from wireless device 2902 to wireless device 2910 within a millimeter wave communications range. Thus, by employing control and data plane separation in such aspects, it may become possible to exploit advantages of millimeter wave communications (e.g. possible high data rates) with communication stability which may be offered by a centralized control e.g. via a base station of a cellular communication system. In other words, a receiver of wireless device 2910 may be configured to receive data plane data from wireless device 2902 via a millimeter wave communications channel. Likewise, wireless device 2902 (the wireless device) may be configured to receive data plane data from wireless device 2910 (the at least one further wireless device) via a millimeter wave communications channel.

In certain aspects the control plane data may include routing information identifying at least one route within the network of wireless devices for data plane data to be transmitted from wireless device 2902 (the wireless device) to wireless device 2910 (the at least one further wireless device). For example, in certain aspects where the direct path as exemplarily illustrated in FIG. 29 between wireless devices 2902, 2910 is not available (e.g. due to a static or moving beam impairment, due to insufficient quality of a communications channel, etc.), the at least one route identified by the routing information may comprise at least one relayed route (a route from wireless device 2902 to wireless device 2910 including one or more relaying wireless devices) and the routing information may further identify one or more relaying wireless devices included in the network of wireless devices for relaying at least a part of the data plane data from the wireless device to the at least one further wireless device.

In other words, the routing information may identify a single relayed route between wireless device 2902 and wireless device 2910 such as the relayed route from wireless device 302 to wireless device 324 illustrated in FIG. 3. In certain aspects, the routing information may identify more than one relayed route between wireless device 2902 and wireless device 2910 such that transmission of data plane data may be branched as for example exemplarily illustrated by the branched relayed routes from wireless device 302 to wireless device 324 illustrated in FIG. 4.

In further aspects, the at least one route identified by the routing information may comprise a direct route for transmitting at least a respective part (all or part) of the data plane data directly from the wireless device to the at least one further wireless device. In such aspects, it may be possible to transmit the data plane data via the direct route only, or to branch the transmission of the data plane data by transmitting part of the data plane data via the direct route and part of the data plane data via one or more relayed paths as indicated by the routing information.

In certain aspects, the control plane information may comprises interleaving information for controlling spatial interleaving of respective parts of the data plane data transmitted via the at least one route identified by the routing information. In other words, in accordance with certain aspects, data plane data may be interleaved and spread over two or more spatially differing routes within the D2D mesh network which may reduce adverse effects of interference that may be spatially confined and affect only a subgroup of the spatially differing routes. Respective interleaving parameters may in such aspects be included as interleaving information in the control plane data. Thus, in accordance with such interleaving aspects, data bits may be distributed onto different (physical/logical) data routes, e.g. to data routes with different spatial properties (e.g. using antennas with different directional configuration, e.g. one antenna sending data in one direction plane and a further antenna sending data in a different direction plane). For example, data bits b0, b1, b2, . . . may be split onto different data routes dr0, dr1, dr2, . . . (where each data route may correspond to a respective spatial antenna configuration): b0→dr0, b1→dr1, b2→dr2, . . . . In a further example, different configurations of bits may be split (interleaved) differently onto different routes. For example b0 and b1 may be send using dr0, b2 and b3 may be send using dr1, b4 and b5 may be send using dr2, etc.

Referring back to FIG. 31A, in accordance with various aspects, if the receiver 3008 of the wireless device 2902 thus receives control plane data from the network access node 2920, the communication processor 3016 of wireless device 2902 is configured to control device-to-device communications of the wireless device 2902 with wireless device 2910 (the at least one further wireless) device based on the control plane data received from the network access node 2920 to communicate the data plane data with the at least one further wireless device at stage 3108.

In response, wireless device 2910 may respond with a transmission of data plane data at stage 3112. In certain aspects, wireless device 2910 may be configured to transmit said data plane data using the same frequency resources as used by wireless device 2902. In certain aspects, wireless device 2910 may be configured to transmit said data plane data based on control plane data received from network access node 2920 at stage 3110. While FIG. 31A may exemplarily show transmission of control plane data at stage 3110 after stage 3108, such transmission may be performed by network access node before stage 3108 after stage 3106 or at stage 3106. Further, while wireless device 2910 may receive control plane data from network access node 2920 at stage 3110, wireless device 2910 may transmit the data plane data at stage 3112 using a distributed channel access protocol (for example equal to or similar to an access protocol used in case of WiFi or 3GPP LAA technology).

Communication of data plane data may continue between wireless devices 2902 and 2910 based on data plane data received at wireless device 2902 and/or at wireless device 2910 from network access node 2920. While for example wireless device 2910 may communicate data plane data with wireless device 2902 based on control plane data received from network access node 2920, wireless device 2910 may in certain aspects be configured to communicate data plane data based on a distributed channel access protocol. Such communication of data plane data may be terminated e.g. if wireless device 2902 and/or wireless device 2920 has no further data plane data to communicate.

Further, in certain aspects, communication of data plane data between wireless devices 2902 and 2910 based on received control plane data may be actively terminated by one or both of the wireless devices 2902, 2910 by actively notifying the network access node (for example in reaction to user input or if reception quality of control plane data falls below a predefined threshold). In other words, transmitter 3010 of wireless device 2902 (and/or of wireless device 2910) may in certain aspects be configured to transmit termination information to the network access node for causing the network access node to terminate transmission of control plane information to the wireless device.

Further, in certain aspects, communication of data plane data between wireless devices 2902 and 2910 based on received control plane data may be terminated by one or both of the wireless devices 2902, 2910 without notifying the network access node, e.g. when one or both wireless devices 2902, 2910 leave the area of coverage 2921 of network access node 2920. In other words, in certain aspects, the receiver 3008 of wireless device 2902 (and/or of wireless device 2910) may in certain aspects be further configured to terminate reception of control plane information from the network access node.

Further, in certain aspects, communication of data plane data between wireless devices 2902 and 2910 based on received control plane data may be terminated by the network access node. In other words, the receiver 3008 of wireless device 2902 (and/or of wireless device 2910) may in certain aspects be further configured to receive information from the network access node causing the receiver to terminate reception of control plane information from the network access node.

For example, in accordance with certain aspects, the control of data plane communication between wireless devices 2902, 2910 may be terminated by the network access node by sending said notification for example when the network access node detects that one or both of wireless devices 2902, 2910 may need to leave the data and control plane separation service. Such detection by the network access node may be triggered for example when one or both of wireless devices 2902, 2910 leave coverage 2921 of the network access node 2920 (which may be detected by the network access node e.g. based on quality of received signals or based on geographical information of the wireless devices 2902, 2910).

Further, such detection by the network access node may in another example in accordance with certain aspects be triggered further when wireless devices 2902, 2910 become widely separated and thus experience different channel characteristics and interference. For example, this may be triggered if wireless devise 2902, 2910 are separated by more than 2 kilometers. Such separation may be detected by the network access node in certain aspects based on a notification received from one or more of the wireless devices 2902, 2910 and/or based on geographical information of the wireless devices 2902, 2910 known to the network access node.

In a further example, in accordance with certain aspects, such detection by the network access node may be triggered when one or both wireless devices 2902, 2910 enter an area a network to which network access node 2920 belongs (e.g. a cellular network) does not offer a control and data plane separation service, the detection in certain aspects being based on geographical information of the wireless devices 2902, 2910 known to the network access node.

In certain aspects, such detection by the network access node may be triggered further for example in case communication characteristics of wireless devices 2902, 2910 indicate to the base station that a distributed communication without control and data plane separation is preferential. For example, if wireless devices 2902, 2910 transmit data only very rarely, overhead caused by the control and data plane separation service at network access node may be considered unjustified (for example without limitation, a single transmission during a duration of ten transmission frame lengths may in certain aspects be considered as not justifying switching to a control and data plane separation service).

In accordance with certain aspects, if reception of control plane information is terminated by the network access node or e.g. by wireless device 2902, i.e. if reception of control plane information is terminated and/or if the transmitter transmits the termination information to the network access node, the communication processor 3016 e.g. of wireless device 2902 may be configured to start controlling device-to-device communications of the wireless device 2902 with wireless device 2910 (the at least one further wireless device) based on the data relating to mutual connections between wireless devices included in the network of wireless devices. In other words, in accordance with certain aspects, in such case, the communication processor 3016 e.g. of wireless device 2902 may be configured to switch from controlling device-to-device communications of the wireless device 2902 based on received control plane data to controlling device-to-device communications of the wireless device 2902 with wireless device 2910 (the at least one further wireless device) based on the data relating to mutual connections between wireless devices included in the network of wireless devices.

As mentioned further herein, a control and data plane separation service may be actively initiated and/or requested by a user of a wireless device which may already be connected to a D2D mesh network and/or automatically initiated and/or requested by the wireless device. Alternatively or in addition, as illustrated by sequence chart 3100b in FIG. 31B, such control and data plane separation service may be proposed or announced by the network access node by transmission of corresponding notification information to the wireless device at stage 3103. Thus, in accordance with various aspects, the receiver 3008 may be configured to receive notification information from the network access node notifying a transmission of control plane data from the network access node to the wireless device. Hereby, the notification information may notify an option to transmit control plane data to the wireless device which in certain aspects can be acknowledged by the wireless device by responding with a corresponding acknowledgement message at stage 3105 before wireless device 2902 may e.g. switch from D2D mesh network control based on the data relating to mutual connections to control based on received control plane data. Alternatively, in certain aspects, such notification information may be an information of control plane data already scheduled to be transmitted from the network access node to the wireless device. Thus, in accordance with various aspects, the communication processor 3016 of wireless device 2902 may be configured to start controlling device-to-device communications of the wireless device 2902 with wireless device 2910 (with the at least one further wireless device) and/or may be configured to switch from controlling device-to-device communications of the wireless device 2902 with wireless device 2910 (the at least one further wireless device) based on the data relating to mutual connections between wireless devices included in the network of wireless devices to controlling device-to-device communications of the wireless device 2902 with wireless device 2910 (the at least one further wireless device) based on received control plane data in response to the received notification.

In accordance with various aspects, said notification transmitted at stage 3103 may in notify control plane data for communication of data plane data for specific applications only. In such aspects, wireless device 2902 may be configured to accept or not accept such request for the specific application only, while wireless device 2902 may communicate data plane data for different applications e.g. with wireless device 2910 as D2D mesh network communication, e.g. based on the data relating to mutual connections.

In accordance with various aspects of the present disclosure, a wireless device may have the freedom to disregard an offer for a control and data plane separation service from the network access node. To this end, in accordance with various aspects, the communication processor 3016 of wireless device 2902 may be configured to evaluate said network control acceptance criterion and to disregard the received notification based on a result of the evaluation, whereby the network control acceptance criterion may in certain aspects correspond for example to a hierarchy level of the network access node and/or to user input.

For example, a wireless device such as a mobile terminal device (e.g. a smart phone, a smart watch, etc.) may be configured to run an application including an option that a user of the wireless device is informed of the notification received from the network access node. The application may then provide a possibility for the user to accept or disregard the offer by corresponding user input. Alternatively or in addition, user input may correspond to a dynamically stored, semi-static user input. As mentioned, for example, a user may register at least one geographical area (a country, a region, a city, etc.) in the vicinity of which a data and control plane separation service is not desired and/or may register at least one geographical area (a country, a region, a city, etc.) in the vicinity of which a data and control plane separation service is desired. Based on such network control acceptance criterion, wireless device 2902 may be configured to decide whether or not to disregard the notification at stage 3103 (e.g. disregard when being within geographical area where the service is not desired and accept when being within geographical area where the service is desired). The wireless device may be configured to determine its geographical location e.g. based on reception of satellite based positioning system signals (e.g. GPS, GNSS signals, etc.). Likewise, in accordance with certain aspects, a user may register one or more applications for which a control and data plane separation service is desired or not desired, and the wireless device may be configured to decide whether or not to disregard the notification at stage 3103 in analogy to the decision based on the at least one geographical area. For example, a user may register a security and/or privacy application for which control and data plane separation may not be desired. If the wireless device is running such application, it may decide to disregard the notification at stage 3103 for data communication of such application (while in certain aspects, the wireless device may for example simultaneously apply control and data plane separation for different applications and accordingly may not disregard a corresponding notification for such different application).

Alternatively or in addition, a control and data plane separation service may be implemented based on hierarchy levels and the wireless device may be configured to disregard the notification received at stage 3103 based on such hierarchy levels. For example, in certain aspects, a hierarchy level may indicate that a network access node in general has priority such that the wireless device 2902 may be prevented from disregarding the received notification. Further, in certain aspects may be set based on a type of the network access node. For example, a type of the network access node may correspond to the network access node being a network access node of a cellular communication system in general, the network access node being more specifically a NodeB, an evolved NodeB (eNB), a gNodeB, or a different kind of base station of a cellular network, or a Wi-Fi/WLAN Access Point, or a Road Side Unit (RSU), or a different access point suitable for providing control plane data for controlling D2D data plane data communications of the wireless device and the hierarchy level may be set in accordance with such type. Only as illustrative example, hierarchy levels may be set such that a wireless device is prevented from disregarding the received notification in case the network access point is a gNodeB and such that the wireless device disregards the received notification in case the network access point is a WLAN access point. In accordance with various aspects, such hierarchy levels may be preset for a wireless device and/or may be open to a dynamic adjustment. For example, the wireless device may be configured to allow setting of such priority levels based on user input (e.g. via a corresponding application running on the wireless device). Further, alternatively or in addition, a wireless device may be configured to allow setting of such priority levels by a wireless coordinator device such as a network access node (e.g. a base station of a cellular network and/or a WLAN access point) and/or a further wireless device included in the D2D mesh network of wireless devices.

In accordance with various aspects, a wireless device may be configured to receive control plane data from a network access node, e.g. including time/frequency scheduling information and/or routing information and may be configured to overrule such decision e.g. based on further information. For example, based on the connectivity map or based on different additional information (knowledge of beam impairments, etc.) the wireless device may prefer transmitting data plane data via a different route as the route in accordance with received routing information.

In such aspects, the wireless device 2902 (e.g. the transmitter 3010 of the wireless device 2902) may be configured to respond to the received control plane data with adapted control plane data (a proposal differing from the proposal of the network access node). In such aspects, the wireless device 2902 (e.g. the receiver 3008 of the wireless device 2902) may be configured to receive a control data response message (e.g. an acknowledgement message or a non-acknowledgement message) from network access node 2920 and may be configured (the application processor 3016 of wireless device 2902 may be configured) to control communication of data plane data to wireless device 2910 (at least one further wireless device) based on the control plane data received from the network access node or based on the adapted control plane data transmitted to the network access node based on the control data response message. For example, the wireless device 2902 may control data plane data communication to the wireless device 2910 based on the received control plane data if the control data response message is a non-acknowledgement message and may control data plane data communication to the wireless device 2910 based on the transmitted adapted control plane data if the control data response message is an acknowledgement message.

In accordance with various aspect, notifying a possible control and data plane separation may be advantageous in that it may enable a network access node to impose control over an autonomous D2D mesh network. In addition to potentially improved communication quality and/or communication stability, such control may enable to adapt a mesh network topology. For example, if in case of a relayed transmission link from a source wireless device included in the D2D mesh network and under control of the network access node to a target wireless device included in the D2D mesh network and under control of the network access node, one or more relaying wireless devices vanish or are lost (e.g. due to leaving an area 2921 covered by the network access node 2920 or by the two or more network access nodes 2920, as a result of being turned off, as a result of poor communication quality, etc.) the network access node 2920 may transmit said notification at stage 3103 e.g. including routing information including respective wireless device IDs, requesting the wireless device 2902 to replace the vanished or lost relaying wireless device. Such request may in certain aspects be open to a determination at the wireless device 2902 whether or not to accept such notification as described above.

Turning back to FIG. 31B, following either stage 3105 or stage 3103 in case wireless device does not transmit an acknowledgement message or non-acknowledgement message, wireless devices 2902, 2910 may enter D2D communications either based on control plane data received from network access node 820 or based as D2D mesh network communications based on the data relating to mutual connections. As in the case illustrated in FIG. 31A (stages 3106, 3110), one or both wireless devices 2902, 2910 may be configured to receive control plane data from the network access node 2920 based on which said communication may be controlled.

As mentioned, network access node 2920 shown exemplarily as single network access node 2920 may be representative of two or more network access nodes, while area 2921 may be representative of a coverage area of said two or more network access nodes. Thus, in accordance with various aspects, after an initiation phase of a control and data plane separation service (e.g. stages 3102, 3104 and/or stages 3103, 3105 in FIGS. 31A, 31B), a network access node within the coverage of which at least the wireless device 2902 may be located may perform control to maintain a D2D communication link of wireless device 2902, e.g. by repeatedly transmitting control plane data. Accordingly, wireless device 2902 (a receiver thereof) may be configured to periodically or sporadically receive control plane data from network access node 2920. Further, in case wireless device 2902 may approach an edge of coverage of a single network access node 2920, which may be known to network access node 2920 based on geographical information of the wireless device 2902, based on communication link measurements between network access node 2920 and wireless device 2902, etc., network access node 2920 may control a handover of the wireless device 2902 to a network access node neighboring the single network access node 2920. Accordingly, in accordance with certain aspects, the control plane data received by wireless device 2902 from network access node 2920 may include handover control information. As mentioned above, a communication of data plane data by the wireless device 2902 based on control plane data received from network access node 2920 may be terminated actively, by the network access node 2920, by the wireless device 2902 or may be passively terminated, which may correspond to a termination of service phase.

Thus, a wireless device in accordance with various aspects may be configured to employ a control and data plane separation service for data plane communication with at least one further wireless device, the wireless device and the at least one further wireless device being included in a D2D mesh network of wireless devices. In accordance with certain aspects, a wireless device connected to a D2D mesh network and configured to control communications within said network based on the connectivity map (the data relating to mutual connections between wireless devices included in a network of wireless devices) described herein, with at least one further wireless device, may choose to control communications with the at least one further wireless device based on control plane data received from the at least one network access node based on a result of a determination of the described network control acceptance criterion. Such service may in accordance with certain aspects be requested by said wireless device which may already be connected to a D2D mesh network, e.g. in cases where the network acceptance criterion corresponds to user input, or automatically, e.g. in cases where the network acceptance criterion corresponds to accessibility of a communications network as described herein. Such service may in accordance with certain aspects be announced by the network access node to said wireless device which may already be connected to a D2D mesh network, while the wireless device may be configured to reject (disregard) said announcement (notification).

Thus, as compared e.g. to D2D communications that may be established within a cellular network under control of a radio base station, in certain aspects, control of communications by the wireless device with the at least one further wireless device based on control plane data may be established in certain aspects after the wireless device is connected to the D2D mesh network. In other words, in accordance with certain aspects, a network access node from which the wireless device may receive the control plane data may be unaware of and/or at least not involved in establishment of the D2D mesh network. In addition, a wireless device in accordance with various aspects of the present disclosure may be connected to a D2D mesh network further including at least one further wireless device (e.g. wireless device 2910 in FIG. 29) within coverage 2921 of the network access node and/or within coverage of a communication system 2921 and/or connected to the network access node 2920 and/or the communication system 2921, the D2D mesh network further including at least one further wireless device (e.g. wireless device 2906 in FIG. 29) not within coverage 2921 of the network access node and/or not within coverage of a communication system 2921 and/or not connected to the network access node 2920 and/or the communication system 2921.

Figure 32:
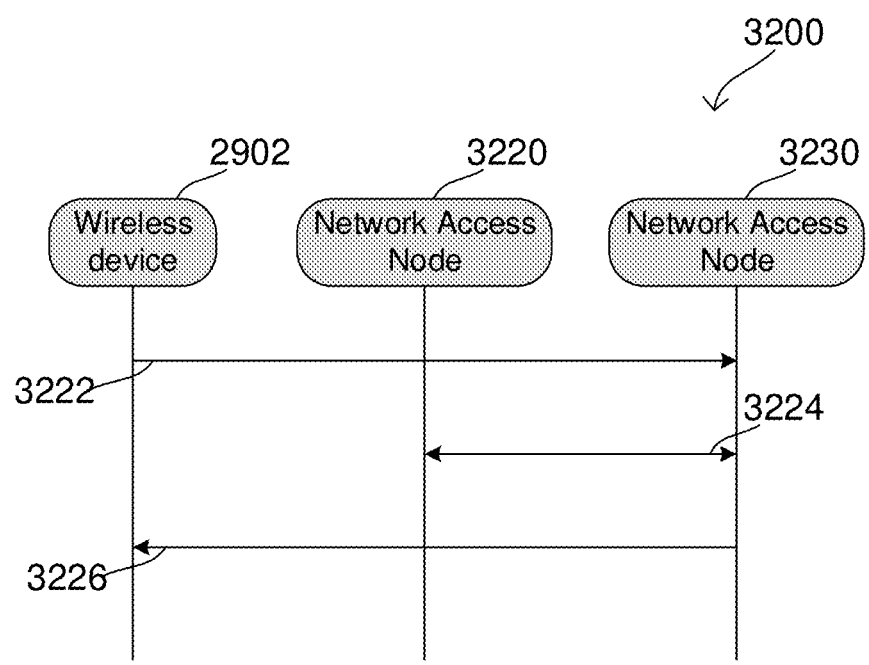
FIG. 32 shows a further exemplary sequence chart illustrating communication between a network access node and a further network access node according to some aspects.

FIG. 32 shows exemplary sequence chart 3200 illustrating communication between network access node 3220 which may in certain aspects correspond to network access node 2920 shown in FIG. 29 and a further network access node 3230 not shown in FIG. 29 and in certain aspects not being a network access node for the network for which network access node 2920 is network access node. Network access node 3230 may in certain aspects reflect the fact that more than one choice may exist to select a network for participating in data and control plan separation. Exemplary networks may include for example an LTE network, a 3G network, a WiFi network, etc. Thus, in certain aspects, a network access node 3220, 3230 may correspond to any network access node as described in the introduction, e.g. a network access node may correspond to any one of a NodeB, an evolved NodeB (eNBs), a gNodeB, a Wi-Fi/WLAN Access Point (AP), and/or a Road Side Unit (RSU). Given this, in certain aspects, a network access node 3230 may assume a role of a mediator network access node to which a wireless device can send a request message, requesting information on one or more available network access nodes that may take part in control and data plane separation with the wireless device.

As shown in FIG. 32, the transmitter 3010 of wireless device 2902 may in certain aspects be configured to transmit a request message for network access node identification information to wireless access node 3230 (to at least one further network access node). In other words, wireless device 2902 may at stage 3222 transmit a request message to network access node 3230 requesting information (access node identification information) on one or more available networks that may be configured to take part in control and data plane separation with wireless device 2902. In turn, at stage 3224, the network access node 3230 may be configured to identify one or more available networks that may be configured to take part in control and data plane separation with wireless device 2902 by exchange of information on such available network access nodes with wireless device 3220 (and/or one or more network access nodes).

As further illustrated, at stage 3226, the receiver 3008 of wireless device 2902 may be configured to receive network access node identification information identifying network access node 3220 from network access node 3230 (the at least one further network access node). Based on a communication as exemplarily illustrated in FIG. 32, the transmitter 3010 of wireless device 2902 may then be configured to transmit the request message for control plane data to the network access node 3220 based on the received network access node identification information.

In accordance with various aspects, it may be possible to trigger activation of a control and data plane separation via an indirect communication between wireless device 2902 and network access node 2920. For example, in accordance with various aspects, the request message transmitted at stage 3102 in FIG. 31A may be transmitted via a relayed route including at least one relaying wireless device and/or at least one proxy wireless device. Alternatively or in addition, the notification received at wireless device 2902 at stage 3103 of FIG. 31B may be received at the wireless device 2902 from at least one relaying wireless device and/or from at least one proxy wireless device. Thus in accordance with various aspects, the transmitter 3010 of wireless device 2902 may be configured to transmit the request message for control plane data to the network access node to at least one further wireless device to be relayed by the at least one further wireless device to the network access node. Alternatively or in addition, the receiver 3008 of wireless device 2902 may be configured to receive the notification the notification information indirectly from the network access node via at least one further wireless device.

Figure 33:
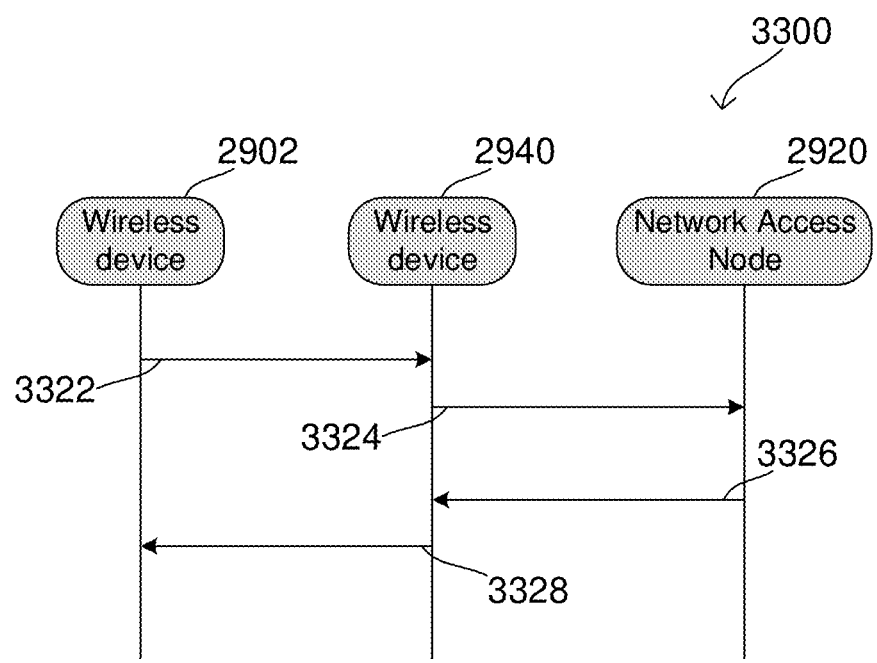
FIG. 33 shows a sequence chart of communication stages where a control and data plane separation service is triggered via another wireless device included in the D2D mesh network of wireless devices.

FIG. 33 shows sequence chart 3300 of communication stages where a control and data plane separation service is triggered via another wireless device included in the D2D mesh network of wireless devices. As shown, wireless device 2902 may transmit a request message for information to wireless device 2940 (which may correspond to any one of wireless devices 2904, 2906, 2908 or 2910 of mesh network 2900 shown in FIG. 29 or to a further wireless device of the mesh network not illustrated) at stage 3322. Communication processor 3016 of wireless device 2902 may in certain aspects be configured to insert identification information as described herein into the message to be relayed at stage 3322. Network access node 2940 acting as relaying wireless device or as proxy wireless device may forward the request message to network access node 2920 which may be configured to evaluate said request message based on the included identification information of wireless device 2902. Network access node may be further configured to transmit an acknowledgement message of the request message associated with (e.g. the same) identification for identifying wireless device 2902 to wireless device 2940 at stage 3326 which may in turn forward said acknowledgement message to wireless device 2902 thus acknowledging the request message transmitted by wireless device 2902 at stage 3328.

Further, in certain aspects, the network access node 2920 may be configured to transmit an non-acknowledgement message of the request message associated with (e.g. the same) identification for identifying wireless device 2902 to wireless device 2940 at stage 3326 which may in turn forward said non-acknowledgement message to wireless device 2902 thus denying the request message transmitted by wireless device 2902 at stage 3328.

While aspects of the present disclosure may relate to wireless devices included in or connected to device-to-device (D2D) mesh networks, certain aspects of the present disclosure aiming at reducing effects of interference imposed by access node controlled communications of a further wireless device on communications of a wireless device may be applicable more generally in addition to a wireless device not included in or connected to a D2D mesh network. While certain aspects of the present disclosure may thus be applicable to wireless devices being on the one hand connected to a D2D mesh network (and thus are configured to control communications with at least one further wireless device via D2D communication links based on data relating to mutual connections between wireless devices included in said mesh D2D network of wireless devices) and on the other hand to a network access node such as a base station of a cellular network, aspects of the present disclosure may further be applicable for example to a wireless device being connected to a first network access node and to a second network access node, the first and second network access nodes not being connected e.g. by a backhaul link, e.g. being respectively at edges of corresponding communication networks, for example while the wireless device performs a handover from the second network access node to the first access node, where communications of a further wireless device being connected to the second network access node impose interference on communications of the wireless device with the first network access node.

Figure 34:
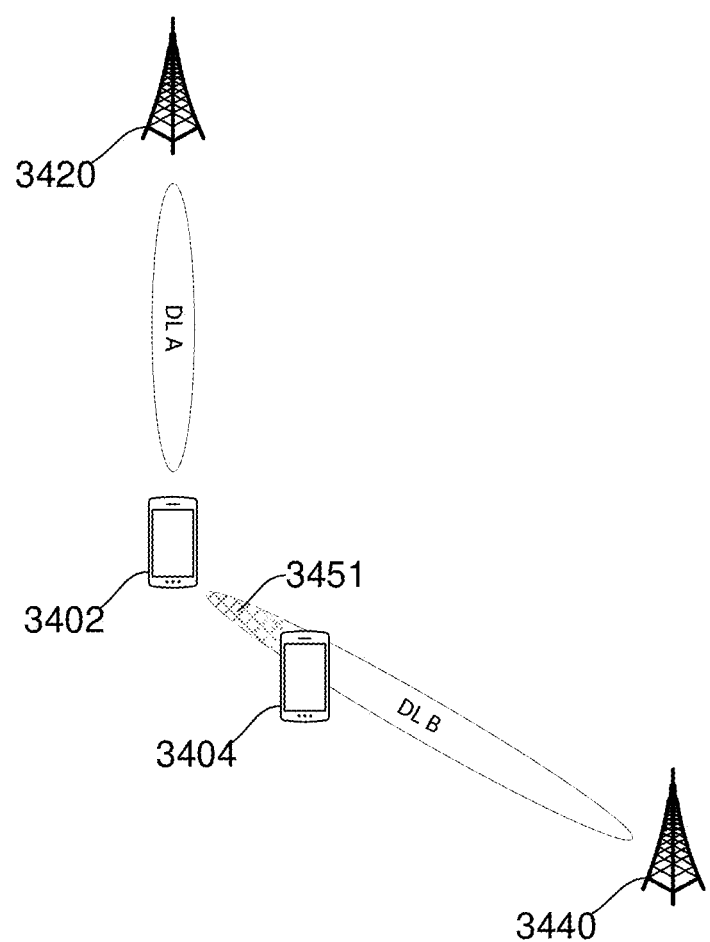
FIG. 34 shows wireless devices and base stations according to some aspects.

Aspects of the present disclosure may more generally relate to wireless devices and base stations as exemplarily shown in FIG. 34. As shown, a wireless device 3402 is connected to base station 3420 (an example of the first network access node) and wireless device 3404 (a further wireless device) is connected to base station 3440 (an example of the first network access node). While FIG. 34 may illustratively show base stations as exemplary network access nodes, concepts as disclosed herein may similarly be applicable to further network access nodes as mentioned in the introduction. In specific exemplary aspects, a network access node may correspond to a base station of a 5G NR network, e.g. to a gNodeB. In the example shown in FIG. 34, wireless devices 3402, 3404 may operate at a same carrier frequency (e.g. within 5G NR sub 6 GHz FR1 bands) while base station 3420 and base station 3440 may not be mutually connected, e.g. via a backhaul link. In other words, base stations 3420 and 3440 may correspond to respective network edges and may for example correspond to different network regions with different operators. Thus, in certain aspects, base station 3420 (the first network access node) and base station 3440 (the second network access node) may be connected to different (e.g. cellular) communication networks). While wireless device 3402 may receive a downlink transmission A from base station 3420, wireless device 3404 may receive a downlink transmission B from base station 3440, which may impose interference 3451 on the downlink transmission A received by wireless device 3402. With no link being established between base stations 3420, 3440, base stations 3420, 3440 may in certain examples not be capable of performing e.g. real-time parameter exchange addressing such interference issue.

Given such situation, aspects of the present disclosure may generally address issues that may arise when communications between a network access node and a wireless device do not include cell specific control information such as cell specific reference signals. For example, while LTE communications may employ such cell specific reference signals, 5G NR communications may employ downlink (DL) reference signals that are not cell specific but wireless device specific. Examples of wireless device specific reference signals in accordance with various aspects of the present disclosure include e.g. CSI-RS (Channel State Information-Reference Signals), DMRS (Demodulation Reference Signals), TRS (Tracking Reference Signals), and PTRS (Phase Tracking Reference Signals). In such situation, for example wireless device 3402 may not be capable of descrambling interfering reference signals corresponding to downlink transmission B addressed to wireless device 3404 because such reference signals are specific to wireless device 3404. Wireless device 3402 may therefore not be able to reconstruct signal waveforms of data signals addressed to wireless device 3404 and may thus be incapable of employing for example interference cancellation algorithms (e.g. joint channel estimation, successive interference cancellation, etc.) to extract downlink data addressed to wireless device 3402 transmitted from base station 3420 from the combined data transmission signal that wireless device 3402 receives from base stations 3420 and 3440 (the downlink transmission A with the interference signal 3451 superimposed thereto).

Addressing for example such interference scenarios, various aspects of the present disclosure provide interference mitigation approaches described further herein by enabling wireless device 3402 (a wireless device) to extract downlink data addressed to wireless device 3402 from a data transmission signal received from base station 3420 (a first network access node) and from base station 3440 (at least one second network access node) based on wireless device specific control data corresponding to wireless device 3404 (at least one further wireless device). In other words, a signal processor of a wireless device may in accordance with various aspects of the present disclosure be configured to at least partially remove an interference signal received from base station 3440 (at least one second network access node) from a data transmission signal received from base station 3420 (a first network access node) and from base station 3440 (at least one second network access node) based on wireless device specific control data corresponding to wireless device 3404 (at least one further wireless device). In such aspects, the interference signal may correspond at least to a data signal from base station 3440 (at least one second network access node) carrying second data addressed to wireless device 3404 (at least one further wireless device). In accordance with certain aspects, the wireless device specific control data may be transmitted for example from the second network access node to which the further wireless device is connected (e.g. base station 3440 in FIG. 34) to the wireless device (wireless device 3402), e.g. during a soft handover of the wireless device (wireless device 3402) from a network to which the second network access node is connected to a network to which the first network access node is connected. Further, in accordance with certain aspects, the wireless device specific control data may be transmitted for example from wireless device 3404 to wireless device 3402 via a device-to-device (D2D) communication link established between wireless device 3402 and wireless device 3404. In accordance with various aspects, such D2D communication link may be an autonomous D2D communication link not controlled by a network access node. Thus, in accordance with various aspects of the present disclosure, a wireless device (e.g. wireless device 3404) may include a receiver configured to receive at least one data transmission signal from at least one network access node (e.g. base station 3440) and a transmitter configured to transmit wireless device specific control data corresponding to the wireless device (e.g. to wireless device 3404) to at least one further wireless device (e.g. wireless device 3402). In accordance with various aspects, the wireless device may further comprise a receiver configured to receive a request message for requesting transmission of wireless device specific control data of the wireless device from the at least one further wireless device. In other words, the wireless device may be configured to transmit the information upon request, i.e. in accordance with a "pull" mechanism. Alternatively or in addition, the wireless device may transmit such information without initial request, i.e. in accordance with a "push mechanism". In such aspects, the transmitter of the wireless device may for example be configured to broadcast the wireless device specific control data corresponding to the wireless device.

Interference mitigation approaches in accordance with various aspects of the present disclosure may for example be useful for 5G NR sub-6 Ghz band communications (FR1). In such FR1 communications, while a corresponding base station (a gNodeB) may employ beamforming for the downlink transmission, reception at wireless devices may be omnidirectional within FR1 bands such that a wireless device may receive downlink transmission from a neighboring gNodeB to a further wireless device as interference.

Figure 35:
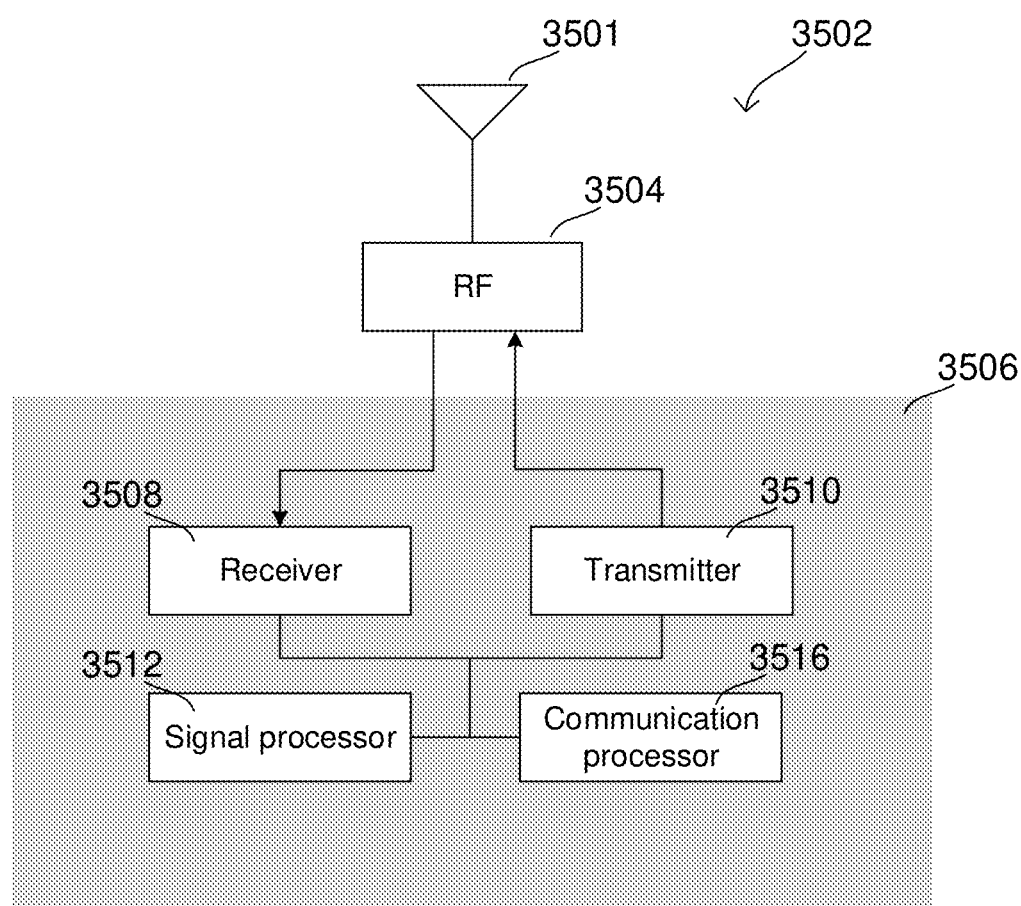
FIG. 35 shows an exemplary structural configuration of a wireless device according to some aspects.

FIG. 35 shows an exemplary structural configuration of a wireless device 3502 which may for example correspond to any one of wireless devices 3402, 3404 shown in FIG. 34. The structural configuration shown in FIG. 35 is focused on interference mitigation features of wireless device 3502 and may therefore not expressly depict other components that are less directly related to these features. As illustrated, wireless device 3502 may include antenna system 3501, RF transceiver 3504, and baseband modem 3506. In some aspects, antenna system 3501, RF transceiver 3504, and baseband modem 3506 may be configured as described above for antenna system 202, RF transceiver 204, baseband modem 206 and memory 214 of terminal device 102. Accordingly, wireless device 3502 may be configured to transmit and receive wireless signals via antenna system 3501 and RF transceiver 3504. In the transmit direction, RF transceiver 3504 may therefore modulate and transmit baseband samples (provided by baseband modem 3506) via antenna system 3501. In the receive direction, RF transceiver 3504 may also receive and demodulate radio signals via antenna system 3501 and provide the resulting baseband samples to baseband modem 3506.

FIG. 35 also depicts several internal components of baseband modem 3506, including receiver 3508, transmitter 3510, signal processor 3512 and communication processor 3516. In some aspects, baseband modem 3506 may include a digital signal processor and a protocol controller. Receiver 3508, transmitter 3510, signal processor 3512 and communication processor 3516 may therefore be subcomponents of the digital signal processor (e.g., physical layer components) and/or subcomponents of the protocol controller (e.g., protocol stack components). In some aspects, receiver 3508 may be the physical layer receive chain, transmitter 3510 may be the physical layer transmit chain, while signal processor 3512 and communication processor 3516 may be processors part of the protocol stack layers of wireless device 3502. For example, receiver 3508 may include a demodulator, demapper (e.g., constellation demapper), de-interleaver, decoder, and/or descrambler. Receiver 3508 may receive wireless signals in the form of baseband samples via antenna system 3501 and RF transceiver 3504. Receiver

3508 may then sequentially process these baseband samples with the demodulator, demapper (e.g., constellation demapper), de-interleaver, decoder, and/or descrambler to produce a bitstream, which receiver 3508 may provide to communication processor 3516 (e.g., to the protocol stack layers). Transmitter 3510 may include a scrambler, encoder, interleaver, mapper (e.g., constellation mapper), and/or a modulator, which may sequentially process a bitstream (e.g., provided by protocol stack layers of communication processor 3516) to produce baseband samples (e.g., complex IQ symbols). Transmitter 3510 may then transmit these baseband samples as wireless signals via RF transceiver 3504 and antenna system 3501.

Communication processor 3516 may be a processor configured to execute control- and user-plane operations of the protocol stack layers. This may include generating messages for transmitter 3510 to transmit (e.g., messages including user/data plane data or control plane data) and/or recovering messages from bitstreams provided by receiver 3508. Signal processor 3512 may be a processor configured to employ interference cancellation algorithms (e.g. joint channel estimation, successive interference cancellation, etc.) to extract first data from a data transmission signal received from a first network access node (e.g. from base station 3420 in FIG. 34) and from a second network access node (e.g. from base station 3440 in FIG. 34). The first data may correspond to downlink data addressed to the wireless device (e.g. wireless device 3402 in FIG. 34) while the data transmission signal may be a superposition of a data signal (e.g. downlink transmission A in FIG. 34) carrying the first data and an interference signal (e.g. interference signal 3451 in FIG. 34). The interference signal superposed to the data signal carrying the first data may correspond to a second data signal from the second base station carrying second data addressed to a further wireless device connected to the second network access node. In accordance with various aspects, signal processor 3512 may be configured to process the received data transmission signal based on wireless device specific control data (e.g. data corresponding to a wireless device specific reference signal) corresponding to the further wireless device to extract the first data from the data transmission signal. In accordance with certain aspects, receiver 3508 may be configured to receive the wireless device specific control data (e.g. the data corresponding to the wireless device specific reference signal) from the second network access node (e.g. base station 3440 in FIG. 34) and/or from the further wireless device (e.g. wireless device 3404 in FIG. 34).

In alternative aspects a wireless device (e.g. a UE_A) may employ dual-sim (subscriber identity module) technology, where a single wireless device could communicate in parallel with two network access nodes (e.g. gNB_A and gNB_B) from different networks. One of the network access nodes (e.g. gNB_B) may then be configured to share wireless device specific information corresponding to a different wireless (e.g. UE_B) with the wireless device (e.g. a UE_A) so that the wireless device (e.g. a UE_A) may use it for interference cancellation/mitigation.

While receiver 3508, transmitter 3510, signal processor 3512 and communication processor 3516 are shown separately in FIG. 35, in some aspects receiver 3508, transmitter 3510, signal processor 3512 and communication processor 3516 may structurally be a single processor configured to perform the respective operations of receiver 3508, transmitter 3510, signal processor 3512 and communication processor 3516.

In accordance with various aspects of the present disclosure, a wireless device may be configured to extract data addressed to the wireless device from a received data transmission signal corresponding to an interference signal superimposed onto a data signal carrying the data addressed to the wireless device, based on wireless device specific control data corresponding to a further wireless device. In certain aspects, said wireless device specific control data may be transmitted to the wireless device by a network access node to which the further wireless device is connected. For example, the network access node (the second network access node) to which the further wireless device is connected may broadcast wireless device specific control data corresponding to one, more or all wireless devices connected to said network access node (the second network access node). Said network access node may for example periodically broadcast such wireless device specific control data. Alternatively, in certain aspects, a transmitter of the wireless device (e.g. of wireless device 3402 in FIG. 34) may be configured to transmit a request message to the network access node (e.g. to base station 3440 in FIG. 34) to which the further wireless device (e.g. wireless device 3404 in FIG. 34) is connected requesting transmission of wireless device specific control data corresponding to the further wireless device. The receiver of the wireless device (e.g. of wireless device 3402 in FIG. 34) may then be configured to receive the wireless device specific control data, which the network access node (e.g. base station 3440 in FIG. 34) to which the further wireless device (e.g. of wireless device 3404 in FIG. 34) is connected, may transmit in response to the request message.

While in accordance with certain aspects the wireless device specific control data corresponding to the further wireless device may be received from the base station to which the further wireless device is connected, in accordance with certain aspects, said wireless device specific control data may be received from the further wireless device via a device-to-device (D2D) communication link. As mentioned, such D2D communication link may in accordance with various aspects be an autonomous D2D communication link not controlled by a network access node such as a base station. By using (autonomous) device-to-device link, wireless devices connected to different (e.g. cellular) networks may be enabled to autonomously share their wireless device specific control data (e.g. cellular related control data) with further wireless devices to employ interference cancelation thus improving cellular link robustness. While in accordance with certain aspects, autonomous device-to-device link may be employed to communicate wireless device specific control data between wireless devices connected to network access nodes not being mutually connected, the network access nodes being e.g. connected to different networks (e.g. at network edges), certain aspects may similarly employ the autonomous device-to-device link to communicate wireless device specific control data between wireless devices connected to network access nodes of a same network (e.g. a cellular network). Thus, in accordance with various aspects, device-to-device links may be established in parallel to links of wireless devices to network access nodes in general to exchange the wireless device specific control data in order to enable the wireless devices to employ interference mitigation techniques such as (advanced) interference cancellation techniques to improve communication quality of communications of the wireless devices with and/or via the respective network access nodes.

In accordance with various aspects, an autonomous device-to-device communication link may be a device-todevice communication link of a wireless device (e.g. wireless device 3402 in FIG. 34) established with at least one further wireless device (e.g. wireless device 3404 in FIG. 34), where the wireless device and the further wireless device are connected to or included in a D2D mesh network and are thus configured to control communications (the autonomous device-to-device communication link) based on data relating to mutual connections between wireless devices included in a network of wireless devices. Such wireless devices may thus be connected to or form a D2D mesh network.

Figure 36:
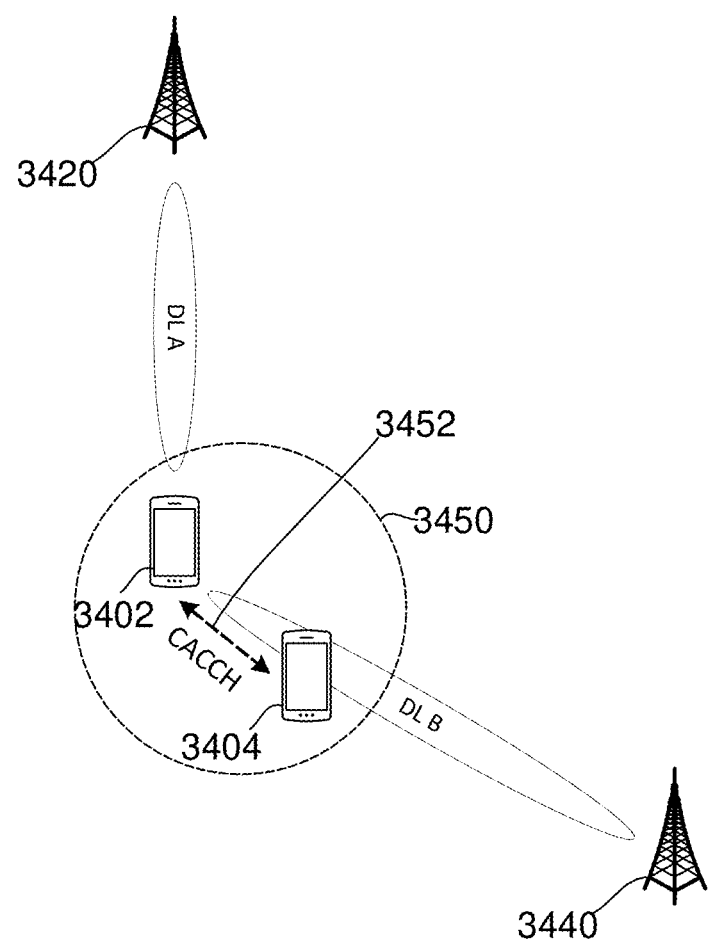
FIG. 36 shows wireless devices and base stations according to some aspects.

FIG. 36 shows the wireless devices 3402 and 3404 and the base stations 3420 and 3440 of FIG. 34. As in case of FIG. 34, network access node 3420 (e.g. gNodeB 3420) may correspond to a serving cell of wireless device 3402 and may allocate for example downlink wireless device specific reference signals (e.g. DMRS, an example of wireless device specific control data) associated to wireless device 3402. Network access node 3440 (e.g. gNodeB 3440) may correspond to a serving cell of UE_B and may allocate for example downlink wireless device specific reference signals (e.g. DMRS, an example of wireless device specific control data) associated only to wireless device 3404. As mentioned, because e.g. in accordance with 5G NR FR1 technology, wireless device 3402 may employ an omnidirectional receive antenna setup, wireless device 3402 may receive a data transmission signal being a superposition of its serving cell downlink signals from network access node 3420 and of downlink signals from network access node 3440 to wireless device 3404 as interference signal. For example, wireless device specific reference signal DMRS can be interfered by wireless device specific reference signal DMRS which may result in non-optimal channel estimation performance for wireless device 3402.

Even though in accordance with certain aspects wireless device 3402 may be configured to blindly detect cell specific parameters of wireless device 3404 (e.g. by neighboring cell Synchronization Signal Block (SSB) detection, in the situation illustrated in FIG. 34, wireless device 3402 may not be able to derive wireless device specific parameters of wireless device 3404 and may therefore be incapable of descrambling wireless device specific reference signals corresponding to wireless device 3404 (e.g. DMRS) such that in a situation as shown in FIG. 34, wireless device 3402 may be incapable of applying e.g. advanced interference cancellation techniques (e.g. joint channel estimation, successive interference cancellation) to extract downlink data transmitted from base station 3420 from the combined data transmission signal that wireless device 3402 receives from base stations 3420 and 3440 (the downlink transmission A with the superposed interference signal 3451 of FIG. 34) to improve its channel estimation performance.

As illustrated in FIG. 36, in order to enable interference mitigation approaches in accordance with various aspects of the present disclosure, receiver 3508 of wireless device 3402 may be configured to receive the wireless device specific control data corresponding to wireless device 3404 from wireless device 3404 via a device-to-device (D2D) communication link 3452.

For example, in certain aspects, wireless device 3402 and wireless device 3404 may be configured to set up a specific, autonomous D2D link not controlled by any network access node to communicate wireless device specific control data. Alternatively or in addition, in certain aspects, wireless device 3402 and wireless device 3404 may be connected to or included in a D2D mesh network 3450 of wireless devices (which may or may not include more wireless devices while only wireless devices 3402, 3404 are shown in FIG. 36 for conciseness of the figure). In such D2D mesh network aspects, a communication processor of wireless device 3402 (and of wireless device 3404) may be configured to control device-to-device communications of wireless device 3402 with wireless device 3404 and any different further wireless device included in network 3450 of wireless devices based on data (the connectivity map) relating to mutual connections between wireless devices included in a network of wireless devices.

Further, in certain aspects, wireless device 3402 detecting the interference signal 3451 in FIG. 34 may be configured to transmit (e.g. broadcast) a request message for establishing a D2D communication link to wireless device 3404. Wireless device 3404 may transmit its wireless device specific control information for communications with network access node 3440 to wireless device 3404 in response to the request message. For example, wireless device 3404 may establish a specific autonomous D2D communication link with wireless device 3402 to transmit its wireless device specific control information or wireless devices 3402, 3404 may establish a connection within a D2D mesh network (e.g. by going through any of the stages, e.g. stages 502, 504, 506 of connection establishment process 500 described with reference to FIG. 5) in response to such request message.

Referring back to FIG. 36, wireless device 3402 may thus receive wireless device specific control data from wireless device 3404 which in accordance with various aspects may include wireless device specific parameters e.g. for reference signal (e.g. DMRS) configuration such as seeds for generating reference signal (e.g. DMRS) de-scrambling codes and/or DMRS time/frequency allocation information. The wireless device specific control data may in certain aspects further include a Physical cell ID of the serving cell (base station 3440) of wireless device 3404 and/or DMRS configuration from base station 3440 to wireless device 3404, associated with a time-stamp. Being provided with such data, the wireless device 3402 may employ e.g. advanced interference cancellation algorithms to extract the data addressed to wireless device 3402 from the received data transmission signal and to mitigate effects of interfering wireless device specific reference signals (e.g. DMRS) from wireless device 3404.

In accordance with various aspects, wireless device specific control data may correspond to data at least associated with one wireless device specific ID. For example, such wireless device specific ID could be a RNTI (Radio Network Temporary Identifier) which may in accordance with various aspects be identification information configured from a network access node (e.g. a gNB) to a particular wireless device. The wireless device specific ID may in accordance with various aspects determine the wireless device specific reference signal (e.g. DMRS, CSI-RS, TRS, PTRS), which may also be wireless device specific.

Figure 37:
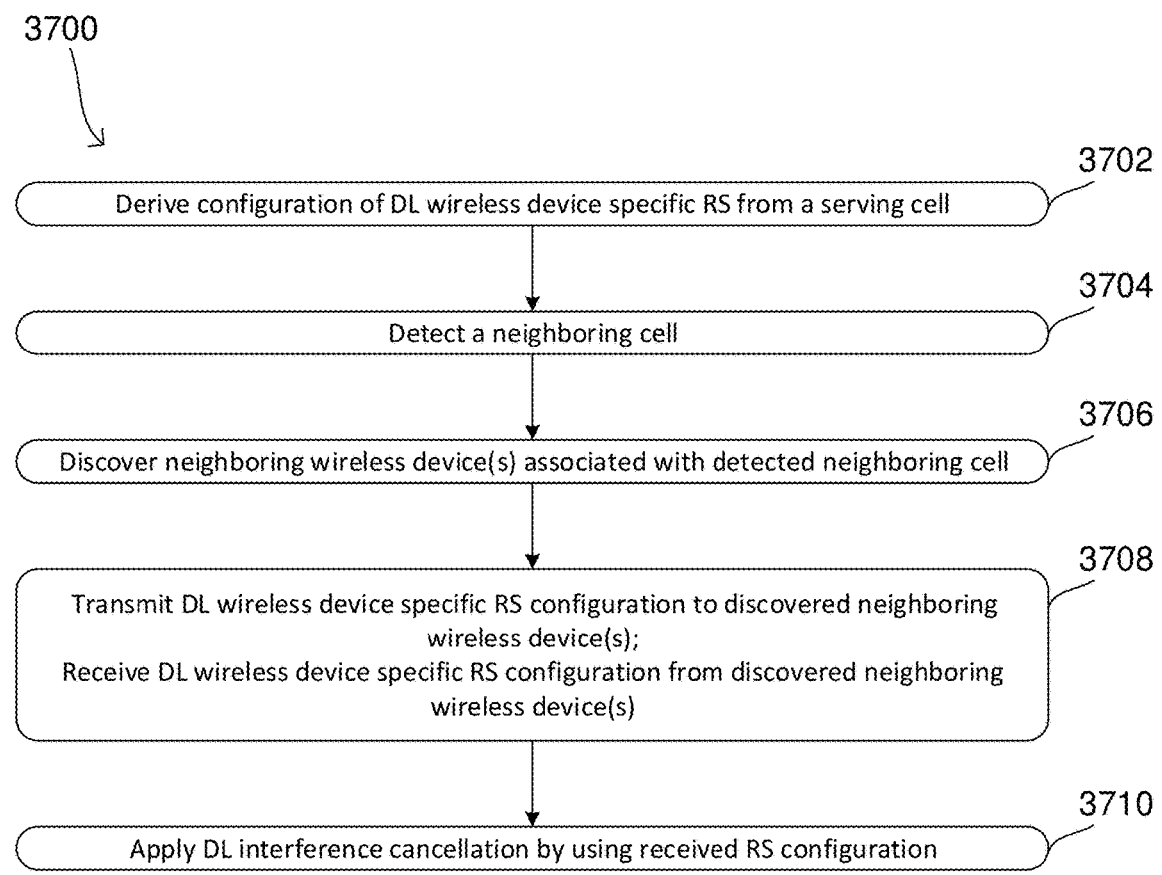
FIG. 37 illustrates an exemplary method according to which wireless devices may mitigate interference according to some aspects.

FIG. 37 illustrates exemplary method 3700 according to which wireless devices 3402 and 3404 illustrated in FIG. 36 may mitigate interference. As illustrated, at stage 3702, each of wireless devices 3402, 3404 may derive its wireless device specific control data for its communications with its own serving base station (e.g. base station 3420 in case of wireless device 3402 and base station 3440 in case of wireless device 3404). For example, each of wireless devices 3402, 3404 may derive a configuration of its wireless device specific reference signals (e.g. CSI-RS and/or DMRS), e.g. via communication with its serving base station, which may allocate such wireless device specific reference signals.

Further, as illustrated, at stage 3704, each of wireless devices 3402, 3404 may detect a neighboring cell and may discover neighboring wireless devices associated with the detected neighboring cells at stage 3706 to be enable establishing D2D links with discovered wireless devices associated with neighboring cells. For example, in accordance with various aspects, each of wireless devices 3402, 3404 may perform any one of the stages, e.g. in particular stages 502, 504, 506 of the connection establishment process 500 described with reference to FIG. 5 at stage 3706.

Having discovered neighboring wireless devices at stage 3706 (e.g. wireless device 3402 may have discovered wireless device 3404 and vice versa), each wireless device may transmit its downlink wireless device specific reference signal configuration (an example of wireless device specific control data) to the discovered wireless devices via an autonomous D2D communication link at stage 3708. In other words, a transmitter e.g. of wireless device 3402 may in accordance with various aspects be configured to transmit wireless device specific control data to wireless device 3404 via a D2D communication link such that the wireless device specific control data is shared among the wireless devices. Thus, similarly, each wireless device may receive downlink wireless device specific reference signal configuration (an example of wireless device specific control data) from the discovered wireless devices via the autonomous D2D communication link. Based on the received wireless devices specific control data, each wireless device may internally apply interference cancellation at stage 3710 to mitigate interference imposed by (cellular) network communications of the discovered wireless devices. In other words, in accordance with various aspects, wireless devices connected to different (e.g. cellular) networks may be configured to establish an autonomous D2D link in parallel to the network connections, such autonomous D2D link not being subject to control by a network access node, to exchange wireless device specific control information. Each wireless device may be configured to employ interference mitigation techniques, such as interference cancellation techniques, based on received wireless device specific control data, to reduce or cancel interference imposed by network (e.g. cellular network) communications of neighboring wireless devices and thus to extract data signals address to each wireless device from its own network access node (e.g. serving base station) and thus to improve its own communications within the (e.g. cellular) network.

In accordance with various aspects, the receiver 3508 of wireless device 3402 may be configured to receive the wireless device specific control data via an autonomous D2D communication link in a Cellular Assistant Control Channel (CACCH), a physical channel carrying the wireless device specific control data required for cellular network communication of wireless device 3404. Thus, by using such (autonomous) device-to-device link, wireless devices connected to different (e.g. cellular) networks may be enabled to autonomously share their wireless device specific control data (e.g. cellular related control data) using the CACCH with further wireless devices to employ interference cancelation thus improving cellular link robustness.

In accordance with various aspects, the CACCH can be multi-cast or broadcast from one wireless device to one or more further wireless devices. Thereby, in certain aspects, a CACCH from different wireless devices may be time/frequency multiplexed within a pre-defined resource pool. In accordance with various aspects, a CACCH transmitted by a wireless device may be associated with base station or network access node identification information (e.g. a physical cell ID) with which the wireless device transmitting the CACCH communicates and/or is connected. Further, in certain aspects, a CACCH can be associated with geographical information (e.g. GPS and/or GNSS data) relating to a position of a wireless device transmitting the CACCH. In such aspects, a receiver of wireless device 3402 may be configured to prioritize processing of data transmission signals corresponding to CACCHs from further wireless devices that are closer to the wireless device and that may be a cause of stronger interfering transmissions as of further wireless devices farther away. For example, a signal processor of a wireless device may be configured to perform processing of a received data transmission signal based on respective wireless device specific control data ordered in accordance with increasing distance of wireless devices corresponding to the respective wireless device specific control data. Alternatively, or in addition, in certain aspects a signal processor of the wireless device may be configured to process a received data transmission signal based on respective wireless device specific control data corresponding to respective wireless devices that are within a predefined distance from the wireless device. In such aspects, the signal processor may be configured to process the received transmission signal only based on such wireless device control data of wireless devices within the predefined distance, or to process the received data transmission signal based on such wireless device specific control data first.

In accordance with various aspects, wireless devices may be configured to align a time/frequency position of predetermined (and thus pre-known) signals (such as pilot resource blocks, preambles, etc.) of a transmission of a wireless device with a time/frequency position of a data sequence part of a transmission of another wireless device using the CACCH. By aligning time/frequency positions of such pre-known sequences of a first transmission with data portions of a second transmission, interference-mitigation may be facilitated for the data portion since interference may be pre-determined based on pre-knowledge of pilot resource blocks or preambles.

Figure 38A:
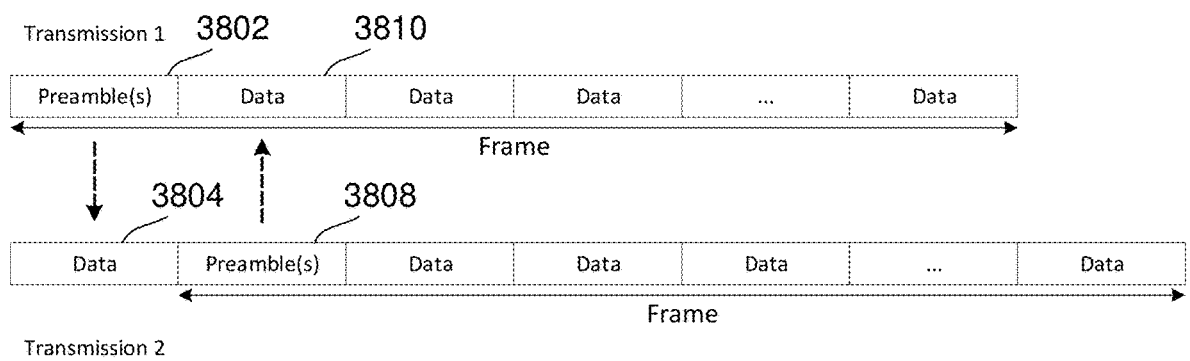
FIG. 38A illustrates data transmission frames according to some aspects.
Figure 38B:
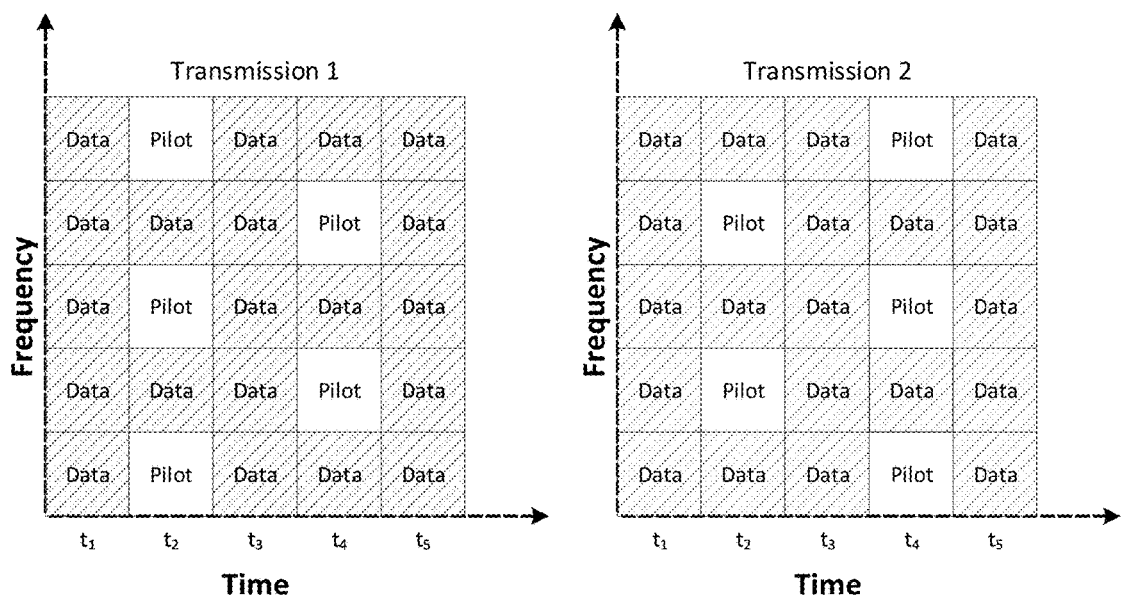
FIG. 38B illustrates data transmission time and frequency resource grids according to some aspects.

FIGS. 38A and 38B illustrate alignment of time/frequency positions of pre-known sequences of a first transmission (transmission 1 e.g. from base station 3420 to wireless device 3402) with time/frequency positions of data portions of a second transmission (transmission 2 e.g. from base station 3440 to wireless device 3404). In FIG. 38A, a frame included in a transmission 1 e.g. to wireless device 3402 is shifted in time as compared to a transmission 2 to e.g. wireless device 3404 such that preamble 3802 of transmission 1 overlaps in time with data portion (slot) 3804 of transmission 2 and that data portion (slot) 3810 of transmission 1 overlaps in time with preamble 3808 of transmission 2. A similar approach is illustrated in FIG. 38B where pilot signals included in a time/frequency resource grid of transmission 1 are arranged in time and frequency to overlap with data portions of time/frequency resource grid of transmission 2 and vice versa. Such alignment of preamble symbols in a first transmission with data symbols of a second transmission as illustrated in FIG. 38A or of pilot symbols of transmission 1 with data symbols of transmission 2 as illustrated in FIG. 38B may facilitate interference mitigation, as interference stemming from the pre-known pilot and preamble signals may be predetermined and subtracted from the data symbols they overlap.

In order to mutually align preambles, pilots and data portions as illustrated in FIGS. 38A and 38B, wireless devices in accordance with various aspects of the present disclosure may be configured to process and exchange corresponding resource alignment information which in accordance with various aspects may be included in the CACCH. In other words, in accordance with certain aspects, receiver 3508 of wireless device 3402 may be configured to receive resource alignment information from wireless device 3404 included in the CACCH via the autonomous device-to-device communication link. Further, transmitter 3510 of wireless device 3402 may be configured to transmit resource alignment information included in the CACCH via the device-to-device communication link to wireless device 3404 to coordinate time/frequency location of preamble and pilot tones/signals.

Wireless device 3402 (receiver of transmission 1) may then estimate an interference signal between base station 3440 (transmitter of transmission 2) and wireless device 3402, e.g. based on the pre-known preamble and/or pilot signals included in transmission 2, the time/frequency position of which is known based on the CACCH resource alignment information received from wireless device 3404. Accordingly, wireless device 3404 (receiver of transmission 2) may estimate an interference signal between base station 3420 and wireless device 3404 based on the pre-known preamble and/or pilot signals included in transmission 1, the time/frequency position of which is known based on the CACCH resource alignment information received from wireless device 3402.

In accordance with certain aspects, wireless device 3402 may then perform interference cancellation of pre-known pilot and/or preamble sequences originating from the transmission of base station 3440 to wireless device 3404 (transmission 2). To this end, wireless device 3402 may subtract such pre-known signals/resource blocks convolved by the estimated interference signal between base station 3440 and wireless device 3402. Wireless device 3404 may similarly perform interference cancellation of pre-known pilot and/or preamble sequences originating from a transmission from base station 3420 to wireless device 3402 by subtracting of pre-known signals/resource blocks convolved by the estimated interference signal between base station 3420 and wireless device 3402.

Figure 39A:
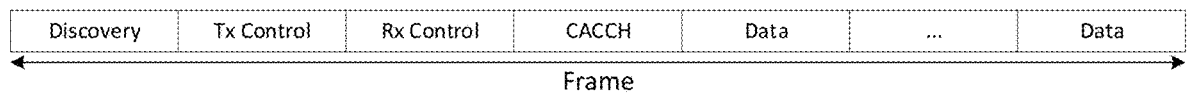
FIG. 39A illustrates a device-to-device data transmission frame according to some aspects.
Figure 39B:
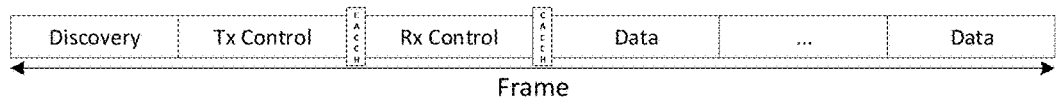
FIG. 39B illustrates a device-to-device data transmission frame according to some aspects.

FIGS. 39A and 39B show example communication frames that may be employed in D2D mesh communications in accordance with various aspects of the present disclosure. In accordance with a communication protocol for D2D mesh communication according to various aspects of the present disclosure, plural time slots may be included in a time frame where each slot may be dedicated for a specific physical channel function, e.g. for discovery (for example stage 504 in FIG. 5), for transmission control (Tx Control), for reception control (Rx Control) and for data communication. As illustrated in FIG. 39A, the Cellular Assistant Control Channel (CACCH) may in certain aspects be added to a communication frame as a dedicated physical channel. As illustrated in FIG. 39B, in certain aspects, the Cellular Assistant Control Channel (CACCH) may in certain aspects be added to a communication frame as dedicated signaling to be exchanged between wireless devices included in a D2D mesh network.

Figure 40:
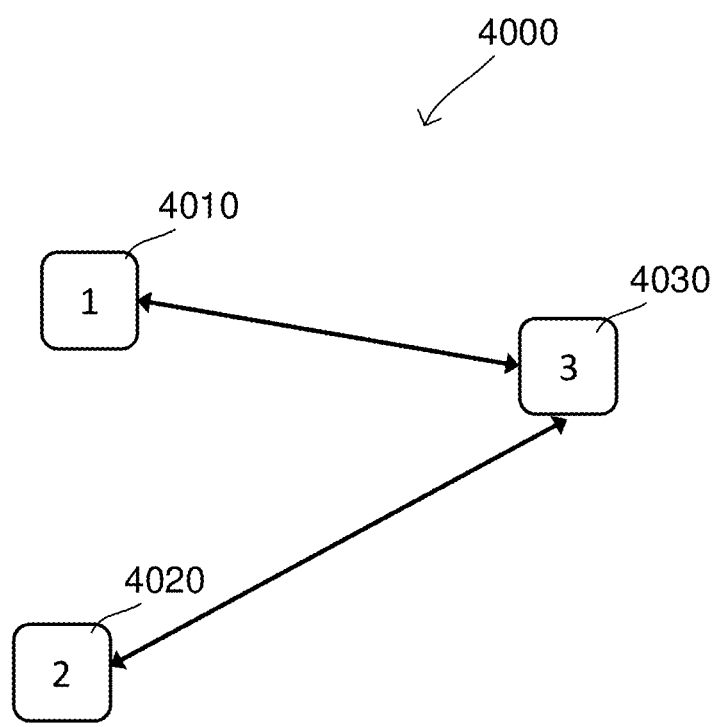
FIG. 40 shows exemplary radio communication network according to some aspects.

FIG. 40 shows exemplary communication in a radio communication network 4000. In this case, communication is being accomplished or attempted by terminal devices 4010, 4020, and 4030. Any one or all of these terminal devices may be, for example, wireless device, e.g., cellular phone. Further, in some exemplary embodiments, network access nodes (not shown) may be present. The terminal devices 4010, 4020, and 4030 may be configured to communicate through one or more wireless mobile telecommunications technologies. That is, the devices may be configured to transmit and receive signals through one or more protocols, e.g., LTE. Further, the devices may further be configured to communication directly with another, e.g., through device-to-device (D2D) communication.

As shown in FIG. 40, the first device 4010, is wirelessly communicating (e.g., receiving and/or transmitting) with the third device 4030. The first device 4010 may be directly transmitting one or more messages to the third device 4030, e.g., using D2D technology. Similarly, as shown in FIG. 40, a second device 4020 may also be trying to communicate (e.g., sending/transmitting) with the third device 4030. In some situations, transmissions from devices 4010 and 4020 may overlap and interfere at the third device 4030, as shown in FIG. 41.

In some exemplary embodiments, the devices 4010, 4020, and 4030 may be operating in or as part of a D2D network. In such a case, a random channel access scheme may be used, e.g., one in which channel resources are divided into time slots. The network devices (4010, 4020, and 4030) may access or utilize channel resources in a random manner. Slotted aloha is one type of random access scheme.

Figure 41:
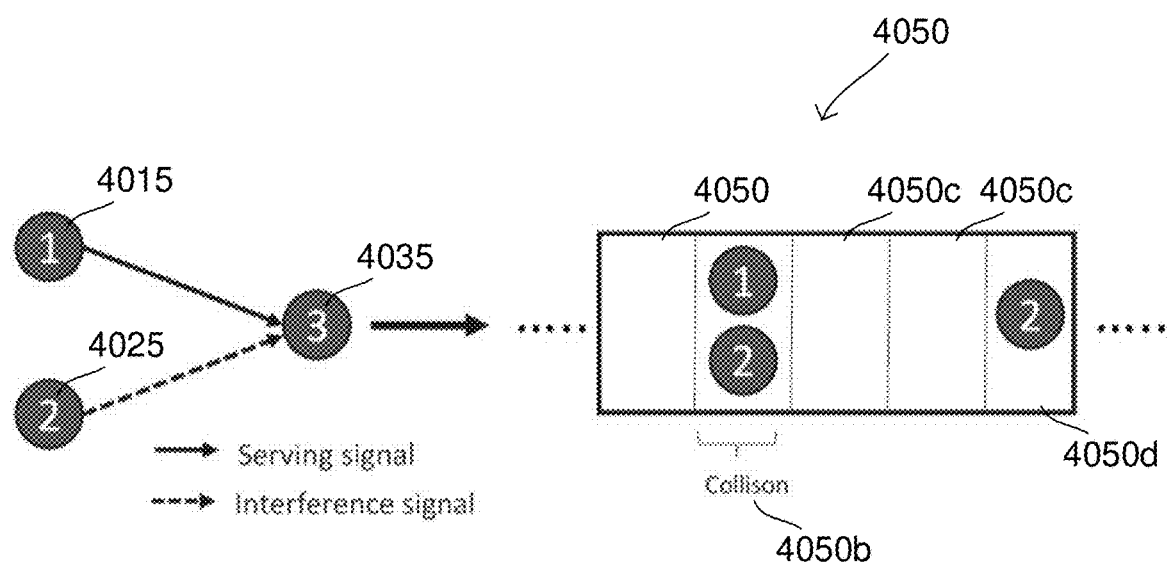
FIG. 41 shows of random access in a radio communication environment according to some aspects.

FIG. 41 is an exemplary diagram showing an example of random access. Device 4030 receives overlapping transmissions from devices 4010 and 4020. In one example, the signal of interest is the signal being transmitted from the first device 4010. This signal of interest 4015, is shown as being affected or interfered by the transmission of signal 4025 from device 4020. For example, the interfering signal 4025 can negatively affect and prevent decoding of signal 4015 by the third device 4030.

From the perspective of the third device, the first transmission 4015 and the second transmission 4025 is received as a third composite signal 4035. In other words, the third device 4030 receives both transmission as a signal 4035 that is a superposition of first and second transmission 4015 and 4025. The first and second transmissions may each include a message, e.g., packet.

The time diagram 4050 shows an exemplary instance of how the how the transmissions 4015 and 4025 are sent and received over channel resources, specifically over a plurality of consecutive time slots 4050*a*, 4050*b*, 4050*c*, . . . etc. In this case, there is a collision in or at time slot 4050*b*. in the colliding time slot 4050*b*.

Generally, without coordination or information, such as from a base station (e.g., eNode B, and the like), the device 4030 would not be able or have difficulty to decode the transmissions sent in a random access scheme, including those sent directly.

Figure 42:
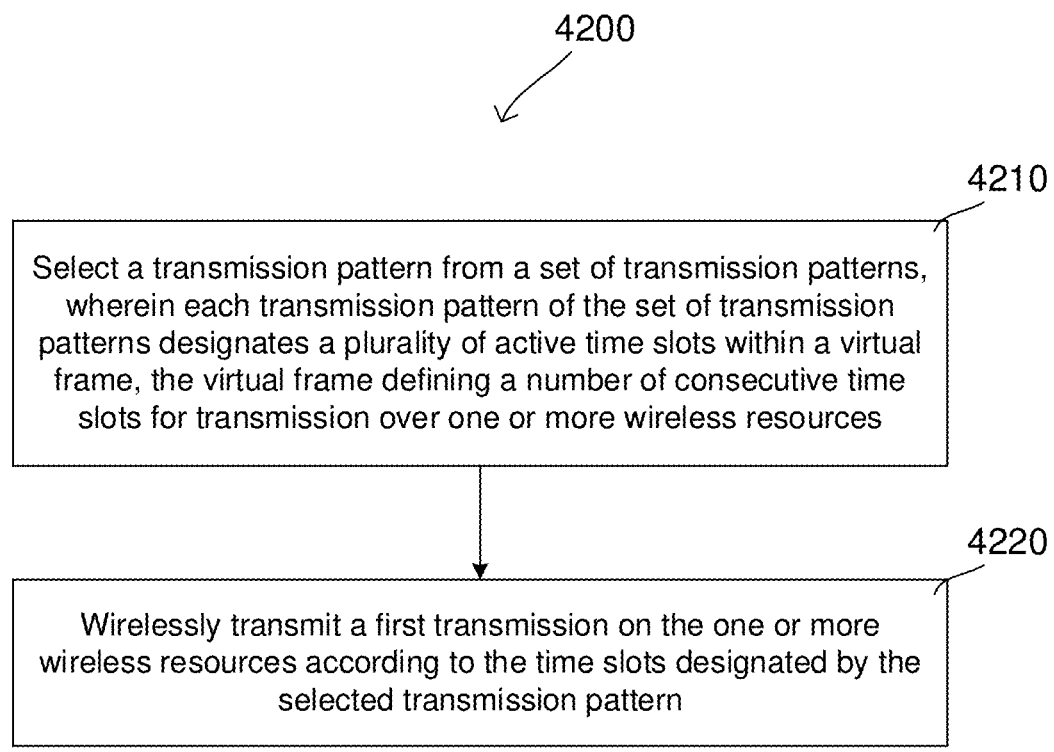
FIG. 42 shows an exemplary method of performing radio communications according to some aspects.

FIG. 42 shows an exemplary method 4200 of performing radio communications. The method 4200 may be implemented in a random access scheme, including, for example, in D2D communication scenarios.

The method includes, at 4210, selecting, by a wireless device, a transmission pattern from a set of transmission patterns. Further, each transmission pattern of the set of transmission patterns can designate a plurality of time slots within a virtual frame, the virtual frame defining a number of consecutive time slots to be used for transmission over one or more wireless resources.

The method further includes at 4220, wirelessly transmitting a transmission on the one or more wireless resources according to the time slots designated by the selected transmission pattern. In embodiments, the transmission may be a D2D transmission. The UE may be transmitting directly to another device, e.g., another terminal device (e.g., UE, base station, etc.). This transmission may be or include a discovery request, such as, a discovery request for initiation of D2D communication.

A virtual frame, for example, as used in connection with the method 4200 of FIG. 42. The virtual can define a set or series of consecutive time slots defining when a terminal device accesses one or more wireless channel resources. A terminal device, for example, may transmit a message or packet in one or more of the time slots defined by a particular virtual frame.

Figure 43:
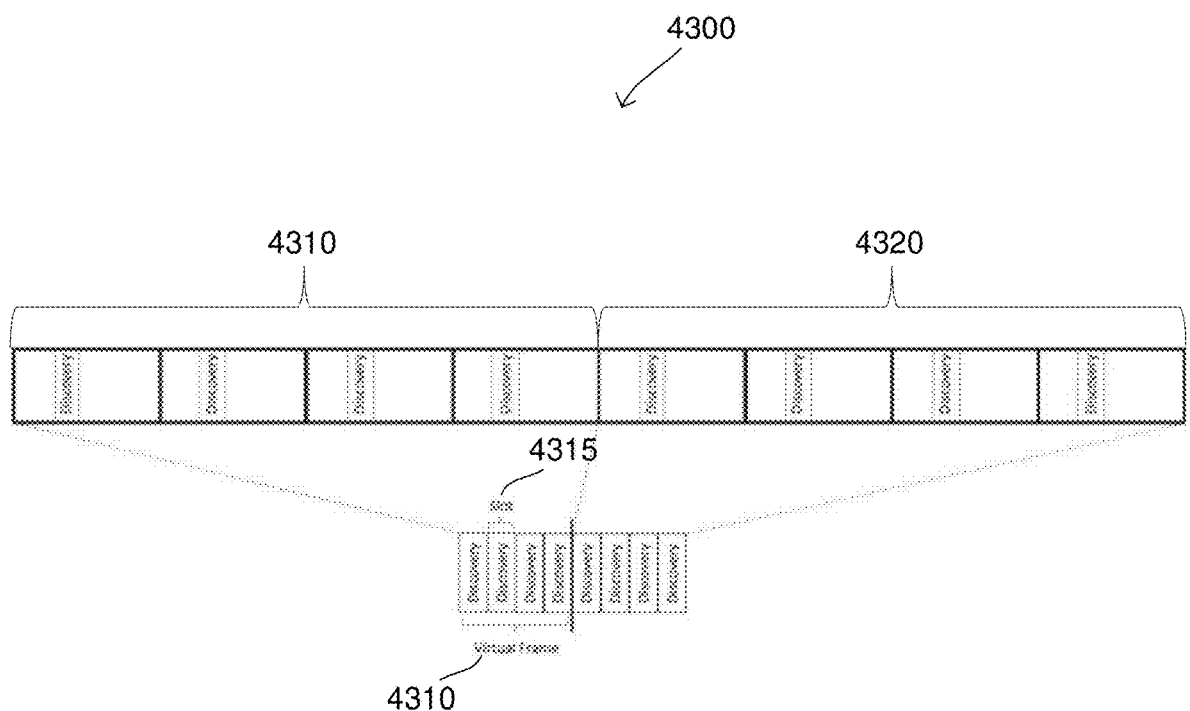
FIGS. 43 and 44 show exemplary representation of time slots according to some aspects.

FIG. 43, shows exemplary virtual frames 4310 and 4320. Each time slot of the virtual frame may be a potential discovery slot or a time slot occupied by a discovery message of a transmitting terminal device. That is, the terminal device may access channel resources by sending a transmission including a discovery message in one or more of the time slots of a virtual frame.

Figure 44:
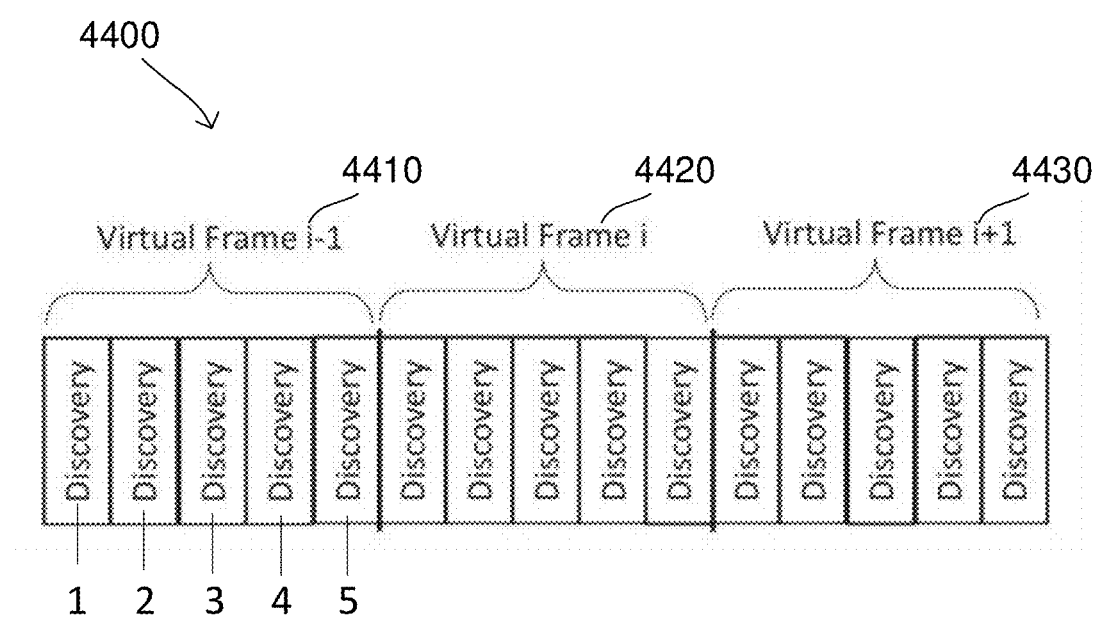

A transmission pattern may define the timing of transmissions by use of virtual frames. In accordance with exemplary embodiments of the present disclosure, FIG. 44 shows an example of a series of consecutive virtual frames which may be used to send a discovery request by one or more terminal devices. As shown in this example, each of the virtual frames (4410, 4420, & 4430) include five time slots (labelled "1", "2", "3", "4" and "5"). A particular transmission pattern can designate which time slots of a virtual frame are to active or are to be used by a terminal device (e.g., user equipment). The terminal device can transmit a message or packet in the active time slots designated by the particular transmission pattern. In various embodiments, a sending according to a particular transmission pattern may include sending at least two replicas (e.g., two of the same message/packet) with each replica or message sent in a different one of the active time slots. To improve communication, the active time slots designated by particular transmission pattern may be separated by at least one empty or non-active time slot.

Figure 45:
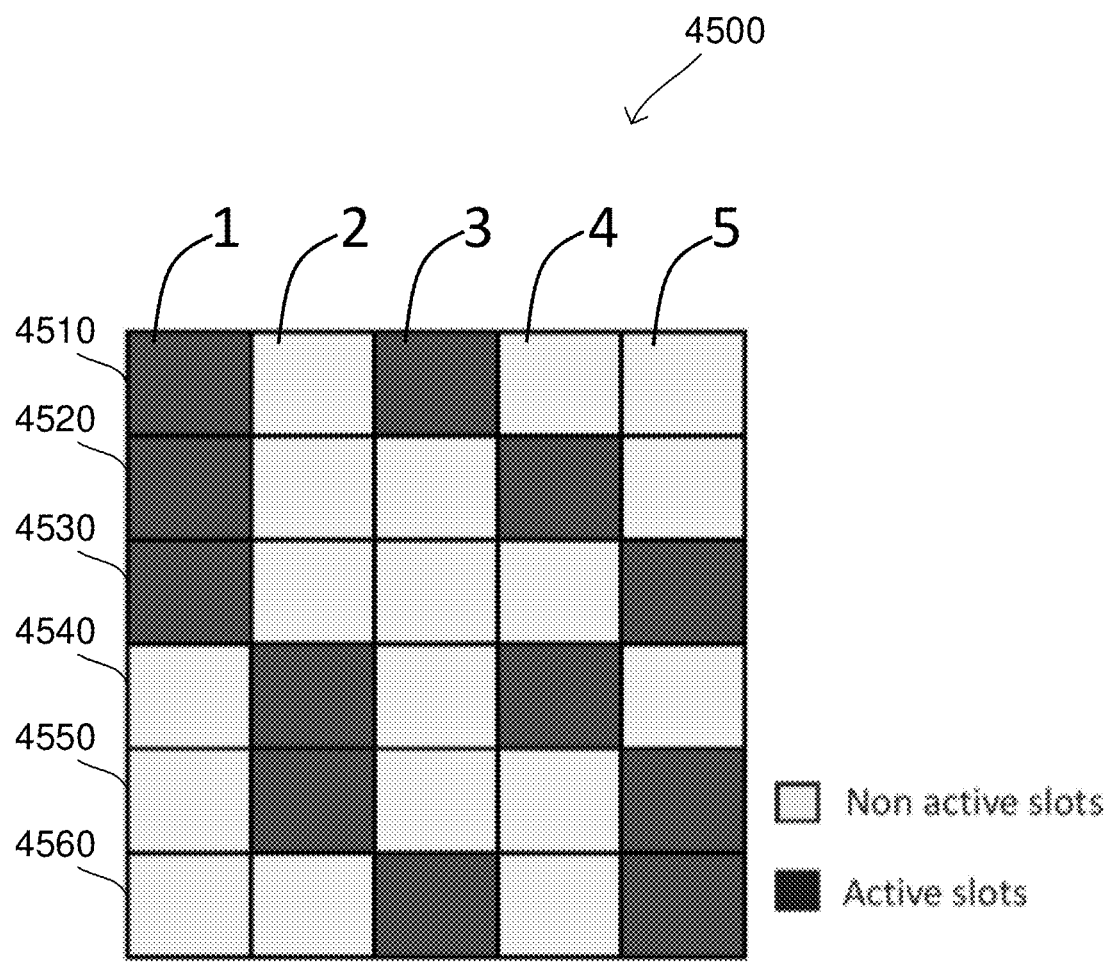
FIG. 45 shows an exemplary group of unique transmission patterns according to some aspects.

FIG. 45 shows, according to exemplary embodiments, a representation group of unique transmission patterns 4500. In this case, the shown set of transmission patterns 4500 is represented as rows of virtual frames. Each virtual frame includes a series of boxes each corresponding a time slot. In this case, each of the transmission patterns are a virtual frame with five time slots (size L=5).

In the example of FIG. 45, each transmission pattern indicates the time slots to be used to send two replicas (two of the same message) in a virtual frame. For the parameters of this this case, two replicas and virtual frame size of 5, there are six possible different or unique transmission patterns.

As previously explained, a transmission pattern may designate the active slots or a time slot in virtual frame that a device accesses or uses channel or wireless resources, such as a terminal device sending a message, packet, etc. within the designated active time slot. Similarly, a designated non-active slot may be a time slot that a terminal device does not use to access channel resources, e.g., the terminal device does not send or include a message or packet in a signal.

In FIG. 45, the first transmission pattern 4510 designates time slots 1 and 3 as being active, e.g., including a message and/or a packet, while time slots 2, 4, and 5 are non-active or empty. The transmission pattern 4520 designates slots 1 and 4 designated as active and slots 2, 3, and 5 as non-active. The transmission pattern 4530 designates slots 1 and 5 designated as active and slots 2, 3, and 4 as non-active. The transmission pattern 4540 designates slots 2 and 4 as active and slots 1, 3, and 5 as non-active. The transmission pattern 4550 designates slots 2 and 5 as active and slots 1, 3, and 4 designated as non-active. Finally, the transmission pattern 4560 designates slots 3 and 5 as active and slots 1, 2, and 4 designated as non-active.

In general, if it is given a virtual frame with a size L number of time slots and r replicas to be used, then the number of possible unique transmission patterns is given by the following equation:

$$\binom{L-r+1}{r}$$

These parameters may be adjustable, including dynamic adjustable depending on device capabilities and network conditions (e.g., noise or interference).

As explained, in accordance with exemplary embodiments, in a random access scheme (e.g., D2D) it can be desirable that each terminal device sending a message (e.g., discovery request) selects a different a transmission pattern. Accordingly, one way or approach to attempt to achieve this is by each terminal device randomly selecting a particular transmission pattern from a group of established transmission patterns. Referring back to 4210 of the method 4200, the transmission pattern may be selected randomly (e.g., randomly selected in a uniform manner) from a group or set of transmission patterns. Again, the group or set may be a predefined group or set where each member or transmission pattern is unique or different. Then, at 4220 of method 4200, the transmission is transmitted by transmitting a message or replica in each of the designated active time slots of the virtual frame. In other words, a terminal device (e.g., user equipment) may wirelessly send a transmission over a virtual frame defined by a randomly selected transmission pattern in which two or more slots of the virtual frame are occupied with a message or packet and there exists at least one "empty" or unoccupied slot between the two designated by the chosen transmission.

Again, while FIG. 45 shows an exemplary set of transmission patterns using a virtual frame of size L=5, virtual frames and transmission patterns may be of other sizes. Moreover, it may be advantageous to optimize the virtual frame size depending on current conditions. As explained, terminal devices may have dedicated signaling capabilities which may be used to transmit to each other (e.g., directly or indirectly) the experienced wireless interference. This dedicated signaling may occur periodically or at scheduled times. For example, regarding the method 4200, selecting a transmission pattern at 4210 may further include establishing a virtual frame size. Further, determining the virtual frame size can include obtaining an experienced level of wireless interference and then determining the virtual frame size (e.g., number of time slots for the virtual frame) based on this obtained experienced interference level. Then the UE selects a transmission pattern from only the set of transmission patterns having established or determined virtual frame size.

Figure 46A:
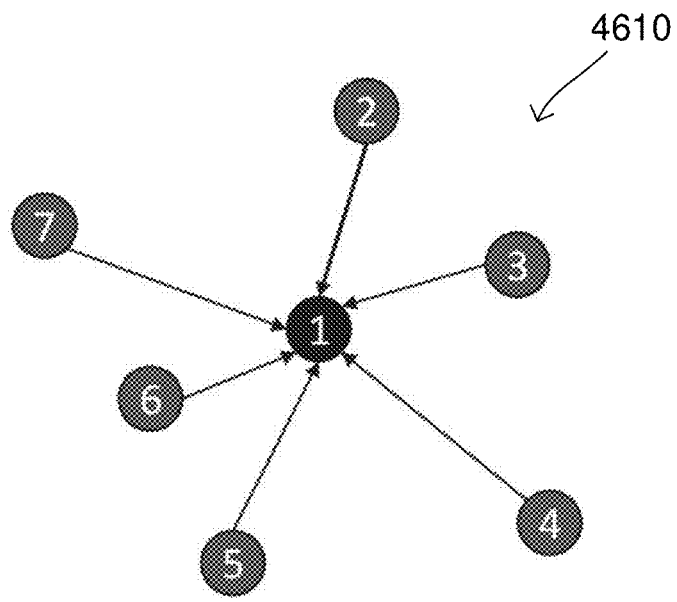
FIGS. 46A-46B show an exemplary scenario of devices in communication according to some aspects.
Figure 46B:
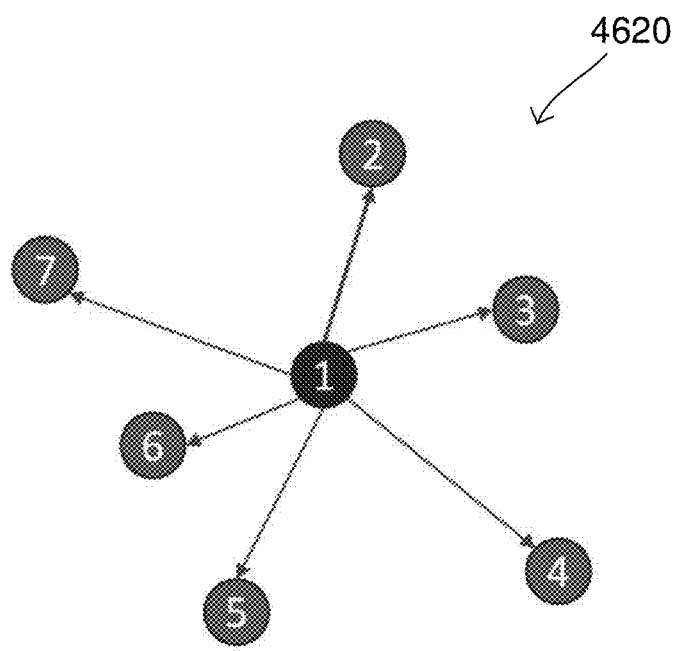

Further, in some exemplary embodiments, a particular terminal device or particular UE may be designated as a "master". Thus, a UE implementing method 4200 may obtain an experienced level of wireless interference from master and/or slave devices. For example, FIG. 46A shows a network with devices 4610 having a master-slave relationship. The (designated) slave devices (2, 3, 4, 6, 7) report their experienced interference to the master device (1). The slave devices may report their experienced interference periodically or at scheduled times. Then, in FIG. 46B, the master device (1) may itself determine the optimal frame size for the cluster of devices. That is, the master device (1) determines the virtual frame size to be used based on the reported experienced interferences from the slave devices (2, 3, 4, 6, 7). The reporting and determining the virtual frame size may be repeated, e.g., at intervals, scheduled times, or in response to changing network conditions (e.g., changing inference levels). The number of replicas or packets to send in virtual frame may also be chosen in a similar manner.

In exemplary embodiments, the decision to switch to a different virtual frame size and the corresponding set of patterns is made by the group coordinator (master) and signaled to members of the group (slaves). Slaves are then only allowed to select a pattern from that set. On the other hand, each device should or may be capable of performing this functionality because "master" and "slave" roles are not fixed and at different times a device might be one or the other.

As an example, the virtual frame size be determined based on the experienced level of interference as in the table below:

| Level of interference | Virtual frame size |
| --- | --- |
| Low | <4 |
| Medium | 4-10 |
| High | >10 |

In some situations, greater the interference leads to greater selection of the virtual frame size to be used by devices using direct communication (e.g., D2D communication).

The determined virtual frame size informs regarding the set of transmission patterns a UE can select from. For example, a UE may theoretically be able to choose from a large amount of transmission patterns that have various frame sizes (e.g., various numbers of time slots). However, the determined virtual frame size narrows the selection to the subset of transmission patterns having time slots corresponding to the determined frame size.

In various embodiments, the transmission patterns may be stored on a UE. In other embodiments of the disclosure, the set of transmission patterns may be retrieved or obtained from a remote source (e.g., wired or wireless) before selection by the UE is needed.

Figure 47:
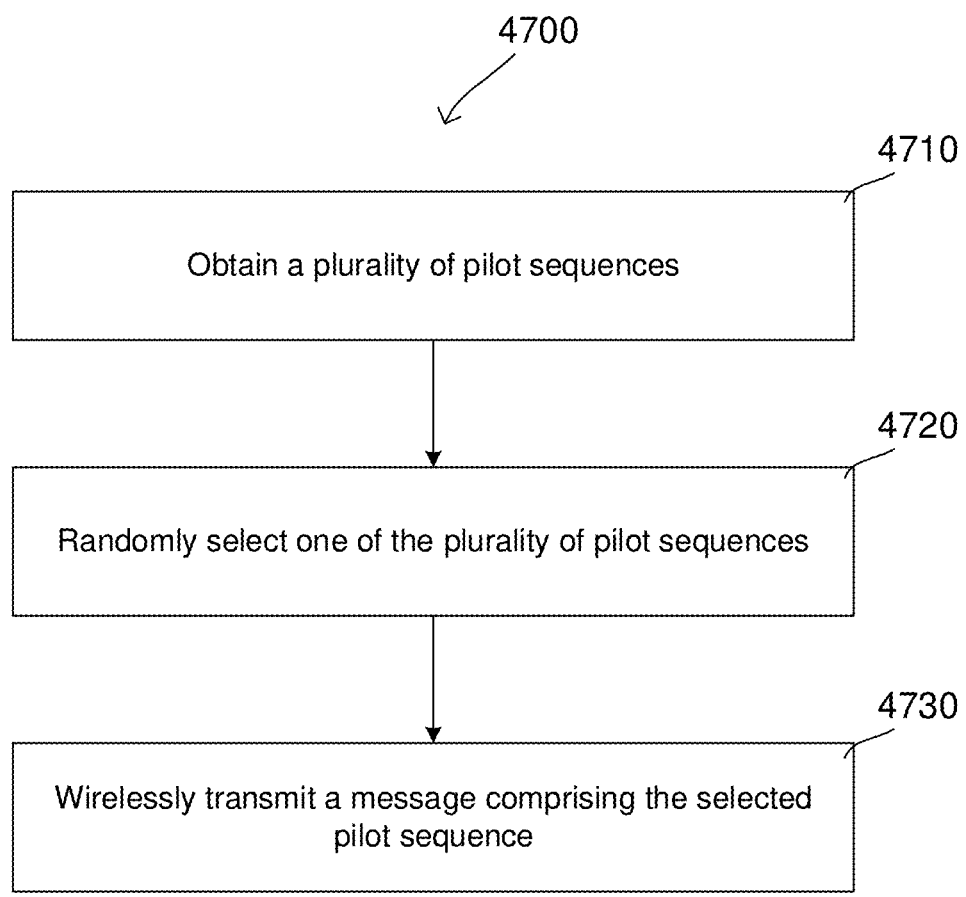
FIG. 47 shows another exemplary method of performing radio communications according to some aspects.

FIG. 47 shows another exemplary method 4700 of performing radio communications. That is, the method 4700 may also be implemented in a random access scheme, including, for example, in D2D communications.

At 4710, a terminal device (e.g., a UE) obtains a plurality of pilot sequences. The pilot sequences may be obtained locally from a storage medium (e.g., a non-transitory computer storage medium) residing on the UE. Alternatively, the pilot sequences may be obtained communicatively from a device remote to the UE. For example, the UE may wirelessly receive these pilot sequences from another device, e.g., another terminal device/user equipment.

In further exemplary embodiments, the pilot sequences obtained and transmitted are orthogonal pilot sequences. The obtained pilot sequences may be generated locally by the UE itself or obtained from another source. In some exemplary embodiments, the pilot sequences are generated according to known or established protocols. For example, the generation of the pilots is performed according to method(s) described in the standard 3GGP TS 36.211.

At 4720, the UE randomly selects one of the plurality of pilot sequences. After selecting one of the pilot sequences, at 4730 the UE wirelessly transmits a message containing the selected pilot sequence. The UE may transmit to another terminal device (e.g., another UE) directly or indirectly. For example, the UE may transmit a message including the pilot sequences as part of a discovery request message, such as for D2D communication.

In accordance with at least one exemplary embodiment of the present disclosure, the UE may transmit the pilot message as part of the transmission described in the context of the method 4200 of FIG. 42. For example, the pilot sequences may be interleaved in each replica (e.g., interleaved in each packet) sent in a particular designated active time slot of a virtual frame as discussed in connection with method 4200.

A selected pilot sequence may be transmitted, for example, within a payload of a packet e.g., a packet for a discovery request for communication (e.g., a request to initiate D2D communication). More specifically, the selected pilot sequence can be located at one or more predefined locations within the packet payload. These predefined locations may be known to various devices, such as terminal devices that are in communication with each other or are within a network service at least in part by a base station.

Figure 48:
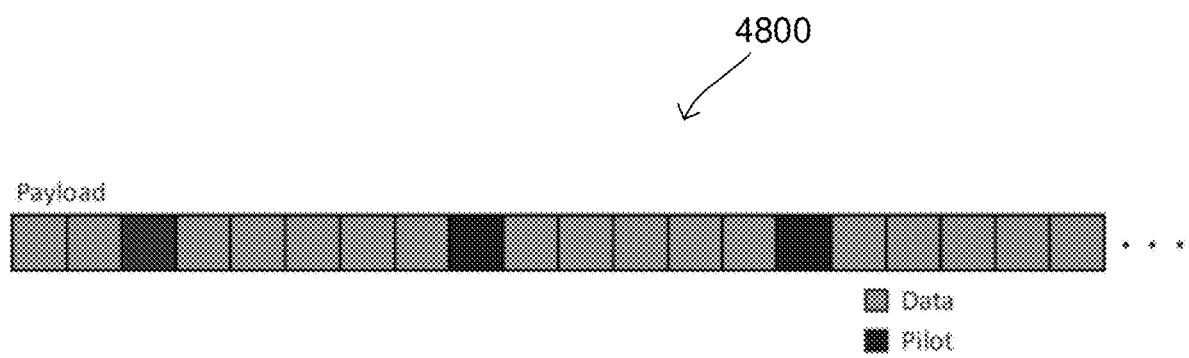
FIG. 48 shows an exemplary representation of a payload of a packet according to some aspects.

FIG. 48 shows an exemplary representation of a packet payload 4800. As shown, the data representing the pilot sequences are interleaved and occupy certain locations/positions of the payload of a packet.

In some embodiments, all devices that are part of a network, for example, one or more terminal devices that a part of a D2D network may be configured to or prompted to select from the same set of orthogonal pilot sequences.

Figure 49:
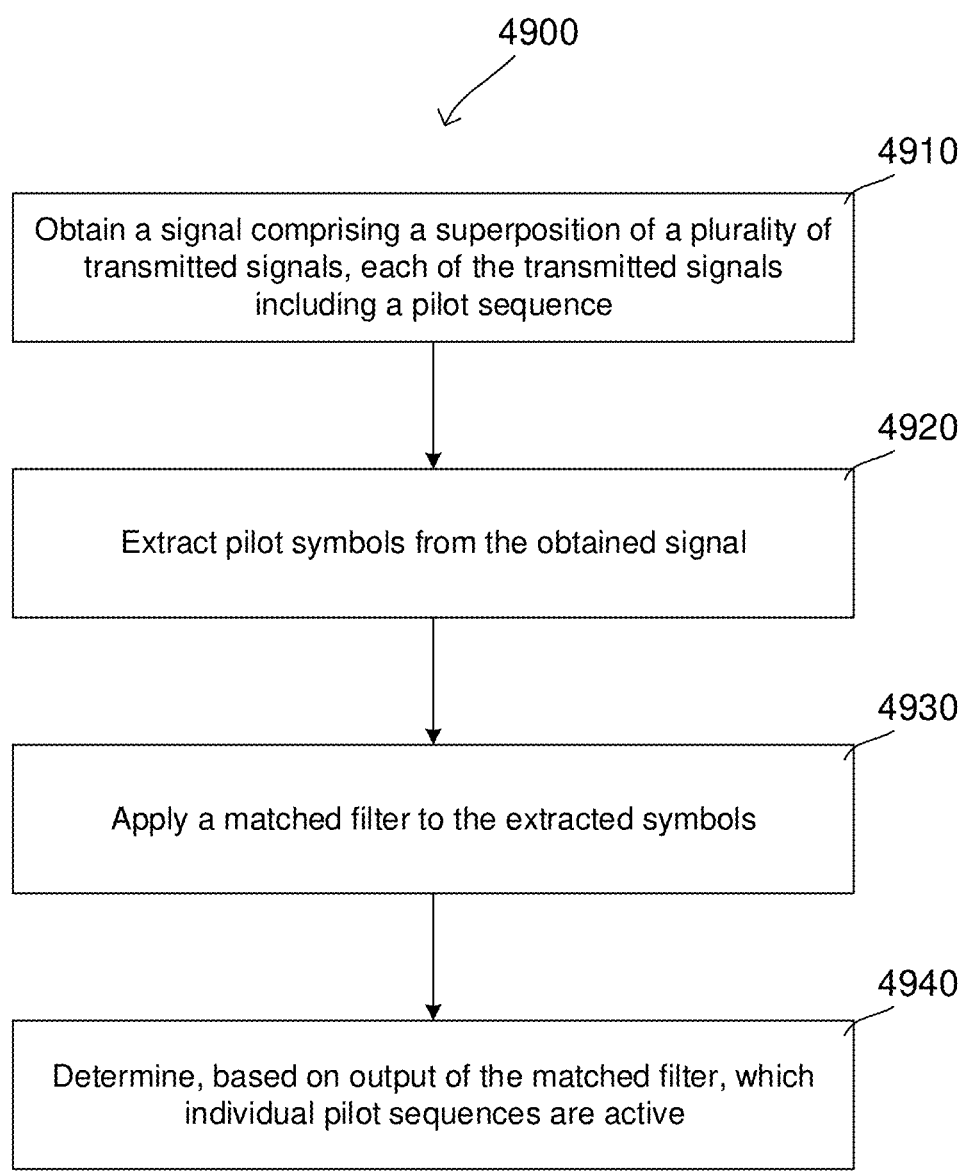
FIG. 49 shows an exemplary method performing radio communications according to some aspects.

FIG. 49 shows a method 4900 for performing radio communications according to an exemplary embodiment of the present disclosure. The method 4900 may be implemented as part of a random access scheme, including, for example, in D2D communications.

At 4910 of method 4900, a terminal device (e.g., a user equipment (UE)) obtains a signal including a superposition of a plurality of transmitted signals, with each of the transmitted signals including a pilot sequence. The transmitted signals of the composite signal received by the UE may be received directly from a plurality of transmitted devices.

As discussed with respect to method 4700, the pilot sequences transmitted may be orthogonal pilot sequences. That, is the pilot sequences chosen, may be from a set or group of pilot sequences that are each orthogonal to each other.

After obtaining the signal the UE detects the pilot sequences. Referring back to FIG. 49, the UE at 4920 extracts detected pilot symbols from the obtained signal. Also as explained in connection with method 4700, the pilot symbols may be located at certain positions of the signal or certain positions within a payload of packets included in the received signal. Therefore, the UE in such cases can limit observation of the obtained or received composite signal to certain positions, e.g., particular a positions of a packet.

Figure 50:
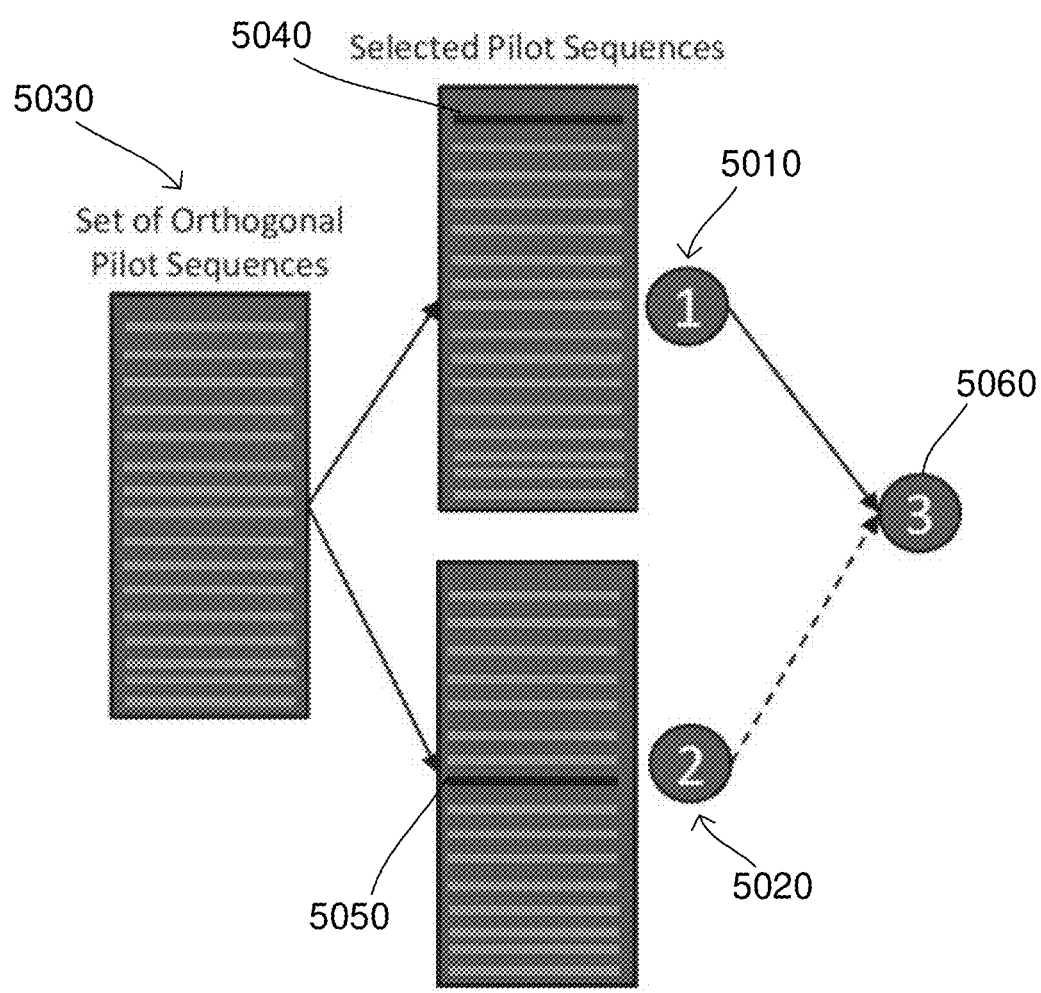
FIGS. 50-51 shows exemplary visual representations of terminal devices operating in a radio communication network according to some aspects.

In accordance with exemplary embodiments, the received composite signal in frequency is given by the equation:

$$y_p = \sum_{i=1}^{N} h_i \cdot x_{p,i} + n$$

where $h_i$ is the channel response or distortion
where $x_{p,i}$ is ith pilot symbol at position p
where n is noise FIG. 50, for example, shows a visual representation of terminal devices selecting pilot sequences. In particular, FIG. 50 shows a first UE 5010, and a second UE 5020 selecting pilot sequences 5040 and 5050. These pilot sequences 5040 and 5050 have been chosen from a bank or a set of orthogonal pilot sequences 5030. In various embodiments and here, this set of orthogonal pilot sequences is known and/or included at each of the terminal devices, which in the case of FIG. 50 is devices 5010, 5020, and 5060. That is, the device of a network, may have agreed beforehand on a predefined group or subset of orthogonal pilot sequences for use in communication.

The first UE 5010 and the second UE 5020 transmit their respectively selected pilot sequences to the third terminal device, UE 5060. The devices 5010 and 5020 may transmit the pilot sequences according the method 4700 described herein or through another similar or suitable process.

Figure 51:
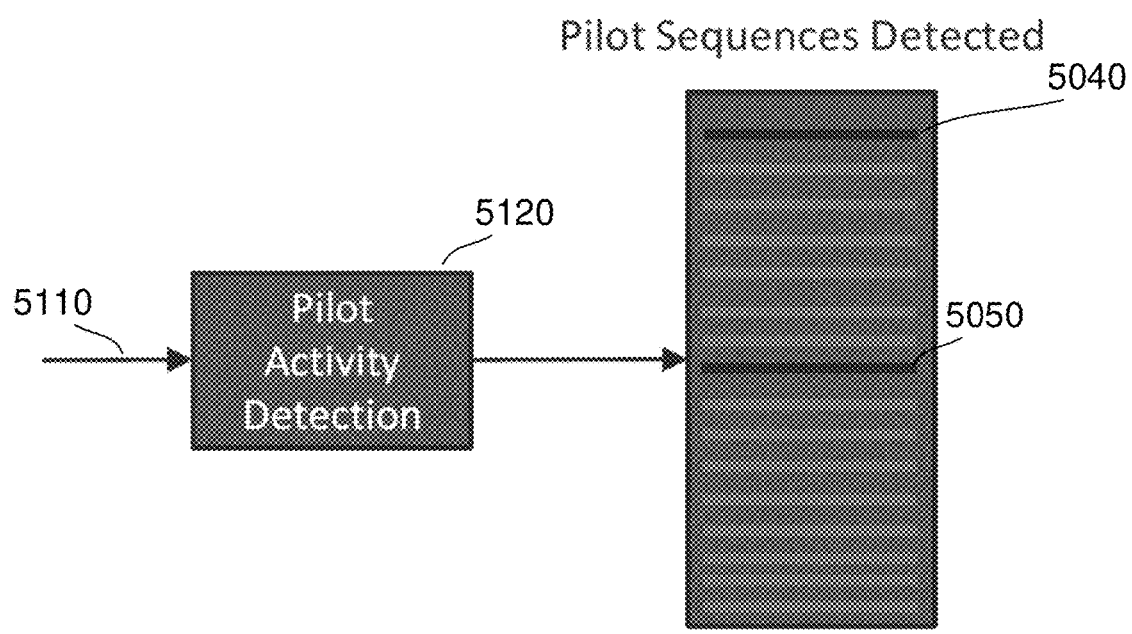

As shown further in FIG. 51, the UE 5060 receives a composite signal 5110 that includes signals from UE 5010 and UE 5020. This composite signal 5110 contains the pilot sequences 5040 and 5050. With knowledge of the pilot positions, the UE can more efficiently extract the detected pilot symbols.

Referring back to the method 4900 of FIG. 49, after extracting pilot sequences (e.g. pilot symbols), at 4930 the UE applies a matched filter to the pilot sequences. Applying a matched filter may be accomplished by multiplying the extracted symbols forming the pilot sequences with the conjugate transpose of all pilot sequences of the subset to which the pilot sequences belong. This can be expressed as:

$$q_i = |\langle y, p_i^H \rangle| \ \forall i=1, \ldots, N$$

wherein y is the composite signal corresponding to pilot symbol positions
wherein $p_i$ is the i-th predefined pilot sequence from the subset of size P
wherein $q_i$ is the i-th statistic element of the vector q
H indicates the conjugate transpose operation
< > indicates inner product operation and
| | represents modulus operation
where N is the amount of pilot sequences in the set At 4940 the UE determines, based on the output of the matched filter, which of the individual pilot sequences are active or present, e.g., which pilot sequences were part of the composite signal sent by the other terminal devices. To determine or identify the pilot sequences, the output from the matched filter may be further processed. In many cases the number of pilot sequences is 16.

In one example, the output of the matched filter can be normalized and compared to a threshold. For example, after obtaining the matched filter output, e.g., obtaining the values forming the vector q, further processing may be needed and performed in order to determine which pilot sequences are present in the composite signal. In one example, the matched filter output, e.g., the obtained values of the matched filter, may be normalized. For example, values ($q_i$) of the vector q may be normalized using the largest element as expressed in the following equation:

$$\hat{q}_i = \frac{q_i}{q_{max}} \ \text{s.t.} \ q_{max} = \max q_i$$

The greater is the value of $\hat{q}_i$, the greater the probability of a i-th pilot sequence being present. The UE can employ a decision mechanism to identify from the normalized values the pilot sequences which are present or active in the obtained signal. A hard decision mechanism may be performed in which the normalized values are compared to a threshold. Specifically, such a hard decision mechanism can evaluate, if a value $\hat{q}_i$ is above a certain threshold. The pilot sequences corresponding to the $\hat{q}_i$ that are above the threshold are determined or considered active or present in the signal obtained by the UE.

Figure 52:
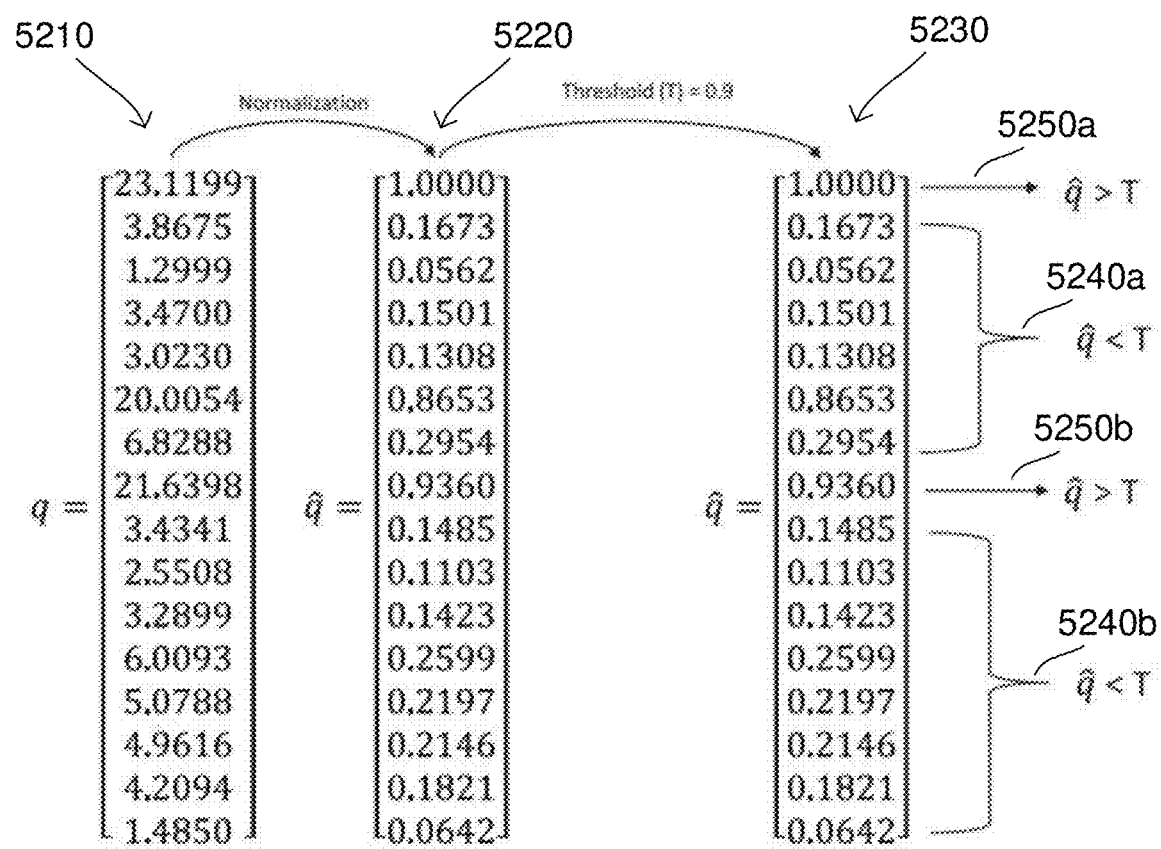
FIG. 52 shows exemplary values produced by an exemplary terminal device according to some aspects.

Referring back to the example depicted in FIGS. 50 and 51, the UE 5060 implements pilot activity detection 5120. To perform pilot activity detection 5120, the UE 5060 as described above may extract symbols and apply a matched filter. FIG. 52 shows an exemplary set or group matched filter output values 5210 obtained by UE 5060 of FIGS. 50 and 51. The UEs of FIGS. 50 and 51 may be working from a set of 16 orthogonal pilot sequences.

The UE 5060 then normalizes to obtain a set of normalized output values 5220. Each normalized values is compared to a threshold (T), which in the example of FIG. 52 is value 0.9. As discussed, the normalized values that match or exceed this threshold value indicate of the pilot sequences are active. For example, FIG. 52 shows that the value at the first location or position (first element) 5250*a* and the value at the eighth location or position (eighth element) 5250*b* both exceed the threshold of 0.9. By contrast, the normalized values at the second through seventh positions (5240*a*) and ninth through sixteenth positions (5240*b*) are less than the threshold indicating the pilot sequences corresponding thereto were not present in the signal. Accordingly, the UE 5060 thus determines that pilot sequences respectively corresponding to the first and eighth elements 5250*a* and 5250*b* are active. In this case, the detected pilot sequences are the pilot sequence 5040 and 5050 of FIG. 50. This is an example of a successful detection. In other cases, depending on factors such as noise, channel estimation errors etc. it might not always be possible to guess perfectly which sequences were active. In such cases may be represent miss-detection (no sequences accurately identified) or partial miss detection (some sequences accurately identified).

Alternative methods or mechanisms may be implemented to determine or detect the pilot sequences. In another exemplary embodiment of the present disclosure, neural networks may be implemented or used to determine the presence of pilot sequences. In accordance with exemplary embodiments a neural network can be applied to the output of the matched filter or a neural network may be applied to the output of the matched filter and to the obtained signal (e.g., the composite signal received by the UE).

Alternatively, a plurality of neural networks may be applied to the to the output of the matched filter or may be applied to the output of the matched filter and to the obtained signal.

A neural network or a plurality of neural networks can provide an output that indicates the likelihood that a particular individual one of the pilot sequences (e.g., a predefined group of orthogonal pilot sequences) is present/active. The output of the neural network(s) can further be normalized and then compared against a threshold.

Figure 53A:
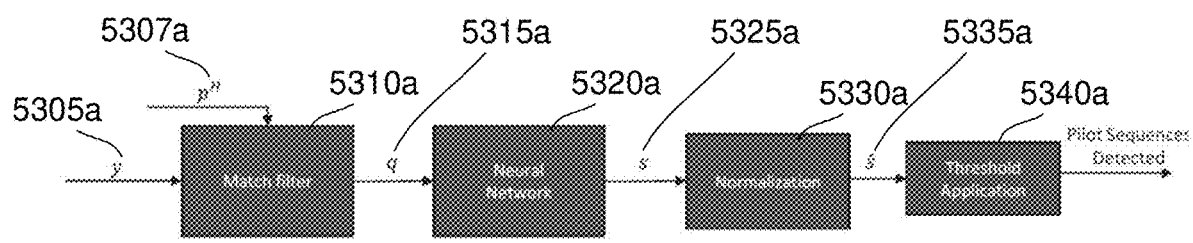
FIGS. 53A-53B and 55A-55B show exemplary pilot detection mechanisms of terminal devices according to some aspects.
Figure 53B:
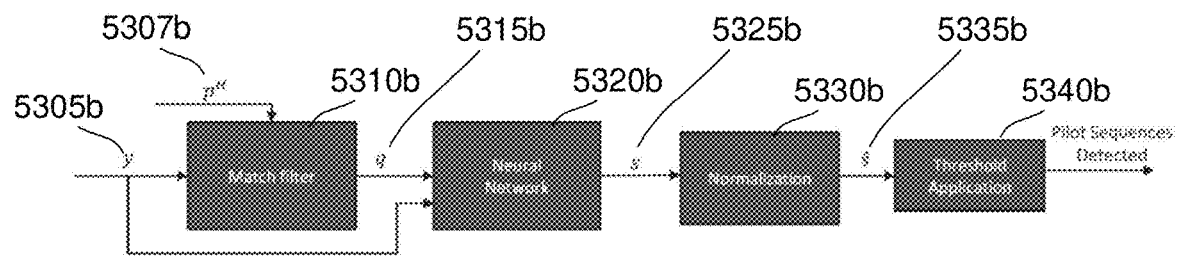

FIGS. 53A and 53B show exemplary pilot detection mechanisms implementing neural networks. FIG. 53A shows match filter 5310*a* being applied to an obtained composite signal 5305*a*. That is, the pilot symbols from the obtained signal 5305*a* can be multiplied with the conjugate transpose of the set of pilot sequences 5307*a*. Then a neural network 5320*a* can be applied to output 5315*a* of the matched filter 5310*a*. For example, the output 5315*a* of matched filter 5310*a* can be inserted into a feedforward neural network, such as the exemplary one depicted in FIG. 54.

Figure 54:
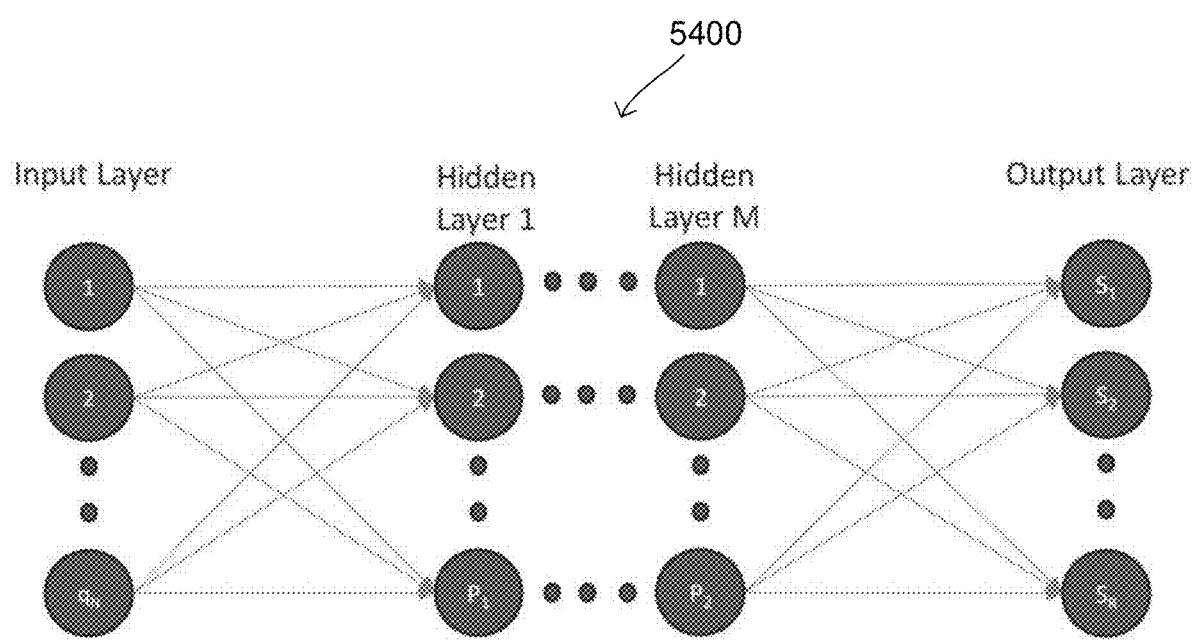
FIG. 54 show exemplary representation of a neural network according to some aspects.

FIG. 54 shows an exemplary feedforward neural network 5400 of FIG. 54 that includes an input layer with N inputs (denoted from $q_1$ to $q_N$). The neural network 5400 further includes M hidden layers, each hidden layer having P hidden nodes (for a total of P×M nodes), and an output layer with R outputs (denoted from $S_1$ to $S_R$). As shown, the input of the feedforward neural network 5400 is a vector q composed by N elements. In the context of FIG. 53A, the input vector q is simply the output of the matched filter 5310. This vector is fed into the input layer. In turn these inputs are combined into each of the nodes of the first hidden layer with a scaling and offset factors (these factors are tuned for each connection, during the training phase of the neural network, based on the well-known backpropagation algorithm).

This process occurs between all hidden layers until it is propagated to the R nodes in the output layer, where each node has then soft values. The nodes in the output layer correspond each to a class (or in our example to a specific pilot sequence).

FIG. 53B is similar to FIG. 53A, except that the output 5315*b* of the matched filter 5310*b* and the obtained signal 5305*b* are inserted into a neural network. Again, in FIG. 53B the matched filter 5310*b* multiplies pilot symbols extracted from the obtained signal 5305*b* with the conjugate transpose of the set of pilot sequences 5307*b* to produce output 5315*b*. However, neural network 5320*b*, in contrast to neural network 5320*a*, receives as input both the obtained signal 5305*b* and the output 5315*b*. Again, the neural network 5320*b* may be a feedforward network similar to the shown in FIG. 54. The neutral network 5320*b*, like the neural network 5320*a* produces output values 5325*b* in the nodes of the output layer corresponding to each pilot sequence (of the e.g., predefined set of pilot sequence).

As shown in both FIGS. 53A and 53B, the respective outputs 5325*a* and 5325*b* are normalized. The normalization processes 5330*a*, 5330*b* may be implemented similar to the normalization processes previously described herein. In examples of FIGS. 53A and 53B, threshold applications 5340*a*, 5340*b* are respectively applied to the normalized outputs 5335*a*, 5335*b*. These output values may be, for example, be represented or expressed as the previously described vector $\hat{q}$. Further, the threshold applications may be implemented as a hard decision that compares the output values from the normalization process to a threshold value also as previously described. Based on the threshold application, the active pilot sequences are determined or identified.

Figure 55A:
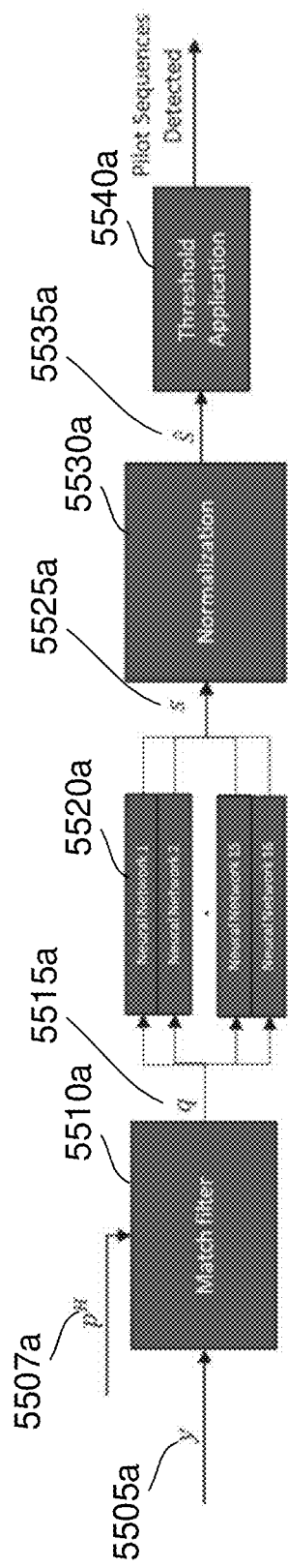
Figure 55B:
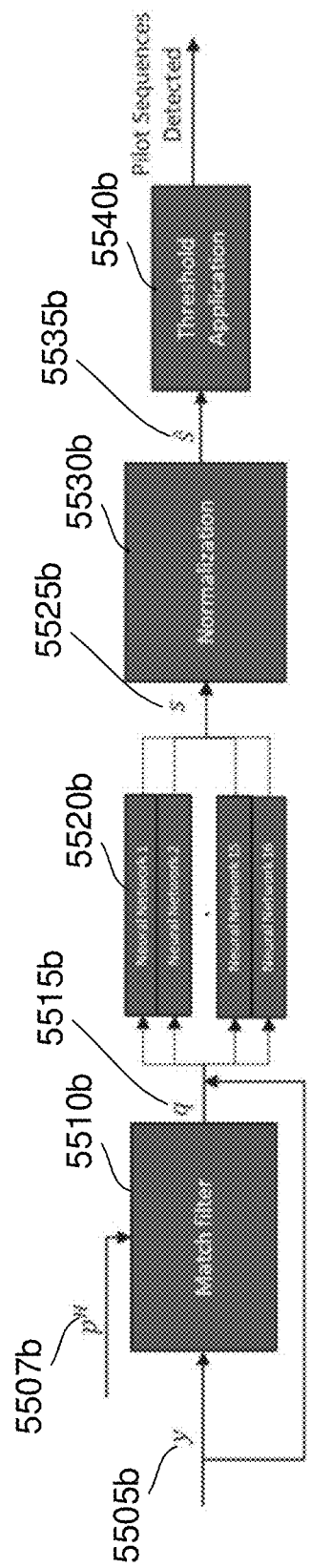

Therefore, a UE implementing method of FIG. 49 may determine which of the individual pilot sequences are active or which pilot sequences were part of the composite signal by using a plurality of neural networks. FIGS. 55A and 55B show exemplary pilot detection mechanism implementing a plurality of neural networks.

In FIGS. 55A and 55B, match filters 5510*a* and 5510*b* are applied to obtained signals 5505*a*, 5505*b*. The pilot symbols are obtained from signals 5505*a*, 5505*b* which then may be respectively multiplied with conjugate transposes 5507*a*, 5507*b* based on the set of orthogonal pilot sequences.

In FIG. 55A the matched filter output 5515*a* is inserted into a plurality of neural networks 5520*a*. Each of the plurality of neural networks 5520*a* may receive the matched filter output (e.g., the matched filter output values). Moreover, each of the plurality of neural networks 5520*a* may be assigned or configured to determine a value indicating the likelihood that one particular of the pilot sequences is active. For example, if it is that given a certain set of 16 predefined orthogonal sequences is used, then 16 neural networks can be implemented at a UE that each identify a different or unique one of the 16 orthogonal sequences.

In FIG. 55A, a normalization process 5530*a* is applied to the neural networks output 5525*a*. A threshold application 5540*a* is applied to the normalized outputs 5535*a*. As described before, the result of the threshold application 5540*a* can indicate which of the particular individual pilot sequences are active or present.

FIG. 55B shows a similar process as to FIG. 55A, except that in this example each of the plurality of neural networks receives both the output 5515*b* of the matched filter 5510*b* and the obtained signal 5505*b*. Again, each of the plurality of neural networks 5520*b* may be assigned or configured to determine a value indicating the likelihood that one particular of the pilot sequences is active.

Like in FIG. 55A, in FIG. 55B a normalization process 5530*b* is applied to the output of the neural networks 5525*b*. A threshold application 5540*a* is then applied to the normalized outputs 5535*b*. The threshold application, as before, can compare each value of the normalized outputs to a threshold value to indicate which pilot sequences are active.

Figure 56A:
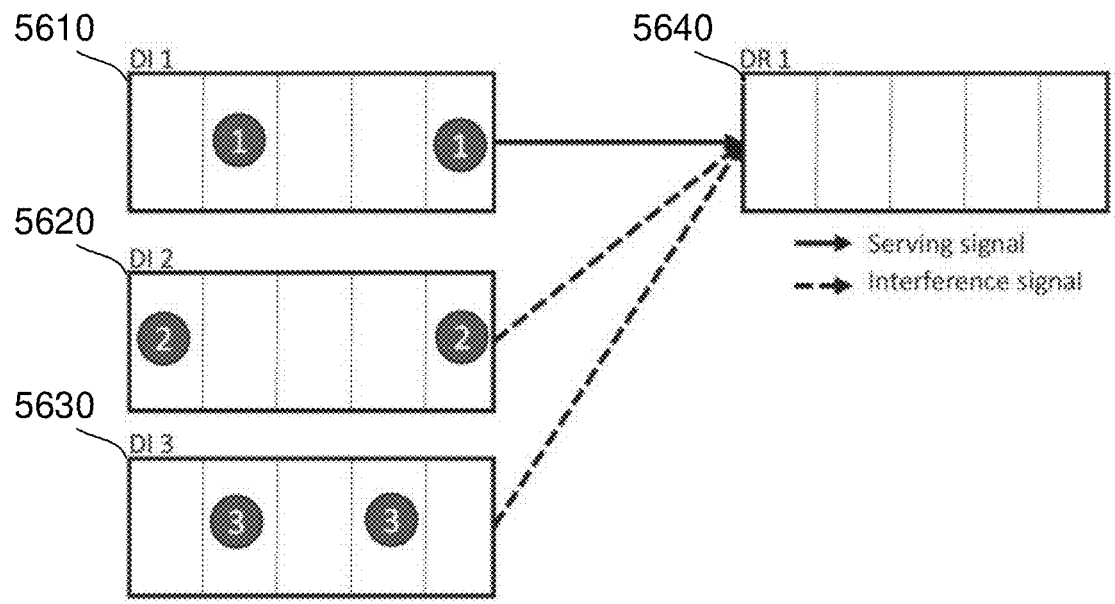
FIGS. 56A-56C show exemplary representation of radio signals in an exemplary scenario according to some aspects.

FIG. 56A shows a first user equipment device (UE1) transmitting a signal to another user equipment device (UE4). As described herein, for example, in a random access scheme (e.g., D2D) a device may include a plurality of transmitting devices sending signals that overlap or interfere. In this case, UE1 may be transmitting according to a random access scheme (e.g., D2D). As seen the UE1 is transmitting using a virtual frame 5610*a*. The UE1 may, for example, use techniques described herein in connection with the methods 4000 and 4200.

In exemplary embodiments, the UE1 may be a device of interest that is attempting to initiate a communication session using, (e.g., D2D), with the UE4. As shown, UE1 transmits packets in the second and fourth time slots in the virtual frame 5610*a*. The UE1 may be sending a discovery request or other message to the UE4. However, other user equipment devices, UE2 and UE3 are also transmitting to the UE4 at the same time and thus can interfere the signal from UE1 at UE4. The UE2 transmits a packet in each of the first and fifth time slots of the virtual frame 5620*a* and UE3 transmits a packet in each of the second and fourth time slots of the virtual frame 5630*a*.

Figure 56B:
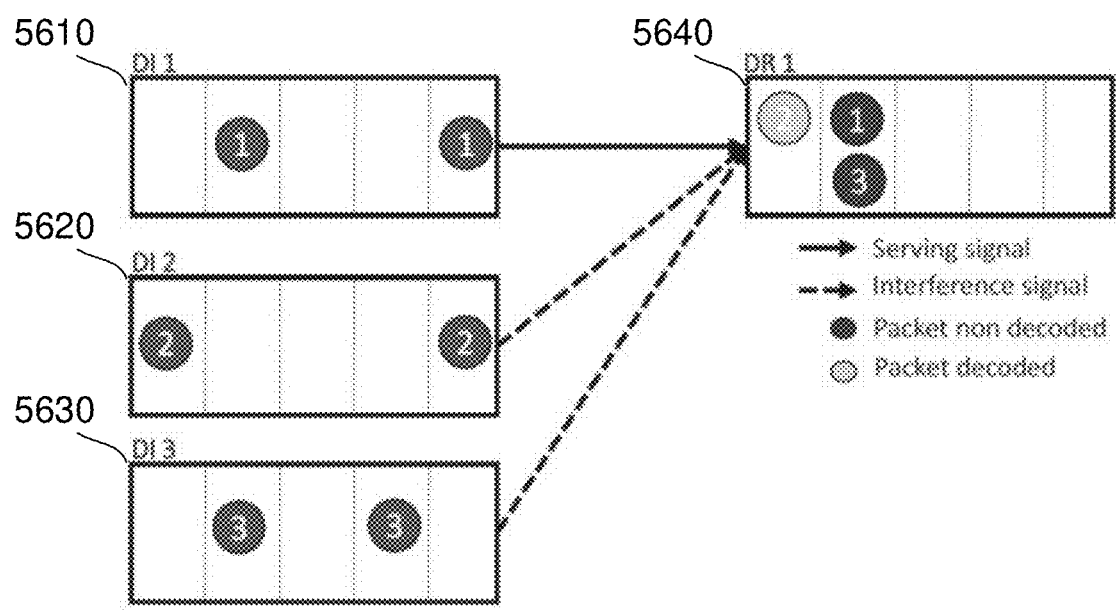

In the cases where the UE1 is the device of interest, a problem can arise in that the message or packets of UE1 collide in time with the message or packets from UE2 and UE3. As shown in the example of FIG. 56B, at the UE4, a first packet sent from UE1 in the second time slot collides with a packet sent from the UE3. Accordingly, it would be difficult to decode the first packet form UE1.

Figure 56C:
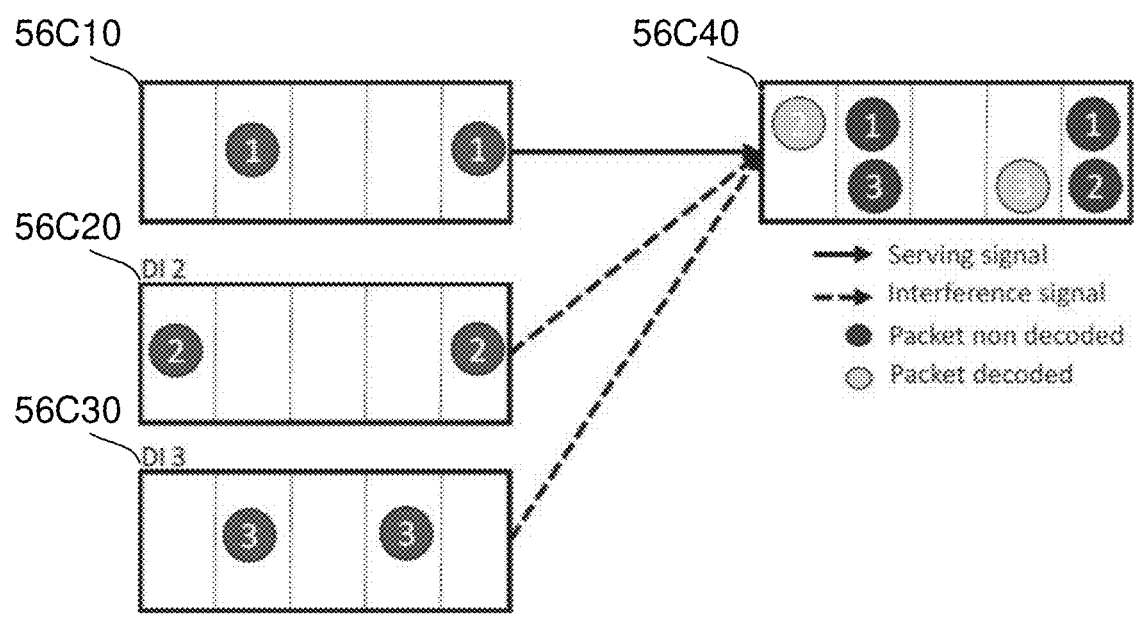

In accordance with exemplary embodiments, one way to cope with the collision problem is to cancel or delete the interference affecting the signal from the device of interest. For example, as shown in FIG. 56B, the UE4 receives only one packet in the first time slot 1 which is the signal from UE2. Therefore, there is a high probability that this packet will be decoded. Further, this decoded packet from UE2 can be saved, such as for example, in a memory buffer or other storage means and be used later. Similarly, as shown in FIG. 56C, the packet from UE3 experiences no collision in the fourth time slot. Thus this packet at UE4 can also be decoded with a high probability and also be saved for potential future use.

FIG. 56C shows that in the fifth time slot of virtual frame 5640, the UE4 receives a (second) packet received from UE1 and a packet from UE2. However, if the packet from UE2 received in the first time slot (where there was no collision) was decoded, then UE4 apply cancellation techniques and use this decoded packet cases to address the collision situation in the fifth time slot. That is, the UE4 may use the decoded packet to "delete" the packet received from the UE2 in order to extract or isolate and then decode the packet from UE1 in the fifth time slot.

Figure 57:
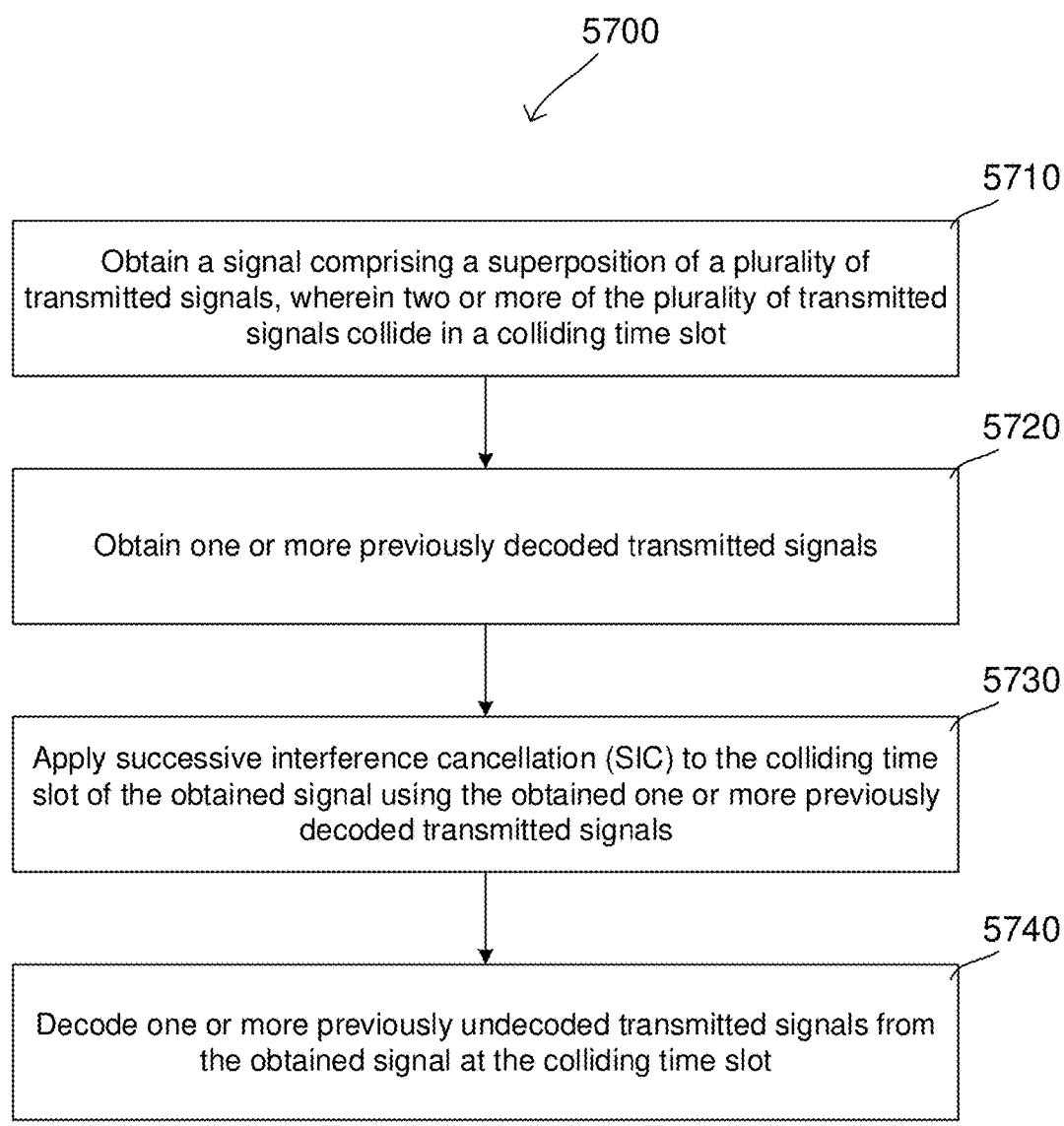
FIG. 57 shows an exemplary method performing radio communications according to some aspects.

FIG. 57 shows an exemplary method 5700 of performing radio communications. The method 5700 may be implemented in a random access scheme, including, for example, in D2D communications. The method 5700 may include or related to processes described in connection to FIGS. 56A-56C.

At 5710 of FIG. 57, a terminal device (e.g., a UE) obtains a signal including a superposition of a plurality of transmitted signals, wherein two or more of the plurality of transmitted signals collide in a colliding time slot. Packets transmitted from the plurality of transmitted may be received as a composite signal and may overlap or collide at a certain time slots, colliding time slots. For example, the UE may be a UE such as UE4 of FIGS. 56A-56C, which receives signals from UE1, UE2, and UE3. There is interference due to a collision in some time slots of packets from the different transmitting devices.

The UE may receive packets containing orthogonal pilot sequences. The transmitted pilot sequences chosen, may be from a set or group of orthogonal pilot sequences and may use the methods described or related to methods 4200 and/or 4700.

Referring back to FIG. 57, at 5720, the UE obtains one or more previously decoded transmitted signals. That is, the UE has already through some means decoded a signal, e.g., decoded a packet received in a signal from a transmitting device. That is, the UE may have decoded the signal, e.g., previously decoded the packet in the interfering signal at previous time. The UE may retrieve previously decoded signals from any suitable non-transitory computer storage device, such as for example a memory buffer of the UE.

At 5730, the UE applies, successive interference cancellation (SIC) to the colliding time slot in the obtained signal using the obtained one or more previously decoded transmitted signals. This cancellation may be called inter-SIC cancellation, based on the fact that it cancels an interfering signal a certain time slot based using another, e.g., previous time slot.

In various exemplary embodiments, applying inter-SIC includes performing one or more channel and noise estimations of the obtained signal at the colliding time slot. A UE performing inter-SIC may select and then implement any kind or type of channel and noise estimation method. The selected channel and noise estimation method is performed on composite signal at the colliding slot. In some embodiments, the selected type of channel and noise estimation method may be MMSE-MRC, MMSE-IRC, and/or any other suitable method.

In further exemplary embodiments, performing the one or more channel and noise estimations of the obtained signal in the colliding slot using MMSE-IRC may include the UE determining a number of unique active pilot sequences from the obtained signal in the colliding time slot. For example, the unique number of pilot sequences may be determined through methods described herein, such as described in connection with FIG. 49.

Then at 5740, the UE decodes one or more previously undecoded transmitted signals from the obtained signal at the colliding time slot. That is after cancellation is implemented, at least one signal would remain isolated and would be able to be decoded with a high probability.

Figure 58:
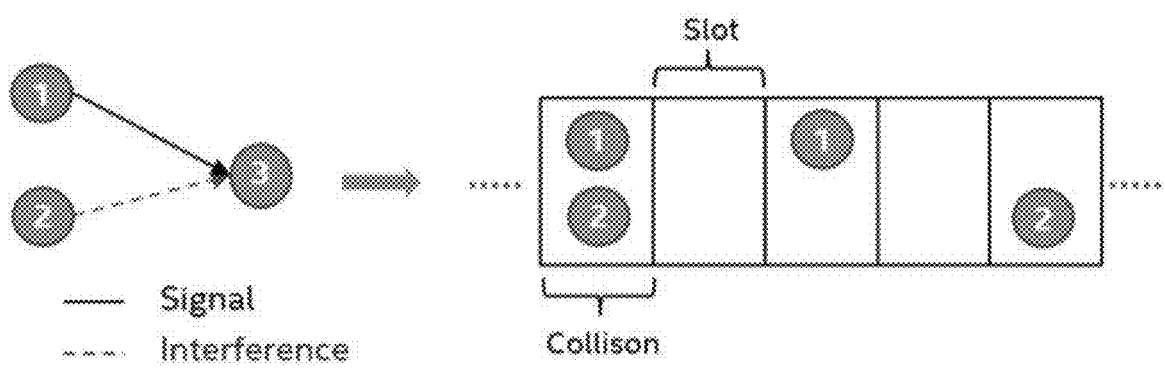
FIG. 58 shows exemplary representation of radio signals in an exemplary scenario according to some aspects.

As previously mentioned, situations where devices are implementing random access schemes (e.g., D2D networks), channel resources are divided into time slots, over which the network devices may attempt to access or use randomly. FIG. 58 shows another example of terminal devices receiving transmissions in a random access network setting. (see also, FIGS. 17A-17C). In FIG. 58, terminal device 3 receives concurrent transmissions from devices 1 and 2. The reception of the signal of interest may be coming from device 1 which is interfered with the transmission from terminal device 2. As shown, in the first time slot of the composite signal received at terminal 3 includes signals from devices 1 and 2. The composite signal y, received at the device 3, can be expressed as:

$$y = x_1 \cdot H_1 + x_2 \cdot H_2 + n$$

where $x_i$ is the signal from device i where $H_i$ is the channel response experienced by signal from device i where n is noise In accordance with exemplary embodiments, the interference provided from the device 2 transmission, $x_2$, in the reception of the packet of interest from device 1, $x_1$, may be dealt with by applying a successive interference cancellation (SIC) loop. One such technique may be known as intra-SIC because it involves applying cancellation techniques using only signal at a single individual time slot. This is in contrast to methods such as method 5700 of FIG. 57, in which cancellation involves a plurality of time slots.

Figure 59:
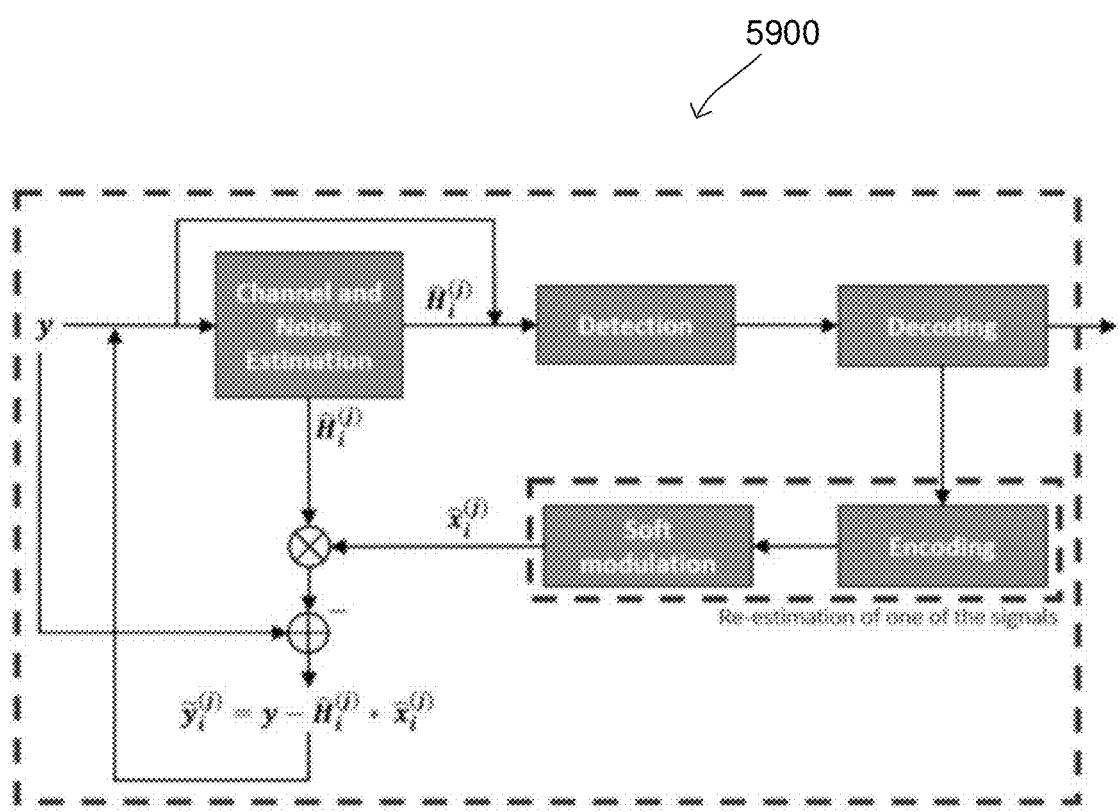
FIG. 59 shows an exemplary successive interference cancellation loop according to some aspects.

FIG. 59 shows an exemplary SIC loop 5900 in accordance with exemplary embodiments. The SIC loop 5900 allows the cancellation of the signal transmitted by device 2 of FIG. 58 in order to produce a final signal that only depends on the signal from device 1. The signal to which the cancellation has been applied can be expressed as:

$$\tilde{y} = y - \hat{x}_2 \cdot \tilde{H}_2 - \hat{x}_1 \cdot \tilde{H}_1$$

As shown in FIG. 59, the SIC loop works by detecting the presence of an interfering signal which is demodulated and decoded. Then the interfering signal is then re-encoded and so as to then subtracted from the original obtained signal. In other words, in this example the SIC loops cancels the estimated interfering signal after being multiplied with determined estimated channel response ($H_2$) from device 2 from the received signal and thus obtains a signal that depends from only device 1. This operation makes the decoding of the transmission from device 1 more likely to succeed at device 3. Reliable estimation of the channels associated with each of the transmissions is important. Accordingly, various channel estimation mechanisms maybe used such as, for example, MMSE-MRC, MMSE-IRC, etc.

A receiver using Minimum Mean Square Error-Maximum-ratio-combining (MMSE-MRC) treats the interference coming from other devices as noise. The covariance matrix, Rr, is given by:

$$R_r = R_N = \frac{1}{n_{pil}} \sum_{pil=1}^{n_{pil}} \left( (y_{pil} - \hat{H}_{0,pil} \bullet x_{0,pil})(y_{pil} - \hat{H}_{0,pil} \bullet x_{0,pil})^H \right)$$

where $n_{pil}$ is the total number of pilot sequences,
where $y_{pil}$ are the receiving signals,
where $\hat{H}_{0,pil}$ are the channel estimation elements associated with the serving signal,
and where $x_{0,pil}$ are the serving signal elements in the pilot positions.

In a receiver using Minimum Mean Square Error-Interference Rejection Combining (MMSE-IRC), the effect of the main interferer is accounted for in the covariance matrix, Rr, which is expressed as or given by:

$$R_r = \frac{1}{n_{pil}} \sum_{pil=1}^{n_{pil}} \left( \hat{H}_{1,pil} \bullet \hat{H}_{1,pil}^H \right) + R_N$$

where $$R_N = \frac{1}{n_{pil}} \sum_{pil=1}^{\hat{H}_{1,pil}} \left( (y_{pil} - \hat{H}_{0,pil} \bullet x_{0,pil} - \hat{H}_{1,pil} \bullet x_{1,pil}) \right.$$

$$\left. (y_{pil} - \hat{H}_{0,pil} \bullet x_{0,pil} - \hat{H}_{1,pil} \bullet x_{1,pil})^H \right)$$

where $\hat{H}_{1,pil}$ are the channel estimation elements associated with the main interferer, and
where $x_{1,pil}$ the interfering signal elements in the pilot positions.

Figure 60:
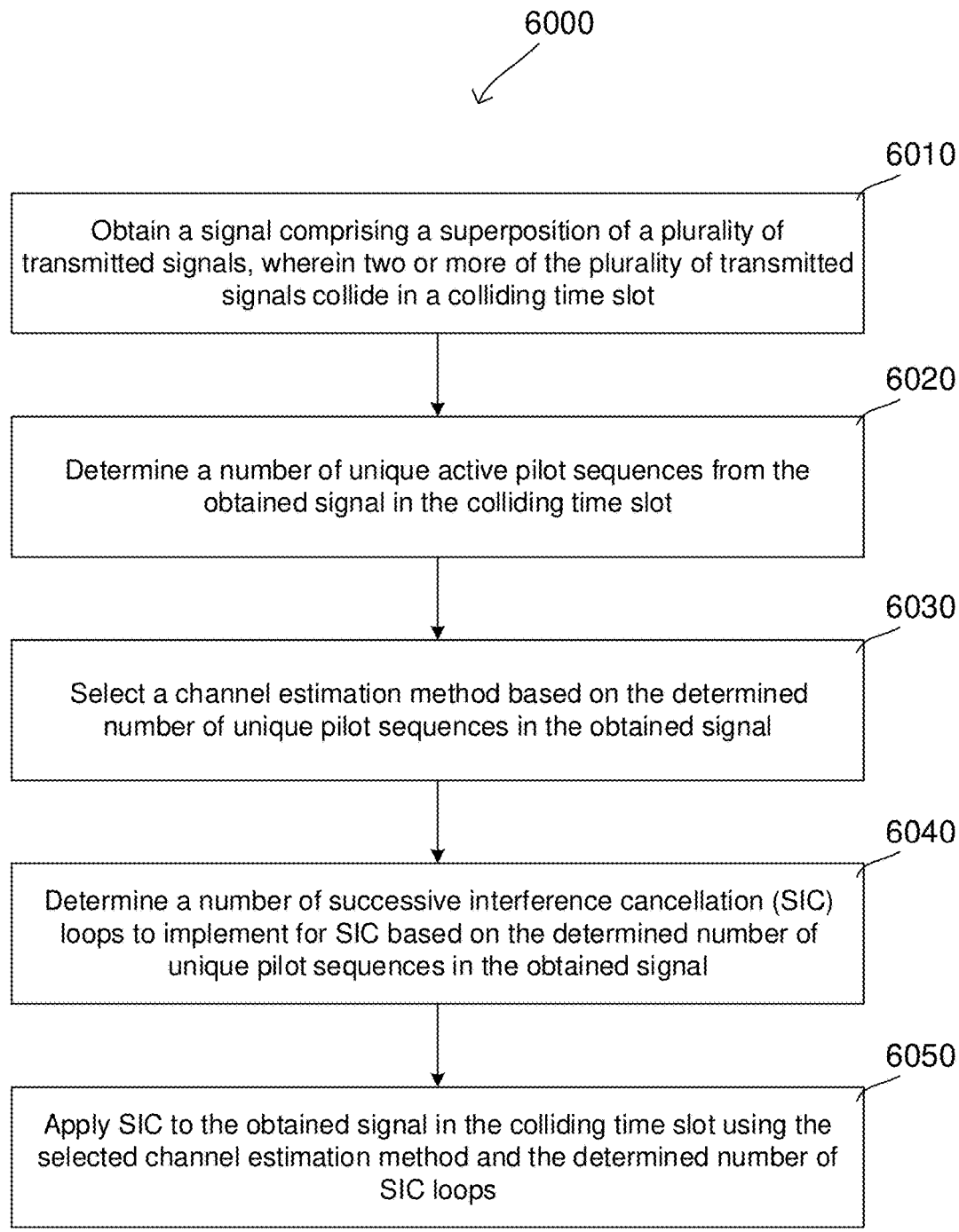
FIG. 60 shows an exemplary method performing radio communications according to some aspects.

FIG. 60 shows another exemplary method 6000 of performing radio communications. The method 6000 may also be implemented in a random access scheme (e.g., uncoordinated network), such as, for example, in D2D scenario.

At 6010, a terminal device (e.g., a UE) obtains or receives a signal including a superposition of a plurality of transmitted signals, wherein two or more of the plurality of transmitted signals collide in a colliding time slot. This scenario has been shown or described in connection FIGS. 56A-56C, 58, etc. At 6020, the UE determines a number of unique active pilot sequences from the obtained signal in the colliding time slot. Further, the UE obtaining the signal may use any suitable method to determine the amount or number of unique or different pilot sequences, including techniques related to method 4900.

As explained in herein, the pilot sequences transmitted may be orthogonal pilot sequences. The transmitting devices reference in connection with method 6000, e.g., the transmitting UEs may transmit according to or similar to the techniques described herein in connection with methods 4200 and method 4700. For example, the UEs may transmitting orthogonal pilot sequences. The pilot sequences chosen, may be from a set or group of orthogonal pilot sequences. In short, each of the plurality of transmitted signals of the obtained signal comprises or includes an orthogonal pilot sequence.

Therefore, the received pilot sequences are orthogonal to each other assuming they are unique (e.g., are not the same pilot sequence). Thus, in accordance with exemplary embodiments, determining the number of unique active pilot sequences is accomplished by determining a number of unique active pilot sequences from the obtained signal in the colliding time slot. This may be done according to or similar to the techniques described herein in connection with method 4900.

At 6030, the UE selects a channel estimation method based on the determined number of unique pilot sequences from or in the obtained signal. For example, as described herein in connection with FIGS. 58 and 59, channel estimation methods such as, MMSE-IRC, MMSE-MRC, etc. may be selected.

Then at 6040, the UE determines a number of successive interference cancellation (SIC) loops to implement based on the determined number of unique pilot sequences in the obtained signal. At 6050, the UE applies SIC to the obtained signal in the colliding time slot using the selected channel estimation method and the determined number of SIC loops. That is, the determined number of interference cancellation loops are applied (successively) to the obtained signal. As a result of applying SIC to the obtained signal produces one or more of the plurality of the transmitted signals. That is, the individual signals, or the individual decoded packets corresponding to each signal can be separately or individually acquired by the process.

Figure 61:
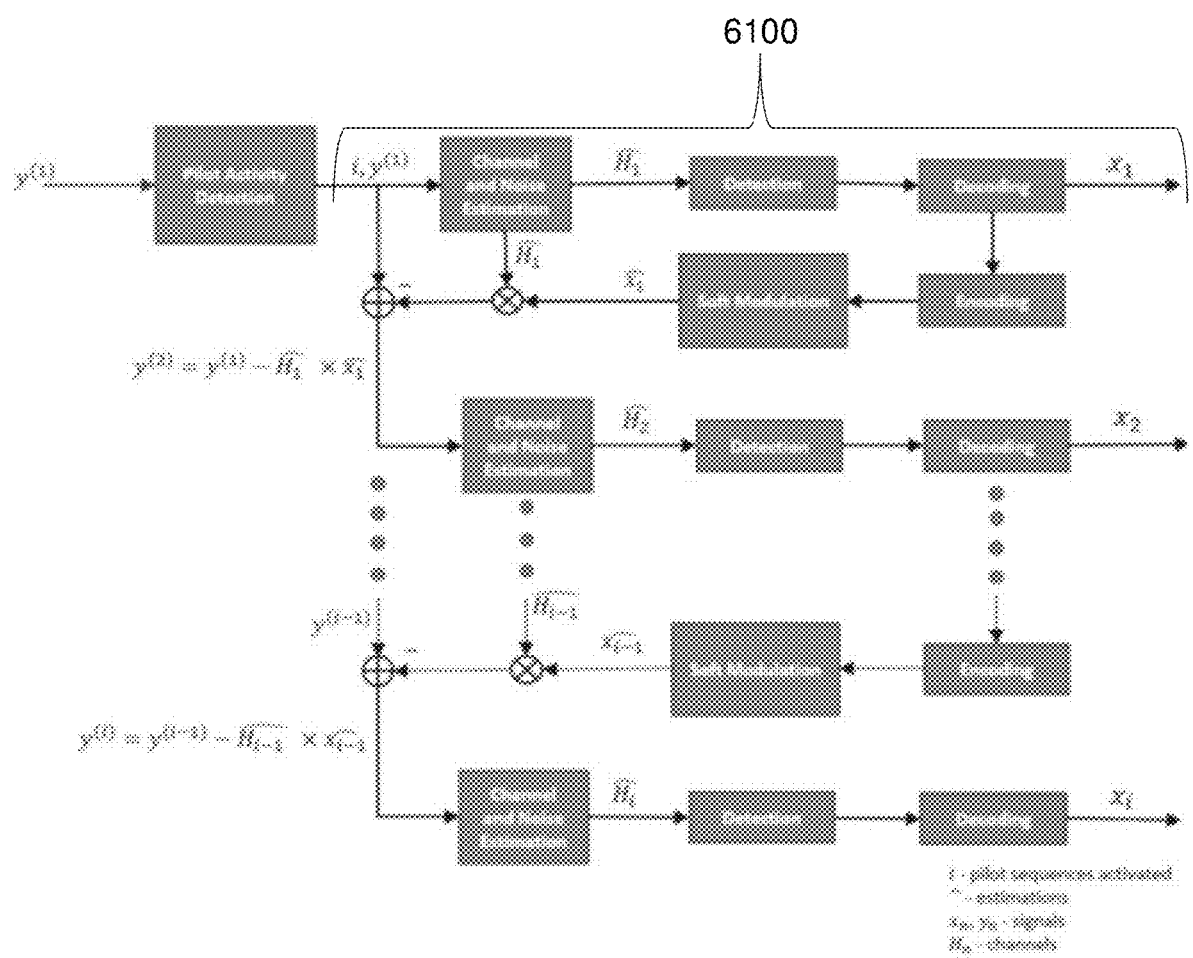
FIG. 61 shows an exemplary series of SIC loops according to some aspects.

Each SIC loop that can be applied to decode and "extracts" one of the plurality of transmitted signals from the obtained signal, e.g., produces one of the decoded and demodulated packets corresponding to the one of the transmitted signals. This can be seen in FIG. 61, which shows a series of SIC loops 6100.

In accordance with exemplary embodiments, the determined and implemented number or amount of SIC loops may be 1 or greater than 1. The number of SIC loops to apply is not fixed and may depend on factors, e.g., interference, device capabilities.

While the method 5700 (inter-SIC) and the method 6000 (intra-SIC) have been described separately, this not so. Both methods may be utilized by a UE for performance in a communication network, in particular a D2D scenario.

Figure 62:
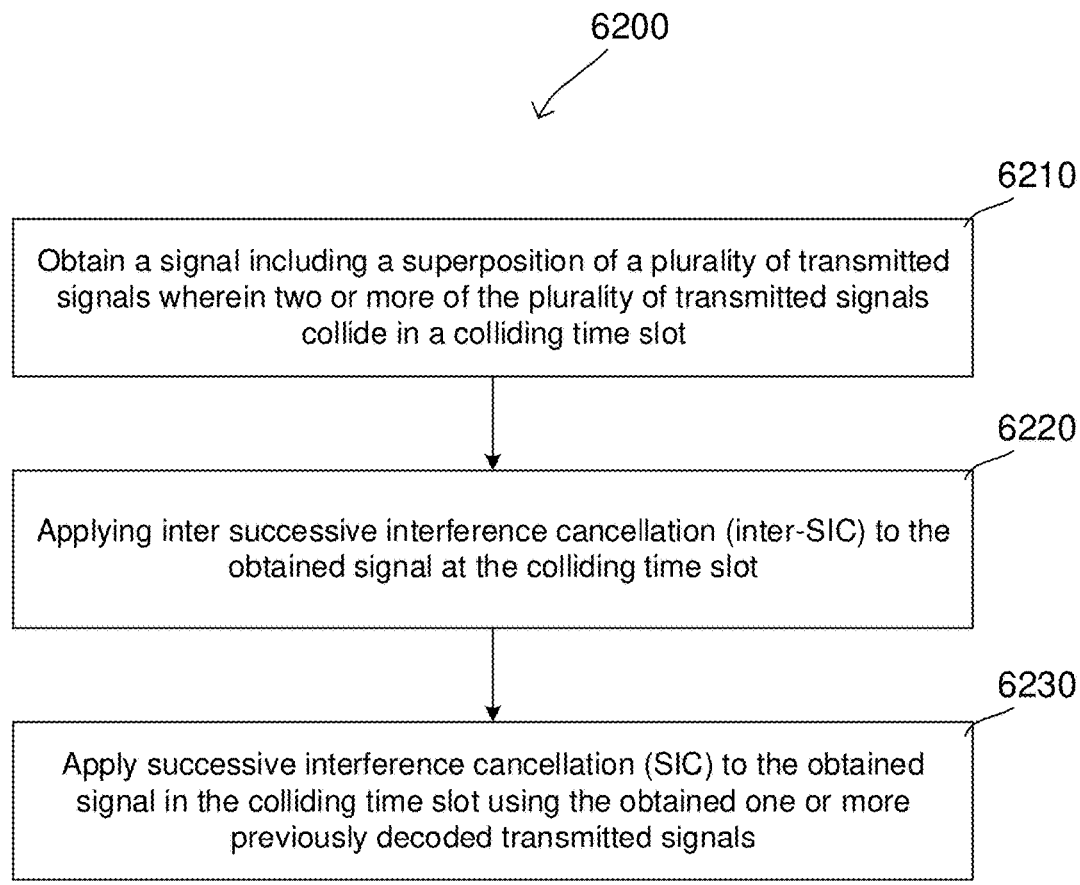
FIG. 62 shows an exemplary method of performing radio communications according to some aspects.

FIG. 62 shows an exemplary method 6200 of performing radio communications according to exemplary embodiments of the present disclosure. The method 6200 includes 6210, where a UE obtaining a signal including a superposition of a plurality of transmitted signals, wherein two or more of the plurality of transmitted signals collide in a colliding time slot. At 6220, the UE applies inter-successive interference cancellation (inter-SIC) to the obtained signal at the colliding time slot. At 6230, the UE applies intra-successive interference cancellation (intra-SIC) to the obtained signal in the colliding time slot.

In general, inter-SIC and intra-SIC may both be applied and/or only one of the method may be applied. Further, if both inter-SIC and intra-SIC are applied, they may be applied in any suitable order depending on the circumstances.

In general, the UE may apply only selectively apply inter-SIC in response to determining that packets in the obtained signal have already been decoded. For example, the UE may apply intra-SIC to decode one or more signals which then may be stored by the UE so that inter-SIC can advantageously be used.

In some exemplary embodiments, the use of virtual frames and transmission patterns, as described herein may be used to identify or determine whether a packet in obtained signal has already been decoded. For example, consider if a virtual frame of length 5 and the patterns shown in FIG. 45. If a receiver observes a transmission in slot 2 then there are only two possibilities: either the corresponding transmitter is using pattern 4540 or pattern 4550, which means that there will be another replica of that packet incoming later in either slot 4 or 5. If there happens to be a collision in slot 4 or 5, receiver knows who is the suspect and depending on whether decoding in slot 2 was successful or not.

Another way of identifying the particular packets could be with the help of pilot sequences, assuming they are not completely random every time, e.g., whenever a transmitter wants to send a packet within a virtual frame, it selects a pilot sequence randomly, but then uses it for all replicas (rather than each replica having also distinct pilot sequences).

In embodiments, whether the packet itself was decoded successfully or not, may be determined through some form of checksum (e.g. CRC), which can be implemented at any layer (physical, MAC, etc).

Figure 63:
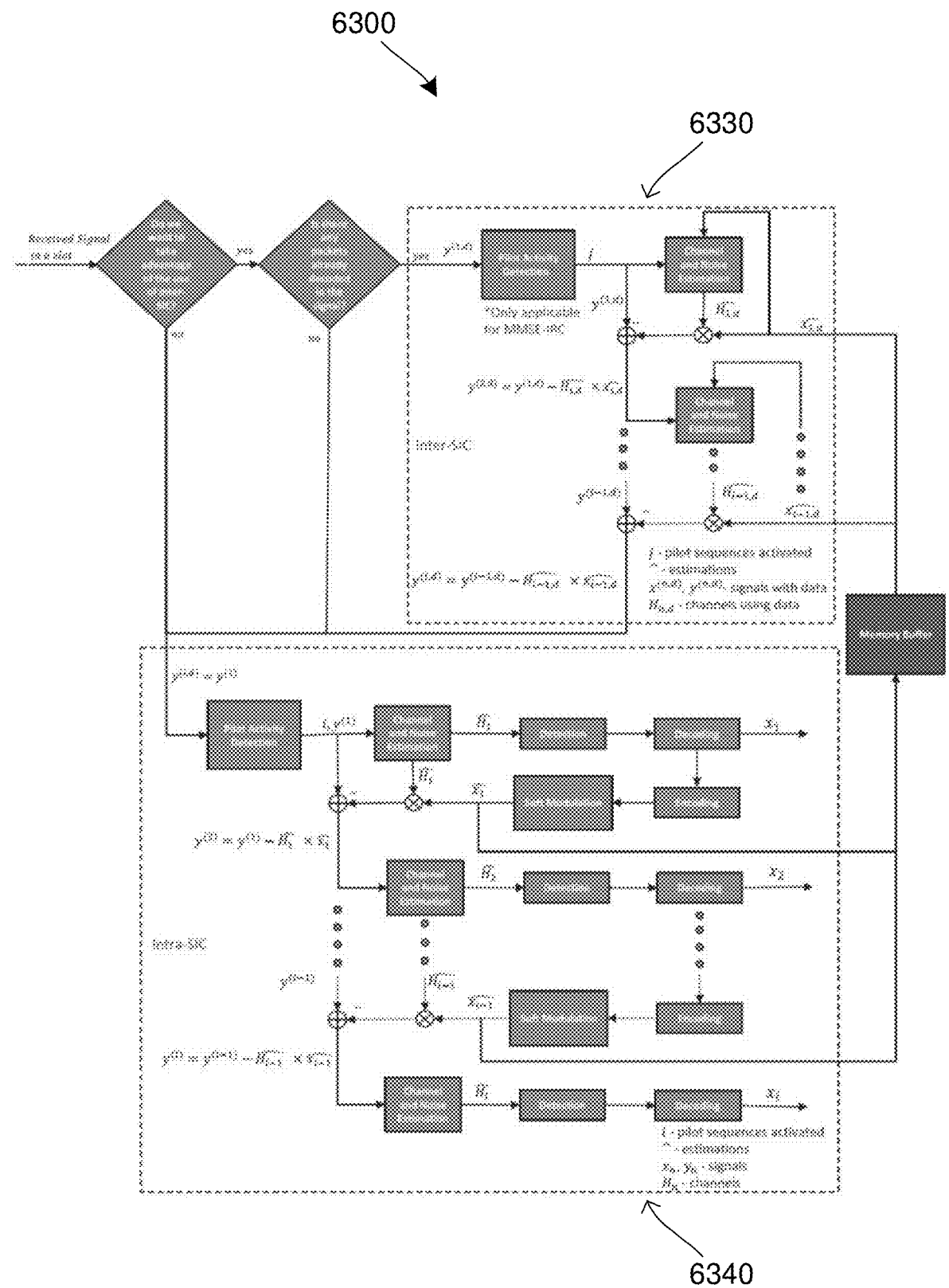
FIG. 63 shows a receiver of a terminal device according to some aspects.

FIG. 63 includes an aspect of a receiver 6300 of a terminal device in accordance with exemplary embodiments of the present disclosure. As shown the receiver 6300 includes an inter-SIC decoder 6330 and intra-SIC decoder 6340. The terminal device, or the receiver 6300 may be configured to determine first whether to apply the inter-SIC decoder 6330. Depending on current device capabilities and network conditions, it may be more advantageous to immediately apply one of the decoders. However, even if the device wishes to use the inter-SIC decoder, then it is necessary that at least one of the packets in a colliding time slot has already been decoded. Therefore, the device must check if any colliding packets have previously been decoded and remain stored on the device (stored in a memory buffer). If not, then the receiver applies only the intra-SIC decoder. Further, even if the inter-SIC decoder 6330 is applied to cancel one or more interfering signals, there may be remaining collisions or colliding signals to which inter-SIC decoder 6330 cannot be applied. Thus, the intra-SIC decoder 6340 may be applied thereafter.

Various communication systems are configured as mesh networks. These mesh networks may operate using device-to-device (D2D) communications. For example, a network of wireless devices (e.g., terminal devices, mobile devices, UEs, and the like) may form a mesh network that uses D2D links (e.g., direct links) between the devices to exchange data. Each wireless device may have one or more peer devices to which it is directly connected, and wireless devices may communicate across the mesh network (e.g., to other wireless devices to which it is not directly connected) using relaying. In some cases, mesh networks may operate without a central radio access infrastructure. For example, in contrast to many cellular networks, wireless devices in mesh networks may communicate without using cells (e.g., base stations and/or access points). As there is no central radio access infrastructure, the wireless devices may manage the mesh network themselves, including functions related to mobility (e.g., handovers) and scheduling (e.g., radio resource allocation).

Mesh networking may enable non-infrastructure-supported communications across large spatial areas. For example, even though wireless devices in the mesh network may not be able to directly communicate with each other, the wireless devices may communicate by relaying data across the mesh network (e.g., using other wireless devices in the mesh network as relay links). Wireless devices in the mesh network may therefore be able to communicate even if they only support short-range communications. This can be particularly relevant when wireless devices use operating frequencies above 2 GHz. Because these operating frequencies experience higher pathloss, direct communication between wireless devices may be difficult unless the wireless devices are proximate. Mesh networking may therefore enable such wireless devices to communicate across large spaces.

Given the interconnections and relaying between many wireless devices, mesh networking can present unique privacy challenges. For example, when wireless devices are not directly connected to each other in the mesh network (e.g., are not peer devices), they may communicate using relaying links in the mesh network. This means that other wireless devices in the mesh network may relay messages between the wireless devices. However, because a relaying link is used, private information for the wireless devices may leak to the relaying devices. This may be undesirable, as it may allow malicious entities to intercept and use the private information.

The information leaked by relaying links can be classified into types of information: device IDs and payload. For example, each wireless device in the mesh network may use a device ID to identify itself, such as for addressing messages and identifying itself in discovery. The device IDs may be considered secret information, and wireless devices may try to avoid leaking these device IDs to other devices (e.g., to prevent malicious eavesdroppers from being able to track wireless device activity based on the device IDs). Relaying links may leak payload data from messages. For example, a relaying device may be able to access the payload data from a message that it is relaying between wireless devices. This can expose sensitive information in the payload data.

Payload data can be protected by end-to-end strong encryption (e.g., where the end wireless devices encrypt the payload data to prevent relaying devices from accessing it). However, because the device IDs are used to establish routes in relaying links, other solutions may be needed to avoid leaking device IDs.

Various aspects of this disclosure present a routing protocol that avoids leaking device identification information (e.g., device IDs) to wireless devices in a mesh network. As further described herein, various aspects of this routing protocol may obfuscate the device IDs in messages, which may prevent non-trusted devices from determining the device IDs. Trusted devices, on the other hand, may be able to revert the obfuscation and determine the device IDs. This routing protocol may therefore prevent leakage of device IDs while still allowing trusted devices to identify wireless devices.

This disclosure describes some aspects of this routing protocol in the context of connectivity updates (e.g., messages exchanged during a mesh update phase as described in FIG. 5). These connectivity updates may be messages that wireless devices in a mesh network exchange in order to determine a routing map (also referred to herein as a connectivity map) of the mesh network, e.g., to determine which wireless devices are connected to which wireless devices within the mesh network. While this disclosure uses this context to describe some aspects, the routing protocols of this disclosure may be used in any context, e.g., may be used to prevent leakage of device IDs in any type of message.

Figure 64:
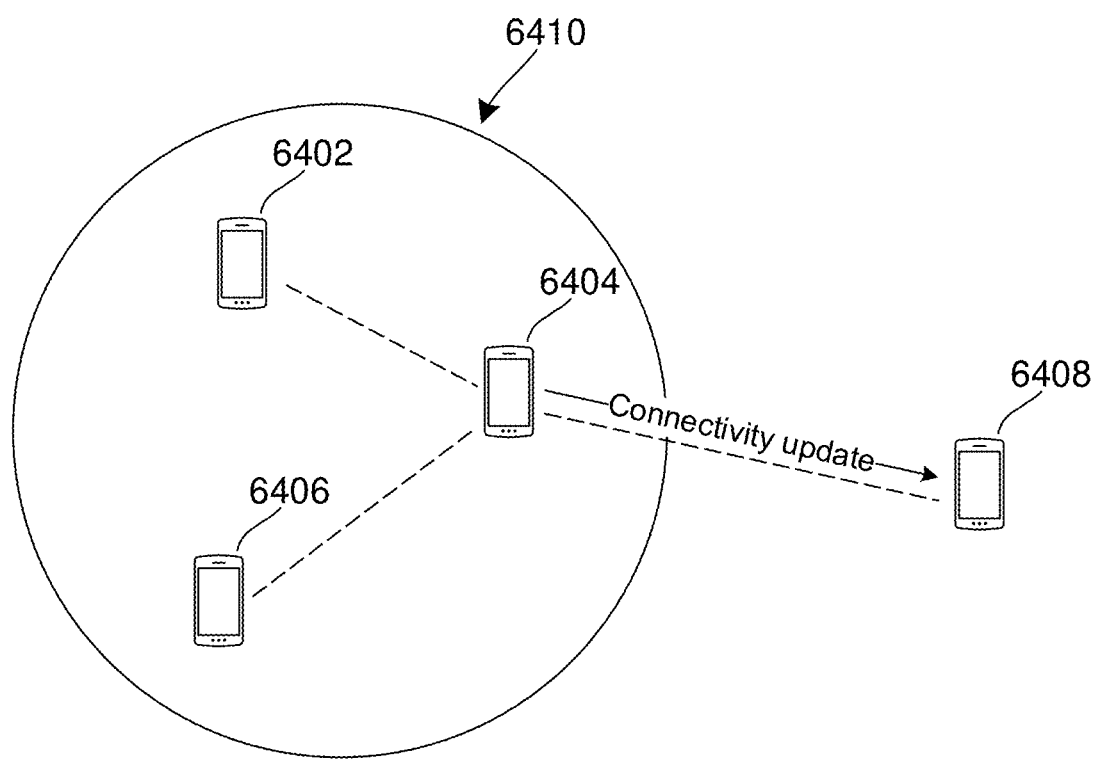
FIG. 64 shows an exemplary scenario illustrating the routing protocol according to some aspects.

FIG. 64 shows an exemplary scenario illustrating the routing protocol according to some aspects. As shown in FIG. 64, wireless devices 6402, 6404, 6406, and 6408 may all be members of a mesh network. Each wireless device may have a trusted entity list containing the device IDs of other wireless devices that the wireless device trusts. For example, wireless device 6404 may have a trusted entity list (stored in a memory of wireless device 6404) that contains the device IDs of wireless devices that wireless device 6404 trusts. These device IDs may be secret device IDs. For example, if a wireless device trusts a set of wireless devices, only this set of wireless devices is permitted to know the device ID of the wireless device. The device ID of the wireless device is secret, e.g., it is assumed that only its trusted devices know its device ID. As device IDs are sensitive information, wireless devices may attempt to protect their device IDs. In some aspects, the trusted entity lists can be managed by a central entity, such as a server that manages the trusted entity lists for the wireless devices. The wireless devices may then use their respective trusted entity lists (which may be the same or different) for D2D communications, e.g., communications in the mesh network.

In the example of FIG. 64, wireless device 6404 may trust wireless devices 6402, 6406, and 6408 (e.g., the trusted entity list of wireless device 6404 may include the device IDs of wireless devices 6402, 6406, and 6408, and the trusted entity lists of wireless devices 6402, 6406, and 6408 may include the device ID of wireless device 6404). Wireless device 6402 may similarly trust wireless devices 6404 and 6408 (and, optionally, wireless device 6406). However, while wireless device 6406 may trust wireless device 6404 (and, optionally, wireless device 6402), wireless device 6406 may not trust wireless device 6408. Accordingly, wireless device 6408 may not be permitted to know the device ID of wireless device 6406.

As previously introduced, wireless devices may exchange connectivity updates to determine a mapping of the mesh network, e.g., to determine the routing paths through the mesh network (which depend on which wireless devices are directly connected to each other, e.g., which wireless devices are peers in the mesh network). A connectivity update may include various data fields, including the device ID of the originator node (e.g., the wireless device that originally sent the connectivity device) and the device IDs of the peers of the originator node (e.g., the other wireless devices in the mesh network to which the originator node is directly connected). In some aspects, the connectivity update may also include information about the peer links between the originator node and its peers, such as band quality information (e.g., information that identifies the frequency band used for the peer link and/or provides information about the quality or cost of the peer link).

In some aspects, the wireless devices in a mesh network may be configured to propagate the connectivity updates through the mesh network using relaying. Accordingly, after an originator node sends a connectivity update, other wireless devices that receive the connectivity update may continue to relay the connectivity update through the mesh network. The relaying wireless devices may read the connectivity update and identify the peers of the originator node. By propagating connectivity updates from multiple originator nodes, wireless devices in the mesh network may develop a mapping of the mesh network (e.g., determine which wireless devices are directly connected to which other wireless devices in the mesh network).

In the example of FIG. 64, wireless device 6404 may send a connectivity update to wireless device 6408 (which, optionally, wireless device 6408 may forward to other wireless devices in the mesh network). As previously indicated, the connectivity update may include the device ID of wireless device 6404 as well as the device IDs of the peers of wireless device 6404, namely wireless devices 6402 and 6406. However, because the peers of wireless device 6404 may not all trust wireless device 6408, wireless device 6404 may configure the connectivity update to obfuscate the device IDs of its peers. Furthermore, because wireless device 6408 may forward the connectivity update to other wireless devices that wireless device 6404 does not trust, wireless device 6404 may additionally or alternatively configure the connectivity update to obfuscate its own device ID. Wireless device 6408 may then be configured to revert this obfuscation to determine device IDs of wireless devices that trust wireless device 6408. Wireless device 6404 may perform the obfuscation so that wireless device 6408 is not able to recover the device IDs of wireless devices that do not trust wireless device 6408, such as wireless device 6406. This may help to avoid leaking device IDs to malicious eavesdroppers. As previously indicated, while this disclosure describes this routing protocol using connectivity updates, this obfuscation protocol may be utilized with any type of messaging.

Figure 65:
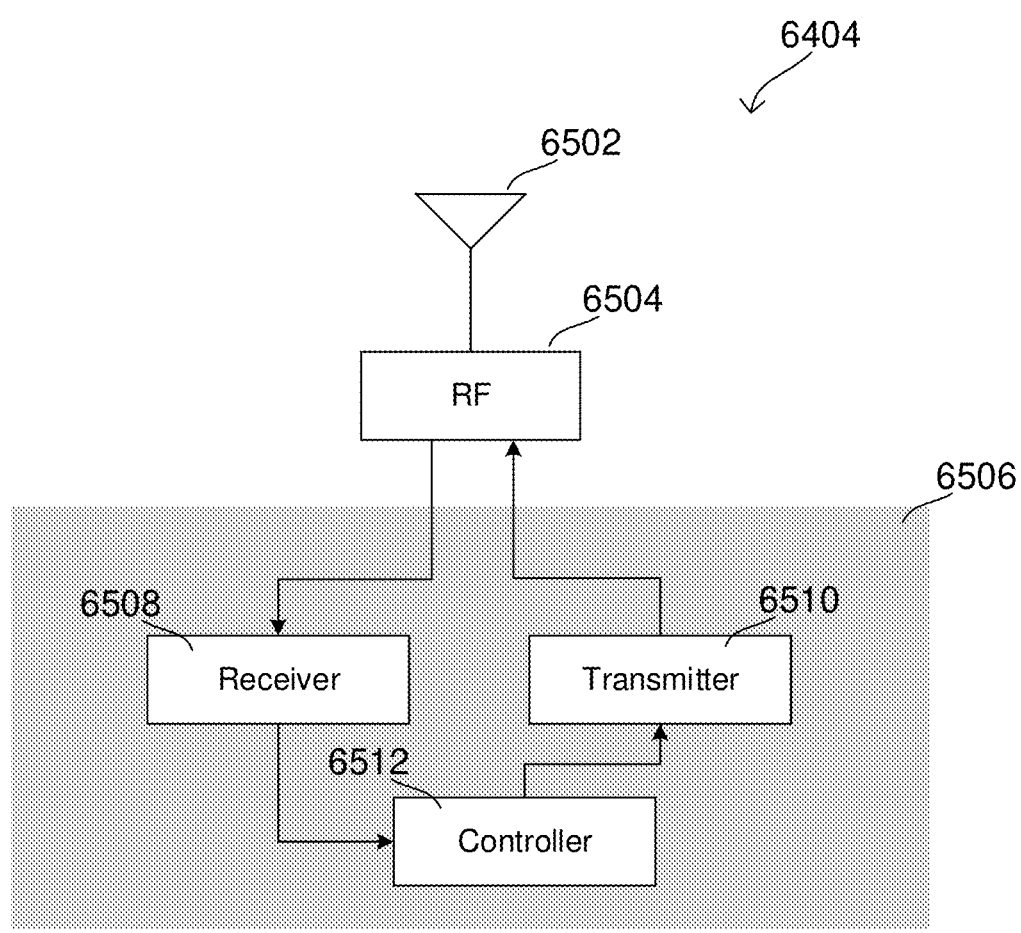
FIGS. 65 and 66 show exemplary internal configurations of wireless devices according to some aspects.
Figure 66:
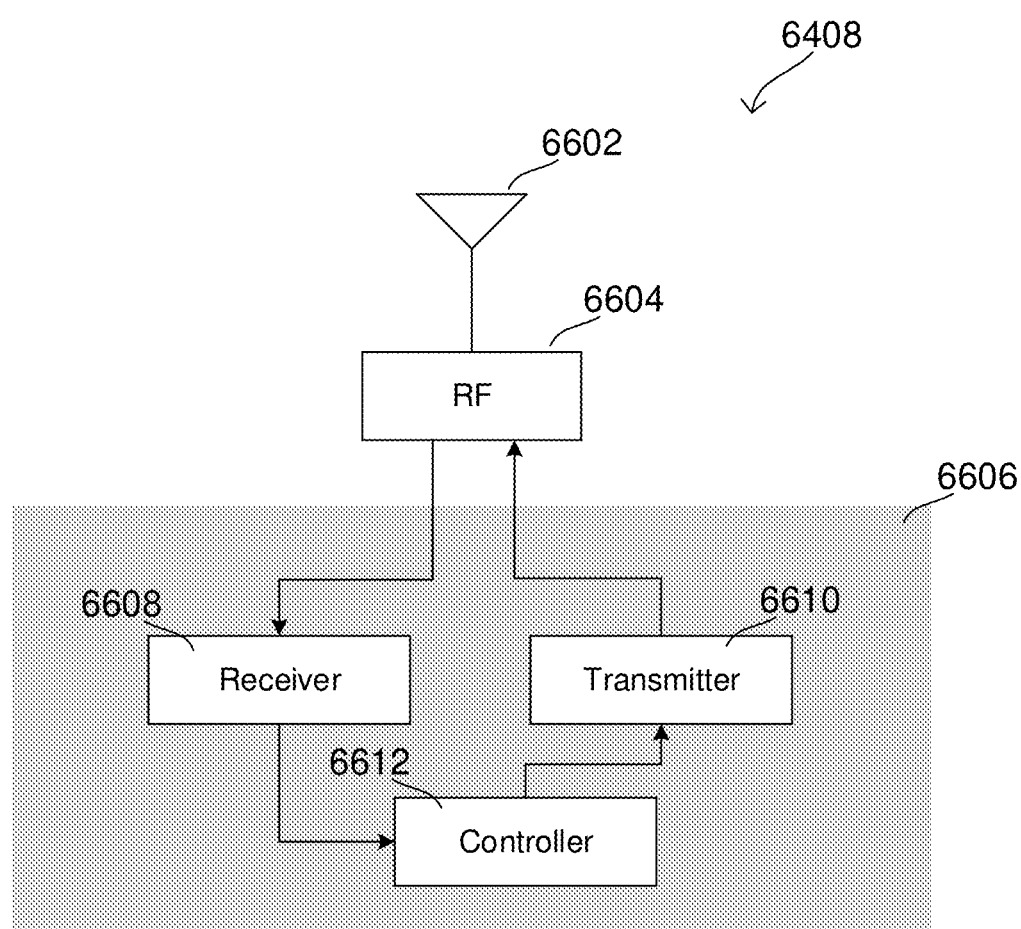

This disclosure will first provide a structural configuration of wireless devices 6404 and 6408, followed by a description of the obfuscation protocol. FIGS. 65 and 66 show exemplary internal configurations of wireless devices 6404 and 6408 according to some aspects. The configurations shown in FIGS. 65 and 66 are focused on the obfuscation protocol features of wireless devices 6404 and 6408 and therefore may not expressly depict other components of wireless devices 6404 and 6408 that are less directly related to the obfuscation protocols. Accordingly, in various aspects wireless device 6404 and/or wireless device 6408 may include various other components. Furthermore, while the following description may focus on wireless device 6404 in a transmitting role (e.g., transmitting messages) and wireless device 6408 in a receiving role (e.g., receiving messages), in some aspects wireless device 6404 may also be configured with the structure and functionality of wireless device 6408 and/or wireless device 6408 may be configured with the structure and functionality of wireless device 6404.

Starting with FIG. 65, wireless device 6404 may include antenna system 6502, RF transceiver 6504, and baseband modem 6506. Wireless device 6404 may transmit and receive radio signals on one or more radio access networks. Baseband modem 6506 may direct such communication functionality of wireless device 6404 according to the communication protocols associated with each radio access network, and may execute control over antenna system 6502 and RF transceiver 6504 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of wireless device 6404 shown in FIG. 65 depicts only a single instance of such components.

Wireless device 6404 may transmit and receive wireless signals with antenna system 6502, which may be a single antenna or an antenna array that includes multiple antennas. In some aspects, antenna system 6502 may additionally include analog antenna combination and/or beamforming circuitry. In the receive (RX) path, RF transceiver 6504 may receive analog radio frequency signals from antenna system 6502 and perform analog and digital RF front-end processing on the analog radio frequency signals to produce digital baseband samples (e.g., In-Phase/Quadrature (IQ) samples) to provide to baseband modem 6506. RF transceiver 6504 may include analog and digital reception components including amplifiers (e.g., Low Noise Amplifiers (LNAs)), filters, RF demodulators (e.g., RF IQ demodulators)), and analog-to-digital converters (ADCs), which RF transceiver 6504 may utilize to convert the received radio frequency signals to digital baseband samples. In the transmit (TX) path, RF transceiver 6504 may receive digital baseband samples from baseband modem 6506 and perform analog and digital RF front-end processing on the digital baseband samples to produce analog radio frequency signals to provide to antenna system 6502 for wireless transmission. RF transceiver 6504 may thus include analog and digital transmission components including amplifiers (e.g., Power Amplifiers (PAs), filters, RF modulators (e.g., RF IQ modulators), and digital-to-analog converters (DACs), which RF transceiver 6504 may utilize to mix the digital baseband samples received from baseband modem 6506 and produce the analog radio frequency signals for wireless transmission by antenna system 6502. In some aspects baseband modem 6506 may control the radio transmission and reception of RF transceiver 6504, including specifying the transmit and receive radio frequencies for operation of RF transceiver 6504.

FIG. 65 also depicts several internal components of baseband modem 6506, including receiver 6508, transmitter 6510, and controller 6512. In some aspects, baseband modem 6506 may include a digital signal processor and a protocol controller. Receiver 6508, transmitter 6510, and controller 6512 may therefore be subcomponents of the digital signal processor (e.g., physical layer components) and/or subcomponents of the protocol controller (e.g., protocol stack components). In some aspects, receiver 6508 may be the physical layer receive chain, transmitter 6510 may be the physical layer transmit chain, and controller 6512 may be the protocol controller that executes the protocol stack of baseband modem 6506. For example, receiver 6508 may include a demodulator, demapper (e.g., constellation demapper), de-interleaver, decoder, and/or descrambler. Receiver 6508 may receive wireless signals in the form of baseband samples via antenna system 6502 and RF transceiver 6504. Receiver 6508 may then sequentially process these baseband samples with the demodulator, demapper (e.g., constellation demapper), de-interleaver, decoder, and/or descrambler to produce a bitstream, which receiver 6508 may provide to controller 6512 (e.g., to protocol stack layers of controller 6512). Transmitter 6510 may include a scrambler, encoder, interleaver, mapper (e.g., constellation mapper), and/or a modulator, which may sequentially process a bitstream (e.g., provided by protocol stack layers of controller 6512) to produce baseband samples (e.g., complex IQ symbols). Transmitter 6510 may then transmit these baseband samples as wireless signals via RF transceiver 6504 and antenna system 6502. Controller 6512 may include one or more processors configured to execute the protocol stack layers as software. This may include generating messages for transmitter 6510 to transmit (e.g., messages including user or control data) and/or recovering messages from bitstreams provided by receiver 6508. In some aspects, controller 6512 may be configured to perform user-plane and control-plane functions to facilitate the transfer of application layer data to and from wireless device 6404 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 6512 may include executable instructions that define the logic of these functions.

As shown in FIG. 66, wireless device 6408 may include antenna system 6602, RF transceiver 6604, and baseband modem 6606. Wireless device 6408 may transmit and receive radio signals on one or more radio access networks. Baseband modem 6606 may direct such communication functionality of wireless device 6408 according to the communication protocols associated with each radio access network, and may execute control over antenna system 6602 and RF transceiver 6604 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of wireless device 6408 shown in FIG. 66 depicts only a single instance of such components.

Wireless device 6408 may transmit and receive wireless signals with antenna system 6602, which may be a single antenna or an antenna array that includes multiple antennas. In some aspects, antenna system 6602 may additionally include analog antenna combination and/or beamforming circuitry. In the receive (RX) path, RF transceiver 6604 may receive analog radio frequency signals from antenna system 6602 and perform analog and digital RF front-end processing on the analog radio frequency signals to produce digital baseband samples (e.g., In-Phase/Quadrature (IQ) samples) to provide to baseband modem 6606. RF transceiver 6604 may include analog and digital reception components including amplifiers (e.g., Low Noise Amplifiers (LNAs)), filters, RF demodulators (e.g., RF IQ demodulators)), and analog-to-digital converters (ADCs), which RF transceiver 6604 may utilize to convert the received radio frequency signals to digital baseband samples. In the transmit (TX) path, RF transceiver 6604 may receive digital baseband samples from baseband modem 6606 and perform analog and digital RF front-end processing on the digital baseband samples to produce analog radio frequency signals to provide to antenna system 6602 for wireless transmission. RF transceiver 6604 may thus include analog and digital transmission components including amplifiers (e.g., Power Amplifiers (PAs), filters, RF modulators (e.g., RF IQ modulators), and digital-to-analog converters (DACs), which RF transceiver 6604 may utilize to mix the digital baseband samples received from baseband modem 6606 and produce the analog radio frequency signals for wireless transmission by antenna system 6602. In some aspects baseband modem 6606 may control the radio transmission and reception of RF transceiver 6604, including specifying the transmit and receive radio frequencies for operation of RF transceiver 6604.

FIG. 66 also depicts several internal components of baseband modem 6606, including receiver 6608, transmitter 6610, and controller 6612. In some aspects, baseband modem 6606 may include a digital signal processor and a protocol controller. Receiver 6608, transmitter 6610, and controller 6612 may therefore be subcomponents of the digital signal processor (e.g., physical layer components) and/or subcomponents of the protocol controller (e.g., protocol stack components). In some aspects, receiver 6608 may be the physical layer receive chain, transmitter 6610 may be the physical layer transmit chain, and controller 6612 may be the protocol controller that executes the protocol stack of baseband modem 6606. For example, receiver 6608 may include a demodulator, demapper (e.g., constellation demapper), de-interleaver, decoder, and/or descrambler. Receiver 6608 may receive wireless signals in the form of baseband samples via antenna system 6602 and RF transceiver 6604. Receiver 6608 may then sequentially process these baseband samples with the demodulator, demapper (e.g., constellation demapper), de-interleaver, decoder, and/or descrambler to produce a bitstream, which receiver 6608 may provide to controller 6612 (e.g., to protocol stack layers of controller 6612). Transmitter 6610 may include a scrambler, encoder, interleaver, mapper (e.g., constellation mapper), and/or a modulator, which may sequentially process a bitstream (e.g., provided by protocol stack layers of controller 6612) to produce baseband samples (e.g., complex IQ symbols). Transmitter 6610 may then transmit these baseband samples as wireless signals via RF transceiver 6604 and antenna system 6602. Controller 6612 may include one or more processors configured to execute the protocol stack layers as software. This may include generating messages for transmitter 6610 to transmit (e.g., messages including user or control data) and/or recovering messages from bitstreams provided by receiver 6608. In some aspects, controller 6612 may be configured to perform user-plane and control-plane functions to facilitate the transfer of application layer data to and from wireless device 6408 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 6612 may include executable instructions that define the logic of these functions.

As previously introduced regarding FIG. 64, wireless device 6404 may be configured to send a connectivity update to wireless device 6408, where the connectivity update includes the device IDs of wireless device 6404 and the device IDs of one or more of its peers. Wireless device 6404 may obfuscate these device IDs in the connectivity update to prevent wireless devices from determining device IDs of other wireless devices that do not trust them. Wireless device 6408 may then read the connectivity update and attempt to recover the device IDs in the wireless update. Due to the obfuscation, wireless device 6408 may only be able to recover the device IDs of wireless devices that trust wireless device 6408 (e.g., wireless devices for which wireless device 6408 knows their secret device IDs).

Figure 67:
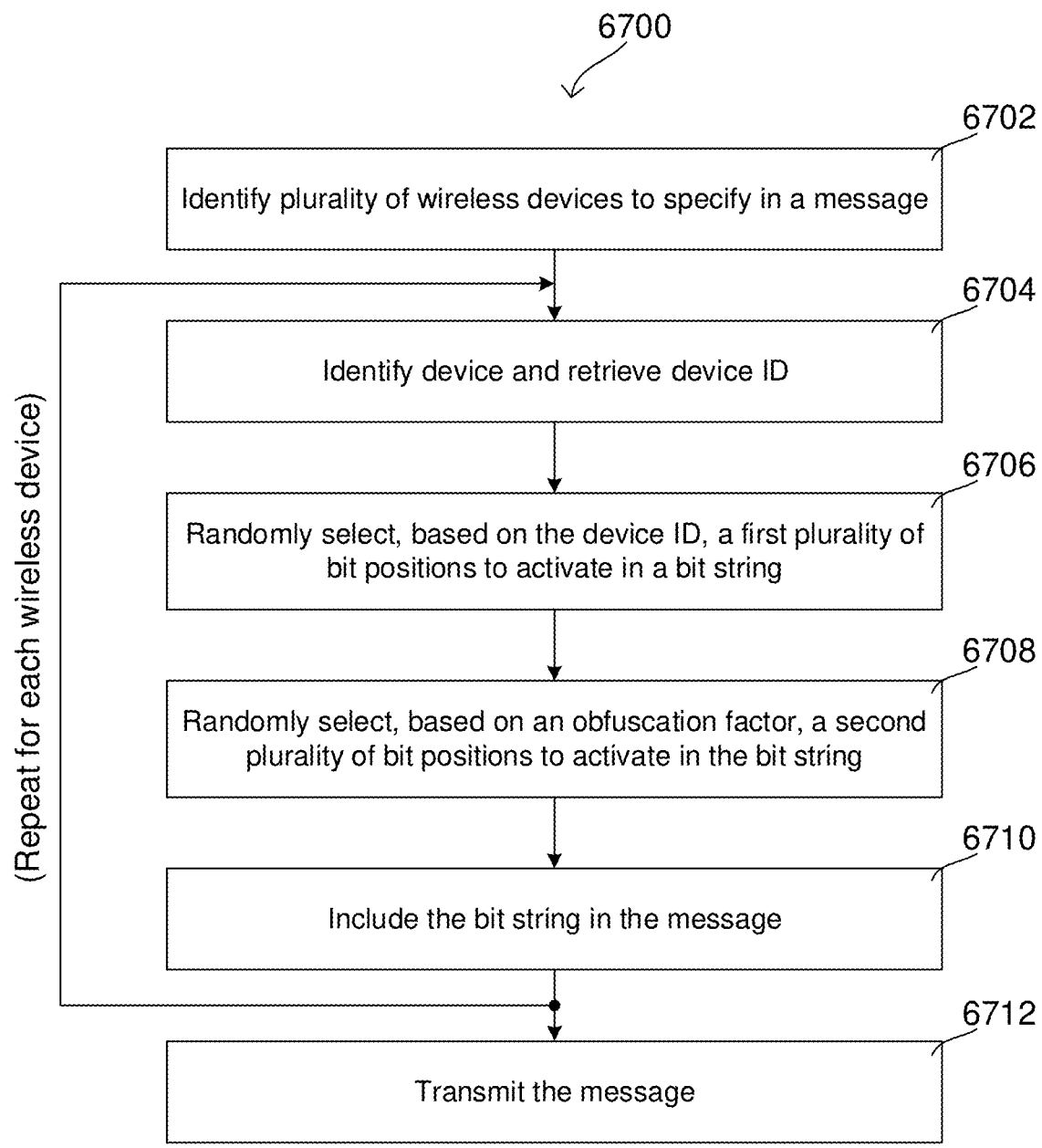
FIGS. 67 and 68 show exemplary flow charts for routing protocols using obfuscation according to some aspects.
Figure 68:
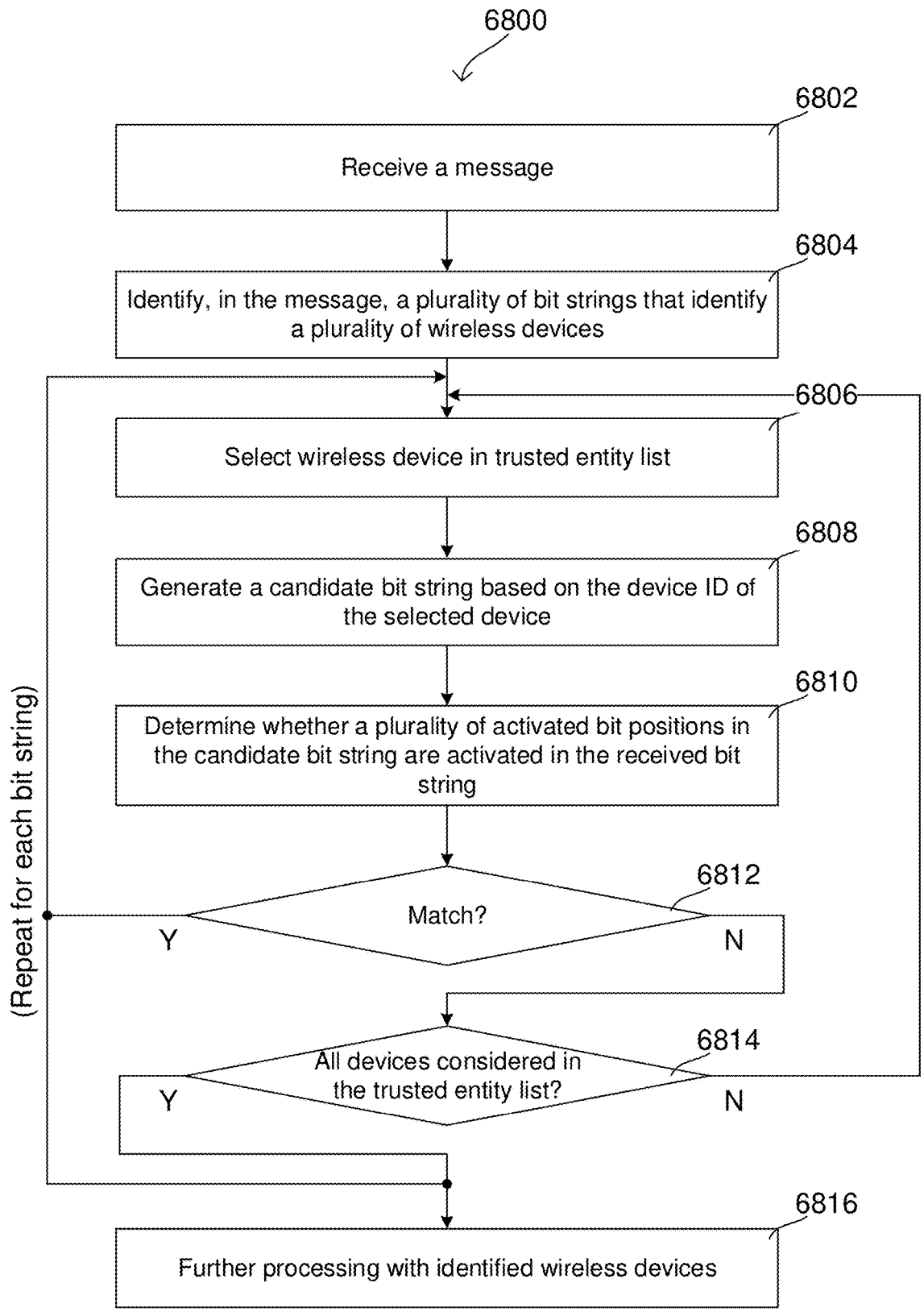

FIGS. 67 and 68 show flow charts 6700 and 6800, which describe this procedure according to some aspects. Flow chart 6700 in FIG. 67 describes the procedure for wireless device 6404 to generate the connectivity update while flow chart 6800 in FIG. 68 describes the procedure for wireless device 6408 to read the connectivity update. Although described in the context of connectivity updates for mesh networks in FIG. 68, the underlying device ID obfuscation and recovery techniques (e.g., the routing protocol) can be used in any type of message.

Starting with flow chart 6700 in FIG. 67, wireless device 6404 may first identify a plurality of wireless devices to specify in a connectivity update (or, alternatively, another type of message) in stage 6702. For example, controller 6512 of wireless device 6404 may decide to generate and send a connectivity update to wireless device 6408. Controller 6512 may then identify the plurality of wireless devices to specify in the connectivity update. Using the example of FIG. 64, controller 6512 may identify wireless device 6404 and its peers, wireless devices 6402 and 6406, as the plurality of wireless devices.

Wireless device 6404 may then perform stages 6704-6710 for each of the plurality of wireless devices. As shown in FIG. 67, controller 6512 may identify one of the plurality of wireless devices (either itself or one of the peers of wireless device 6404) as a selected device and retrieve the device ID in stage 6704. As previously indicated, wireless devices in a mesh network may store a trusted entity list, such as in a local memory. The trusted entity list of a given wireless device may include the device IDs of the other wireless devices that the wireless device trusts. Referring to the example of FIG. 64 introduced above, wireless device 6404 may trust wireless devices 6402, 6406, and 6408. Accordingly, the trusted entity list of wireless device 6404 may include the device IDs of wireless devices 6402, 6406, and 6408. The trusted entity lists of wireless devices 6402, 6406, and 6408 may also include the device ID of wireless device 6404. In some aspects, the trusted entity lists may be preconfigured at time of manufacture. In some aspects, the wireless devices may update their trusted entity lists periodically. For example, a cloud server may be responsible for managing the trusted entity lists (e.g., to reconfigure which wireless devices trust and are trusted by other wireless devices). The cloud server may therefore periodically send updated trusted entity lists to the wireless devices, which may then update their trusted entity lists with the updated trusted entity lists.

Controller 6512 may therefore identify the device ID for the selected device in the trusted entity list (e.g., stored in a local memory, such as a local memory of controller 6512). Controller 6512 may then retrieve the device ID from the trusted entity list to complete stage 6704.

Controller 6512 may then generate a bit string in stages 6706-6708 that represents the device ID of the selected device. The bit string may obfuscate the device ID to prevent wireless devices that the selected device does not trust from identifying the device ID. Controller 6512 may begin this process with a bit string length L, number of first bit positions K, number of second bit positions N, and the device ID. Controller 6512 may also initialize an empty bit string S of length L (e.g., to all "0"s or all "1"s), and may initialize a bit selection vector L containing the integers between 1 and L (representing each of the bit positions in the bit string S).

As shown in FIG. 67, controller 6512 may then randomly select, based on the device ID of the selected device, a first plurality of bit positions to activate in a bit string in stage 6706. For example, controller 6512 may initialize a random number generator (e.g., a pseudorandom number generator (PRNG)) with the device ID as the seed. Controller 6512 may then generate K numbers (e.g., a first set of numbers) with the random number generator. Controller 6512 may then, for each of the K numbers, identify a bit position in S to activate (e.g., identify bit positions of S to activate based on the K numbers). Using a first number of the K numbers as an example, controller 6512 may determine the modulus of the first number using the remaining number of bit positions (entries) in L plus one as a base, thus obtaining a modulus result. Controller 6512 may then select an entry from the bit selection vector L using the modulus result (e.g., using the modulus result as the index of the entry). As bit selection vector L initially contains the integers 1 to L (the size of the bit string), the integer in the selected entry of L points to a specific bit position in bit string S (which has size L). In other words, the modulus result of the first number points to an entry in L, which in turn is an integer referring to a bit position (or index) in S. Controller 6512 may then activate this bit position in S to which the first number points (e.g., by setting this bit position in S to "1" if S is initialized to all "0"s, or by setting this bit position of S to "0" if S is initialized to all "1"s). As controller 6512 has activated this bit position in S, controller 6512 may remove this bit position (its entry) from bit position vector L.

After activating the bit position for this first number, controller 6512 may repeat the procedure to activate a bit position for the next number of the K numbers. For example, controller 6512 may determine the modulus of the second number using the remaining number of bit positions in L plus one as a base (where the base is one less than the base used for the first number, because controller 6512 removed one entry from L when activating the first number). Controller 6512 may then select an entry in bit selection vector L using the modulus result to identify the index of the entry. As controller 6512 previously removed the entry from L to which the first number pointed, controller 6512 will select a different entry from L for the second number. This entry will contain an integer (between 1 and L) that refers to one of the L bit positions in S. Controller 6512 may then activate this bit position in S.

Controller 6512 may continue this procedure for each of the K numbers (the first set of numbers generated by the random number generator). Controller 6512 may therefore activate a first plurality of K bit positions in S based on the device ID of the selected device (as the device ID is used as a seed for the random number generator) in stage 6706. By removing entries from L when they are used to select bit position to activate in S, controller 6512 may select a different bit position to activate for each of the K first numbers. In some aspects, controller 6512 may generate all of the K numbers before starting to select and/or activate the first plurality of K bit positions in S. In other aspects, controller 6512 may select and/or activate some of the first plurality of bit positions in S before controller 6512 generates all of the K numbers.

After activating the first K bit positions in stage 6706, controller 6512 may proceed to stage 6708. As shown in FIG. 67, controller 6512 may randomly select, based on an obfuscation factor, a second plurality of bit positions to activate in the bit string in stage 6708. The obfuscation factor may be the number N of second bit positions (e.g., the obfuscation factor may control the number of second bit positions that obfuscate the first bit positions in S). These N bit positions may be supplemental, and may disguise the K activated bit positions in S. In other words, if K+N bit positions are activated in S, a device may not be able to determine precisely which bit positions were the K bit positions vs. which bit positions were the N bit positions.

Controller 6512 may select the second plurality of bit positions (N in total) to activate using a similar procedure. For example, controller 6512 may keep the random number generator seeded with the device ID of the selected device, and may then generate N additional numbers (e.g., a second set of numbers) from the random number generator. In other words, controller 6512 may generate the N additional numbers without resetting the random number generator. In some aspects, controller 6512 may generate the N additional numbers after activating the K bit positions in stage 6706; in other aspects, controller 6512 may generate the K+N numbers and subsequently begin activating the K bit positions.

Controller 6512 may then, for each of the N additional numbers, identify a bit position in S to activate. Controller 6512 may continue to use the same bit selection vector L previously used for the K bit positions. Accordingly, L may not contain entries for the K bit positions that controller 6512 previously activated in stage 6708, because controller 6512 removed these from L when activating the corresponding K bit positions. As L is continuous, controller 6512 may select N different bit positions (relative to the first plurality of K bit positions). Controller 6512 may use L to select the N bit positions in a similar manner as previously described.

Using a first number of the N additional numbers as an example, controller 6512 may determine the modulus of this first number using the remaining number of bit positions in L plus one as a base (where controller 6512 removed K entries from L when selecting K bit positions of S to activate). Controller 6512 may then select an entry from L using the modulus result as the index of the entry. The integer in this selected entry (between 1 to L) points to a bit position in S; accordingly, controller 6512 may select and activate this bit position in S. In other words, the modulus result of the first number points to an entry in L, which is an integer that controller 6512 may use as an index to select a bit position in S to activate. As controller 6512 has activated this bit position in S, controller 6512 may remove this bit position (its entry) from bit position vector L.

After activating the bit position for the first number of the N additional numbers, controller 6512 may activate a bit position for the next number of the N additional numbers. For example, controller 6512 may determine the modulus of the second number using the remaining number of bit positions in L plus one as a base (which is one less than the base used for the first number of the N additional numbers). Controller 6512 may then select an entry in bit selection vector L using the modulus result to identify the index of the entry. As previously indicated, L may not contain entries pointing to bit positions in S that controller 6512 previously activated. Controller 6512 may then activate this bit position in S.

Controller 6512 may continue this procedure for each of the N additional numbers (the second set of numbers generated by the random number generator). Controller 6512 may therefore activate a second plurality of N bit positions in S based on the obfuscation factor N in stage 6708. As controller 6512 may have continued to generate the N additional numbers using the device ID as the seed for the random number generator (e.g., without resetting the random number generator after generating the K random numbers), controller 6512 may also base the selection of the second plurality of N bit positions in S on the device ID. In some aspects, controller 6512 may generate all of the N additional numbers before starting to select and/or activate bit the second plurality of N bit positions in S. In other aspects, controller 6512 may select and/or activate some of the second plurality of bit positions in S before controller generates all of the N additional numbers.

By completing stages 6706 and 6708, controller 6512 may obtain a bit string S with K+N activated bit positions. As each activated bit position looks the same (e.g., is set to "1"), an observer may not be able to determine which of the activated bit positions are the first plurality of K bit positions versus the second plurality of N bit positions (e.g., may not be able to identify which bits are based on the authentication factor N). The N activated bit positions may therefore obfuscate the K activated bit positions, thus preventing an observer from identifying the K activated bit positions.

As shown in FIG. 67, controller 6512 may then include the bit string S in the message in stage 6710. For example, the message may include one or more data fields for bit strings that identify wireless devices. As previously indicated, the message may be a connectivity update, or may be another type of message that identifies wireless devices. Controller 6512 may therefore include the bit string S in one of the data fields of the message.

As shown in FIG. 67, controller 6512 may repeat stages 6704-6710 for each wireless device that controller 6512 is identifying in the message. If controller 6512 is only identifying one wireless device, controller 6512 may proceed directly to stage 6712; otherwise, controller 6512 may identify another wireless device and retrieve its device ID in stage 6704. Controller 6512 may then generate another bit string S based on this device's device ID and the obfuscation factor N in stages 6706-6708. Controller 6512 may then include this bit string in the message in stage 6710. In such cases, the message may therefore include multiple bit strings that each identify a different wireless device.

With reference to the connectivity update example of FIG. 64, controller 6512 may identify itself (wireless device 6404) and wireless devices 6402 and 6406 (the peers of wireless device 6404) as the plurality of devices in stage 6702, and may perform stages 6704-6710 for each of itself, wireless device 6402, and wireless device 6406. Accordingly, controller 6512 may generate bit strings for each of itself, wireless device 6402, and wireless device 6406 and may include these bit strings in the connectivity update message. In some aspects, controller 6512 may include each separate bit string in a respective data field of the connectivity update message. For example, the connectivity update message may include a data field assigned to the bit string of the originating device (the wireless device that originally transmits the connectivity update message). Controller 6512 may insert the bit string based on the device ID of wireless device 6404 into this first data field. The connectivity update message may include one or more additional data fields assigned to bit strings of the originating device's peers. Controller 6512 may insert the respective bit strings for wireless devices 6402 and 6406 into these data fields. Controller 6512 may therefore obtain a connectivity update message that identifies itself, wireless device 6402, and wireless device 6406 via the bit strings. As the bit strings are obfuscated, an observer may not be able to determine the device ID of any of wireless devices 6402-6406 by looking at the bit strings directly (e.g., without further processing).

After obtaining the message, controller 6512 may provide the message to transmitter 6510 for transmission. Transmitter 6510 may then transmit the message in stage 6712. For example, transmitter 6510 may perform physical layer processing on the message and transmit the resulting IQ samples (representing the message) via RF transceiver 6504 and antenna system 6502.

Using the example of FIG. 64, transmitter 6510 may transmit the connectivity update message to wireless device 6408. Accordingly, wireless device 6404 may specify, to wireless device 6408, which wireless device is the originating device (of the connectivity update message) and which wireless devices are the peers of the originating device. As the connectivity update message specifies the identifies of these wireless devices with bit strings that are obfuscated (with N bit positions activated in addition to the K bit positions), wireless device 6408 may process the obfuscated bit strings to identify the wireless devices specified in the connectivity update message.

Table 1 below shows exemplary pseudocode describing the procedure of stages 6706-6708 according to some aspects. As described therein, controller 6512 may begin with bit string length L, number K of the first plurality of bit positions, number N of the second plurality of bit positions, and device ID ID of the selected device. Controller 6512 may then generate K+N random numbers from a random number generator g seeded with ID, and then select K+N bit positions to activate in bit string S. Controller 6512 may obtain bit string S as the output. In some aspects, controller 6512 may perform this procedure by executing program code that defines this pseudocode in the form of executable instructions.

TABLE 1

Message generation pseudocode

| Line Number | Code |
|---|---|
| 1 | Input (L, K, N, ID) |
| 2 | Output (S) |
| 3 | Initialize the bit string S with L zeros, as $S \leftarrow 0_L$ |
| 3 | Initialize the random generator g with ID, as g(ID) |
| 4 | Extract K + N uniform random integers within the $[2^0, 2^{32}]$ interval, as U = g (ID, K, N) |
| 5 | Initialize bit selection vector L, as $L \leftarrow 1 \ldots L$ |
| 6 | FOR j: 1 ... K + N |
| 7 | Select the $j^{th}$ index to be active in S, as $h_j = L(mod(U(j), L + 1 - j))$ |
| 8 | Activate the $j^{th}$ index to be active in S, as $S(h_j) = 1$ |
| 9 | Exclude the $j^{th}$ selected index from L, as $L = L\backslash\{h_j\}$ |
| 10 | END |

As previously indicated, FIG. 68 shows flow chart 6800. Flow chart 6800 describes a procedure for wireless devices to decode messages that include bit strings obfuscated with the techniques described herein. This may include connectivity update messages and other messages that specify device IDs of wireless devices. Continuing with the example of FIG. 64, wireless device 6408 may perform the procedure of flow chart 6800 to process the message (e.g., the connectivity update message) transmitted by wireless device 6404. As shown in FIG. 68, wireless device 6408 may receive the message in stage 6802. For example, receiver 6608 may receive the message via antenna system 6602 and RF transceiver 6604. Receiver 6608 may perform physical layer processing on the message (represented by IQ samples provided by RF transceiver 6604) and provide the message to controller 6612 (e.g., in the form of a bitstream).

The message may include a plurality of bit strings that identify a plurality of wireless devices. For example, wireless device 6404 may have inserted bit strings identifying wireless devices 6402-6406 in the message. Controller 6612 may therefore read the message in stage 6804 to identify a plurality of bit strings that identify a plurality of wireless devices. This may include identifying the different data fields of the message and identifying the plurality of bit strings in the data fields.

Controller 6612 may then process each bit string (e.g., individually) in stages 6806-6812 to determine whether the bit strings identify one of the wireless devices in its trusted entity list. As described above for FIG. 67, the bit strings may be configured to obfuscate the corresponding device ID. In particular, a given bit string may have K+N randomly selected bit positions out of L total bit positions. However, due to the bit string generation procedure described above, an observer may not be able to directly determine which of the K+N activated bit positions are the K bit positions (the first plurality of bit positions) and which are the N bit positions (the second plurality of bit positions). The N bit positions may therefore obfuscate the K bit positions.

Due to this obfuscation, a wireless device may only be able to decode a received bit string and recover the device ID if the wireless device is trusted by the wireless device identified in the received bit string (e.g., assuming the wireless device doesn't apply a brute force or other code-breaking technique). Controller 6612 may therefore process the plurality of bit strings in stages 6806-6812 to decode (revert the obfuscation) using the device IDs in its trusted entity list. If a received bit string identifies a device ID included in the trusted entity list of wireless device 6408, controller 6612 may be able to decode the received bit string and identify the corresponding wireless device; otherwise, controller 6612 may not be able to decode the received bit string. Controller 6612 may therefore only be able to decode received bit strings that include device IDs in its trusted entity list. As previously indicated, this may prevent non-trusted devices from identifying wireless devices. Using the example of FIG. 64 where wireless devices 6402 and 6404 trust wireless device 6408 and wireless device 6406 does not trust wireless device 6408, controller 6612 may be able to decode the received bit strings that identify wireless devices 6402 and 6404 but may not be able to decode the received bit string identifying wireless device 6406 (as the trusted entity list of wireless device 6408 does not include the device ID of wireless device 6406). This may prevent the device ID of wireless device 6406 from leaking to wireless device 6408.

Controller 6612 may attempt to decode the received bit strings by searching through the trusted entity list and determining whether any of its device IDs can generate a candidate bit string that has activated bit positions matching the activated bit positions of the received bit strings. As shown in FIG. 68, controller 6612 may select a wireless device in the trusted entity list in stage 6806. The trusted entity list may include the device IDs (assumed to be secret) of the wireless devices that wireless device 6408 trusts. Controller 6612 may then generate a candidate bit string based on the device ID of the selected device in stage 6808. This procedure may partially track the same procedure that controller 6512 of wireless device 6404 used to generate the bit string. For example, controller 6612 may start with a bit string size L, number K of first bit positions, and the device ID of the selected device. Bit string size L and number K of first bit positions may be the same values that wireless device 6408 used to generate the bit string. These values may be uniformly preconfigured at each wireless device that is configured to use the routing protocol described herein. Controller 6612 may also initialize a bit selection vector L with the integers 1 to L. As described above for FIG. 67, controller 6612 may use the entries of L to point to bit positions of S.

Controller 6612 may then initialize an empty candidate bit string $S_{cand}$ of length L (e.g., either all "0"s if "1s" are considered active bits, or all "1" is "0"s are considered active bits). Controller 6612 may also initialize a random number generator (e.g., a PRNG) with the device ID as the seed. Controller 6612 may be configured to use the same random number generator as controller 6512 of wireless device 6404 (the originating device that originally generated the bit string). Accordingly, as the random number generators are pseudorandom, they may generate the same pseudorandom sequence of random numbers when seeded with the same value.

Controller 6612 may then generate K random numbers with the random number generator. If the device ID of the selected device is the same as the device ID used by the originating device to generate the bit string, controller 6612 may generate the same K random numbers as the originating device. If the device IDs are different, controller 6612 may generate a different set of K random numbers.

Controller 6612 may then progress through the K numbers and select bit positions in $S_{cand}$ to active based on the K random numbers. Using a first number of the K numbers as an example, controller 6612 may determine the modulus of the first number using the remaining number of bit positions (entries) in L plus one as a base. This produces a modulus result. Controller 6612 may then select an entry from bit selection vector L using the modulus result (e.g., using the modulus result as the index of the entry). As bit selection vector L initially contains the integers 1 to L (the size of the bit string), the integer in the selected entry of L points to a specific bit position in candidate bit string $S_{cand}$ (which has size L). In other words, the modulus result of the first number points to an entry in L, which in turn is an integer referring to a bit position (or index) in $S_{cand}$. Controller 6612 may then activate this bit position in $S_{cand}$ to which the first number points (e.g., by setting this bit position in $S_{cand}$ to "1" if $S_{cand}$ is initialized to all "0"s, or by setting this bit position of $S_{cand}$ to "0" if $S_{cand}$ is initialized to all "1"s). As controller 6612 has activated this bit position in $S_{cand}$, controller 6612 may remove this bit position (its entry) from bit position vector L. This is the same procedure described above for controller 6512 in FIG. 67.

After activating the bit position in $S_{cand}$ for this first number, controller 6612 may repeat the procedure to activate a bit position in $S_{cand}$ for the next number of the K numbers. For example, controller 6612 may determine the modulus of the second number using the remaining number of bit positions in L plus one as a base (where the base is one less than the base used for the first number, because controller 6612 removed one entry from L when activating the first number). Controller 6612 may then select an entry in bit selection vector L using the modulus result to identify the index of the entry. As controller 6612 previously removed the entry from L to which the first number pointed, controller 6612 will select a different entry from L for the second number. This entry will contain an integer (between 1 and L) that refers to one of the L bit positions in $S_{cand}$. Controller 6612 may then activate this bit position in $S_{cand}$.

Controller 6612 may continue this procedure for each of the K numbers (generated by the random number generator). Controller 6612 may therefore activate a plurality of K bit positions in $S_{cand}$ based on the device ID of the selected device (as the device ID is used as a seed for the random number generator). By removing entries from L when they are used to select bit position to activate in $S_{cand}$, controller 6612 may select a different bit position to activate for each of the K first numbers. In some aspects, controller 6612 may generate all of the K numbers before starting to select and/or activate the plurality of K bit positions in $S_{cand}$. In other aspects, controller 6612 may select and/or activate some of the plurality of bit positions in $S_{cand}$ before controller 6612 generates all of the K numbers.

By activating the K bit positions, controller 6612 may obtain a candidate bit string $S_{cand}$ based on the device ID of the selected device. As controller 6612 generated the candidate bit string based on random numbers derived from the device ID, the K activated bit positions in the candidate bit string may be based on the device ID of the selected device. Controller 6612 may then determine whether the K activated bit positions of the candidate bit string are activated in the received bit string S (that controller 6612 is currently evaluating) in stage 6810. For example, controller 6612 may compare the candidate bit string to the received bit string to determine whether at least the K activated bit positions of the candidate bit string are activated in the received bit string. In one example, controller 6612 may calculate the bit-wise product (e.g., Tensor product) of the candidate bit string and the received bit string. Controller 6612 may then compare the bit-wise product to the candidate bit string. If the bit-wise product is equal to the candidate bit string (e.g., has the same activated and deactivated bit positions, e.g., the same sequence of "0"s and "1"S), controller 6612 determine that the activated bit positions in the candidate bit string are activated in the received bit string. For example, if each activated bit position in the candidate bit string is also activated in the received bit string, the bit-wise product at these positions will also be activated (as the product of logical 1 and logical 1 is also logical 1). Even though the received bit string also has N additional activated bit positions, these bit positions will not be activated in the candidate bit string and will also not be activated in the bit-wise product. Controller 6612 can therefore use the bit-wise product to determine whether the activated bit positions in the candidate bit string are activated in the received bit string.

If the activated bit positions in the candidate bit string are activated in the received bit string, controller 6612 may determine that there is a match in stage 6812. Controller 6612 may therefore determine that the received bit string identifies the selected device (whose device ID controller 6612 used to generate the candidate bit string). Controller 6612 may then proceed to the next bit string in the message, and perform the same procedure of stages 6806-6814 to determine whether any wireless devices in the trusted entity list have device IDs that can generate a candidate bit string whose activated bit positions match the activated bit positions in the received bit string. In some aspects, controller 6612 may re-use candidate bit strings that controller 6612 previously generated while evaluating another bit string. For example, controller 6612 may not need to re-generate a candidate bit string for a wireless device of the trusted entity list that controller 6612 previously generated a candidate bit string for (as the candidate bit string will be the same). Controller 6612 may therefore save previously generated candidate bit strings (from previously evaluated bit strings in the message) and re-use the candidate bit strings to compare with the other bit strings to determine whether there are any matches.

If there is not a match between the candidate bit string and the received bit string, controller 6612 may determine that the received bit string does not identify the selected device. Controller 6612 may then determine in stage 6814 whether controller 6612 has considered all wireless devices in the trusted entity list as potential matches for the received bit string. If so, controller 6612 may determine that the received bit string does not identify a wireless device that trusts wireless device 6408 (e.g., that the trusted entity list does not include a device ID that could generate a candidate bit string matching the received bit string). Controller 6612 may then proceed to the next bit received string in the message, and may perform stages 6806-6814 to determine whether this next received bit string identifies a wireless device in the trusted entity list.

If controller 6612 has not considered all wireless devices in the trusted entity list in stage 6814, controller 6612 may return to stage 6806. Controller 6612 may then select another wireless device in the trusted entity as the selected device in stage 6806. Controller 6612 may generate a candidate bit string based on the device ID of this selected device in stage 6808, such as by using the same procedure described above for stage 6808. As controller 6612 seeds the random number generator with a different seed (the device ID of this selected device), controller 6612 may obtain a different set of K random numbers than for the previous selected device. The candidate bit string for this selected device may therefore be different from the candidate bit string of the previous selected device. Controller 6612 may then compare the candidate bit string to the received bit string to determine whether the activated bit positions in the candidate bit string are activated in the received bit string in stage 6810. If controller 6612 determines there is a match, controller 6612 may determine that the received bit string identifies the selected device. Controller 6612 may then repeat the procedure of stages 6806-6814 for the next bit string in the message (if any). If controller 6612 determines that there is not a match, controller 6612 may determine whether controller 6612 has considered all wireless devices in the trusted entity list in stage 6814. If not, controller 6612 may return to stage 6806 and select another wireless device in the trusted entity list to evaluate in stages 6806-6812.

Controller 6612 may therefore search through the wireless devices in the trusted entity list and determine whether any of the wireless devices have a device ID that can generate a candidate bit string matching the received bit string (e.g., a candidate bit string whose activated bit positions are activated in the received bit string). If the received bit string identifies a wireless device that does not trust wireless device 6408, the device ID of this wireless device will not be in the trusted entity list. Unless controller 6612 attempts a brute force or other codebreaking technique, controller 6612 will not be able to generate a candidate bit string that matches the received bit string. This will therefore prevent controller 6612 from identifying wireless devices in the bit strings that do not trust wireless device 6408. The presence of the N additional activated bit positions in S makes it more difficult for non-trusted devices to identify the wireless device from the bit string. Using the example of FIG. 64, controller 6612 may determine that the bit strings in the message (e.g., a connectivity update message) identify wireless devices 6402 and 6404. Even though one of the bit strings identifies wireless device 6406, wireless device 6404 may not be able to identify wireless device 6406 from the string because the trusted entity list of controller 6612 does not include the device ID of wireless device 6406. The routing protocol and obfuscation technique may therefore prevent devices IDs from leaking to non-trusted wireless devices.

After evaluating each of the bit strings in the message, wireless device 6408 may in stage 6816 perform further processing with the wireless devices identified in the bit strings of the message. This further processing can vary in different aspects. For example, in some aspects controller 6612 may develop a routing map of a mesh network based on the identified wireless devices. For example, the message may be a connectivity update message that specifies which wireless devices are peers of the originating device, e.g., that wireless devices 6402 and 6406 are peers of wireless device 6404. Wireless device 6408 may receive multiple connectivity update messages from multiple originating devices, and may therefore be able to develop a routing map that specifies which wireless devices are peers. For example, wireless device 6402 may also receive a connectivity update message from wireless device 6402 (e.g., that wireless device 6404 forwarded to wireless device 6408) that specifies the peers of wireless device 6402. Controller 6612 may therefore be able to programmatically develop a linked data structure that specifies the peers of wireless devices 6402 and 6404 and indicates that wireless device 6402 and 6404 are peers. This linked data structure may therefore indicate a routing path between the peers of wireless device 6402 and wireless device 6404 (e.g., a routing path from the peer to wireless device 6408 via wireless devices 6402 and 6404). By receiving and processing multiple connectivity update messages, controller 6612 may develop a routing map that specifies the routing paths between multiple wireless devices of the mesh network and wireless device 6408 (and between other wireless devices and other wireless devices). If other connectivity update messages are configured using the obfuscation technique, controller 6612 may not be able to identify wireless devices in the mesh network that do not trust wireless device 6408.

In some aspects, controller 6612 may use this routing map (based on the connectivity update message) to transmit and/or receive messages to and from other wireless device in the mesh network in stage 6816. For example, if controller 6612 has a message to send to a target wireless device, controller 6612 may identify a routing path to the target wireless device (through the mesh network) based on the routing map, such as by identifying a routing path (e.g., having the smallest number of relay hops) through the mesh network between wireless device 6408 and the target wireless device. Wireless device 6408 may then identify its peer that is first in the routing path and send the message to this peer. Wireless device 6408 may determine and include routing information in the message (e.g., in a header) that specifies the routing path. The peer may therefor read this routing information and determine which of its peers to forward the message to. The relaying devices may continue this procedure until the message reaches the target wireless device.

In some aspects, controller 6612 may forward the message in stage 6816. For example, controller 6612 may provide the message to transmitter 6610, which may then re-transmit (forward) the message via RF transceiver 6604 and antenna system 6602. This forwarding may continue, and the wireless devices may propagate the message via the mesh network. In the example of FIG. 64 where the message is a connectivity update message, other wireless devices that receive the message may process the message using the process of flow chart 6700. These wireless devices may also identify wireless devices 6402-6406 from the bit strings based on whether wireless devices 6402-6406 trust these wireless devices. For example, if wireless device 6406 trusts a wireless device that receives the forwarded message, this wireless device may be able to identify wireless device 6406 from its corresponding bit string (as this wireless device also has the same random number generator and will generate a candidate bit string matching the bit string identifying wireless device 6406).

Table 2 below shows exemplary pseudocode describing the procedure of stages 6808-6812 according to some aspects. As described therein, controller 6612 may begin with bit string length L, number K of the plurality of bit positions, device ID ID of the selected device, and received bit string S. Controller 6612 may then generate K random numbers from a random number generator g seeded with ID, and then select K bit positions to activate in candidate bit string $S_{cand}$. Controller 6612 may obtain a confirmation if the received bit string S is present in the device ID as the output. In some aspects, controller 6612 may perform this procedure by executing program code that defines this pseudocode in the form of executable instructions.

TABLE 2

Message processing pseudocode

| Line Number | Code |
|---|---|
| 1 | Input (L, K, ID, S) |
| 2 | Output (Confirmation if the device ID is present in the string S) |
| 3 | Initialize the bit string $S_{cand}$ with L zeros, as $S_{cand} \leftarrow 0_L$ |
| 4 | Initialize the random generator g with ID, as g (ID) |

TABLE 2-continued

Message processing pseudocode

| Line Number | Code |
|---|---|
| 5 | Extract K uniform random integers within the $[2^0, 2^{32}]$ interval, as U = g (ID , K) |
| 6 | Initialize bit selection vector L, as $L \leftarrow 1 \ldots L$ |
| 7 | FOR j: 1 ... K |
| 8 | Select the $j^{th}$ index to be active in $S_{cand}$, as $h_j$ = L(mod(U(j), L + 1 − j)) |
| 9 | Activate the $j^{th}$ index to be active in $S_{cand}$ as $S_{cand}(h_j)$ = 1 |
| 10 | Exclude the $j^{th}$ selected index from L, as L = L\{$h_j$} |
| 11 | END |
| 12 | Determine whether the device ID is present in the string S, as $S \otimes S_{cand}$ $S_{cand}$ |

Figure 69:
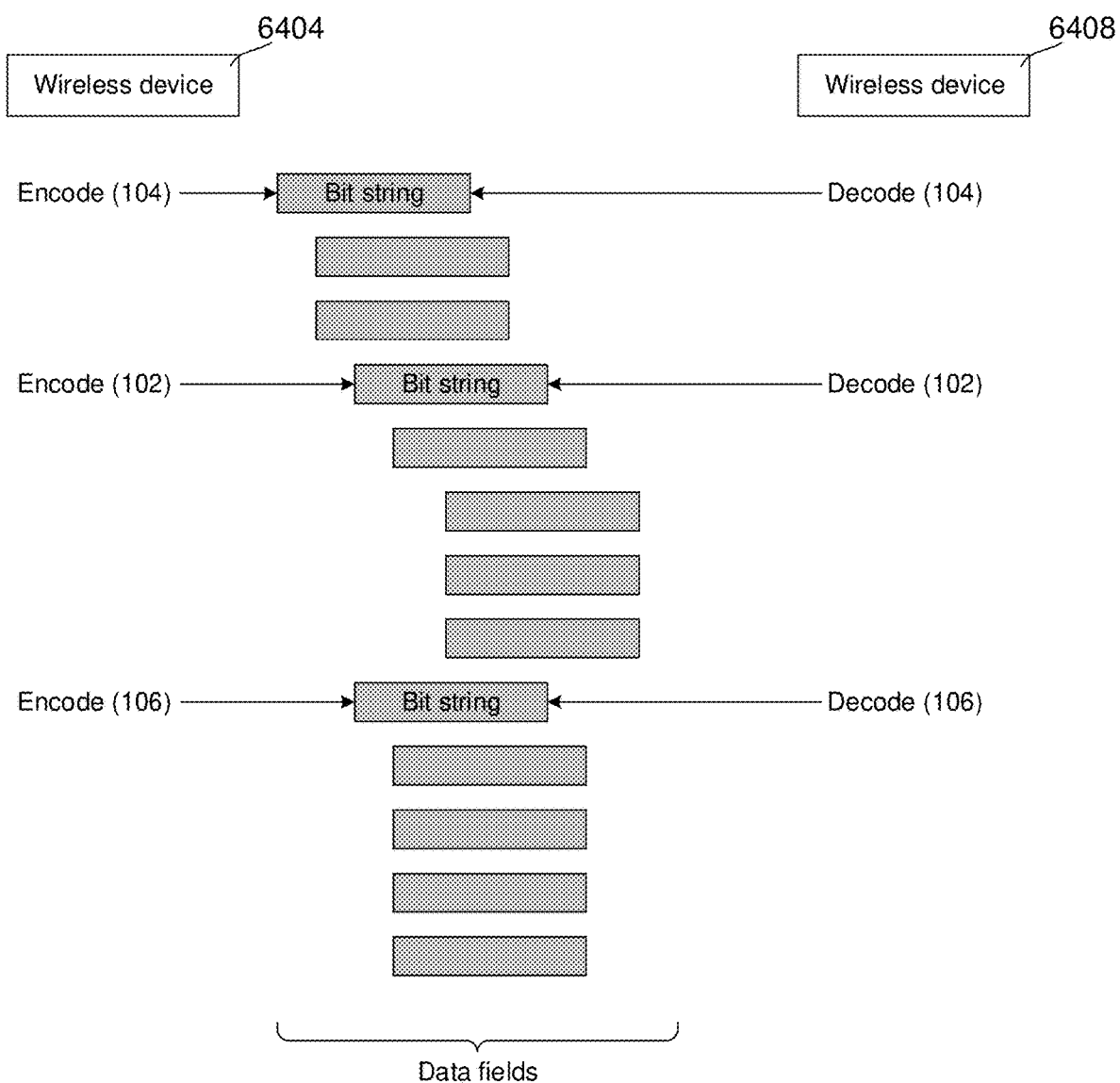
FIG. 69 shows an exemplary diagram illustrating message encoding and decoding according to some aspects.

FIG. 69 shows an exemplary diagram illustrating the message encoding and decoding procedure according to some aspects. As shown in FIG. 69, wireless device 6404 may generate the message to include a plurality of data fields. Some of the data fields may be information other than the bit strings identifying wireless devices. These data fields are unlabeled in FIG. 69. Using the example of FIG. 64, wireless device 6404 may encode the device IDs for wireless devices 6402-6406 in respective bit strings using the obfuscation procedure of FIG. 67. In some aspects, wireless device 6404 may include other data fields with the bit strings, such as data fields that indicate peer link information for the wireless device identified in a given bit string. These data fields are shown in FIG. 69 as indented from the bit strings that identify the wireless devices. In some aspects, controller 6512 of wireless device 6404 may specify K and N in one of the data fields (e.g., a header field).

When wireless device 6408 receives the message, wireless device 6408 may read the message and identify the various fields. In some aspects, controller 6612 of wireless device 6408 may read K and N from the appropriate data field, and may use these values for K and N when decoding the bit strings. Wireless device 6408 may then decode the bit strings to identify the corresponding wireless devices with the procedure of FIG. 68. Wireless device 6408 may therefore identify the wireless devices that trust wireless device 6408 from the bit strings. Wireless device 6408 may not be able to identify wireless devices that do not trust wireless device 6408 (e.g., wireless device 6406) because wireless device 6408 may not have their device IDs in its trusted entity list.

Selection of L, K, and N may impact the level of obfuscation of a device ID in a given bit string. In some aspects, a large number of device IDs may be selected (e.g., offline by a designer), which may make it more difficult for non-trusted devices to guess which device ID is identified in a given bit string. Taking into account the number of bits K used to encode the device ID and the number of N obfuscation bits (extra bits of noise), the number O of possible device IDs for a given bit string (with K+N activated bit positions) can be expressed as $$O = \binom{\min_K(K + N, L)}{}$$

While the N obfuscation bits may help to disguise the device IDs and prevent leaks to non-trusted devices, the N obfuscation bits may also lead to false positives. For example, a wireless device may inadvertently generate a candidate bit string based on the wrong device ID that has activated bit positions (K in total) matching the received bit string (K+N activated bit positions in total). The wireless device may mistakenly determine that the received bit string identifies the wireless device paired with the candidate bit string. The probability $P_{fp}$ of these false positives can be expressed as $$P_{fp} = \left(1 - \left(1 - \frac{1}{L}\right)^{K+N}\right)^K$$

Accordingly, higher values for N may lead to a larger number of possible device IDs for a given bit string (thus making it harder for non-trusted devices to identify the wireless device) but may increase the probability of false positives. In some aspects, a designer can select the relevant parameters so that $P_{fp}$ is below 1%.

Figure 70:
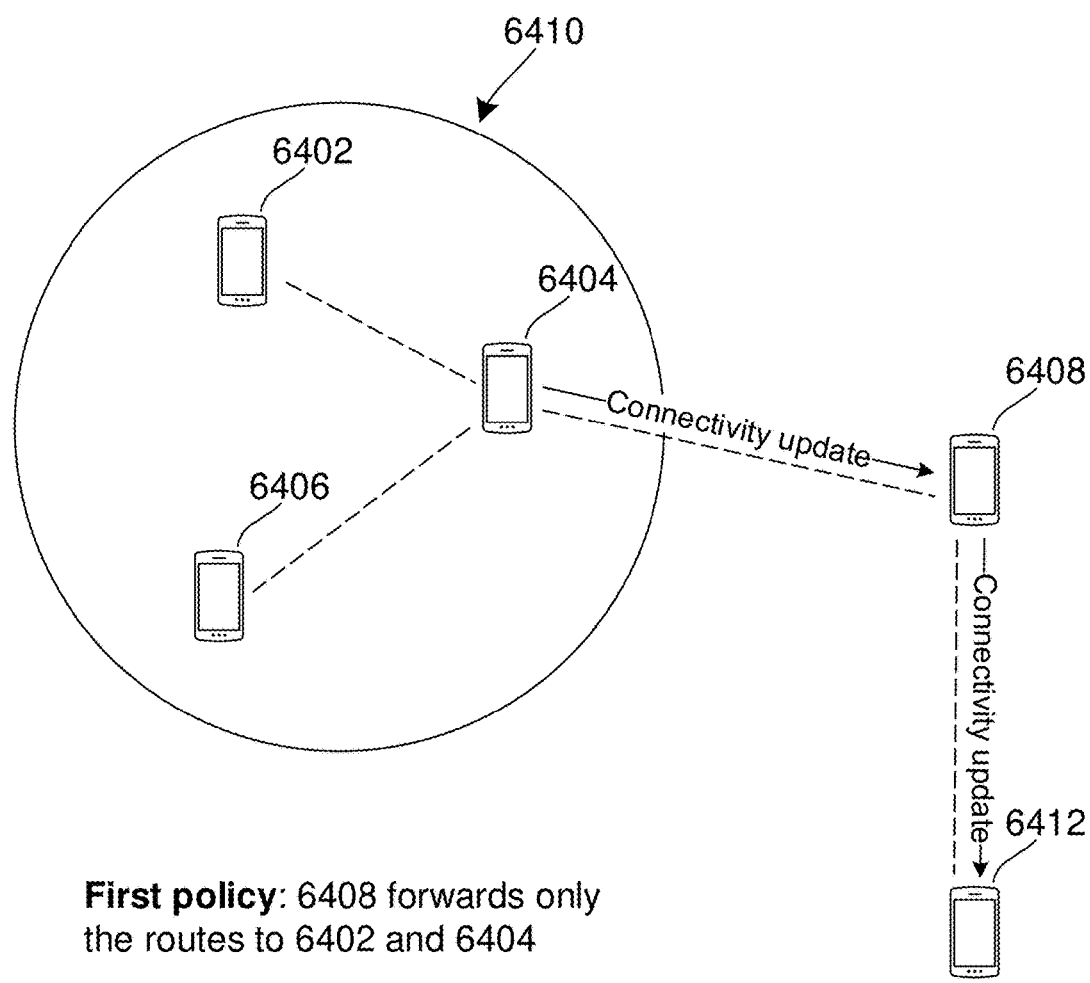
FIG. 70 shows examples of routing policies according to some aspects.

As previously indicated, in some aspects wireless devices may forward connectivity update messages through the mesh network. This may propagate the connectivity update messages through the mesh network and enable the wireless devices to develop a routing map that represents the various connections and routing paths across the mesh network. In some aspects, wireless devices may use specific routing policies when forwarding messages (e.g., connectivity update messages) through the mesh network. In a first policy, wireless devices route (e.g., forward) connectivity update messages only to trusted devices. For example, a wireless device only forwards a connectivity update node if the forwarding device knows the receiving device is a trusted device. In a second policy, wireless devices route connectivity update messages to both trusted and non-trusted devices. For example, a wireless device always forwards connectivity update messages to other devices. FIG. 70 shows an example of this where wireless device 6406 does not trust wireless device 6412. According to the first policy, wireless device 6408 forwards the routes (e.g., information in the connectivity update that indicates the paths between devices) for only wireless devices 6402 and 6404 to wireless device 6412. Wireless device 6408 does not forward the route for wireless device 6406 to wireless device 6412. According to the second policy, wireless device 6408 forwards the routes for all of wireless devices 6402-6406 to wireless device 6412.

Figure 71:
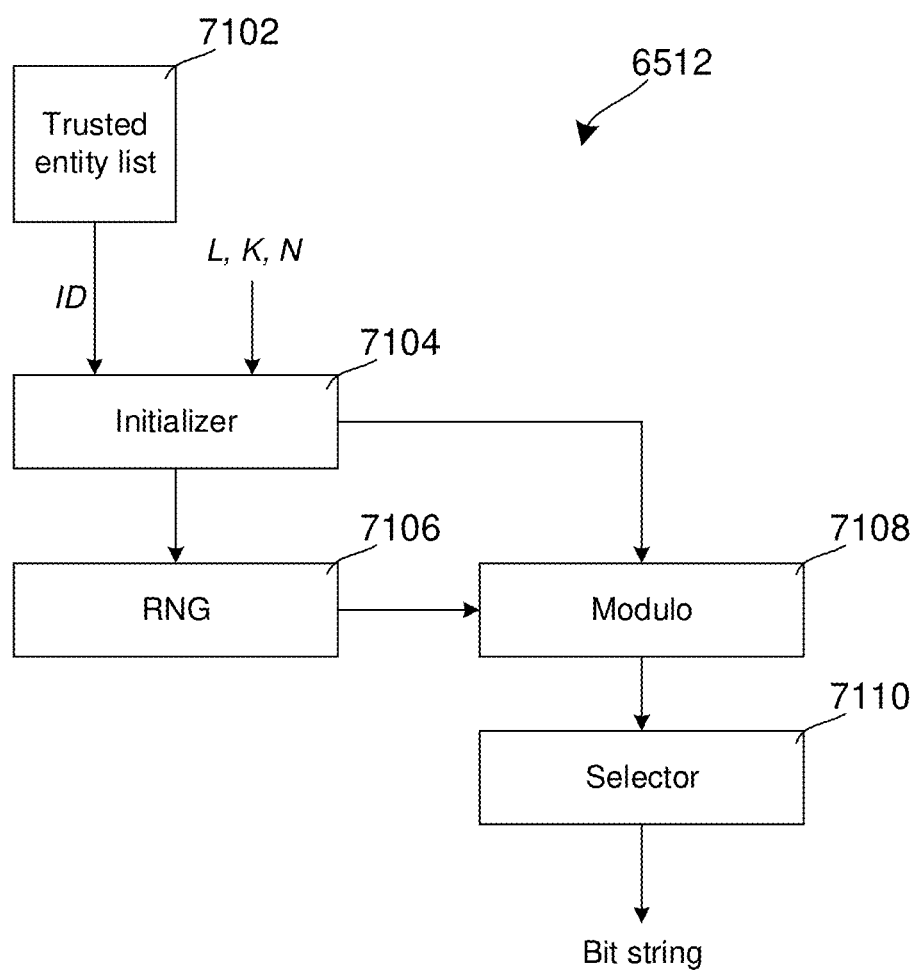
FIGS. 71 and 72 show exemplary internal configurations of wireless device controllers for performing encoding and decoding using obfuscation according to some aspects.
Figure 72:
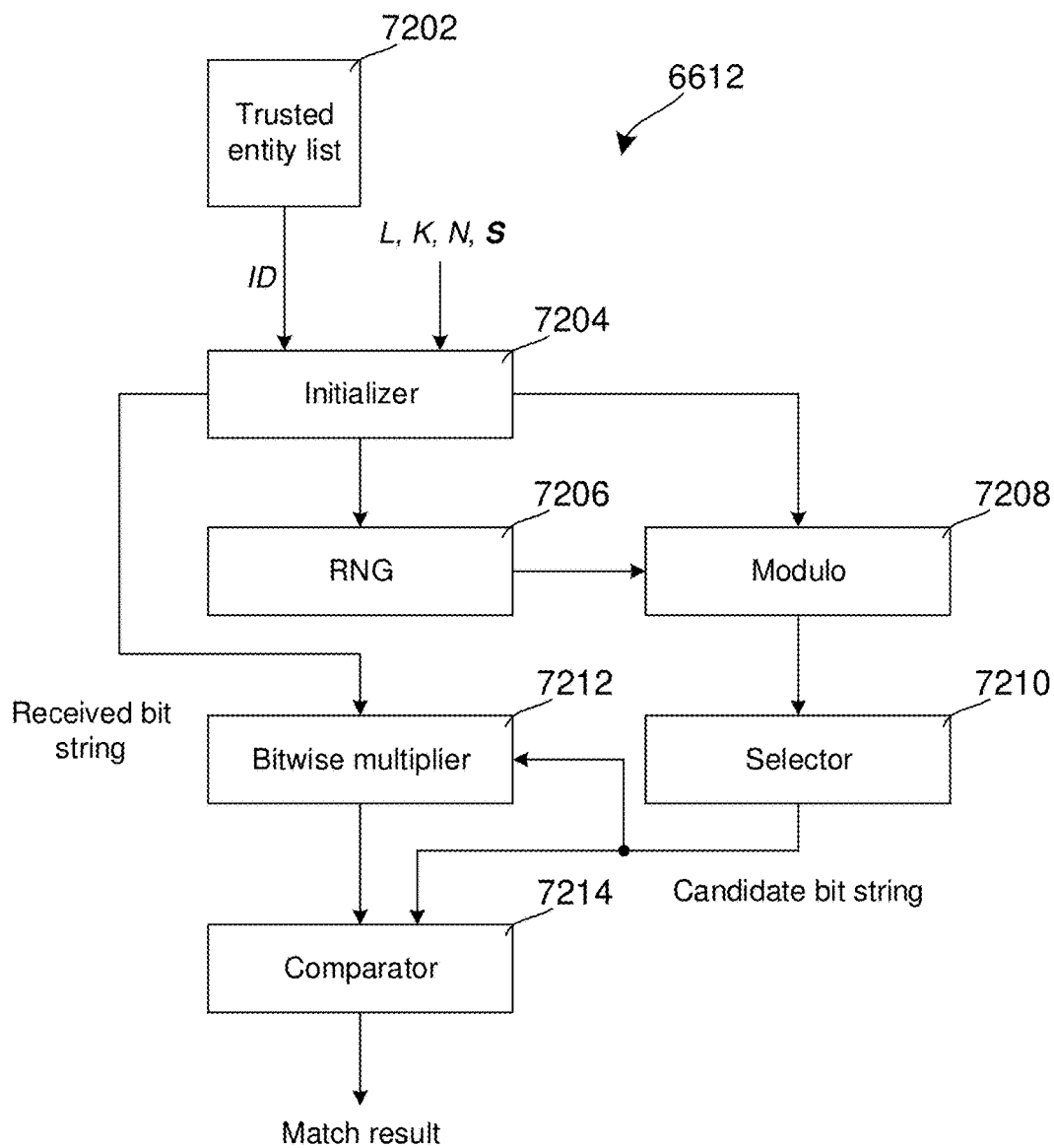

As previously described, controllers 6512 and 6612 of wireless devices 6404 and 6408 may respectively perform the encoding (obfuscation) and decoding (reverting the obfuscation) of device IDs to and from bit strings. Pseudo-code for these operations is given above. FIGS. 71 and 72 show exemplary structural configurations that controllers 6512 and 6612 may respectively include in some aspects.

Starting with FIG. 71, in some aspects controller 6512 may include trusted entity list 7102, initializer 7104, random number generator (RNG) 7106, modulo 7108, and selector 7110. Trusted entity list 7102 may be a memory storing device IDs (secret device IDs) for wireless devices that wireless device 6404 trusts. In various aspects, initializer 7104, random number generator 7106, modulo 7108, and selector 7110 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. In one aspect, each of initializer 7104, RNG 7106, modulo 7108, and selector 7110 may be hardware (e.g., separate or integrated digital logic circuits configured to perform the described operations). In another aspect, each of initializer 7104, RNG 7106, modulo 7108, and selector 7110 may be software (e.g., one or more processors configured to execute instructions that define the described operations). In another aspects, some of initializer 7104, RNG 7106, modulo 7108, and selector 7110 may be hardware and some may be software (e.g., a combination of hardware and software).

As shown in FIG. 71, initializer 7104 may receive inputs L, K, N. Initializer 7104 may receive these inputs as preprogrammed values or where initializer 7104 dynamically selects these values (e.g., to achieve a target false positive probability). Trusted entity list 7102 may also provide the device ID ID for the wireless device that controller 6512 is encoding into the bit string. Initializer 7104 may then initialize S and L and provide the input variables to RNG 7106. RNG 7106 may then generate the K random numbers and the N random numbers. Modulo 7108 may then determine the modulus of the K+N random numbers. Selector 7110 may then use L and the modulo results to select the K+N bit positions of S to activate. This may produce bit string S with K activated bit positions depending on device ID ID and N activated bit positions depending on the obfuscation factor N. These operations are abbreviated here as the above description of FIG. 67 described them in detail. Controller 6512 may therefore obtain a bit string identifying the device ID. Controller 6512 may repeat this procedure for the device ID of one or more additional wireless devices to obtain respective bit strings identifying these other wireless devices. Controller 6512 may include the bit strings as data fields in a message, and then provide the message to transmitter 6510 for transmission.

Turning to FIG. 72, in some aspects controller 6612 may include trusted entity list 7202, initializer 7204, random number generator (RNG) 7206, modulo 7208, selector 7210, bitwise multiplier 7212, and comparator 7214. Trusted entity list 7102 may be a memory storing device IDs (secret device IDs) for wireless devices that wireless device 6408 trusts. In various aspects, initializer 7204, random number generator (RNG) 7206, modulo 7208, selector 7210, bitwise multiplier 7212, and comparator 7214 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. In one aspect, each of initializer 7204, random number generator (RNG) 7206, modulo 7208, selector 7210, bitwise multiplier 7212, and comparator 7214 may be hardware (e.g., separate or integrated digital logic circuits configured to perform the described operations). In another aspect, each of initializer 7204, random number generator (RNG) 7206, modulo 7208, selector 7210, bitwise multiplier 7212, and comparator 7214 may be software (e.g., one or more processors configured to execute instructions that define the described operations). In another aspects, some of initializer 7204, random number generator (RNG) 7206, modulo 7208, selector 7210, bitwise multiplier 7212, and comparator 7214 may be hardware and some may be software (e.g., a combination of hardware and software).

As shown in FIG. 72, trusted entity list 7202 may provide a device ID ID to initializer 7204. Initializer 7204, RNG 7206, modulo 7208, and selector 7210 may then be configured to generate a candidate bit string for the device ID. Initializer 7204 may also receive inputs L, K, N, such as where initializer 7204 reads one or more of these values from a header field in a received message. Initializer 7204 may also read a received bit string S from the received message.

Initializer 7204 may then initialize $S_{cand}$ and L and provide the input variables to RNG 7206. RNG 7206 may then generate K random numbers using the device ID ID as the seed. Modulo 7208 may then determine the modulus of the K random numbers. Selector 7210 may then use L and the modulo results to select the K bit positions of $S_{cand}$ to activate. This may produce candidate bit string $S_{cand}$ with K activated bit positions depending on device ID ID. Selector 7210 may provide $S_{cand}$ to bitwise multiplier 7212, which may perform a bitwise multiplication of received bit string S and candidate bit string $S_{cand}$. Bitwise multiplier 7212 may then provide the bitwise product to comparator 7214, which may compare the bitwise product to $S_{cand}$ to determine whether the bitwise product is equal to Sand. If so, comparator 7214 may declare a match, and may thus determine that received bit string S identifies the device ID ID. If not, trusted entity list 7202 may provide a next device ID ID to initializer 7204, and initializer 7204, RNG 7206, modulo 7208, selector 7210, bitwise multiplier 7212, and comparator 7214 may repeat this procedure to determine whether the next device ID ID generates a candidate bit string $S_{cand}$ that matches S. Controller 6612 may repeat this procedure until a match is found or until all device IDs in trusted entity list 7202 are considered. Controller 6612 may also repeat this procedure for multiple received bit strings S in the received message (that each identify a wireless device). These operations are abbreviated here as the above description of FIG. 68 described them in detail. Furthermore, while this description expressly uses a bitwise multiplication to compare $S_{cand}$ to S, in some aspects comparator 7214 may use other logical operations to compare $S_{cand}$ to S and determine whether there is a match (e.g., a logical operation that compares each activated bit position in $S_{cand}$ to S to determine whether each activated bit position in $S_{cand}$ is also activated in S.

Figure 73:
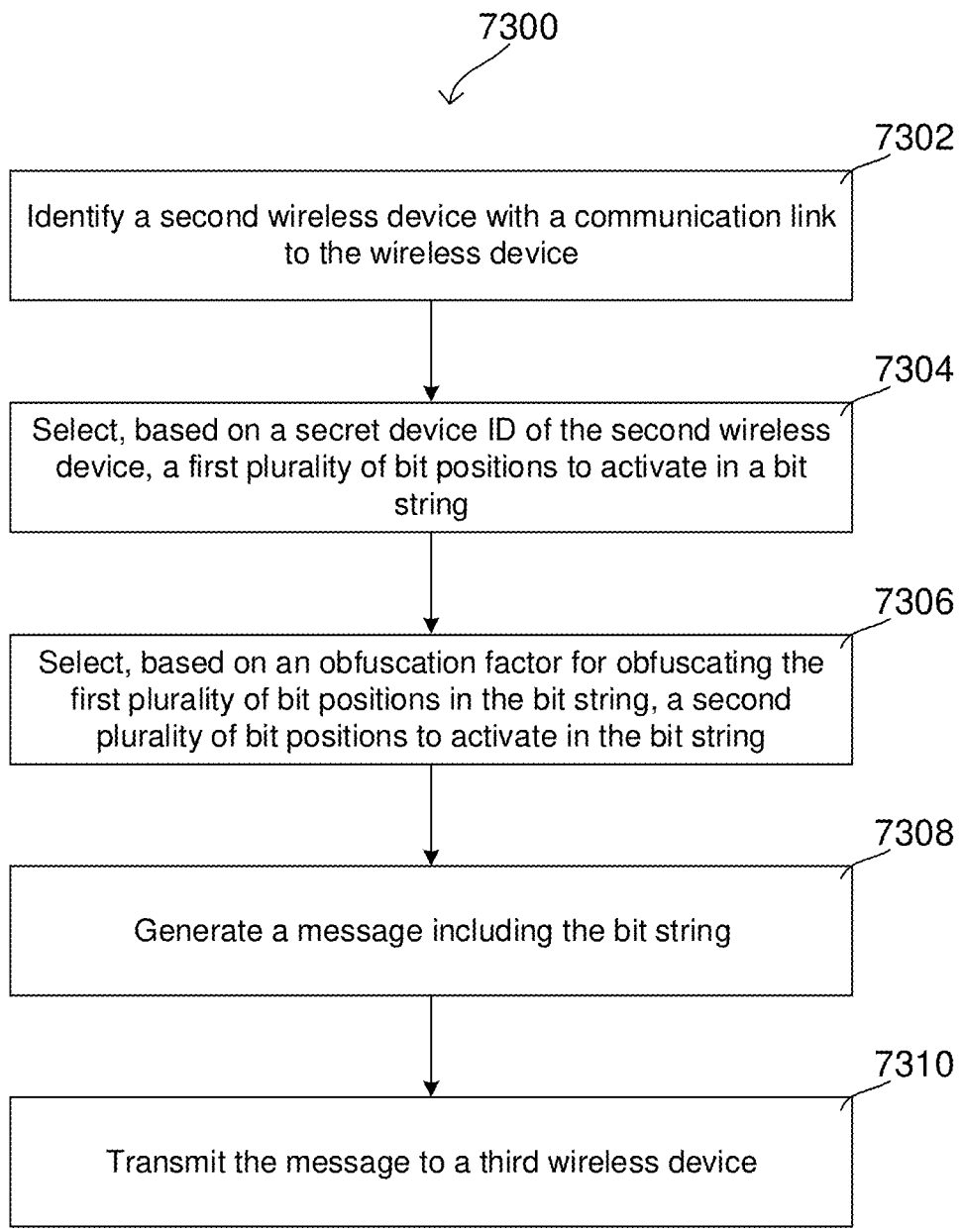
FIGS. 73-76 show exemplary methods for performing wireless communications according to some aspects.

FIG. 73 shows exemplary method 7300 of performing wireless communications at a wireless device according to some aspects. As shown in FIG. 73, method 7300 may include identifying a second wireless device with a communication link to the wireless device (7302), selecting, based on a secret device ID of the second wireless device, a first plurality of bit positions to activate in a bit string (7304), selecting, based on an obfuscation factor for obfuscating the first plurality of bit positions in the bit string, a second plurality of bit positions to activate in the bit string (7306), generating a message including the bit string (7308), and transmitting the message to a third wireless device (7310).

Figure 74:
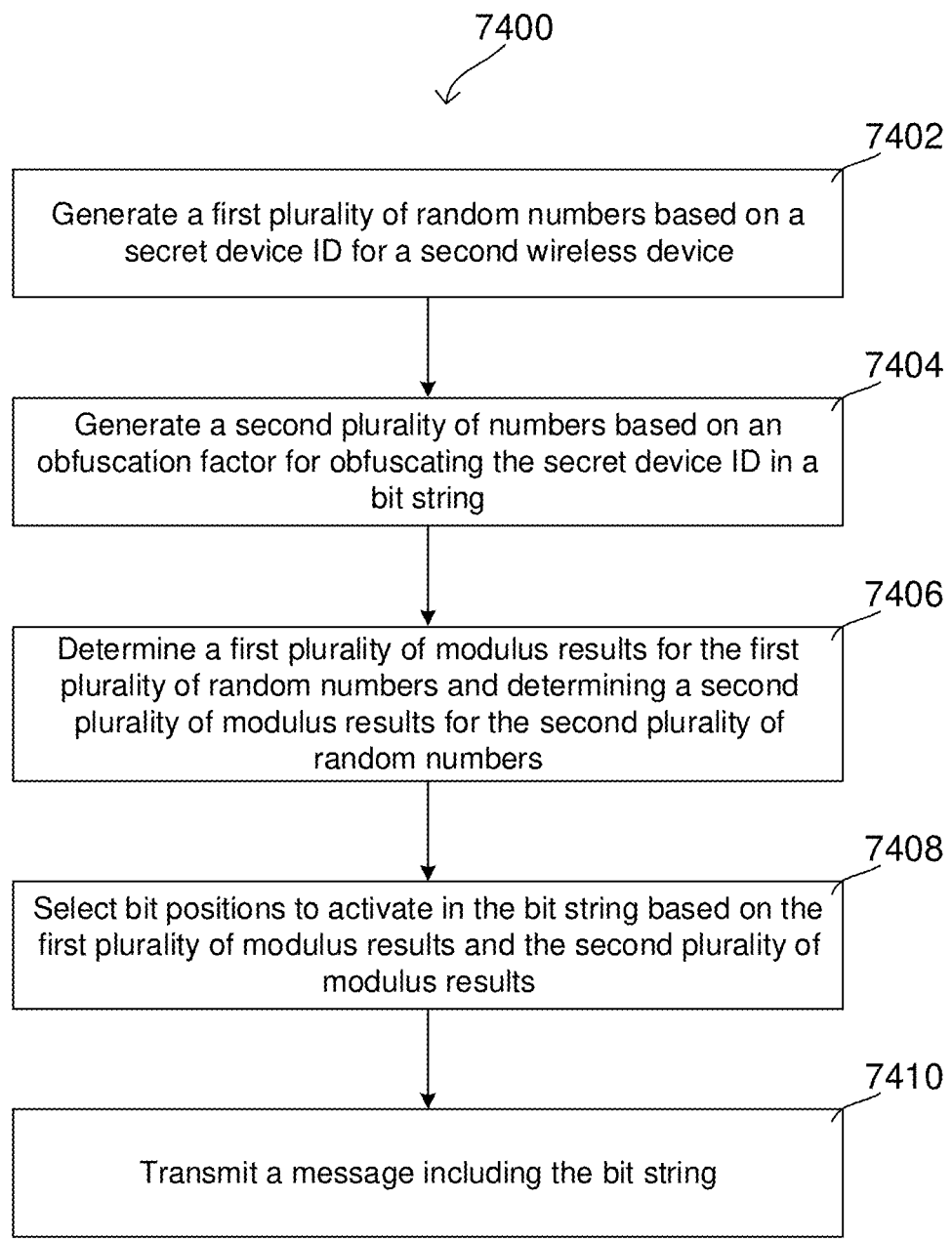

FIG. 74 shows exemplary method 7400 of performing wireless communications at a wireless device according to some aspects. As shown in FIG. 74, method 7400 may include generating a first plurality of random numbers based on a secret device ID for a second wireless device (7402), generating a second plurality of numbers based on an obfuscation factor for obfuscating the secret device ID in a bit string (7404), determining a first plurality of modulus results for the first plurality of random numbers and determining a second plurality of modulus results for the second plurality of random numbers (7406), selecting bit positions to activate in the bit string based on the first plurality of modulus results and the second plurality of modulus results (7408), and transmitting a message including the bit string (7410).

Figure 75:
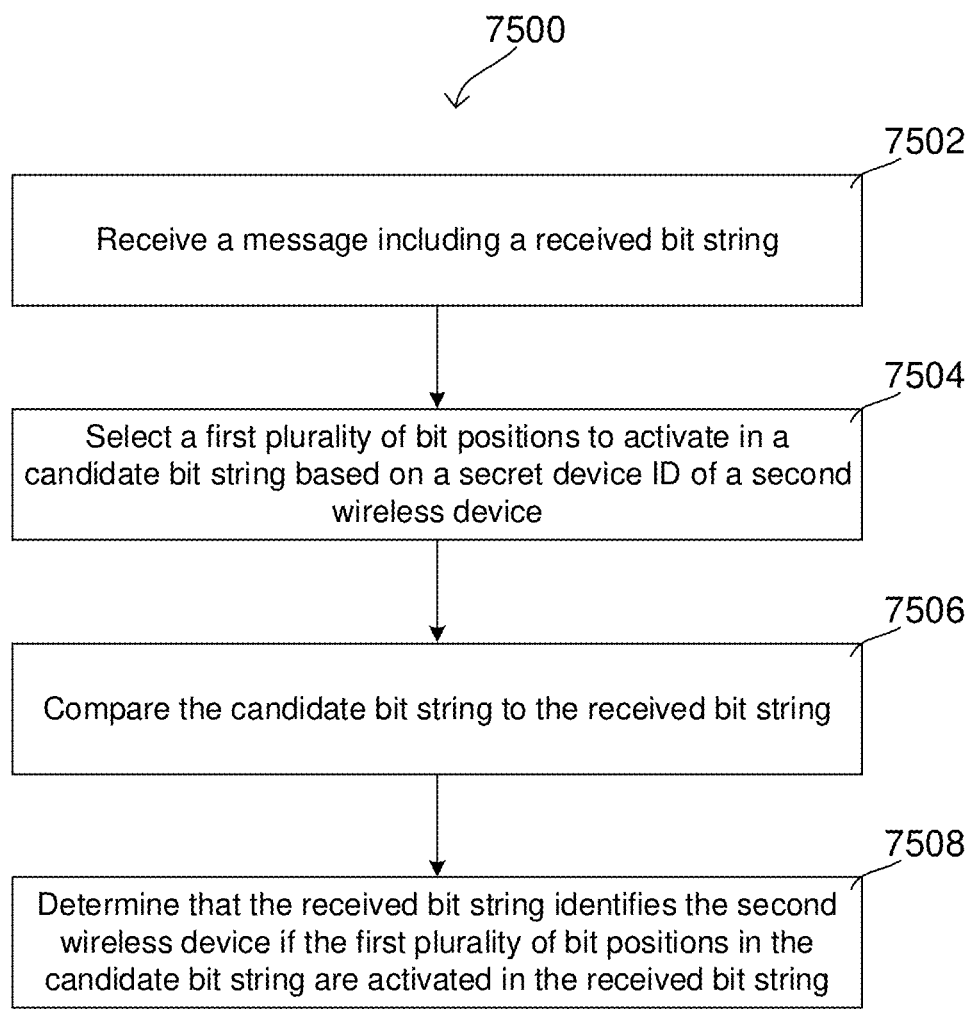

FIG. 75 shows exemplary method 7500 of performing wireless communications at a wireless device according to some aspects. As shown in FIG. 75, method 7500 may include receiving a message including a received bit string (7502), selecting a first plurality of bit positions to activate in a candidate bit string based on a secret device ID of a second wireless device (7504), comparing the candidate bit string to the received bit string (7506), and determining that the received bit string identifies the second wireless device if the first plurality of bit positions in the candidate bit string are activated in the received bit string (7508).

Figure 76:
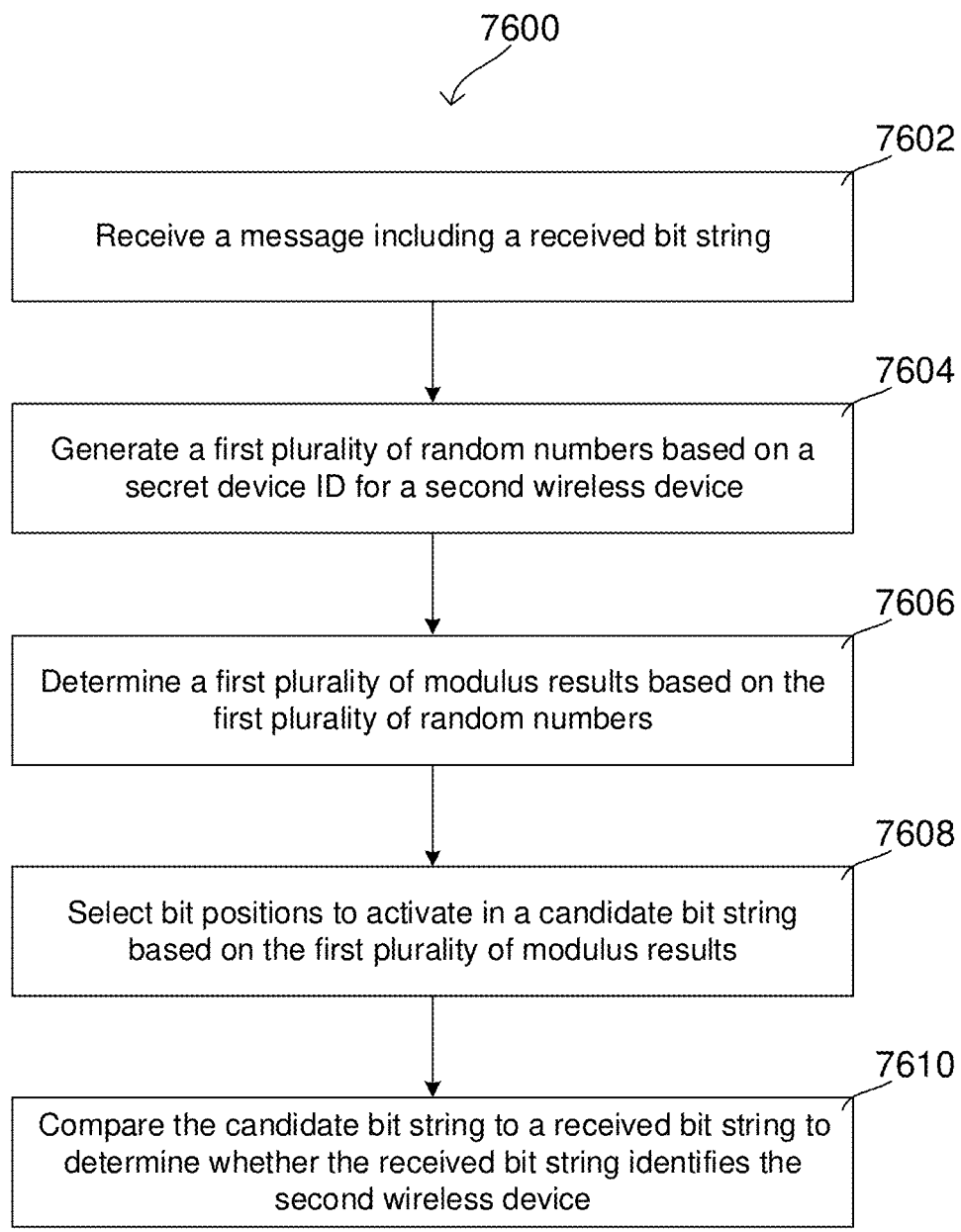

FIG. 76 shows exemplary method 7600 of performing wireless communications at a wireless device according to some aspects. As shown in FIG. 76, method 7600 may include receiving a message comprising a received bit string (7602), generating a first plurality of random numbers based on a secret device ID for a second wireless device (7604), determining a first plurality of modulus results based on the first plurality of random numbers (7606), selecting bit positions to activate in a candidate bit string based on the first plurality of modulus results (7608), and comparing the candidate bit string to a received bit string to determine whether the received bit string identifies the second wireless device (7610).

Figure 77:
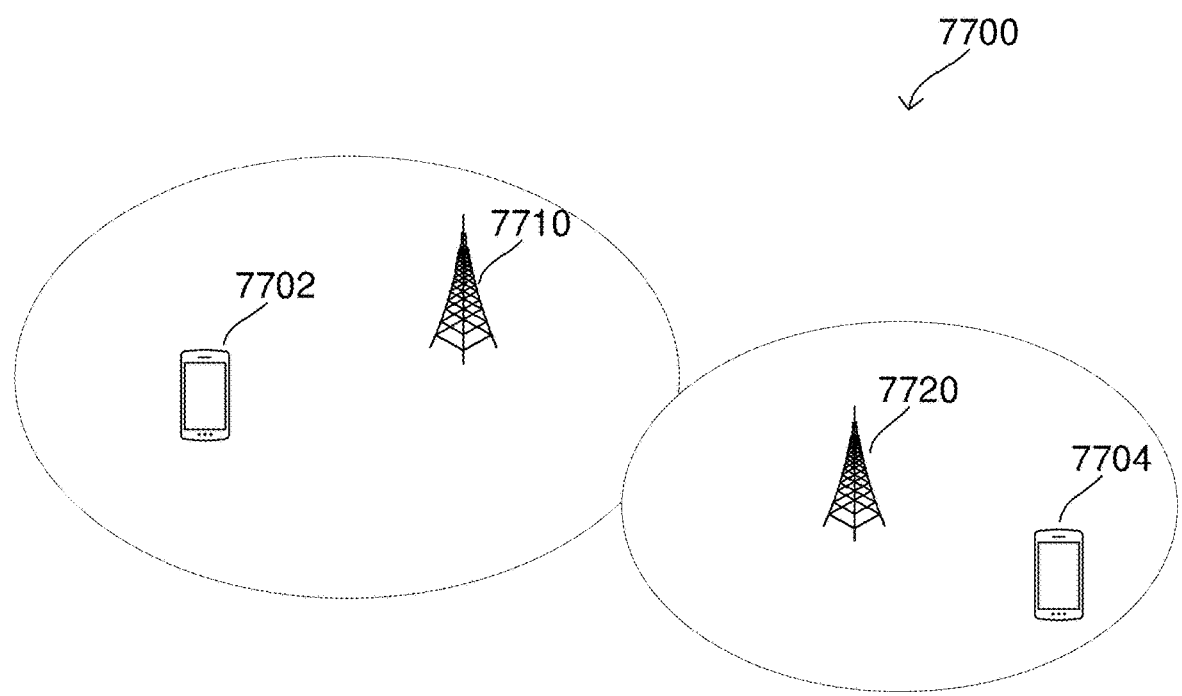
FIG. 77 shows an exemplary radio communication network according to some aspects.
Figure 78:
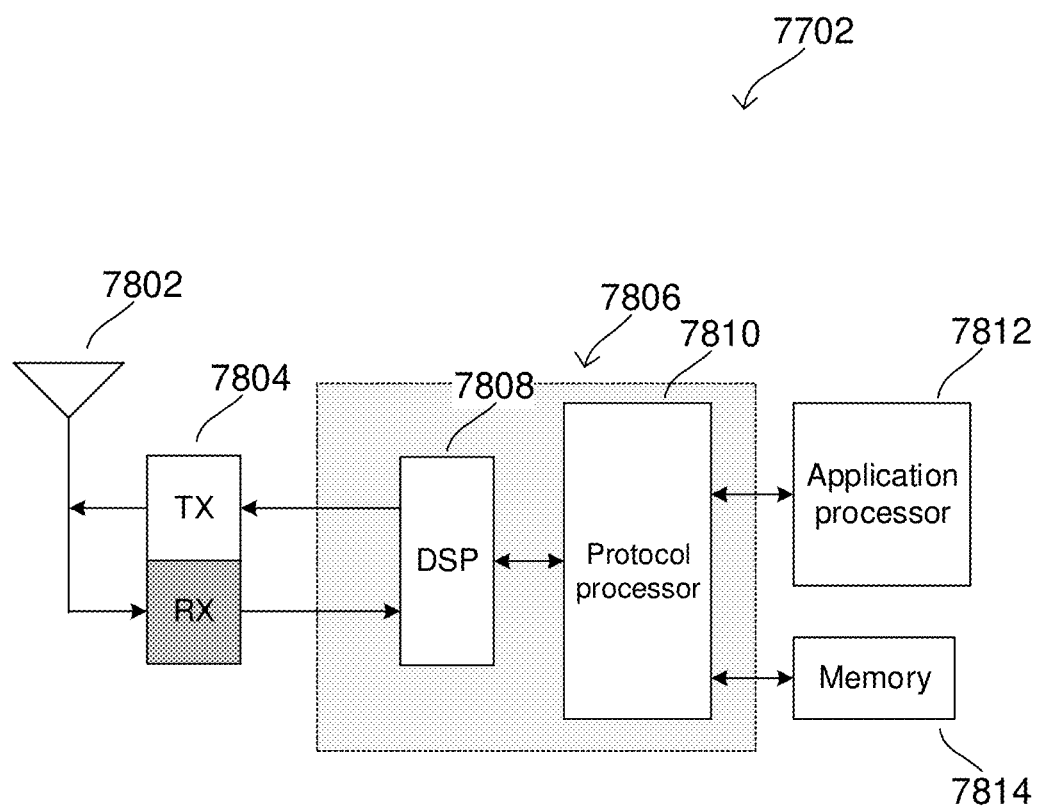
FIG. 78 shows an exemplary internal configuration of a terminal device according to some aspects.

FIGS. 77 and 78 depict a general network and device architecture for wireless communications. In particular, FIG. 77 shows exemplary radio communication network 7700 according to some aspects, which may include terminal devices 7702 and 7704 and network access nodes 7710 and 7720. Radio communication network 7700 may communicate with terminal devices 7702 and 7704 via network access nodes 7710 and 7720 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 7700 is exemplary and is scalable to any amount.

In an exemplary cellular context, network access nodes 7710 and 7720 may be base stations (e.g., eNodeBs, NodeBs, Base Transceiver Stations (BTSs), or any other type of base station), while terminal devices 7702 and 7704 may be cellular terminal devices (e.g., Mobile Stations (MSs), User Equipments (UEs), or any type of cellular terminal device). Network access nodes 7710 and 7720 may therefore interface (e.g., via backhaul interfaces) with a cellular core network such as an Evolved Packet Core (EPC, for LTE), Core Network (CN, for UMTS), or other cellular core networks, which may also be considered part of radio communication network 7700. The cellular core network may interface with one or more external data networks. In an exemplary short-range context, network access node 7710 and 7720 may be access points (APs, e.g., WLAN or WiFi APs), while terminal device 7702 and 7704 may be short range terminal devices (e.g., stations (STAs)). Network access nodes 7710 and 7720 may interface (e.g., via an internal or external router) with one or more external data networks.

Network access nodes 7710 and 7720 (and, optionally, other network access nodes of radio communication network 7700 not explicitly shown in FIG. 77) may accordingly provide a radio access network to terminal devices 7702 and 7704 (and, optionally, other terminal devices of radio communication network 7700 not explicitly shown in FIG. 77). In an exemplary cellular context, the radio access network provided by network access nodes 7710 and 7720 may enable terminal devices 7702 and 7704 to wirelessly access the core network via radio communications. The core network may provide switching, routing, and transmission, for traffic data related to terminal devices 7702 and 7704, and may further provide access to various internal data networks (e.g., control nodes, routing nodes that transfer information between other terminal devices on radio communication network 7700, etc.) and external data networks (e.g., data networks providing voice, text, multimedia (audio, video, image), and other Internet and application data). In an exemplary short-range context, the radio access network provided by network access nodes 7710 and 7720 may provide access to internal data networks (e.g., for transferring data between terminal devices connected to radio communication network 7700) and external data networks (e.g., data networks providing voice, text, multimedia (audio, video, image), and other Internet and application data).

The radio access network and core network (if applicable, such as for a cellular context) of radio communication network 7700 may be governed by communication protocols that can vary depending on the specifics of radio communication network 7700. Such communication protocols may define the scheduling, formatting, and routing of both user and control data traffic through radio communication network 7700, which includes the transmission and reception of such data through both the radio access and core network domains of radio communication network 7700. Accordingly, terminal devices 7702 and 7704 and network access nodes 7710 and 7720 may follow the defined communication protocols to transmit and receive data over the radio access network domain of radio communication network 7700, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 7700.

FIG. 78 shows an internal configuration of terminal device 7702 according to some aspects, which may include antenna system 7802, radio frequency (RF) transceiver 7804, baseband modem 7806 (including digital signal processor 7808 and protocol controller 7810), application processor 7812, and memory 7814. Although not explicitly shown in FIG. 78, in some aspects terminal device 7702 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 7702 may transmit and receive radio signals on one or more radio access networks. Baseband modem 7806 may direct such communication functionality of terminal device 7702 according to the communication protocols associated with each radio access network, and may execute control over antenna system 7802 and RF transceiver 7804 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 7702 shown in FIG. 78 depicts only a single instance of such components.

Terminal device 7702 may transmit and receive wireless signals with antenna system 7802, which may be a single antenna or an antenna array that includes multiple antennas. In some aspects, antenna system 7802 may additionally include analog antenna combination and/or beamforming circuitry. In the receive (RX) path, RF transceiver 7804 may receive analog radio frequency signals from antenna system 7802 and perform analog and digital RF front-end processing on the analog radio frequency signals to produce digital baseband samples (e.g., In-Phase/Quadrature (IQ) samples) to provide to baseband modem 7806. RF transceiver 7804 may include analog and digital reception components including amplifiers (e.g., Low Noise Amplifiers (LNAs)), filters, RF demodulators (e.g., RF IQ demodulators)), and analog-to-digital converters (ADCs), which RF transceiver 7804 may utilize to convert the received radio frequency signals to digital baseband samples. In the transmit (TX) path, RF transceiver 7804 may receive digital baseband samples from baseband modem 7806 and perform analog and digital RF front-end processing on the digital baseband samples to produce analog radio frequency signals to provide to antenna system 7802 for wireless transmission. RF transceiver 7804 may thus include analog and digital transmission components including amplifiers (e.g., Power Amplifiers (PAs), filters, RF modulators (e.g., RF IQ modulators), and digital-to-analog converters (DACs), which RF transceiver 7804 may utilize to mix the digital baseband samples received from baseband modem 7806 and produce the analog radio frequency signals for wireless transmission by antenna system 7802. In some aspects baseband modem 7806 may control the radio transmission and reception of RF transceiver 7804, including specifying the transmit and receive radio frequencies for operation of RF transceiver 7804.

As shown in FIG. 78, baseband modem 7806 may include digital signal processor 7808, which may perform physical layer (PHY, Layer 1) transmission and reception processing to, in the transmit path, prepare outgoing transmit data provided by protocol controller 7810 for transmission via RF transceiver 7804, and, in the receive path, prepare incoming received data provided by RF transceiver 7804 for processing by protocol controller 7810. Digital signal processor 7808 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. Digital signal processor 7808 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 7808 may include one or more processors configured to retrieve and execute program code that defines control and processing logic for physical layer processing operations. In some aspects, digital signal processor 7808 may execute processing functions with software via the execution of executable instructions. In some aspects, digital signal processor 7808 may include one or more dedicated hardware circuits (e.g., ASICs, FPGAs, and other hardware) that are digitally configured to specific execute processing functions, where the one or more processors of digital signal processor 7808 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 7808 may be realized as a coupled integrated circuit.

Terminal device 7702 may be configured to operate according to one or more radio communication technologies. Digital signal processor 7808 may be responsible for lower-layer processing functions (e.g., Layer 1/PHY) of the radio communication technologies, while protocol controller 7810 may be responsible for upper-layer protocol stack functions (e.g., Data Link Layer/Layer 2 and/or Network Layer/Layer 3). Protocol controller 7810 may thus be responsible for controlling the radio communication components of terminal device 7702 (antenna system 7802, RF transceiver 7804, and digital signal processor 7808) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 7810 may be structurally embodied as a protocol processor configured to execute protocol stack software (retrieved from a controller memory) and subsequently control the radio communication components of terminal device 7702 to transmit and receive communication signals in accordance with the corresponding protocol stack control logic defined in the protocol software. Protocol controller 7810 may include one or more processors configured to retrieve and execute program code that defines the upper-layer protocol stack logic for one or more radio communication technologies, which can include Data Link Layer/Layer 2 and Network Layer/Layer 3 functions. Protocol controller 7810 may be configured to perform both user-plane and control-plane functions to facilitate the transfer of application layer data to and from radio terminal device 7702 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 7810 may include executable instructions that define the logic of such functions.

Terminal device 7702 may also include application processor 7812 and memory 7814. Application processor 7812 may be a CPU, and may be configured to handle the layers above the protocol stack, including the transport and application layers. Application processor 7812 may be configured to execute various applications and/or programs of terminal device 7702 at an application layer of terminal device 7702, such as an operating system (OS), a user interface (UI) for supporting user interaction with terminal device 7702, and/or various user applications. The application processor may interface with baseband modem 7806 and act as a source (in the transmit path) and a sink (in the receive path) for user data, such as voice data, audio/video/image data, messaging data, application data, basic Internet/web access data, etc. In the transmit path, protocol controller 7810 may therefore receive and process outgoing data provided by application processor 7812 according to the layer-specific functions of the protocol stack, and provide the resulting data to digital signal processor 7808. Digital signal processor 7808 may then perform physical layer processing on the received data to produce digital baseband samples, which digital signal processor may provide to RF transceiver 7804. RF transceiver 7804 may then process the digital baseband samples to convert the digital baseband samples to analog RF signals, which RF transceiver 7804 may wirelessly transmit via antenna system 7802. In the receive path, RF transceiver 7804 may receive analog RF signals from antenna system 7802 and process the analog RF signals to obtain digital baseband samples. RF transceiver 7804 may provide the digital baseband samples to digital signal processor 7808, which may perform physical layer processing on the digital baseband samples. Digital signal processor 7808 may then provide the resulting data to protocol controller 7810, which may process the resulting data according to the layer-specific functions of the protocol stack and provide the resulting incoming data to application processor 7812. Application processor 7812 may then handle the incoming data at the application layer, which can include execution of one or more application programs with the data and/or presentation of the data to a user via a user interface.

Memory 7814 may embody a memory component of terminal device 7702, such as a hard drive or another such permanent memory device. Although not explicitly depicted in FIG. 78, the various other components of terminal device 7702 shown in FIG. 78 may additionally each include integrated permanent and non-permanent memory components, such as for storing software program code, buffering data, etc.

In accordance with some radio communication networks, terminal devices 7702 and 7704 may execute mobility procedures to connect to, disconnect from, and switch between available network access nodes of the radio access network of radio communication network 7700. As each network access node of radio communication network 7700 may have a specific coverage area, terminal devices 7702 and 7704 may be configured to select and re-select between the available network access nodes in order to maintain a strong radio access connection with the radio access network of radio communication network 7700. For example, terminal device 7702 may establish a radio access connection with network access node 7710 while terminal device 7704 may establish a radio access connection with network access node 7720. In the event that the current radio access connection degrades, terminal devices 7702 or 7704 may seek a new radio access connection with another network access node of radio communication network 7700; for example, terminal device 7704 may move from the coverage area of network access node 7720 into the coverage area of network access node 7710. As a result, the radio access connection with network access node 7720 may degrade, which terminal device 7704 may detect via radio measurements such as signal strength or signal quality measurements of network access node 7720. Depending on the mobility procedures defined in the appropriate network protocols for radio communication network 7700, terminal device 7704 may seek a new radio access connection (which may be, for example, triggered at terminal device 7704 or by the radio access network), such as by performing radio measurements on neighboring network access nodes to determine whether any neighboring network access nodes can provide a suitable radio access connection. As terminal device 7704 may have moved into the coverage area of network access node 7710, terminal device 7704 may identify network access node 7710 (which may be selected by terminal device 7704 or selected by the radio access network) and transfer to a new radio access connection with network access node 7710. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 79:
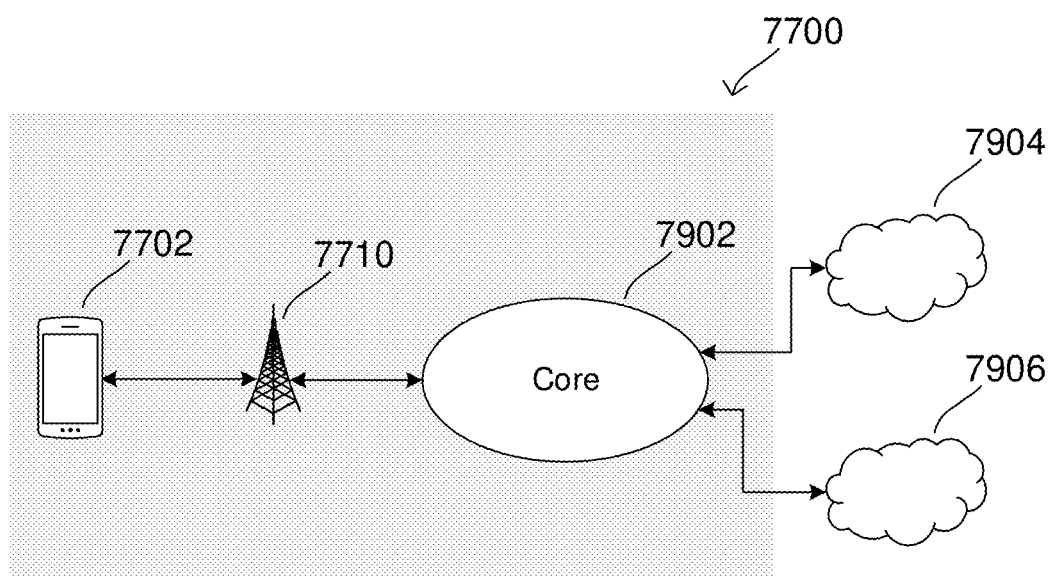
FIG. 79 shows an exemplary network configuration of a network access node interfacing with a core network according to some aspects.

As previously indicated, network access nodes 7710 and 7720 may interface with a core network. FIG. 79 shows an exemplary configuration in accordance with some aspects where network access node 7710 interfaces with core network 7902, which may be, for example, a cellular core network. Core network 7902 may provide a variety of functions to manage operation of radio communication network 7700, such as data routing, authenticating and managing users/subscribers, interfacing with external networks, and various other network control tasks. Core network 7902 may therefore provide an infrastructure to route data between terminal device 7704 and various external networks such as data network 7904 and data network 7906. Terminal device 7704 may thus rely on the radio access network provided by network access node 7710 to wirelessly transmit and receive data with network access node 7710, which may then provide the data to core network 7902 for further routing to external locations such as data networks 7904 and 7906 (which may be packet data networks (PDNs)). Terminal device 7704 may therefore establish a data connection with data network 7904 and/or data network 7906 that relies on network access node 7710 and core network 7902 for data transfer and routing.

Many wireless networks may use time and frequency synchronization to support communications between wireless devices. Slotted communication systems are particularly common, which generally divide a communication schedule into frames that are individually composed of multiple slots. Wireless devices following the communication schedule may then arrange their transmission and reception operations around the slots and frames. Wireless devices may align their operations with the communication schedule through a synchronization process, which may vary in operation depending on the particular radio access technology. In cellular networks, the synchronization is generally provided by the cellular infrastructure, such as where cells broadcast synchronization signals that terminal devices can use to acquire time and frequency synchronization with the cellular network.

Various aspects of this disclosure relate to device-to-device (D2D) networks that are decentralized. Accordingly, wireless devices operating in these D2D networks may not have centralized network infrastructure to assist with synchronization. Wireless devices may instead use external synchronization sources, such as satellite-based synchronization sources (e.g., Global Navigation Satellite System (GNSS)), internal synchronization sources, such as internal device clocks (e.g., based on Coordinated Universal Time (UTC)), or peer-based synchronization sources (e.g., another D2D device broadcasting its own synchronization signal, which may be in turn based on an internal synchronization source of this device).

Figure 80:
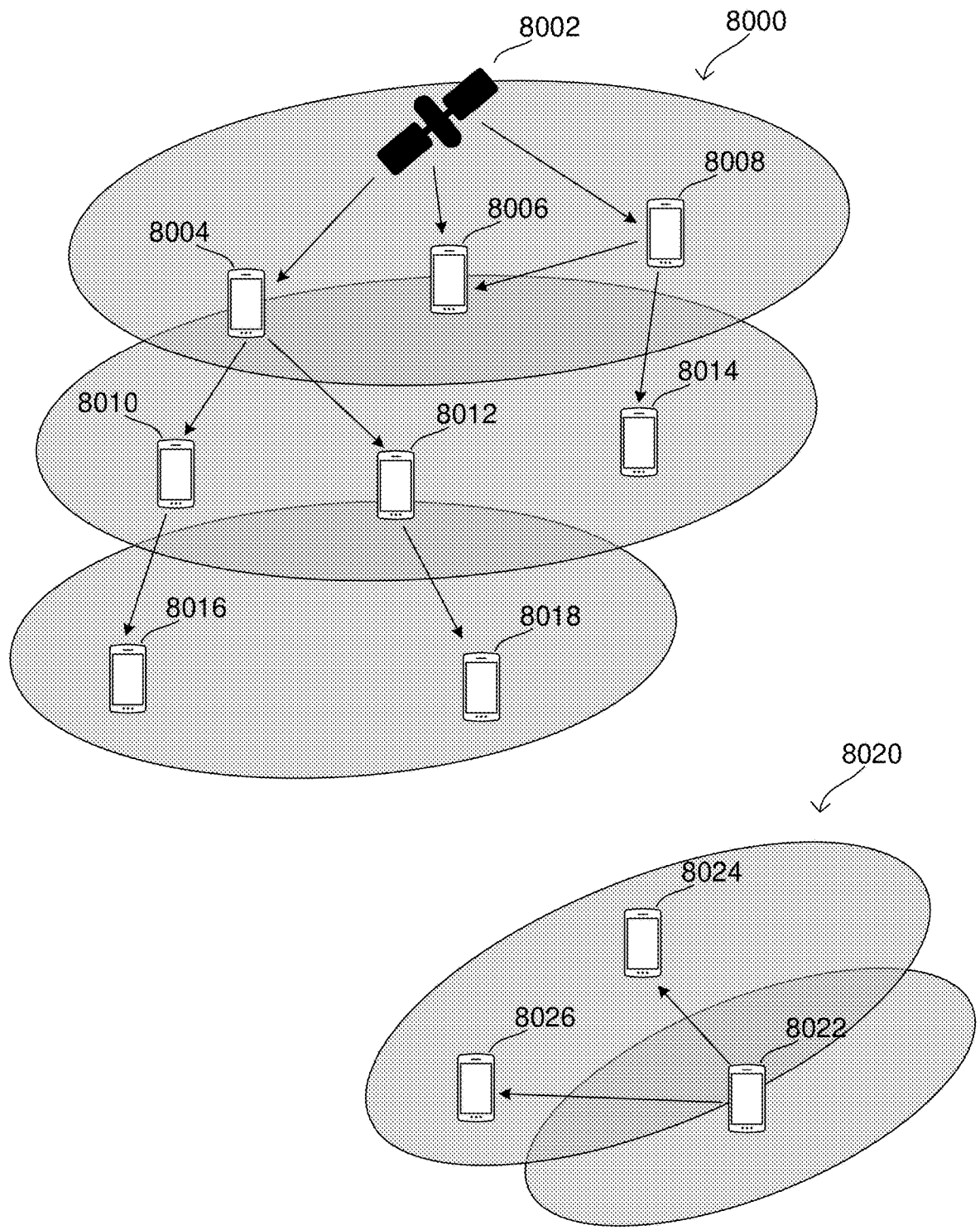
FIG. 80 shows an exemplary synchronization arrangement of wireless devices according to some aspects.

Various aspects of this disclosure may use a tiered system of synchronization, where certain synchronization tiers of devices may act as synchronization masters, synchronization relays, and synchronization slaves. FIG. 80 shows an exemplary synchronization arrangement of wireless devices according to some aspects. As shown in FIG. 80, there may be satellite-based synchronization cluster 8000 and peer-based synchronization cluster 8020. Satellite-based synchronization cluster 8000 may be synchronized with satellite-based synchronization source 8002, such as with a synchronization signal broadcasted by satellite-based synchronization source 8002 (e.g., a GNSS synchronization signal broadcasted by one or more satellites, e.g., four satellites). This includes both wireless devices that are synchronized directly with satellite-based synchronization source 8002 and wireless devices that are synchronized via relay with satellite-based synchronization source 8002. By contrast, peer-based synchronization cluster 8020 may be synchronized with wireless device 8022. Wireless device 8022 may use an internal synchronization source, such as its internal device clock (e.g., based on UTC), to generate synchronization signals to which the other wireless devices in peer-based synchronization cluster 8020 can synchronize.

The wireless devices of satellite-based synchronization cluster 8000 and peer-based synchronization cluster 8020 may assume either master, relay, or slave roles. Synchronization masters may broadcast synchronization signals that synchronization relays and synchronization slaves can use to synchronize with the synchronization master. The synchronization masters may in turn be synchronized with a satellite-based or internal synchronization source, where the synchronization relays and slaves can also synchronize with the same synchronization source using the synchronization signals broadcasted by the synchronization masters. In the example of FIG. 80, wireless devices 8004 and 8008 may be synchronization masters that are synchronized with satellite-based synchronization source 8002. The synchronization masters may form a zeroth synchronization tier of synchronization arrangement. Wireless devices 8004 and 8008 may therefore broadcast synchronization signals that are synchronized with satellite-based synchronization source 8002. As shown in FIG. 80, wireless devices 8006, 8010, 8012, and 8014 may receive these synchronization signals from the synchronization masters.

Wireless device 8006 may receive both a synchronization signal from satellite-based synchronization source 8002 and a synchronization signal from wireless device 8008. Wireless device 8006 may not broadcast a synchronization signal, and may therefore be a synchronization slave (e.g., synchronized to both satellite-based synchronization source 8002 and wireless device 8008). Wireless device 8014 may also receive a synchronization signal from wireless device 8008 but may not receive a synchronization signal from satellite-based synchronization source 8002. Wireless device 8014 may not broadcast a synchronization signal, and may therefore be a synchronization slave to wireless device 8008. As wireless device 8014 receives a synchronization signal that is once-removed from the synchronization master, wireless device 8014 may form part of the first synchronization tier of satellite-based synchronization cluster 8000.

Similar to wireless device 8014, wireless devices 8010 and 8012 may also receive synchronization signals from a synchronization master. Wireless devices 8010 and 8012 may therefore also be part of the first synchronization tier of satellite-based synchronization cluster 8000. As shown in FIG. 80, wireless devices 8010 and 8012 may then broadcast their own synchronization signals, or in other words, may relay the synchronization signals from the synchronization master. Wireless devices 8010 and 8012 may therefore assume the role of synchronization relays.

Wireless devices 8016 and 8018 may then receive these synchronization signals from the synchronization relays. As these synchronization signals are two levels moved (e.g., forwarded twice) from the synchronization source, wireless devices 8016 and 8018 may be part of the second synchronization tier of satellite-based synchronization cluster 8000. Wireless devices 8016 and 8018 may not transmit their own synchronization signals, and may therefore assume a synchronization slave role.

While satellite-based synchronization cluster 8000 includes three synchronization tiers (zeroth, first, and second), additional synchronization tiers can also be used. However, as each additional synchronization tier includes an additional relay of the synchronization signal, the synchronization reliability will progressively decrease in each synchronization tier (e.g., with relay hop of the synchronization signal). For example, the probability that an nth synchronization tier synchronization relay becomes unsynchronized increases with n, leading to a time drift between the different synchronization tiers within the synchronization cluster. Furthermore, the designation of synchronization masters may change over time, such as through a contention or handover process where synchronization masters switch places with synchronization relays or slaves and the synchronization relays or slaves become synchronization masters. As synchronization masters can consume large levels of power, this can avoid scenarios where some devices share a disproportionate amount of the power usage burden.

In contrast to the satellite-based synchronization source of satellite-based synchronization cluster 8000, peer-based synchronization cluster 8020 may be synchronized with an internal clock of wireless device 8022. In one example, the wireless devices of peer-based synchronization cluster 8020 may be indoors, or in another location where satellite-based synchronization signals are unavailable or unreliable. Accordingly, wireless device 8022 may begin broadcasting synchronization signals that are synchronized with its own internal synchronization source (e.g., its internal UTC clock). Wireless device 8022 may therefore be a synchronization master. Wireless devices 8024 and 8026 may receive this synchronization signal and thus synchronize themselves with wireless device 8022. In the example of FIG. 80, wireless devices 8024 and 8026 may not transmit their own synchronization signals, and may therefore be synchronization slaves in the first synchronization tier of peer-based synchronization cluster 8020. In other scenarios, wireless devices 8024 and 8026 may be synchronization relays and therefore may relay the synchronization signal from wireless device 8022.

In aspects, synchronization clusters may attempt to align themselves with a universal reference time. For example, synchronization cluster 8000 may align itself with Global Positioning System (GPS) time, which is provided by the synchronization signals broadcasted by satellite-based synchronization source 8002. Each wireless device may have its own local reference time, which it may periodically update based on synchronization signals to be aligned with the universal reference time. Similarly, synchronization cluster 8020 may align itself with UTC time, which is provided by the synchronization signal broadcasted by wireless device 8022. In some aspects, synchronization clusters may align their frame timings with certain timing positions in the universal reference time, such as where frame boundaries are located at certain points in time relative to the universal reference time. As further described below, this alignment with a universal reference time may help wireless devices when they are searching for synchronization signals. While wireless devices may not be able to perfectly align their local reference times with the universal reference time in proactive, it may help provide approximate frame timings to unsynchronized wireless devices. For example, even though the local reference time of a wireless device may not be precisely aligned with the communication schedule and universal reference time, it may still provide a baseline for wireless devices to approximately identify frame timings in the communication schedule.

Figure 81:
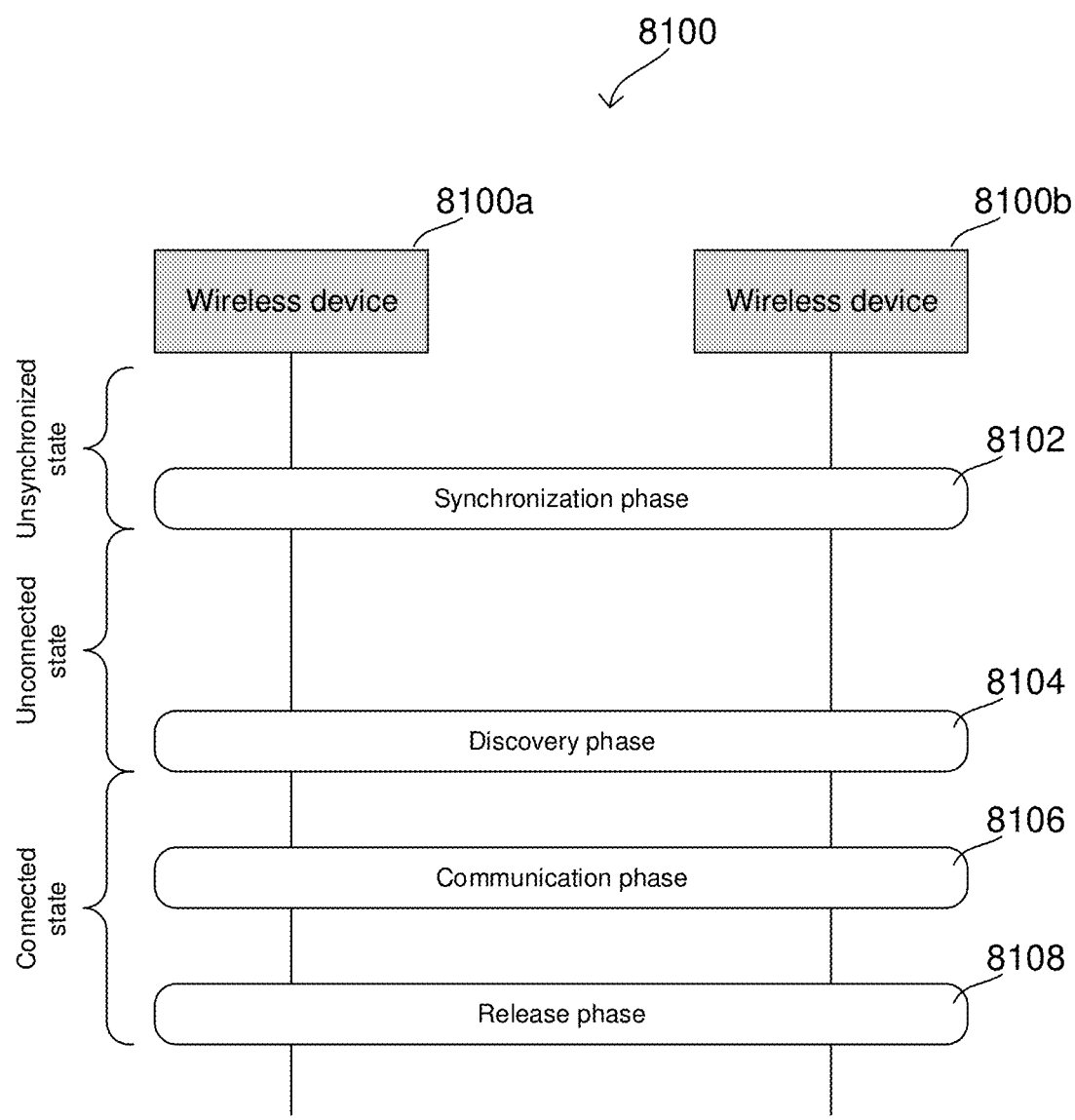
FIG. 81 shows an exemplary message sequence chart illustrating use of synchronization according to some aspects.

The respective wireless devices in satellite-based synchronization cluster 8000 and peer-based synchronization cluster 8020 may use the synchronization with each other to establish communication links. FIG. 81 shows exemplary message sequence chart 8100 illustrating use of synchronization according to some aspects. As shown in FIG. 8100, wireless devices 8100a and 8100b may initially be in an unsynchronized state with each other, or in other words, may not have a reliable synchronization reference between them. Wireless devices 8100a and 8100b may then perform a synchronization phase in stage 8102. For example, wireless devices 8100a and 8100b may receive synchronization signals that are synchronized with the same synchronization source, and may therefore obtain common time references that are synchronized with each other. Wireless devices 8100a and 8100b may also align their tuning frequencies to a common frequency reference and thus obtain frequency synchronization.

Figure 82:
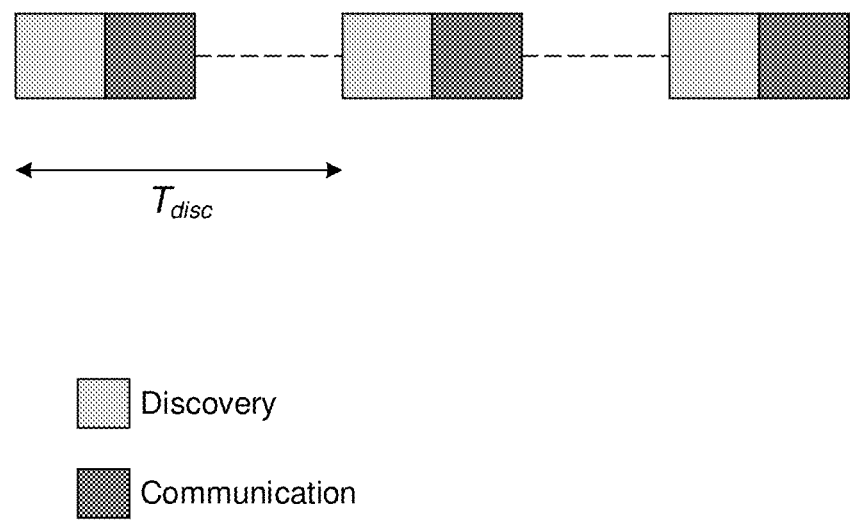
FIG. 82 shows an exemplary allocation of discovery resources according to some aspects.

Following stage 8102, wireless devices 8100a and 8100b may be in a synchronized but unconnected state. Wireless devices 8100a and 8100b may then execute a discovery phase in stage 8104. In particular, wireless devices 8100a and 8100b may use the time and frequency synchronization to align their respective discovery operations in time and frequency. For example, wireless devices 8100a and 8100b may operate on a slotted communication schedule that allocates certain time slots and frequencies for discovery during each frame (or sequence of frames). These time slots and frequencies allocated for discovery are referred to herein as discovery resources. FIG. 82 shows an example where discovery resources are allocated with a periodicity of $T_{disc}$. The frames may also include communication and other resources, between which the discovery resources are interleaved. Wireless devices 8100a and 8100b may therefore use the time and frequency synchronization (e.g., the common time and frequency references) to align their discovery operations, such as by identifying the timing of the discovery resources using the common time reference. This can include exchanging discovery messages (e.g., a discovery initiation message and a discovery confirmation message) on the discovery resources. Without time and frequency synchronization, wireless devices 8100a and 8100b may not be able to effectively perform discovery. For example, if misaligned in time, wireless devices 8100a and 8100b may transmit and receive the discovery messages at different times and experience irreversible decode errors (e.g., if the misalignment is larger than a guard interval). Similarly, if misaligned in frequency wireless devices 8100a and 8100b may use different modulation and demodulation frequencies that may likewise result in irreversible decode errors.

After discovering each other, wireless devices 8100a and 8100b may enter a connected state and perform a communication phase in stage 8106, such as where wireless devices 8100a and 8100b exchange data. This may likewise rely on the time and frequency synchronization obtained in the synchronization phase of stage 8102. For example, wireless devices 8100*a* and 8100*b* may use this time and frequency synchronization to align their transmission and reception on the same communication resources (as shown in FIG. 82). In some aspects, wireless devices 8100*a* and 8100*b* may use the synchronization from the synchronization phase for initial coarse synchronization and may apply time and frequency tracking on exchanged communication signal for fine synchronization. After communication is finished, wireless devices 8100*a* and 8100*b* execute a release phase in stage 8108 to end the communication link. Without proper synchronization between them, wireless devices 8100*a* and 8100*b* may not be able to perform stages 8104-8108.

In some aspects, a terminal device may be configured to transmit an emergency communication. The terminal device may, however, encounter various obstacles in transmitting the emergency communication. For example, a radio communication network may not be able to receive and/or process an emergency communication from a terminal device due to a variety of conditions. Further to this technical problem, the terminal device may not be able to accurately determine its position.

Figure 83:
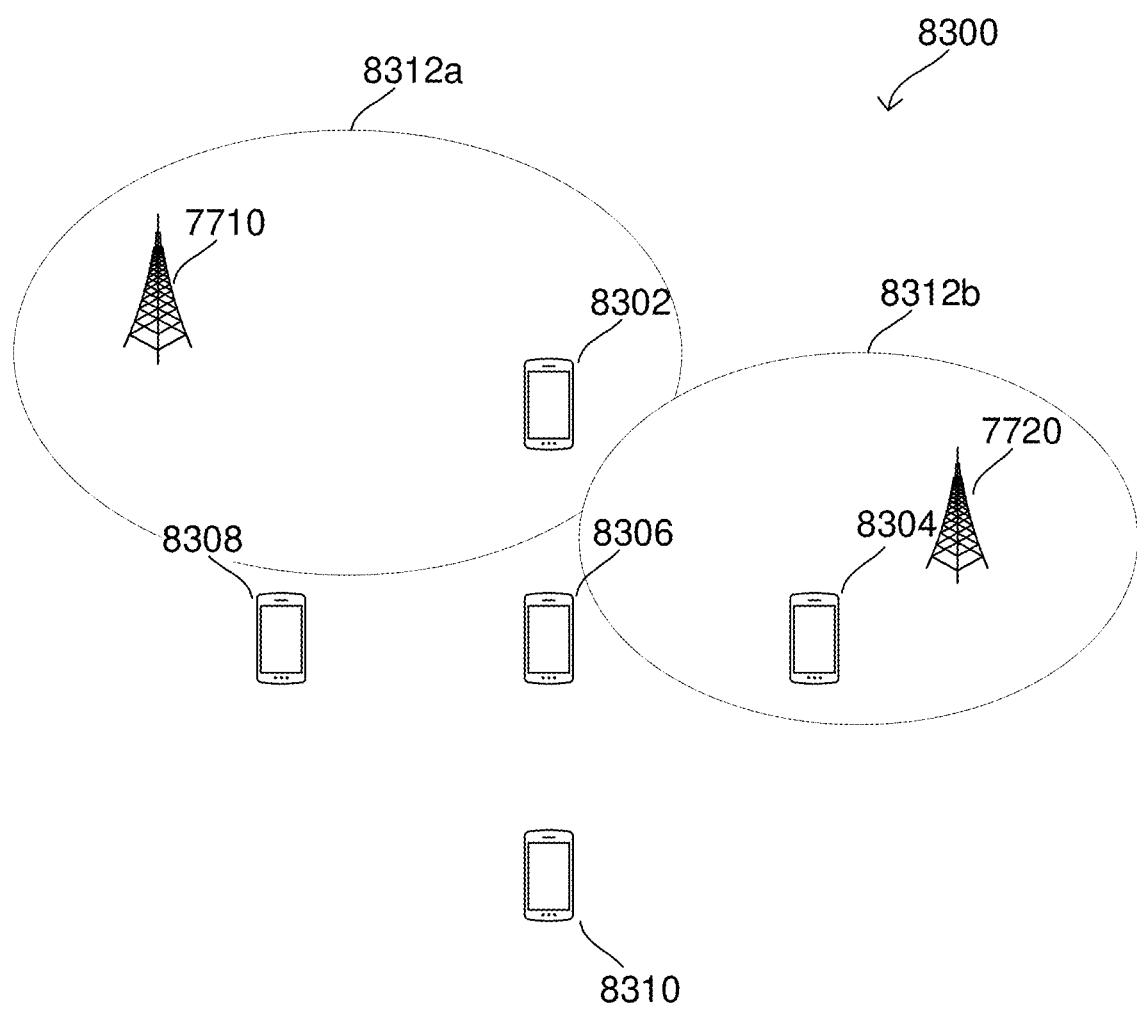
FIG. 83 shows an exemplary network architecture for wireless communications according to some aspects.

FIG. 83 depicts a general network architecture for wireless communications. As shown in FIG. 83, radio communication network 8300 may include network access node 7710, network access node 7720, terminal device 8302, terminal device 8304, terminal device 8306, terminal device 8308, and terminal device 8310. In some aspects, one or more of terminal device 8302, terminal device 8304, terminal device 8306, terminal device 8308, and terminal device 8310 may be implemented as terminal device 7702 or any wireless device described herein. Although radio communication network 8300 may include network access node 7710, network access node 7720, terminal device 8302, terminal device 8304, terminal device 8306, terminal device 8308, and terminal device 8310 as illustrated in FIG. 83, some aspects may employ additional or fewer terminal devices, network access nodes and/or other elements.

As depicted in FIG. 83, terminal device 8302 is located within the communication range 8312*a* of network access node 7710, whereas terminal device 8304 is located within the communication range 8312*b* of network access node 7720. Terminal devices 8306-8310 are, however, located outside of the respective communication ranges 8312*a* and 8312*b* of network access nodes 7710 and 7720. Consequently, radio communication network 8300 may not be able to receive and/or process an emergency communication that is transmitted from one or more of terminal devices 8304-8310.

Various conditions may also prevent radio communication network 8300 from receiving and/or processing an emergency communication from a terminal device that is either within or outside of the communication range of the radio communication network 8300. For example, radio communication network 8300 may not be able to receive and/or process an emergency communication that is transmitted from terminal device 8302 even though terminal device 8302 is located within communication range 8312*a* of network access node 7710. These conditions may include one or more faults, errors, and/or failures within radio communication network 8300. The one or more faults, errors, and/or failures may be attributable to one or more specification mistakes (e.g., typographical errors in a document), implementation mistakes (e.g., design/manufacturing mistakes), external disturbances (e.g., environmental changes), and/or component defects (e.g., hardware and/or software defects).

Figure 84:
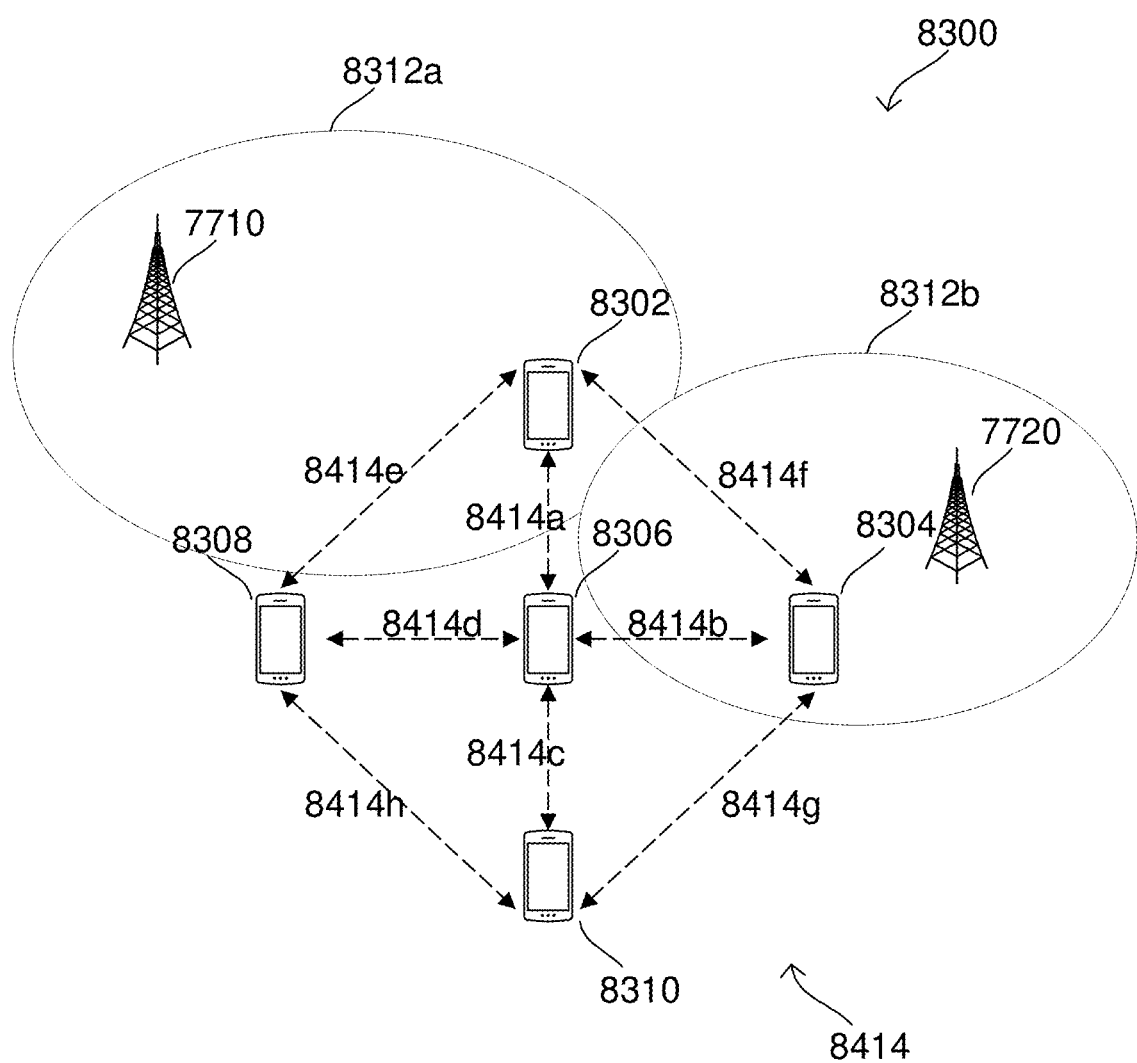
FIG. 84 shows another exemplary network architecture for wireless communications according to some aspects.

FIG. 84 depicts a general network architecture for wireless communications. As shown in FIG. 84, terminal devices 8302-8310 may form a decentralized network 8414 and use D2D signaling (e.g., on D2D resources) to communicate with each other. As specified above, the term D2D refers to any type of direct signaling between terminal devices and is not limited to any particular radio communication technology. Although decentralized network 8414 may include terminal devices 8302-8310 as illustrated in FIG. 84, some aspects may employ additional or fewer terminal devices, and/or other elements.

Decentralized network 8414 may include one or more communication links 8414*a*-8414*h* between terminal devices 8302-8310. In some aspects, one or more of the communication links 8414*a*-8414*h* may be unidirectional. Additionally or alternatively, one or more of the communication links 8414*a*-8414*h* may bidirectional. Each of the communication links 8414*a*-8414*h* may, for example, represent a unicast communication link, a narrowcast communication link, a multicast communication link, a broadcast communication link, or any combination thereof. Although decentralized network 8414 may include communication links 8414*a*-8414*h* as illustrated in FIG. 84, some aspects may employ additional or fewer communication links. For example, each of the communication links 8414*a*-8414*h* illustrated in FIG. 84, may represent one or more of the aforementioned communication links and/or other communication link types not explicitly referenced herein. Moreover, one or more communication links may be present between terminal device 8302 and terminal device 8310, and one or more communication links may be present between terminal device 8308 and terminal device 8304.

Communication links 8414*a*-8414*h* may be established in a variety of manners. In some aspects, two or more of the communication links 8414*a*-8414*h* may be established according to a similar establishment protocol. For example, two or more of the communication links 8414*a*-8414*h* may be established according to the same protocol (e.g., the protocol described with respect to FIG. 81). According to at least one aspect, two or more of the communication links 8414*a*-8414*h* may be established according to different establishment protocols. For example, two or more of the communication links 8414*a*-8414*h* may be established according to different establishment protocols.

Communication links 8414*a*-8414*h* may be implemented in a variety of manners. In some aspects, communication links 8414*a*-8414*h* may be similar in terms of radio communication technology. For example, two or more of the communication links 8414*a*-8414*h* may conform to the same radio communication technology. According to at least one aspect, two or more of the communication links 8414*a*-8414*h* may be different in terms of radio communication technology. For example, two or more of the communication links 8414*a*-8414*h* may conform to different radio communication technologies.

With continued reference to FIG. 84, terminal device 8306 may be configured to transmit an emergency communication via decentralized network 8414 when, for example, terminal device 8306 is located outside of the communication ranges 8312*a* and 8312*b* of network access nodes 7710 and 7720. In some aspects, terminal device 8306 may be configured to transmit an emergency communication through decentralized network 8414 before it reaches radio communication network 8300. For instance, terminal device 8306 may be configured to transmit an emergency communication over communication link 8414*a* to terminal device 8302. Upon receipt, terminal device 8302 may be configured to transmit the emergency communication to the radio communication network 8300 via network access node 7710.

In some aspects, terminal device 8302 may be configured to transmit an emergency communication via decentralized network 8414. For example, terminal device 8302 may be configured to transmit an emergency communication through decentralized network 8414 in the event radio communication network 8300 is unable to receive and/or process an emergency communication from terminal device 8302 directly. According to at least one aspect, terminal device 8302 may be configured to transmit an emergency communication over communication link 8414f to terminal device 8304. Upon receipt, terminal device 8304 may be configured to transmit the emergency communication to the radio communication network 8300 via network access node 7720.

In some aspects, radio communication network 8300 may be configured to request a position of a terminal device (e.g., terminal device 8306) under a variety of conditions. According to at least one aspect, radio communication network 8300 may be configured to request a position of the terminal device if it was not already provided in the emergency communication. Even if its position were provided within the emergency communication, radio communication network 8300 may, in some aspects, be configured to request an updated position of the terminal device. For example, radio communication network 8300 may be configured to detect the terminal device is moving based on its usage of one or more resources of the radio communication network 8300. In such a case, radio communication network 8300 may, for example, be configured to send out one or more position requests (e.g., periodically) for the terminal device. Radio communication network 8300 may be configured to confirm a position of the terminal device 8306 derived by one or more components of the radio communication network 8300 or derived externally from the radio communication network 8300 in at least one aspect. For instance, radio communication network may be configured to request a position of the terminal device in response to receiving a position of the terminal device that was derived externally from the radio communication network 8300.

In some aspects, terminal device 8306 may not be able to accurately determine its position due to a variety of conditions. For instance, signal reflections may cause multi-path measurement errors in the terminal device 8306. In cases where the surrounding terrain may include tree cover and/or buildings, terminal device 8306 might also experience line of sight issues with one or more satellites and/or attenuated GNSS signals. According to at least one aspect, terminal device may not be equipped with a satellite receiver (e.g., GNSS receiver or the like). In view of the foregoing technical problems, terminal device 8306 may be configured to utilize the assistance of one or more terminal devices of the decentralized network 8414 in determining its position.

Figure 85:
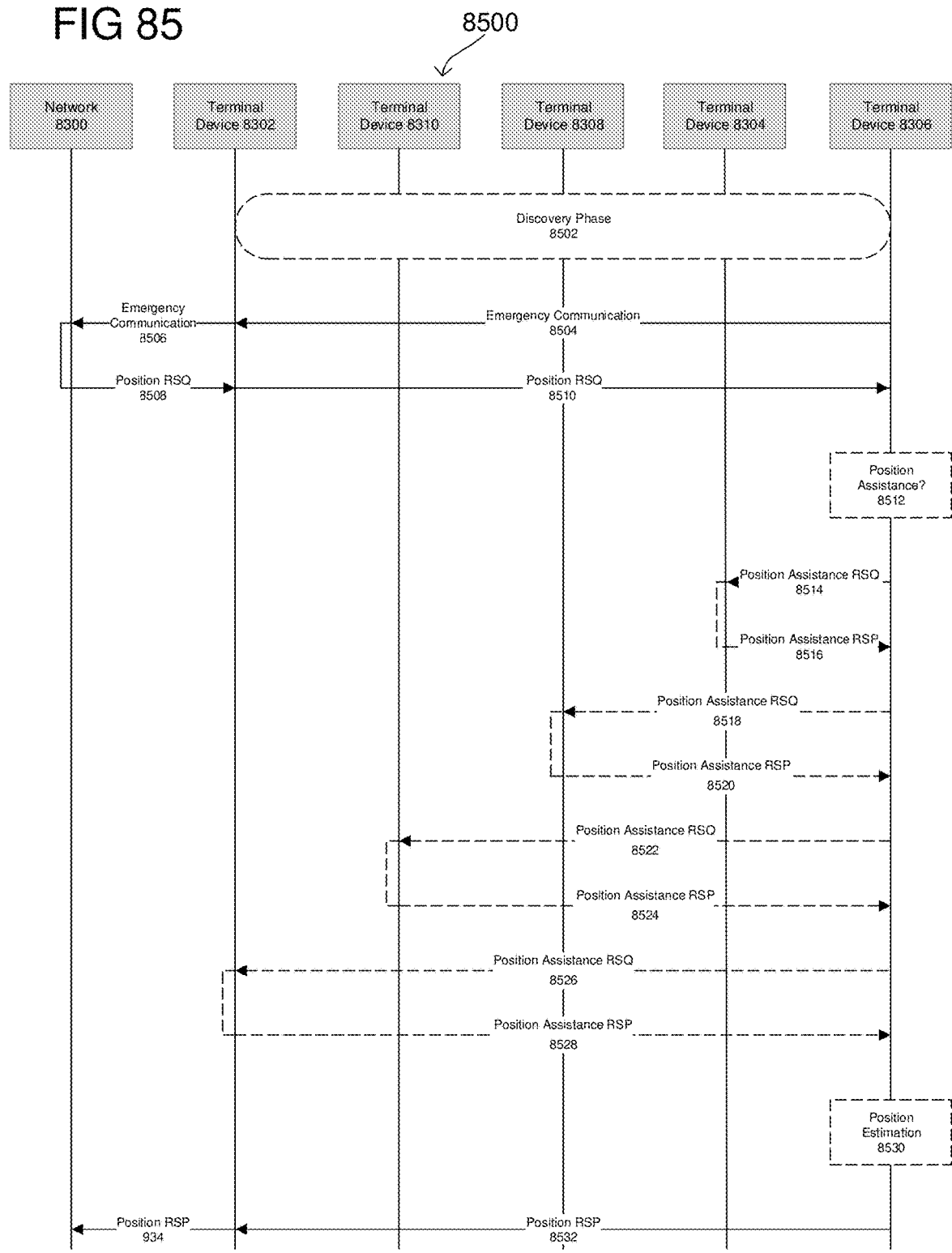
FIG. 85 shows an exemplary emergency communication message sequence chart according to some aspects.

FIG. 85 shows an exemplary emergency communication message sequence chart 8500 according to some aspects, which serves as an example of an emergency communication message flow. As shown in FIG. 85, emergency communication message sequence chart 8500 may include an emergency communication message flow between devices, including radio communication network 8300, terminal device 8302, terminal device 8304, terminal device 8306, terminal device 8308, and terminal device 8310. Although the emergency communication message flow may occur between devices, including radio communication network 8300, terminal device 8302, terminal device 8304, terminal device 8306, terminal device 8308, and terminal device 8310 as illustrated in FIG. 85, some aspects may employ additional or fewer terminal devices, radio communication networks and/or other elements.

With continued reference to FIG. 85, emergency communication message sequence chart 8500 may include an emergency communication message flow delineated by a number of stages. As described below, one or more of these stages may, in some aspects, be omitted depending upon the implementation. A dashed line type may be used in emergency communication message sequence chart 8500 to graphically illustrate that certain stage(s) may be omitted.

Although numerically ordered reference characters may be used herein to denote each stage in the emergency communication message sequence chart 8500, the order in which these stages are performed should not be limited by these reference characters. These reference characters may, in some aspects, be only used to distinguish one stage from another. In particular, the numerical order of the reference characters does not imply a sequence or order unless clearly indicated by the context. In some aspects, two or more of stages 8514-8530 may be performed based on their numerical order, or consecutively. According to at least one aspect, two or more of stages 8514 to 8530 may, however, occur simultaneously or concurrently. One or more stages not explicitly provided herein may, in some aspects, be performed between two or more of stages 8502-8534.

At stage 8502, one or more terminal devices 8302-8310 may be configured to perform a discovery phase over decentralized network 8414 in a variety of manners. In some aspects, the discovery phase in stage 8502 may be implemented as discovery phase 8104, which is described herein with respect to FIG. 81. Additionally or alternatively, the discovery phase in stage 8502 may be implemented in accordance with a standard of any of the radio communication technologies described herein. According to at least one aspect, one or more terminal devices 8302-8310 may be configured to communicate over decentralized network 8414 upon completion of the discovery phase in stage 8502. By way of contrast, the discovery phase in stage 8502 may, in some aspects, be omitted.

At stage 8504, terminal device 8306 may be configured to transmit an emergency communication, either directly or indirectly, to terminal device 8302 over decentralized network 8414. In some aspects, terminal device 8306 may be configured to transmit the emergency communication during a communication phase (e.g., stage 8106 of FIG. 81) with terminal device 8302 over communication link 8414a of decentralized network 8414. According to at least one aspect, terminal device 8306 may be configured to broadcast the emergency communication, over decentralized network 8414, to one or more terminal devices (e.g., terminal device 8302) using one or more discovery resources (e.g., time slots and frequencies) and/or one or more other resources of decentralized network 8414. In situations where the discovery phase in stage 8502 is omitted, terminal device 8306 may, in some aspects, be configured to broadcast the emergency communication (e.g., blindly), over decentralized network 8414, in attempt to reach one or more terminal devices (e.g., terminal device 8302) monitoring one or more discovery resources of the decentralized network 8414. Although not explicitly provided herein, other forms of providing the emergency communication to terminal device 8302 over decentralized network 8414 are possible.

The emergency communication may be implemented in a variety of forms. In some aspects, the emergency communication may be implemented as emergency communication 9400 of FIG. 94, as further discussed below. According to at least one aspect, the emergency communication may be implemented as emergency communication 9500 of FIG. 95, as further discussed below. The emergency communication may, in some aspects, be implemented as an initiation of an emergency call. The emergency communication may be implemented as an emergency beacon in at least one aspect.

At stage 8506, terminal device 8302 may be configured to transmit the emergency communication received from terminal device 8306, either directly or indirectly, to radio communication network 8300. For example, terminal device 8302 may be configured to transmit the emergency communication to radio communication network 8300 via a radio access connection with network access node 7710. Although not explicitly provided herein, other forms of providing the emergency communication to radio communication network 8300 are possible.

In some aspects, one or more components of radio communication network 8300 may be configured to request a position of terminal device 8306, based on the emergency communication from terminal device 8302. To this end, one or more components of radio communication network 8300 may be configured to select one or more intermediary devices (e.g., terminal device 8302) for use in communicating with terminal device 8306. For instance, one or more components of radio communication network 8300 may be configured to select terminal device 8302 for use in communicating with terminal device 8306, based on the emergency communication provided from terminal device 8306. According to at least one aspect, one or more components of radio communication network (e.g., network access node 7710) may be configured to transmit one or more position requests directed to terminal device 8306 via one or more intermediary devices (e.g., terminal device 8302). Although not explicitly provided herein, other forms of providing the one or more position assistance requests to terminal device 8306 are possible.

At stage 8510, terminal device 8302 may be configured to transmit one or more of the position requests from radio communication network 8300, either directly or indirectly, to terminal device 8306 over decentralized network 8414. In some aspects, terminal device 8302 may be configured to transmit the one or more positions requests during a communication phase (e.g., stage 8106 of FIG. 81) with terminal device 8306 over communication link 8414a of decentralized network 8414. According to at least one aspect, terminal device 8302 may be configured to broadcast the one or more position requests, over decentralized network 8414, to one or more terminal devices (e.g., terminal device 8306) using one or more discovery resources (e.g., time slots and frequencies) and/or one or more other resources of decentralized network 8414. Terminal device 8302 may, in some aspects, no longer be in communication range with terminal device 8306 when one or both are moving. If terminal device 8302 is no longer in communication range of terminal device 8306, then terminal device 8302 may be configured to broadcast the one or more position requests directed to terminal device 8306 over decentralized network 8414 in attempt to reach terminal device 8306 through one or more intermediary devices. Although not explicitly provided herein, other forms of providing the one or more position assistance requests to terminal device 8306 over decentralized network 8414 are possible.

At stage 8512, terminal device 8306 may be configured to determine whether to acquire assistance in estimating a location of terminal device 8306. In some aspects, terminal device 8306 may be configured to determine whether to acquire assistance in estimating the position of terminal device 8306, based on whether terminal device 8306 is able to derive an estimated position of terminal device 8306. According to at least one aspect, terminal device 8306 may be configured to determine whether to acquire assistance in estimating the position of terminal device 8306, based on an accuracy of an estimated position of terminal device 8306. The estimated position of terminal device 8306 may, for instance, be derived from a satellite receiver (e.g., GNSS receiver or the like) included in the terminal device 8306 and/or derived from one or more other alternative sources (e.g., external to decentralized network 8414) for estimating the position of terminal device 8306. Terminal device 8306 may, in some aspects, be configured to determine whether to acquire assistance in estimating the position of terminal device 8306, based on an accuracy of an estimated position of terminal device 8306.

Figure 86:
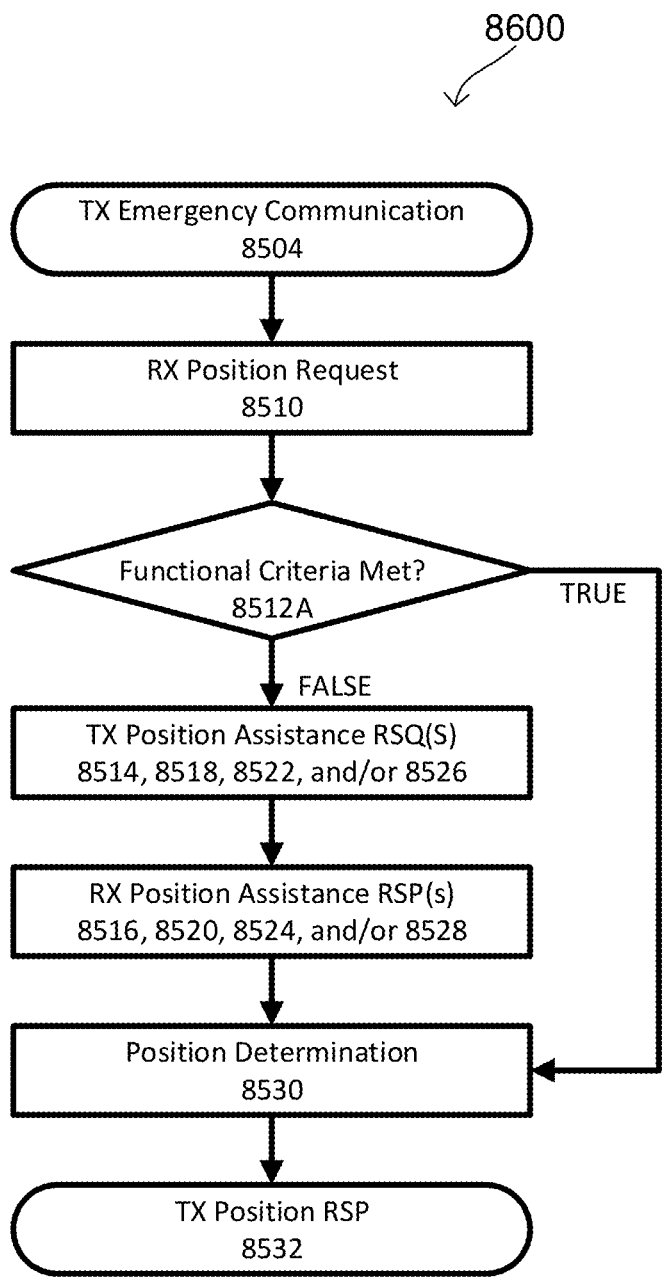
FIG. 86-89 show exemplary emergency communication flow diagrams according to some aspects.

FIG. 86 shows an exemplary emergency communication flow diagram 8600 according to some aspects, which serves as an example of one possible manner in which a terminal device may determine whether to acquire assistance in estimating its location. A repetitive description of like reference characters employed in FIG. 85 is hereby omitted for sake of brevity. In some aspects, terminal device 8306 may be configured to determine whether to acquire assistance in estimating the position of the terminal device 8306, based on whether one or more capabilities of the terminal device 8306 satisfy a functional criteria 8512A. According to at least one aspect, the functional criteria may be satisfied when terminal device 8306 includes a satellite receiver (e.g., a GNSS receiver or the like) and/or terminal device 8306 is otherwise able to derive an estimated position of terminal device 8306 from one or more alternative sources (e.g., external to decentralized network 8414). When it is determined that position assistance will be acquired in accordance with stage 8512A, message flow may proceed to stages 8514, 8518, 8522, and/or 8526. If, however, it is determined that position assistance will not be acquired in accordance with stage 8512A, message flow may instead proceed to stage 8530.

Figure 87:
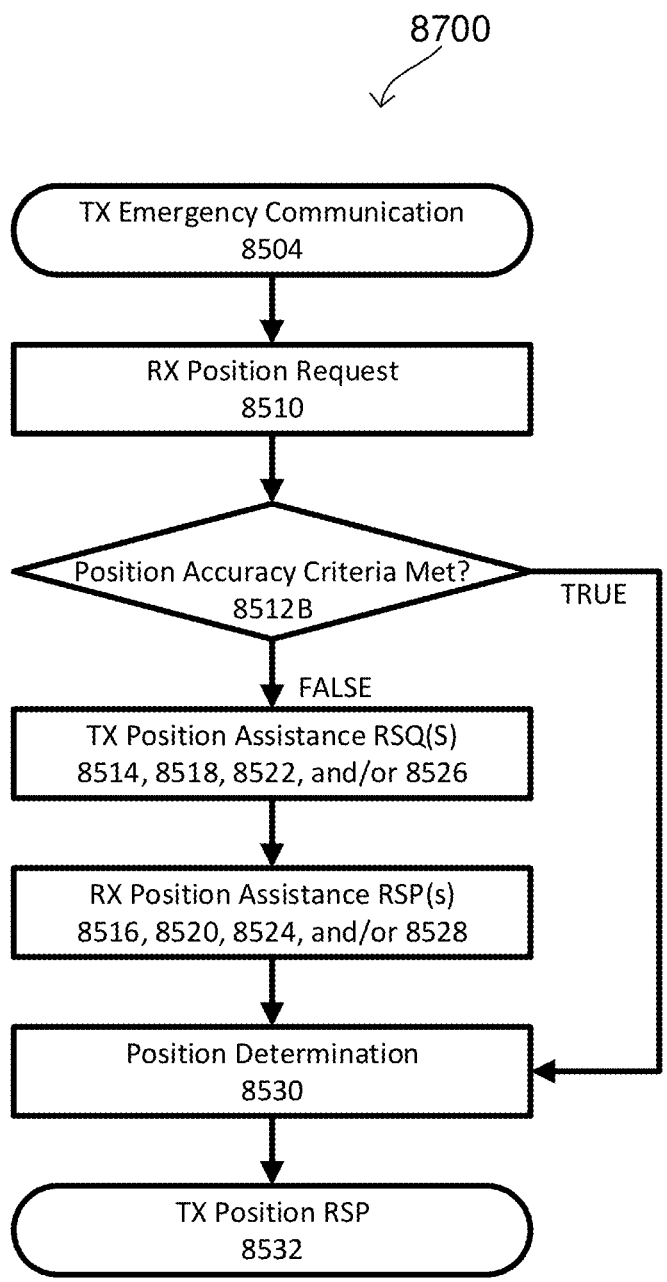

FIG. 87 shows an exemplary emergency communication flow diagram 8700 according to some aspects, which serves as an example of one possible manner in which a terminal device may determine whether to acquire assistance in estimating its location. As previously noted, a repetitive description of like reference characters employed in FIG. 85 is hereby omitted for sake of brevity. In some aspects, terminal device 8306 may be configured to determine whether to acquire assistance in estimating the position of the terminal device 8306, based on whether the accuracy of the estimated position of the terminal device 8306 satisfies a position accuracy criteria 8512B. According to at least one aspect, the position accuracy criteria many include a comparison between the accuracy of the estimated position of terminal device 8306 and a threshold position accuracy (e.g., predetermined threshold position accuracy). Position accuracy criteria may, in some aspects, be satisfied when the accuracy of the estimated position of terminal device 8306 is greater than or equal to the threshold position accuracy. Alternatively, the position accuracy criteria may be satisfied when the accuracy of the estimated position of terminal device 8306 falls within a threshold range of position accuracies. When it is determined that position assistance will be acquired in accordance with stage 8512B, message flow may proceed to stages 8514, 8518, 8522, and/or 8526. If, however, it is determined that position assistance will not be acquired in accordance with stage 8512B, message flow may instead proceed to stage 8530.

Figure 88:
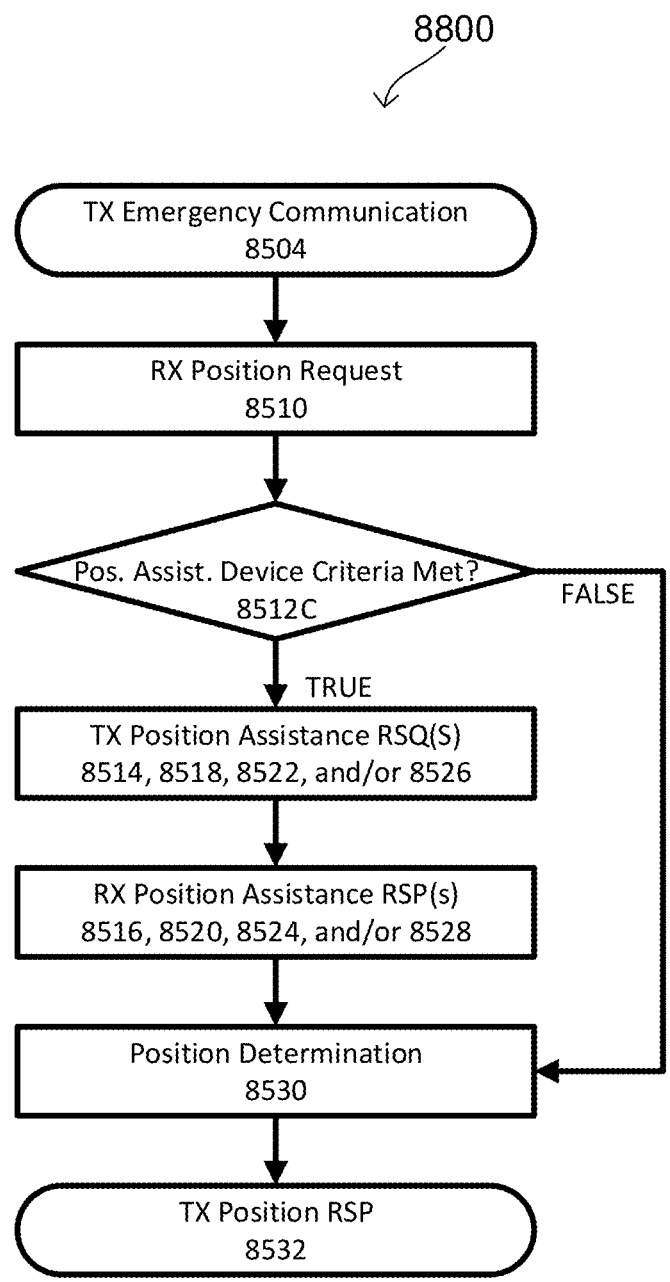

FIG. 88 shows an exemplary emergency communication flow diagram 8800 according to some aspects, which serves as an example of one possible manner in which a terminal device may determine whether to acquire assistance in estimating its location. As previously noted, a repetitive description of like reference characters employed in FIG. 85 is hereby omitted for sake of brevity. In some aspects, terminal device 8306 may be configured to determine whether to acquire assistance in estimating the position of the terminal device 8306, based on whether position assistance device criteria is satisfied 8512C. For instance, position assistance device criteria may include a comparison between the number of terminal devices available for position assistance and a threshold number of terminal devices available for position assistance. When the threshold number of terminal device is, for example, three, position assistance device criteria may be satisfied when the number of terminal device available for position assistance is greater than or equal to three. If it is determined that position assistance will be acquired in accordance with stage 8512C, message flow may proceed to stages 8514, 8518, 8522, and/or 8526. If, however, it is determined that position assistance will not be acquired in accordance with stage 8512C, message flow may instead proceed to stage 8530.

Figure 89:
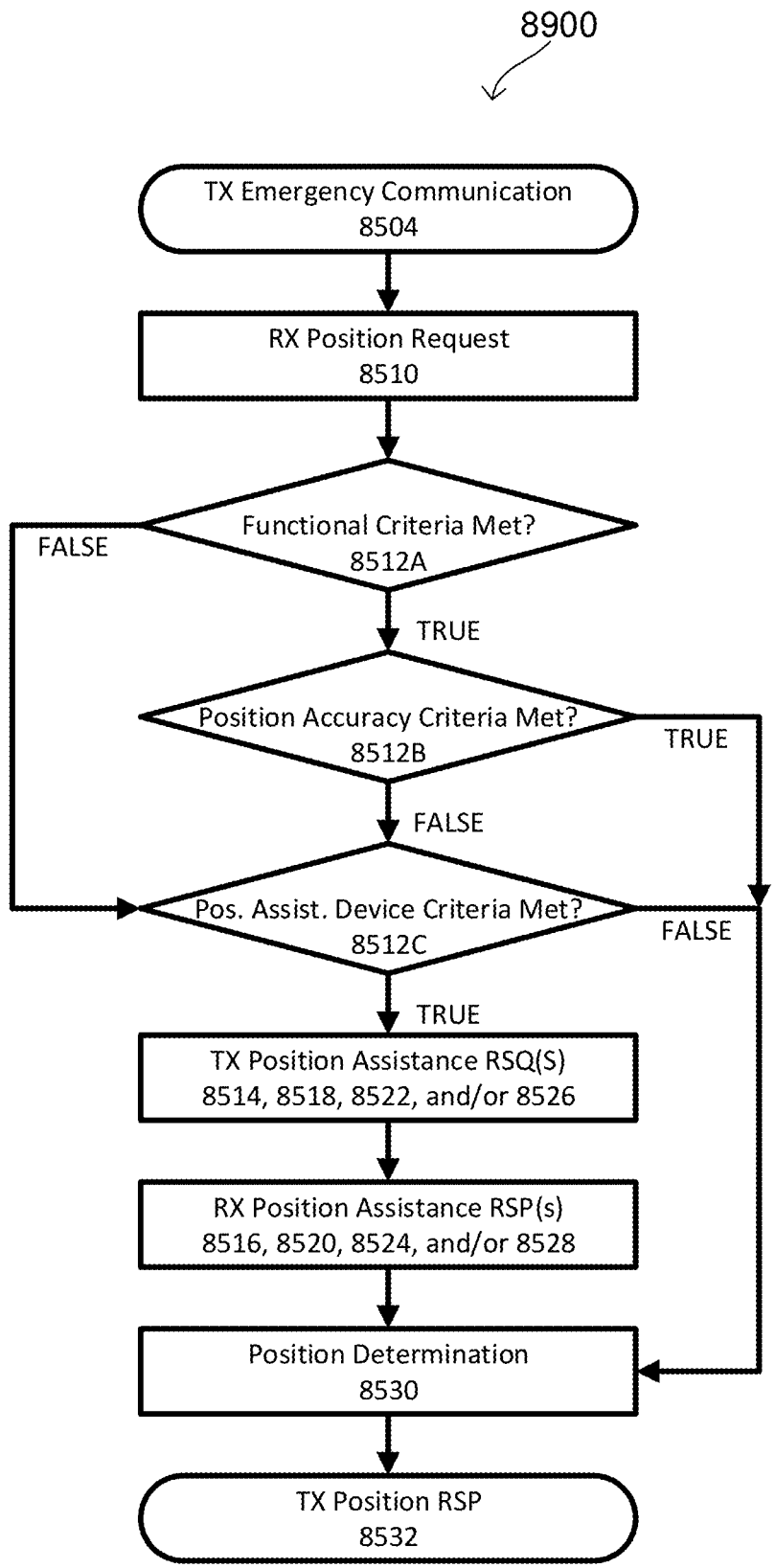

FIG. 89 shows an exemplary emergency communication flow diagram 8900 according to some aspects, which serves as an example of one possible manner in which a terminal device may determine whether to acquire assistance in estimating its location. A repetitive description of like reference characters employed in FIGS. 85-88 is hereby omitted for sake of brevity.

At stage 8512, terminal device 8306 may be configured to determine whether to acquire assistance in estimating a location of terminal device 8306. When it is determined that position assistance will be acquired in accordance with stage 8512A, message flow may proceed to stage 8512B. If, however, it is determined that position assistance will not be acquired in accordance with stage 8512A, message flow may instead proceed to stage 8512C. When it is determined that position assistance will be acquired in accordance with stage 8512B, message flow may proceed to stage 8512C. If, however, it is determined that position assistance will not be acquired in accordance with stage 8512B, message flow may instead proceed to stage 8530. When it is determined that position assistance will be acquired in accordance with stage 8512C, message flow may proceed to stages 8514, 8518, 8522, and/or 8526. If, however, it is determined that position assistance will not be acquired in accordance with stage 8512C, message flow may instead proceed to stage 8530.

With continued reference to FIGS. 85-89, terminal device 8306 may, at stage 8514, be configured to transmit a position assistance request, either directly or indirectly, to terminal device 8304 over decentralized network 8414. In some aspects, terminal device 8306 may be configured to transmit the position assistance request during a communication phase (e.g., stage 8106 of FIG. 81) with terminal device 8304 over communication link 8414b of decentralized network 8414. According to at least one aspect, terminal device 8306 may be configured to broadcast the position assistance request, over decentralized network 8414, to one or more terminal devices (e.g., terminal device 8304) using one or more discovery resources (e.g., time slots and frequencies) and/or one or more other resources of decentralized network 8414. Although not explicitly provided herein, other forms of providing the position assistance request to terminal device 8304 over decentralized network 8414 are possible.

At stage 8516, terminal device 8304 may be configured to transmit a position assistance response, either directly or indirectly, to terminal device 8306 over decentralized network 8414. In some aspects, terminal device 8304 may be configured to transmit the position assistance response during a communication phase (e.g., stage 8106 of FIG. 81) with terminal device 8306 over communication link 8414b of decentralized network 8414. According to at least one aspect, terminal device 8304 may be configured to broadcast the position assistance response, over decentralized network 8414, to one or more terminal devices (e.g., terminal device 8306) using one or more discovery resources (e.g., time slots and frequencies) and/or one or more other resources of decentralized network 8414. Although not explicitly provided herein, other forms of providing the position assistance response to terminal device 8306 over decentralized network 8414 are possible.

At stage 8518, terminal device 8306 may be configured to transmit a position assistance request, either directly or indirectly, to terminal device 8308 over decentralized network 8414. In some aspects, terminal device 8306 may be configured to transmit the position assistance request during a communication phase (e.g., stage 8106 of FIG. 81) with terminal device 8308 over communication link 8414d of decentralized network 8414. According to at least one aspect, terminal device 8306 may be configured to broadcast the position assistance request, over decentralized network 8414, to one or more terminal devices (e.g., terminal device 8308) using one or more discovery resources (e.g., time slots and frequencies) and/or one or more other resources of decentralized network 8414. Although not explicitly provided herein, other forms of providing the position assistance request to terminal device 8308 over decentralized network 8414 are possible.

At stage 8520, terminal device 8308 may be configured to transmit a position assistance response, either directly or indirectly, to terminal device 8306 over decentralized network 8414. In some aspects, terminal device 8308 may be configured to transmit the position assistance response during a communication phase (e.g., stage 8106 of FIG. 81) with terminal device 8306 over communication link 8414d of decentralized network 8414. According to at least one aspect, terminal device 8308 may be configured to broadcast the position assistance response, over decentralized network 8414, to one or more terminal devices (e.g., terminal device 8306) using one or more discovery resources (e.g., time slots and frequencies) and/or one or more other resources of decentralized network 8414. Although not explicitly provided herein, other forms of providing the position assistance response to terminal device 8306 over decentralized network 8414 are possible.

At stage 8522, terminal device 8306 may be configured to transmit a position assistance request, either directly or indirectly, to terminal device 8310 over decentralized network 8414. In some aspects, terminal device 8306 may be configured to transmit the position assistance request during a communication phase (e.g., stage 8106 of FIG. 81) with terminal device 8310 over communication link 8414c of decentralized network 8414. According to at least one aspect, terminal device 8306 may be configured to broadcast the position assistance request, over decentralized network 8414, to one or more terminal devices (e.g., terminal device 8310) using one or more discovery resources (e.g., time slots and frequencies) and/or one or more other resources of decentralized network 8414. Although not explicitly provided herein, other forms of providing the position assistance request to terminal device 8310 over decentralized network 8414 are possible.

At stage 8524, terminal device 8310 may be configured to transmit a position assistance response, either directly or indirectly, to terminal device 8306 over decentralized network 8414. In some aspects, terminal device 8310 may be configured to transmit the position assistance response during a communication phase (e.g., stage 8106 of FIG. 81) with terminal device 8306 over communication link 8414*c* of decentralized network 8414. According to at least one aspect, terminal device 8310 may be configured to broadcast the position assistance response, over decentralized network 8414, to one or more terminal devices (e.g., terminal device 8306) using one or more discovery resources (e.g., time slots and frequencies) and/or one or more other resources of decentralized network 8414. Although not explicitly provided herein, other forms of providing the position assistance response to terminal device 8306 over decentralized network 8414 are possible.

At stage 8526, terminal device 8306 may be configured to transmit a position assistance request, either directly or indirectly, to terminal device 8302 over decentralized network 8414. In some aspects, terminal device 8306 may be configured to transmit the position assistance request during a communication phase (e.g., stage 8106 of FIG. 81) with terminal device 8302 over communication link 8414*a* of decentralized network 8414. According to at least one aspect, terminal device 8306 may be configured to broadcast the position assistance request, over decentralized network 8414, to one or more terminal devices (e.g., terminal device 8302) using one or more discovery resources (e.g., time slots and frequencies) and/or one or more other resources of decentralized network 8414. Although not explicitly provided herein, other forms of providing the position assistance request to terminal device 8302 over decentralized network 8414 are possible.

At stage 8528, terminal device 8302 may be configured to transmit a position assistance response, either directly or indirectly, to terminal device 8306 over decentralized network 8414. In some aspects, terminal device 8302 may be configured to transmit the position assistance response during a communication phase (e.g., stage 8106 of FIG. 81) with terminal device 8306 over communication link 8414*a* of decentralized network 8414. According to at least one aspect, terminal device 8302 may be configured to broadcast the position assistance response, over decentralized network 8414, to one or more terminal devices (e.g., terminal device 8306) using one or more discovery resources (e.g., time slots and frequencies) and/or one or more other resources of decentralized network 8414. Although not explicitly provided herein, other forms of providing the position assistance response to terminal device 8306 over decentralized network 8414 are possible.

A position assistance request may implemented in a variety of forms. In some aspects, a position assistance request may include one or more signals from terminal device 8306. According to at least one aspect, the one or more signals of the position assistance request may include one or more timestamps respectively recorded by terminal device 8306 at the time of transmission, one or more trigger signals, one or more test signals, an estimated position of terminal device 8306 (e.g., with or without an associated accuracy measurement), and/or a request for a position of the recipient of the position assistance request (e.g., terminal device 8304). A position assistance request may, in some aspects, be employed indicate a start of one or more signals from terminal device 8306, which the recipient of the position assistance request is to perform one or more measurements thereon. Additionally or alternatively, a position assistance request may be employed to indicate a start of one or more signals to be transmitted by the recipient of the position assistance request to terminal device 8306. Although not explicitly provided herein, terminal device 8306 may be configured to generate and transmit other forms of position assistance requests.

In stages 8514, 8518, 8522 and 8526, terminal device 8306 may, in some aspects, be configured to broadcast a position assistance request, over decentralized network 8414, to two or more of terminal devices 8302, 8304, 8308 and 8310 using one or more discovery resources (e.g., time slots and frequencies) and/or one or more other resources of decentralized network 8414.

With continued reference to stages 8514, 8518, 8522 and 8526, terminal device 8306 may, in some aspects, be configured to limit the transmission of position assistance requests to devices over decentralized network 8414, which are within a threshold number of hops (e.g., one hop, two hops, etc.) of terminal device 8306. When the threshold number of hops is, for example, one hop, terminal device 8306 may be configured to only transmit position assistance requests to devices over decentralized network 8414 in which a direct communication can be established. As a result of limiting the transmission of position assistance requests, utilization of network resources over decentralized network 8414 may be decreased, whereas the accuracy in estimating the position of terminal device 8306 may be increased. The threshold number of hops may be variable, and in at least one aspect based on (e.g., inversely proportional to) the amount of activity over decentralized network 8414.

A recipient of the position assistance request (e.g., terminal device 8304) may be configured perform a variety of actions based on the receipt of a position assistance request from terminal device 8306. In some aspects, the recipient of the position assistance request may be configured to perform one or more measurements. For example, the recipient of the position assistance request may be configured to measure and record a time-of-arrival (ToA), angle-of-arrival (AoA), and/or received signal strength indications (RSSI) for one or more signals from terminal device 8306. According to at least one aspect, the recipient of the position assistance request may be configured to perform one or more comparisons and/or computations, based on the one or more signals received from terminal device 8306 and/or measurements performed by recipient of the position assistance request. Additionally or alternatively, the recipient of the position assistance request may be configured to estimate its position using, for example, a satellite receiver (e.g., GNSS receiver or the like) included therein. Although not explicitly provided herein, the recipient of the position assistance request may be configured to perform one or more other actions (e.g., measurements, comparisons, and/or computations) in response to the position assistance request.

The position assistance response may be implemented in a variety of forms. In some aspects, a position assistance response may include one or more signals from the recipient (e.g., terminal device 8304) of the position assistance request. According to at least one aspect, the one or more signals of the position assistance response may include one or more measurements (e.g., ToA, AoA, and/or RSSI) performed by the recipient of the position assistance request, one or more timestamps respectively recorded, by the recipient of the position assistance request, at the time of transmission, one or more test signals, an estimated position of the recipient of the position assistance request (e.g., with or without an associated accuracy measurement) and/or an estimated position of terminal device 8306 (or adjustment thereto). Although not explicitly provided herein, the recipient of the position assistance request may be configured to generate and transmit other forms of position assistance responses to terminal device 8306.

In stages 8516, 8520, 8524 and 8528, terminal device 8306 may, in some aspects, be configured to receive a position assistance response from each of terminal devices 8302, 8304, 8308 and 8310, at discrete non-overlapping times. According to at least one aspect, terminal device 8306 may be configured to receive a position assistance response from two or more of terminal devices 8302, 8304, 8308 and 8310 concurrently or simultaneously over decentralized network 8414.

At stage 8530, terminal device 8306 may, in some aspects, be configured to estimate the position of terminal device 8306 in a variety of manners. According to least one aspect, terminal device 8306 may be configured to estimate the position of terminal device 8306 using, for example, a satellite receiver (e.g., GNSS receiver or the like) included in terminal device 8306, the position assistance response from terminal device 8304, the position assistance response from terminal device 8308, the position assistance response from terminal device 8310, and/or the position assistance response from terminal device 8302. For instance, terminal device 8306 may be configured to combine data (e.g., one or more measurements) from any or all of the aforementioned position assistance responses using an algorithm, such as an Extended Kalman Filter (EKF) among others. However, various alternatives exist to the EKF. The measurements may be combined in a tightly coupled method, taking benefit of the fact that a synchronized time base in the decentralized network 8414. Although several position estimation techniques are described herein, terminal device 8306 may, in some aspects, be configured to employ one or more other techniques not explicitly provided herein to estimate its position.

In some aspects, stage 8530 may be omitted. For example, terminal device 8306 may be configured to provide data from one or more of the position assistance responses received in stages 8516, 8520, 8524, and 8528 to the radio communication network 8300 for a network-side estimation of the position of terminal device 8306.

At stage 8532, terminal device 8306 may be configured to transmit a position response, either directly or indirectly, to terminal device 8302 over decentralized network 8414. In some aspects, terminal device 8306 may be configured to transmit the position response during a communication phase (e.g., stage 8106 of FIG. 81) with terminal device 8302 over communication link 8414a of decentralized network 8414. According to at least one aspect, terminal device 8306 may be configured to broadcast the position response, over decentralized network 8414, to one or more terminal devices (e.g., terminal device 8302) using one or more discovery resources (e.g., time slots and frequencies) and/or one or more other resources of decentralized network 8414. Although not explicitly provided herein, other forms of providing the position response to terminal device 8302 over decentralized network 8414 are possible.

The position response may be implemented in a variety of forms. In some aspects, a position assistance response may include data from the terminal device 8306. According to at least one aspect, the data of the position response may include one or more estimated positions of terminal device 8306 (e.g., with or without an associated accuracy measurement). The data of the position response may, in some aspects, include data from one or more of the position assistance responses received in stages 8516, 8520, 8524, and 8528. Although not explicitly provided herein, terminal device 8306 may be configured to generate and transmit other forms of position responses to terminal device.

At stage 8534, terminal device 8302 may be configured to transmit the position response from terminal device 8306, either directly or indirectly, to radio communication network 8300. For example, terminal device 8302 may be configured to transmit the position response to radio communication network 8306 via a radio access connection with network access node 7710. Although not explicitly provided herein, other forms of providing the position response to radio communication network 8300 are possible.

Upon receipt of the position response, one or more components of the radio communication network may be configured to process the emergency communication from terminal device 8306. In some aspects, one or more components of radio communication network 8300 may be configured to provide the emergency communication from terminal device 8300 to a server (e.g., server 9616 of FIG. 96, as further discussed below) of an emergency service provider. For instance, the server of the emergency service provider may be included in an emergency communication center, which dispatches local authorities in response to an event (e.g., an emergency event).

Figure 90:
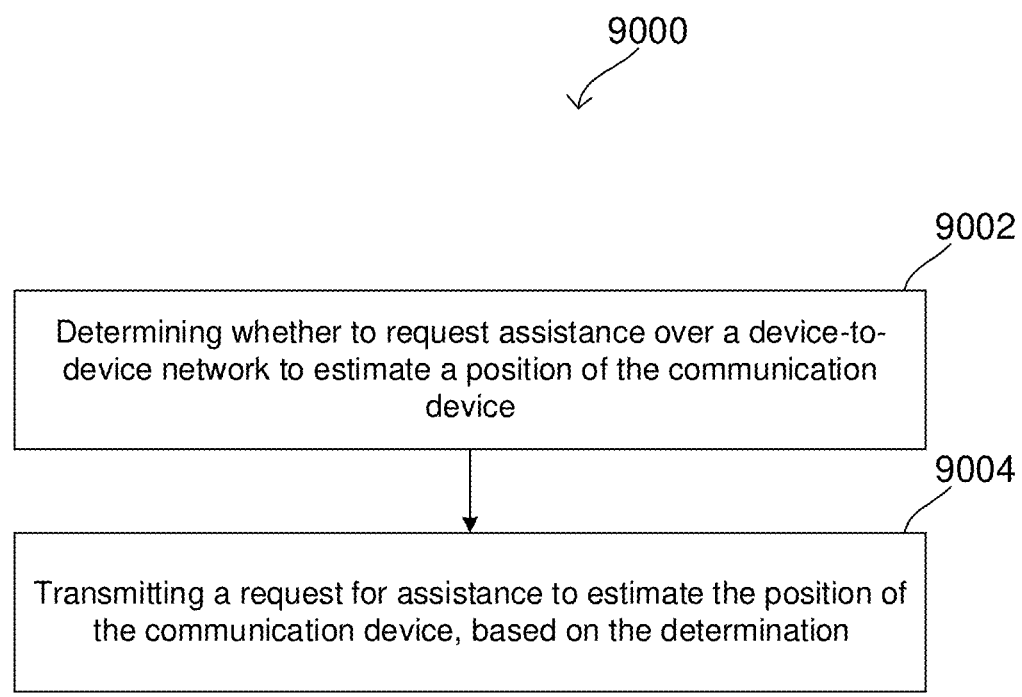
FIGS. 90 and 91 show exemplary methods for a communication device configured to operate on a radio communication network and a device-to-device network according to some aspects.

FIG. 90 shows an exemplary method 9000 for a communication device configured to operate on a radio communication network and a device-to-device network in accordance with some aspects. Method 9000 includes receiving an emergency communication over the device-to-device network in stage 9002, and determining whether to forward the emergency communication based on one or more components of the emergency communication in 9004.

Figure 91:
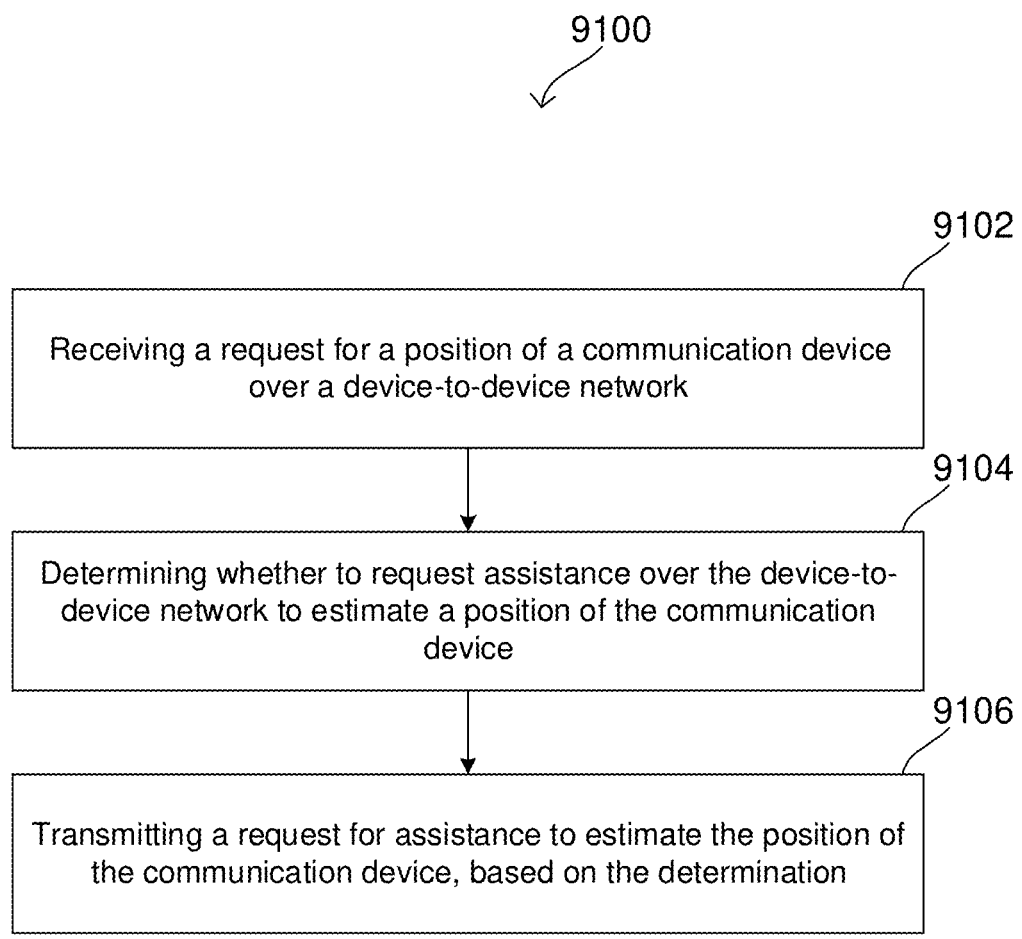

FIG. 91 shows an exemplary method 9100 for a communication device configured to operate on a radio communication network and a device-to-device network in accordance with some aspects. Method 9100 includes receiving an emergency communication over the device-to-device network in stage 9102, determining whether to forward the emergency communication based on one or more components of the emergency communication in 9104, and forwarding the emergency communication based on the determination in stage 9102.

In some aspects, a terminal device may be configured to transmit an emergency communication. The terminal device may, however, encounter various obstacles in transmitting the emergency communication. For example, a radio communication network may not be able to receive and/or process an emergency communication from a terminal device due to a variety of conditions. Further to this technical problem, information from an emergency communication may be vulnerable upon transmission.

Figure 92:
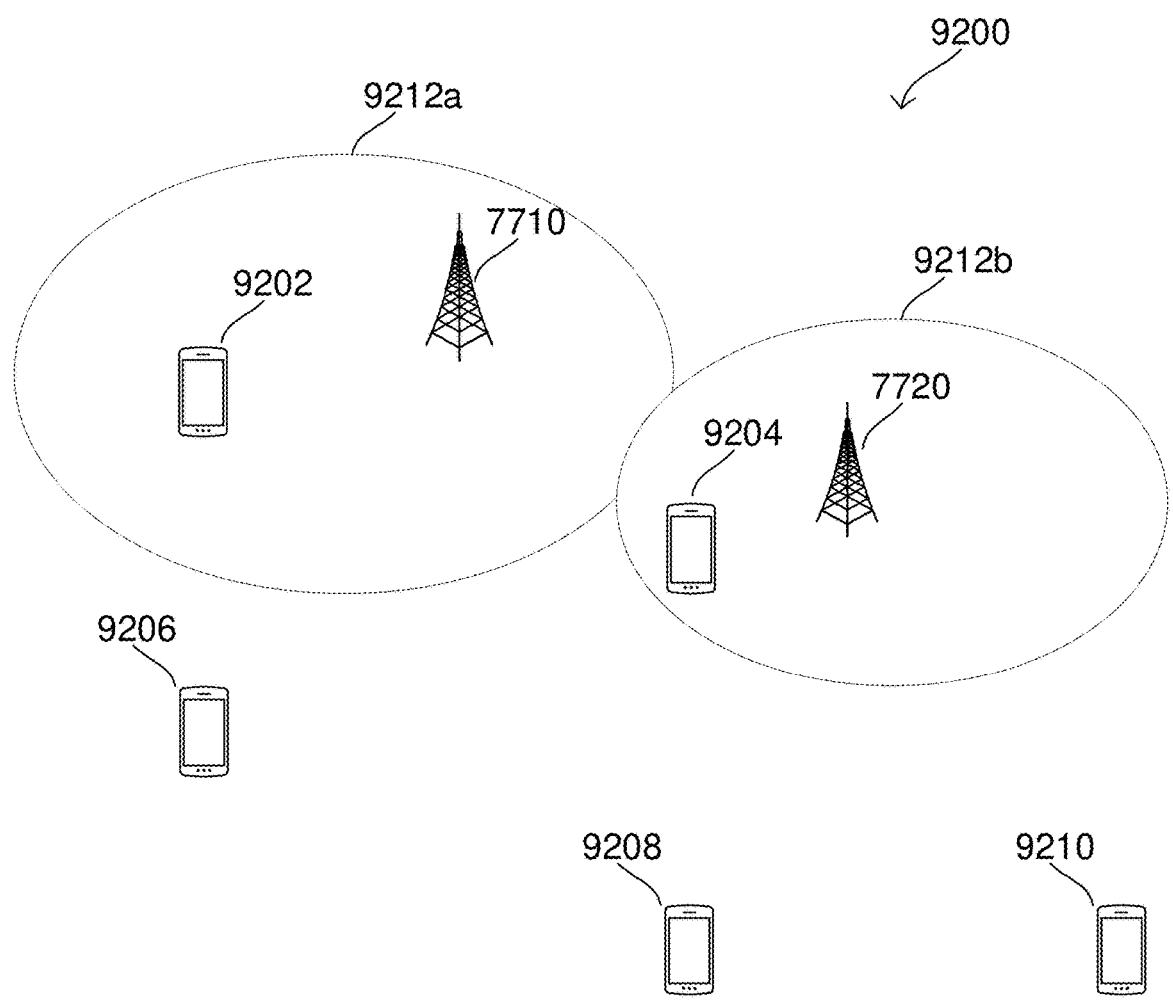
FIG. 92 shows an exemplary architecture for wireless communications according to some aspects.

FIG. 92 depicts a general network architecture for wireless communications. As shown in FIG. 92, radio communication network 9200 may include network access node 7710, network access node 7720, terminal device 9202, terminal device 9204, terminal device 9206, terminal device 9208, and terminal device 9210. In some aspects, one or more of terminal device 9202, terminal device 9204, terminal device 9206, terminal device 9208, and terminal device 9210 may be implemented as terminal device 7702 or any wireless device described herein. Although radio communication network 9200 may include network access node 7710, network access node 7720, terminal device 9202, terminal device 9204, terminal device 9206, terminal device 9208, and terminal device 9210 as illustrated in FIG. 92, some aspects may employ additional or fewer terminal devices, network access nodes and/or other elements.

As depicted in FIG. 92, terminal device 9202 is located within the communication range 9212a of network access node 7710, whereas terminal device 9204 is located within the communication range 9212b of network access node 7720. Terminal devices 9206-9210 are, however, located outside of the respective communication ranges 9212a and 9212b of network access nodes 7710 and 7720. Consequently, radio communication network 9200 may not be able to receive and/or process an emergency communication that is transmitted from one or more of terminal devices 9206-9210.

Various conditions may also prevent radio communication network 9200 from receiving and/or processing an emergency communication from a terminal device that is either within or outside of the communication range of the radio communication network 9200. For example, radio communication network 9200 may not be able to receive and/or process an emergency communication that is transmitted from terminal device 9202 even though terminal device 9202 is located within communication range 9212a of network access node 7710. These conditions may include one or more faults, errors, and/or failures within radio communication network 9200. The one or more faults, errors, and/or failures may be attributable to one or more specification mistakes (e.g., typographical errors in a document), implementation mistakes (e.g., design/manufacturing mistakes), external disturbances (e.g., environmental changes), and/or component defects (e.g., hardware and/or software defects).

Figure 93:
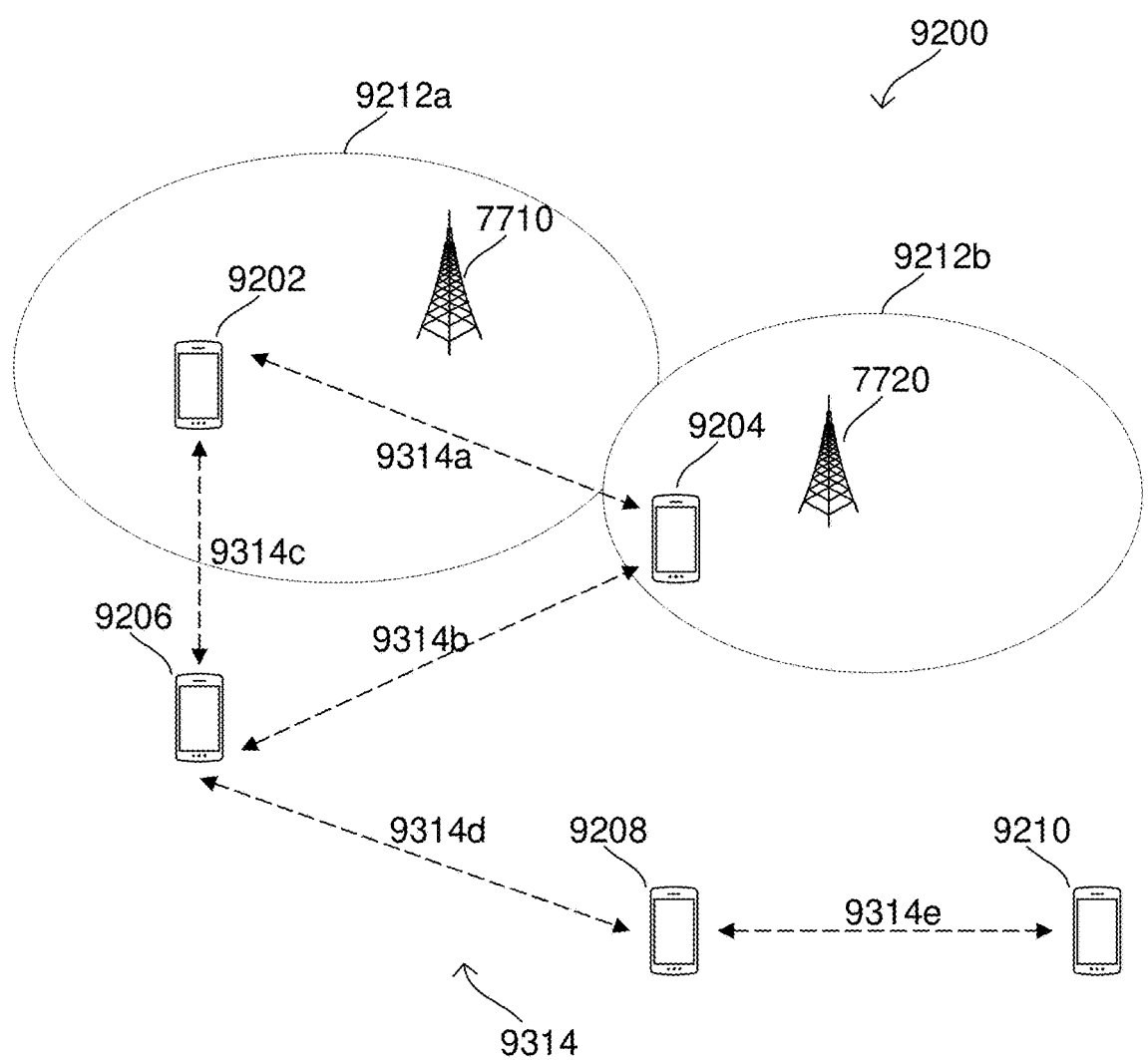
FIG. 93 shows another exemplary architecture for wireless communications according to some aspects.

FIG. 93 depicts a general network architecture for wireless communications. As shown in FIG. 93, terminal devices 9202-9210 may form a decentralized network 9314 and use D2D signaling (e.g., on D2D resources) to communicate with each other. As specified above, the term D2D refers to any type of direct signaling between terminal devices and is not limited to any particular radio communication technology. Although decentralized network 9314 may include terminal devices 9202-9210 as illustrated in FIG. 93, some aspects may employ additional or fewer terminal devices, and/or other elements.

Decentralized network 9314 may include one or more communication links 9314a-9314e between terminal devices 9202-9210. In some aspects, one or more of the communication links 9314a-9314e may be unidirectional. Additionally or alternatively, one or more of the communication links 9314a-9314e may bidirectional. Each of the communication links 9314a-9314e may, for example, represent a unicast communication link, a narrowcast communication link, a multicast communication link, a broadcast communication link, or any combination thereof. Although decentralized network 9314 may include communication links 9314a-9314e as illustrated in FIG. 93, some aspects may employ additional or fewer communication links. For example, each of the communication links 9314a-9314e illustrated in FIG. 93, may represent one or more of the aforementioned communication links and/or other communication link types not explicitly referenced herein.

Communication links 9314a-9314e may be established in a variety of manners. In some aspects, two or more of the communication links 9314a-9314e may be established according to a similar establishment protocol. For example, two or more of the communication links 9314a-9314e may be established according to the same protocol (e.g., the protocol described with respect to FIG. 8100). According to at least one aspect, two or more of the communication links 9314a-9314e may be established according to different establishment protocols. For example, two or more of the communication links 9314a-9314e may be established according to different establishment protocols.

Communication links 9314a-9314e may be implemented in a variety of manners. In some aspects, communication links 9314a-9314e may be similar in terms of radio communication technology. For example, two or more of the communication links 9314a-9314e may conform to the same radio communication technology. According to at least one aspect, two or more of the communication links 9314a-9314e may be different in terms of radio communication technology. For example, two or more of the communication links 9314a-9314e may conform to different radio communication technologies.

With continued reference to FIG. 93, terminal device 9206 may be configured to transmit an emergency communication via decentralized network 9314 when, for example, terminal device 9206 is located outside of the communication ranges 9212a and 9212b of network access nodes 7710 and 7720. In some aspects, terminal device 9206 may be configured to transmit an emergency communication through decentralized network 9314 before it reaches radio communication network 9200. For instance, terminal device 9206 may be configured to transmit an emergency communication over communication link 9314c to terminal device 9202. Upon receipt, terminal device 9202 may be configured to transmit the emergency communication to the radio communication network 9200 via network access node 7710.

In some aspects, terminal device 9202 may be configured to transmit an emergency communication via decentralized network 9314. For example, terminal device 9202 may be configured to transmit an emergency communication through decentralized network 9314 in the event radio communication network 9200 is unable to receive and/or process an emergency communication from terminal device 9202 directly. According to at least one aspect, terminal device 9202 may be configured to transmit an emergency communication over communication link 9314a to terminal device 9204. Upon receipt, terminal device 9204 may be configured to transmit the emergency communication to the radio communication network 9200 via network access node 7720.

In view of the foregoing examples, an emergency communication may be received at one or more intermediary devices before ultimately reaching its destination. As a result, information from emergency communications may be vulnerable to one or more entities (e.g., via a packet sniffer or malware) upon transmission. For instance, some information could be accessed by terminal device 9202 when it receives an emergency communication from terminal device 9206. Additionally or alternatively, some information could be accessed by terminal device 9204 when it receives an emergency communication from terminal device 9202.

Figure 94:
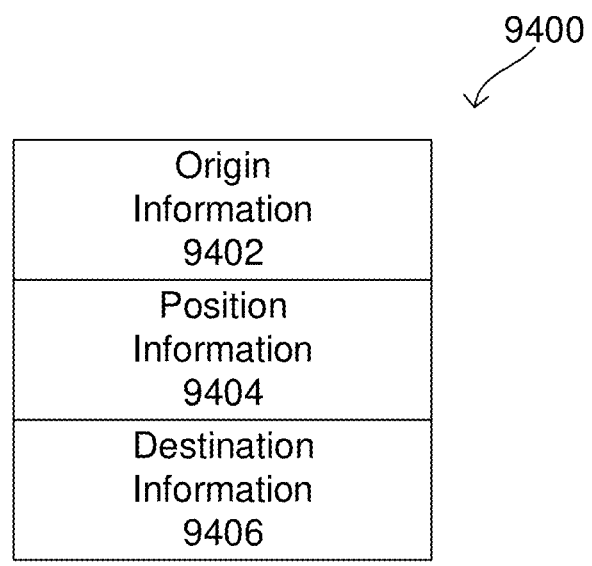
FIGS. 94 and 95 show an exemplary emergency communication according to some aspects.

An emergency communication may include various types of information, including origination information, position information, destination information, security information, timing information, intermediary information, and/or message information. FIG. 94 shows an exemplary emergency communication 9400 according to some aspects, which serves as an example of one possible emergency communication format. In some aspects, emergency communication 9400 may include origin information 9402, position information 9404, and/or destination information 9406. Although emergency communication 9400 may include origin information 9402, position information 9404, and destination information 9406 as illustrated in FIG. 94, some aspects may employ additional types of information, fewer types of information, and/or other types of information not explicitly referenced herein.

Origin information 9402 may, in some aspects, relate to an origin associated with the emergency communication 9400. According to at least one aspect, origin information 9402 may relate to an identification of one or more entities, an identification of one or more devices, and/or an identification of one or more communication sessions. For example, origination information 9402 may include data that represents one or more international mobile subscriber identities (IMSIs), one or more international mobile equipment identities (IMEIs), one or more globally unique temporary identifiers (GUTIs), one or more mobile subscriber directory numbers (MSISDNs), one or more usernames, one or more media access control (MAC) addresses, one or more uniform resource locators (URLs), one or more protocols to be used, one or more internet protocol (IP) addresses, and/or one or more group identifiers. Although several examples of origination information 9402 are described, some aspects may employ other types of origination information 9402 not explicitly referenced herein.

Position information 9404 may, in some aspects, relate to a position associated with the emergency communication 9400. According to at least one aspect, position information 9404 may relate to position information of one or more entities, position information of one or more devices, and/or position information of one or more events (e.g., emergency event). For instance, position information 9404 may include data that represents one or more geographic coordinates (e.g., latitude, longitude, and/or altitude), one or more points of interest (POIs) (e.g., landmarks), one or more street names, one or more address ranges, one or more zip codes, one or more cities, one or more counties, one or more states, one or more countries, and/or one or more other regions. Although several examples of position information 9404 are described, some aspects may employ other types of position information 9404 not explicitly referenced herein.

Destination information 9406 may, in some aspects, relate to a destination associated with the emergency communication 9400. According to at least one aspect, destination information 9406 may relate to an identification of one or more entities, an identification of one or more devices, and/or an identification of one or more communication sessions. For example, destination information 9406 may include data that represents one or more one or more IMEIs, one or more GUTIs, one or more mobile MSISDNs, one or more MAC addresses, one or more URLs, one or more protocols to be used, one or more port properties, one or more IP addresses, and/or one or more group identifiers. Although several examples of destination information 9406 are described, some aspects may employ other types of destination information 9406 not explicitly referenced herein.

With continued referenced to FIG. 94, a terminal device may be configured to generate emergency communication 9400. In some aspects, the terminal device may be configured to apply one or more security techniques to one or more components of the emergency communication 9400. According to at least one aspect, terminal device may be configured to scramble and/or encrypt one or more components of the emergency communication 9400. For example, the terminal device may be configured to encrypt the origin information 9402 and the position information 9404 with one or more keys (e.g., public key), while leaving destination information 9406 unencrypted. When one or more components of the emergency communication 9400 have a security technique applied thereto, the risk of unauthorized access to one or more components of the emergency communication 9400 may be mitigated.

Figure 95:
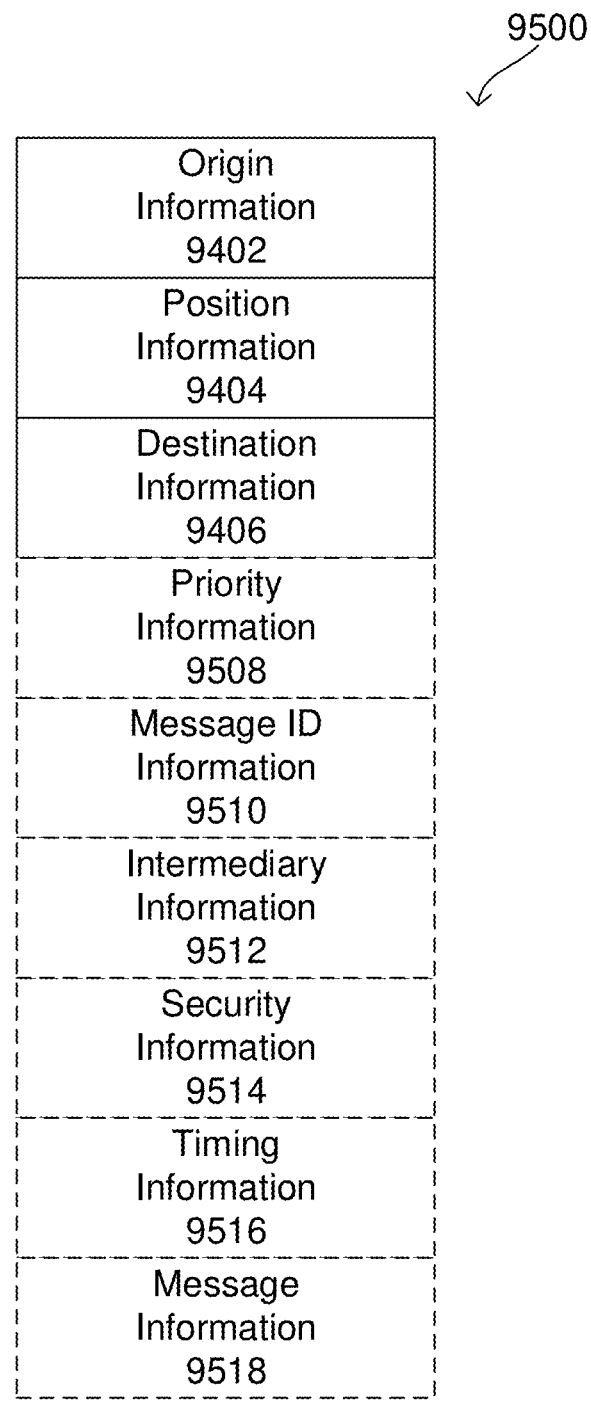

FIG. 95 shows exemplary emergency communication according to some aspects, which serves as an example of other possible emergency communication formats. A repetitive description of like reference characters employed in FIG. 94 is hereby omitted for sake of brevity. As shown in FIG. 95, emergency communication 9500 may include origin information 9402, position information 9404, destination information 9406, priority information 9508, message identification information 9510, intermediary information 9512, security information 9514, timing information 9516 and/or message information 9518. Although emergency communication 9500 may include origin information 9402, position information 9404, destination information 9406, priority information 9508, message identification information 9510, intermediary information 9512, security information 9514, timing information 9516 and/or message information 9518 as illustrated in FIG. 95, some aspects may employ other types of information not explicitly referenced herein.

Priority information 9508 may, in some aspects, relate to one or more priorities associated with the emergency communication 9500. According to at least one aspect, priority information 9508 may relate to one or more priorities of the emergency communication 9500, one or more priorities of an event (e.g., emergency event), and/or one or more priorities associated with an event. For example, priority information 9508 may include data that represents one or more alphabetic characters, one or more numeric values, one or more symbols, or any combination thereof. In some aspects, priority information may be implemented as one or more bits, one or more flags, one or more fields, and/or metadata. Although several examples of priority information 9508 are described, some aspects may employ other types of priority information 9508 not explicitly referenced herein.

Message identification information 9510 may, in some aspects, relate to one or more identifiers associated with the emergency communication 9500. According to at least one aspect, message identification information 9510 may relate to one or more identifiers of the emergency communication 9500, one or more identifiers about an event (e.g., emergency event), and/or or more identifiers about an entity (e.g., individual(s)) associated with an event. Message identification information 9510 may include data that represents an identifier of the emergency communication 9500, an identifier of an event, and/or an identifier of an entity associated with an event. Although several examples of message identification information 9510 are described, some aspects may employ other types of message information 9510 not explicitly referenced herein.

Intermediary information 9512 may, in some aspects, relate to one or more intermediaries associated with the emergency communication 9500. According to at least one aspect, intermediary information 9512 may relate to an identification of one or more entities, an identification of one or more devices (e.g., terminal devices), and/or an identification of one or more sessions. For example, intermediary information 9512 may include data that represents one or more IMSIs, one or more IMEIs, one or more GUTIs, one or more mobile MSISDNs, one or more MAC addresses, one or more URLs, one or more protocols to be used, one or more port properties, one or more IP addresses, one or more group identifiers, one or more message identifiers, and/or relay counter information. In some aspects, relay counter information may represent the number of times an emergency communication has been forwarded. Although several examples of intermediary information 9512 are described, some aspects may employ other types of intermediary information 9512 not explicitly referenced herein.

Security information 9514 may, in some aspects, relate to one or more security techniques associated with the emergency communication 9500. According to at least one aspect, security information 9514 may relate to one or more security techniques applied to the emergency communication 9500 and/or one or more protocols for authentication. For example, security information 9514 may include data that represents a digital certificate, a key derivation function, a public key, private key, symmetric key, authentication code, a password, key stretching information, a salt, a nonce, a pseudorandom number, and/or a watermark. Although several examples of security information 9514 are described, some aspects may employ other types of security information 9508 not explicitly referenced herein.

Timing information 9516 may, in some aspects, relate to one or more timings associated with the emergency communication 9500. According to at least one aspect, timing information 9516 may relate to one or more timings of the emergency communication 9500, one or more timings of an event (e.g., emergency event), and/or or more timings associated with an event. For example, timing information 9510 may include data that represents counter information, clock information, a day of the week, a year, a timestamp, transmission timing information, a duration, period information, frequency information and/or other pattern information. Although several examples of timing information 9516 are described, some aspects may employ other types of security information 9508 not explicitly referenced herein.

Message information 9516 may, in some aspects, relate to one or more messages associated with the emergency communication 9500. According to at least one aspect, message information 9516 may relate to one or more messages of the emergency communication 9500, one or more messages about an event (e.g., emergency event), and/or one or more messages about an entity (e.g., individual(s)) associated with an event. Message information 9516 may include data that represents one or more alphabetic characters, one or more numeric values, one or more symbols, audio information, image information, audiovisual information, video information, and/or biometric information. Although several examples of message information 9514 are described, some aspects may employ other types of message information 9514 not explicitly referenced herein.

With continued referenced to FIG. 95, a terminal device may be configured to generate emergency communication 9500. In some aspects, the terminal device may be configured to apply one or more security techniques to one or more components of the emergency communication 9500. According to at least one aspect, terminal device may be configured to scramble and/or encrypt one or more components of the emergency communication 9500. For example, the terminal device may be configured to encrypt the origin information 9402, position information 9404, priority information 9508, message identification information 9510, security information 9514, timing information 9516 and/or message information 9518 with one or more keys (e.g., public key), while leaving destination information 9406, priority information 9508, message identification information 9510, and intermediary information 9512 unencrypted. Alternatively, the terminal device may be configured to encrypt one or more components of the emergency communication 9500 with one or more keys (e.g., public key), while leaving destination information 9406 and one or more of priority information 9508, message identification information 9510, and intermediary information 9512 unencrypted. When one or more components of the emergency communication 9500 have a security technique applied thereto, the risk of unauthorized access to one or more components of the emergency communication 9500 may be mitigated.

Figure 96:
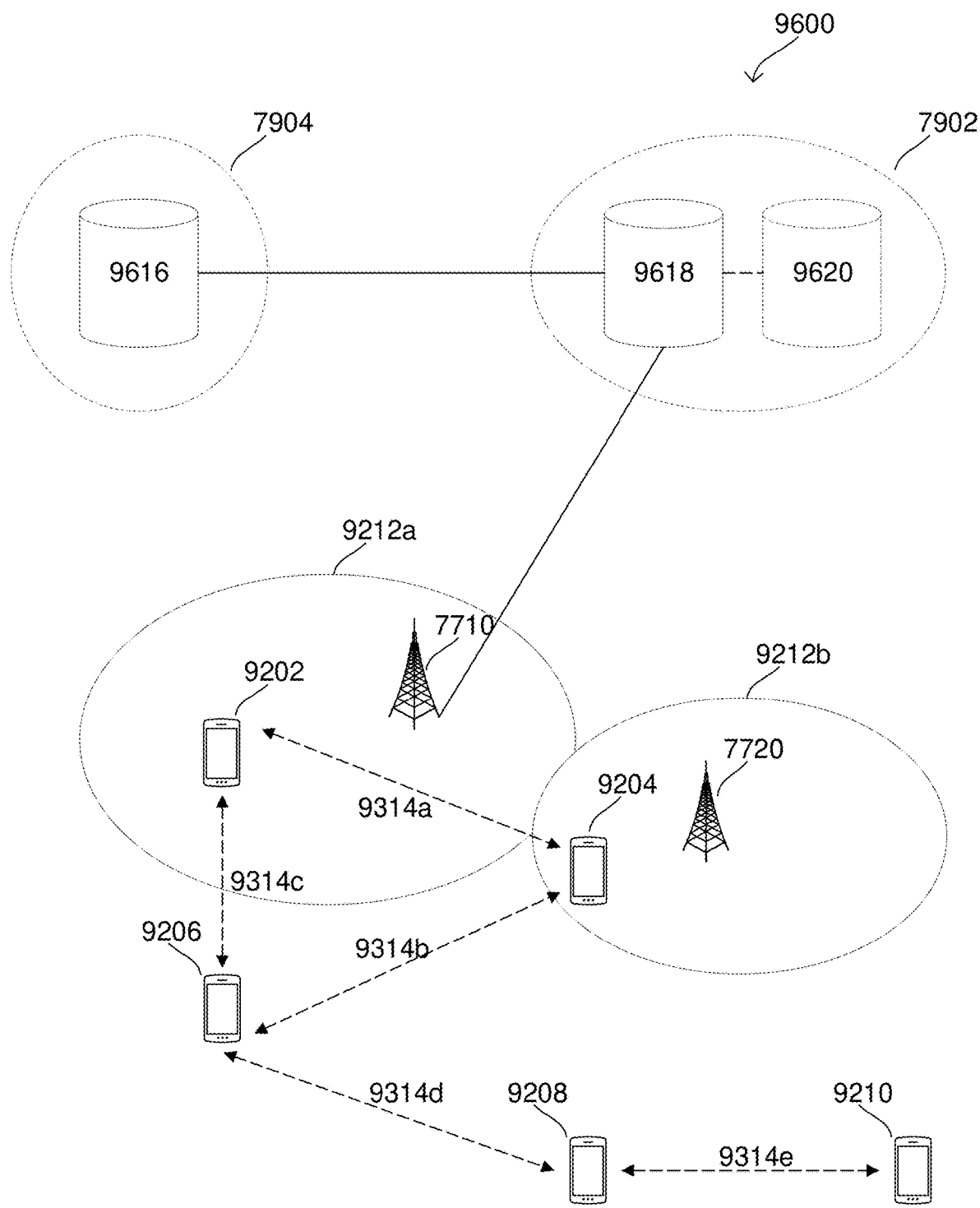
FIG. 96 shows an extended network architecture for emergency communications according to some aspects.

FIG. 96 depicts an extended network architecture for emergency communications. As shown in FIG. 96, an extended network architecture for emergency communication 9600 may include network access nodes 7710, network access node 7720, terminal device 9202, terminal device 9204, terminal device 9206, terminal device 9208, terminal device 9210, server 9616, server 9618, and server 9620. Although extended network architecture for emergency communication 9600 may include network access node 7710, network access node 7720, terminal device 9202, terminal device 9204, terminal device 9206, terminal device 9208, terminal device 9210, server 9616, server 9618, and server 9620 as illustrated in FIG. 96, some aspects may employ additional or fewer terminal devices, network access nodes, servers and/or other elements.

Server 9616 may be implemented in a variety of forms. In some aspects, server 9616 may be accessible through the data network 7904. According to at least one aspect, server 9616 may be implemented as a server of an emergency service provider. For instance, server 9616 may be included in an emergency communication center, which dispatches local authorities in response to an event (e.g., an emergency event).

Server 9618 may be implemented in a variety of forms. In some aspects, server 9618 may be included within core network 7902. According to at least one aspect, server 9618 may be configured to manage operation of radio communication network 9200, such as data routing, authenticating and managing users/subscribers, interfacing with external networks, and/or various other network control tasks. Server 9618 may, in some aspects, be implemented as a visitor location register (VLR). Server 9618 may be implemented as a home location register (HLR) or home subscriber server (HSS) in at least one aspect.

Server 9620 may be implemented in a variety of forms. In some aspects, server 9620 may be included within core network 7902. According to at least one aspect, server 9620 may be configured to manage operation of radio communication network 9200, such as data routing, authenticating and managing users/subscribers, interfacing with external networks, and/or various other network control tasks. Server 9620 may, in some aspects, be implemented as an HLR or HSS.

In some aspects, terminal device 9210 may, in some aspects, be configured to generate an emergency communication (e.g., emergency communication 9400, emergency communication 9500, among others) for transmission over decentralized network 9314. Prior to transmission over decentralized network 9314, terminal device 9210 may be configured to scramble and/or encrypt one or more components of the emergency communication. According to at least one aspect, a server (e.g., server 9618 or server 9620) may be configured to provide terminal device 9210 with a public key of the server and/or a private key (e.g., for signing a digital certificate) as a part of (or in conjunction with) an authentication procedure for a radio communication network (e.g., radio communication network 9200). As a result, terminal device 9210 may be configured to encrypt one or more components of the emergency communication with the public key of the server, while leaving destination information 9406 and, in some aspects, one or more other components of the emergency communication (e.g., priority information 9508, message identification information 9510, and/or intermediary information 9512) unencrypted. Encryption of the one or more components of the emergency communication may be made with or without user intervention.

With continued reference to FIG. 96, terminal device 9210 may be configured to transmit an emergency communication via decentralized network 9314 when, for example, terminal device 9210 is located outside of the communication ranges 9212a and 9212b of network access nodes 7710 and 7720. According to at least one aspect, terminal device 9210 may be configured to transmit an emergency communication through decentralized network 9314 and radio communication network 9200 before the emergency communication reaches server 9616. Terminal device 9210 may, in some aspects, be configured to transmit the emergency communication over decentralized network 9314 in one or more of the following manners. Terminal device 9210 may, for example, be configured to broadcast the emergency communication using one or more discovery resources (e.g., time slots and frequencies) of the decentralized network 9314 to one or more terminal devices (e.g., terminal device 9208). Additionally or alternatively, terminal device 9210 may be configured to transmit the emergency communication during a communication phase (e.g., stage 8106 of FIG. 81) with a terminal device (e.g., terminal device 9208) of the decentralized network 9314. Although not explicitly provided herein, other forms of providing the emergency communication to one or more terminal devices (e.g., terminal device 9208) over decentralized network 9314 are possible.

Figure 97:
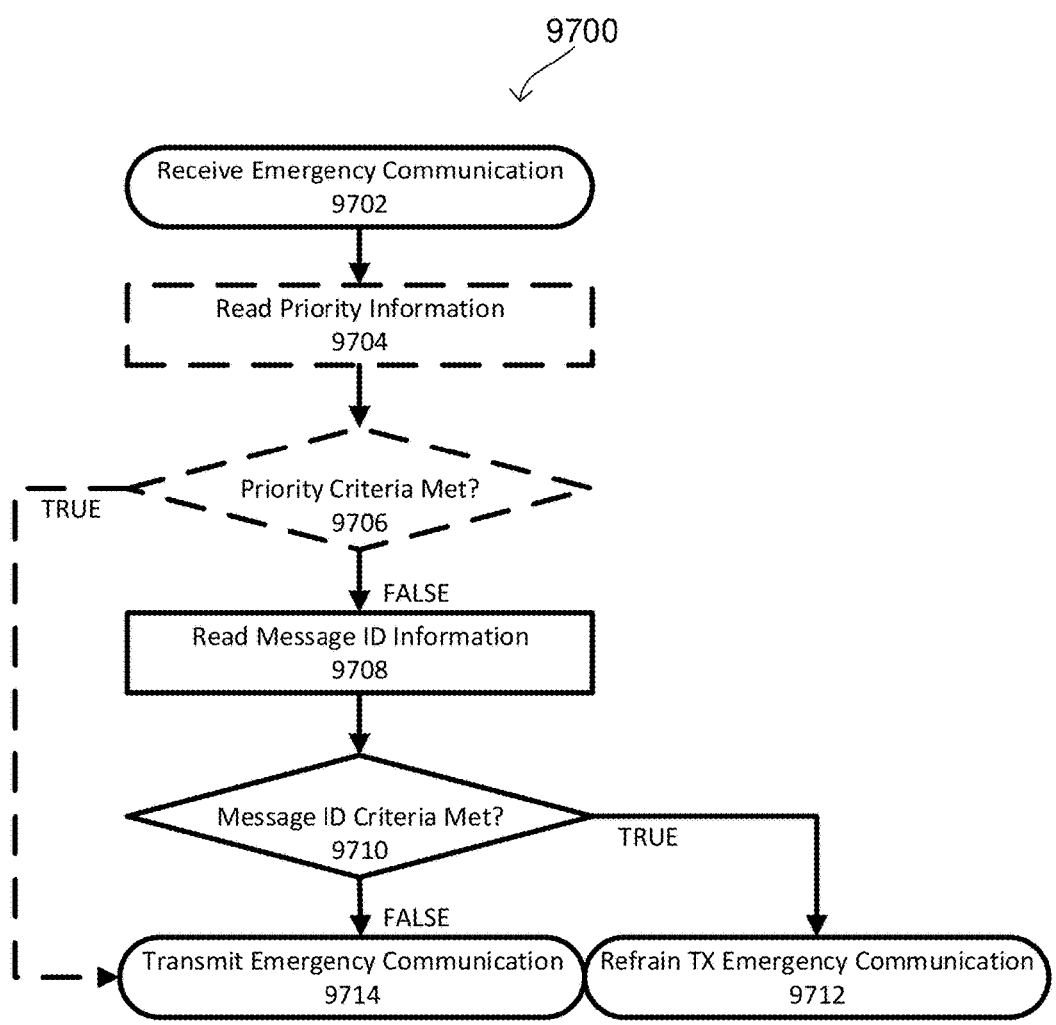
FIGS. 97-99 shows an exemplary emergency communication flow diagram according to some aspects.
Figure 98:
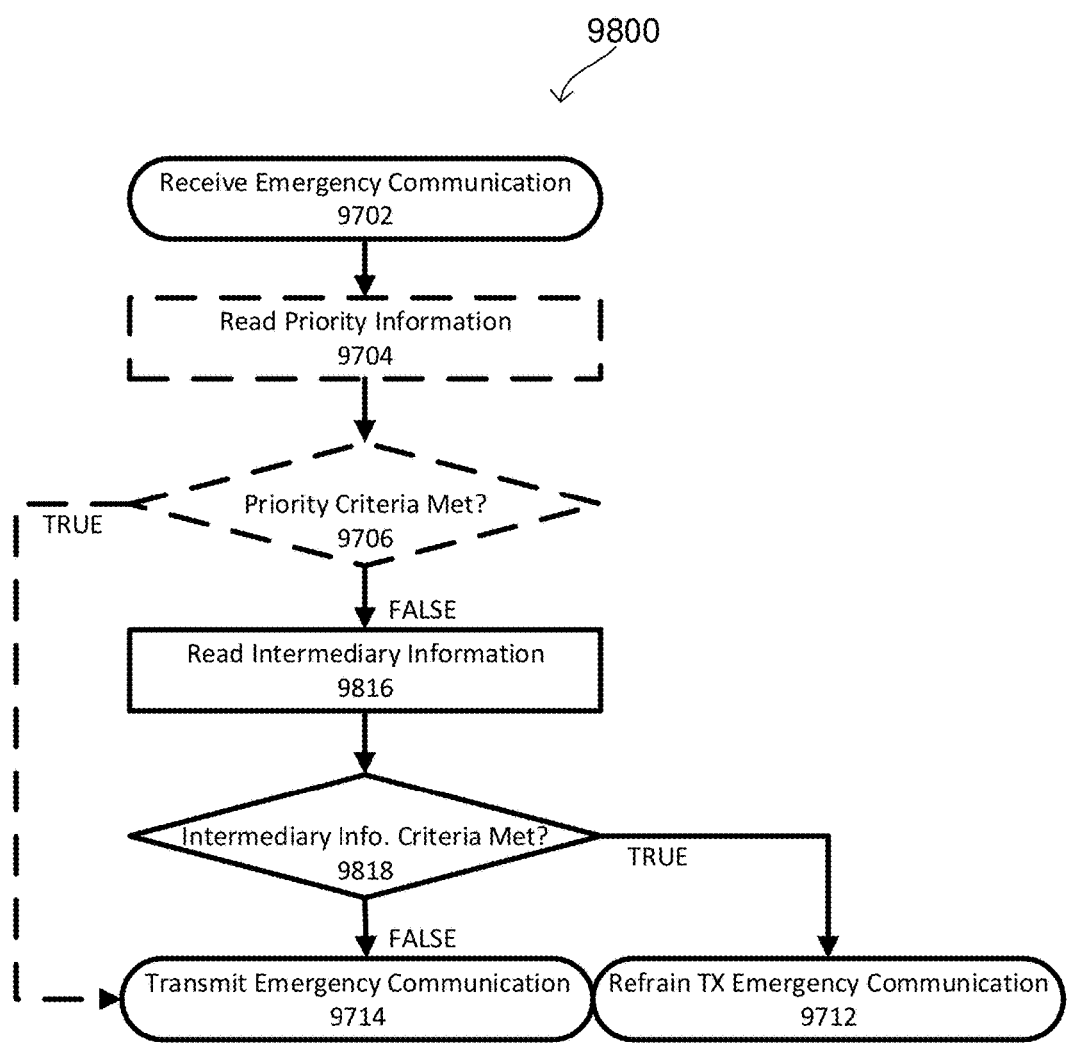
Figure 99:
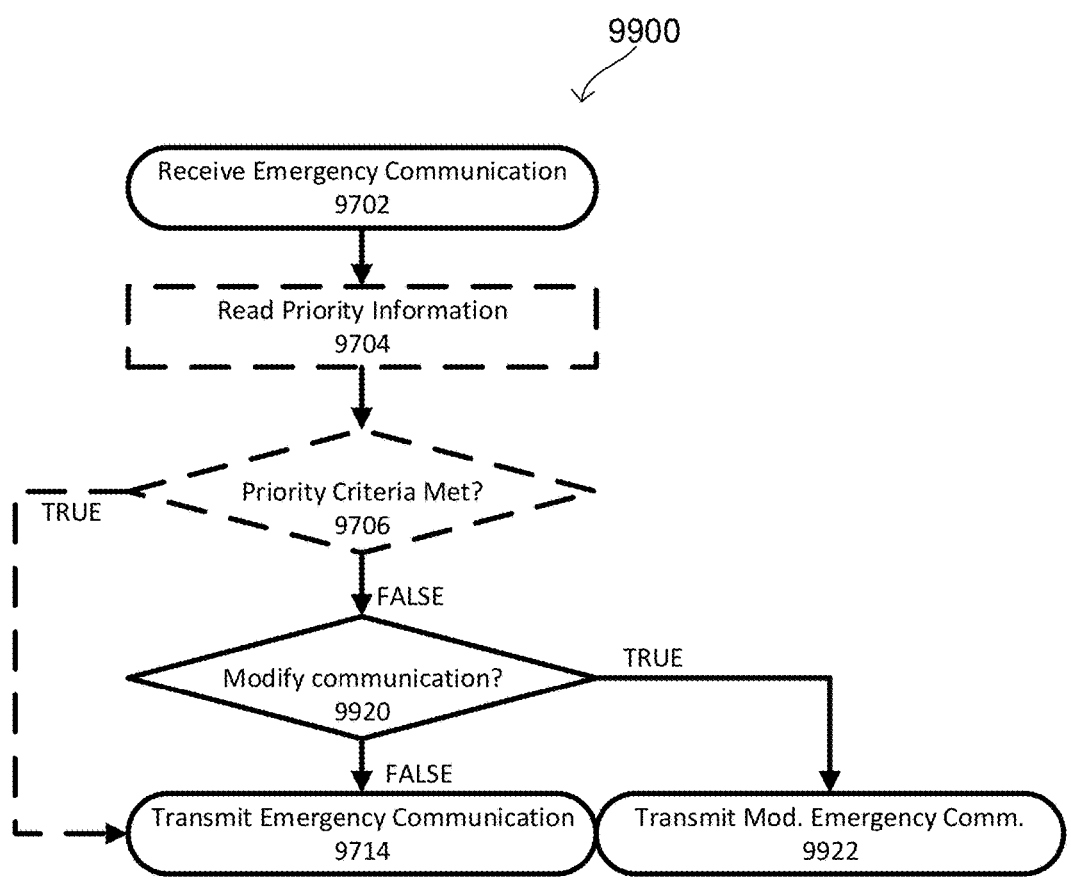

In some aspects, terminal device 9208 may be configured to receive the emergency communication from terminal device 9210. According to at least one aspect, terminal device 9208 may be configured to read one or more non-encrypted components of the emergency communication. For instance, terminal device 9208 may be configured to read destination information 9406 and, in some aspects, one or more other components of the emergency communication (e.g., the priority information 9508, message identification information 9510, and/or intermediary information 9512). As further described below, FIGS. 97-99 illustrate several examples of possible manners in which an emergency communication may be processed by a terminal device.

With continued reference to FIG. 96, terminal device 9208 may be configured to transmit the emergency communication via decentralized network 9314 when, for example, terminal device 9208 is located outside of the communication ranges 9212a and 9212b of network access nodes 7710 and 7720. Terminal device 9208 may, in some aspects, be configured to transmit the emergency communication over decentralized network 9314 in one or more of the following manners. Terminal device 9208 may, for example, be configured to broadcast the emergency communication using one or more discovery resources (e.g., time slots and frequencies) of the decentralized network 9314 to one or more terminal devices (e.g., terminal device 9206). Additionally or alternatively, terminal device 9208 may be configured to transmit the emergency communication during a communication phase (e.g., stage 8106 of FIG. 81) with a terminal device (e.g., terminal device 9206) of the decentralized network 9314. Although not explicitly provided herein, other forms of providing the emergency communication to terminal device 9206 over decentralized network 9314 are possible.

In some aspects, terminal device 9206 may be configured to transmit the emergency communication via decentralized network 9314 when, for example, terminal device 9206 is located outside of the communication ranges 9212a and 9212b of network access nodes 7710 and 7720. Terminal device 9206 may, in some aspects, be configured to transmit the emergency communication over decentralized network 9314 in one or more of the following manners. Terminal device 9206 may, for example, be configured to broadcast the emergency communication using one or more discovery resources (e.g., time slots and frequencies) of the decentralized network 9314 to one or more terminal devices (e.g., terminal device 9202 and/or terminal device 9204). Additionally or alternatively, terminal device 9206 may be configured to transmit the emergency communication during a communication phase (e.g., stage 8106 of FIG. 81) with a terminal device (e.g., terminal device 9202) of the decentralized network 9314. Although not explicitly provided herein, other forms of providing the emergency communication to terminal device 9202 and/or terminal device 9204 over decentralized network 9314 are possible.

With continued reference to FIG. 96, a terminal device (e.g., terminal device 9202) may be configured to transmit the emergency communication via radio communication network 9200 when, for example, the terminal device (e.g., terminal device 9202) is located within one or more of the communication ranges 9212a and 9212b of network access nodes 7710 and 7720. One or more components of radio communication network 9200 may be configured to transmit the emergency communication to server 9618.

In some aspects, server 9618 may be implemented as an authentication server (e.g., HLR, HSS, among others) for terminal device 9210. According to at least one aspect, server 9618 may be configured to decrypt and/or descramble the emergency communication. For example, server 9618 may be configured to decrypt the emergency communication (e.g., via its private key, which corresponds to the public key provided as a part of (or in conjunction with) an authentication procedure of a radio communication network) and transmit an unencrypted version of the emergency communication to server 9616.

With continued reference to FIG. 96, server 9618 may be implemented as the VLR for terminal device 9210, whereas server 9620 may be implemented as the HLR or HSS for terminal device 9210. According to at least one aspect, server 9618 may be configured to transmit the emergency communication to server 9620 for decryption and/or descrambling of the emergency communication. Server 9620 may, in some aspects, be configured to decrypt the emergency communication (e.g., via its private key, which corresponds to the public key provided as a part of (or in conjunction with) an authentication procedure of a radio communication network) and transmit the unencrypted emergency communication to server 9616, with or without (not illustrated) being received at server 9618.

In some aspects, server 9616 may be configured to dispatch one or more emergency services based on receipt of the emergency communication. According to at least one aspect, server 9616 may be configured to transit a confirmation message to terminal device 9210. The confirmation message may, in some aspects, be transmitted to terminal device 9210, with or without (not illustrated) being received at server 9618.

FIG. 97 shows an exemplary emergency communication flow diagram 9700 according to some aspects, which serves as an example of one possible manner in which an emergency communication may be processed by a terminal device. A terminal device (e.g., terminal device 9208) may be configured to receive an emergency communication from another terminal device (e.g., terminal device 9210) at stage 9702. At stage 9704, the terminal device may be further configured to read one or more non-encrypted portions of the emergency communication. For example, the terminal device may be configured to read priority information 9508 and store it within memory (e.g., memory 7814).

At stage 9706, the terminal device may be further configured to determine whether the priority information 9508 satisfies a priority criteria. In some aspects, the terminal device may be configured to determine whether the priority information 9508 satisfies a priority criteria based on a comparison between priority information 9508 and a threshold priority (e.g., a predetermined threshold priority). For example, the terminal device may be configured to determine the priority information satisfies the priority criteria when priority information is greater than or equal to the threshold priority. According to at least one aspect, the terminal device may be configured to determine whether the priority information 9508 satisfies a priority criteria based on whether the priority information 9508 is present (e.g., priority flag enabled). If priority information 9508 satisfies the priority criteria, then the terminal device may be configured to proceed to stage 9714. If, however, priority information 9508 does not satisfy the priority criteria, then the terminal device may be configured to proceed to stage 9708.

At stage 9708, the terminal device may be further configured to read one or more non-encrypted portions of the emergency communication. For example, the terminal device may be configured to read message identification information 9510 and store it within memory (e.g., memory 7814). Additionally or alternatively, the terminal device may be configured to store a timestamp associated with the reception of the message identification information 9510. At stage 9710, the terminal device may be further configured to determine whether the message identification information 9510 satisfies a message identification criteria. In some aspects, the terminal device may be configured to determine whether the message identification information 9510 satisfies a message identification criteria, based on a timing of the message identification information 9510. According to at least one aspect, the terminal device may be configured to determine whether message identification information 9516 has previously been received within a threshold timing (e.g., a predetermined threshold duration). For instance, the terminal device may be configured to determine whether the timestamp associated with the reception of the message identification information 9510 falls within the predetermined threshold duration (e.g., N–X minutes; where, for instance, N is the present time) using a look-up table. If the message identification information 9510 satisfies the message identification criteria, then the terminal device may refrain from forwarding the emergency communication in stage 9712 to conserve network resources and/or mitigate network flooding. If, however, the message identification information 9510 does not satisfy the message identification criteria, then the terminal device may be configured to proceed to stage 9714.

At stage 9714, the terminal device (e.g., terminal device 9208) may be further configured to transmit the emergency communication to one or more other terminal devices (e.g., terminal device 9206). In some aspects, the terminal device may be configured to select one or more terminal devices to which the emergency communication is to be sent, based on destination information 9406. According to at least one aspect, the terminal device may be further configured broadcast the emergency communication to one or more terminal devices.

FIG. 98 shows an exemplary emergency communication flow diagram 9800 according to some aspects, which serves as an example of one possible manner in which an emergency communication may be processed by a terminal device. A repetitive description of like reference characters employed in FIG. 97 is hereby omitted for sake of brevity.

At stage 9706, the terminal device may be further configured to determine whether the priority information 9508 satisfies a priority criteria. If priority information 9508 does not satisfy the priority criteria in stage 9706, then the terminal device may be configured to proceed to stage 9816.

At stage 9816, the terminal device may be further configured to read one or more non-encrypted portions of the emergency communication. For example, the terminal device may be configured to read intermediary information 9512 and store it within memory (e.g., memory 7814). At stage 9818, the terminal device may be further configured to determine whether the intermediary information 9512 satisfies an intermediary information criteria based on a comparison between intermediary information 9512 (e.g., relay counter information) and an intermediary information threshold (e.g., a predetermined relay threshold). For example, the terminal device may be configured to determine the intermediary information 9512 satisfies the intermediary information threshold when the relay counter information is greater than or equal to the predetermined relay threshold. If the intermediary information 9516 does not satisfy the intermediary information criteria, then the terminal device may be further configured to refrain from forwarding the emergency communication in stage 9712 to conserve network resources and/or mitigate network flooding. If, however, the intermediary information 9516 satisfies the intermediary information criteria, then the terminal device may be configured to proceed to stage 9714.

FIG. 99 shows an exemplary emergency communication flow diagram 9900 according to some aspects, which serves as an example of one possible manner in which an emergency communication may be processed by a terminal device. As previously noted, a repetitive description of like reference characters employed in FIG. 97 is hereby omitted for sake of brevity.

At stage 9706, the terminal device may be further configured to determine whether the priority information 9508 satisfies a priority criteria. If priority information 9508 does not satisfy the priority criteria in stage 9706, then the terminal device may be configured to proceed to stage 9920.

At stage 9920, the terminal device may be further configured to determine whether the terminal device is to modify information to the emergency communication. In some aspects, the terminal device may determine whether the terminal device is to modify the emergency communication based on an input (e.g., user input, a user profile stored in the terminal device, a position (e.g., GNSS position or the like) of the terminal device, an Internet of Things (IoT) biometric measurement, among others) to the terminal device.

If it is determined that the terminal device does not modify information to the emergency communication, then the terminal device may be configured to proceed to stage 9714. If, however, it is determined that the terminal is to modify the emergency communication, then the terminal device may be configured to proceed to stage 9922. At stage 9922, the terminal device may be configured to add information to one or more non-encrypted components of the emergency communication, remove information from one or more non-encrypted components of the emergency communication, edit information from one or more non-encrypted components of the emergency communication, and/or concatenate another emergency communication to the emergency communication. In some aspects, the terminal device may, in some aspects, be configured to add position information 9404 of the terminal device within the emergency communication. According to at least one aspect, the terminal device may be configured to edit intermediary information 9510. For example, terminal device may be configured to edit (e.g., increment) relay counter information prior to transmission. The terminal device may, in some aspects, be configured to generate an emergency communication (e.g., emergency communication 9400, emergency communication 9500) and concatenate it to the emergency communication received in stage 9702.

Figure 100:
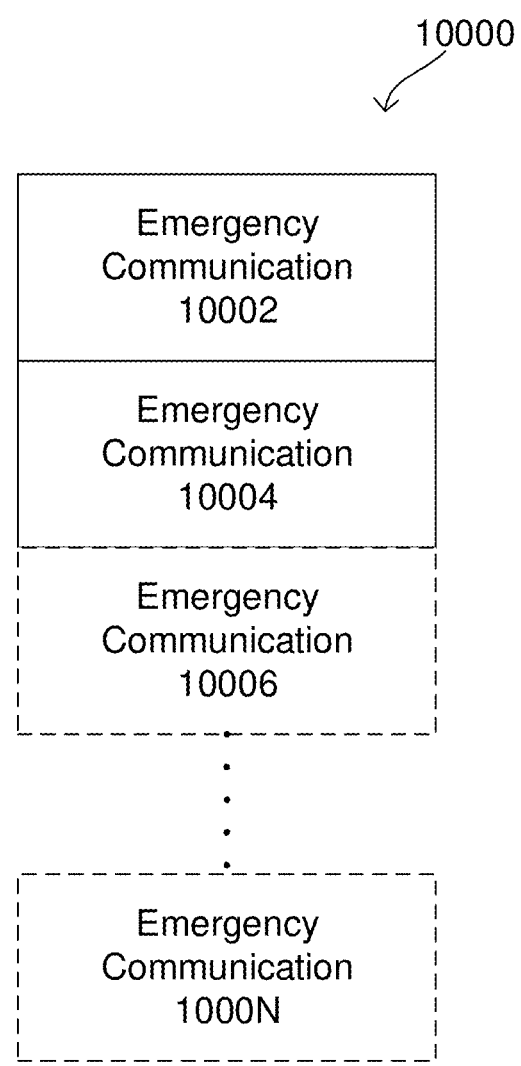
FIG. 100 shows an exemplary concatenated emergency communication according to some aspects.

FIG. 100 shows exemplary concatenated emergency communication according to some aspects, which serves as an example of a possible concatenated emergency communication format. As shown in FIG. 100, concatenated emergency communication 10000 may include emergency communication 10002, emergency communication 10004, emergency communication 10006, and/or emergency communication 10000N. Although concatenated emergency communication 10000 may include emergency communication 10002, emergency communication 10004, emergency communication 10006, and/or emergency communication 10000N as illustrated in FIG. 100, some aspects may employ other types of information not explicitly referenced herein.

In some aspects, concatenated emergency communication 10000 may include a variety of emergency communication formats. According to at least one aspect, concatenated emergency communication 10000 may include two or more emergency communications having the same format (e.g., emergency communication 9400). Concatenated emergency communication 10000 may, in some aspects, include two or more emergency communications having a different format (e.g., emergency communication 9400 in conjunction with emergency communication 9500).

Figure 101:
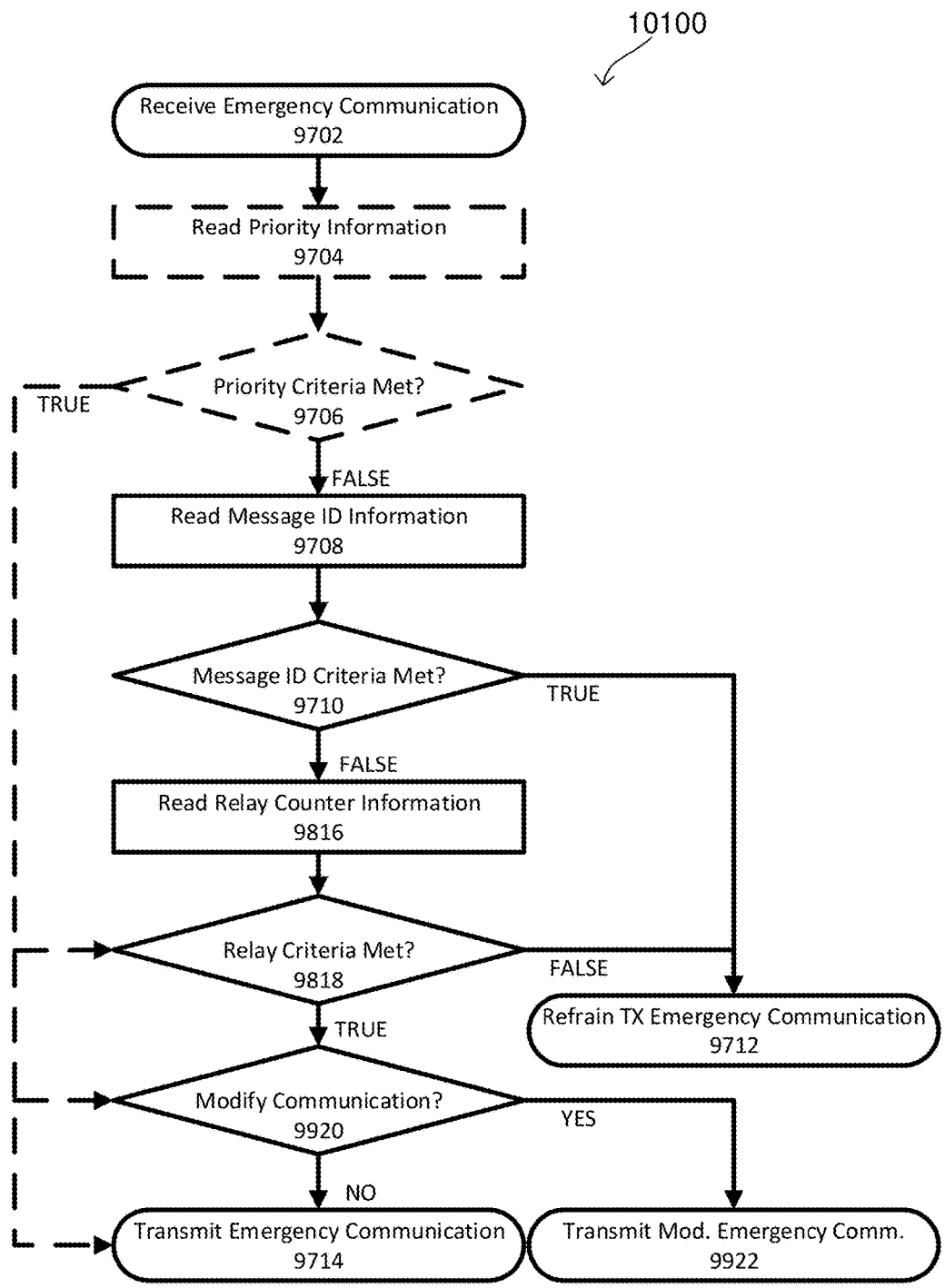
FIG. 101 shows an exemplary emergency communication flow diagram according to some aspects.

FIG. 101 shows an exemplary emergency communication flow diagram 9900 according to some aspects, which serves as an example of one possible manner in which an emergency communication may be processed by a terminal device. A repetitive description of like reference characters employed in FIGS. 97-100 is hereby omitted for sake of brevity.

At stage 9706, the terminal device may be further configured to determine whether the priority information 9508 satisfies a priority criteria. If priority information 9508 satisfies the priority criteria, then the terminal device may be configured to proceed to one of the following stage 9818, stage 9920 or stage 9714 depending upon the objectives of the implementation.

At stage 9710, the terminal device may be further configured to determine whether the message identification information 9510 satisfies a message identification criteria. If the message identification information 9510 does not satisfy the message identification criteria, then the terminal device may be configured to proceed to stage 9816.

At stage 9818, the terminal device may be further configured to determine whether the intermediary information 9512 satisfies an intermediary information criteria based on a comparison between intermediary information 9512 and an intermediary information threshold. If the intermediary information 9516 does not satisfy the intermediary information criteria, then the terminal device may be configured to proceed to stage 9920.

Figure 102:
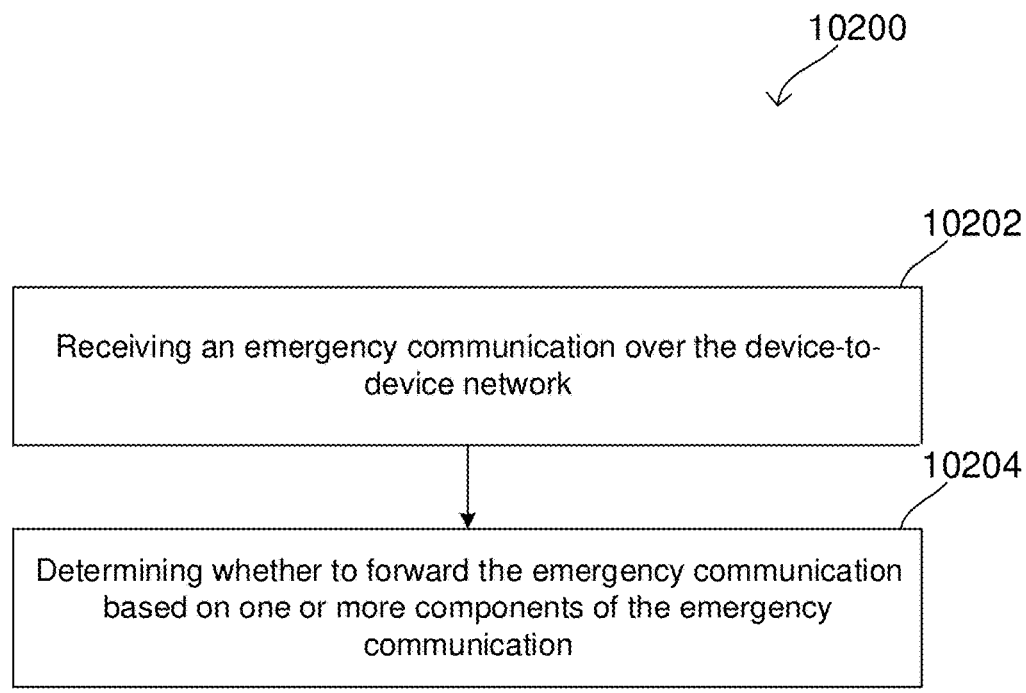
FIGS. 102 and 103 show exemplary methods for a communication device configured to operate on a radio communication network and a device-to-device network according to some aspects.

FIG. 102 shows an exemplary method 10200 for a communication device configured to operate on a radio communication network and a device-to-device network in accordance with some aspects. Method 10200 includes receiving an emergency communication over the device-to-device network in stage 10202, and determining whether to forward the emergency communication based on one or more components of the emergency communication in 10204.

Figure 103:
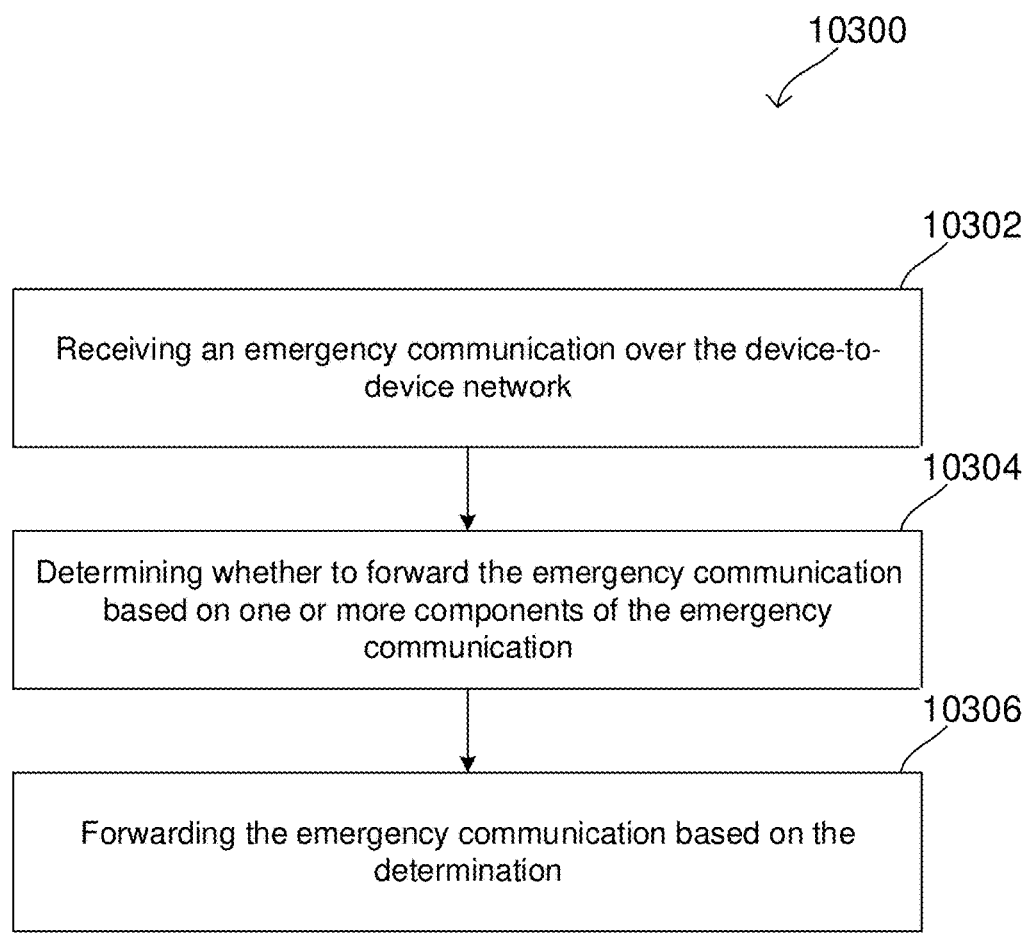

FIG. 103 shows an exemplary method 10300 for a communication device configured to operate on a radio communication network and a device-to-device network in accordance with some aspects. Method 10300 includes receiving an emergency communication over the device-to-device network in stage 10302, determining whether to forward the emergency communication based on one or more components of the emergency communication in 10304, and forwarding the emergency communication based on the determination in stage 10302.

The exemplary embodiments of the present disclosure may be realized by a terminal device performing the methods or similar methods described herein. For example, a terminal may include one or more processors configured to execute instructions (e.g., computer/hardware instructions) stored on suitable non-transitory computer readable media of the terminal. Thus processor(s) of the terminal device can execute the instructions, which to cause the UE to implement the methods or variations of the methods discussed herein.

While the above descriptions used various exemplary use cases, the use of these specific examples serve to enhance the clarity of the description and do not limit the applicability or scope of the techniques described herein. While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a wireless device comprising a transceiver comprising an antenna arrangement with at least two antennas; a communication processor configured to control communications of the wireless device with at least one further wireless device included in a network of wireless devices based on data relating to mutual connections between wireless devices included in the network; a beamforming controller configured to control a configuration of the at least two antennas to steer at least one beam for transmission of data based on beamforming information.

In Example 2, the subject matter of Example 1 can optionally include wherein the beamforming information comprises position information of the at least one further wireless device.

In Example 3, the subject matter of any one of Examples 1 or 2 can optionally include wherein the beamforming controller is configured to control the configuration of the at least two antennas to steer the at least one beam towards the at least one further wireless device.

In Example 4, the subject matter of any one of Examples 1 to 3 can optionally include wherein the beamforming controller is configured to control the configuration of the at least two antennas to suppress interference in a direction different from a direction in which the wireless device receives data from the at least one further wireless device.

In Example 5, the subject matter of any one of Examples 1 to 4 can optionally include wherein the data is payload data.

In Example 6, the subject matter of any one of Examples 2 to 5 can optionally include wherein the position information is an absolute position of the at least one further wireless device comprised by the beamforming information, and wherein the transceiver is configured to receive the beamforming information from the at least one further wireless device.

In Example 7, the subject matter of any one of Examples 2 to 5 can optionally include wherein the position information is a relative position obtained by the wireless device based on at least one measurement of a signal received from the at least one further wireless device.

In Example 8, the subject matter of any one of Examples 1 to 7 can optionally include wherein the beamforming information comprises beamforming capability information of the at least one further wireless device.

In Example 9, the subject matter of Example 8 can optionally include wherein the beamforming capability information comprises information indicating a maximum number of beams the at least one further wireless device can simultaneously form for data transmission.

In Example 10, the subject matter of any one of Examples 8 or 9 can optionally include wherein the beamforming capability information comprises information indicating a range of possible directions in which the at least one further wireless device can form at least one beam for data transmission.

In Example 11, the subject matter of any one of Examples 8 to 10 can optionally include wherein the beamforming capability information comprises information indicating a capability of the at least one further wireless device for data transmission according to unicast and/or multicast data transmission.

In Example 12, the subject matter of any one of Examples 1 to 11 can optionally include wherein the beamforming information comprises information indicative of a relative distance between the wireless device and at least two further wireless devices, and wherein the beamforming controller is configured to control the configuration of the at least two antennas to adjust an opening angle of the at least one beam for transmission of data to the at least two further wireless devices based on the relative distance.

In Example 13, the subject matter of Example 12 can optionally include wherein the beamforming controller is configured to control the configuration of the at least two antennas to increase the opening angle for a shorter relative distance and to decrease the opening angle for a larger relative distance.

In Example 14, the subject matter of any one of Examples 12 or 13 can optionally include wherein the beamforming controller is configured to control the configuration of the at least two antennas to steer a respective beam for transmission of data to a corresponding one of the at least two further wireless devices, respectively, if the relative distance to at least one of the at least two further wireless devices is below a predefined threshold.

In Example 15, the subject matter of any one of Examples 12 to 14 can optionally include wherein the beamforming controller is configured to control the configuration of the at least two antennas by weighting signals received by each respective one of the at least two antennas and/or by weighting signals transmitted by each respective one of the at least two antennas.

In Example 16, the subject matter of any one of Examples 1 to 15 can optionally include wherein the beamforming controller is configured to control the configuration of the at least two antennas to adjust a transmission power for data transmission based on the beamforming information.

In Example 17, the subject matter of any one of Examples 1 to 16 can optionally include wherein the transceiver is configured to receive beamforming information from at least two wireless devices included in the network of wireless devices; wherein the beamforming controller is configured to group the at least two wireless devices into a first group based on the beamforming information, and wherein the beamforming controller is configured to control the configuration of the at least two antennas to transmit data to each of the at least two wireless devices with a single beam.

In Example 18, the subject matter of Example 17 can optionally include wherein the beamforming information includes absolute positions of each of the at least two wireless devices, and wherein the beamforming controller is configured to determine a relative distance between the two wireless devices based on the absolute positions and to group the at least two wireless devices if the relative distance is below a predefined threshold.

In Example 19, the subject matter of any one of Examples 17 or 18 can optionally include wherein the beamforming controller is configured to group at least two further wireless devices included in the network of wireless devices into at least one further group, wherein the communication processor is configured to control the transceiver to multiplex data transmissions to each of the first group and the at least one further group in the time domain.

In Example 20, the subject matter of any one of Examples 17 to 19 can optionally include wherein the communication processor is configured to control the transceiver to multiplex data transmissions to each wireless device included in one group of wireless devices in the frequency domain.

In Example 21, the subject matter of any one of Examples 1 to 20 can optionally include wherein the beamforming information comprises information indicating an application type to which data to be received or transmitted via the transceiver corresponds.

In Example 22, the subject matter of any one of Examples 1 to 21 can optionally include wherein the beamforming information comprises information indicating a data rate at which data is to be received or transmitted via the transceiver.

In Example 23, the subject matter of any one of Examples 1 to 22 can optionally include wherein the transceiver is configured to receive the beamforming information from the at least one further wireless device.

In Example 24, the subject matter of any one of Examples 1 to 23 can optionally include wherein the transceiver is configured to transmit beamforming information comprising an absolute position of the wireless device to the at least one further wireless device.

In Example 25, the subject matter of any one of Examples 1 to 24 can optionally include wherein the wireless device is configured to obtain the absolute position of the wireless device from a satellite based positioning system.

In Example 26, the subject matter of any one of Examples 1 to 25 can optionally include wherein the transceiver is configured to receive the beamforming information from the at least one further wireless device via a direct device-to-device (D2D) communication link.

In Example 27, the subject matter of any one of Examples 1 to 26 can optionally include wherein the communication processor is configured to control device-to-device (D2D) communications between the wireless device and the at least one further wireless device, and wherein the network of wireless devices is a D2D mesh network.

In Example 28, the subject matter of any one of Examples 1 to 27 can optionally include wherein the transceiver is configured to receive the beamforming information in a first frequency band, and wherein the transceiver is configured to transmit and/or receive payload data in at least one further frequency band different from the first frequency band.

In Example 29, the subject matter of Example 28 can optionally include wherein the transceiver is configured to transmit beamforming information relating to the wireless device to the at least one further wireless device in the first frequency band.

In Example 30, the subject matter of any one of Examples 28 or 29 can optionally include wherein the first frequency band is a band of lower frequencies as the at least one further frequency band.

In Example 31, the subject matter of any one of Examples 28 to 30 can optionally include wherein the first frequency band comprises a frequency range of 790-960 MHz, a frequency range of 1710-2025 MHz, a frequency range of 2110-2200 MHz, a frequency range of 2300-2400 MHz, and/or a frequency range of 2.4-2.4835 GHz.

In Example 32, the subject matter of any one of Examples 1 to 31 can optionally include wherein the transceiver is configured to broadcast beamforming information relating to the wireless device.

In Example 33, the subject matter of any one of Examples 1 to 32 can optionally include wherein the communication processor is configured to store and/or to update a database including information for establishing communication routes to at least one wireless device included in the network of wireless devices based on the data relating to the mutual connections between the wireless devices included in the network.

In Example 34, the subject matter of any one of Examples 1 to 33 can optionally include wherein the transceiver is configured to receive the data relating to the mutual connections between the wireless devices included in the network from the at least one further wireless device.

In Example 35, the subject matter of any one of Examples 1 to 34 can optionally include wherein the transceiver is configured to periodically receive the data relating to the mutual connections between the wireless devices included in the network from the at least one further wireless device.

In Example 36, the subject matter of any one of Examples 1 to 35 can optionally include further comprising a resource management processor configured to allocate time and/or frequency resources for transmission and reception of data by the transceiver based on allocation information; wherein the transceiver is configured to receive allocation information from the at least one further wireless device.

In Example 37, the subject matter of any one of Examples 1 to 36 can optionally include wherein the transceiver is configured to transmit allocation information to the at least one further wireless device.

In Example 38, the subject matter of any one of Examples 36 or 37 can optionally include wherein the beamforming controller is configured to control a configuration of the at least two antennas to steer at least one beam for transmission of data and/or to suppress the interference based on the beamforming information and based on the allocation information.

Example 39 is a wireless device comprising a communication processor configured to control communications of the wireless device with at least one further wireless device included in a network of wireless devices based on data relating to mutual connections between wireless devices included in the network; a transceiver configured to receive beamforming information from the at least one further wireless device; a beamforming processor configured to process the beamforming information to obtain control information; the transceiver being configured to transmit the control information to the at least one further wireless device for controlling a configuration of at least two antennas of a transceiver of the at least one further wireless device to steer at least one beam for transmission of data by the at least one further wireless device.

In Example 40, the subject matter of Example 39 can optionally include wherein the beamforming information comprises position information of the at least one further wireless device.

In Example 41, the subject matter of any one of Examples 39 or 40 can optionally include wherein the transceiver of the wireless device is configured to transmit the control information for controlling the configuration of the at least two antennas of the transceiver of the at least one further wireless device to enable the transceiver of the at least one further wireless device to direct a beam for transmission of data towards the wireless device and/or towards at least one wireless device included in the network of wireless devices and different from the wireless device.

In Example 42, the subject matter of any one of Examples 39 to 41 can optionally include wherein the transceiver is configured to transmit the control information for controlling the configuration of the at least two antennas of the transceiver of the at least one further wireless device to enable the transceiver of the at least one further wireless device to suppress interference in a direction different from a direction in which the further wireless device receives data from the wireless device and/or from at least one wireless device included in the network of wireless devices and different from the wireless device.

In Example 43, the subject matter of any one of Examples 39 to 42 can optionally include wherein the data is payload data.

In Example 44, the subject matter of any one of Examples 40 to 43 can optionally include wherein the position information is an absolute position of the at least one further wireless device.

In Example 45, the subject matter of any one of Examples 40 to 43 can optionally include wherein the position information is a relative position obtained by the wireless device based on at least one measurement of a signal received from the at least one further wireless device.

In Example 46, the subject matter of any one of Examples 39 to 45 can optionally include wherein the beamforming information comprises beamforming capability information of the at least one further wireless device.

In Example 47, the subject matter of Example 46 can optionally include wherein the beamforming capability information comprises information indicating a maximum number of beams the at least one further wireless device can simultaneously form for data transmission.

In Example 48, the subject matter of any one of Examples 46 or 47 can optionally include wherein the beamforming capability information comprises information indicating a range of possible directions in which the at least one further wireless device can form at least one beam for data transmission.

In Example 49, the subject matter of any one of Examples 46 to 48 can optionally include wherein the beamforming capability information comprises information indicating a capability of the at least one further wireless device for data transmission according to unicast and/or multicast data transmission.

In Example 50, the subject matter of any one of Examples 39 to 49 can optionally include wherein the beamforming information comprises information indicative of a relative distance between the at least one further wireless device and at least two wireless devices included in the network of wireless devices and different from the wireless device, and wherein the transceiver of the wireless device is configured to transmit the control information for controlling the configuration of the at least two antennas of the transceiver of the at least one further wireless device to adjust an opening angle of at least one beam for data transmission from the further wireless devices to the at least two wireless devices different from the wireless device based on the relative distance.

In Example 51, the subject matter of Example 50 can optionally include wherein the transceiver of the wireless device is configured to transmit the control information for controlling the configuration of the at least two antennas of the transceiver of the at least one further wireless device to increase the opening angle for a shorter relative distance and to decrease the opening angle for a larger relative distance.

In Example 52, the subject matter of any one of Examples 50 or 51 can optionally include wherein the transceiver of the wireless device is configured to transmit the control information for controlling the configuration of the at least two antennas of the transceiver of the at least one further wireless device to steer a respective beam for transmission of data from the further wireless device to a corresponding one of the at least two wireless devices different from the wireless device, respectively, if the relative distance between the at least one further wireless device and at least one of the at least two different wireless devices is below a predefined threshold.

In Example 53, the subject matter of any one of Examples 39 to 53 can optionally include wherein the transceiver is configured to transmit the control information for controlling the configuration of the at least two antennas of the transceiver of the at least one further wireless device by weighting signals received by each respective one of the at least two antennas of the further wireless device and/or by weighting signals transmitted by each respective one of the at least two antennas of the further wireless device.

In Example 54, the subject matter of any one of Examples 39 to 53 can optionally include wherein the transceiver is configured to transmit the control information for controlling the configuration of the at least two antennas of the transceiver of the at least one further wireless device to adjust a transmission power for data transmission based on the beamforming information.

In Example 55, the subject matter of any one of Examples 39 to 54 can optionally include wherein the transceiver is configured to receive beamforming information from plural wireless devices included in the network of wireless devices; wherein the beamforming controller is configured to group at least two of the plural wireless devices into a first group based on the beamforming information, and wherein the transceiver is configured to transmit the control information for controlling the configuration of the at least two antennas of the transceiver of the at least one further wireless device to transmit data to each of the at least two wireless devices with a single beam.

In Example 56, the subject matter of Example 55 can optionally include wherein the beamforming information received from the plural wireless devices comprises absolute positions of each wireless device of the plural wireless devices, and wherein the beamforming controller is configured to determine relative distances between wireless devices of the plural wireless devices and to group the at least two wireless devices if a relative distance between the two wireless devices is below a predefined threshold.

In Example 57, the subject matter of any one of Examples 55 or 56 can optionally include wherein the beamforming controller is configured to group at least two further wireless devices included in the network of wireless devices into at least one further group, wherein the transmitter is configured to transmit the control information for controlling the configuration of the at least two antennas of the transceiver of the at least one further wireless device to multiplex data transmissions from the further wireless device to each of the first group and the at least one further group in the time domain.

In Example 58, the subject matter of any one of Examples 55 to 57 can optionally include wherein the transceiver is configured to transmit the control information for controlling the configuration of the at least two antennas of the transceiver of the at least one further wireless device to multiplex data transmissions from the further wireless device to each wireless device included in one group of wireless devices in the frequency domain.

In Example 59, the subject matter of any one of Examples 39 to 58 can optionally include wherein the beamforming information comprises information indicating an application type to which data to be communicated via the transceiver of the at least one further wireless device corresponds.

In Example 60, the subject matter of any one of Examples 39 to 59 can optionally include wherein the beamforming information comprises information indicating a data rate at which data is to be communicated via the transceiver of the at least one further wireless device.

In Example 61, the subject matter of any one of Examples 39 to 60 can optionally include wherein the transceiver of the wireless device is configured to receive the beamforming information from the at least one further wireless device via a direct device-to-device (D2D) communication link.

In Example 62, the subject matter of any one of Examples 39 to 61 can optionally include wherein the communication processor is configured to control device-to-device (D2D) communications between the wireless device and the at least one further wireless device, and wherein the network of wireless devices is a D2D mesh network.

In Example 63, the subject matter of any one of Examples 39 to 62 can optionally include wherein the transceiver of the wireless device is configured to receive the beamforming information in a first frequency band, and wherein the transceiver of the wireless device is configured to transmit and/or receive payload data in at least one further frequency band different from the first frequency band.

In Example 64, the subject matter of Example 63 can optionally include wherein the transceiver of the wireless device is configured to transmit the control information to the at least one further wireless device in the first frequency band.

In Example 65, the subject matter of any one of Examples 63 or 64 can optionally include wherein the first frequency band is a band of lower frequencies as the at least one further frequency band.

In Example 66, the subject matter of any one of Examples 63 to 65 can optionally include wherein the first frequency band comprises a frequency range of 790-960 MHz, a frequency range of 1710-2025 MHz, a frequency range of 2110-2200 MHz, a frequency range of 2300-2400 MHz, and/or a frequency range of 2.4-2.4835 GHz.

In Example 67, the subject matter of any one of Examples 39 to 66 can optionally include wherein the communication processor is configured to store and/or to update a database including information for establishing communication routes to at least one wireless device included in the network of wireless devices based on the data relating to the mutual connections between the wireless devices included in the network.

In Example 68, the subject matter of any one of Examples 39 to 67 can optionally include wherein the transceiver of the wireless device is configured to receive the data relating to the mutual connections between the wireless devices included in the network from the at least one further wireless device.

In Example 69, the subject matter of any one of Examples 39 to 68 can optionally include wherein the transceiver of the wireless device is configured to periodically receive the data relating to the mutual connections between the wireless devices included in the network from the at least one further wireless device.

In Example 70, the subject matter of any one of Examples 39 to 69 can optionally include further comprising a selection processor configured to compare a value based on a first parameter indicative of number of wireless devices included in the network of wireless devices to which the wireless device can connect to via a direct device-to-device (D2D) communication link, a second parameter indicative of a strength of respective signals that can be exchanged between the wireless device and one or more wireless devices included in the network of wireless devices to which the wireless device can connect to via a direct device-to-device (D2D) communication link, a third parameter indicative of computation power of the wireless device, a fourth parameter indicative of a battery level of the wireless device to a predefined threshold; wherein the transceiver of the wireless device is configured to transmit the control information to the at least one further wireless device if the value is above the predefined threshold.

In Example 71, the subject matter of Example 70 can optionally include wherein the value is a weighted sum of at least two parameters selected from the first parameter, the second parameter, the third parameter and the fourth parameter.

In Example 72, the subject matter of any one of Examples 39 to 71 can optionally include further comprising a resource management processor configured to process allocation information to obtain allocation control information; wherein the transmitter is configured to transmit the allocation control information to the at least one further wireless device for allocating time and/or frequency resources for transmission and reception of data by the transceiver of the at least one further wireless device.

In Example 73, the subject matter of Example 72 can optionally include wherein beamforming processor is configured to process the beamforming information and the allocation information to obtain the control information.

Example 74 is a communication method of a wireless device comprising a transceiver with an antenna arrangement comprising at least two antennas, the method comprising controlling communications of the wireless device with at least one further wireless device included in a network of wireless devices based on data relating to mutual connections between wireless devices included in the network; controlling a configuration of the at least two antennas to steer at least one beam for transmission of data based on beamforming information.

In Example 75, the subject matter of Example 74 can optionally include wherein the beamforming information comprises position information of the at least one further wireless device.

In Example 76, the subject matter of any one of Examples 74 or 75 can optionally include comprising controlling the configuration of the at least two antennas to steer the at least one beam towards the at least one further wireless device.

In Example 77, the subject matter of any one of Examples 74 to 76 can optionally include comprising controlling the configuration of the at least two antennas to suppress interference in a direction different from a direction in which the wireless device receives data from the at least one further wireless device.

In Example 78, the subject matter of any one of Examples 74 to 77 can optionally include wherein the data is payload data.

In Example 79, the subject matter of any one of Examples 75 to 78 can optionally include wherein the position information is an absolute position of the at least one further wireless device comprised by the beamforming information, the method comprising receiving the beamforming information from the at least one further wireless device.

In Example 80, the subject matter of any one of Examples 75 to 78 can optionally include wherein the position information is a relative position obtained by the wireless device based on at least one measurement of a signal received from the at least one further wireless device.

In Example 81, the subject matter of any one of Examples 74 to 80 can optionally include wherein the beamforming information comprises beamforming capability information of the at least one further wireless device.

In Example 82, the subject matter of Example 81 can optionally include wherein the beamforming capability information comprises information indicating a maximum number of beams the at least one further wireless device can simultaneously form for data transmission.

In Example 83, the subject matter of any one of Examples 81 or 82 can optionally include wherein the beamforming capability information comprises information indicating a range of possible directions in which the at least one further wireless device can form at least one beam for data transmission.

In Example 84, the subject matter of any one of Examples 81 to 83 can optionally include wherein the beamforming capability information comprises information indicating a capability of the at least one further wireless device for data transmission according to unicast and/or multicast data transmission.

In Example 85, the subject matter of any one of Examples 74 to 84 can optionally include wherein the beamforming information comprises information indicative of a relative distance between the wireless device and at least two further wireless devices, the method comprising controlling the configuration of the at least two antennas to adjust an opening angle of the at least one beam for transmission of data to the at least two further wireless devices based on the relative distance.

In Example 86, the subject matter of Example 85 can optionally include comprising controlling the configuration of the at least two antennas to increase the opening angle for a shorter relative distance and to decrease the opening angle for a larger relative distance.

In Example 87, the subject matter of any one of Examples 85 or 86 can optionally include comprising controlling the configuration of the at least two antennas to steer a respective beam for transmission of data to a corresponding one of the at least two further wireless devices, respectively, if the relative distance to at least one of the at least two further wireless devices is below a predefined threshold.

In Example 88, the subject matter of any one of Examples 85 to 87 can optionally include comprising controlling the configuration of the at least two antennas by weighting signals received by each respective one of the at least two antennas and/or by weighting signals transmitted by each respective one of the at least two antennas.

In Example 89, the subject matter of any one of Examples 74 to 88 can optionally include comprising controlling the configuration of the at least two antennas to adjust a transmission power for data transmission based on the beamforming information.

In Example 90, the subject matter of any one of Examples 74 to 89 can optionally include comprising receiving beamforming information from at least two wireless devices included in the network of wireless devices; grouping the at least two wireless devices into a first group based on the beamforming information, and controlling the configuration of the at least two antennas to transmit data to each of the at least two wireless devices with a single beam.

In Example 91, the subject matter of Example 90 can optionally include wherein the beamforming information includes absolute positions of each of the at least two wireless devices, the method comprising determining a relative distance between the two wireless devices based on the absolute positions and grouping the at least two wireless devices if the relative distance is below a predefined threshold.

In Example 92, the subject matter of any one of Examples 90 or 91 can optionally include comprising grouping at least two further wireless devices included in the network of wireless devices into at least one further group, and controlling data transmissions to each of the first group and the at least one further group to be multiplexed in the time domain.

In Example 93, the subject matter of any one of Examples 90 to 92 can optionally include comprising controlling data transmissions to each wireless device included in one group of wireless devices to be multiplexed in the frequency domain.

In Example 94, the subject matter of any one of Examples 74 to 93 can optionally include wherein the beamforming information comprises information indicating an application type to which data to be received or transmitted via the transceiver corresponds.

In Example 95, the subject matter of any one of Examples 74 to 94 may further include wherein the beamforming information comprises information indicating a data rate at which data is to be received or transmitted via the transceiver.

In Example 96, the subject matter of any one of Examples 74 to 95 may further include comprising receiving the beamforming information from the at least one further wireless device.

In Example 97, the subject matter of any one of Examples 74 to 96 may further include comprising transmitting beamforming information comprising an absolute position of the wireless device to the at least one further wireless device.

In Example 98, the subject matter of any one of Examples 74 to 97 may further include comprising obtaining the absolute position of the wireless device from a satellite based positioning system.

In Example 99, the subject matter of any one of Examples 74 to 98 may further include comprising receiving the beamforming information from the at least one further wireless device via a direct device-to-device (D2D) communication link.

In Example 100, the subject matter of any one of Examples 74 to 99 may further include comprising controlling device-to-device (D2D) communications between the wireless device and the at least one further wireless device, and wherein the network of wireless devices is a D2D mesh network.

In Example 101, the subject matter of any one of Examples 74 to 100 may further include comprising receiving the beamforming information in a first frequency band, and transmitting and/or receiving payload data in at least one further frequency band different from the first frequency band.

In Example 102, the subject matter of Example 101 may further include comprising transmitting beamforming information relating to the wireless device to the at least one further wireless device in the first frequency band.

In Example 103, the subject matter of any one of Examples 101 or 102 may further include wherein the first frequency band is a band of lower frequencies as the at least one further frequency band.

In Example 104, the subject matter of any one of Examples 101 to 103 may further include wherein the first frequency band comprises a frequency range of 790-960 MHz, a frequency range of 1710-2025 MHz, a frequency range of 2110-2200 MHz, a frequency range of 2300-2400 MHz, and/or a frequency range of 2.4-2.4835 GHz.

In Example 105, the subject matter of any one of Examples 74 to 104 may further include comprising broadcasting beamforming information relating to the wireless device.

In Example 106, the subject matter of any one of Examples 74 to 105 may further include comprising storing and/or updating a database including information for establishing communication routes to at least one wireless device included in the network of wireless devices based on the data relating to the mutual connections between the wireless devices included in the network.

In Example 107, the subject matter of any one of Examples 74 to 106 may further include comprising receiving the data relating to the mutual connections between the wireless devices included in the network from the at least one further wireless device.

In Example 108, the subject matter of any one of Examples 74 to 107 may further include comprising periodically receiving the data relating to the mutual connections between the wireless devices included in the network from the at least one further wireless device.

In Example 109, the subject matter of any one of Examples 74 to 108 may further include allocating time and/or frequency resources for transmission and reception of data by the transceiver based on allocation information; and receiving allocation information from the at least one further wireless device.

In Example 110, the subject matter of any one of Examples 74 to 109 may further include comprising transmitting allocation information to the at least one further wireless device.

In Example 111, the subject matter of any one of Examples 109 to 110 may further include comprising controlling a configuration of the at least two antennas to steer at least one beam for transmission of data and/or to suppress the interference based on the beamforming information and based on the allocation information.

Example 112 is a communication method of a wireless device comprising controlling communications of the wireless device with at least one further wireless device included in a network of wireless devices based on data relating to mutual connections between wireless devices included in the network; receiving beamforming information from the at least one further wireless device; processing the beamforming information to obtain control information; transmitting the control information to the at least one further wireless device for controlling a configuration of at least two antennas of a transceiver of the at least one further wireless device to steer at least one beam for transmission of data by the at least one further wireless device.

In Example 113, the subject matter of Example 112 may further include wherein the beamforming information comprises position information of the at least one further wireless device.

In Example 114, the subject matter of any one of Examples 112 or 113 may further include comprising transmitting the control information for controlling the configuration of the at least two antennas of the transceiver of the at least one further wireless device to enable the transceiver of the at least one further wireless device to direct a beam for transmission of data towards the wireless device and/or towards at least one wireless device included in the network of wireless devices and different from the wireless device.

In Example 115, the subject matter of any one of Examples 112 to 114 may further include comprising transmitting the control information for controlling the configuration of the at least two antennas of the transceiver of the at least one further wireless device to enable the transceiver of the at least one further wireless device to suppress interference in a direction different from a direction in which the further wireless device receives data from the wireless device and/or from at least one wireless device included in the network of wireless devices and different from the wireless device.

In Example 116, the subject matter of any one of Examples 112 to 115 may further include wherein the data is payload data.

In Example 117, the subject matter of any one of Examples 113 to 116 may further include wherein the position information is an absolute position of the at least one further wireless device.

In Example 118, the subject matter of any one of Examples 113 to 116 may further include wherein the position information is a relative position obtained by the wireless device based on at least one measurement of a signal received from the at least one further wireless device.

In Example 119, the subject matter of any one of Examples 112 to 118 may further include wherein the beamforming information comprises beamforming capability information of the at least one further wireless device.

In Example 120, the subject matter of Example 119 may further include wherein the beamforming capability information comprises information indicating a maximum number of beams the at least one further wireless device can simultaneously form for data transmission.

In Example 121, the subject matter of any one of Examples 119 or 120 may further include wherein the beamforming capability information comprises information indicating a range of possible directions in which the at least one further wireless device can form at least one beam for data transmission.

In Example 122, the subject matter of any one of Examples 119 to 121 may further include wherein the beamforming capability information comprises information indicating a capability of the at least one further wireless device for data transmission according to unicast and/or multicast data transmission.

In Example 123, the subject matter of any one of Examples 112 to 122 may further include wherein the beamforming information comprises information indicative of a relative distance between the at least one further wireless device and at least two wireless devices included in the network of wireless devices and different from the wireless device, the method comprising transmitting the control information for controlling the configuration of the at least two antennas of the transceiver of the at least one further wireless device to adjust an opening angle of at least one beam for data transmission from the further wireless devices to the at least two wireless devices different from the wireless device based on the relative distance.

In Example 124, the subject matter of Example 123 may further include comprising transmitting the control information for controlling the configuration of the at least two antennas of the transceiver of the at least one further wireless device to increase the opening angle for a shorter relative distance and to decrease the opening angle for a larger relative distance.

In Example 125, the subject matter of any one of Examples 123 or 124 may further include comprising transmitting the control information for controlling the configuration of the at least two antennas of the transceiver of the at least one further wireless device to steer a respective beam for transmission of data from the further wireless device to a corresponding one of the at least two wireless devices different from the wireless device, respectively, if the relative distance between the at least one further wireless device and at least one of the at least two different wireless devices is below a predefined threshold.

In Example 126, the subject matter of any one of Examples 112 to 125 may further include comprising transmitting the control information for controlling the configuration of the at least two antennas of the transceiver of the at least one further wireless device by weighting signals received by each respective one of the at least two antennas of the further wireless device and/or by weighting signals transmitted by each respective one of the at least two antennas of the further wireless device.

In Example 127, the subject matter of any one of Examples 112 to 126 may further include comprising transmitting the control information for controlling the configuration of the at least two antennas of the transceiver of the at least one further wireless device to adjust a transmission power for data transmission based on the beamforming information.

In Example 128, the subject matter of any one of Examples 112 to 127 may further include comprising receiving beamforming information from plural wireless devices included in the network of wireless devices; grouping at least two of the plural wireless devices into a first group based on the beamforming information, and transmitting the control information for controlling the configuration of the at least two antennas of the transceiver of the at least one further wireless device to transmit data to each of the at least two wireless devices with a single beam.

In Example 129, the subject matter of Example 128 may further include wherein the beamforming information received from the plural wireless devices comprises absolute positions of each wireless device of the plural wireless devices, the method comprising determining relative distances between wireless devices of the plural wireless devices, and grouping the at least two wireless devices if a relative distance between the two wireless devices is below a predefined threshold.

In Example 130, the subject matter of any one of Examples 128 or 129 may further include comprising grouping at least two further wireless devices included in the network of wireless devices into at least one further group, and transmitting the control information for controlling the configuration of the at least two antennas of the transceiver of the at least one further wireless device to multiplex data transmissions from the further wireless device to each of the first group and the at least one further group in the time domain.

In Example 131, the subject matter of any one of Examples 128 to 130 may further include comprising transmitting the control information for controlling the configuration of the at least two antennas of the transceiver of the at least one further wireless device to multiplex data transmissions from the further wireless device to each wireless device included in one group of wireless devices in the frequency domain.

In Example 132, the subject matter of any one of Examples 112 to 131 may further include wherein the beamforming information comprises information indicating an application type to which data to be communicated via the transceiver of the at least one further wireless device corresponds.

In Example 133, the subject matter of any one of Examples 112 to 132 may further include wherein the beamforming information comprises information indicating a data rate at which data is to be communicated via the transceiver of the at least one further wireless device.

In Example 134, the subject matter of any one of Examples 112 to 133 may further include comprising receiving the beamforming information from the at least one further wireless device via a direct device-to-device (D2D) communication link.

In Example 135, the subject matter of any one of Examples 112 to 134 may further include comprising controlling device-to-device (D2D) communications between the wireless device and the at least one further wireless device, and wherein the network of wireless devices is a D2D mesh network.

In Example 136, the subject matter of any one of Examples 112 to 135 may further include comprising receiving the beamforming information in a first frequency band, and transmitting and/or receiving payload data in at least one further frequency band different from the first frequency band.

In Example 137, the subject matter of Example 136 may further include comprising transmitting the control information to the at least one further wireless device in the first frequency band.

In Example 138, the subject matter of any one of Examples 136 or 137 may further include wherein the first frequency band is a band of lower frequencies as the at least one further frequency band.

In Example 139, the subject matter of any one of Examples 136 to 138 may further include wherein the first frequency band comprises a frequency range of 790-960 MHz, a frequency range of 1710-2025 MHz, a frequency range of 2110-2200 MHz, a frequency range of 2300-2400 MHz, and/or a frequency range of 2.4-2.4835 GHz.

In Example 140, the subject matter of any one of Examples 112 to 139 may further include comprising storing and/or updating a database including information for establishing communication routes to at least one wireless device included in the network of wireless devices based on the data relating to the mutual connections between the wireless devices included in the network.

In Example 141, the subject matter of any one of Examples 112 to 140 may further include comprising receiving the data relating to the mutual connections between the wireless devices included in the network from the at least one further wireless device.

In Example 142, the subject matter of any one of Examples 112 to 141 may further include comprising periodically receiving the data relating to the mutual connections between the wireless devices included in the network from the at least one further wireless device.

In Example 143, the subject matter of any one of Examples 112 to 142 may further include comparing a value based on a first parameter indicative of number of wireless devices included in the network of wireless devices to which the wireless device can connect to via a direct device-to-device (D2D) communication link, a second parameter indicative of a strength of respective signals that can be exchanged between the wireless device and one or more wireless devices included in the network of wireless devices to which the wireless device can connect to via a direct device-to-device (D2D) communication link, a third parameter indicative of computation power of the wireless device, a fourth parameter indicative of a battery level of the wireless device to a predefined threshold; and transmitting the control information to the at least one further wireless device if the value is above the predefined threshold.

In Example 144, the subject matter of Example 143 may further include wherein the value is a weighted sum of at least two parameters selected from the first parameter, the second parameter, the third parameter and the fourth parameter.

In Example 145, the subject matter of any one of Examples 112 to 144 may further include processing allocation information to obtain allocation control information; and transmitting the allocation control information to the at least one further wireless device for allocating time and/or frequency resources for transmission and reception of data by the transceiver of the at least one further wireless device.

In Example 146, the subject matter of Example 145 may further include comprising processing the beamforming information and the allocation information to obtain the control information.

Example 147 is a non-transitory computer readable medium storing instructions that, when executed by one or more processors of a wireless device, cause the wireless device to perform the method of any one of Examples 74 to 111.

Example 148 is a wireless device comprising one or more processors; and a memory storing instructions that, when executed by the one or more processors, cause the wireless device to perform the method of any one of Examples 74 to 111.

Example 149 is a non-transitory computer readable medium storing instructions that, when executed by one or more processors of a wireless device, cause the wireless device to perform the method of any one of Examples 112 to 146.

Example 150 is a wireless device comprising one or more processors; and a memory storing instructions that, when executed by the one or more processors, cause the wireless device to perform the method of any one of Examples 112 to 146.

Example 151 is a wireless device comprising a receiver configured to receive control information from at least one further wireless device via an antenna arrangement with at least two antennas via a direct device-to-device communication link; a beamforming controller configured to select a transmit antenna configuration of the antenna arrangement to steer a data transmission beam towards the at least one further wireless device based on the control information.

In Example 152, the subject matter of Example 151 can optionally include wherein the beamforming controller is configured to control the antenna arrangement to receive the control information with at least two candidate receive antenna configurations of the antenna arrangement, and to select the transmit antenna configuration to steer the data transmission beam corresponding to one of the at least two candidate receive antenna configurations.

In Example 153, the subject matter of Example 152 can optionally include further comprising an estimator configured to estimate a reception quality of the control information for each of the at least two candidate receive antenna configurations, wherein the beamforming controller is configured to select the transmit antenna configuration corresponding to one of the at least two candidate receive antenna configurations based on the reception quality estimated for the one of the at least two candidate receive antenna configurations.

In Example 154, the subject matter of Example 153 can optionally include wherein the beamforming controller is configured to select the transmit antenna configuration corresponding to the one of the at least two candidate receive antenna configurations for which the estimated reception quality fulfills a predefined reception quality criterion.

In Example 155, the subject matter of any one of Examples 151 to 154 can optionally include wherein the beamforming controller is configured to adjust a receive antenna configuration of the antenna arrangement to receive the control information to be adapted to a width of a received beam including the control information, and wherein the beamforming controller is configured to adjust the transmit antenna configuration to steer the data transmission beam towards the at least one further wireless device with a smaller width than the width of the beam for transmission of the control information.

In Example 156, the subject matter of any one of Examples 152 to 155 can optionally include wherein the one of the at least two candidate receive antenna configurations is adapted to a direction and a width of a received beam including the control information, and wherein the transmit antenna configuration is adapted to steer the data transmission beam in the same direction with a smaller width.

In Example 157, the subject matter of any one of Examples 153 to 156 can optionally include wherein the estimator is configured to compare the reception quality estimated for the one of the at least two candidate receive antenna configurations to a predefined threshold value, the wireless device further comprising a transmitter configured to transmit a confirmation message via the antenna arrangement to the at least one further wireless device if the reception quality is equal to or above the predefined threshold value.

In Example 158, the subject matter of any one of Examples 153 to 157 can optionally include wherein the estimator is configured to compare the reception quality estimated for the one of the at least two candidate receive antenna configurations to a predefined threshold value, the wireless device further comprising a transmitter configured to transmit payload data via the antenna arrangement to the at least one further wireless device if the reception quality is equal to or above the predefined threshold value.

In Example 159, the subject matter of any one of Examples 151 to 158 can optionally include wherein the control information corresponds to a beam acquisition preamble periodically transmitted by the at least one further wireless device.

In Example 160, the subject matter of any one of Examples 151 to 159 can optionally include wherein the control information corresponds to a predefined beam acquisition preamble suitable for measurements of reception quality.

In Example 161, the subject matter of any one of Examples 151 to 160 can optionally include wherein the control information corresponds to a random access preamble and/or is included in a sidelink synchronization sub-frame.

In Example 162, the subject matter of any one of Examples 151 to 161 can optionally include wherein the control information includes information for identifying the at least one further wireless device.

In Example 163, the subject matter of any one of Examples 151 to 162 can optionally include wherein the beamforming controller is configured to select a transmit antenna configuration of the antenna arrangement to steer the data transmission beam towards the at least one further wireless device based on information identifying the at least one further wireless device included in the control information.

In Example 164, the subject matter of any one of Examples 151 to 163 can optionally include further comprising a communication processor, wherein the communication processor is configured to establish the direct device-to-device communication link with the at least one further wireless device by: controlling the antenna arrangement to periodically switch between receive antenna configurations for receiving periodic control information including information identifying the at least one further wireless device in different spatial directions, and controlling the antenna arrangement to periodically switch between transmit antenna configurations for transmitting periodic control information including information identifying the wireless device in different spatial directions, and wherein the communication processor is configured to establish the direct device-to-device communication link with the at least one further wireless device based on the information identifying the at least one further wireless device.

In Example 165, the subject matter of Example 164 can optionally include wherein the control information includes random access preambles, each random access preamble for identifying one of the wireless device and the at least one further wireless device, the random access preambles being quasi orthogonal.

In Example 166, the subject matter of any one of Examples 151 to 165 can optionally include wherein the communication processor is configured to control communications of the wireless device with further wireless devices included in a network of wireless devices based on data relating to mutual direct device-to-device connections between the wireless devices included in the network.

In Example 167, the subject matter of Example 166 can optionally include wherein the network of wireless devices is a device-to-device mesh network further including the wireless device and the at least one further wireless device.

In Example 168, the subject matter of any one of Examples 166 or 167 can optionally include wherein the communication processor is configured to establish the direct device-to-device communication link with at least two wireless devices, the at least two wireless devices included in the network of wireless devices, and to establish a relayed communication link with at least one third wireless device included in the network of wireless devices via the at least two wireless devices.

In Example 169, the subject matter of Example 168 can optionally include wherein the communication processor is configured to apply spatial interleaving to data to be communicated to the at least one third wireless device, by controlling a first portion of the data to be relayed by one of the at least two wireless devices and a second portion of the data to be relayed by the other one of the at least two wireless devices.

In Example 170, the subject matter of any one of Examples 164 to 169 can optionally include wherein the estimator is configured to estimate a duration of an interference signal received by the receiver, wherein the communication processor is configured to spread a data signal to be transmitted to the at least one third wireless device over a time period longer than the estimated duration of the interference signal and to temporally interleave data bits comprised by the data signal.

In Example 171, the subject matter of any one of Examples 164 to 170 can optionally include wherein the estimator is configured to estimate a frequency spread of an interference signal received by the receiver, wherein the communication processor is configured to spread a data signal to be transmitted to the at least one third wireless device over a frequency range larger than the estimated spread of the interference signal and to interleave data bits comprised by the data signal in the frequency domain.

In Example 172, the subject matter of any one of Examples 151 to 171 can optionally include further comprising a transmitter configured to transmit a topology update request, wherein the receiver is configured to receive a message including a network connection status at least from the at least one further wireless device; the wireless device further comprising a communication processor configured to establish the direct device-to-device communication link with the at least one further wireless device.

In Example 173, the subject matter of Example 172 can optionally include wherein the transmitter is configured to broadcast the topology update request.

In Example 174, the subject matter of any one of Examples 151 to 171 can optionally include wherein the receiver is configured to receive a topology update control message from a wireless coordinator device.

In Example 175, the subject matter of Example 174 can optionally include wherein the wireless coordinator device is a wireless device included in a device-to-device mesh network further including the wireless device and the at least one further wireless device.

In Example 176, the subject matter of Example 174 can optionally include wherein the wireless coordinator device is a radio base station of a wireless communication network.

In Example 177, the subject matter of Example 174 can optionally include wherein the wireless coordinator device is a 5G gNB.

In Example 178, the subject matter of any one of Examples 151 to 178 can optionally include wherein the beamforming controller, the estimator and/or the communication processor correspond to one or more physical layer processors included in a baseband modem of the wireless device.

Example 179 is a communication method of a wireless device comprising: receiving control information from at least one further wireless device via an antenna arrangement with at least two antennas via a direct device-to-device communication link; selecting a transmit antenna configuration of the antenna arrangement to steer a data transmission beam towards the at least one further wireless device based on the control information.

In Example 180, the subject matter of Example 179 may further include controlling the antenna arrangement to receive the control information with at least two candidate receive antenna configurations of the antenna arrangement, and selecting the transmit antenna configuration to steer the data transmission beam corresponding to one of the at least two candidate receive antenna configurations.

In Example 181, the subject matter of Example 180 may further include estimating a reception quality of the control information for each of the at least two candidate receive antenna configurations, and selecting the transmit antenna configuration corresponding to one of the at least two candidate receive antenna configurations based on the reception quality estimated for the one of the at least two candidate receive antenna configurations.

In Example 182, the subject matter of Example 181 may further include selecting the transmit antenna configuration corresponding to the one of the at least two candidate receive antenna configurations for which the estimated reception quality fulfills a predefined reception quality criterion.

In Example 183, the subject matter of any one of Examples 179 to 182 may further include adjusting a receive antenna configuration of the antenna arrangement to receive the control information to be adapted to a width of a received beam including the control information, and adjusting the transmit antenna configuration to steer the data transmission beam towards the at least one further wireless device with a smaller width than the width of the beam for transmission of the control information.

In Example 184, the subject matter of any one of Examples 180 to 183 may further include wherein the one of the at least two candidate receive antenna configurations is adapted to a direction and a width of a received beam including the control information, and wherein the transmit antenna configuration is adapted to steer the data transmission beam in the same direction with a smaller width.

In Example 185, the subject matter of any one of Examples 181 to 184 may further include comparing the reception quality estimated for the one of the at least two candidate receive antenna configurations to a predefined threshold value, and transmitting a confirmation message via the antenna arrangement to the at least one further wireless device if the reception quality is equal to or above the predefined threshold value.

In Example 186, the subject matter of any one of Examples 181 to 185 may further include comparing the reception quality estimated for the one of the at least two candidate receive antenna configurations to a predefined threshold value, and transmitting payload data via the antenna arrangement to the at least one further wireless device if the reception quality is equal to or above the predefined threshold value.

In Example 187, the subject matter of any one of Examples 179 to 186 may further include wherein the control information corresponds to a beam acquisition preamble periodically transmitted by the at least one further wireless device.

In Example 188, the subject matter of any one of Examples 179 to 187 may further include wherein the control information corresponds to a predefined beam acquisition preamble suitable for measurements of reception quality.

In Example 189, the subject matter of any one of Examples 179 to 188 may further include wherein the control information corresponds to a random access preamble and/or is included in a sidelink synchronization sub-frame.

In Example 190, the subject matter of any one of Examples 179 to 189 may further include wherein the control information includes information for identifying the at least one further wireless device.

In Example 191, the subject matter of any one of Examples 179 to 190 may further include selecting a transmit antenna configuration of the antenna arrangement to steer the data transmission beam towards the at least one further wireless device based on information identifying the at least one further wireless device included in the control information.

In Example 192, the subject matter of any one of Examples 179 to 191 may further include: establishing the direct device-to-device communication link with the at least one further wireless device by: controlling the antenna arrangement to periodically switch between receive antenna configurations for receiving periodic control information including information identifying the at least one further wireless device in different spatial directions, and controlling the antenna arrangement to periodically switch between transmit antenna configurations for transmitting periodic control information including information identifying the wireless device in different spatial directions, whereby the establishing the direct device-to-device communication link with the at least one further wireless device is based on the information identifying the at least one further wireless device.

In Example 193, the subject matter of Example 192 may further include wherein the control information includes random access preambles, each random access preamble for identifying one of the wireless device and the at least one further wireless device, the random access preambles being quasi orthogonal.

In Example 194, the subject matter of any one of Examples 179 to 193 may further include controlling communications of the wireless device with further wireless devices included in a network of wireless devices based on data relating to mutual direct device-to-device connections between the wireless devices included in the network.

In Example 195, the subject matter of Example 194 may further include wherein the network of wireless devices is a device-to-device mesh network further including the wireless device and the at least one further wireless device.

In Example 196, the subject matter of any one of Examples 194 or 195 may further include establishing the direct device-to-device communication link with at least two wireless devices, the at least two wireless devices included in the network of wireless devices, and establishing a relayed communication link with at least one third wireless device included in the network of wireless devices via the at least two wireless devices.

In Example 197, the subject matter of Example 196 may further include applying spatial interleaving to data to be communicated to the at least one third wireless device, by controlling a first portion of the data to be relayed by one of the at least two wireless devices and a second portion of the data to be relayed by the other one of the at least two wireless devices.

In Example 198, the subject matter of any one of Examples 192 to 197 may further include estimating a duration of an interference signal received by the receiver, spreading a data signal to be transmitted to the at least one third wireless device over a time period longer than the estimated duration of the interference signal and temporally interleaving data bits comprised by the data signal.

In Example 199, the subject matter of any one of Examples 192 to 198 may further include estimating a frequency spread of an interference signal received by the receiver, spreading a data signal to be transmitted to the at least one third wireless device over a frequency range larger than the estimated spread of the interference signal and interleaving data bits comprised by the data signal in the frequency domain.

In Example 200, the subject matter of any one of Examples 179 to 199 may further include transmitting a topology update request, receiving a message including a network connection status at least from the at least one further wireless device; and establishing the direct device-to-device communication link with the at least one further wireless device.

In Example 201, the subject matter of Example 200 may further include wherein the transmitting comprises broadcasting the topology update request.

In Example 202, the subject matter of any one of Examples 179 to 199 may further include receiving a topology update control message from a wireless coordinator device.

In Example 203, the subject matter of Example 202 may further include wherein the wireless coordinator device is a wireless device included in a device-to-device mesh network further including the wireless device and the at least one further wireless device.

In Example 204, the subject matter of Example 202 may further include wherein the wireless coordinator device is a radio base station of a wireless communication network.

In Example 205, the subject matter of Example 202 may further include wherein the wireless coordinator device is a 5G gNB.

Example 206 is a non-transitory computer readable medium storing instructions that, when executed by one or more processors of a wireless device, cause the wireless device to perform the method of any one of Examples 179 to 205.

Example 207 is a wireless device comprising one or more processors; and a memory storing instructions that, when executed by the one or more processors, cause the wireless device to perform the method of any one of Examples 179 to 205.

Example 208 is a wireless device including an antenna arrangement including at least two antennas; a geographical information determiner configured to determine a position of at least one first further wireless device, a position of at least one second further wireless device, and to determine whether a beam is impaired along a direct path from the wireless device to the at least one first further wireless device based on geographical information; a beamforming controller configured to control a transmit antenna configuration of the antenna arrangement to steer a data transmission beam towards the at least one second further wireless device if the geographical information determiner determines a beam is impaired along the direct path from the wireless device to the at least one first further wireless device.

In Example 209, the subject matter of Example 208 can optionally include further comprising a communication processor configured to generate transmission data for the data transmission beam for relay transmission by the at least one second further wireless device to a target wireless device.

In Example 210, the subject matter of Example 209 can optionally include wherein the communication processor is configured to generate identification information corresponding to the transmission data for the data transmission beam to identify the target wireless device, the wireless device further comprising a transmitter to transmit the identification information to the at least one second further wireless device.

In Example 211, the subject matter of any one of Examples 208 to 210 can optionally include wherein the beamforming controller is configured to control the transmit antenna configuration of the antenna arrangement to steer a data transmission beam towards the at least one first further wireless device if the geographical information determiner determines no beam impairment is present along the direct path from the wireless device to the at least one first further wireless device.

In Example 212, the subject matter of any one of Examples 208 to 211 can optionally include wherein the geographical information determiner is configured to determine the position of the at least one first further wireless device and the position of the at least one second further wireless device by referring to first map data comprised by the geographical information, wherein the wireless device comprises a receiver configured to receive at least part of the first map data.

In Example 213, the subject matter of Example 212 can optionally include wherein the receiver is configured to periodically receive the at least part of the first map data.

In Example 214, the subject matter of any one of Examples 212 or 213 can optionally include wherein the receiver is configured to receive the at least part of the first map data from at least one of the at least one first further wireless device and the at least one second further wireless device.

In Example 215, the subject matter of any one of Examples 212 or 213 can optionally include wherein the receiver is configured to receive the at least part of the first map data from a wireless coordinator device.

In Example 216, the subject matter of any one of Examples 208 to 215 can optionally include wherein the geographical information determiner is configured to determine whether the beam is impaired by referring to second map data comprised by the geographical information, the second map data comprising position information of one or more beam impairments.

In Example 217, the subject matter of Example 216 can optionally include wherein the one or more beam impairments include at least one static beam impairment, and wherein the second map data comprises a static portion comprising position information of the at least one static beam impairment, the static portion being pre-stored at a memory of the wireless device.

In Example 218, the subject matter of any one of Examples 216 or 217 can optionally include wherein the one or more beam impairments include at least one movable beam impairment, wherein the second map data comprises a dynamic portion comprising position information of the at least one movable beam impairment, and wherein the receiver is configured to receive the position information of the at least one movable beam impairment.

In Example 219, the subject matter of Example 218 can optionally include wherein the receiver is configured to periodically receive the position information of the at least one movable beam impairment.

In Example 220, the subject matter of any one of Examples 218 or 219 can optionally include wherein the receiver is configured to receive the position information of the at least one movable beam impairment from at least one of the at least one first further wireless device and the at least one second further wireless device.

In Example 221, the subject matter of any one of Examples 218 or 219 can optionally include wherein the receiver is configured to receive the position information of the at least one movable beam impairment from a wireless coordinator device.

In Example 222, the subject matter of any one of Examples 215 to 221 can optionally include wherein the wireless coordinator device is a base station of a radio communication system.

In Example 223, the subject matter of any one of Examples 215 to 221 can optionally include wherein the wireless coordinator device is a road side unit configured for vehicle-to-everything communication with the wireless device.

In Example 224, the subject matter of any one of Examples 208 to 223 can optionally include wherein the wireless device, the at least one first further wireless device, the at least one second further wireless device and the target wireless device are included in a mesh network of wireless devices configured for mutual device-to-device communication.

In Example 225, the subject matter of any one of Examples 215 to 224 can optionally include wherein the wireless coordinator device is a wireless device included in the mesh network of wireless devices configured for mutual device-to-device communication.

In Example 226, the subject matter of any one of Examples 208 to 225 can optionally include wherein the beam impairment is a signal blocker or an active source of signal interference.

In Example 227, the subject matter of any one of Examples 216 to 226 can optionally include wherein the one or more beam impairments comprise a building or a wall.

In Example 228, the subject matter of any one of Examples 216 to 227 can optionally include wherein the one or more beam impairments comprise a wireless signal source operating at a frequency band at least partially overlapping with a frequency band used by the wireless device.

In Example 229, the subject matter of any one of Examples 216 to 228 can optionally include wherein the one or more beam impairments comprise at least one Wireless Local Area Network access point.

In Example 230, the subject matter of any one of Examples 218 to 229 can optionally include wherein the at least one movable beam impairment includes at least one vehicle.

In Example 231, the subject matter of any one of Examples 218 to 230 can optionally include wherein the at least one movable beam impairment includes at least one temporarily installed facility.

In Example 232, the subject matter of any one of Examples 208 to 231 can optionally include wherein the wireless device, the at least one first further wireless device, the at least one second further wireless device and/or the target wireless device is a mobile terminal device.

In Example 233, the subject matter of any one of Examples 208 to 232 can optionally include wherein the geographical information determiner is configured to determine a distance to the at least one first further wireless device and to the at least one second further wireless device based on the geographical information, and wherein the beamforming controller is configured to control a transmit antenna configuration of the antenna arrangement to steer the data transmission beam towards the at least one first further wireless device and to the at least one second further wireless device and to adjust an opening angle of the data transmission beam based on the determined distance.

Example 234 is a wireless coordinator device including a geographical information determiner configured to determine a position of at least one wireless device, a position of at least one first further wireless device, a position of at least one second further wireless device, and to determine whether a beam is impaired along a direct path from the wireless device to the at least one first further wireless device based on geographical information; a transmitter configured to transmit control information to the wireless device for controlling the wireless device to steer a data transmission beam towards the at least one second further wireless device if the geographical information determiner determines a beam is impaired along the direct path from the wireless device to the at least one first further wireless device.

In Example 235, the subject matter of Example 234 can optionally include wherein the transmitter is configured to transmit the control information to the wireless device to control a communication processor of the wireless device to generate transmission data for the data transmission beam for relay transmission by the at least one second further wireless device to a target wireless device.

In Example 236, the subject matter of Example 235 can optionally include wherein the transmitter is configured to transmit the control information to control the communication processor to generate identification information corresponding to the transmission data for the data transmission beam to identify the target wireless device, and a transmitter of the wireless device to transmit the identification information to the at least one second further wireless device.

In Example 237, the subject matter of any one of Examples 234 to 236 can optionally include wherein the transmitter is configured to transmit the control information to the wireless device for controlling the wireless device to steer the data transmission beam towards the at least one first further wireless device if the geographical information determiner determines no beam impairment is present along the direct path from the wireless device to the at least one first further wireless device.

In Example 238, the subject matter of any one of Examples 234 to 237 can optionally include wherein the geographical information determiner is configured to determine the position of the at least one first further wireless device and the position of the at least one second further wireless device by referring to first map data comprised by the geographical information, wherein the wireless coordinator device comprises a receiver configured to receive at least part of the first map data.

In Example 239, the subject matter of Example 238 can optionally include wherein the receiver is configured to periodically receive the at least part of the first map data.

In Example 240, the subject matter of any one of Examples 238 or 239 can optionally include wherein the receiver is configured to receive at least part of the first map data from at least one of the wireless device, the at least one first further wireless device and the at least one second further wireless device.

In Example 241, the subject matter of any one of Examples 234 to 240 can optionally include wherein the geographical information determiner is configured to determine whether the beam is impaired by referring to second map data comprised by the geographical information, the second map data comprising position information of one or more beam impairments.

In Example 242, the subject matter of Example 241 can optionally include wherein the one or more beam impairments include at least one static beam impairment, and wherein the second map data comprises a static portion comprising position information of the at least one static beam impairment, the static portion being pre-stored at a memory of the wireless coordinator device.

In Example 243, the subject matter of any one of Examples 241 or 242 can optionally include wherein the one or more beam impairments include at least one movable beam impairment, wherein the second map data comprises a dynamic portion comprising position information of the at least one movable beam impairment, and wherein the receiver is configured to receive the position information of the at least one movable beam impairment.

In Example 244, the subject matter of Example 243 can optionally include wherein the receiver is configured to periodically receive the position information of the at least one movable beam impairment.

In Example 245, the subject matter of any one of Examples 243 or 244 can optionally include wherein the receiver is configured to receive the position information of the at least one movable beam impairment from at least one of the wireless device, the at least one first further wireless device and the at least one second further wireless device.

In Example 246, the subject matter of any one of Examples 234 to 245 can optionally include wherein the wireless coordinator device is a base station of a radio communication system.

In Example 247, the subject matter of any one of Examples 234 to 245 can optionally include wherein the wireless coordinator device is a road side unit configured for vehicle-to-everything communication with the wireless device.

In Example 248, the subject matter of any one of Examples 234 to 247 can optionally include wherein the wireless coordinator device, the wireless device, the at least one first further wireless device, the at least one second further wireless device and the target wireless device are included in a mesh network of wireless devices configured for mutual device-to-device communication.

In Example 249, the subject matter of any one of Examples 234 to 248 can optionally include wherein the beam impairment is a signal blocker or an active source of signal interference.

In Example 250, the subject matter of any one of Examples 241 to 249 can optionally include wherein the one or more beam impairments comprise a building or a wall.

In Example 251, the subject matter of any one of Examples 241 to 250 can optionally include wherein the one or more beam impairments comprise a wireless signal source operating at a frequency band at least partially overlapping with a frequency band used by the wireless device.

In Example 252, the subject matter of any one of Examples 241 to 251 can optionally include wherein the one or more beam impairments comprise at least one Wireless Local Area Network access point.

In Example 253, the subject matter of any one of Examples 243 to 252 can optionally include wherein the at least one movable beam impairment includes at least one vehicle.

In Example 254, the subject matter of any one of Examples 243 to 253 can optionally include wherein the at least one movable beam impairment includes at least one temporarily installed facility.

In Example 255, the subject matter of any one of Examples 234 to 254 can optionally include wherein the wireless coordinator device, the wireless device, the at least one first further wireless device, the at least one second further wireless device and/or the target wireless device is a mobile terminal device.

Example 256 is a wireless device including an antenna arrangement comprising at least two antennas; a geographical information determiner configured to determine a distance from the wireless device to at least one first further wireless device and to at least one second further wireless device based on geographical information; a beamforming controller configured to control a transmit antenna configuration of the antenna arrangement to steer a data transmission beam towards the at least one first further wireless device and to the at least one second further wireless device and to adjust an opening angle of the data transmission beam based on the determined distance.

In Example 257, the subject matter of Example 256 can optionally include wherein the beamforming controller is configured to adjust the opening angle to be larger for a smaller distance.

In Example 258, the subject matter of any one of Examples 256 or 257 can optionally include wherein the geographical information determiner is configured to monitor the determined distance, and wherein the beamforming controller is configured to increase the opening angle while the distance decreases and to decrease the opening angle while the distance increases.

In Example 259, the subject matter of any one of Examples 256 to 258 can optionally include further comprising a communication processor configured to generate at least first transmission data for relay transmission by the at least one first further wireless device to at least one first target wireless device, and to generate at least second transmission data for relay transmission by the at least one second further wireless device to at least one second target wireless device.

In Example 260, the subject matter of Example 259 can optionally include wherein the communication processor is configured to generate first identification information corresponding to the at least first transmission data for identifying the at least one first target device, and to generate second identification information corresponding to the at least second transmission data for identifying the at least one second target device.

In Example 261, the subject matter of any one of Examples 256 to 260 can optionally include wherein the geographical information determiner is configured to monitor the determined distance and to compare the distance with a threshold, wherein the beamforming controller is configured to control the transmit antenna configuration of the antenna arrangement to split the data transmission beam and to steer a first data transmission beam towards the at least one first further wireless device and to steer a second data transmission beam towards the at least one second further wireless device if the geographical information determiner determines the distance to be below the threshold.

In Example 262, the subject matter of any one of Examples 256 to 261 can optionally include wherein the antenna arrangement comprises at least two antenna arrays each including a plurality of antennas and being configured to generate respective data transmission beams within a corresponding angular range, wherein the beamforming controller is configured to select at least one of the at least two antenna arrays and to control the plurality of antennas of the at least one selected antenna array to steer the data transmission beam towards the at least one first further wireless device and to the at least one second further wireless device.

In Example 263, the subject matter of any one of Examples 261 or 262 can optionally include wherein the beamforming controller is configured to select a first one of the at least two antenna arrays and to control the plurality of antennas of the first one selected antenna array to steer the first data transmission beam towards the at least one first further wireless device and to select a second one of the at least two antenna arrays and to control the plurality of antennas of the second one selected antenna array to steer the second data transmission beam towards the at least one second further wireless device if the geographical information determiner determines the distance to be below the threshold.

In Example 264, the subject matter of any one of Examples 256 to 263 can optionally include wherein the distance to the at least one first further wireless device and to the at least one second further wireless device is one of a mean distance, a maximum distance, and a minimum distance.

In Example 265, the subject matter of any one of Examples 256 to 264 can optionally include wherein the geographical information determiner is configured to determine the distance to the at least one first further wireless device and to the at least one second further wireless device by referring to first map data comprised by the geographical information, wherein the wireless device comprises a receiver configured to receive at least part of the first map data.

In Example 266, the subject matter of Example 265 can optionally include wherein the receiver is configured to periodically receive the at least part of the first map data.

In Example 267, the subject matter of any one of Examples 265 or 266 can optionally include wherein the receiver is configured to receive at least part of the first map data from at least one of the at least one first further wireless device and the at least one second further wireless device.

In Example 268, the subject matter of any one of Examples 265 or 266 can optionally include wherein the receiver is configured to receive at least part of the first map data from a wireless coordinator device.

In Example 269, the subject matter of any one of Examples 256 to 268 can optionally include wherein the wireless device, the at least one first further wireless device, and the at least one second further wireless device are included in a mesh network of wireless devices configured for mutual device-to-device communication.

In Example 270, the subject matter of Example 269 can optionally include wherein the wireless device, the at least one first further wireless device, and/or the at least one second further wireless device is a mobile terminal device.

In Example 271, the subject matter of any one of Examples 256 to 268 can optionally include wherein the wireless device is a road side unit configured for vehicle-to-everything communication.

In Example 272, the subject matter of any one of Examples 256 to 268 can optionally include wherein the wireless device is a base station of a radio communication system.

In Example 273, the subject matter of Example 268 can optionally include wherein the wireless coordinator device is a base station of a radio communication system.

In Example 274, the subject matter of Example 268 can optionally include wherein the wireless coordinator device is a wireless device included in a mesh network of wireless devices configured for mutual device-to-device communication.

In Example 275, the subject matter of Example 268 can optionally include wherein the wireless coordinator device is a road side unit configured for vehicle-to-everything communication with the wireless device.

Example 276 is communication method of a wireless device comprising an antenna arrangement with at least two antennas, the method comprising: determining a position of at least one first further wireless device and a position of at least one second further wireless device, determining whether a beam is impaired along a direct path from the wireless device to the at least one first further wireless device based on geographical information; controlling a transmit antenna configuration of the antenna arrangement to steer a data transmission beam towards the at least one second further wireless device if a beam is impaired along the direct path from the wireless device to the at least one first further wireless device.

In Example 277, the subject matter of Example 276 may further include generating transmission data for the data transmission beam for relay transmission by the at least one second further wireless device to a target wireless device.

In Example 278, the subject matter of Example 277 may further include generating identification information corresponding to the transmission data for the data transmission beam to identify the target wireless device, and transmitting the identification information to the at least one second further wireless device In Example 279, the subject matter of any one of Examples 276 to 278 may further include controlling the transmit antenna configuration of the antenna arrangement to steer a data transmission beam towards the at least one first further wireless device if no beam impairment is present along the direct path from the wireless device to the at least one first further wireless device.

In Example 280, the subject matter of any one of Examples 276 to 279 may further include determining the position of the at least one first further wireless device and the position of the at least one second further wireless device by referring to first map data comprised by the geographical information, and receiving the first map data.

In Example 281, the subject matter of Example 280 may further include wherein the receiving the first map data comprises periodically receiving the first map data.

In Example 282, the subject matter of any one of Examples 280 or 281 may further include receiving the first map data from at least one of the at least one first further wireless device and the at least one second further wireless device.

In Example 283, the subject matter of any one of Examples 280 or 281 may further include receiving the first map data from a wireless coordinator device.

In Example 284, the subject matter of any one of Examples 276 to 283 may further include determining whether the beam is impaired by referring to second map data comprised by the geographical information, the second map data comprising position information of one or more beam impairments.

In Example 285, the subject matter of Example 284 may further include wherein the one or more beam impairments include at least one static beam impairment, and wherein the method comprises pre-storing a static portion of the second map data comprising position information of the at least one static beam impairment at a memory of the wireless device.

In Example 286, the subject matter of any one of Examples 284 or 285 may further include wherein the one or more beam impairments include at least one movable beam impairment, wherein the second map data comprises a dynamic portion comprising position information of the at least one movable beam impairment, the method comprising receiving the position information of the at least one movable beam impairment.

In Example 287, the subject matter of Example 286 may further include wherein the receiving the position information of the at least one movable beam impairment comprises periodically receiving the position information of the at least one movable beam impairment.

In Example 288, the subject matter of any one of Examples 286 or 287 may further include receiving the position information of the at least one movable beam impairment from at least one of the at least one first further wireless device and the at least one second further wireless device.

In Example 289, the subject matter of any one of Examples 286 or 287 may further include receiving the position information of the at least one movable beam impairment from a wireless coordinator device.

In Example 290, the subject matter of any one of Examples 283 to 289 may further include wherein the wireless coordinator device is a base station of a radio communication system.

In Example 291, the subject matter of any one of Examples 283 to 289 may further include wherein the wireless coordinator device is a road side unit configured for vehicle-to-everything communication with the wireless device.

In Example 292, the subject matter of any one of Examples 276 to 291 may further include wherein the wireless device, the at least one first further wireless device, the at least one second further wireless device and the target wireless device are included in a mesh network of wireless devices configured for mutual device-to-device communication.

In Example 293, the subject matter of any one of Examples 283 to 292 may further include wherein the wireless coordinator device is a wireless device included in the mesh network of wireless devices configured for mutual device-to-device communication.

In Example 294, the subject matter of any one of Examples 276 to 293 may further include wherein the beam impairment is a signal blocker or an active source of signal interference.

In Example 295, the subject matter of any one of Examples 284 to 294 may further include wherein the one or more beam impairments comprise a building or a wall.

In Example 296, the subject matter of any one of Examples 284 to 295 may further include wherein the one or more beam impairments comprise a wireless signal source operating at a frequency band at least partially overlapping with a frequency band used by the wireless device.

In Example 297, the subject matter of any one of Examples 284 to 296 may further include wherein the one or more beam impairments comprise at least one Wireless Local Area Network access point.

In Example 298, the subject matter of any one of Examples 286 to 297 may further include wherein the at least one movable beam impairment includes at least one vehicle.

In Example 299, the subject matter of any one of Examples 286 to 298 may further include wherein the at least one movable beam impairment includes at least one temporarily installed facility.

In Example 300, the subject matter of any one of Examples 276 to 299 may further include wherein the wireless device, the at least one first further wireless device, the at least one second further wireless device and/or the target wireless device is a mobile terminal device.

In Example 301, the subject matter of any one of Examples 276 to 300 may further include determining a distance to the at least one first further wireless device and to the at least one second further wireless device based on the geographical information, and controlling a transmit antenna configuration of the antenna arrangement to steer the data transmission beam towards the at least one first further wireless device and to the at least one second further wireless device and to adjust an opening angle of the data transmission beam based on the determined distance.

Example 302 is a communication method of a wireless coordinator device comprising determining a position of at least one wireless device, a position of at least one first further wireless device, and a position of at least one second further wireless device; determining whether a beam is impaired along a direct path from the wireless device to the at least one first further wireless device based on geographical information; transmitting control information to the wireless device for controlling the wireless device to steer a data transmission beam towards the at least one second further wireless device if a beam is impaired along the direct path from the wireless device to the at least one first further wireless device.

In Example 303, the subject matter of Example 302 may further include transmitting the control information to control a communication processor of the wireless device to generate transmission data for the data transmission beam for relay transmission by the at least one second further wireless device to a target wireless device.

In Example 304, the subject matter of Example 303 may further include transmitting the control information to control the communication processor to generate identification information corresponding to the transmission data for the data transmission beam to identify the target wireless device, and to control a transmitter of the wireless device to transmit the identification information to the at least one second further wireless device.

In Example 305, the subject matter of any one of Examples 302 to 304 may further include transmitting the control information to the wireless device for controlling the wireless device to steer the data transmission beam towards the at least one first further wireless device if no beam impairment is present along the direct path from the wireless device to the at least one first further wireless device.

In Example 306, the subject matter of any one of Examples 302 to 305 may further include determining the position of the at least one first further wireless device and the position of the at least one second further wireless device by referring to first map data comprised by the geographical information, the method comprising receiving the position information.

In Example 307, the subject matter of Example 306 may further include wherein the receiving the first map data comprises periodically receiving the first map data.

In Example 308, the subject matter of any one of Examples 306 or 307 may further include receiving the first map data from at least one of the wireless device, the at least one first further wireless device and the at least one second further wireless device.

In Example 309, the subject matter of any one of Examples 302 to 308 may further include determining whether the beam is impaired by referring to second map data comprised by the geographical information, the second map data comprising position information of one or more beam impairments.

In Example 310, the subject matter of Example 309 may further include wherein the one or more beam impairments include at least one static beam impairment, the method comprising pre-storing a static portion of the second map data comprising position information of the at least one static beam impairment at a memory of the wireless coordinator device.

In Example 311, the subject matter of any one of Examples 309 or 310 may further include wherein the one or more beam impairments include at least one movable beam impairment, wherein the second map data comprises a dynamic portion comprising position information of the at least one movable beam impairment, the method comprising receiving the position information of the at least one movable beam impairment.

In Example 312, the subject matter of Example 311 may further include wherein the receiving the position information of the at least one movable beam impairment comprises periodically receiving the position information of the at least one movable beam impairment.

In Example 313, the subject matter of any one of Examples 311 or 312 may further include receiving the position information of the at least one movable beam impairment from at least one of the wireless device, the at least one first further wireless device and the at least one second further wireless device.

In Example 314, the subject matter of any one of Examples 302 to 313 may further include wherein the wireless coordinator device is a base station of a radio communication system.

In Example 315, the subject matter of any one of Examples 302 to 313 may further include wherein the wireless coordinator device is a road side unit configured for vehicle-to-everything communication with the wireless device.

In Example 316, the subject matter of any one of Examples 302 to 315 may further include wherein the wireless coordinator device, the wireless device, the at least one first further wireless device, the at least one second further wireless device and the target wireless device are included in a mesh network of wireless devices configured for mutual device-to-device communication.

In Example 317, the subject matter of any one of Examples 302 to 316 may further include wherein the beam impairment is a signal blocker or an active source of signal interference.

In Example 318, the subject matter of any one of Examples 309 to 317 may further include wherein the one or more beam impairments comprise a building or a wall.

In Example 319, the subject matter of any one of Examples 309 to 318 may further include wherein the one or more beam impairments comprise a wireless signal source operating at a frequency band at least partially overlapping with a frequency band used by the wireless device.

In Example 320, the subject matter of any one of Examples 309 to 319 may further include wherein the one or more beam impairments comprise at least one Wireless Local Area Network access point.

In Example 321, the subject matter of any one of Examples 311 to 320 may further include wherein the at least one movable beam impairment includes at least one vehicle.

In Example 322, the subject matter of any one of Examples 311 to 321 may further include wherein the at least one movable beam impairment includes at least one temporarily installed facility.

In Example 323, the subject matter of any one of Examples 302 to 322 may further include wherein the wireless coordinator device, the wireless device, the at least one first further wireless device, the at least one second further wireless device and/or the target wireless device is a mobile terminal device.

Example 324 is a communication method of a wireless device comprising an antenna arrangement with at least two antennas, the method comprising determining a distance from the wireless device to at least one first further wireless device and to at least one second further wireless device based on geographical information; controlling a transmit antenna configuration of the antenna arrangement to steer a data transmission beam towards the at least one first further wireless device and to the at least one second further wireless device and to adjust an opening angle of the data transmission beam based on the determined distance.

In Example 325, the subject matter of Example 324 may further include adjusting the opening angle to be larger for a smaller distance.

In Example 326, the subject matter of any one of Examples 324 or 325 may further include monitoring the distance, and increasing the opening angle while the distance decreases and decreasing the opening angle while the distance increases.

In Example 327, the subject matter of any one of Examples 324 to 326 may further include generating at least first transmission data for relay transmission by the at least one first further wireless device to at least one first target wireless device, and generating at least second transmission data for relay transmission by the at least one second further wireless device to at least one second target wireless device.

In Example 328, the subject matter of Example 327 may further include generating first identification information corresponding to the at least first transmission data for identifying the at least one first target device, and generating second identification information corresponding to the at least second transmission data for identifying the at least one second target device.

In Example 329, the subject matter of any one of Examples 324 to 328 may further include monitoring the distance; comparing the distance with a threshold; splitting the data transmission beam; and controlling the transmit antenna configuration of the antenna arrangement to steer a first data transmission beam towards the at least one first further wireless device and to steer a second data transmission beam towards the at least one second further wireless device if the distance is determined to be below the threshold.

In Example 330, the subject matter of any one of Examples 324 to 329 may further include wherein the antenna arrangement comprises at least two antenna arrays each including a plurality of antennas and being configured to generate respective data transmission beams within a corresponding angular range, the method further comprising: selecting at least one of the at least two antenna arrays; controlling the plurality of antennas of the at least one selected antenna array to steer the data transmission beam towards the at least one first further wireless device and to the at least one second further wireless device.

In Example 331, the subject matter of any one of Examples 329 or 330 may further include selecting a first one of the at least two antenna arrays; controlling the plurality of antennas of the first one selected antenna array to steer the first data transmission beam towards the at least one first further wireless device; selecting a second one of the at least two antenna arrays; and controlling the plurality of antennas of the second one selected antenna array to steer the second data transmission beam towards the at least one second further wireless device if the distance is determined to be below the threshold.

In Example 332, the subject matter of any one of Examples 324 to 331 may further include wherein the distance to the at least one first further wireless device and to the at least one second further wireless device is one of a mean distance, a maximum distance, and a minimum distance.

In Example 333, the subject matter of any one of Examples 324 to 332 may further include determining the distance to the at least one first further wireless device and to the at least one second further wireless device by referring to first map data comprised by the geographical information, the method further comprising receiving the first map data.

In Example 334, the subject matter of Example 333 may further include wherein the receiving the position information comprises periodically receiving the first map data.

In Example 335, the subject matter of any one of Examples 333 or 334 may further include receiving the first map data from at least one of the at least one first further wireless device and the at least one second further wireless device.

In Example 336, the subject matter of any one of Examples 333 or 334 may further include receiving the first map data from a wireless coordinator device.

In Example 337, the subject matter of any one of Examples 324 to 336 may further include wherein the wireless device, the at least one first further wireless device, and the at least one second further wireless device are included in a mesh network of wireless devices configured for mutual device-to-device communication.

In Example 338, the subject matter of Example 337 may further include wherein the wireless device, the at least one first further wireless device, and/or the at least one second further wireless device is a mobile terminal device.

In Example 339, the subject matter of any one of Examples 324 to 336 may further include wherein the wireless device is a road side unit configured for vehicle-to-everything communication.

In Example 340, the subject matter of any one of Examples 324 to 336 may further include wherein the wireless device is a base station of a radio communication system.

In Example 341, the subject matter of Example 336 may further include wherein the wireless coordinator device is a base station of a radio communication system.

In Example 342, the subject matter of Example 336 may further include wherein the wireless coordinator device is a wireless device included in a mesh network of wireless devices configured for mutual device-to-device communication.

In Example 343, the subject matter of Example 336 may further include wherein the wireless coordinator device is a road side unit configured for vehicle-to-everything communication with the wireless device.

Example 344 is a non-transitory computer readable medium storing instructions that, when executed by one or more processors of a wireless device, cause the wireless device to perform the method of any one of Examples 276 to 301.

Example 345 is a wireless device comprising one or more processors; and a memory storing instructions that, when executed by the one or more processors, cause the wireless device to perform the method of any one of Examples 276 to 301.

Example 346 is a non-transitory computer readable medium storing instructions that, when executed by one or more processors of a wireless device, cause the wireless device to perform the method of any one of Examples 302 to 323.

Example 347 is a wireless device comprising one or more processors; and a memory storing instructions that, when executed by the one or more processors, cause the wireless device to perform the method of any one of Examples 302 to 323.

Example 348 is a non-transitory computer readable medium storing instructions that, when executed by one or more processors of a wireless device, cause the wireless device to perform the method of any one of Examples 324 to 343.

Example 142 is a wireless device comprising one or more processors; and a memory storing instructions that, when executed by the one or more processors, cause the wireless device to perform the method of any one of Examples 324 to 343.

Example 350 is a wireless device comprising a communication processor configured to: control device-to-device communications of the wireless device with at least one further wireless device based on data relating to mutual connections between wireless devices included in a network of wireless devices to communicate first data plane data with the at least one further wireless device, determine a network control acceptance criterion, and switch to control device-to-device communications of the wireless device with the at least one further wireless device based on control plane data received from at least one network access node to communicate first data plane data with the at least one further wireless device based on a result of the determination.

In Example 351, the subject matter of Example 350 can optionally include wherein the network control acceptance criterion corresponds to user input and/or accessibility of a network access node and/or communication quality of a current device-to-device data communication link, and/or a hierarchy level of the network access node.

In Example 352, the subject matter of any one of Examples 350 or 351 can optionally include further comprising a transmitter configured to transmit a request message for control plane data to the network access node.

In Example 353, the subject matter of Example 352 can optionally include wherein the communication processor is configured to switch to control of device-to-device communications of the wireless device with the at least one further wireless device based on received control plane data if the receiver receives an acknowledgement message from the network access node in response to the request message for control plane data to the network access node.

In Example 354, the subject matter of any one of Examples 350 to 353 can optionally include wherein transmitter is configured to transmit the request message for control plane data to the network access node based on the result of the determination of the network control acceptance criterion.

In Example 355, the subject matter of any one of Examples 350 to 354 can optionally include wherein the receiver is configured to receive notification information from the network access node notifying a transmission of control plane data from the network access node to the wireless device.

In Example 356, the subject matter of Example 355 can optionally include wherein the communication processor is configured to switch to control of device-to-device communications of the wireless device with the at least one further wireless device based on received control plane data in response to the received notification information.

In Example 357, the subject matter of Example 356 can optionally include wherein the communication processor is configured to disregard the received notification based on the result of the determination of the network control acceptance criterion.

In Example 358, the subject matter of any one of Examples 350 to 357 can optionally include wherein the communication processor is configured to control device-to-device communications of the wireless device with the at least one further wireless device based on data relating to mutual connections between wireless devices included in the network of wireless devices to communicate second data plane data with the at least one further wireless device while the communication processor controls the device-to-device communications of the wireless device based on the received control plane data.

In Example 359, the subject matter of any one of Examples 350 to 358 can optionally include wherein the transmitter is further configured to transmit termination information to the network access node for causing the network access node to terminate transmission of control plane information to the wireless device.

In Example 360, the subject matter of any one of Examples 350 to 359 can optionally include wherein the receiver is configured to receive information from the network access node causing the receiver to terminate reception of control plane information from the network access node.

In Example 361, the subject matter of any one of Examples 350 to 360 can optionally include wherein the communication processor is configured to switch control of device-to-device communications of the wireless device with the at least one further wireless device based on data relating to mutual connections between wireless devices included in the network of wireless devices if the receiver terminates reception of control plane information.

In Example 362, the subject matter of any one of Examples 350 to 361 can optionally include wherein the transmitter is configured to transmit a request message for network access node identification information to at least one further network access node; the receiver is configured to receive network access node identification information identifying the network access node from the at least one further network access node; and the transmitter is configured to transmit the request message for control plane data to the network access node based on the received network access node identification information.

In Example 363, the subject matter of any one of Examples 350 to 362 can optionally include wherein the control plane data comprises time and/or frequency allocation information and/or application prioritization information.

In Example 364, the subject matter of any one of Examples 350 to 363 can optionally include wherein the at least one further wireless device is included in the network of wireless devices, and wherein the control plane data comprises routing information identifying at least one route within the network of wireless devices for the first data plane data to be transmitted from the wireless device to the at least one further wireless device.

In Example 365, the subject matter of Example 364 can optionally include wherein the at least one route identified by the routing information comprises at least one relayed route and the routing information further identifies one or more relaying wireless devices included in the network of wireless devices for relaying at least a respective part of the first data plane data from the wireless device to the at least one further wireless device.

In Example 366, the subject matter of any one of Examples 364 or 365 can optionally include wherein the at least one route identified by the routing information comprises a direct route for transmitting at least a respective part of the first data plane data directly from the wireless device to the at least one further wireless device.

In Example 367, the subject matter of any one of Examples 365 or 366 can optionally include wherein the control plane information comprises interleaving information for controlling spatial interleaving of respective parts of the first data plane data transmitted via the at least one route identified by the routing information.

In Example 368, the subject matter of any one of Examples 350 to 367 can optionally include wherein the transmitter is configured to transmit the request message for control plane data to the network access node to at least one further wireless device to be relayed by the at least one further wireless device to the network access node.

In Example 369, the subject matter of any one of Examples 350 to 368 can optionally include wherein the receiver is configured to receive data plane data from the at least one further wireless device via a millimeter wave communications channel.

In Example 370, the subject matter of any one of Examples 350 to 369 can optionally include wherein the network access node is a base station of a cellular communication system or a Wireless Local Area Network access point.

In Example 371, the subject matter of any one of Examples 362 to 370 can optionally include wherein the at least one further network access node is a base station of a cellular communication system or a Wireless Local Area Network access point.

In Example 372, the subject matter of any one of Examples 350 to 371 can optionally include wherein the network of wireless devices is a device-to-device mesh network.

In Example 373, the subject matter of any one of Examples 350 to 372 can optionally include wherein the wireless device and the at least one further wireless device are included in the network of wireless devices.

In Example 374, the subject matter of any one of Examples 350 to 373 can optionally include wherein the receiver is configured to receive data relating to mutual connections between wireless devices included in the network of wireless devices from the at least one further wireless device.

Example 375 is a communication method for a wireless device comprising controlling device-to-device communications of the wireless device with at least one further wireless device based on data relating to mutual connections between wireless devices included in a network of wireless devices to communicate first data plane data with the at least one further wireless device, determining a network control acceptance criterion, and switching to control device-to-device communications of the wireless device with the at least one further wireless device based on control plane data received from at least one network access node to communicate first data plane data with the at least one further wireless device based on a result of the determination.

In Example 376, the subject matter of Example 375 may further include wherein the network control acceptance criterion corresponds to user input and/or accessibility of a network access node and/or communication quality of a current device-to-device data communication link, and/or a hierarchy level of the network access node.

In Example 377, the subject matter of any one of Examples 375 or 376 may further include transmitting a request message for control plane data to the network access node.

In Example 378, the subject matter of Example 377 may further include switching to control of device-to-device communications of the wireless device with the at least one further wireless device based on received control plane data if the receiver receives an acknowledgement message from the network access node in response to the request message for control plane data to the network access node.

In Example 379, the subject matter of any one of Examples 375 to 378 may further include transmitting the request message for control plane data to the network access node based on the result of the determination of the network control acceptance criterion.

In Example 380, the subject matter of any one of Examples 375 to 379 may further include receiving notification information from the network access node notifying a transmission of control plane data from the network access node to the wireless device.

In Example 381, the subject matter of Example 380 may further include switching to control of device-to-device communications of the wireless device with the at least one further wireless device based on received control plane data in response to the received notification information.

In Example 382, the subject matter of Example 381 may further include disregarding the received notification based on the result of the determination of the network control acceptance criterion.

In Example 383, the subject matter of any one of Examples 375 to 382 may further include controlling device-to-device communications of the wireless device with the at least one further wireless device based on data relating to mutual connections between wireless devices included in the network of wireless devices to communicate second data plane data with the at least one further wireless device while the communication processor controls the device-to-device communications of the wireless device based on the received control plane data.

In Example 384, the subject matter of any one of Examples 375 to 383 may further include transmitting termination information to the network access node for causing the network access node to terminate transmission of control plane information to the wireless device.

In Example 385, the subject matter of any one of Examples 375 to 384 may further include receiving information from the network access node causing the receiver to terminate reception of control plane information from the network access node.

In Example 386, the subject matter of any one of Examples 375 to 385 may further include switching control of device-to-device communications of the wireless device with the at least one further wireless device based on data relating to mutual connections between wireless devices included in the network of wireless devices if the receiver terminates reception of control plane information.

In Example 387, the subject matter of any one of Examples 375 to 386 may further include transmitting a request message for network access node identification information to at least one further network access node; receiving network access node identification information identifying the network access node from the at least one further network access node; and transmitting the request message for control plane data to the network access node based on the received network access node identification information.

In Example 388, the subject matter of any one of Examples 375 to 387 may further include wherein the control plane data comprises time and/or frequency allocation information and/or application prioritization information.

In Example 389, the subject matter of any one of Examples 375 to 388 may further include wherein the at least one further wireless device is included in the network of wireless devices, and wherein the control plane data comprises routing information identifying at least one route within the network of wireless devices for the first data plane data to be transmitted from the wireless device to the at least one further wireless device.

In Example 390, the subject matter of Example 389 may further include wherein the at least one route identified by the routing information comprises at least one relayed route and the routing information further identifies one or more relaying wireless devices included in the network of wireless devices for relaying at least a respective part of the first data plane data from the wireless device to the at least one further wireless device.

In Example 391, the subject matter of any one of Examples 389 or 390 may further include wherein the at least one route identified by the routing information comprises a direct route for transmitting at least a respective part of the first data plane data directly from the wireless device to the at least one further wireless device.

In Example 392, the subject matter of any one of Examples 390 or 391 may further include wherein the control plane information comprises interleaving information for controlling spatial interleaving of respective parts of the first data plane data transmitted via the at least one route identified by the routing information.

In Example 393, the subject matter of any one of Examples 375 to 392 may further include transmitting the request message for control plane data to the network access node to at least one further wireless device to be relayed by the at least one further wireless device to the network access node.

In Example 394, the subject matter of any one of Examples 375 to 393 may further include receiving data plane data from the at least one further wireless device via a millimeter wave communications channel.

In Example 395, the subject matter of any one of Examples 375 to 394 may further include wherein the network access node is a base station of a cellular communication system or a Wireless Local Area Network access point.

In Example 396, the subject matter of any one of Examples 387 to 395 may further include wherein the at least one further network access node is a base station of a cellular communication system or a Wireless Local Area Network access point.

In Example 397, the subject matter of any one of Examples 375 to 396 may further include wherein the network of wireless devices is a device-to-device mesh network.

In Example 398, the subject matter of any one of Examples 375 to 397 may further include wherein the wireless device and the at least one further wireless device are included in the network of wireless devices.

In Example 399, the subject matter of any one of Examples 375 to 398 may further include receiving data relating to mutual connections between wireless devices included in the network of wireless devices from the at least one further wireless device.

Example 400 is a non-transitory computer readable medium storing instructions that, when executed by one or more processors of a wireless device, cause the wireless device to perform the method of any one of Examples 375 to 399.

Example 401 is a wireless device comprising: one or more processors; and a memory storing instructions that, when executed by the one or more processors, cause the wireless device to perform the method of any one of Examples 375 to 399.

Example 402 is a wireless device comprising a receiver configured to receive at least one data transmission signal from at least one first network access node; and a signal processor configured to process the received at least one data transmission signal based on wireless device specific control data corresponding to at least one further wireless device to extract first data from the data transmission signal.

In Example 403, the subject matter of Example 402 can optionally include wherein the at least one data transmission signal comprises a first data signal transmitted from the first network access node and carrying the first data addressed to the wireless device and at least one second data signal transmitted from at least one second network access node and carrying second data addressed to the at least one further wireless device.

In Example 404, the subject matter of Example 403 can optionally include wherein the receiver is configured to receive the wireless device specific control data corresponding to the at least one further wireless device from the second network access node.

In Example 405, the subject matter of Example 404 can optionally include further comprising a transmitter configured to transmit a request message to the second network access node to request transmission of the wireless device specific control data corresponding to the at least one further wireless device.

In Example 406, the subject matter of any one of Examples 402 to 405 can optionally include wherein the receiver is configured to receive the wireless device specific control data corresponding to the at least one further wireless device from the at least one further wireless device via a device-to-device communication link.

In Example 407, the subject matter of any one of Examples 402 to 406 can optionally include further comprising a transmitter configured to transmit wireless device specific control data corresponding to the wireless device to the at least one further wireless device via a device-to-device communication link.

In Example 408, the subject matter of any one of Examples 406 to 407 can optionally include further comprising a transmitter configured to transmit a request message for requesting transmission of wireless device specific control data of the at least one further wireless device to the at least one further wireless device via the device-to-device communication link.

In Example 409, the subject matter of Example 408 can optionally include wherein the transmitter is configured to broadcast the request message.

In Example 410, the subject matter of any one of Examples 406 to 409 can optionally include wherein the device-to-device communication link is an autonomous device-to-device communication link not controlled by a network access node.

In Example 411, the subject matter of any one of Examples 406 to 410 can optionally include further comprising a communication processor configured to control device-to-device communications of the wireless device with the at least one further wireless device based on data relating to mutual connections between wireless devices included in a network of wireless devices.

In Example 412, the subject matter of any one of Examples 406 to 411 can optionally include wherein the receiver is configured to receive the wireless device specific control data included in a physical Cellular Assistant Control Channel carrying the wireless device specific control data via the device-to-device communication link.

In Example 413, the subject matter of Example 412 can optionally include wherein the received Cellular Assistant Control Channel comprises network access node identification information identifying the second network access node.

In Example 414, the subject matter of any one of Examples 412 to 413 can optionally include wherein the receiver is configured to receive wireless device specific control data corresponding to at least two further wireless devices included in respective physical Cellular Assistant Control Channels carrying the corresponding wireless device specific control data corresponding to each one of the at least two further wireless devices via the device-to-device communication link, wherein each Cellular Assistant Control Channel is associated with geographical information of a corresponding one of the at least two further wireless devices, and wherein the signal processor is configured to prioritize processing of the data transmission signal based on the associated geographical information.

In Example 415, the subject matter of any one of Examples 406 to 414 can optionally include wherein the receiver is configured to receive resource alignment information from the at least one further wireless device via the device-to-device communication link, and wherein the signal processor is configured to determine a time or frequency position of predefined symbols included in the second data based on the received resource alignment information and to apply interference cancellation to the received data transmission signal based on the predefined symbols positioned at the determined time and/or frequency position.

In Example 416, the subject matter of Example 415 can optionally include wherein the receiver is configured to receive the resource alignment information included in the physical Cellular Assistant Control Channel.

In Example 417, the subject matter of any one of Examples 402 to 416 can optionally include wherein the wireless device specific control data comprises wireless device specific parameters of a configuration of a wireless device specific reference signal of the at least one further wireless device.

In Example 418, the subject matter of Example 417 can optionally include wherein the wireless device specific parameters comprise at least one seed for generating a wireless device specific reference signal de-scrambling code or wireless device specific reference signal time or frequency allocation information.

In Example 419, the subject matter of any one of Examples 417 to 418 can optionally include wherein the reference signal corresponds to a Demodulation Reference Signal and/or to a Channel State Information-Reference Signal or to a Tracking Reference Signal, and/or to a Phase Tracking Reference Signal.

In Example 420, the subject matter of any one of Examples 403 to 419 can optionally include wherein the wireless device specific control data comprises a Physical cell ID of the second network access node.

In Example 421, the subject matter of any one of Examples 403 to 420 can optionally include wherein the first network access node is a serving base station of the wireless device and wherein the second network access node is a serving base station of the at least one further wireless device.

In Example 422, the subject matter of any one of Examples 403 to 421 can optionally include wherein the first network access node and the second network access node are connected to different communication networks.

In Example 423, the subject matter of any one of Examples 402 to 422 can optionally include wherein the signal processor is configured to process the received data transmission signal based on the wireless device specific control data corresponding to the at least one further wireless to extract the first data from the data transmission signal by employing interference cancellation.

In Example 424, the subject matter of any one of Examples 403 to 423 can optionally include wherein at least one of the first network access node and the second network access node is a base station.

In Example 425, the subject matter of any one of Examples 402 to 424 can optionally include further configured to communicate data at carrier frequencies within a sub 6 GHz band.

Example 426 is a wireless device comprising a receiver configured to receive at least one data transmission signal from at least one network access node; and a transmitter configured to transmit wireless device specific control data corresponding to the wireless device to at least one further wireless device.

In Example 427, the subject matter of Example 426 can optionally include wherein the transmitter is configured to transmit the wireless device specific control data corresponding to the wireless device to the at least one further wireless device via a device-to-device communication link.

In Example 428, the subject matter of any one of Examples 426 to 427 can optionally include further comprising a receiver configured to receive a request message for requesting transmission of wireless device specific control data of the wireless device from the at least one further wireless device.

In Example 429, the subject matter of any one of Examples 426 to 428 can optionally include wherein the transmitter is configured to broadcast the wireless device specific control data corresponding to the wireless device.

In Example 430, the subject matter of any one of Examples 427 to 429 can optionally include wherein the device-to-device communication link is an autonomous device-to-device communication link not controlled by a network access node.

In Example 431, the subject matter of any one of Examples 426 to 430 can optionally include further comprising a communication processor configured to control device-to-device communications of the wireless device with the at least one further wireless device based on data relating to mutual connections between wireless devices included in a network of wireless devices.

In Example 432, the subject matter of any one of Examples 426 to 431 can optionally include wherein the transmitter is configured to transmit the wireless device specific control data included in a physical Cellular Assistant Control Channel carrying the wireless device specific control data via the device-to-device communication link.

In Example 433, the subject matter of Example 432 can optionally include wherein the transmitted Cellular Assistant Control Channel comprises network access node identification information identifying the network access node.

In Example 434, the subject matter of any one of Examples 432 to 433 can optionally include wherein the Cellular Assistant Control Channel is associated with geographical information of the wireless device.

In Example 435, the subject matter of any one of Examples 426 to 434 can optionally include wherein the transmitter is configured to transmit resource alignment information to the at least one further wireless device via the device-to-device communication link.

In Example 436, the subject matter of Example 435 can optionally include wherein the transmitter is configured to transmit the resource alignment information included in the physical Cellular Assistant Control Channel.

In Example 437, the subject matter of any one of Examples 426 to 436 can optionally include wherein the wireless device specific control data comprises wireless device specific parameters of a configuration of a wireless device specific reference signal of the at least one further wireless device.

In Example 438, the subject matter of Example 437 can optionally include wherein the wireless device specific parameters comprise at least one seed for generating a wireless device specific reference signal de-scrambling code or wireless device specific reference signal time and/or frequency allocation information.

In Example 439, the subject matter of any one of Examples 437 to 438 can optionally include wherein the reference signal corresponds to a Demodulation Reference Signal and/or to a Channel State Information-Reference Signal and/or to a Tracking Reference Signal, and/or to a Phase Tracking Reference Signal.

In Example 440, the subject matter of any one of Examples 426 to 439 can optionally include wherein the wireless device specific control data comprises a Physical cell ID of the network access node.

In Example 441, the subject matter of any one of Examples 426 to 440 can optionally include wherein the network access node is a serving base station of the wireless device.

In Example 442, the subject matter of any one of Examples 426 to 441 can optionally include wherein the network access node is a base station.

In Example 443, the subject matter of any one of Examples 426 to 442 can optionally include further configured to communicate data at carrier frequencies within a sub 6 GHz band.

Example 444 is a communication method of a wireless device comprising receiving at least one data transmission signal from at least one first network access node; processing the received at least one data transmission signal based on wireless device specific control data corresponding to at least one further wireless device to extract first data from the data transmission signal.

In Example 445, the subject matter of Example 444 may further include wherein the at least one data transmission signal comprises a first data signal transmitted from the first network access node and carrying the first data addressed to the wireless device and at least one second data signal transmitted from at least one second network access node and carrying second data addressed to the at least one further wireless device.

In Example 446, the subject matter of any one of Examples 444 to 445 may further include receiving the wireless device specific control data corresponding to the at least one further wireless device from the second network access node.

In Example 447, the subject matter of Example 446 may further include transmitting a request message to the second network access node to request transmission of the wireless device specific control data corresponding to the at least one further wireless device.

In Example 448, the subject matter of any one of Examples 444 to 447 may further include receiving the wireless device specific control data corresponding to the at least one further wireless device from the at least one further wireless device via a device-to-device communication link.

In Example 449, the subject matter of any one of Examples 444 to 448 may further include transmitting wireless device specific control data corresponding to the wireless device to the at least one further wireless device via a device-to-device communication link.

In Example 450, the subject matter of any one of Examples 448 to 449 may further include transmitting a request message for requesting transmission of wireless device specific control data of the at least one further wireless device to the at least one further wireless device via the device-to-device communication link.

In Example 451, the subject matter of Example 450 may further include wherein the transmitting comprises broadcasting the request message.

In Example 452, the subject matter of any one of Examples 448 to 451 may further include wherein the device-to-device communication link is an autonomous device-to-device communication link not controlled by a network access node.

In Example 453, the subject matter of any one of Examples 448 to 452 may further include controlling device-to-device communications of the wireless device with the at least one further wireless device based on data relating to mutual connections between wireless devices included in a network of wireless devices.

In Example 454, the subject matter of any one of Examples 448 to 453 may further include receiving the wireless device specific control data included in a physical Cellular Assistant Control Channel carrying the wireless device specific control data via the device-to-device communication link.

In Example 455, the subject matter of Example 454 may further include wherein the received Cellular Assistant Control Channel comprises network access node identification information identifying the second network access node.

In Example 456, the subject matter of any one of Examples 454 to 455 may further include receiving wireless device specific control data corresponding to at least two further wireless devices included in respective physical Cellular Assistant Control Channels carrying the corresponding wireless device specific control data corresponding to each one of the at least two further wireless devices via the device-to-device communication link, wherein each Cellular Assistant Control Channel is associated with geographical information of a corresponding one of the at least two further wireless devices, and further comprising prioritizing processing of the data transmission signal based on the associated geographical information.

In Example 457, the subject matter of any one of Examples 448 to 456 may further include receiving resource alignment information from the at least one further wireless device via the device-to-device communication link, and determining a time or frequency position of predefined symbols included in the second data based on the received resource alignment information and applying interference cancellation to the received data transmission signal based on the predefined symbols positioned at the determined time and/or frequency position.

In Example 458, the subject matter of Example 457 may further include receiving the resource alignment information included in the physical Cellular Assistant Control Channel.

In Example 459, the subject matter of any one of Examples 444 to 458 may further include wherein the wireless device specific control data comprises wireless device specific parameters of a configuration of a wireless device specific reference signal of the at least one further wireless device.

In Example 460, the subject matter of Example 459 may further include wherein the wireless device specific parameters comprise at least one seed for generating a wireless device specific reference signal de-scrambling code and/or wireless device specific reference signal time or frequency allocation information.

In Example 461, the subject matter of any one of Examples 459 to 460 may further include wherein the reference signal corresponds to a Demodulation Reference Signal or to a Channel State Information-Reference Signal or to a Tracking Reference Signal, or to a Phase Tracking Reference Signal.

In Example 462, the subject matter of any one of Examples 445 to 461 may further include wherein the wireless device specific control data comprises a Physical cell ID of the second network access node.

In Example 463, the subject matter of any one of Examples 445 to 462 may further include wherein the first network access node is a serving base station of the wireless device and wherein the second network access node is a serving base station of the at least one further wireless device.

In Example 464, the subject matter of any one of Examples 445 to 463 may further include wherein the first network access node and the second network access node are connected to different communication networks.

In Example 465, the subject matter of any one of Examples 444 to 464 may further include processing the received data transmission signal based on the wireless device specific control data corresponding to the at least one further wireless to extract the first data from the data transmission signal by employing interference cancellation.

In Example 466, the subject matter of any one of Examples 445 to 465 may further include wherein at least one of the first network access node and the second network access node is a base station.

In Example 467, the subject matter of any one of Examples 444 to 466 may further include wherein the wireless device is configured to communicate data at carrier frequencies within a sub 407 GHz band.

Example 468 is a communication method of a wireless device comprising: receiving at least one data transmission signal from at least one network access node; transmitting wireless device specific control data corresponding to the wireless device to at least one further wireless device.

In Example 469, the subject matter of Example 468 may further comprise transmitting the wireless device specific control data corresponding to the wireless device to the at least one further wireless device via a device-to-device communication link.

In Example 470, the subject matter of any one of Examples 468 to 469 may further include receiving a request message for requesting transmission of wireless device specific control data of the wireless device from the at least one further wireless device.

In Example 471, the subject matter of any one of Examples 468 to 470 may further include wherein the transmitting comprises broadcasting the wireless device specific control data corresponding to the wireless device.

In Example 472, the subject matter of any one of Examples 469 to 471 may further include wherein the device-to-device communication link is an autonomous device-to-device communication link not controlled by a network access node.

In Example 473, the subject matter of any one of Examples 468 to 472 may further include controlling device-to-device communications of the wireless device with the at least one further wireless device based on data relating to mutual connections between wireless devices included in a network of wireless devices.

In Example 474, the subject matter of any one of Examples 468 to 473 may further include transmitting the wireless device specific control data included in a physical Cellular Assistant Control Channel carrying the wireless device specific control data via the device-to-device communication link.

In Example 475, the subject matter of Example 474 may further include wherein the transmitted Cellular Assistant Control Channel comprises network access node identification information identifying the network access node.

In Example 476, the subject matter of any one of Examples 474 to 475 may further include wherein the Cellular Assistant Control Channel is associated with geographical information of the wireless device.

In Example 477, the subject matter of any one of Examples 468 to 476 may further include transmitting resource alignment information to the at least one further wireless device via the device-to-device communication link.

In Example 478, the subject matter of Example 476 may further include transmitting the resource alignment information included in the physical Cellular Assistant Control Channel.

In Example 479, the subject matter of any one of Examples 468 to 478 may further include wherein the wireless device specific control data comprises wireless device specific parameters of a configuration of a wireless device specific reference signal of the at least one further wireless device.

In Example 480, the subject matter of Example 479 may further include wherein the wireless device specific parameters comprise at least one seed for generating a wireless device specific reference signal de-scrambling code and/or wireless device specific reference signal time and/or frequency allocation information.

In Example 481, the subject matter of any one of Examples 479 to 480 may further include wherein the reference signal corresponds to a Demodulation Reference Signal and/or to a Channel State Information-Reference Signal or to a Tracking Reference Signal, or to a Phase Tracking Reference Signal.

In Example 482, the subject matter of any one of Examples 468 to 481 may further include wherein the wireless device specific control data comprises a Physical cell ID of the network access node.

In Example 483, the subject matter of any one of Examples 468 to 482 may further include wherein the network access node is a serving base station of the wireless device.

In Example 484, the subject matter of any one of Examples 468 to 483 may further include wherein the network access node is a base station.

In Example 485, the subject matter of any one of Examples 468 to 484 may further include wherein the wireless device is configured to communicate data at carrier frequencies within a sub 6 GHz band.

Example 486 is a non-transitory computer readable medium storing instructions that, when executed by one or more processors of a wireless device, cause the wireless device to perform the method of any one of Examples 444 to 467.

Example 487 is a wireless device comprising one or more processors; and a memory storing instructions that, when executed by the one or more processors, cause the wireless device to perform the method of any one of Examples 444 to 467.

Example 488 is a non-transitory computer readable medium storing instructions that, when executed by one or more processors of a wireless device, cause the wireless device to perform the method of any one of Examples 468 to 485.

Example 489 is wireless device comprising one or more processors; and a memory storing instructions that, when executed by the one or more processors, cause the wireless device to perform the method of any one of Examples 468 to 485.

Example 490 is a method for wireless communication, the method including selecting, by a wireless device, a transmission pattern from a set of transmission patterns, wherein each transmission pattern of the set of transmission patterns designates a plurality of active time slots within a virtual frame, the virtual frame defining a number of consecutive time slots over one or more wireless resources, wirelessly transmitting, by the wireless device, a transmission on the one or more wireless resources according to the time slots designated by the selected transmission pattern.

In Example 491, the subject matter of Example 490 can optionally include wherein the selected transmission pattern is randomly selected from the set of transmission patterns.

In Example 492, the subject matter any of Examples 490 or 491 can optionally include wherein the transmission is a device-to-device (D2D) transmission.

In Example 493, the subject matter of any of Examples 490 to 492 can optionally include wherein each transmission pattern of the set of transmission patterns designates a plurality of non-consecutive time slots in the virtual frame.

In Example 494, the subject matter of Example 493 can optionally include wherein each transmission pattern of the set of transmission patterns is unique.

In Example 495, the subject matter of any of Examples 490 to 494 can optionally include wherein transmitting the transmission includes transmitting a replica of a packet or a message in each of the designated time slots according to the selected transmission pattern.

In Example 496, the subject matter of Example 495 can optionally include wherein the transmission includes a discovery request.

In Example 497, the subject matter of any of Examples 490 to 496 can optionally include wherein the set of transmission patterns is predefined.

In Example 498, the subject matter of any of Examples 490 to 497 can optionally include wherein selecting a transmission pattern includes obtaining an experienced level of wireless interference, determining the number of time slots for the virtual frame based on the obtained experienced interference level, and selecting the transmission pattern from a set of transmission patterns that each designate the plurality of time slots within the virtual frame with the determined number of consecutive time slots.

In Example 499, the subject matter of any of Examples 490 to 498 can optionally include wherein obtaining the experienced level of wireless interference includes wirelessly receiving the experienced level of wireless interference from a second wireless device.

In Example 500, the subject matter of any of Examples 490 to 499 can optionally include wherein transmitting the transmission includes transmitting the transmission directly to a second wireless device.

In Example 501, the subject matter of any of Examples 490 to 500 can optionally include wherein transmitting the transmission includes transmitting the transmission in a wireless network independent of a base station.

Example 502 is a wireless device, including one or more processors and one or more non-transitory computer readable media, the computer readable media including instructions to cause the wireless device, when executed by one or more processors to select, by the wireless device, a transmission pattern from a set of transmission patterns, wherein each transmission pattern of the set of transmission patterns designates a plurality of active time slots within a virtual frame, the virtual frame defining a number of consecutive time slots over one or more wireless resources, wirelessly transmit, by the wireless device, a transmission on the one or more wireless resources in the time slots designated by the selected transmission pattern.

In Example 503, the subject matter of Example 502 can optionally include wherein the wireless device selects the selected transmission pattern randomly from the set of transmission patterns.

In Example 504, the subject matter of any of Examples 502 or 503 can optionally include wherein the transmission is a device-to-device (D2D) transmission.

In Example 505, the subject matter of any of Examples 502 to 504 can optionally include wherein each transmission pattern of the set of transmission patterns designates a plurality of non-consecutive time slots in the virtual frame.

In Example 506, the subject matter of Example 505 can optionally include wherein each transmission pattern of the set of transmission is unique.

In Example 507, the subject matter of any of Examples 502 to 506 can optionally include wherein the instructions causing the wireless device to transmit the transmission includes the wireless device transmitting a replica of a packet or a message in each of the designated time slots according to the selected transmission pattern.

In Example 508, the subject matter of Example 507 can optionally include wherein the first transmission includes a discovery request.

In Example 509, the subject matter of any of Examples 502 to 508 can optionally include wherein the set of transmission patterns is predefined.

In Example 510, the subject matter of any of Examples 502 to 509 can optionally include wherein the wireless device caused to select a transmission pattern includes the wireless device further being caused to obtain an experienced level of wireless interference, determine the number of time slots for the virtual frame based on the obtained experienced interference level, and select the transmission pattern from a set of transmission patterns that each designate the plurality of time slots within the virtual frame with the determined number of consecutive time slots.

In Example 511, the subject matter of Example 510 can optionally include wherein the wireless device caused to obtain the experienced level of wireless interference includes the wireless device further caused to wirelessly receive the experienced level of wireless interference from a second wireless device.

In Example 512, the subject matter of any of Examples 502 to 511 can optionally include wherein the wireless device caused to transmit the transmission includes the wireless device caused to transmit the transmission directly to a second wireless device.

In Example 513, the subject matter of any of Examples 502 to 512 can optionally include wherein the wireless device caused to transmit the transmission includes the wireless device caused to transmit the transmission in a wireless network independent of a base station.

Example 514 is a method for wireless transmission, the method including obtaining, by a wireless device, a plurality of pilot sequences, randomly selecting, by the wireless device, one of the plurality of pilot sequences, and wirelessly transmitting, by the wireless device, a message including the selected pilot sequence.

In Example 515, the subject matter of Example 514 can optionally include wherein the plurality of pilot sequences is a set of orthogonal pilot sequences.

In Example 516, the subject matter of Example 515 can optionally include wherein obtaining the plurality of pilot sequence includes generating the plurality of pilot sequences.

In Example 517, the subject matter of any of Examples 514 to 516 can optionally include wherein the message is a packet, wherein selected pilot sequence is located in one or more predefined locations within a payload of the packet.

In Example 518, the subject matter of any of Examples 514 to 517 can optionally include wherein the message is discovery request message.

In Example 519, the subject matter of any of Examples 514 to 518 can optionally include wherein the message is wirelessly transmitted directly to a second wireless device.

Example 520 is a wireless device, including one or more processors and one or more non-transitory computer readable media, the computer readable media including instructions to cause the wireless device, when executed by one or more processors to obtain a plurality of pilot sequences, randomly select one of the plurality of pilot sequences, and wirelessly transmit a message including the selected pilot sequence.

In Example 521, the subject matter of Example 520 can optionally include wherein the plurality of pilot sequences is a set of orthogonal pilot sequences.

In Example 522, the subject matter of Example 521 can optionally include the wireless device being caused to obtain the plurality of pilot sequence includes the wireless device generating the plurality of pilot sequences.

In Example 523, the subject matter of any of Examples 520 to 522 can optionally include wherein the message is a packet, wherein selected pilot sequence is located in one or more predefined locations within a payload of the packet.

In Example 524, the subject matter of any of Example 520 to 523 can optionally include wherein the message is discovery request message.

In Example 525, the subject matter of any of Examples 520 to 524 can optionally include wherein the wireless device is caused to wirelessly transmit the message to a second wireless device.

Example 526 is a method for wireless communication, the method including obtaining, by a wireless device, a plurality of pilot sequences, randomly selecting, by the wireless device, one of the plurality of pilot sequences, selecting, by the wireless device, a transmission pattern from a set of transmission patterns, wherein each transmission pattern of the set of transmission patterns designates a plurality of consecutive time slots within a virtual frame, the virtual frame defining a number of consecutive time slots over one or more wireless resources, and wirelessly transmitting, by the wireless device, a first transmission on the one or more wireless resources according to the time slots designated by the selected transmission pattern, wherein the first transmission includes the selected pilot sequence.

Example 527 is a wireless device, including one or more processors and one or more non-transitory computer readable media, the computer readable media including instructions to cause the wireless device, when executed by one or more processors, to obtain a plurality of pilot sequences, randomly select one of the plurality of pilot sequences, select a transmission pattern from a set of transmission patterns, wherein each transmission pattern of the set of transmission patterns designates a plurality of time slots within a virtual frame, the virtual frame defining a number of consecutive time slots over one or more wireless resources, wirelessly transmit a first transmission on the one or more wireless resources according to the time slots designated by the selected transmission pattern, wherein the first transmission includes the selected pilot sequence.

Example 528 is a method for receiving in a wireless network, the method including obtaining, at a wireless device, a signal including a superposition of a plurality of transmitted signals, each of the transmitted signals including a pilot sequence, extracting pilot symbols from the obtained signal, applying a matched filter to the extracted symbols, and determining, based on output of the matched filter, which individual pilot sequences are active.

In Example 529, the subject matter of Example 528 can optionally further include determining an amount of active devices based on determined active individual pilot sequences.

In Example 530, the subject matter of Example 528 or 529 can optionally include wherein the individual pilot sequences are members of a predefined group of pilot sequences.

In Example 531, the subject matter of Example 530 can optionally include wherein the predefined group of pilot sequences is a group of orthogonal pilot sequences.

In Example 532, the subject matter of any of Examples 528 to 531 can optionally include wherein applying the matched filter to the extracted symbols includes multiplying the extracted symbols with a conjugate transpose of each pilot sequences of the predefined group of pilot sequences.

In Example 533, the subject matter of any of Examples 528 to 532 can optionally include wherein extracting symbols includes extracting symbols located in predefined pilot positions of the obtained signal.

In Example 534, the subject matter of any of Examples 528 to 533 can optionally further include normalizing each value from the output of the applied matched filter.

In Example 535, the subject matter of Example 534 can optionally include wherein determining which individual pilot sequences are active includes comparing each normalized value from the output of the applied matched filter with a threshold value.

In Example 536, the subject matter of any of Examples 528 to 535 can optionally include wherein determining, based on output of the matched filter, which individual pilot sequences are active includes, applying a neural network to the output of the matched filter, wherein an output of the neural network including a plurality of values, each value corresponding to a specific pilot sequence.

In Example 537, the subject matter of Example 536 can optionally include wherein the neural network is a single feedforward neural network.

In Example 538, the subject matter of Example 536 can optionally include wherein the neural network is a plurality of feedforward neural networks, each feedforward neural network corresponds to a unique pilot sequence.

In Example 539, the subject matter of Example 536 or 537 can optionally include wherein determining, based on output of the matched filter, which individual pilot sequences are active further includes, normalizing the output values from output of the neural network, and comparing the normalized values to a threshold value.

In Example 540, the subject matter of Example 539 can optionally include wherein threshold value is adaptable.

Example 541 is a wireless device, including one or more processors and one or more non-transitory computer readable media, the computer readable media including instructions to cause the wireless device, when executed by one or more processors to obtain at a wireless device, an obtained signal including a superposition of a plurality of transmitted signals, each of the transmitted signals including a pilot sequence, extract pilot symbols from the obtained signal, apply a matched filter to the extracted symbols, and determine, based on output of the matched filter, which individual pilot sequences are active.

In Example 542, the subject matter of Example 541 can optionally include wherein the executed instructions further cause the wireless device to determine an amount of active devices based on determined active individual pilot sequences.

In Example 543, the subject matter of Example 541 or 542 can optionally include wherein the individual pilot sequences are members of a predefined group of pilot sequences.

In Example 544, the subject matter of Example 543 can optionally include wherein the predefined group of pilot sequences is a group of orthogonal pilot sequences.

In Example 545, the subject matter of any of Examples 543 to 544 can optionally include wherein the wireless device being caused to apply the matched filter to the extracted symbols includes multiplying the extracted symbols with a conjugate transpose of each pilot sequences of the predefined group of pilot sequences.

In Example 546, the subject matter of any of Examples 541 to 545 can optionally include wherein the wireless device is caused to extract symbols by extracting symbols located in predefined pilot positions of the obtained signal.

In Example 547, the subject matter of any of Examples 541 to 546 can optionally include wherein the executed instructions further cause the wireless device to normalize each value from the output of the applied matched filter.

In Example 548, the subject matter of Example 547 can optionally include wherein the wireless device is caused to determine which individual pilot sequences are active includes by comparing each normalized value from the output of the applied matched filter with a threshold value.

In Example 549, the subject matter of any of Examples 541 to 546 can optionally include wherein the wireless device is caused to determine, based on output of the matched filter, which individual pilot sequences are active by applying a neural network to the output of the matched filter, wherein an output of the neural network including a plurality of values, each value corresponding to a specific pilot sequence.

In Example 550, the subject matter of Example 549 can optionally include wherein the neural network is a single feedforward neural network.

In Example 551, the subject matter of Example 549 can optionally include wherein the neural network is a plurality of feedforward neural networks, each feedforward neural network corresponds to a unique pilot sequence.

In Example 552, the subject matter of any of Examples 549 to 551 can optionally include wherein the wireless device is caused to determine, based on output of the matched filter, which individual pilot sequences are active further by normalizing the output values from output of the neural network, and comparing the normalized values to a threshold value.

In Example 553, the subject matter of Example 552 can optionally include wherein the threshold value is adaptable.

Example 554 is a method for receiving in a wireless network, the method including obtaining, at a wireless device, a signal including a superposition of a plurality of transmitted signals wherein two or more of the plurality of transmitted signals collide in a colliding time slot, determining, by the wireless device, a number of unique active pilot sequences from the obtained signal in the colliding time slot, selecting, by the wireless device, a channel estimation method based on the determined number of unique pilot sequences in the obtained signal, determining, by the wireless device, a number of successive interference cancellation (SIC) loops to implement in SIC based on the determined number of unique pilot sequences in the obtained signal, applying, by the wireless device, SIC to the obtained signal in the colliding time slot using the selected channel estimation method and the determined number of SIC loops.

In Example 555, the subject matter of Example 554 can optionally include wherein applying SIC to the obtained signal produces one or more of the plurality of the transmitted signals.

In Example 556, the subject matter of Example 554 to 555 can optionally include wherein each SIC loops decodes and extracts one of the plurality of transmitted signals from the obtained signal.

In Example 557, the subject matter of Example 556 can optionally include wherein determining the number of unique active pilot sequences includes determining a number of unique active pilot sequences from the obtained signal in the colliding time slot.

In Example 558, the subject matter of any of Examples 554 to 557 can optionally include wherein each of the plurality of transmitted signals of the obtained signal includes an orthogonal pilot sequence.

In Example 559, the subject matter of Example 558 can optionally include wherein each of the plurality of transmitted signals of the obtained signal includes an orthogonal pilot sequence from predefined set of unique orthogonal pilot sequences.

In Example 560, the subject matter of any of Examples 554 to 559 can optionally include wherein the selected channel estimation method is MMSE-MRC.

In Example 561, the subject matter of any of Examples 554 to 559 can optionally include wherein the selected channel estimation method is MMSE-IRC.

In Example 562, the subject matter of any of Examples 554 to 561 can optionally include wherein the number of SIC loops is 1.

In Example 563, the subject matter of any of Examples 554 to 561 can optionally include wherein the number of SIC loops is greater than 1.

Example 564 is a wireless device, including one or more processors and one or more non-transitory computer readable media, the computer readable media including instructions to cause the wireless device, when executed by one or more processors to obtain a signal including a superposition of a plurality of transmitted signals, wherein two or more of the plurality of transmitted signals collide in a colliding time slot, determine a number of unique active pilot sequences from the obtained signal in the colliding time slot, select a channel estimation method based on the determined number of unique pilot sequences in the obtained signal, determine a number of successive interference cancellation (SIC) loops to implement in SIC based on the determined number of unique pilot sequences in the obtained signal, and apply SIC to the obtained signal in the colliding time slot using the selected channel estimation method and the determined number of SIC loops.

In Example 565, the subject matter of Example 564 can optionally include wherein the instructions cause the wireless device to apply SIC to the obtained signal so as to produce one or more of the plurality of the transmitted signals.

In Example 566, the subject matter of Example 565 can optionally include wherein each SIC loops decodes and extracts one of the plurality of transmitted signals from the obtained signal.

In Example 567, the subject matter of any of Examples 564 to 566 can optionally include wherein the instructions cause the wireless device to determine the number of unique active pilot sequences by determining a number of unique active pilot sequences from the obtained signal in the colliding time slot.

In Example 568, the subject matter of any of Examples 564 to 567 can optionally include wherein each of the plurality of transmitted signals of the obtained signal includes an orthogonal pilot sequence.

In Example 569, the subject matter of Example 568 can optionally include wherein each of the plurality of transmitted signals of the obtained signal includes an orthogonal pilot sequence from predefined set of unique orthogonal pilot sequences.

In Example 570, the subject matter of any of Examples 564 to 569 can optionally include wherein the selected channel estimation method is MMSE-MRC.

In Example 571, the subject matter of any of Examples 564 to 569 can optionally include wherein the selected channel estimation method is MMSE-IRC.

In Example 572, the subject matter of any of Examples 564 to 571 can optionally include wherein the number of SIC loops is 1.

In Example 573, the subject matter of any of Examples 564 to 571 can optionally include wherein the number of SIC loops is greater than 1.

Example 574 is a method for receiving in a wireless network, the method including obtaining, at a wireless device, a signal including a superposition of a plurality of transmitted signals wherein two or more of the plurality of transmitted signals collide in a colliding time slot, obtaining, by the wireless device, one or more previously decoded transmitted signals, applying, by the wireless device, successive interference cancellation (SIC) to the colliding time slot of the obtained signal using the obtained one or more previously decoded transmitted signals, decoding, by the wireless device, one or more previously undecoded transmitted signals from the obtained signal at the colliding time slot.

In Example 575, the subject matter of Example 574 can optionally include wherein obtaining the one or more decoded signals includes retrieving the at least one decoded signal from a memory buffer.

In Example 576, the subject matter of Example 574 or 575 can optionally include wherein applying SIC includes performing one or more channel and noise estimations of the obtained signal in the colliding time slot.

In Example 577, the subject matter of Example 576 can optionally further include selecting a type of channel and noise estimation method to implement, and performing the one or more channel and noise estimations of the obtained signal in the colliding slot using the selected type of channel and noise estimation method.

In Example 578, the subject matter of Example 577 can optionally include wherein the selected type of channel and noise estimation method is MMSE-MRC.

In Example 579, the subject matter of Example 577 can optionally include wherein the selected type of channel and noise estimation method is MMSE-IRC.

In Example 580, the subject matter of Example 579 can optionally include wherein performing the one or more channel and noise estimations of the obtained signal in the colliding slot using MMSE-IRC includes determining, by the wireless device, a number of unique active pilot sequences from the obtained signal in the colliding time slot.

Example 581 is a wireless device, including one or more processors and one or more non-transitory computer readable media, the computer readable media including instructions to cause the wireless device, when executed by one or more processors to obtain a signal including a superposition of a plurality of transmitted signals, wherein two or more of the plurality of transmitted signals collide in a colliding time slot, obtain one or more previously decoded transmitted signals, apply successive interference cancellation (SIC) to the obtained signal in the colliding time slot using the obtained one or more previously decoded transmitted signals, obtain one or more previously undecoded transmitted signals from the obtained signal at the colliding time slot.

In Example 582, the subject matter of Example 581 can optionally include wherein the instructions to cause the wireless device to obtain the one or more decoded signals include causing the wireless device to retrieve the at least one decoded signal from a memory buffer.

In Example 583, the subject matter of Example 581 or 582 can optionally include wherein the instructions to cause the wireless device to apply SIC include causing the wireless device to perform one or more channel and noise estimations of the obtained signal in the colliding time slot.

In Example 584, the subject matter of Example 583 can optionally include wherein the instructions further cause the wireless device to select a type of channel and noise estimation method to implement, and perform the one or more channel and noise estimations of the obtained signal in the colliding slot using the selected type of channel and noise estimation method.

In Example 585, the subject matter of Example 584 can optionally include wherein the selected type of channel and noise estimation method is MMSE-MRC.

In Example 586, the subject matter of Example 584 can optionally include wherein the selected type of channel and noise estimation method is MMSE-IRC.

In Example 587, the subject matter of Example 586 can optionally include wherein the instructions to cause the wireless device to perform the one or more channel and noise estimations of the obtained signal in the colliding slot using MMSE-IRC include causing the wireless device to determine a number of unique active pilot sequences from the obtained signal in the colliding time slot.

Example 588 is a method for receiving in a wireless network, the method including obtaining, at a wireless device, a signal including a superposition of a plurality of transmitted signals wherein two or more of the plurality of transmitted signals collide in a colliding time slot, applying, by the wireless device, inter successive interference cancellation (inter-SIC) to the obtained signal at the colliding time slot, and applying, by the wireless device, intra successive interference cancellation (intra-SIC) to the obtained signal at the colliding time slot.

In Example 589, the subject matter of Example 588 can optionally include wherein the receiver applies inter-SIC to the colliding time slot of the obtained signal in response to determining a signal interfering at the colliding time slot was previously decoded.

In Example 590, the subject matter of Example 589 can optionally include wherein the signal interfering at the colliding time slot was previously decoded by means of the intra-SIC decoder.

In Example 591, the subject matter of any of Examples 588 to 590 can optionally include wherein applying inter-SIC includes obtaining, by the wireless device, one or more previously decoded transmitted signals, applying, by the wireless device, successive interference cancellation to the obtained signal in the colliding time slot using the obtained one or more previously decoded transmitted signals, and obtaining, by the wireless device, one or more previously undecoded transmitted signals from the obtained signal at the colliding time slot.

In Example 592, the subject matter of any of Examples 588 to 591 can optionally include wherein applying intra-SIC includes determining, by the wireless device, a number of unique active pilot sequences from the obtained signal in the colliding time slot, selecting, by the wireless device, a channel estimation method based on the determined number of unique pilot sequences in the obtained signal, determining, by the wireless device, a number of successive interference cancellation (SIC) loops to implement in SIC based on the determined number of unique pilot sequences in the obtained signal, and applying, by the wireless device, SIC to the obtained signal in the colliding time slot using the selected channel estimation method and the determined number of SIC loops.

In Example 593, the subject matter of any of Examples 588 to 592 can optionally include wherein the intra-SIC is applied after the inter-SIC has been applied.

In Example 594, the subject matter of Example 593 can optionally include wherein the intra-SIC is applied to an output of the obtained signal after intra-SIC has been applied.

Example 595 is a wireless device including a controller configured to identify a second wireless device with a communication link to the wireless device, select, based on a secret device ID of the second wireless device, a first plurality of bit positions to activate in a bit string, select, based on an obfuscation factor for obfuscating the first plurality of bit positions in the bit string, a second plurality of bit positions to activate in the bit string, and generate a message including the bit string, and a transmitter configured to transmit the message to a third wireless device.

In Example 596, the subject matter of Example 595 can optionally include wherein the transmitter is a physical layer transmit path of a baseband modem of the wireless device.

In Example 597, the subject matter of Example 595 or 596 can optionally further include a radio frequency transceiver and one or more antennas, wherein the transmitter is configured to transmit the message via the radio frequency transceiver and the one or more antennas.

In Example 598, the subject matter of any one of Examples 595 to 597 can optionally include wherein the communication link is a direct link between the wireless device and the second wireless device.

In Example 599, the subject matter of any one of Examples 595 to 597 can optionally include wherein the controller is further configured to identify one or more wireless devices with direct links to the wireless device, generate, based on respective secret device IDs of the one or more wireless devices, one or more bit strings that identify the one or more additional wireless devices, and include the one or more bit strings in the message.

In Example 600, the subject matter of any one of Examples 595 to 599 can optionally include wherein the message is a message for a mesh network that identifies wireless devices with direct links to the wireless device.

In Example 601, the subject matter of Example 600 can optionally further include a receiver configured to receive a second message from a fourth wireless device that identifies one or more wireless devices, wherein the controller is configured to determine a routing path between the wireless device and a target wireless device through a mesh network, the routing path including a fifth wireless device with a direct link to the wireless device, wherein the transmitter is configured to transmit a third message to the target wireless device via the fifth wireless device.

In Example 602, the subject matter of any one of Examples 595 to 601 can optionally further include a trusted entity list configured to store a plurality of secret device IDs for a plurality of wireless devices that the wireless device trusts, wherein the controller is configured to retrieve the secret device ID from the trusted entity list.

In Example 603, the subject matter of any one of Examples 595 to 602 can optionally include wherein the controller is configured to select the first plurality of bit positions to activate in the bit string by generating a first plurality of random numbers from a random number generator with the secret device ID as a seed of the random number generator, selecting the first plurality of bit positions based on the first plurality of random numbers, and activating the first plurality of bit positions in the bit string.

In Example 604, the subject matter of Example 603 can optionally include wherein the controller is configured to select the first plurality of bit positions based on the first plurality of random numbers by performing modulo operations on the first plurality of random numbers to obtain a first plurality of modulus results, and selecting the first plurality of bit positions based on the first plurality of modulus results.

In Example 605, the subject matter of Example 603 or 604 can optionally include wherein a base of the modulo operations is based on the number of bit positions in the bit string.

In Example 606, the subject matter of Example 604 or 605 can optionally include wherein the controller is configured to select the first plurality of bit positions based on the first plurality of modulus results by selecting entries of a bit selection vector based on the first plurality of modulus results, wherein the entries of the bit selection vector are integers that reference respective bit positions of the bit string, and selecting the first plurality of bit positions based on bit positions of the bit string that the selected entries reference.

In Example 607, the subject matter of any one of Examples 603 to 606 can optionally include wherein the controller is configured to select the second plurality of bit positions to activate in the bit string by generating a second plurality of random numbers from the random number generator with the secret device ID as the seed of the random number generator, wherein the quantity of the second plurality of random numbers is based on the obfuscation factor, selecting the second plurality of bit positions based on the second plurality of random numbers, and activating the second plurality of bit positions in the bit string.

In Example 608, the subject matter of Example 607 can optionally include wherein the controller is configured to select the second plurality of bit positions based on the second plurality of random numbers by performing modulo operations on the second plurality of random numbers to obtain a second plurality of modulus results, and selecting the second plurality of bit positions based on the second plurality of modulus results.

In Example 609, the subject matter of Example 607 or 608 can optionally include wherein a base of the modulo operations is based on the number of bit positions in the bit string.

In Example 610, the subject matter of Example 608 or 609 can optionally include wherein the controller is configured to select the second plurality of bit positions based on the second plurality of modulus results by selecting entries of a bit selection vector based on the second plurality of modulus results, wherein the entries of the bit selection vector are integers that reference respective bit positions of the bit string, and selecting the second plurality of bit positions as the bit positions of the bit string that the selected entries reference.

Example 611 is a wireless device including a trusted entity list including a secret device ID for a second wireless device, a random number generator configured to generate a first plurality of random numbers based on the secret device ID, and configured to generate a second plurality of numbers based on an obfuscation factor for obfuscating the secret device ID in a bit string, a modulo configured to determine a first plurality of modulus results for the first plurality of random numbers and to determine a second plurality of modulus results for the second plurality of random numbers, a selector configured to select bit positions to activate in the bit string based on the first plurality of modulus results and the second plurality of modulus results, and a transmitter configured to transmit a message including the bit string.

In Example 612, the subject matter of Example 611 can optionally include wherein the transmitter is a physical layer transmit path of a baseband modem of the wireless device.

In Example 613, the subject matter of Example 612 can optionally include wherein the random number generator, the modulo, and the selector are subcomponents of the baseband modem.

In Example 614, the subject matter of any one of Examples 611 to 613 can optionally further include a radio frequency transceiver and one or more antennas, wherein the transmitter is configured to transmit the message via the radio frequency transceiver and the one or more antennas.

In Example 615, the subject matter of any one of Examples 611 to 614 can optionally include wherein the trusted entity list is configured to store a plurality of secret device IDs for a plurality of wireless devices that the wireless device trusts.

In Example 616, the subject matter of any one of Examples 611 to 615 can optionally include wherein the random number generator is configured to generate the first plurality of random numbers based on the secret device ID by using the secret device ID as its seed for generating the first plurality of random numbers.

In Example 617, the subject matter of any one of Examples 611 to 616 can optionally include wherein the random number generator is configured to generate the second plurality of random numbers using the secret device ID as a seed, and is configured to generate the second plurality of random numbers using the obfuscation factor to control the quantity of the second plurality of random numbers.

In Example 618, the subject matter of any one of Examples 611 to 617 can optionally include wherein the modulo is configured to determine the first plurality of modulus results by performing modulo operations on the first plurality of random numbers using a modulo base that depends on the number of bit positions in the bit string.

In Example 619, the subject matter of any one of Examples 611 to 618 can optionally include wherein the modulo is configured to determine the second plurality of modulus results by performing modulo operations on the second plurality of random numbers using a modulo base that depends on the number of bit positions in the bit string.

In Example 620, the subject matter of any one of Examples 611 to 619 can optionally include wherein the selector is configured to select the bit positions to activate in the bit string based on the first plurality of modulus results and the second plurality of modulus results by selecting entries of a bit selection vector based on the first plurality of modulus results and the second plurality of modulus results, wherein the entries of the bit selection vector are integers that reference respective bit positions of the bit string, and activating bit positions of the bit string that the selected entries reference.

Example 621 is a wireless device including a receiver configured to receive a message including a received bit string, and a controller configured to select a first plurality of bit positions to activate in a candidate bit string based on a secret device ID of a second wireless device, compare the candidate bit string to the received bit string, and determine that the received bit string identifies the second wireless device if the first plurality of bit positions in the candidate bit string are activated in the received bit string.

In Example 622, the subject matter of Example 621 can optionally include wherein the receiver is a physical layer receive path of a baseband modem of the wireless device.

In Example 623, the subject matter of Example 621 or 622 can optionally further include a radio frequency transceiver and one or more antennas, wherein the receiver is configured to receive the message via the radio frequency transceiver and the one or more antennas.

In Example 624, the subject matter of any one of Examples 621 to 623 can optionally include wherein the controller is further configured to, if the first plurality of bit positions in the candidate bit string are not activated in the received bit string select a first plurality of bit positions to activate in a second candidate bit string based on a secret device ID of a third wireless device, compare the second candidate bit string to the received bit string, and determine that the received bit string identifies the third wireless device if the first plurality of bit positions in the second candidate bit string are activated in the received bit string.

In Example 625, the subject matter of Example 624 can optionally include wherein the controller is configured to continue generating candidate bit strings based on one or more additional secret device IDs of additional wireless devices and to continue determining whether any of the candidate bit strings have activated bit positions that are activated in the received bit string.

In Example 626, the subject matter of Example 625 can optionally include wherein the controller is configured to continue the generating and the determining until the controller identifies a secret device ID that produces a candidate bit string with activated bit positions that are activated in the received bit string, or the controller compares, to the received bit string, candidate bit strings for each secret device ID in a trusted entity list.

In Example 627, the subject matter of Example 626 can optionally further include the trusted entity list, wherein the trusted entity list is configured to store secret device IDs for wireless devices that the wireless device trusts.

In Example 628, the subject matter of Example 626 or 627 can optionally include wherein, if the controller compares candidate bit strings for each secret device ID in the trusted entity list to the received bit string without identifying a candidate bit string with activated bit positions that are activated in the received bit string, the controller is configured to determine that the received bit string identifies a secret device ID that is not in the trusted entity list.

In Example 629, the subject matter of any one of Examples 621 to 628 can optionally include wherein the message includes one or more received bit strings, wherein the controller is configured to, for each of the one or more received bit strings obtain a candidate bit string based on a secret device ID for a wireless device, compare the candidate bit string to the received bit string, and determine that the received bit string identifies the wireless device if the candidate bit string has activated bit positions that are activated in the received bit string.

In Example 630, the subject matter of any one of Examples 621 to 629 can optionally further include a trusted entity list configured to store a plurality of secret device IDs for a plurality of wireless devices that the wireless device trusts, wherein the controller is configured to retrieve the secret device ID from the trusted entity list.

In Example 631, the subject matter of any one of Examples 621 to 630 can optionally include wherein the controller is configured to select the first plurality of bit positions to activate in the candidate bit string by generating a first plurality of random numbers from a random number generator with the secret device ID as a seed of the random number generator, selecting the first plurality of bit positions based on the first plurality of random numbers, and activating the first plurality of bit positions in the candidate bit string.

In Example 632, the subject matter of Example 631 can optionally include wherein the controller is configured to select the first plurality of bit positions based on the first plurality of random numbers by performing modulo operations on the first plurality of random numbers to obtain a first plurality of modulus results, and selecting the first plurality of bit positions based on the first plurality of modulus results.

In Example 633, the subject matter of Example 631 or 632 can optionally include wherein a base of the modulo operations is based on the number of bit positions in the candidate bit string In Example 634, the subject matter of Example 632 or 633 can optionally include wherein the controller is configured to select the first plurality of bit positions based on the first plurality of modulus results by selecting entries of a bit selection vector based on the first plurality of modulus results, wherein the entries of the bit selection vector are integers that reference respective bit positions of the candidate bit string, and selecting the first plurality of bit positions based on bit positions of the candidate bit string that the selected entries reference.

In Example 635, the subject matter of any one of Examples 621 to 634 can optionally include wherein the controller is configured to compare the candidate bit string to the received bit string by comparing the activated bit positions in the candidate bit string to the activated bit positions in the received bit string.

In Example 636, the subject matter of any one of Examples 621 to 634 can optionally include wherein the controller is configured to compare the candidate bit string to the received bit string by performing a bitwise multiplication of the candidate bit string and the received bit string to obtain a bitwise product.

In Example 637, the subject matter of Example 636 can optionally include wherein the controller is configured to determine that the first plurality of bit positions in the candidate bit string are activated in the received bit string if the bitwise product equals the candidate bit string.

In Example 638, the subject matter of any one of Examples 621 to 637 can optionally further include a transmitter, wherein the controller is configured to provide the message to the transmitter and the transmitter is configured to forward the message to one or more wireless devices.

In Example 639, the subject matter of Example 638 can optionally include wherein the one or more wireless devices are in a mesh network with the wireless device.

In Example 640, the subject matter of any one of Examples 621 to 639 can optionally include wherein the receiver is configured to receive the message from a third wireless device, wherein the message is a message for a mesh network that identifies the wireless devices with direct links to the third wireless device.

In Example 641, the subject matter of any one of Examples 621 to 640 can optionally include wherein the controller is configured to determine a routing path between the wireless device and a target wireless device through a mesh network, the routing path including a fourth wireless device with a direct link to the wireless device, and wherein the transmitter is configured to transmit a third message to the target wireless device via the fourth wireless device.

Example 642 is a wireless device including a receiver configured to receive a message including a received bit string, a trusted entity list including a secret device ID for a second wireless device, a random number generator configured to generate a first plurality of random numbers based on the secret device ID, a modulo configured to determine a first plurality of modulus results based on the first plurality of random numbers, a selector configured to select bit positions to activate in a candidate bit string based on the first plurality of modulus results, and a comparator configured to compare the candidate bit string to a received bit string to determine whether the received bit string identifies the second wireless device.

In Example 643, the subject matter of Example 642 can optionally include wherein the receiver is a physical layer receive path of a baseband modem of the wireless device.

In Example 644, the subject matter of Example 643 can optionally include wherein the random number generator, the modulo, the selector, and the comparator are subcomponents of the baseband modem.

In Example 645, the subject matter of any one of Examples 642 to 644 can optionally further include a radio frequency transceiver and one or more antennas, wherein the receiver is configured to receive the message via the radio frequency transceiver and the one or more antennas.

In Example 646, the subject matter of any one of Examples 642 to 645 can optionally include wherein the trusted entity list is configured to store a plurality of secret device IDs for a plurality of wireless devices that the wireless device trusts.

In Example 647, the subject matter of any one of Examples 642 to 646 can optionally include wherein the random number generator is configured to generate the first plurality of random numbers based on the secret device ID by using the secret device ID as its seed for generating the first plurality of random numbers.

In Example 648, the subject matter of any one of Examples 642 to 647 can optionally include wherein the modulo is configured to determine the first plurality of modulus results by performing modulo operations on the first plurality of random numbers using a modulo base that depends on the number of bit positions in the candidate bit string.

In Example 649, the subject matter of any one of Examples 642 to 648 can optionally include wherein the selector is configured to select the bit positions to activate in the candidate bit string based on the first plurality of modulus results by selecting entries of a bit selection vector based on the first plurality of modulus results, wherein the entries of the bit selection vector are integers that reference respective bit positions of the candidate bit string, and activating bit positions of the candidate bit string that the selected entries reference.

In Example 650, the subject matter of any one of Examples 642 to 649 can optionally further include a bitwise multiplier configured to perform a bitwise multiplication of the candidate bit string and the received bit string to obtain a bitwise product.

In Example 651, the subject matter of Example 650 can optionally include wherein the comparator is configured to compare the candidate bit string to the received bit string to determine whether the received bit string identifies the second wireless device by comparing the bitwise product to the candidate bit string and determining that the first plurality of bit positions in the candidate bit string are activated in the received bit string if the bitwise product equals the candidate bit string.

In Example 652, the subject matter of any one of Examples 642 to 651 can optionally include wherein, if the comparator determines that the received bit string does not identify the second wireless device the selector is configured to select a first plurality of bit positions to activate in a second candidate bit string based on a secret device ID of a third wireless device, and the comparator is configured to compare the second candidate bit string to the received bit string and determine that the received bit string identifies the third wireless device if the first plurality of bit positions in the second candidate bit string are activated in the received bit string.

In Example 653, the subject matter of Example 652 can optionally include wherein the selector is configured to continue generating candidate bit strings based on one or more additional secret device IDs of additional wireless devices and the comparator is configured to continue determining whether any of the candidate bit strings have activated bit positions that are activated in the received bit string.

In Example 654, the subject matter of Example 653 can optionally include wherein the selector is configured to continue the generating and the comparator is configured to continue the determining until the comparator identifies a secret device ID that produces a candidate bit string with activated bit positions that are activated in the received bit string, or the controller compares, to the received bit string, candidate bit strings for each secret device ID in a trusted entity list.

In Example 655, the subject matter of Example 654 can optionally include wherein, if the comparator compares candidate bit strings for each secret device ID in the trusted entity list to the received bit string without identifying a candidate bit string with activated bit positions that are activated in the received bit string, the comparator is configured to determine that the received bit string identifies a secret device ID that is not in the trusted entity list.

Example 656 is a method of performing wireless communications at wireless device, the method including identifying a second wireless device with a communication link to the wireless device, selecting, based on a secret device ID of the second wireless device, a first plurality of bit positions to activate in a bit string, selecting, based on an obfuscation factor for obfuscating the first plurality of bit positions in the bit string, a second plurality of bit positions to activate in the bit string, generating a message including the bit string, and transmitting the message to a third wireless device.

In Example 657, the subject matter of Example 656 can optionally include wherein transmitting the message to a third wireless device includes transmitting the message with a physical layer transmit path via one or more antennas and a radio frequency transceiver.

In Example 658, the subject matter of Example 656 or 657 can optionally include wherein the communication link is a direct link between the wireless device and the second wireless device.

In Example 659, the subject matter of any one of Examples 656 to 658 can optionally further include identifying one or more wireless devices with direct links to the wireless device, generating, based on respective secret device IDs of the one or more wireless devices, one or more bit strings that identify the one or more additional wireless devices, and including the one or more bit strings in the message.

In Example 660, the subject matter of any one of Examples 656 to 659 can optionally include wherein the message is a message for a mesh network that identifies wireless devices with direct links to the wireless device.

In Example 661, the subject matter of Example 660 can optionally further include receiving a second message from a fourth wireless device that identifies one or more wireless devices with direct links to the fourth wireless device, determining a routing path between the wireless device and a target wireless device through a mesh network, the routing path including a fifth wireless device with a direct link to the wireless device, and transmitting a third message to the target wireless device via the fifth wireless device.

In Example 662, the subject matter of any one of Examples 656 to 661 can optionally further include retrieving the secret device ID from a trusted entity list of the wireless device that is configured to store a plurality of secret device IDs for a plurality of wireless devices that the wireless device trusts.

In Example 663, the subject matter of any one of Examples 656 to 662 can optionally include wherein selecting the first plurality of bit positions to activate in the bit string includes generating a first plurality of random numbers from a random number generator with the secret device ID as a seed of the random number generator, selecting the first plurality of bit positions based on the first plurality of random numbers, and activating the first plurality of bit positions in the bit string.

In Example 664, the subject matter of Example 663 can optionally include wherein selecting the first plurality of bit positions based on the first plurality of random numbers includes performing modulo operations on the first plurality of random numbers to obtain a first plurality of modulus results, and selecting the first plurality of bit positions based on the first plurality of modulus results.

In Example 665, the subject matter of Example 663 or 664 can optionally include wherein a base of the modulo operations is based on the number of bit positions in the bit string.

In Example 666, the subject matter of Example 664 or 665 can optionally include wherein selecting the first plurality of bit positions based on the first plurality of modulus results includes selecting entries of a bit selection vector based on the first plurality of modulus results, wherein the entries of the bit selection vector are integers that reference respective bit positions of the bit string, and selecting the first plurality of bit positions based on bit positions of the bit string that the selected entries reference.

In Example 667, the subject matter of any one of Examples 663 to 666 can optionally include wherein selecting the second plurality of bit positions to activate in the bit string includes generating a second plurality of random numbers from the random number generator with the secret device ID as the seed of the random number generator, wherein the quantity of the second plurality of random numbers is based on the obfuscation factor, selecting the second plurality of bit positions based on the second plurality of random numbers, and activating the second plurality of bit positions in the bit string.

In Example 668, the subject matter of Example 667 can optionally include wherein selecting the second plurality of bit positions based on the second plurality of random numbers includes performing modulo operations on the second plurality of random numbers to obtain a second plurality of modulus results, and selecting the second plurality of bit positions based on the second plurality of modulus results.

In Example 669, the subject matter of Example 667 or 668 can optionally include wherein a base of the modulo operations is based on the number of bit positions in the bit string.

In Example 670, the subject matter of Example 668 or 669 can optionally include wherein selecting the second plurality of bit positions based on the second plurality of modulus results includes selecting entries of a bit selection vector based on the second plurality of modulus results, wherein the entries of the bit selection vector are integers that reference respective bit positions of the bit string, and selecting the second plurality of bit positions as the bit positions of the bit string that the selected entries reference.

Example 671 is a method of performing wireless communications at a wireless device, the method including generating a first plurality of random numbers based on a secret device ID for a second wireless device, generating a second plurality of numbers based on an obfuscation factor for obfuscating the secret device ID in a bit string, determining a first plurality of modulus results for the first plurality of random numbers and determining a second plurality of modulus results for the second plurality of random numbers, selecting bit positions to activate in the bit string based on the first plurality of modulus results and the second plurality of modulus results, and transmitting a message including the bit string.

In Example 672, the subject matter of Example 671 can optionally include wherein transmitting the message includes performing physical layer processing on the message, and wirelessly transmitting the message via a radio frequency transceiver and one or more antennas.

In Example 673, the subject matter of Example 671 or 672 can optionally include wherein generating the first plurality of random numbers based on the secret device ID includes generating the first plurality of random numbers from a random number generator with the secret device ID as its seed.

In Example 674, the subject matter of Example 673 can optionally include wherein generating the second plurality of random numbers includes generating the second plurality of random numbers from the random number generator with the secret device ID as its seed, wherein the quantity of the second plurality of random numbers is based on the obfuscation factor.

In Example 675, the subject matter of any one of Examples 671 to 674 can optionally include wherein determining the first plurality of modulus results includes performing modulo operations on the first plurality of random numbers using a modulo base that depends on the number of bit positions in the bit string.

In Example 676, the subject matter of any one of Examples 671 to 675 can optionally include wherein determining the second plurality of modulus results includes performing modulo operations on the second plurality of random numbers using a modulo base that depends on the number of bit positions in the bit string.

In Example 677, the subject matter of any one of Examples 671 to 676 can optionally include wherein selecting the bit positions to activate in the bit string based on the first plurality of modulus results and the second plurality of modulus results includes select entries of a bit selection vector based on the first plurality of modulus results and the second plurality of modulus results, wherein the entries of the bit selection vector are integers that reference respective bit positions of the bit string, and activating bit positions of the bit string that the selected entries reference.

Example 678 is a method of performing wireless communications at a wireless device, the method including receiving a message including a received bit string, selecting a first plurality of bit positions to activate in a candidate bit string based on a secret device ID of a second wireless device, comparing the candidate bit string to the received bit string, and determining that the received bit string identifies the second wireless device if the first plurality of bit positions in the candidate bit string are activated in the received bit string.

In Example 679, the subject matter of Example 678 can optionally include wherein receiving the message includes wirelessly receiving the message via one or more antennas radio frequency transceiver and performing physical layer processing on the message.

In Example 680, the subject matter of Example 678 or 679 can optionally further include, if the first plurality of bit positions in the candidate bit string are not activated in the received bit string selecting a first plurality of bit positions to activate in a second candidate bit string based on a secret device ID of a third wireless device, comparing the second candidate bit string to the received bit string, and determining that the received bit string identifies the third wireless device if the first plurality of bit positions in the second candidate bit string are activated in the received bit string.

In Example 681, the subject matter of Example 680 can optionally further include continuing to generate candidate bit strings based on one or more additional secret device IDs of additional wireless devices and continuing to determine whether any of the candidate bit strings have activated bit positions that are activated in the received bit string.

In Example 682, the subject matter of Example 681 can optionally further include continuing the generating and continuing the determining until identifying a secret device ID that produces a candidate bit string with activated bit positions that are activated in the received bit string, or comparing, to the received bit string, candidate bit strings for each secret device ID in a trusted entity list.

In Example 683, the subject matter of Example 682 can optionally further include, if none of the candidate bit strings have activated bit positions that are activated in the received bit string determining that the received bit string identifies a secret device ID that is not in the trusted entity list.

In Example 684, the subject matter of any one of Examples 678 to 683 can optionally include wherein the message includes one or more received bit strings, the method further including, for each of the one or more received bit strings obtaining a candidate bit string based on a secret device ID for a wireless device, comparing the candidate bit string to the received bit string, and determining that the received bit string identifies the wireless device if the candidate bit string has activated bit positions that are activated in the received bit string.

In Example 685, the subject matter of any one of Examples 678 to 684 can optionally include wherein selecting the first plurality of bit positions to activate in the candidate bit string includes generating a first plurality of random numbers from a random number generator with the secret device ID as a seed of the random number generator, selecting the first plurality of bit positions based on the first plurality of random numbers, and activating the first plurality of bit positions in the candidate bit string.

In Example 686, the subject matter of Example 685 can optionally include wherein selecting the first plurality of bit positions based on the first plurality of random numbers includes performing modulo operations on the first plurality of random numbers to obtain a first plurality of modulus results, and selecting the first plurality of bit positions based on the first plurality of modulus results.

In Example 687, the subject matter of Example 685 or 686 can optionally include wherein a base of the modulo operations is based on the number of bit positions in the candidate bit string.

In Example 688, the subject matter of Example 686 or 687 can optionally include wherein selecting the first plurality of bit positions based on the first plurality of modulus results includes selecting entries of a bit selection vector based on the first plurality of modulus results, wherein the entries of the bit selection vector are integers that reference respective bit positions of the candidate bit string, and selecting the first plurality of bit positions based on bit positions of the candidate bit string that the selected entries reference.

In Example 689, the subject matter of any one of Examples 678 to 688 can optionally include wherein comparing the candidate bit string to the received bit string includes comparing the activated bit positions in the candidate bit string to the activated bit positions in the received bit string.

In Example 690, the subject matter of any one of Examples 678 to 688 can optionally include wherein comparing the candidate bit string to the received bit string includes performing a bitwise multiplication of the candidate bit string and the received bit string to obtain a bitwise product.

In Example 691, the subject matter of Example 690 can optionally further include determining that the first plurality of bit positions in the candidate bit string are activated in the received bit string if the bitwise product equals the candidate bit string.

In Example 692, the subject matter of any one of Examples 678 to 691 can optionally further include forwarding the message to one or more wireless devices.

In Example 693, the subject matter of Example 692 can optionally include wherein the one or more wireless devices are in a mesh network with the wireless device.

In Example 694, the subject matter of any one of Examples 678 to 693 can optionally include wherein receiving the message includes receiving the message from a third wireless device, wherein the message is a message for a mesh network that identifies the wireless devices with direct links to the third wireless device.

In Example 695, the subject matter of any one of Examples 678 to 694 can optionally further include determining a routing path between the wireless device and a target wireless device through a mesh network, the routing path including a fourth wireless device with a direct link to the wireless device, and transmitting a third message to the target wireless device via the fourth wireless device.

Example 696 is a method of performing wireless communications at a wireless device, the method including receiving a message including a received bit string, generating a first plurality of random numbers based on a secret device ID for a second wireless device, determining a first plurality of modulus results based on the first plurality of random numbers, selecting bit positions to activate in a candidate bit string based on the first plurality of modulus results, and comparing the candidate bit string to a received bit string to determine whether the received bit string identifies the second wireless device.

In Example 697, the subject matter of Example 696 can optionally include wherein receiving the message includes receiving the message via one or more antennas and a radio frequency transceiver and performing physical layer processing on the message.

In Example 698, the subject matter of Example 696 or 697 can optionally include wherein generating the first plurality of random numbers based on the secret device ID includes generating the first plurality of random numbers with a random number generating with the secret device ID as its seed.

In Example 699, the subject matter of any one of Examples 696 to 698 can optionally include wherein determining the first plurality of modulus results includes performing modulo operations on the first plurality of random numbers using a modulo base that depends on the number of bit positions in the candidate bit string.

In Example 700, the subject matter of any one of Examples 696 to 699 can optionally include wherein selecting the bit positions to activate in the candidate bit string based on the first plurality of modulus results includes selecting entries of a bit selection vector based on the first plurality of modulus results, wherein the entries of the bit selection vector are integers that reference respective bit positions of the candidate bit string, and activating bit positions of the candidate bit string that the selected entries reference.

In Example 701, the subject matter of any one of Examples 696 to 700 can optionally further include performing a bitwise multiplication of the candidate bit string and the received bit string to obtain a bitwise product.

In Example 702, the subject matter of Example 701 can optionally include wherein comparing the candidate bit string to the received bit string to determine whether the received bit string identifies the second wireless device includes comparing the bitwise product to the candidate bit string and determining that the first plurality of bit positions in the candidate bit string are activated in the received bit string if the bitwise product equals the candidate bit string.

In Example 703, the subject matter of any one of Examples 696 to 702 can optionally further include, if the received bit string does not identify the second wireless device selecting a first plurality of bit positions to activate in a second candidate bit string based on a secret device ID of a third wireless device, and comparing the second candidate bit string to the received bit string and determining that the received bit string identifies the third wireless device if the first plurality of bit positions in the second candidate bit string are activated in the received bit string.

In Example 704, the subject matter of Example 703 can optionally further include continuing to generate candidate bit strings based on one or more additional secret device IDs of additional wireless devices and continuing to determine whether any of the candidate bit strings have activated bit positions that are activated in the received bit string.

In Example 705, the subject matter of Example 704 can optionally further include continuing the generating and continuing the determining until identifying a secret device ID that produces a candidate bit string with activated bit positions that are activated in the received bit string, or comparing, to the received bit string, candidate bit strings for each secret device ID in a trusted entity list.

In Example 706, the subject matter of Example 705 can optionally further include, if none of the candidate bit strings have activated bit positions that are activated in the received bit string, determining that the received bit string identifies a secret device ID that is not in the trusted entity list.

Example 707 is a non-transitory computer readable medium storing instructions that, when executed by one or more processors, cause the one or more processors to perform the method of any one of Examples 656 to 706.

Example 708 is a wireless device including one or more processors, and a memory storing instructions that, when executed by the one or more processors, cause the wireless device to perform the method of any one of Examples 656 to 706.

Example 709 is a communication device configured to operate on a radio communication network and a device-to-device network, in which the communication device may include: a transceiver configured to receive a request for a position of the communication device over the device-to-device network; and one or more processors configured to determine whether to request assistance over the device-to-device network to estimate the position of the communication device, wherein the transceiver is further configured to transmit a request for assistance to estimate the position of the communication device, based on the determination by the one or more processors.

In Example 710, the subject matter of Example 709 can optionally include the transceiver being further configured to perform a discovery operation over the device-to-device network.

In Example 711, the subject matter of Example 710 can optionally include the transceiver being further configured to transmit an emergency communication to a further communication device over the device-to-device network, based on the discovery operation.

In Example 712, the subject matter of Example 711 can optionally include the emergency communication being an initiation of an emergency call.

In Example 713, the subject matter of Examples 711 to 712 can optionally include the transceiver being configured to receive the request for the position of the communication device in response to transmitting the emergency communication.

In Example 714, the subject matter of Examples 709 to 713 can optionally include the one or more processors being configured to determine whether to request assistance in estimating the position of the communication device, based on the presence of a satellite receiver in the communication device.

In Example 715, the subject matter of Examples 709 to 713 may further include: a satellite receiver configured to estimate the position of the communication device, wherein the one or more processors being configured to determine whether to request assistance in estimating the position of the communication device, based on an accuracy of the estimated position of the communication device by the satellite receiver.

In Example 716, the subject matter of Example 715 can optionally include the one or more processors being configured to determine whether to request assistance in estimating the position of the communication device, based on a comparison between the accuracy of the estimated position of the communication device by the satellite receiver and a threshold position accuracy.

In Example 717, the subject matter of Examples 710 to 716 can optionally include the one or more processors being further configured to identify a number of communication devices on the device-to-device network, based on the discovery operation.

In Example 718, the subject matter of Example 717 can optionally include one or more processors being configured to identify the number of communication devices on the device-to-device network, further based on a threshold number of hops from the communication device.

In Example 719, the subject matter of Examples 717 or 718 can optionally include the one or more processors being configured to determine whether to request assistance in estimating the position of the communication device, based on the number of identified communication devices on the device-to-device network.

In Example 720, the subject matter of Examples 717 to 719 can optionally include the one or more processors being configured to determine whether to request assistance in estimating the position of the communication device, based on a comparison between the number of identified communication devices on the device-to-device network and a threshold number of communication devices for position assistance.

In Example 721, the subject matter of Examples 709 to 720 may further include: a clock configured to record one or more transmission timestamps; wherein the request for assistance includes the one or more of transmission timestamps.

In Example 722, the subject matter of Examples 709 to 721 can optionally include the transceiver being configured to transmit the request for assistance to one or more communication devices including a further communication device, and the request for assistance includes a request for an estimated position of the further communication device.

In Example 723, the subject matter of Example 722 can optionally include the transceiver being further configured to receive one or more responses to the request for assistance over the device-to-device network.

In Example 724, the subject matter of Example 723 can optionally include the one or more responses to the request for assistance includes a time of arrival measurement by the further communication device, a signal strength measurement by the further communication device, and/or the estimated position of the further communication device.

In Example 725, the subject matter of Examples 723 to 724 can optionally include the one or more processors being further configured to estimate the position of the communication device based on the one or more responses to the request for assistance.

In Example 726, the subject matter of Example 725 may further include: a satellite receiver configured to estimate the position of the communication device, wherein the one or more processors being configured to estimate the position of the communication device based on the estimated position of the communication device from the satellite receiver and the one or more responses to the request for assistance.

In Example 727, the subject matter of Examples 709 to 726 can optionally include the transceiver being further configured to transmit a response to the request for the position of the communication device over the device-to-device network.

In Example 728, the subject matter of Example 727 can optionally include the response to the request for the position of the communication device includes the estimated position of the communication device from the one or more processors.

Example 729 is a method for a communication device configured to operate on a radio communication network and a device-to-device network, in which the method may include: receiving a request for a position of the communication device over the device-to-device network; determining whether to request assistance over the device-to-device network to estimate the position of the communication device; and transmitting a request for assistance to estimate the position of the communication device, based on the determination.

In Example 730, the subject matter of Example 729 may further include: performing a discovery operation over the device-to-device network.

In Example 731, the subject matter of Example 730 may further include: transmitting an emergency communication to a further communication device over the device-to-device network, based on the discovery operation.

In Example 732, the subject matter of Example 731 can optionally include the emergency communication is an initiation of an emergency call.

In Example 733, the subject matter of Example 731 to 732 can optionally include receiving the request for the position of the communication device includes receiving the request for the position of the communication device in response to transmitting the emergency communication.

In Example 734, the subject matter of Examples 729 to 733 can optionally include determining whether to request assistance over the device-to-device network to estimate the position of the communication device includes determining whether to request assistance in estimating the position of the communication device, based on the presence of a satellite receiver in the communication device.

In Example 735, the subject matter of Examples 729 to 733 may further include: estimating the position of the communication device by a satellite receiver in the communication device, wherein determining whether to request assistance over the device-to-device network to estimate the position of the communication device includes determining whether to request assistance in estimating the position of the communication device, based on an accuracy of the estimated position of the communication device by the satellite receiver.

In Example 736, the subject matter of Example 735 can optionally include determining whether to request assistance over the device-to-device network to estimate the position of the communication device includes determining whether to request assistance in estimating the position of the communication device, based on a comparison between the accuracy of the estimated position of the communication device by the satellite receiver and a threshold position accuracy.

In Example 737, the subject matter of Examples 730 to 736 may further include: identifying a number of communication devices on the device-to-device network, based on the discovery operation.

In Example 738, the subject matter of Example 737 can optionally include identifying the number of communication devices on the device-to-device network includes identifying the number of communication devices on the device-to-device network, further based on a threshold number of hops from the communication device.

In Example 739, the subject matter of Examples 737 to 738 can optionally include determining whether to request assistance over the device-to-device network to estimate the position of the communication device includes determining whether to request assistance in estimating the position of the communication device, based on the number of identified communication devices on the device-to-device network.

In Example 740, the subject matter of Examples 737 to 739 can optionally include determining whether to request assistance over the device-to-device network to estimate the position of the communication device includes determining whether to request assistance in estimating the position of the communication device, based a comparison between the number of identified communication devices on the device-to-device network and a threshold number of communication devices for position assistance.

In Example 741, the subject matter of Examples 729 to 740 may further include: recording one or more transmission timestamps, wherein the request for assistance includes the one or more recorded transmission timestamps.

In Example 742, the subject matter of Example 729 to 741 can optionally include transmitting the request for assistance to estimate the position of the communication device includes transmitting the request for assistance to one or more communication devices including a further communication device, and the request for assistance includes a request for an estimated position of the further communication device.

In Example 743, the subject matter of Example 742 may further include: receiving one or more responses to the request for assistance over the device-to-device network.

In Example 744, the subject matter of Example 743 can optionally include the one or more responses to the request for assistance include a time of arrival measurement by the further communication device, a signal strength measurement by the further communication device, and/or the estimated position of the further communication device.

In Example 745, the subject matter of Examples 743 to 744 may further include: estimating the position of the communication device by one or more processors of the communication device, based on the one or more responses to the request for assistance.

In Example 746, the subject matter of Example 745 may further include: estimating the position of the communication device by a satellite receiver of the communication device, wherein estimating the position of the communication device by one or more processors of the communication device includes estimating the position of the communication device by one or more processors of the communication device based on the estimated position of the communication device from the satellite receiver and the one or more responses to the request for assistance.

In Example 747, the subject matter of Examples 729 to 746 may further include: transmitting a response to the request for the position of the communication device over the device-to-device network.

In Example 748, the subject matter of Example 747 can optionally include the response to the request for the position of the communication device includes the estimated position of the communication device from the one or more processors.

Example 749 is one or more non-transitory computer readable media storing instructions thereon that when executed by at least one processor of a device, direct the device to perform the method which may include: receiving a request for a position of the communication device over the device-to-device network; determining whether to request assistance over the device-to-device network to estimate the position of the communication device; and transmitting a request for assistance to estimate the position of the communication device, based on the determination.

Example 750 is one or more non-transitory computer readable media storing instructions thereon that when executed by at least one processor of a device, direct the device to perform the subject matter of any one of Examples 729 to 748.

Example 751 is one or more non-transitory computer readable media storing instructions thereon that when executed by at least one processor of a device, direct the device to perform the method of any one of Examples 729 to 748.

Example 752 is a device, which may include: a processor; and a memory storing instructions that when executed by the processor cause the processor to perform the method which may include: receiving a request for a position of the communication device over the device-to-device network; determining whether to request assistance over the device-to-device network to estimate the position of the communication device; and transmitting a request for assistance to estimate the position of the communication device, based on the determination.

Example 753 is a device, which may include: a processor; and a memory storing instructions that when executed by the processor cause the processor to perform the subject matter of any one of Examples 729 to 748.

Example 754 is a communication device connected to a radio communication network, in which the communication device may include: means for receiving a request for a position of the communication device over the device-to-device network; means for determining whether to request assistance over the device-to-device network to estimate the position of the communication device; and means for transmitting a request for assistance to estimate the position of the communication device, based on the determination.

Example 755 is a communication device configured to operate on a radio communication network and a device-to-device network, in which the communication device may include: a transceiver configured to receive an emergency communication over the device-to-device network; and one or more processors configured to determine whether to forward the emergency communication, based on one or more components of the emergency communication, wherein the transceiver is further configured to forward the emergency communication, based on the determination by the one or more processors.

In Example 756, the subject matter of Example 755 can optionally include the one or more components of the emergency communication includes priority information, and the one or more processors being configured to determine whether to forward the emergency communication, based on the priority information.

In Example 757, the subject matter of Example 756 can optionally include the one or more processors being configured to determine whether to forward the emergency communication, based on a comparison between the priority information and a threshold priority.

In Example 758, the subject matter of Examples 755 to 757 may further include: a clock configured to record a timestamp associated with the reception of the emergency communication.

In Example 759, the subject matter of Examples 755 to 758 can optionally include the one or more components of the emergency communication includes message identification information, and the one or more processors being configured to determine whether to forward the emergency communication, based on the message identification information satisfying a message identification criteria.

In Example 760, the subject matter of Example 759 may further include: a memory configured to store the message identification information and the timestamp associated with the reception of the emergency communication.

In Example 761, the subject matter of Examples 759 to 760 can optionally include the one or more processors being configured to determine whether to forward the emergency communication, based on the message identification information being received within a threshold duration.

In Example 762, the subject matter of Examples 755 to 761 can optionally include the one or more components of the emergency communication includes intermediary information, and the one or more processors being configured to determine whether to forward the emergency communication, based on the intermediary information satisfying an intermediary information criteria.

In Example 763, the subject matter of Example 762 can optionally include the one or more processors being configured to determine whether to forward the emergency communication, based on a comparison between the intermediary information and an intermediary information threshold.

In Example 764, the subject matter of Examples 762 to 763 can optionally include the intermediary information includes a count of the number of times the emergency communication has been forwarded over the device-to-device network, and the intermediary information threshold includes a maximum number of times the emergency communication can be forwarded over the device-to-device network.

In Example 765, the subject matter of Examples 755 to 764 can optionally include the one or more processors being further configured to determine whether to modify the emergency communication.

In Example 766, the subject matter of Examples 755 to 764 can optionally include the one or more processors being further configured to modify the emergency communication, and the transceiver being further configured to forward the modified emergency communication.

In Example 767, the subject matter of Example 766 can optionally include the one or more processors being further configured to modify the emergency communication by adding information to one or more components of the emergency communication.

In Example 768, the subject matter of Examples 766 to 767 can optionally include the one or more processors being further configured to modify the emergency communication by removing information from one or more components of the emergency communication.

In Example 769, the subject matter of Examples 766 to 768 can optionally include the one or more processors being further configured to modify the emergency communication by editing information from one or more components of the emergency communication.

In Example 770, the subject matter of Examples 755 to 768 can optionally include the one or more processors being further configured to generate a further emergency communication.

In Example 771, the subject matter of Example 770 can optionally include the one or more processors being further configured to modify the emergency communication by concatenating the emergency communication with the further emergency communication.

In Example 772, the subject matter of Examples 755 to 771 can optionally include one or more components of the emergency communication being protected by a security technique.

In Example 773, the subject matter of Examples 755 to 772 can optionally include the transceiver being configured to forward the emergency communication over the radio communication network.

In Example 774, the subject matter of Examples 755 to 772 can optionally include the transceiver being configured to forward the emergency communication over the device-to-device network.

Example 775 is a method for a communication device configured to operate on a radio communication network and a device-to-device network, in which the method include: receiving an emergency communication over the device-to-device network; determining whether to forward the emergency communication based on one or more components of the emergency communication; and forwarding the emergency communication based on the determination.

In Example 776, the subject matter of Example 775 can optionally include the one or more components of the emergency communication includes priority information, and determining whether to forward the emergency communication being based on the priority information.

In Example 777, the subject matter of Example 786 can optionally include determining whether to forward the emergency communication includes comparing the priority information with a threshold priority.

In Example 778, the subject matter of Examples 775 to 777 may further include: recording a timestamp associated with the reception of the emergency communication.

In Example 779, the subject matter of Example 775 to 777 can optionally include the one or more components of the emergency communication includes message identification information, and determining whether to forward the emergency communication includes determining whether the message identification information satisfies a message identification criteria.

In Example 779, the subject matter of Examples 775 to 779 may further include: storing the message identification information and the timestamp associated with the reception of the emergency communication.

In Example 781, the subject matter of Examples 779 to 780 can optionally include determining whether to forward the emergency communication includes determining whether the message identification information is received within a threshold duration.

In Example 782, the subject matter of Examples 775 to 781 can optionally include the one or more components of the emergency communication includes intermediary information, and determining whether to forward the emergency communication includes determining whether the intermediary information satisfies an intermediary information criteria.

In Example 783, the subject matter of Example 782 can optionally include determining whether to forward the emergency communication includes comparing the intermediary information with an intermediary information threshold.

In Example 784, the subject matter of Examples 782 to 783 can optionally include the intermediary information includes a count of the number of times the emergency communication has been forwarded over the device-to-device network, and the intermediary information threshold includes a maximum number of times the emergency communication can be forwarded over the device-to-device network.

In Example 785, the subject matter of Examples 775 to 784 may further include: determining whether to modify the emergency communication.

In Example 786, the subject matter of Examples 775 to 785 may further include: modifying the emergency communication; and forwarding the modified emergency communication.

In Example 787, the subject matter of Example 796 can optionally include modifying the emergency communication includes adding information to one or more components of the emergency communication.

In Example 788, the subject matter of Example 786 can optionally include modifying the emergency communication includes removing information from one or more components of the emergency communication.

In Example 789, the subject matter of Example 786 can optionally include modifying the emergency communication includes editing information from one or more components of the emergency communication.

In Example 790, the subject matter of Example 789 may further include: generating a further emergency communication.

In Example 791, the subject matter of Example 790 can optionally include modifying the emergency communication includes concatenating the emergency communication with the further emergency communication.

In Example 792, the subject matter of Examples 775 to 791 can optionally include one or more components of the emergency communication are protected by a security technique.

In Example 793, the subject matter of Examples 775 to 792 can optionally include the transceiver being configured to forward the emergency communication over the radio communication network In Example 794, the subject matter of Examples 775 to 793 can optionally include the transceiver being configured to forward the emergency communication over the device-to-device network.

Example 795 is one or more non-transitory computer readable media storing instructions thereon that when executed by at least one processor of a device, direct the device to perform a method which may include: receiving an emergency communication over the device-to-device network; determining whether to forward the emergency communication based on one or more components of the emergency communication; and forwarding the emergency communication based on the determination.

Example 796 is one or more non-transitory computer readable media storing instructions thereon that when executed by at least one processor of a device, direct the device to perform the subject matter of any one of Examples 775 to 794.

Example 797 is one or more non-transitory computer readable media storing instructions thereon that when executed by at least one processor of a device, direct the device to perform the subject matter of any one of Examples 775 to 794.

Example 798 is a device, which may include: a processor; and a memory storing instructions that when executed by the processor cause the processor to perform the method which may include: receiving an emergency communication over the device-to-device network; determining whether to forward the emergency communication based on one or more components of the emergency communication; and forwarding the emergency communication based on the determination.

Example 799 is a device, which may include: a processor; and a memory storing instructions that when executed by the processor cause the processor to perform the subject matter of any one of Examples 775 to 794.

Example 800 is a communication device connected to a radio communication network, in which the communication device may include: means for receiving an emergency communication over the device-to-device network; means for determining whether to forward the emergency communication based on one or more components of the emergency communication; and means for forwarding the emergency communication based on the determination.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wireless device comprising:
    a transceiver comprising an antenna arrangement with at least two antennas;
    a communication processor configured to control communications of the wireless device with at least one further wireless device included in a network of wireless devices based on data relating to mutual connections between wireless devices included in the network;
    a beamforming controller configured to control a configuration of the at least two antennas to steer at least one beam for transmission of data based on beamforming information,
    wherein the beamforming controller is configured to control the configuration of the at least two antennas to suppress interference in a direction different from a direction in which the wireless device receives data from the at least one further wireless device.

2. The wireless device according to any one of claim 1, wherein the beamforming controller is configured to control the configuration of the at least two antennas to steer the at least one beam towards the at least one further wireless device.

3. The wireless device according to claim 1, wherein the data of the data transmission is payload data.

4. The wireless device according to claim 1, wherein the beamforming information comprises position information of the at least one further wireless device.

5. The wireless device according to claim 4, wherein the position information is an absolute position of the at least one further wireless device comprised by the beamforming information, and wherein the transceiver is configured to receive the beamforming information from the at least one further wireless device.

6. The wireless device according to claim 4, wherein the position information is a relative position obtained by the wireless device based on at least one measurement of a signal received from the at least one further wireless device.

7. The wireless device according to claim 1, wherein the beamforming information comprises beamforming capability information of the at least one further wireless device.

8. The wireless device according to claim 7, wherein the beamforming capability information comprises information indicating a maximum number of beams the at least one further wireless device can simultaneously form for data transmission.

9. The wireless device according to claim 7, wherein the beamforming capability information comprises information indicating a range of possible directions in which the at least one further wireless device can form at least one beam for data transmission.

10. The wireless device according to claim 7, wherein the beamforming capability information comprises information indicating a capability of the at least one further wireless device for data transmission according to unicast and/or multicast data transmission.

11. The wireless device according to claim 1, wherein the beamforming controller configured to control the configuration of the at least two antennas to suppress interference in a direction different from a direction in which the wireless device receives data from the at least one further wireless device comprises to suppress interference caused by a transmission from another wireless device.

12. A wireless device comprising:
a receiver configured to receive control information from at least one further wireless device via an antenna arrangement with at least two antennas via a direct device-to-device communication link;
a beamforming controller configured to select a transmit antenna configuration of the antenna arrangement to steer a data transmission beam towards the at least one further wireless device based on the control information,
wherein the beamforming controller is configured to adjust a receive antenna configuration of the antenna arrangement to receive the control information to be adapted to a width of a received beam including the control information, and wherein the beamforming controller is configured to adjust the transmit antenna configuration to steer the data transmission beam towards the at least one further wireless device with a smaller width than the width of the beam for transmission of the control information.

13. The wireless device according to claim 12, wherein the beamforming controller is configured to control the antenna arrangement to receive the control information with at least two candidate receive antenna configurations of the antenna arrangement, and to select the transmit antenna configuration to steer the data transmission beam corresponding to one of the at least two candidate receive antenna configurations.

14. The wireless device according to claim 13, further comprising an estimator configured to estimate a reception quality of the control information for each of the at least two candidate receive antenna configurations, wherein the beamforming controller is configured to select the transmit antenna configuration corresponding to one of the at least two candidate receive antenna configurations based on the reception quality estimated for the one of the at least two candidate receive antenna configurations.

15. The wireless device according to claim 14, wherein the beamforming controller is configured to select the transmit antenna configuration corresponding to the one of the at least two candidate receive antenna configurations for which the estimated reception quality fulfills a predefined reception quality criterion.

16. The wireless device of claim 14, wherein the estimator is configured to compare the reception quality estimated for the one of the at least two candidate receive antenna configurations to a predefined threshold value, the wireless device further comprising a transmitter configured to transmit a confirmation message via the antenna arrangement to the at least one further wireless device if the reception quality is equal to or above the predefined threshold value.

17. The wireless device of claim 14, wherein the estimator is configured to compare the reception quality estimated for the one of the at least two candidate receive antenna configurations to a predefined threshold value, the wireless device further comprising a transmitter configured to transmit payload data via the antenna arrangement to the at least one further wireless device if the reception quality is equal to or above the predefined threshold value.

18. The wireless device according to claim 13, wherein the one of the at least two candidate receive antenna configurations is adapted to a direction and a width of a received beam including the control information, and wherein the transmit antenna configuration is adapted to steer the data transmission beam in the same direction with a smaller width.

19. The wireless device of claim 12, wherein the control information corresponds to a beam acquisition preamble periodically transmitted by the at least one further wireless device.

20. The wireless device of claim 12, wherein the control information corresponds to a predefined beam acquisition preamble suitable for measurements of reception quality.

21. The wireless device of claim 12, wherein the control information corresponds to a random access preamble and/or is included in a sidelink synchronization sub-frame.

22. A wireless device comprising:
a transceiver comprising an antenna arrangement with at least two antennas;
a communication processor configured to control communications of the wireless device with at least one further wireless device included in a network of wireless devices based on data relating to mutual connections between wireless devices included in the network;
a beamforming controller configured to control a configuration of the at least two antennas to steer at least one beam for transmission of data based on beamforming information;
wherein the beamforming information comprises information indicative of a relative distance between the wireless device and at least two further wireless devices, and wherein the beamforming controller is configured to control the configuration of the at least two antennas to adjust an opening angle of the at least one beam for transmission of data to the at least two further wireless devices based on the relative distance.

23. The wireless device according to claim 22, wherein the beamforming controller is configured to control the configuration of the at least two antennas to increase the opening angle for a shorter relative distance and to decrease the opening angle for a larger relative distance.

24. The wireless device according to claim 22, wherein the beamforming controller is configured to control the configuration of the at least two antennas to steer a respective beam for transmission of data to a corresponding one of the at least two further wireless devices, respectively, if the relative distance to at least one of the at least two further wireless devices is below a predefined threshold.

25. The wireless device according to claim 22, wherein the beamforming controller is configured to control the configuration of the at least two antennas by weighting signals received by each respective one of the at least two antennas and/or by weighting signals transmitted by each respective one of the at least two antennas.

* * * * *